(12) United States Patent
Mirous et al.

(10) Patent No.: US 12,180,116 B2
(45) Date of Patent: Dec. 31, 2024

(54) ALKYL SULFATE / ALKYL ETHER SULFATE GYPSUM FOAMER

(71) Applicants: STEPAN COMPANY, Northfield, IL (US); SAINT-GOBAIN PLACO, Suresnes (FR)

(72) Inventors: Brian K. Mirous, Northfield, IL (US); Hamouda Jaffel, Aulnay-sous-bois (FR)

(73) Assignees: STEPAN COMPANY, Northfield, IL (US); SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 18/199,529

(22) Filed: May 19, 2023

(65) Prior Publication Data
US 2023/0303443 A1    Sep. 28, 2023

Related U.S. Application Data

(62) Division of application No. 16/497,606, filed as application No. PCT/US2018/026242 on Apr. 5, 2018, now abandoned.
(Continued)

(51) Int. Cl.
*C04B 24/16* (2006.01)
*C04B 28/14* (2006.01)
(Continued)

(52) U.S. Cl.
CPC ............. *C04B 24/16* (2013.01); *C04B 28/14* (2013.01); *C04B 38/106* (2013.01);
(Continued)

(58) Field of Classification Search
CPC ....... C04B 24/16; C04B 28/14; C04B 38/106; C04B 40/0039; C08K 5/36; C08K 5/41
See application file for complete search history.

(56) References Cited

U.S. PATENT DOCUMENTS 6,348,076 B1    2/2002   Canaperi et al.
7,033,431 B2    4/2006   Martin et al.
(Continued)

FOREIGN PATENT DOCUMENTS

| WO | WO 2016/205170 A1 | 12/2016 | |
|---|---|---|---|
| WO | WO 2017/063047 A1 | 4/2017 | |
| WO | WO-2017137417 A1 * | 8/2017 | ............. C04B 28/14 |

OTHER PUBLICATIONS

International Search Report issued Aug. 22, 2018 in PCT/US2018/026242 filed Apr. 5, 2018.

*Primary Examiner* — John E Uselding
(74) *Attorney, Agent, or Firm* — Oblon, McClelland, Maier & Neustadt, L.L.P.

(57) ABSTRACT

A surfactant composition is disclosed comprising a first alkyl sulfate surfactant, optionally a second alkyl sulfate surfactant, and optionally an alkyl ether sulfate. The first and second alkyl sulfate surfactants have Formula (1):

$$R^1\text{—}OSO_3^{-+}M^1 \qquad (1)$$

and the alkyl ether sulfate has Formula (2):

$$R^2\text{—}(OCH_2CH_2)_y OSO_3^{-+}M^2 \qquad (2)$$

in which $R^1$ and $R^2$ are independently selected linear or branched alkyl or a combination thereof having from 6 to 14 carbon atoms, y has an average value from 0.1 to 5, and $M^1$ and $M^2$ are cations independently selected from sodium, calcium, ammonium, or a combination of two or all of these. Use of the composition as a foaming agent for gypsum slurries, and of the gypsum slurries for formation of gypsum boards, are disclosed.

2 Claims, 1 Drawing Sheet

Related U.S. Application Data

(60) Provisional application No. 62/482,416, filed on Apr. 6, 2017.

(51) Int. Cl.
  *C04B 38/10* (2006.01)
  *C04B 40/00* (2006.01)
  *C08K 5/36* (2006.01)
  *C08K 5/41* (2006.01)
  *C04B 111/00* (2006.01)

(52) U.S. Cl.
  CPC ............ C04B 40/0039 (2013.01); C08K 5/36 (2013.01); C08K 5/41 (2013.01); *C04B 2111/0062* (2013.01)

(56) References Cited

U.S. PATENT DOCUMENTS

2003/0188670 A1 * 10/2003 Martin .................... C04B 28/14
  106/781
2008/0223258 A1    9/2008 Bruce et al.

\* cited by examiner

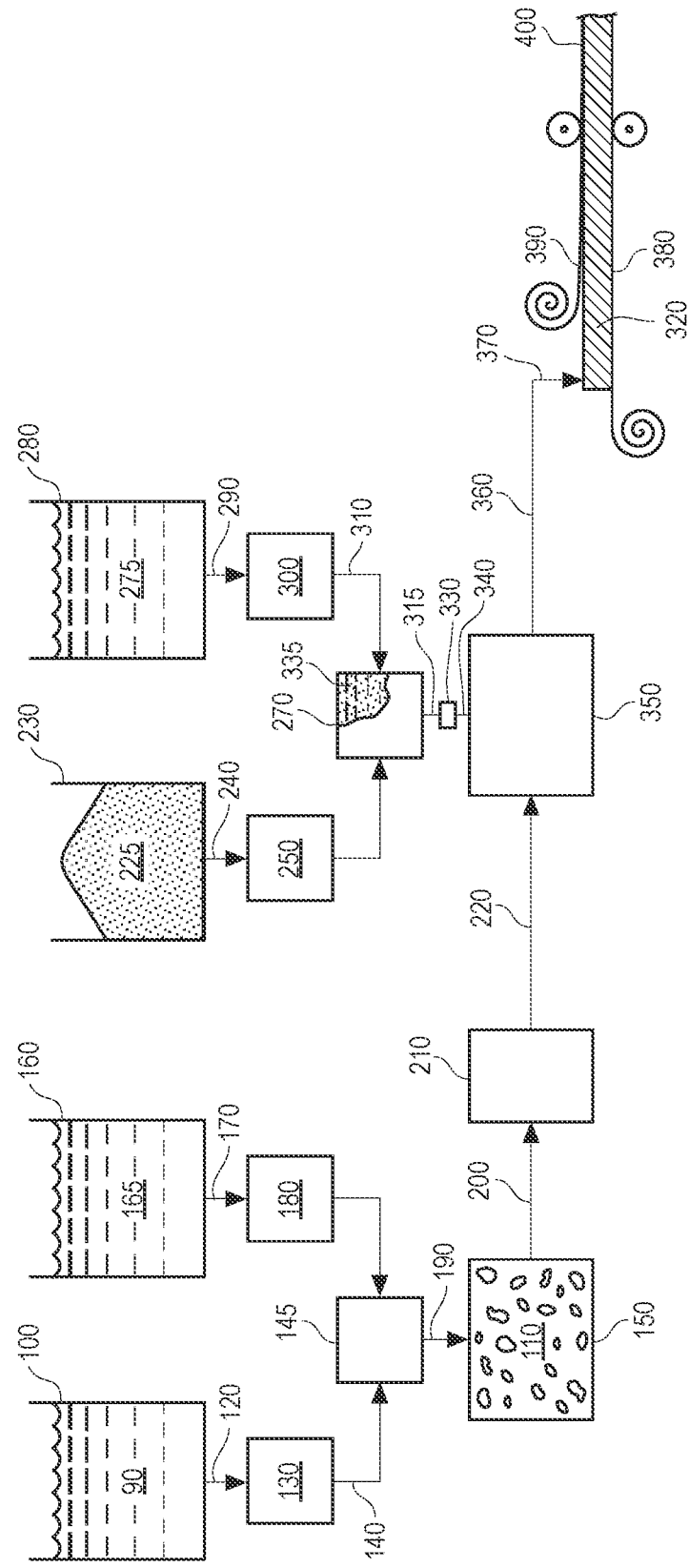

ALKYL SULFATE / ALKYL ETHER SULFATE GYPSUM FOAMER

This application is a division of application Ser. No. 16/487,606, filed Sep. 25, 2019, as the U.S. National Stage Application of PCT/US2018/026242, and claims the priority of U.S. Provisional Ser. No. 62/482,416, filed Apr. 6, 2017, which is incorporated by reference in its entirety to provide continuity of disclosure.

BACKGROUND

The disclosed technology relates generally to the manufacture of gypsum wallboard, and more particularly to a surfactant composition used to foam the gypsum slurry incorporated into the gypsum wallboard between the facing sheets. The purpose of foaming the gypsum slurry is to reduce the weight of the gypsum wallboard while still enabling it to perform its functions as a building material.

U.S. Patent Application Publication 2008/0223258 A1 ("Bruce et al.") provides a description of preexisting knowledge in the formation of gypsum wallboard using foaming agents. Other patent documents providing background in this area are U.S. Pat. Nos. 4,156,615; 5,085,929; 5,116,671; 5,240,639; 5,643,510; 5,714,001; 7,033,431; 7,220,373; WO2014172469; and WO2016205170. Each of these patent documents is incorporated by reference in its entirety.

SUMMARY

In a first embodiment, a surfactant composition is contemplated comprising:
from 70 to 100 wt. % by total surfactant weight of a linear or branched alkyl sulfate; and
from 0 to 30 wt. % by total surfactant weight of a linear or branched alkyl ether sulfate.

The linear or branched alkyl sulfate comprises the structure of Formula (1):

  (1)

in which $R^1$ is linear or branched alkyl having from 6 to 14 carbon atoms and $M^1$ is a cation. The alkyl ether sulfate comprises the structure of Formula (2):

  (2)

in which $R^2$ is branched alkyl or linear alkyl or a combination thereof having from 6 to 14 carbon atoms, y has an average value from 0.1 to 5, preferably from 0.8 to 3, and $M^2$ is a cation. $M^1$ and $M^2$ can be independently selected, and can be the same or different.

In a second embodiment, a surfactant composition is contemplated comprising:
from 91 to 99.5 wt. % by total surfactant weight of a linear or branched alkyl sulfate having the structure of Formula (1), an average number of carbon atoms, $n_m$, in $R^1$ between 10 and 11, and the following proportions by weight of species of Formula (1):
7% to 12% in which $R^1$ is straight or branched $C_9H_{19}$;
42% to 59% in which $R^1$ is straight or branched $C_{10}H_{21}$;
15% to 29% in which $R^1$ is straight or branched $C_{11}H_{23}$;
7% to 15% in which $R^1$ is straight or branched $C_{12}H_{25}$; and
from 0.5 to 9 wt. % by total surfactant weight of a linear or branched alkyl ether sulfate having the structure of Formula (2), an average number of carbon atoms, $n_m$, in $R^2$ between 10 and 11, and an average value of y from 0.5 to 2.5.

In a third embodiment, a surfactant composition is contemplated comprising:
from 97.5 to 99.5 wt. % by total surfactant weight of a linear or branched alkyl sulfate having the structure of Formula (1), an average number of carbon atoms, $n_m$, in $R^1$ between 9 and 10, and the following proportions by weight of species of Formula (1):
25% to 47% in which R1 is straight or branched $C_8H_{17}$;
38% to 55% in which $R^1$ is straight or branched $C_{10}H_{21}$;
12% to 20% in which $R^1$ is straight or branched $C_{12}H_{25}$; and
from 0.5 to 2.5 wt. % by total surfactant weight of a linear or branched alkyl ether sulfate having the structure of Formula (2), an average number of carbon atoms, $n_m$, in $R^2$ between 9 and 10, and an average value of y from 0.5 to 2.5.

A gypsum slurry according to any of the first, second, and third embodiments is contemplated comprising gypsum, water, and the surfactant composition of the embodiment.

A gypsum board according to any of the first, second, and third embodiments is contemplated comprising a core and facing sheets, the core comprising the gypsum slurry according to the embodiment. The core has multiple foam voids, which are also sometimes referred to as bubbles, with the same meaning.

Still other aspects and variations are also provided, as will be evident to a person of ordinary skill in the gypsum wallboard manufacturing art, after considering this specification and the other knowledge possessed by such a person.

BRIEF DESCRIPTION OF DRAWING FIGURES

FIG. 1 is a schematic diagram of a gypsum wallboard manufacturing line according to any embodiment.

The following reference characters are used in the FIG. 1:

| | |
|---|---|
| 90 | First foam water composition |
| 100 | Vessel |
| 110 | Foam |
| 120 | Pipe |
| 130 | Fluid meter |
| 140 | Outlet pipe |
| 145 | Mixer |
| 150 | Foam generator |
| 160 | Vessel |
| 165 | Second foam water composition |
| 170 | Pipe |
| 180 | Fluid meter |
| 190 | Pipe |
| 200 | Pipe or trough |
| 210 | Foam feeder |
| 220 | Pipe or trough |
| 225 | Stucco |
| 230 | Bin |
| 240 | Chute |
| 250 | Dry material feeder |
| 270 | Mixing vessel |
| 275 | Gauge water |
| 280 | Tank |
| 290 | Drain |
| 300 | Metering feeder |
| 310 | Pipe |
| 315 | Pipe |
| 320 | Foamed gypsum slurry |
| 330 | Metering feeder |
| 335 | Still gypsum slurry |
| 340 | Pipe |

-continued

| | |
|---|---|
| 350 | Mixing vessel |
| 360 | Vessel or trough |
| 370 | Depositing point |
| 380 | Running lower web |
| 390 | Running upper web |
| 400 | Gypsum board |

DETAILED DESCRIPTION

The surfactant compositions of the first, second, or third embodiment briefly described above comprise one or more surfactants, water, and optionally other ingredients. The proportions in the net surfactant composition to be combined with the stucco, from one or more feed streams, optionally of different composition if from more than one feed stream, can be from 70 to 100 wt. %, optionally 90 to 100 wt. %, optionally 93 to 99 wt. % by total surfactant weight of a linear or branched alkyl sulfate, which optionally can be a mixture of two or more linear or branched alkyl sulfates having an alkyl chain length of 6 to 14 carbon atoms; and from 0 to 30 wt. %, optionally 0 to 10 wt. %, optionally 1 to 7 wt. % by total surfactant weight of a linear or branched alkyl ether sulfate, which optionally can be a mixture of two or more linear or branched alkyl ether sulfates having an alkyl chain length of 6 to 14 carbon atoms.

"By total surfactant weight" means that these proportions only reflect the amount of these particular active surfactants, not including any amount of water, gypsum, or non-surfactant ingredients present in the surfactants as supplied or as formulated.

The alkyl sulfate of the first embodiment comprises the structure of Formula (1):

$$R^1\text{—}OSO_3^{-+}M^1 \quad (1)$$

in which $R^1$ is linear or branched alkyl having from 6 to 14 carbon atoms, and $M^1$ is a cation. Alternatively in this first embodiment, $R^1$ has at least 9 carbon atoms, alternatively at least 10 carbon atoms, alternatively at least 11 carbon atoms, alternatively at most about 14 carbon atoms. Specific alkyl sulfates of the first embodiment contemplated here and commercially available are $C_8$, $C_{8-10}$, $C_9$, $C_{10}$, $C_{10-12}$, $C_{12-14}$, or $C_{9-11}$ alkyl sulfates, and mixtures of any two or more of these. Any of these alkyl sulfate species can be linear, branched (as shown and described in more detail in WO2016205170), or a combination of linear and branched species.

Broadly speaking, linear $R^1$ or any branching of $R^1$ is contemplated in the first embodiment.

Any suitable cation may be used, including but not limited to calcium, sodium, ammonium, or any combination of two or more of these.

The alkyl ether sulfate of the first embodiment contemplated here comprises the structure of Formula (2):

$$R^2\text{—}(OCH_2CH_2)_y OSO_3^{-+}M^2 \quad (2)$$

in which $R^2$ is branched alkyl or linear alkyl or a combination thereof having from 6 to 14 carbon atoms, optionally 6 to 11 carbon atoms, y has an average value from 0.1 to 5, optionally 0.8 to 3, optionally 1.8 to 2.8, and $M^2$ is any suitable cation, including but not limited to calcium, sodium, ammonium, or any combination of two or more of these.

Specific alkyl ether sulfates of the first embodiment contemplated here can be made by ethoxylating the corresponding alkyl sulfates described above to the desired degree, using well-known technology. Specifically contemplated here are $C_8$, $C_{8-10}$, $C_9$, $C_{10}$, $C_{10-12}$, $C_{12-14}$, or $C_{9-11}$ alkyl ether sulfates, and mixtures of any two or more of these. The alkyl moiety of any of these alkyl ether sulfate species can be linear, branched (as shown and described in more detail in WO2016205170), or a combination of linear and branched species.

$M^1$ and $M^2$ of the first embodiment are independently selected, meaning they can be the same or different. Optionally, $M^1$ and $M^2$ can each be ammonium ($NH_4^+$). Optionally, $M^1$ and $M^2$ can each be sodium (Nat). Alternatively in the first embodiment $M^1$ is sodium and $M^2$ is ammonium. Alternatively in the first embodiment $M^1$ is ammonium and $M^2$ is sodium.

A second embodiment is like the first embodiment, except that the contemplated surfactant composition comprises:
from 91 to 99.5 wt. % by total surfactant weight of a linear or branched alkyl sulfate having the structure of Formula (1), an average number of carbon atoms, $n_m$, in $R^1$ between 10 and 11, and the following proportions by weight of species of Formula (1):
7% to 12% in which $R^1$ is straight or branched $C_9H_{19}$;
42% to 59% in which $R^1$ is straight or branched $C_{10}H_{21}$;
15% to 29% in which $R^1$ is straight or branched $C_{11}H_{23}$;
7% to 15% in which $R^1$ is straight or branched $C_{12}H_{25}$; and
from 0.5 to 9 wt. % by total surfactant weight of a linear or branched alkyl ether sulfate having the structure of Formula (2), an average number of carbon atoms, $n_m$, in $R^2$ between 10 and 11, and an average value of y from 0.5 to 2.5.

A third embodiment is like the first and second embodiments, except that the contemplated surfactant composition comprises:
from 97.5 to 99.5 wt. % by total surfactant weight of a linear or branched alkyl sulfate having the structure of Formula (1), an average number of carbon atoms, $n_m$, in $R^1$ between 9 and 10, and the following proportions by weight of species of Formula (1):
25% to 47% in which $R^1$ is straight or branched $C_8H_{17}$;
38% to 55% in which $R^1$ is straight or branched $C_{10}H_{21}$;
12% to 20% in which $R^1$ is straight or branched $C_{12}H_{25}$; and
from 0.5 to 2.5 wt. % by total surfactant weight of a linear or branched alkyl ether sulfate having the structure of Formula (2), an average number of carbon atoms, $n_m$, in $R^2$ between 9 and 10, and an average value of y from 0.5 to 2.5.

A gypsum slurry of any embodiment is made by combining stucco, water, and a surfactant comprising the corresponding embodiment of the surfactant composition described above. "Gypsum" technically refers to the hydrated mineral that can either be mined or produced by combining calcined gypsum—stucco—with water. Since the present compositions contain water, the slurry is specified here as a gypsum slurry, even though, if still not fully cured, some of this mineral persists as stucco. The range of proportions of stucco addition is well known to those skilled in the art. For example, useful proportions of stucco (for example, about 72 wt. %), foaming surfactant (typically from about 0.005 wt. % to about 0.03 wt. %), and water (balance, for example about 28 wt. %) can be used. A person of ordinary skill can vary and adapt these proportions and ingredients to particular processing conditions and desired compositions.

Various optional ingredients can be employed in the present gypsum slurries of any embodiment. Some examples of such optional ingredients, including many mentioned in ¶¶ 0075-0081 of Bruce et al., incorporated by reference, are slurry set retarders or accelerators (such as finely ground gypsum and/or potassium sulfate), ball mill accelerators (for example containing starch or dextrose), water-reducing agents, dispersants, moisture-resistant agents, fire-retardant agents, paper fiber and/or chopped glass fibers, boric acid, or other ingredients. Among the effects that these additives are known to achieve are: a reduction in the amount of water required to produce a workable gypsum board core slurry; a reduced slurry viscosity; the retardation of the onset of setting of the slurry to a solid gypsum board core until after the fully formulated foamed gypsum board core has been formed into its final width; the acceleration of the setting of the calcined gypsum slurry on the setting belt; an increased resistance to product over-drying during manufacture; an increased resistance of the final product to moisture and fire; and an increased resistance to damage during shipping, handling and the installation of the manufactured gypsum board.

A gypsum board 400 of any embodiment is contemplated comprising a foamed gypsum core 320 and facing sheets 380 and 390 as shown in FIG. 1. The core 320 comprises gypsum plus any surfactant composition embodiment described above. The core 320 has multiple foam voids.

A first foam water composition 90 of any embodiment is provided, for example disposed in a vessel 100, comprising 0.05 to 1 wt. % active weight of an alkyl sulfate surfactant. The alkyl sulfate surfactant of the first foam water composition comprises a linear or branched alkyl sulfate surfactant as described above. The first foam water composition can thus be a pure linear alkyl sulfate or a mixture of linear alkyl sulfate with a branched alkyl sulfate, optionally further combined with other materials. One specific example of an additional material contemplated here is one or more alkyl ether sulfates, which usually is combined in a minor proportion relative to the amount of one or more alkyl sulfates.

A second foam water composition 165 of any embodiment is also provided, for example disposed in a vessel 160, which has a composition somewhat different in proportions or ingredients from the first foam water composition, so they can be mixed in different proportions during production to control production specifications such as median foam void diameter. For example, it has been found that using a surfactant mixture having more alkyl sulfate surfactant and less alkyl ether sulfate surfactant, or a less-highly-ethoxylated alkyl ether sulfate, or a greater proportion of branched alkyl sulfate, or a shorter chain alkyl sulfate, may produce larger median foam void diameters.

It is also contemplated that the water used to make the foam water compositions may equally be added before or after the linear and branched alkyl sulfate surfactants, and/or an alkyl ether sulfate surfactant or other ingredients, are mixed. Regardless of the order of addition of the water, surfactants, or other ingredients, this process step is regarded as combining the first and second foam water compositions.

The first foam water composition 90 of any embodiment in the tank 100 can be exhausted through a pipe 120, metered in a specific proportion at any given time by a fluid meter 130, and passed by an outlet pipe 140 to a mixer 145. The second foam water composition 165 in the tank 160 can be exhausted through a pipe 170, metered in a specific proportion at any given time by a fluid meter 180, and passed to the mixer 145. The mixer 145 mixes the first and second foam water composition to form a final or net foam water composition, and passes the final or net foam water composition via a pipe 190 to the foam generator 150. The foam generator 150 employs mechanical energy, such as rotation of an impeller, to generate foam 110 from the foam water.

Alternatively in any embodiment, the first and second foam water compositions can be foamed independently, for example in separate foam generators, and the respective streams of foam combined either before or as the foam and stucco are mixed in the slurry mixer.

A third foam water composition can also be prepared and mixed into the gypsum slurry in any embodiment. The third foam water composition optionally can be combined with one or both of the first and second foam water compositions as a still composition or as separately generated foam. Alternatively, the third foam water composition can be added directly to the gypsum slurry mixer in the form of foam.

Separately, a gypsum slurry is formed by combining the foam 110, stucco 225, optionally gauge water 275, and optionally minor proportions of other ingredients. Any method, order of steps, or equipment can be used.

Referring again to FIG. 1, when forming a gypsum slurry, stucco 225 provided in a suitable bin 230 can be conveyed via a chute 240 by a dry material feeder 250, such as a screw feeder, to a mixing vessel 270. Gauge water 275 provided in a suitable tank 280 can be conveyed via a drain 290, a metering feeder 300, and a pipe 310 to the mixing vessel 270, optionally an in-line or other type of continuous mixer, where the stucco 225 and gauge water 275 can be mixed to form a still (unfoamed) gypsum slurry 335.

The still gypsum slurry 335 can leave the mixing vessel 270 via a pipe 315, a metering feeder 330, and a pipe 340 to a further mixing vessel 350. The foam 110 can be conveyed via a pipe or trough 200, a foam feeder 210, and a pipe or trough 220 to the further mixing vessel 350, which for example can be a pin mixer, a pinless mixer, or any other useful type of slurry mixer. The further mixing vessel 350 is operated to mix the foam 110 and the still gypsum slurry 335 to form a foamed gypsum slurry 320.

Alternatively, the stucco 225, gauge water 275, and foam 110 could be combined in a single mixer to form a foamed gypsum slurry 320.

Alternatively, the foam water 90 and the foam water 165 could be separately foamed and the two streams of foam could be mixed together either upstream of or directly with the stucco 225 and gauge water 275 in a single mixer 350 to form a foamed gypsum slurry 320.

The foamed gypsum slurry 320 can leave the further mixing vessel 350 via a pipe or trough 360 and can be deposited at the deposition point 370 on a running lower web 380 of paper or another type of facing sheet. The foamed gypsum slurry can be sandwiched to form a gypsum board 400 by applying a running upper web 390 of paper or other material on the foamed gypsum slurry. The foamed gypsum slurry 320, contained between its facing sheets defined by the running lower web 380 and running upper web 390, is then cured, dried, and cut to form gypsum wallboards or another product.

Alternatively, the apparatus and methods described in Bruce et al., incorporated by reference above, can be used.

Also contemplated in any embodiment is a new method of changing the median foam void diameter in a gypsum board while forming the board. The method can be used, for example, to correct a deviation from the intended median foam void diameter, preferably while the board forming line remains operating to minimize or eliminate down time.

The method can be carried out as follows in any embodiment. First and second foam water compositions 90 and 165 and stucco 225 as described above are provided, again optionally including additional ingredients. A foamed gypsum slurry 320 is formed comprising the first foam water composition 90, the second foam water composition 165, and stucco 225 and delivered at the delivery point 270. While the foamed gypsum slurry 320 is being formed, the proportions of the first and second foam water compositions 90 and 165 are changed to change the median foam void diameter of the gypsum slurry, and thus the median foam void diameter in the gypsum board 400.

WORKING EXAMPLES

The following examples illustrate the practice of the present technology of any embodiment without limiting the technology.

Protocol for Gypsum Slurry Formation

Foamers are provided, each made from one or more alkyl sulfates and in some cases one or more alkyl ether sulfates having the respective alkyl chain lengths, proportions, and one of the alternative ranges or degrees of ethoxylation specified in Tables 1-15. (Range A or B and Species C, D, or E in Table 15 are alternative proportions of ethoxylation specified for each listed species.) Thus the row identified as Species 1 of Table 1 provides five different species, respectively 1A, 1B, 1C, 1D, and 1E, as do the other numbered species in the respective rows of Tables 1-15.

To prepare foam water, the selected gypsum foaming surfactant (sometimes referred to as a "foamer") is combined with room temperature tap water in suitable proportions, for example, from about 0.005 wt. % to about 0.03 wt. % surfactant (by weight of the complete gypsum slurry). Separately, gauging water is prepared by combining, for example, tap water, a retarder, and a dispersant in suitable proportions.

The dry ingredients, for example stucco, boric acid, a ball mill accelerator (BMA) containing 5% dextrose, and starch are mixed in suitable proportions.

To prepare the gypsum slurry, the foam water and dry ingredients are combined.

TABLE 1

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % | Average mol. EO (Alternatives for each numbered species) | | | | |
| Species | 8 | 8 to 10 | 6 | Range A | Range B | Species C | Species D | Species E |
| 1 | 30% | 70% | 0% | 0.8 to 3 | 1.8 to 2.8 | 2.0 | 2.2 | 2.4 |
| 2 | 31% | 69% | 0% | 0.8 to 3 | 1.8 to 2.8 | 2.0 | 2.2 | 2.4 |
| 3 | 32% | 68% | 0% | 0.8 to 3 | 1.8 to 2.8 | 2.0 | 2.2 | 2.4 |
| 4 | 33% | 67% | 0% | 0.8 to 3 | 1.8 to 2.8 | 2.0 | 2.2 | 2.4 |
| 5 | 34% | 66% | 0% | 0.8 to 3 | 1.8 to 2.8 | 2.0 | 2.2 | 2.4 |
| 6 | 35% | 65% | 0% | 0.8 to 3 | 1.8 to 2.8 | 2.0 | 2.2 | 2.4 |
| 7 | 36% | 64% | 0% | 0.8 to 3 | 1.8 to 2.8 | 2.0 | 2.2 | 2.4 |
| 8 | 37% | 63% | 0% | 0.8 to 3 | 1.8 to 2.8 | 2.0 | 2.2 | 2.4 |
| 9 | 38% | 62% | 0% | 0.8 to 3 | 1.8 to 2.8 | 2.0 | 2.2 | 2.4 |
| 10 | 39% | 61% | 0% | 0.8 to 3 | 1.8 to 2.8 | 2.0 | 2.2 | 2.4 |
| 11 | 40% | 60% | 0% | 0.8 to 3 | 1.8 to 2.8 | 2.0 | 2.2 | 2.4 |
| 12 | 41% | 59% | 0% | 0.8 to 3 | 1.8 to 2.8 | 2.0 | 2.2 | 2.4 |
| 13 | 42% | 58% | 0% | 0.8 to 3 | 1.8 to 2.8 | 2.0 | 2.2 | 2.4 |
| 14 | 43% | 57% | 0% | 0.8 to 3 | 1.8 to 2.8 | 2.0 | 2.2 | 2.4 |
| 15 | 44% | 56% | 0% | 0.8 to 3 | 1.8 to 2.8 | 2.0 | 2.2 | 2.4 |
| 16 | 45% | 55% | 0% | 0.8 to 3 | 1.8 to 2.8 | 2.0 | 2.2 | 2.4 |
| 17 | 46% | 54% | 0% | 0.8 to 3 | 1.8 to 2.8 | 2.0 | 2.2 | 2.4 |
| 18 | 47% | 53% | 0% | 0.8 to 3 | 1.8 to 2.8 | 2.0 | 2.2 | 2.4 |
| 19 | 48% | 52% | 0% | 0.8 to 3 | 1.8 to 2.8 | 2.0 | 2.2 | 2.4 |
| 20 | 49% | 51% | 0% | 0.8 to 3 | 1.8 to 2.8 | 2.0 | 2.2 | 2.4 |
| 21 | 50% | 50% | 0% | 0.8 to 3 | 1.8 to 2.8 | 2.0 | 2.2 | 2.4 |
| 22 | 51% | 49% | 0% | 0.8 to 3 | 1.8 to 2.8 | 2.0 | 2.2 | 2.4 |
| 23 | 52% | 48% | 0% | 0.8 to 3 | 1.8 to 2.8 | 2.0 | 2.2 | 2.4 |
| 24 | 53% | 47% | 0% | 0.8 to 3 | 1.8 to 2.8 | 2.0 | 2.2 | 2.4 |
| 25 | 54% | 46% | 0% | 0.8 to 3 | 1.8 to 2.8 | 2.0 | 2.2 | 2.4 |
| 26 | 55% | 45% | 0% | 0.8 to 3 | 1.8 to 2.8 | 2.0 | 2.2 | 2.4 |
| 27 | 56% | 44% | 0% | 0.8 to 3 | 1.8 to 2.8 | 2.0 | 2.2 | 2.4 |
| 28 | 57% | 43% | 0% | 0.8 to 3 | 1.8 to 2.8 | 2.0 | 2.2 | 2.4 |
| 29 | 58% | 42% | 0% | 0.8 to 3 | 1.8 to 2.8 | 2.0 | 2.2 | 2.4 |
| 30 | 59% | 41% | 0% | 0.8 to 3 | 1.8 to 2.8 | 2.0 | 2.2 | 2.4 |
| 31 | 60% | 40% | 0% | 0.8 to 3 | 1.8 to 2.8 | 2.0 | 2.2 | 2.4 |
| 32 | 30% | 69.5% | 0.5% | 0.8 to 3 | 1.8 to 2.8 | 2.0 | 2.2 | 2.4 |
| 33 | 31% | 68.5% | 0.5% | 0.8 to 3 | 1.8 to 2.8 | 2.0 | 2.2 | 2.4 |
| 34 | 32% | 67.5% | 0.5% | 0.8 to 3 | 1.8 to 2.8 | 2.0 | 2.2 | 2.4 |
| 35 | 33% | 66.5% | 0.5% | 0.8 to 3 | 1.8 to 2.8 | 2.0 | 2.2 | 2.4 |
| 36 | 34% | 65.5% | 0.5% | 0.8 to 3 | 1.8 to 2.8 | 2.0 | 2.2 | 2.4 |
| 37 | 35% | 64.5% | 0.5% | 0.8 to 3 | 1.8 to 2.8 | 2.0 | 2.2 | 2.4 |
| 38 | 36% | 63.5% | 0.5% | 0.8 to 3 | 1.8 to 2.8 | 2.0 | 2.2 | 2.4 |
| 39 | 37% | 62.5% | 0.5% | 0.8 to 3 | 1.8 to 2.8 | 2.0 | 2.2 | 2.4 |
| 40 | 38% | 61.5% | 0.5% | 0.8 to 3 | 1.8 to 2.8 | 2.0 | 2.2 | 2.4 |
| 41 | 39% | 60.5% | 0.5% | 0.8 to 3 | 1.8 to 2.8 | 2.0 | 2.2 | 2.4 |
| 42 | 40% | 59.5% | 0.5% | 0.8 to 3 | 1.8 to 2.8 | 2.0 | 2.2 | 2.4 |
| 43 | 41% | 58.5% | 0.5% | 0.8 to 3 | 1.8 to 2.8 | 2.0 | 2.2 | 2.4 |
| 44 | 42% | 57.5% | 0.5% | 0.8 to 3 | 1.8 to 2.8 | 2.0 | 2.2 | 2.4 |

TABLE 1-continued

| | Alkyl Sulfate Alkyl Chain Length, Wt. % | Alkyl Chain Length, Wt. % | Alkyl Ether Sulfate Average mol. EO (Alternatives for each numbered species) | | | | |
|---|---|---|---|---|---|---|---|
| Species | 8 | 8 to 10 | 6 | Range A | Range B | Species C | Species D | Species E |
| 45 | 43% | 56.5% | 0.5% | 0.8 to 3 | 1.8 to 2.8 | 2.0 | 2.2 | 2.4 |
| 46 | 44% | 55.5% | 0.5% | 0.8 to 3 | 1.8 to 2.8 | 2.0 | 2.2 | 2.4 |
| 47 | 45% | 54.5% | 0.5% | 0.8 to 3 | 1.8 to 2.8 | 2.0 | 2.2 | 2.4 |
| 48 | 46% | 53.5% | 0.5% | 0.8 to 3 | 1.8 to 2.8 | 2.0 | 2.2 | 2.4 |
| 49 | 47% | 52.5% | 0.5% | 0.8 to 3 | 1.8 to 2.8 | 2.0 | 2.2 | 2.4 |
| 50 | 48% | 51.5% | 0.5% | 0.8 to 3 | 1.8 to 2.8 | 2.0 | 2.2 | 2.4 |
| 51 | 49% | 50.5% | 0.5% | 0.8 to 3 | 1.8 to 2.8 | 2.0 | 2.2 | 2.4 |
| 52 | 50% | 49.5% | 0.5% | 0.8 to 3 | 1.8 to 2.8 | 2.0 | 2.2 | 2.4 |
| 53 | 51% | 48.5% | 0.5% | 0.8 to 3 | 1.8 to 2.8 | 2.0 | 2.2 | 2.4 |
| 54 | 52% | 47.5% | 0.5% | 0.8 to 3 | 1.8 to 2.8 | 2.0 | 2.2 | 2.4 |
| 55 | 53% | 46.5% | 0.5% | 0.8 to 3 | 1.8 to 2.8 | 2.0 | 2.2 | 2.4 |
| 56 | 54% | 45.5% | 0.5% | 0.8 to 3 | 1.8 to 2.8 | 2.0 | 2.2 | 2.4 |
| 57 | 55% | 44.5% | 0.5% | 0.8 to 3 | 1.8 to 2.8 | 2.0 | 2.2 | 2.4 |
| 58 | 56% | 43.5% | 0.5% | 0.8 to 3 | 1.8 to 2.8 | 2.0 | 2.2 | 2.4 |
| 59 | 57% | 42.5% | 0.5% | 0.8 to 3 | 1.8 to 2.8 | 2.0 | 2.2 | 2.4 |
| 60 | 58% | 41.5% | 0.5% | 0.8 to 3 | 1.8 to 2.8 | 2.0 | 2.2 | 2.4 |
| 61 | 59% | 40.5% | 0.5% | 0.8 to 3 | 1.8 to 2.8 | 2.0 | 2.2 | 2.4 |
| 62 | 60% | 39.5% | 0.5% | 0.8 to 3 | 1.8 to 2.8 | 2.0 | 2.2 | 2.4 |
| 63 | 30% | 69% | 1% | 0.8 to 3 | 1.8 to 2.8 | 2.0 | 2.2 | 2.4 |
| 64 | 31% | 68% | 1% | 0.8 to 3 | 1.8 to 2.8 | 2.0 | 2.2 | 2.4 |
| 65 | 32% | 67% | 1% | 0.8 to 3 | 1.8 to 2.8 | 2.0 | 2.2 | 2.4 |
| 66 | 33% | 66% | 1% | 0.8 to 3 | 1.8 to 2.8 | 2.0 | 2.2 | 2.4 |
| 67 | 34% | 65% | 1% | 0.8 to 3 | 1.8 to 2.8 | 2.0 | 2.2 | 2.4 |
| 68 | 35% | 64% | 1% | 0.8 to 3 | 1.8 to 2.8 | 2.0 | 2.2 | 2.4 |
| 69 | 36% | 63% | 1% | 0.8 to 3 | 1.8 to 2.8 | 2.0 | 2.2 | 2.4 |
| 70 | 37% | 62% | 1% | 0.8 to 3 | 1.8 to 2.8 | 2.0 | 2.2 | 2.4 |
| 71 | 38% | 61% | 1% | 0.8 to 3 | 1.8 to 2.8 | 2.0 | 2.2 | 2.4 |
| 72 | 39% | 60% | 1% | 0.8 to 3 | 1.8 to 2.8 | 2.0 | 2.2 | 2.4 |
| 73 | 40% | 59% | 1% | 0.8 to 3 | 1.8 to 2.8 | 2.0 | 2.2 | 2.4 |
| 74 | 41% | 58% | 1% | 0.8 to 3 | 1.8 to 2.8 | 2.0 | 2.2 | 2.4 |
| 75 | 42% | 57% | 1% | 0.8 to 3 | 1.8 to 2.8 | 2.0 | 2.2 | 2.4 |
| 76 | 43% | 56% | 1% | 0.8 to 3 | 1.8 to 2.8 | 2.0 | 2.2 | 2.4 |
| 77 | 44% | 55% | 1% | 0.8 to 3 | 1.8 to 2.8 | 2.0 | 2.2 | 2.4 |
| 78 | 45% | 54% | 1% | 0.8 to 3 | 1.8 to 2.8 | 2.0 | 2.2 | 2.4 |
| 79 | 46% | 53% | 1% | 0.8 to 3 | 1.8 to 2.8 | 2.0 | 2.2 | 2.4 |
| 80 | 47% | 52% | 1% | 0.8 to 3 | 1.8 to 2.8 | 2.0 | 2.2 | 2.4 |
| 81 | 48% | 51% | 1% | 0.8 to 3 | 1.8 to 2.8 | 2.0 | 2.2 | 2.4 |
| 82 | 49% | 50% | 1% | 0.8 to 3 | 1.8 to 2.8 | 2.0 | 2.2 | 2.4 |
| 83 | 50% | 49% | 1% | 0.8 to 3 | 1.8 to 2.8 | 2.0 | 2.2 | 2.4 |
| 84 | 51% | 48% | 1% | 0.8 to 3 | 1.8 to 2.8 | 2.0 | 2.2 | 2.4 |
| 85 | 52% | 47% | 1% | 0.8 to 3 | 1.8 to 2.8 | 2.0 | 2.2 | 2.4 |
| 86 | 53% | 46% | 1% | 0.8 to 3 | 1.8 to 2.8 | 2.0 | 2.2 | 2.4 |
| 87 | 54% | 45% | 1% | 0.8 to 3 | 1.8 to 2.8 | 2.0 | 2.2 | 2.4 |
| 88 | 55% | 44% | 1% | 0.8 to 3 | 1.8 to 2.8 | 2.0 | 2.2 | 2.4 |
| 89 | 56% | 43% | 1% | 0.8 to 3 | 1.8 to 2.8 | 2.0 | 2.2 | 2.4 |
| 90 | 57% | 42% | 1% | 0.8 to 3 | 1.8 to 2.8 | 2.0 | 2.2 | 2.4 |
| 91 | 58% | 41% | 1% | 0.8 to 3 | 1.8 to 2.8 | 2.0 | 2.2 | 2.4 |
| 92 | 59% | 40% | 1% | 0.8 to 3 | 1.8 to 2.8 | 2.0 | 2.2 | 2.4 |
| 93 | 60% | 39% | 1% | 0.8 to 3 | 1.8 to 2.8 | 2.0 | 2.2 | 2.4 |
| 94 | 30% | 68.5% | 1.5% | 0.8 to 3 | 1.8 to 2.8 | 2.0 | 2.2 | 2.4 |
| 95 | 31% | 67.5% | 1.5% | 0.8 to 3 | 1.8 to 2.8 | 2.0 | 2.2 | 2.4 |
| 96 | 32% | 66.5% | 1.5% | 0.8 to 3 | 1.8 to 2.8 | 2.0 | 2.2 | 2.4 |
| 97 | 33% | 65.5% | 1.5% | 0.8 to 3 | 1.8 to 2.8 | 2.0 | 2.2 | 2.4 |
| 98 | 34% | 64.5% | 1.5% | 0.8 to 3 | 1.8 to 2.8 | 2.0 | 2.2 | 2.4 |
| 99 | 35% | 63.5% | 1.5% | 0.8 to 3 | 1.8 to 2.8 | 2.0 | 2.2 | 2.4 |
| 100 | 36% | 62.5% | 1.5% | 0.8 to 3 | 1.8 to 2.8 | 2.0 | 2.2 | 2.4 |
| 101 | 37% | 61.5% | 1.5% | 0.8 to 3 | 1.8 to 2.8 | 2.0 | 2.2 | 2.4 |
| 102 | 38% | 60.5% | 1.5% | 0.8 to 3 | 1.8 to 2.8 | 2.0 | 2.2 | 2.4 |
| 103 | 39% | 59.5% | 1.5% | 0.8 to 3 | 1.8 to 2.8 | 2.0 | 2.2 | 2.4 |
| 104 | 40% | 58.5% | 1.5% | 0.8 to 3 | 1.8 to 2.8 | 2.0 | 2.2 | 2.4 |
| 105 | 41% | 57.5% | 1.5% | 0.8 to 3 | 1.8 to 2.8 | 2.0 | 2.2 | 2.4 |
| 106 | 42% | 56.5% | 1.5% | 0.8 to 3 | 1.8 to 2.8 | 2.0 | 2.2 | 2.4 |
| 107 | 43% | 55.5% | 1.5% | 0.8 to 3 | 1.8 to 2.8 | 2.0 | 2.2 | 2.4 |
| 108 | 44% | 54.5% | 1.5% | 0.8 to 3 | 1.8 to 2.8 | 2.0 | 2.2 | 2.4 |
| 109 | 45% | 53.5% | 1.5% | 0.8 to 3 | 1.8 to 2.8 | 2.0 | 2.2 | 2.4 |
| 110 | 46% | 52.5% | 1.5% | 0.8 to 3 | 1.8 to 2.8 | 2.0 | 2.2 | 2.4 |
| 111 | 47% | 51.5% | 1.5% | 0.8 to 3 | 1.8 to 2.8 | 2.0 | 2.2 | 2.4 |
| 112 | 48% | 50.5% | 1.5% | 0.8 to 3 | 1.8 to 2.8 | 2.0 | 2.2 | 2.4 |
| 113 | 49% | 49.5% | 1.5% | 0.8 to 3 | 1.8 to 2.8 | 2.0 | 2.2 | 2.4 |
| 114 | 50% | 48.5% | 1.5% | 0.8 to 3 | 1.8 to 2.8 | 2.0 | 2.2 | 2.4 |
| 115 | 51% | 47.5% | 1.5% | 0.8 to 3 | 1.8 to 2.8 | 2.0 | 2.2 | 2.4 |

TABLE 1-continued

| | | | Alkyl Ether Sulfate | | | | |
|---|---|---|---|---|---|---|---|
| | Alkyl Sulfate Alkyl Chain Length, Wt. % | Alkyl Chain Length, Wt. % | Average mol. EO (Alternatives for each numbered species) | | | | |
| Species | 8 | 8 to 10 | 6 | Range A | Range B | Species C | Species D | Species E |
| 116 | 52% | 46.5% | 1.5% | 0.8 to 3 | 1.8 to 2.8 | 2.0 | 2.2 | 2.4 |
| 117 | 53% | 45.5% | 1.5% | 0.8 to 3 | 1.8 to 2.8 | 2.0 | 2.2 | 2.4 |
| 118 | 54% | 44.5% | 1.5% | 0.8 to 3 | 1.8 to 2.8 | 2.0 | 2.2 | 2.4 |
| 119 | 55% | 43.5% | 1.5% | 0.8 to 3 | 1.8 to 2.8 | 2.0 | 2.2 | 2.4 |
| 120 | 56% | 42.5% | 1.5% | 0.8 to 3 | 1.8 to 2.8 | 2.0 | 2.2 | 2.4 |
| 121 | 57% | 41.5% | 1.5% | 0.8 to 3 | 1.8 to 2.8 | 2.0 | 2.2 | 2.4 |
| 122 | 58% | 40.5% | 1.5% | 0.8 to 3 | 1.8 to 2.8 | 2.0 | 2.2 | 2.4 |
| 123 | 59% | 39.5% | 1.5% | 0.8 to 3 | 1.8 to 2.8 | 2.0 | 2.2 | 2.4 |
| 124 | 60% | 38.5% | 1.5% | 0.8 to 3 | 1.8 to 2.8 | 2.0 | 2.2 | 2.4 |
| 125 | 30% | 68% | 2% | 0.8 to 3 | 1.8 to 2.8 | 2.0 | 2.2 | 2.4 |
| 126 | 31% | 67% | 2% | 0.8 to 3 | 1.8 to 2.8 | 2.0 | 2.2 | 2.4 |
| 127 | 32% | 66% | 2% | 0.8 to 3 | 1.8 to 2.8 | 2.0 | 2.2 | 2.4 |
| 128 | 33% | 65% | 2% | 0.8 to 3 | 1.8 to 2.8 | 2.0 | 2.2 | 2.4 |
| 129 | 34% | 64% | 2% | 0.8 to 3 | 1.8 to 2.8 | 2.0 | 2.2 | 2.4 |
| 130 | 35% | 63% | 2% | 0.8 to 3 | 1.8 to 2.8 | 2.0 | 2.2 | 2.4 |
| 131 | 36% | 62% | 2% | 0.8 to 3 | 1.8 to 2.8 | 2.0 | 2.2 | 2.4 |
| 132 | 37% | 61% | 2% | 0.8 to 3 | 1.8 to 2.8 | 2.0 | 2.2 | 2.4 |
| 133 | 38% | 60% | 2% | 0.8 to 3 | 1.8 to 2.8 | 2.0 | 2.2 | 2.4 |
| 134 | 39% | 59% | 2% | 0.8 to 3 | 1.8 to 2.8 | 2.0 | 2.2 | 2.4 |
| 135 | 40% | 58% | 2% | 0.8 to 3 | 1.8 to 2.8 | 2.0 | 2.2 | 2.4 |
| 136 | 41% | 57% | 2% | 0.8 to 3 | 1.8 to 2.8 | 2.0 | 2.2 | 2.4 |
| 137 | 42% | 56% | 2% | 0.8 to 3 | 1.8 to 2.8 | 2.0 | 2.2 | 2.4 |
| 138 | 43% | 55% | 2% | 0.8 to 3 | 1.8 to 2.8 | 2.0 | 2.2 | 2.4 |
| 139 | 44% | 54% | 2% | 0.8 to 3 | 1.8 to 2.8 | 2.0 | 2.2 | 2.4 |
| 140 | 45% | 53% | 2% | 0.8 to 3 | 1.8 to 2.8 | 2.0 | 2.2 | 2.4 |
| 141 | 46% | 52% | 2% | 0.8 to 3 | 1.8 to 2.8 | 2.0 | 2.2 | 2.4 |
| 142 | 47% | 51% | 2% | 0.8 to 3 | 1.8 to 2.8 | 2.0 | 2.2 | 2.4 |
| 143 | 48% | 50% | 2% | 0.8 to 3 | 1.8 to 2.8 | 2.0 | 2.2 | 2.4 |
| 144 | 49% | 49% | 2% | 0.8 to 3 | 1.8 to 2.8 | 2.0 | 2.2 | 2.4 |
| 145 | 50% | 48% | 2% | 0.8 to 3 | 1.8 to 2.8 | 2.0 | 2.2 | 2.4 |
| 146 | 51% | 47% | 2% | 0.8 to 3 | 1.8 to 2.8 | 2.0 | 2.2 | 2.4 |
| 147 | 52% | 46% | 2% | 0.8 to 3 | 1.8 to 2.8 | 2.0 | 2.2 | 2.4 |
| 148 | 53% | 45% | 2% | 0.8 to 3 | 1.8 to 2.8 | 2.0 | 2.2 | 2.4 |
| 149 | 54% | 44% | 2% | 0.8 to 3 | 1.8 to 2.8 | 2.0 | 2.2 | 2.4 |
| 150 | 55% | 43% | 2% | 0.8 to 3 | 1.8 to 2.8 | 2.0 | 2.2 | 2.4 |
| 151 | 56% | 42% | 2% | 0.8 to 3 | 1.8 to 2.8 | 2.0 | 2.2 | 2.4 |
| 152 | 57% | 41% | 2% | 0.8 to 3 | 1.8 to 2.8 | 2.0 | 2.2 | 2.4 |
| 153 | 58% | 40% | 2% | 0.8 to 3 | 1.8 to 2.8 | 2.0 | 2.2 | 2.4 |
| 154 | 59% | 39% | 2% | 0.8 to 3 | 1.8 to 2.8 | 2.0 | 2.2 | 2.4 |
| 155 | 60% | 38% | 2% | 0.8 to 3 | 1.8 to 2.8 | 2.0 | 2.2 | 2.4 |
| 156 | 30% | 67.5% | 2.5% | 0.8 to 3 | 1.8 to 2.8 | 2.0 | 2.2 | 2.4 |
| 157 | 31% | 66.5% | 2.5% | 0.8 to 3 | 1.8 to 2.8 | 2.0 | 2.2 | 2.4 |
| 158 | 32% | 65.5% | 2.5% | 0.8 to 3 | 1.8 to 2.8 | 2.0 | 2.2 | 2.4 |
| 159 | 33% | 64.5% | 2.5% | 0.8 to 3 | 1.8 to 2.8 | 2.0 | 2.2 | 2.4 |
| 160 | 34% | 63.5% | 2.5% | 0.8 to 3 | 1.8 to 2.8 | 2.0 | 2.2 | 2.4 |
| 161 | 35% | 62.5% | 2.5% | 0.8 to 3 | 1.8 to 2.8 | 2.0 | 2.2 | 2.4 |
| 162 | 36% | 61.5% | 2.5% | 0.8 to 3 | 1.8 to 2.8 | 2.0 | 2.2 | 2.4 |
| 163 | 37% | 60.5% | 2.5% | 0.8 to 3 | 1.8 to 2.8 | 2.0 | 2.2 | 2.4 |
| 164 | 38% | 59.5% | 2.5% | 0.8 to 3 | 1.8 to 2.8 | 2.0 | 2.2 | 2.4 |
| 165 | 39% | 58.5% | 2.5% | 0.8 to 3 | 1.8 to 2.8 | 2.0 | 2.2 | 2.4 |
| 166 | 40% | 57.5% | 2.5% | 0.8 to 3 | 1.8 to 2.8 | 2.0 | 2.2 | 2.4 |
| 167 | 41% | 56.5% | 2.5% | 0.8 to 3 | 1.8 to 2.8 | 2.0 | 2.2 | 2.4 |
| 168 | 42% | 55.5% | 2.5% | 0.8 to 3 | 1.8 to 2.8 | 2.0 | 2.2 | 2.4 |
| 169 | 43% | 54.5% | 2.5% | 0.8 to 3 | 1.8 to 2.8 | 2.0 | 2.2 | 2.4 |
| 170 | 44% | 53.5% | 2.5% | 0.8 to 3 | 1.8 to 2.8 | 2.0 | 2.2 | 2.4 |
| 171 | 45% | 52.5% | 2.5% | 0.8 to 3 | 1.8 to 2.8 | 2.0 | 2.2 | 2.4 |
| 172 | 46% | 51.5% | 2.5% | 0.8 to 3 | 1.8 to 2.8 | 2.0 | 2.2 | 2.4 |
| 173 | 47% | 50.5% | 2.5% | 0.8 to 3 | 1.8 to 2.8 | 2.0 | 2.2 | 2.4 |
| 174 | 48% | 49.5% | 2.5% | 0.8 to 3 | 1.8 to 2.8 | 2.0 | 2.2 | 2.4 |
| 175 | 49% | 48.5% | 2.5% | 0.8 to 3 | 1.8 to 2.8 | 2.0 | 2.2 | 2.4 |
| 176 | 50% | 47.5% | 2.5% | 0.8 to 3 | 1.8 to 2.8 | 2.0 | 2.2 | 2.4 |
| 177 | 51% | 46.5% | 2.5% | 0.8 to 3 | 1.8 to 2.8 | 2.0 | 2.2 | 2.4 |
| 178 | 52% | 45.5% | 2.5% | 0.8 to 3 | 1.8 to 2.8 | 2.0 | 2.2 | 2.4 |
| 179 | 53% | 44.5% | 2.5% | 0.8 to 3 | 1.8 to 2.8 | 2.0 | 2.2 | 2.4 |
| 180 | 54% | 43.5% | 2.5% | 0.8 to 3 | 1.8 to 2.8 | 2.0 | 2.2 | 2.4 |
| 181 | 55% | 42.5% | 2.5% | 0.8 to 3 | 1.8 to 2.8 | 2.0 | 2.2 | 2.4 |
| 182 | 56% | 41.5% | 2.5% | 0.8 to 3 | 1.8 to 2.8 | 2.0 | 2.2 | 2.4 |
| 183 | 57% | 40.5% | 2.5% | 0.8 to 3 | 1.8 to 2.8 | 2.0 | 2.2 | 2.4 |
| 184 | 58% | 39.5% | 2.5% | 0.8 to 3 | 1.8 to 2.8 | 2.0 | 2.2 | 2.4 |
| 185 | 59% | 38.5% | 2.5% | 0.8 to 3 | 1.8 to 2.8 | 2.0 | 2.2 | 2.4 |
| 186 | 60% | 37.5% | 2.5% | 0.8 to 3 | 1.8 to 2.8 | 2.0 | 2.2 | 2.4 |

TABLE 1-continued

| | Alkyl Sulfate Alkyl Chain Length, Wt. % | Alkyl Chain Length, Wt. % | Alkyl Ether Sulfate | | | | |
|---|---|---|---|---|---|---|---|
| | | | Average mol. EO (Alternatives for each numbered species) | | | | |
| Species | 8 | 8 to 10 | 6 | Range A | Range B | Species C | Species D | Species E |
| 187 | 30% | 67% | 3% | 0.8 to 3 | 1.8 to 2.8 | 2.0 | 2.2 | 2.4 |
| 188 | 31% | 66% | 3% | 0.8 to 3 | 1.8 to 2.8 | 2.0 | 2.2 | 2.4 |
| 189 | 32% | 65% | 3% | 0.8 to 3 | 1.8 to 2.8 | 2.0 | 2.2 | 2.4 |
| 190 | 33% | 64% | 3% | 0.8 to 3 | 1.8 to 2.8 | 2.0 | 2.2 | 2.4 |
| 191 | 34% | 63% | 3% | 0.8 to 3 | 1.8 to 2.8 | 2.0 | 2.2 | 2.4 |
| 192 | 35% | 62% | 3% | 0.8 to 3 | 1.8 to 2.8 | 2.0 | 2.2 | 2.4 |
| 193 | 36% | 61% | 3% | 0.8 to 3 | 1.8 to 2.8 | 2.0 | 2.2 | 2.4 |
| 194 | 37% | 60% | 3% | 0.8 to 3 | 1.8 to 2.8 | 2.0 | 2.2 | 2.4 |
| 195 | 38% | 59% | 3% | 0.8 to 3 | 1.8 to 2.8 | 2.0 | 2.2 | 2.4 |
| 196 | 39% | 58% | 3% | 0.8 to 3 | 1.8 to 2.8 | 2.0 | 2.2 | 2.4 |
| 197 | 40% | 57% | 3% | 0.8 to 3 | 1.8 to 2.8 | 2.0 | 2.2 | 2.4 |
| 198 | 41% | 56% | 3% | 0.8 to 3 | 1.8 to 2.8 | 2.0 | 2.2 | 2.4 |
| 199 | 42% | 55% | 3% | 0.8 to 3 | 1.8 to 2.8 | 2.0 | 2.2 | 2.4 |
| 200 | 43% | 54% | 3% | 0.8 to 3 | 1.8 to 2.8 | 2.0 | 2.2 | 2.4 |
| 201 | 44% | 53% | 3% | 0.8 to 3 | 1.8 to 2.8 | 2.0 | 2.2 | 2.4 |
| 202 | 45% | 52% | 3% | 0.8 to 3 | 1.8 to 2.8 | 2.0 | 2.2 | 2.4 |
| 203 | 46% | 51% | 3% | 0.8 to 3 | 1.8 to 2.8 | 2.0 | 2.2 | 2.4 |
| 204 | 47% | 50% | 3% | 0.8 to 3 | 1.8 to 2.8 | 2.0 | 2.2 | 2.4 |
| 205 | 48% | 49% | 3% | 0.8 to 3 | 1.8 to 2.8 | 2.0 | 2.2 | 2.4 |
| 206 | 49% | 48% | 3% | 0.8 to 3 | 1.8 to 2.8 | 2.0 | 2.2 | 2.4 |
| 207 | 50% | 47% | 3% | 0.8 to 3 | 1.8 to 2.8 | 2.0 | 2.2 | 2.4 |
| 208 | 51% | 46% | 3% | 0.8 to 3 | 1.8 to 2.8 | 2.0 | 2.2 | 2.4 |
| 209 | 52% | 45% | 3% | 0.8 to 3 | 1.8 to 2.8 | 2.0 | 2.2 | 2.4 |
| 210 | 53% | 44% | 3% | 0.8 to 3 | 1.8 to 2.8 | 2.0 | 2.2 | 2.4 |
| 211 | 54% | 43% | 3% | 0.8 to 3 | 1.8 to 2.8 | 2.0 | 2.2 | 2.4 |
| 212 | 55% | 42% | 3% | 0.8 to 3 | 1.8 to 2.8 | 2.0 | 2.2 | 2.4 |
| 213 | 56% | 41% | 3% | 0.8 to 3 | 1.8 to 2.8 | 2.0 | 2.2 | 2.4 |
| 214 | 57% | 40% | 3% | 0.8 to 3 | 1.8 to 2.8 | 2.0 | 2.2 | 2.4 |
| 215 | 58% | 39% | 3% | 0.8 to 3 | 1.8 to 2.8 | 2.0 | 2.2 | 2.4 |
| 216 | 59% | 38% | 3% | 0.8 to 3 | 1.8 to 2.8 | 2.0 | 2.2 | 2.4 |
| 217 | 60% | 37% | 3% | 0.8 to 3 | 1.8 to 2.8 | 2.0 | 2.2 | 2.4 |
| 218 | 30% | 66.5% | 3.5% | 0.8 to 3 | 1.8 to 2.8 | 2.0 | 2.2 | 2.4 |
| 219 | 31% | 65.5% | 3.5% | 0.8 to 3 | 1.8 to 2.8 | 2.0 | 2.2 | 2.4 |
| 220 | 32% | 64.5% | 3.5% | 0.8 to 3 | 1.8 to 2.8 | 2.0 | 2.2 | 2.4 |
| 221 | 33% | 63.5% | 3.5% | 0.8 to 3 | 1.8 to 2.8 | 2.0 | 2.2 | 2.4 |
| 222 | 34% | 62.5% | 3.5% | 0.8 to 3 | 1.8 to 2.8 | 2.0 | 2.2 | 2.4 |
| 223 | 35% | 61.5% | 3.5% | 0.8 to 3 | 1.8 to 2.8 | 2.0 | 2.2 | 2.4 |
| 224 | 36% | 60.5% | 3.5% | 0.8 to 3 | 1.8 to 2.8 | 2.0 | 2.2 | 2.4 |
| 225 | 37% | 59.5% | 3.5% | 0.8 to 3 | 1.8 to 2.8 | 2.0 | 2.2 | 2.4 |
| 226 | 38% | 58.5% | 3.5% | 0.8 to 3 | 1.8 to 2.8 | 2.0 | 2.2 | 2.4 |
| 227 | 39% | 57.5% | 3.5% | 0.8 to 3 | 1.8 to 2.8 | 2.0 | 2.2 | 2.4 |
| 228 | 40% | 56.5% | 3.5% | 0.8 to 3 | 1.8 to 2.8 | 2.0 | 2.2 | 2.4 |
| 229 | 41% | 55.5% | 3.5% | 0.8 to 3 | 1.8 to 2.8 | 2.0 | 2.2 | 2.4 |
| 230 | 42% | 54.5% | 3.5% | 0.8 to 3 | 1.8 to 2.8 | 2.0 | 2.2 | 2.4 |
| 231 | 43% | 53.5% | 3.5% | 0.8 to 3 | 1.8 to 2.8 | 2.0 | 2.2 | 2.4 |
| 232 | 44% | 52.5% | 3.5% | 0.8 to 3 | 1.8 to 2.8 | 2.0 | 2.2 | 2.4 |
| 233 | 45% | 51.5% | 3.5% | 0.8 to 3 | 1.8 to 2.8 | 2.0 | 2.2 | 2.4 |
| 234 | 46% | 50.5% | 3.5% | 0.8 to 3 | 1.8 to 2.8 | 2.0 | 2.2 | 2.4 |
| 235 | 47% | 49.5% | 3.5% | 0.8 to 3 | 1.8 to 2.8 | 2.0 | 2.2 | 2.4 |
| 236 | 48% | 48.5% | 3.5% | 0.8 to 3 | 1.8 to 2.8 | 2.0 | 2.2 | 2.4 |
| 237 | 49% | 47.5% | 3.5% | 0.8 to 3 | 1.8 to 2.8 | 2.0 | 2.2 | 2.4 |
| 238 | 50% | 46.5% | 3.5% | 0.8 to 3 | 1.8 to 2.8 | 2.0 | 2.2 | 2.4 |
| 239 | 51% | 45.5% | 3.5% | 0.8 to 3 | 1.8 to 2.8 | 2.0 | 2.2 | 2.4 |
| 240 | 52% | 44.5% | 3.5% | 0.8 to 3 | 1.8 to 2.8 | 2.0 | 2.2 | 2.4 |
| 241 | 53% | 43.5% | 3.5% | 0.8 to 3 | 1.8 to 2.8 | 2.0 | 2.2 | 2.4 |
| 242 | 54% | 42.5% | 3.5% | 0.8 to 3 | 1.8 to 2.8 | 2.0 | 2.2 | 2.4 |
| 243 | 55% | 41.5% | 3.5% | 0.8 to 3 | 1.8 to 2.8 | 2.0 | 2.2 | 2.4 |
| 244 | 56% | 40.5% | 3.5% | 0.8 to 3 | 1.8 to 2.8 | 2.0 | 2.2 | 2.4 |
| 245 | 57% | 39.5% | 3.5% | 0.8 to 3 | 1.8 to 2.8 | 2.0 | 2.2 | 2.4 |
| 246 | 58% | 38.5% | 3.5% | 0.8 to 3 | 1.8 to 2.8 | 2.0 | 2.2 | 2.4 |
| 247 | 59% | 37.5% | 3.5% | 0.8 to 3 | 1.8 to 2.8 | 2.0 | 2.2 | 2.4 |
| 248 | 60% | 36.5% | 3.5% | 0.8 to 3 | 1.8 to 2.8 | 2.0 | 2.2 | 2.4 |
| 249 | 30% | 66% | 4% | 0.8 to 3 | 1.8 to 2.8 | 2.0 | 2.2 | 2.4 |
| 250 | 31% | 65% | 4% | 0.8 to 3 | 1.8 to 2.8 | 2.0 | 2.2 | 2.4 |
| 251 | 32% | 64% | 4% | 0.8 to 3 | 1.8 to 2.8 | 2.0 | 2.2 | 2.4 |
| 252 | 33% | 63% | 4% | 0.8 to 3 | 1.8 to 2.8 | 2.0 | 2.2 | 2.4 |
| 253 | 34% | 62% | 4% | 0.8 to 3 | 1.8 to 2.8 | 2.0 | 2.2 | 2.4 |
| 254 | 35% | 61% | 4% | 0.8 to 3 | 1.8 to 2.8 | 2.0 | 2.2 | 2.4 |
| 255 | 36% | 60% | 4% | 0.8 to 3 | 1.8 to 2.8 | 2.0 | 2.2 | 2.4 |
| 256 | 37% | 59% | 4% | 0.8 to 3 | 1.8 to 2.8 | 2.0 | 2.2 | 2.4 |
| 257 | 38% | 58% | 4% | 0.8 to 3 | 1.8 to 2.8 | 2.0 | 2.2 | 2.4 |

TABLE 1-continued

| | Alkyl Sulfate Alkyl Chain Length, Wt. % | Alkyl Ether Sulfate | | | | | | |
|---|---|---|---|---|---|---|---|---|
| | | Alkyl Chain Length, Wt. % | Average mol. EO (Alternatives for each numbered species) | | | | | |
| Species | 8 | 8 to 10 | 6 | Range A | Range B | Species C | Species D | Species E |
| 258 | 39% | 57% | 4% | 0.8 to 3 | 1.8 to 2.8 | 2.0 | 2.2 | 2.4 |
| 259 | 40% | 56% | 4% | 0.8 to 3 | 1.8 to 2.8 | 2.0 | 2.2 | 2.4 |
| 260 | 41% | 55% | 4% | 0.8 to 3 | 1.8 to 2.8 | 2.0 | 2.2 | 2.4 |
| 261 | 42% | 54% | 4% | 0.8 to 3 | 1.8 to 2.8 | 2.0 | 2.2 | 2.4 |
| 262 | 43% | 53% | 4% | 0.8 to 3 | 1.8 to 2.8 | 2.0 | 2.2 | 2.4 |
| 263 | 44% | 52% | 4% | 0.8 to 3 | 1.8 to 2.8 | 2.0 | 2.2 | 2.4 |
| 264 | 45% | 51% | 4% | 0.8 to 3 | 1.8 to 2.8 | 2.0 | 2.2 | 2.4 |
| 265 | 46% | 50% | 4% | 0.8 to 3 | 1.8 to 2.8 | 2.0 | 2.2 | 2.4 |
| 266 | 47% | 49% | 4% | 0.8 to 3 | 1.8 to 2.8 | 2.0 | 2.2 | 2.4 |
| 267 | 48% | 48% | 4% | 0.8 to 3 | 1.8 to 2.8 | 2.0 | 2.2 | 2.4 |
| 268 | 49% | 47% | 4% | 0.8 to 3 | 1.8 to 2.8 | 2.0 | 2.2 | 2.4 |
| 269 | 50% | 46% | 4% | 0.8 to 3 | 1.8 to 2.8 | 2.0 | 2.2 | 2.4 |
| 270 | 51% | 45% | 4% | 0.8 to 3 | 1.8 to 2.8 | 2.0 | 2.2 | 2.4 |
| 271 | 52% | 44% | 4% | 0.8 to 3 | 1.8 to 2.8 | 2.0 | 2.2 | 2.4 |
| 272 | 53% | 43% | 4% | 0.8 to 3 | 1.8 to 2.8 | 2.0 | 2.2 | 2.4 |
| 273 | 54% | 42% | 4% | 0.8 to 3 | 1.8 to 2.8 | 2.0 | 2.2 | 2.4 |
| 274 | 55% | 41% | 4% | 0.8 to 3 | 1.8 to 2.8 | 2.0 | 2.2 | 2.4 |
| 275 | 56% | 40% | 4% | 0.8 to 3 | 1.8 to 2.8 | 2.0 | 2.2 | 2.4 |
| 276 | 57% | 39% | 4% | 0.8 to 3 | 1.8 to 2.8 | 2.0 | 2.2 | 2.4 |
| 277 | 58% | 38% | 4% | 0.8 to 3 | 1.8 to 2.8 | 2.0 | 2.2 | 2.4 |
| 278 | 59% | 37% | 4% | 0.8 to 3 | 1.8 to 2.8 | 2.0 | 2.2 | 2.4 |
| 279 | 60% | 36% | 4% | 0.8 to 3 | 1.8 to 2.8 | 2.0 | 2.2 | 2.4 |
| 280 | 30% | 65.5% | 4.5% | 0.8 to 3 | 1.8 to 2.8 | 2.0 | 2.2 | 2.4 |
| 281 | 31% | 64.5% | 4.5% | 0.8 to 3 | 1.8 to 2.8 | 2.0 | 2.2 | 2.4 |
| 282 | 32% | 63.5% | 4.5% | 0.8 to 3 | 1.8 to 2.8 | 2.0 | 2.2 | 2.4 |
| 283 | 33% | 62.5% | 4.5% | 0.8 to 3 | 1.8 to 2.8 | 2.0 | 2.2 | 2.4 |
| 284 | 34% | 61.5% | 4.5% | 0.8 to 3 | 1.8 to 2.8 | 2.0 | 2.2 | 2.4 |
| 285 | 35% | 60.5% | 4.5% | 0.8 to 3 | 1.8 to 2.8 | 2.0 | 2.2 | 2.4 |
| 286 | 36% | 59.5% | 4.5% | 0.8 to 3 | 1.8 to 2.8 | 2.0 | 2.2 | 2.4 |
| 287 | 37% | 58.5% | 4.5% | 0.8 to 3 | 1.8 to 2.8 | 2.0 | 2.2 | 2.4 |
| 288 | 38% | 57.5% | 4.5% | 0.8 to 3 | 1.8 to 2.8 | 2.0 | 2.2 | 2.4 |
| 289 | 39% | 56.5% | 4.5% | 0.8 to 3 | 1.8 to 2.8 | 2.0 | 2.2 | 2.4 |
| 290 | 40% | 55.5% | 4.5% | 0.8 to 3 | 1.8 to 2.8 | 2.0 | 2.2 | 2.4 |
| 291 | 41% | 54.5% | 4.5% | 0.8 to 3 | 1.8 to 2.8 | 2.0 | 2.2 | 2.4 |
| 292 | 42% | 53.5% | 4.5% | 0.8 to 3 | 1.8 to 2.8 | 2.0 | 2.2 | 2.4 |
| 293 | 43% | 52.5% | 4.5% | 0.8 to 3 | 1.8 to 2.8 | 2.0 | 2.2 | 2.4 |
| 294 | 44% | 51.5% | 4.5% | 0.8 to 3 | 1.8 to 2.8 | 2.0 | 2.2 | 2.4 |
| 295 | 45% | 50.5% | 4.5% | 0.8 to 3 | 1.8 to 2.8 | 2.0 | 2.2 | 2.4 |
| 296 | 46% | 49.5% | 4.5% | 0.8 to 3 | 1.8 to 2.8 | 2.0 | 2.2 | 2.4 |
| 297 | 47% | 48.5% | 4.5% | 0.8 to 3 | 1.8 to 2.8 | 2.0 | 2.2 | 2.4 |
| 298 | 48% | 47.5% | 4.5% | 0.8 to 3 | 1.8 to 2.8 | 2.0 | 2.2 | 2.4 |
| 299 | 49% | 46.5% | 4.5% | 0.8 to 3 | 1.8 to 2.8 | 2.0 | 2.2 | 2.4 |
| 300 | 50% | 45.5% | 4.5% | 0.8 to 3 | 1.8 to 2.8 | 2.0 | 2.2 | 2.4 |
| 301 | 51% | 44.5% | 4.5% | 0.8 to 3 | 1.8 to 2.8 | 2.0 | 2.2 | 2.4 |
| 302 | 52% | 43.5% | 4.5% | 0.8 to 3 | 1.8 to 2.8 | 2.0 | 2.2 | 2.4 |
| 303 | 53% | 42.5% | 4.5% | 0.8 to 3 | 1.8 to 2.8 | 2.0 | 2.2 | 2.4 |
| 304 | 54% | 41.5% | 4.5% | 0.8 to 3 | 1.8 to 2.8 | 2.0 | 2.2 | 2.4 |
| 305 | 55% | 40.5% | 4.5% | 0.8 to 3 | 1.8 to 2.8 | 2.0 | 2.2 | 2.4 |
| 306 | 56% | 39.5% | 4.5% | 0.8 to 3 | 1.8 to 2.8 | 2.0 | 2.2 | 2.4 |
| 307 | 57% | 38.5% | 4.5% | 0.8 to 3 | 1.8 to 2.8 | 2.0 | 2.2 | 2.4 |
| 308 | 58% | 37.5% | 4.5% | 0.8 to 3 | 1.8 to 2.8 | 2.0 | 2.2 | 2.4 |
| 309 | 59% | 36.5% | 4.5% | 0.8 to 3 | 1.8 to 2.8 | 2.0 | 2.2 | 2.4 |
| 310 | 60% | 35.5% | 4.5% | 0.8 to 3 | 1.8 to 2.8 | 2.0 | 2.2 | 2.4 |
| 311 | 30% | 65% | 5% | 0.8 to 3 | 1.8 to 2.8 | 2.0 | 2.2 | 2.4 |
| 312 | 31% | 64% | 5% | 0.8 to 3 | 1.8 to 2.8 | 2.0 | 2.2 | 2.4 |
| 313 | 32% | 63% | 5% | 0.8 to 3 | 1.8 to 2.8 | 2.0 | 2.2 | 2.4 |
| 314 | 33% | 62% | 5% | 0.8 to 3 | 1.8 to 2.8 | 2.0 | 2.2 | 2.4 |
| 315 | 34% | 61% | 5% | 0.8 to 3 | 1.8 to 2.8 | 2.0 | 2.2 | 2.4 |
| 316 | 35% | 60% | 5% | 0.8 to 3 | 1.8 to 2.8 | 2.0 | 2.2 | 2.4 |
| 317 | 36% | 59% | 5% | 0.8 to 3 | 1.8 to 2.8 | 2.0 | 2.2 | 2.4 |
| 318 | 37% | 58% | 5% | 0.8 to 3 | 1.8 to 2.8 | 2.0 | 2.2 | 2.4 |
| 319 | 38% | 57% | 5% | 0.8 to 3 | 1.8 to 2.8 | 2.0 | 2.2 | 2.4 |
| 320 | 39% | 56% | 5% | 0.8 to 3 | 1.8 to 2.8 | 2.0 | 2.2 | 2.4 |
| 321 | 40% | 55% | 5% | 0.8 to 3 | 1.8 to 2.8 | 2.0 | 2.2 | 2.4 |
| 322 | 41% | 54% | 5% | 0.8 to 3 | 1.8 to 2.8 | 2.0 | 2.2 | 2.4 |
| 323 | 42% | 53% | 5% | 0.8 to 3 | 1.8 to 2.8 | 2.0 | 2.2 | 2.4 |
| 324 | 43% | 52% | 5% | 0.8 to 3 | 1.8 to 2.8 | 2.0 | 2.2 | 2.4 |
| 325 | 44% | 51% | 5% | 0.8 to 3 | 1.8 to 2.8 | 2.0 | 2.2 | 2.4 |
| 326 | 45% | 50% | 5% | 0.8 to 3 | 1.8 to 2.8 | 2.0 | 2.2 | 2.4 |
| 327 | 46% | 49% | 5% | 0.8 to 3 | 1.8 to 2.8 | 2.0 | 2.2 | 2.4 |
| 328 | 47% | 48% | 5% | 0.8 to 3 | 1.8 to 2.8 | 2.0 | 2.2 | 2.4 |

TABLE 1-continued

| | Alkyl Sulfate Alkyl Chain Length, Wt. % | Alkyl Ether Sulfate | | | | | | |
|---|---|---|---|---|---|---|---|---|
| | | Alkyl Chain Length, Wt. % | Average mol. EO (Alternatives for each numbered species) | | | | | |
| Species | 8 | 8 to 10 | 6 | Range A | Range B | Species C | Species D | Species E |
| 329 | 48% | 47% | 5% | 0.8 to 3 | 1.8 to 2.8 | 2.0 | 2.2 | 2.4 |
| 330 | 49% | 46% | 5% | 0.8 to 3 | 1.8 to 2.8 | 2.0 | 2.2 | 2.4 |
| 331 | 50% | 45% | 5% | 0.8 to 3 | 1.8 to 2.8 | 2.0 | 2.2 | 2.4 |
| 332 | 51% | 44% | 5% | 0.8 to 3 | 1.8 to 2.8 | 2.0 | 2.2 | 2.4 |
| 333 | 52% | 43% | 5% | 0.8 to 3 | 1.8 to 2.8 | 2.0 | 2.2 | 2.4 |
| 334 | 53% | 42% | 5% | 0.8 to 3 | 1.8 to 2.8 | 2.0 | 2.2 | 2.4 |
| 335 | 54% | 41% | 5% | 0.8 to 3 | 1.8 to 2.8 | 2.0 | 2.2 | 2.4 |
| 336 | 55% | 40% | 5% | 0.8 to 3 | 1.8 to 2.8 | 2.0 | 2.2 | 2.4 |
| 337 | 56% | 39% | 5% | 0.8 to 3 | 1.8 to 2.8 | 2.0 | 2.2 | 2.4 |
| 338 | 57% | 38% | 5% | 0.8 to 3 | 1.8 to 2.8 | 2.0 | 2.2 | 2.4 |
| 339 | 58% | 37% | 5% | 0.8 to 3 | 1.8 to 2.8 | 2.0 | 2.2 | 2.4 |
| 340 | 59% | 36% | 5% | 0.8 to 3 | 1.8 to 2.8 | 2.0 | 2.2 | 2.4 |
| 341 | 60% | 35% | 5% | 0.8 to 3 | 1.8 to 2.8 | 2.0 | 2.2 | 2.4 |
| 342 | 30% | 64.5% | 5.5% | 0.8 to 3 | 1.8 to 2.8 | 2.0 | 2.2 | 2.4 |
| 343 | 31% | 63.5% | 5.5% | 0.8 to 3 | 1.8 to 2.8 | 2.0 | 2.2 | 2.4 |
| 344 | 32% | 62.5% | 5.5% | 0.8 to 3 | 1.8 to 2.8 | 2.0 | 2.2 | 2.4 |
| 345 | 33% | 61.5% | 5.5% | 0.8 to 3 | 1.8 to 2.8 | 2.0 | 2.2 | 2.4 |
| 346 | 34% | 60.5% | 5.5% | 0.8 to 3 | 1.8 to 2.8 | 2.0 | 2.2 | 2.4 |
| 347 | 35% | 59.5% | 5.5% | 0.8 to 3 | 1.8 to 2.8 | 2.0 | 2.2 | 2.4 |
| 348 | 36% | 58.5% | 5.5% | 0.8 to 3 | 1.8 to 2.8 | 2.0 | 2.2 | 2.4 |
| 349 | 37% | 57.5% | 5.5% | 0.8 to 3 | 1.8 to 2.8 | 2.0 | 2.2 | 2.4 |
| 350 | 38% | 56.5% | 5.5% | 0.8 to 3 | 1.8 to 2.8 | 2.0 | 2.2 | 2.4 |
| 351 | 39% | 55.5% | 5.5% | 0.8 to 3 | 1.8 to 2.8 | 2.0 | 2.2 | 2.4 |
| 352 | 40% | 54.5% | 5.5% | 0.8 to 3 | 1.8 to 2.8 | 2.0 | 2.2 | 2.4 |
| 353 | 41% | 53.5% | 5.5% | 0.8 to 3 | 1.8 to 2.8 | 2.0 | 2.2 | 2.4 |
| 354 | 42% | 52.5% | 5.5% | 0.8 to 3 | 1.8 to 2.8 | 2.0 | 2.2 | 2.4 |
| 355 | 43% | 51.5% | 5.5% | 0.8 to 3 | 1.8 to 2.8 | 2.0 | 2.2 | 2.4 |
| 356 | 44% | 50.5% | 5.5% | 0.8 to 3 | 1.8 to 2.8 | 2.0 | 2.2 | 2.4 |
| 357 | 45% | 49.5% | 5.5% | 0.8 to 3 | 1.8 to 2.8 | 2.0 | 2.2 | 2.4 |
| 358 | 46% | 48.5% | 5.5% | 0.8 to 3 | 1.8 to 2.8 | 2.0 | 2.2 | 2.4 |
| 359 | 47% | 47.5% | 5.5% | 0.8 to 3 | 1.8 to 2.8 | 2.0 | 2.2 | 2.4 |
| 360 | 48% | 46.5% | 5.5% | 0.8 to 3 | 1.8 to 2.8 | 2.0 | 2.2 | 2.4 |
| 361 | 49% | 45.5% | 5.5% | 0.8 to 3 | 1.8 to 2.8 | 2.0 | 2.2 | 2.4 |
| 362 | 50% | 44.5% | 5.5% | 0.8 to 3 | 1.8 to 2.8 | 2.0 | 2.2 | 2.4 |
| 363 | 51% | 43.5% | 5.5% | 0.8 to 3 | 1.8 to 2.8 | 2.0 | 2.2 | 2.4 |
| 364 | 52% | 42.5% | 5.5% | 0.8 to 3 | 1.8 to 2.8 | 2.0 | 2.2 | 2.4 |
| 365 | 53% | 41.5% | 5.5% | 0.8 to 3 | 1.8 to 2.8 | 2.0 | 2.2 | 2.4 |
| 366 | 54% | 40.5% | 5.5% | 0.8 to 3 | 1.8 to 2.8 | 2.0 | 2.2 | 2.4 |
| 367 | 55% | 39.5% | 5.5% | 0.8 to 3 | 1.8 to 2.8 | 2.0 | 2.2 | 2.4 |
| 368 | 56% | 38.5% | 5.5% | 0.8 to 3 | 1.8 to 2.8 | 2.0 | 2.2 | 2.4 |
| 369 | 57% | 37.5% | 5.5% | 0.8 to 3 | 1.8 to 2.8 | 2.0 | 2.2 | 2.4 |
| 370 | 58% | 36.5% | 5.5% | 0.8 to 3 | 1.8 to 2.8 | 2.0 | 2.2 | 2.4 |
| 371 | 59% | 35.5% | 5.5% | 0.8 to 3 | 1.8 to 2.8 | 2.0 | 2.2 | 2.4 |
| 372 | 60% | 34.5% | 5.5% | 0.8 to 3 | 1.8 to 2.8 | 2.0 | 2.2 | 2.4 |
| 373 | 30% | 64% | 6% | 0.8 to 3 | 1.8 to 2.8 | 2.0 | 2.2 | 2.4 |
| 374 | 31% | 63% | 6% | 0.8 to 3 | 1.8 to 2.8 | 2.0 | 2.2 | 2.4 |
| 375 | 32% | 62% | 6% | 0.8 to 3 | 1.8 to 2.8 | 2.0 | 2.2 | 2.4 |
| 376 | 33% | 61% | 6% | 0.8 to 3 | 1.8 to 2.8 | 2.0 | 2.2 | 2.4 |
| 377 | 34% | 60% | 6% | 0.8 to 3 | 1.8 to 2.8 | 2.0 | 2.2 | 2.4 |
| 378 | 35% | 59% | 6% | 0.8 to 3 | 1.8 to 2.8 | 2.0 | 2.2 | 2.4 |
| 379 | 36% | 58% | 6% | 0.8 to 3 | 1.8 to 2.8 | 2.0 | 2.2 | 2.4 |
| 380 | 37% | 57% | 6% | 0.8 to 3 | 1.8 to 2.8 | 2.0 | 2.2 | 2.4 |
| 381 | 38% | 56% | 6% | 0.8 to 3 | 1.8 to 2.8 | 2.0 | 2.2 | 2.4 |
| 382 | 39% | 55% | 6% | 0.8 to 3 | 1.8 to 2.8 | 2.0 | 2.2 | 2.4 |
| 383 | 40% | 54% | 6% | 0.8 to 3 | 1.8 to 2.8 | 2.0 | 2.2 | 2.4 |
| 384 | 41% | 53% | 6% | 0.8 to 3 | 1.8 to 2.8 | 2.0 | 2.2 | 2.4 |
| 385 | 42% | 52% | 6% | 0.8 to 3 | 1.8 to 2.8 | 2.0 | 2.2 | 2.4 |
| 386 | 43% | 51% | 6% | 0.8 to 3 | 1.8 to 2.8 | 2.0 | 2.2 | 2.4 |
| 387 | 44% | 50% | 6% | 0.8 to 3 | 1.8 to 2.8 | 2.0 | 2.2 | 2.4 |
| 388 | 45% | 49% | 6% | 0.8 to 3 | 1.8 to 2.8 | 2.0 | 2.2 | 2.4 |
| 389 | 46% | 48% | 6% | 0.8 to 3 | 1.8 to 2.8 | 2.0 | 2.2 | 2.4 |
| 390 | 47% | 47% | 6% | 0.8 to 3 | 1.8 to 2.8 | 2.0 | 2.2 | 2.4 |
| 391 | 48% | 46% | 6% | 0.8 to 3 | 1.8 to 2.8 | 2.0 | 2.2 | 2.4 |
| 392 | 49% | 45% | 6% | 0.8 to 3 | 1.8 to 2.8 | 2.0 | 2.2 | 2.4 |
| 393 | 50% | 44% | 6% | 0.8 to 3 | 1.8 to 2.8 | 2.0 | 2.2 | 2.4 |
| 394 | 51% | 43% | 6% | 0.8 to 3 | 1.8 to 2.8 | 2.0 | 2.2 | 2.4 |
| 395 | 52% | 42% | 6% | 0.8 to 3 | 1.8 to 2.8 | 2.0 | 2.2 | 2.4 |
| 396 | 53% | 41% | 6% | 0.8 to 3 | 1.8 to 2.8 | 2.0 | 2.2 | 2.4 |
| 397 | 54% | 40% | 6% | 0.8 to 3 | 1.8 to 2.8 | 2.0 | 2.2 | 2.4 |
| 398 | 55% | 39% | 6% | 0.8 to 3 | 1.8 to 2.8 | 2.0 | 2.2 | 2.4 |
| 399 | 56% | 38% | 6% | 0.8 to 3 | 1.8 to 2.8 | 2.0 | 2.2 | 2.4 |

TABLE 1-continued

|  | Alkyl Sulfate Alkyl Chain Length, Wt. % | Alkyl Chain Length, Wt. % | Alkyl Ether Sulfate ||||| 
|  |  |  | Average mol. EO (Alternatives for each numbered species) |||||
| Species | 8 | 8 to 10 | 6 | Range A | Range B | Species C | Species D | Species E |
| --- | --- | --- | --- | --- | --- | --- | --- | --- |
| 400 | 57% | 37% | 6% | 0.8 to 3 | 1.8 to 2.8 | 2.0 | 2.2 | 2.4 |
| 401 | 58% | 36% | 6% | 0.8 to 3 | 1.8 to 2.8 | 2.0 | 2.2 | 2.4 |
| 402 | 59% | 35% | 6% | 0.8 to 3 | 1.8 to 2.8 | 2.0 | 2.2 | 2.4 |
| 403 | 60% | 34% | 6% | 0.8 to 3 | 1.8 to 2.8 | 2.0 | 2.2 | 2.4 |
| 404 | 30% | 63.5% | 6.5% | 0.8 to 3 | 1.8 to 2.8 | 2.0 | 2.2 | 2.4 |
| 405 | 31% | 62.5% | 6.5% | 0.8 to 3 | 1.8 to 2.8 | 2.0 | 2.2 | 2.4 |
| 406 | 32% | 61.5% | 6.5% | 0.8 to 3 | 1.8 to 2.8 | 2.0 | 2.2 | 2.4 |
| 407 | 33% | 60.5% | 6.5% | 0.8 to 3 | 1.8 to 2.8 | 2.0 | 2.2 | 2.4 |
| 408 | 34% | 59.5% | 6.5% | 0.8 to 3 | 1.8 to 2.8 | 2.0 | 2.2 | 2.4 |
| 409 | 35% | 58.5% | 6.5% | 0.8 to 3 | 1.8 to 2.8 | 2.0 | 2.2 | 2.4 |
| 410 | 36% | 57.5% | 6.5% | 0.8 to 3 | 1.8 to 2.8 | 2.0 | 2.2 | 2.4 |
| 411 | 37% | 56.5% | 6.5% | 0.8 to 3 | 1.8 to 2.8 | 2.0 | 2.2 | 2.4 |
| 412 | 38% | 55.5% | 6.5% | 0.8 to 3 | 1.8 to 2.8 | 2.0 | 2.2 | 2.4 |
| 413 | 39% | 54.5% | 6.5% | 0.8 to 3 | 1.8 to 2.8 | 2.0 | 2.2 | 2.4 |
| 414 | 40% | 53.5% | 6.5% | 0.8 to 3 | 1.8 to 2.8 | 2.0 | 2.2 | 2.4 |
| 415 | 41% | 52.5% | 6.5% | 0.8 to 3 | 1.8 to 2.8 | 2.0 | 2.2 | 2.4 |
| 416 | 42% | 51.5% | 6.5% | 0.8 to 3 | 1.8 to 2.8 | 2.0 | 2.2 | 2.4 |
| 417 | 43% | 50.5% | 6.5% | 0.8 to 3 | 1.8 to 2.8 | 2.0 | 2.2 | 2.4 |
| 418 | 44% | 49.5% | 6.5% | 0.8 to 3 | 1.8 to 2.8 | 2.0 | 2.2 | 2.4 |
| 419 | 45% | 48.5% | 6.5% | 0.8 to 3 | 1.8 to 2.8 | 2.0 | 2.2 | 2.4 |
| 420 | 46% | 47.5% | 6.5% | 0.8 to 3 | 1.8 to 2.8 | 2.0 | 2.2 | 2.4 |
| 421 | 47% | 46.5% | 6.5% | 0.8 to 3 | 1.8 to 2.8 | 2.0 | 2.2 | 2.4 |
| 422 | 48% | 45.5% | 6.5% | 0.8 to 3 | 1.8 to 2.8 | 2.0 | 2.2 | 2.4 |
| 423 | 49% | 44.5% | 6.5% | 0.8 to 3 | 1.8 to 2.8 | 2.0 | 2.2 | 2.4 |
| 424 | 50% | 43.5% | 6.5% | 0.8 to 3 | 1.8 to 2.8 | 2.0 | 2.2 | 2.4 |
| 425 | 51% | 42.5% | 6.5% | 0.8 to 3 | 1.8 to 2.8 | 2.0 | 2.2 | 2.4 |
| 426 | 52% | 41.5% | 6.5% | 0.8 to 3 | 1.8 to 2.8 | 2.0 | 2.2 | 2.4 |
| 427 | 53% | 40.5% | 6.5% | 0.8 to 3 | 1.8 to 2.8 | 2.0 | 2.2 | 2.4 |
| 428 | 54% | 39.5% | 6.5% | 0.8 to 3 | 1.8 to 2.8 | 2.0 | 2.2 | 2.4 |
| 429 | 55% | 38.5% | 6.5% | 0.8 to 3 | 1.8 to 2.8 | 2.0 | 2.2 | 2.4 |
| 430 | 56% | 37.5% | 6.5% | 0.8 to 3 | 1.8 to 2.8 | 2.0 | 2.2 | 2.4 |
| 431 | 57% | 36.5% | 6.5% | 0.8 to 3 | 1.8 to 2.8 | 2.0 | 2.2 | 2.4 |
| 432 | 58% | 35.5% | 6.5% | 0.8 to 3 | 1.8 to 2.8 | 2.0 | 2.2 | 2.4 |
| 433 | 59% | 34.5% | 6.5% | 0.8 to 3 | 1.8 to 2.8 | 2.0 | 2.2 | 2.4 |
| 434 | 60% | 33.5% | 6.5% | 0.8 to 3 | 1.8 to 2.8 | 2.0 | 2.2 | 2.4 |
| 435 | 30% | 63% | 7% | 0.8 to 3 | 1.8 to 2.8 | 2.0 | 2.2 | 2.4 |
| 436 | 31% | 62% | 7% | 0.8 to 3 | 1.8 to 2.8 | 2.0 | 2.2 | 2.4 |
| 437 | 32% | 61% | 7% | 0.8 to 3 | 1.8 to 2.8 | 2.0 | 2.2 | 2.4 |
| 438 | 33% | 60% | 7% | 0.8 to 3 | 1.8 to 2.8 | 2.0 | 2.2 | 2.4 |
| 439 | 34% | 59% | 7% | 0.8 to 3 | 1.8 to 2.8 | 2.0 | 2.2 | 2.4 |
| 440 | 35% | 58% | 7% | 0.8 to 3 | 1.8 to 2.8 | 2.0 | 2.2 | 2.4 |
| 441 | 36% | 57% | 7% | 0.8 to 3 | 1.8 to 2.8 | 2.0 | 2.2 | 2.4 |
| 442 | 37% | 56% | 7% | 0.8 to 3 | 1.8 to 2.8 | 2.0 | 2.2 | 2.4 |
| 443 | 38% | 55% | 7% | 0.8 to 3 | 1.8 to 2.8 | 2.0 | 2.2 | 2.4 |
| 444 | 39% | 54% | 7% | 0.8 to 3 | 1.8 to 2.8 | 2.0 | 2.2 | 2.4 |
| 445 | 40% | 53% | 7% | 0.8 to 3 | 1.8 to 2.8 | 2.0 | 2.2 | 2.4 |
| 446 | 41% | 52% | 7% | 0.8 to 3 | 1.8 to 2.8 | 2.0 | 2.2 | 2.4 |
| 447 | 42% | 51% | 7% | 0.8 to 3 | 1.8 to 2.8 | 2.0 | 2.2 | 2.4 |
| 448 | 43% | 50% | 7% | 0.8 to 3 | 1.8 to 2.8 | 2.0 | 2.2 | 2.4 |
| 449 | 44% | 49% | 7% | 0.8 to 3 | 1.8 to 2.8 | 2.0 | 2.2 | 2.4 |
| 450 | 45% | 48% | 7% | 0.8 to 3 | 1.8 to 2.8 | 2.0 | 2.2 | 2.4 |
| 451 | 46% | 47% | 7% | 0.8 to 3 | 1.8 to 2.8 | 2.0 | 2.2 | 2.4 |
| 452 | 47% | 46% | 7% | 0.8 to 3 | 1.8 to 2.8 | 2.0 | 2.2 | 2.4 |
| 453 | 48% | 45% | 7% | 0.8 to 3 | 1.8 to 2.8 | 2.0 | 2.2 | 2.4 |
| 454 | 49% | 44% | 7% | 0.8 to 3 | 1.8 to 2.8 | 2.0 | 2.2 | 2.4 |
| 455 | 50% | 43% | 7% | 0.8 to 3 | 1.8 to 2.8 | 2.0 | 2.2 | 2.4 |
| 456 | 51% | 42% | 7% | 0.8 to 3 | 1.8 to 2.8 | 2.0 | 2.2 | 2.4 |
| 457 | 52% | 41% | 7% | 0.8 to 3 | 1.8 to 2.8 | 2.0 | 2.2 | 2.4 |
| 458 | 53% | 40% | 7% | 0.8 to 3 | 1.8 to 2.8 | 2.0 | 2.2 | 2.4 |
| 459 | 54% | 39% | 7% | 0.8 to 3 | 1.8 to 2.8 | 2.0 | 2.2 | 2.4 |
| 460 | 55% | 38% | 7% | 0.8 to 3 | 1.8 to 2.8 | 2.0 | 2.2 | 2.4 |
| 461 | 56% | 37% | 7% | 0.8 to 3 | 1.8 to 2.8 | 2.0 | 2.2 | 2.4 |
| 462 | 57% | 36% | 7% | 0.8 to 3 | 1.8 to 2.8 | 2.0 | 2.2 | 2.4 |
| 463 | 58% | 35% | 7% | 0.8 to 3 | 1.8 to 2.8 | 2.0 | 2.2 | 2.4 |
| 464 | 59% | 34% | 7% | 0.8 to 3 | 1.8 to 2.8 | 2.0 | 2.2 | 2.4 |
| 465 | 60% | 33% | 7% | 0.8 to 3 | 1.8 to 2.8 | 2.0 | 2.2 | 2.4 |

TABLE 2

| | Alkyl Sulfate | | Alkyl Ether Sulfate | | | | | |
| | Alkyl Chain Length, Wt. % | | Alkyl Chain Length, Wt. % | Average mol. EO (Alternatives for each numbered species) | | | | |
| Species | 8 | 9 | 6 | Range A | Range B | Species C | Species D | Species E |
|---|---|---|---|---|---|---|---|---|
| 466 | 30% | 70% | 0% | 0.8 to 3 | 1.8 to 2.8 | 2.0 | 2.2 | 2.4 |
| 467 | 31% | 69% | 0% | 0.8 to 3 | 1.8 to 2.8 | 2.0 | 2.2 | 2.4 |
| 468 | 32% | 68% | 0% | 0.8 to 3 | 1.8 to 2.8 | 2.0 | 2.2 | 2.4 |
| 469 | 33% | 67% | 0% | 0.8 to 3 | 1.8 to 2.8 | 2.0 | 2.2 | 2.4 |
| 470 | 34% | 66% | 0% | 0.8 to 3 | 1.8 to 2.8 | 2.0 | 2.2 | 2.4 |
| 471 | 35% | 65% | 0% | 0.8 to 3 | 1.8 to 2.8 | 2.0 | 2.2 | 2.4 |
| 472 | 36% | 64% | 0% | 0.8 to 3 | 1.8 to 2.8 | 2.0 | 2.2 | 2.4 |
| 473 | 37% | 63% | 0% | 0.8 to 3 | 1.8 to 2.8 | 2.0 | 2.2 | 2.4 |
| 474 | 38% | 62% | 0% | 0.8 to 3 | 1.8 to 2.8 | 2.0 | 2.2 | 2.4 |
| 475 | 39% | 61% | 0% | 0.8 to 3 | 1.8 to 2.8 | 2.0 | 2.2 | 2.4 |
| 476 | 40% | 60% | 0% | 0.8 to 3 | 1.8 to 2.8 | 2.0 | 2.2 | 2.4 |
| 477 | 41% | 59% | 0% | 0.8 to 3 | 1.8 to 2.8 | 2.0 | 2.2 | 2.4 |
| 478 | 42% | 58% | 0% | 0.8 to 3 | 1.8 to 2.8 | 2.0 | 2.2 | 2.4 |
| 479 | 43% | 57% | 0% | 0.8 to 3 | 1.8 to 2.8 | 2.0 | 2.2 | 2.4 |
| 480 | 44% | 56% | 0% | 0.8 to 3 | 1.8 to 2.8 | 2.0 | 2.2 | 2.4 |
| 481 | 45% | 55% | 0% | 0.8 to 3 | 1.8 to 2.8 | 2.0 | 2.2 | 2.4 |
| 482 | 46% | 54% | 0% | 0.8 to 3 | 1.8 to 2.8 | 2.0 | 2.2 | 2.4 |
| 483 | 47% | 53% | 0% | 0.8 to 3 | 1.8 to 2.8 | 2.0 | 2.2 | 2.4 |
| 484 | 48% | 52% | 0% | 0.8 to 3 | 1.8 to 2.8 | 2.0 | 2.2 | 2.4 |
| 485 | 49% | 51% | 0% | 0.8 to 3 | 1.8 to 2.8 | 2.0 | 2.2 | 2.4 |
| 486 | 50% | 50% | 0% | 0.8 to 3 | 1.8 to 2.8 | 2.0 | 2.2 | 2.4 |
| 487 | 51% | 49% | 0% | 0.8 to 3 | 1.8 to 2.8 | 2.0 | 2.2 | 2.4 |
| 488 | 52% | 48% | 0% | 0.8 to 3 | 1.8 to 2.8 | 2.0 | 2.2 | 2.4 |
| 489 | 53% | 47% | 0% | 0.8 to 3 | 1.8 to 2.8 | 2.0 | 2.2 | 2.4 |
| 490 | 54% | 46% | 0% | 0.8 to 3 | 1.8 to 2.8 | 2.0 | 2.2 | 2.4 |
| 491 | 55% | 45% | 0% | 0.8 to 3 | 1.8 to 2.8 | 2.0 | 2.2 | 2.4 |
| 492 | 56% | 44% | 0% | 0.8 to 3 | 1.8 to 2.8 | 2.0 | 2.2 | 2.4 |
| 493 | 57% | 43% | 0% | 0.8 to 3 | 1.8 to 2.8 | 2.0 | 2.2 | 2.4 |
| 494 | 58% | 42% | 0% | 0.8 to 3 | 1.8 to 2.8 | 2.0 | 2.2 | 2.4 |
| 495 | 59% | 41% | 0% | 0.8 to 3 | 1.8 to 2.8 | 2.0 | 2.2 | 2.4 |
| 496 | 60% | 40% | 0% | 0.8 to 3 | 1.8 to 2.8 | 2.0 | 2.2 | 2.4 |
| 497 | 30% | 69.5% | 0.5% | 0.8 to 3 | 1.8 to 2.8 | 2.0 | 2.2 | 2.4 |
| 498 | 31% | 68.5% | 0.5% | 0.8 to 3 | 1.8 to 2.8 | 2.0 | 2.2 | 2.4 |
| 499 | 32% | 67.5% | 0.5% | 0.8 to 3 | 1.8 to 2.8 | 2.0 | 2.2 | 2.4 |
| 500 | 33% | 66.5% | 0.5% | 0.8 to 3 | 1.8 to 2.8 | 2.0 | 2.2 | 2.4 |
| 501 | 34% | 65.5% | 0.5% | 0.8 to 3 | 1.8 to 2.8 | 2.0 | 2.2 | 2.4 |
| 502 | 35% | 64.5% | 0.5% | 0.8 to 3 | 1.8 to 2.8 | 2.0 | 2.2 | 2.4 |
| 503 | 36% | 63.5% | 0.5% | 0.8 to 3 | 1.8 to 2.8 | 2.0 | 2.2 | 2.4 |
| 504 | 37% | 62.5% | 0.5% | 0.8 to 3 | 1.8 to 2.8 | 2.0 | 2.2 | 2.4 |
| 505 | 38% | 61.5% | 0.5% | 0.8 to 3 | 1.8 to 2.8 | 2.0 | 2.2 | 2.4 |
| 506 | 39% | 60.5% | 0.5% | 0.8 to 3 | 1.8 to 2.8 | 2.0 | 2.2 | 2.4 |
| 507 | 40% | 59.5% | 0.5% | 0.8 to 3 | 1.8 to 2.8 | 2.0 | 2.2 | 2.4 |
| 508 | 41% | 58.5% | 0.5% | 0.8 to 3 | 1.8 to 2.8 | 2.0 | 2.2 | 2.4 |
| 509 | 42% | 57.5% | 0.5% | 0.8 to 3 | 1.8 to 2.8 | 2.0 | 2.2 | 2.4 |
| 510 | 43% | 56.5% | 0.5% | 0.8 to 3 | 1.8 to 2.8 | 2.0 | 2.2 | 2.4 |
| 511 | 44% | 55.5% | 0.5% | 0.8 to 3 | 1.8 to 2.8 | 2.0 | 2.2 | 2.4 |
| 512 | 45% | 54.5% | 0.5% | 0.8 to 3 | 1.8 to 2.8 | 2.0 | 2.2 | 2.4 |
| 513 | 46% | 53.5% | 0.5% | 0.8 to 3 | 1.8 to 2.8 | 2.0 | 2.2 | 2.4 |
| 514 | 47% | 52.5% | 0.5% | 0.8 to 3 | 1.8 to 2.8 | 2.0 | 2.2 | 2.4 |
| 515 | 48% | 51.5% | 0.5% | 0.8 to 3 | 1.8 to 2.8 | 2.0 | 2.2 | 2.4 |
| 516 | 49% | 50.5% | 0.5% | 0.8 to 3 | 1.8 to 2.8 | 2.0 | 2.2 | 2.4 |
| 517 | 50% | 49.5% | 0.5% | 0.8 to 3 | 1.8 to 2.8 | 2.0 | 2.2 | 2.4 |
| 518 | 51% | 48.5% | 0.5% | 0.8 to 3 | 1.8 to 2.8 | 2.0 | 2.2 | 2.4 |
| 519 | 52% | 47.5% | 0.5% | 0.8 to 3 | 1.8 to 2.8 | 2.0 | 2.2 | 2.4 |
| 520 | 53% | 46.5% | 0.5% | 0.8 to 3 | 1.8 to 2.8 | 2.0 | 2.2 | 2.4 |
| 521 | 54% | 45.5% | 0.5% | 0.8 to 3 | 1.8 to 2.8 | 2.0 | 2.2 | 2.4 |
| 522 | 55% | 44.5% | 0.5% | 0.8 to 3 | 1.8 to 2.8 | 2.0 | 2.2 | 2.4 |
| 523 | 56% | 43.5% | 0.5% | 0.8 to 3 | 1.8 to 2.8 | 2.0 | 2.2 | 2.4 |
| 524 | 57% | 42.5% | 0.5% | 0.8 to 3 | 1.8 to 2.8 | 2.0 | 2.2 | 2.4 |
| 525 | 58% | 41.5% | 0.5% | 0.8 to 3 | 1.8 to 2.8 | 2.0 | 2.2 | 2.4 |
| 526 | 59% | 40.5% | 0.5% | 0.8 to 3 | 1.8 to 2.8 | 2.0 | 2.2 | 2.4 |
| 527 | 60% | 39.5% | 0.5% | 0.8 to 3 | 1.8 to 2.8 | 2.0 | 2.2 | 2.4 |
| 528 | 30% | 69% | 1% | 0.8 to 3 | 1.8 to 2.8 | 2.0 | 2.2 | 2.4 |
| 529 | 31% | 68% | 1% | 0.8 to 3 | 1.8 to 2.8 | 2.0 | 2.2 | 2.4 |
| 530 | 32% | 67% | 1% | 0.8 to 3 | 1.8 to 2.8 | 2.0 | 2.2 | 2.4 |
| 531 | 33% | 66% | 1% | 0.8 to 3 | 1.8 to 2.8 | 2.0 | 2.2 | 2.4 |
| 532 | 34% | 65% | 1% | 0.8 to 3 | 1.8 to 2.8 | 2.0 | 2.2 | 2.4 |
| 533 | 35% | 64% | 1% | 0.8 to 3 | 1.8 to 2.8 | 2.0 | 2.2 | 2.4 |
| 534 | 36% | 63% | 1% | 0.8 to 3 | 1.8 to 2.8 | 2.0 | 2.2 | 2.4 |
| 535 | 37% | 62% | 1% | 0.8 to 3 | 1.8 to 2.8 | 2.0 | 2.2 | 2.4 |
| 536 | 38% | 61% | 1% | 0.8 to 3 | 1.8 to 2.8 | 2.0 | 2.2 | 2.4 |
| 537 | 39% | 60% | 1% | 0.8 to 3 | 1.8 to 2.8 | 2.0 | 2.2 | 2.4 |
| 538 | 40% | 59% | 1% | 0.8 to 3 | 1.8 to 2.8 | 2.0 | 2.2 | 2.4 |

TABLE 2-continued

| | Alkyl Sulfate | | Alkyl Ether Sulfate | | | | | |
| | Alkyl Chain Length, Wt. % | | Alkyl Chain Length, Wt. % | Average mol. EO (Alternatives for each numbered species) | | | | |
| Species | 8 | 9 | 6 | Range A | Range B | Species C | Species D | Species E |
| --- | --- | --- | --- | --- | --- | --- | --- | --- |
| 539 | 41% | 58% | 1% | 0.8 to 3 | 1.8 to 2.8 | 2.0 | 2.2 | 2.4 |
| 540 | 42% | 57% | 1% | 0.8 to 3 | 1.8 to 2.8 | 2.0 | 2.2 | 2.4 |
| 541 | 43% | 56% | 1% | 0.8 to 3 | 1.8 to 2.8 | 2.0 | 2.2 | 2.4 |
| 542 | 44% | 55% | 1% | 0.8 to 3 | 1.8 to 2.8 | 2.0 | 2.2 | 2.4 |
| 543 | 45% | 54% | 1% | 0.8 to 3 | 1.8 to 2.8 | 2.0 | 2.2 | 2.4 |
| 544 | 46% | 53% | 1% | 0.8 to 3 | 1.8 to 2.8 | 2.0 | 2.2 | 2.4 |
| 545 | 47% | 52% | 1% | 0.8 to 3 | 1.8 to 2.8 | 2.0 | 2.2 | 2.4 |
| 546 | 48% | 51% | 1% | 0.8 to 3 | 1.8 to 2.8 | 2.0 | 2.2 | 2.4 |
| 547 | 49% | 50% | 1% | 0.8 to 3 | 1.8 to 2.8 | 2.0 | 2.2 | 2.4 |
| 548 | 50% | 49% | 1% | 0.8 to 3 | 1.8 to 2.8 | 2.0 | 2.2 | 2.4 |
| 549 | 51% | 48% | 1% | 0.8 to 3 | 1.8 to 2.8 | 2.0 | 2.2 | 2.4 |
| 550 | 52% | 47% | 1% | 0.8 to 3 | 1.8 to 2.8 | 2.0 | 2.2 | 2.4 |
| 551 | 53% | 46% | 1% | 0.8 to 3 | 1.8 to 2.8 | 2.0 | 2.2 | 2.4 |
| 552 | 54% | 45% | 1% | 0.8 to 3 | 1.8 to 2.8 | 2.0 | 2.2 | 2.4 |
| 553 | 55% | 44% | 1% | 0.8 to 3 | 1.8 to 2.8 | 2.0 | 2.2 | 2.4 |
| 554 | 56% | 43% | 1% | 0.8 to 3 | 1.8 to 2.8 | 2.0 | 2.2 | 2.4 |
| 555 | 57% | 42% | 1% | 0.8 to 3 | 1.8 to 2.8 | 2.0 | 2.2 | 2.4 |
| 556 | 58% | 41% | 1% | 0.8 to 3 | 1.8 to 2.8 | 2.0 | 2.2 | 2.4 |
| 557 | 59% | 40% | 1% | 0.8 to 3 | 1.8 to 2.8 | 2.0 | 2.2 | 2.4 |
| 558 | 60% | 39% | 1% | 0.8 to 3 | 1.8 to 2.8 | 2.0 | 2.2 | 2.4 |
| 559 | 30% | 68.5% | 1.5% | 0.8 to 3 | 1.8 to 2.8 | 2.0 | 2.2 | 2.4 |
| 560 | 31% | 67.5% | 1.5% | 0.8 to 3 | 1.8 to 2.8 | 2.0 | 2.2 | 2.4 |
| 561 | 32% | 66.5% | 1.5% | 0.8 to 3 | 1.8 to 2.8 | 2.0 | 2.2 | 2.4 |
| 562 | 33% | 65.5% | 1.5% | 0.8 to 3 | 1.8 to 2.8 | 2.0 | 2.2 | 2.4 |
| 563 | 34% | 64.5% | 1.5% | 0.8 to 3 | 1.8 to 2.8 | 2.0 | 2.2 | 2.4 |
| 564 | 35% | 63.5% | 1.5% | 0.8 to 3 | 1.8 to 2.8 | 2.0 | 2.2 | 2.4 |
| 565 | 36% | 62.5% | 1.5% | 0.8 to 3 | 1.8 to 2.8 | 2.0 | 2.2 | 2.4 |
| 566 | 37% | 61.5% | 1.5% | 0.8 to 3 | 1.8 to 2.8 | 2.0 | 2.2 | 2.4 |
| 567 | 38% | 60.5% | 1.5% | 0.8 to 3 | 1.8 to 2.8 | 2.0 | 2.2 | 2.4 |
| 568 | 39% | 59.5% | 1.5% | 0.8 to 3 | 1.8 to 2.8 | 2.0 | 2.2 | 2.4 |
| 569 | 40% | 58.5% | 1.5% | 0.8 to 3 | 1.8 to 2.8 | 2.0 | 2.2 | 2.4 |
| 570 | 41% | 57.5% | 1.5% | 0.8 to 3 | 1.8 to 2.8 | 2.0 | 2.2 | 2.4 |
| 571 | 42% | 56.5% | 1.5% | 0.8 to 3 | 1.8 to 2.8 | 2.0 | 2.2 | 2.4 |
| 572 | 43% | 55.5% | 1.5% | 0.8 to 3 | 1.8 to 2.8 | 2.0 | 2.2 | 2.4 |
| 573 | 44% | 54.5% | 1.5% | 0.8 to 3 | 1.8 to 2.8 | 2.0 | 2.2 | 2.4 |
| 574 | 45% | 53.5% | 1.5% | 0.8 to 3 | 1.8 to 2.8 | 2.0 | 2.2 | 2.4 |
| 575 | 46% | 52.5% | 1.5% | 0.8 to 3 | 1.8 to 2.8 | 2.0 | 2.2 | 2.4 |
| 576 | 47% | 51.5% | 1.5% | 0.8 to 3 | 1.8 to 2.8 | 2.0 | 2.2 | 2.4 |
| 577 | 48% | 50.5% | 1.5% | 0.8 to 3 | 1.8 to 2.8 | 2.0 | 2.2 | 2.4 |
| 578 | 49% | 49.5% | 1.5% | 0.8 to 3 | 1.8 to 2.8 | 2.0 | 2.2 | 2.4 |
| 579 | 50% | 48.5% | 1.5% | 0.8 to 3 | 1.8 to 2.8 | 2.0 | 2.2 | 2.4 |
| 580 | 51% | 47.5% | 1.5% | 0.8 to 3 | 1.8 to 2.8 | 2.0 | 2.2 | 2.4 |
| 581 | 52% | 46.5% | 1.5% | 0.8 to 3 | 1.8 to 2.8 | 2.0 | 2.2 | 2.4 |
| 582 | 53% | 45.5% | 1.5% | 0.8 to 3 | 1.8 to 2.8 | 2.0 | 2.2 | 2.4 |
| 583 | 54% | 44.5% | 1.5% | 0.8 to 3 | 1.8 to 2.8 | 2.0 | 2.2 | 2.4 |
| 584 | 55% | 43.5% | 1.5% | 0.8 to 3 | 1.8 to 2.8 | 2.0 | 2.2 | 2.4 |
| 585 | 56% | 42.5% | 1.5% | 0.8 to 3 | 1.8 to 2.8 | 2.0 | 2.2 | 2.4 |
| 586 | 57% | 41.5% | 1.5% | 0.8 to 3 | 1.8 to 2.8 | 2.0 | 2.2 | 2.4 |
| 587 | 58% | 40.5% | 1.5% | 0.8 to 3 | 1.8 to 2.8 | 2.0 | 2.2 | 2.4 |
| 588 | 59% | 39.5% | 1.5% | 0.8 to 3 | 1.8 to 2.8 | 2.0 | 2.2 | 2.4 |
| 589 | 60% | 38.5% | 1.5% | 0.8 to 3 | 1.8 to 2.8 | 2.0 | 2.2 | 2.4 |
| 590 | 30% | 68% | 2% | 0.8 to 3 | 1.8 to 2.8 | 2.0 | 2.2 | 2.4 |
| 591 | 31% | 67% | 2% | 0.8 to 3 | 1.8 to 2.8 | 2.0 | 2.2 | 2.4 |
| 592 | 32% | 66% | 2% | 0.8 to 3 | 1.8 to 2.8 | 2.0 | 2.2 | 2.4 |
| 593 | 33% | 65% | 2% | 0.8 to 3 | 1.8 to 2.8 | 2.0 | 2.2 | 2.4 |
| 594 | 34% | 64% | 2% | 0.8 to 3 | 1.8 to 2.8 | 2.0 | 2.2 | 2.4 |
| 595 | 35% | 63% | 2% | 0.8 to 3 | 1.8 to 2.8 | 2.0 | 2.2 | 2.4 |
| 596 | 36% | 62% | 2% | 0.8 to 3 | 1.8 to 2.8 | 2.0 | 2.2 | 2.4 |
| 597 | 37% | 61% | 2% | 0.8 to 3 | 1.8 to 2.8 | 2.0 | 2.2 | 2.4 |
| 598 | 38% | 60% | 2% | 0.8 to 3 | 1.8 to 2.8 | 2.0 | 2.2 | 2.4 |
| 599 | 39% | 59% | 2% | 0.8 to 3 | 1.8 to 2.8 | 2.0 | 2.2 | 2.4 |
| 600 | 40% | 58% | 2% | 0.8 to 3 | 1.8 to 2.8 | 2.0 | 2.2 | 2.4 |
| 601 | 41% | 57% | 2% | 0.8 to 3 | 1.8 to 2.8 | 2.0 | 2.2 | 2.4 |
| 602 | 42% | 56% | 2% | 0.8 to 3 | 1.8 to 2.8 | 2.0 | 2.2 | 2.4 |
| 603 | 43% | 55% | 2% | 0.8 to 3 | 1.8 to 2.8 | 2.0 | 2.2 | 2.4 |
| 604 | 44% | 54% | 2% | 0.8 to 3 | 1.8 to 2.8 | 2.0 | 2.2 | 2.4 |
| 605 | 45% | 53% | 2% | 0.8 to 3 | 1.8 to 2.8 | 2.0 | 2.2 | 2.4 |
| 606 | 46% | 52% | 2% | 0.8 to 3 | 1.8 to 2.8 | 2.0 | 2.2 | 2.4 |
| 607 | 47% | 51% | 2% | 0.8 to 3 | 1.8 to 2.8 | 2.0 | 2.2 | 2.4 |
| 608 | 48% | 50% | 2% | 0.8 to 3 | 1.8 to 2.8 | 2.0 | 2.2 | 2.4 |
| 609 | 49% | 49% | 2% | 0.8 to 3 | 1.8 to 2.8 | 2.0 | 2.2 | 2.4 |
| 610 | 50% | 48% | 2% | 0.8 to 3 | 1.8 to 2.8 | 2.0 | 2.2 | 2.4 |
| 611 | 51% | 47% | 2% | 0.8 to 3 | 1.8 to 2.8 | 2.0 | 2.2 | 2.4 |

TABLE 2-continued

| | Alkyl Sulfate | | Alkyl Ether Sulfate | | | | | |
|---|---|---|---|---|---|---|---|---|
| | Alkyl Chain Length, Wt. % | | Alkyl Chain Length, Wt. % | Average mol. EO (Alternatives for each numbered species) | | | | |
| Species | 8 | 9 | 6 | Range A | Range B | Species C | Species D | Species E |
| 612 | 52% | 46% | 2% | 0.8 to 3 | 1.8 to 2.8 | 2.0 | 2.2 | 2.4 |
| 613 | 53% | 45% | 2% | 0.8 to 3 | 1.8 to 2.8 | 2.0 | 2.2 | 2.4 |
| 614 | 54% | 44% | 2% | 0.8 to 3 | 1.8 to 2.8 | 2.0 | 2.2 | 2.4 |
| 615 | 55% | 43% | 2% | 0.8 to 3 | 1.8 to 2.8 | 2.0 | 2.2 | 2.4 |
| 616 | 56% | 42% | 2% | 0.8 to 3 | 1.8 to 2.8 | 2.0 | 2.2 | 2.4 |
| 617 | 57% | 41% | 2% | 0.8 to 3 | 1.8 to 2.8 | 2.0 | 2.2 | 2.4 |
| 618 | 58% | 40% | 2% | 0.8 to 3 | 1.8 to 2.8 | 2.0 | 2.2 | 2.4 |
| 619 | 59% | 39% | 2% | 0.8 to 3 | 1.8 to 2.8 | 2.0 | 2.2 | 2.4 |
| 620 | 60% | 38% | 2% | 0.8 to 3 | 1.8 to 2.8 | 2.0 | 2.2 | 2.4 |
| 621 | 30% | 67.5% | 2.5% | 0.8 to 3 | 1.8 to 2.8 | 2.0 | 2.2 | 2.4 |
| 622 | 31% | 66.5% | 2.5% | 0.8 to 3 | 1.8 to 2.8 | 2.0 | 2.2 | 2.4 |
| 623 | 32% | 65.5% | 2.5% | 0.8 to 3 | 1.8 to 2.8 | 2.0 | 2.2 | 2.4 |
| 624 | 33% | 64.5% | 2.5% | 0.8 to 3 | 1.8 to 2.8 | 2.0 | 2.2 | 2.4 |
| 625 | 34% | 63.5% | 2.5% | 0.8 to 3 | 1.8 to 2.8 | 2.0 | 2.2 | 2.4 |
| 626 | 35% | 62.5% | 2.5% | 0.8 to 3 | 1.8 to 2.8 | 2.0 | 2.2 | 2.4 |
| 627 | 36% | 61.5% | 2.5% | 0.8 to 3 | 1.8 to 2.8 | 2.0 | 2.2 | 2.4 |
| 628 | 37% | 60.5% | 2.5% | 0.8 to 3 | 1.8 to 2.8 | 2.0 | 2.2 | 2.4 |
| 629 | 38% | 59.5% | 2.5% | 0.8 to 3 | 1.8 to 2.8 | 2.0 | 2.2 | 2.4 |
| 630 | 39% | 58.5% | 2.5% | 0.8 to 3 | 1.8 to 2.8 | 2.0 | 2.2 | 2.4 |
| 631 | 40% | 57.5% | 2.5% | 0.8 to 3 | 1.8 to 2.8 | 2.0 | 2.2 | 2.4 |
| 632 | 41% | 56.5% | 2.5% | 0.8 to 3 | 1.8 to 2.8 | 2.0 | 2.2 | 2.4 |
| 633 | 42% | 55.5% | 2.5% | 0.8 to 3 | 1.8 to 2.8 | 2.0 | 2.2 | 2.4 |
| 634 | 43% | 54.5% | 2.5% | 0.8 to 3 | 1.8 to 2.8 | 2.0 | 2.2 | 2.4 |
| 635 | 44% | 53.5% | 2.5% | 0.8 to 3 | 1.8 to 2.8 | 2.0 | 2.2 | 2.4 |
| 636 | 45% | 52.5% | 2.5% | 0.8 to 3 | 1.8 to 2.8 | 2.0 | 2.2 | 2.4 |
| 637 | 46% | 51.5% | 2.5% | 0.8 to 3 | 1.8 to 2.8 | 2.0 | 2.2 | 2.4 |
| 638 | 47% | 50.5% | 2.5% | 0.8 to 3 | 1.8 to 2.8 | 2.0 | 2.2 | 2.4 |
| 639 | 48% | 49.5% | 2.5% | 0.8 to 3 | 1.8 to 2.8 | 2.0 | 2.2 | 2.4 |
| 640 | 49% | 48.5% | 2.5% | 0.8 to 3 | 1.8 to 2.8 | 2.0 | 2.2 | 2.4 |
| 641 | 50% | 47.5% | 2.5% | 0.8 to 3 | 1.8 to 2.8 | 2.0 | 2.2 | 2.4 |
| 642 | 51% | 46.5% | 2.5% | 0.8 to 3 | 1.8 to 2.8 | 2.0 | 2.2 | 2.4 |
| 643 | 52% | 45.5% | 2.5% | 0.8 to 3 | 1.8 to 2.8 | 2.0 | 2.2 | 2.4 |
| 644 | 53% | 44.5% | 2.5% | 0.8 to 3 | 1.8 to 2.8 | 2.0 | 2.2 | 2.4 |
| 645 | 54% | 43.5% | 2.5% | 0.8 to 3 | 1.8 to 2.8 | 2.0 | 2.2 | 2.4 |
| 646 | 55% | 42.5% | 2.5% | 0.8 to 3 | 1.8 to 2.8 | 2.0 | 2.2 | 2.4 |
| 647 | 56% | 41.5% | 2.5% | 0.8 to 3 | 1.8 to 2.8 | 2.0 | 2.2 | 2.4 |
| 648 | 57% | 40.5% | 2.5% | 0.8 to 3 | 1.8 to 2.8 | 2.0 | 2.2 | 2.4 |
| 649 | 58% | 39.5% | 2.5% | 0.8 to 3 | 1.8 to 2.8 | 2.0 | 2.2 | 2.4 |
| 650 | 59% | 38.5% | 2.5% | 0.8 to 3 | 1.8 to 2.8 | 2.0 | 2.2 | 2.4 |
| 651 | 60% | 37.5% | 2.5% | 0.8 to 3 | 1.8 to 2.8 | 2.0 | 2.2 | 2.4 |
| 652 | 30% | 67% | 3% | 0.8 to 3 | 1.8 to 2.8 | 2.0 | 2.2 | 2.4 |
| 653 | 31% | 66% | 3% | 0.8 to 3 | 1.8 to 2.8 | 2.0 | 2.2 | 2.4 |
| 654 | 32% | 65% | 3% | 0.8 to 3 | 1.8 to 2.8 | 2.0 | 2.2 | 2.4 |
| 655 | 33% | 64% | 3% | 0.8 to 3 | 1.8 to 2.8 | 2.0 | 2.2 | 2.4 |
| 656 | 34% | 63% | 3% | 0.8 to 3 | 1.8 to 2.8 | 2.0 | 2.2 | 2.4 |
| 657 | 35% | 62% | 3% | 0.8 to 3 | 1.8 to 2.8 | 2.0 | 2.2 | 2.4 |
| 658 | 36% | 61% | 3% | 0.8 to 3 | 1.8 to 2.8 | 2.0 | 2.2 | 2.4 |
| 659 | 37% | 60% | 3% | 0.8 to 3 | 1.8 to 2.8 | 2.0 | 2.2 | 2.4 |
| 660 | 38% | 59% | 3% | 0.8 to 3 | 1.8 to 2.8 | 2.0 | 2.2 | 2.4 |
| 661 | 39% | 58% | 3% | 0.8 to 3 | 1.8 to 2.8 | 2.0 | 2.2 | 2.4 |
| 662 | 40% | 57% | 3% | 0.8 to 3 | 1.8 to 2.8 | 2.0 | 2.2 | 2.4 |
| 663 | 41% | 56% | 3% | 0.8 to 3 | 1.8 to 2.8 | 2.0 | 2.2 | 2.4 |
| 664 | 42% | 55% | 3% | 0.8 to 3 | 1.8 to 2.8 | 2.0 | 2.2 | 2.4 |
| 665 | 43% | 54% | 3% | 0.8 to 3 | 1.8 to 2.8 | 2.0 | 2.2 | 2.4 |
| 666 | 44% | 53% | 3% | 0.8 to 3 | 1.8 to 2.8 | 2.0 | 2.2 | 2.4 |
| 667 | 45% | 52% | 3% | 0.8 to 3 | 1.8 to 2.8 | 2.0 | 2.2 | 2.4 |
| 668 | 46% | 51% | 3% | 0.8 to 3 | 1.8 to 2.8 | 2.0 | 2.2 | 2.4 |
| 669 | 47% | 50% | 3% | 0.8 to 3 | 1.8 to 2.8 | 2.0 | 2.2 | 2.4 |
| 670 | 48% | 49% | 3% | 0.8 to 3 | 1.8 to 2.8 | 2.0 | 2.2 | 2.4 |
| 671 | 49% | 48% | 3% | 0.8 to 3 | 1.8 to 2.8 | 2.0 | 2.2 | 2.4 |
| 672 | 50% | 47% | 3% | 0.8 to 3 | 1.8 to 2.8 | 2.0 | 2.2 | 2.4 |
| 673 | 51% | 46% | 3% | 0.8 to 3 | 1.8 to 2.8 | 2.0 | 2.2 | 2.4 |
| 674 | 52% | 45% | 3% | 0.8 to 3 | 1.8 to 2.8 | 2.0 | 2.2 | 2.4 |
| 675 | 53% | 44% | 3% | 0.8 to 3 | 1.8 to 2.8 | 2.0 | 2.2 | 2.4 |
| 676 | 54% | 43% | 3% | 0.8 to 3 | 1.8 to 2.8 | 2.0 | 2.2 | 2.4 |
| 677 | 55% | 42% | 3% | 0.8 to 3 | 1.8 to 2.8 | 2.0 | 2.2 | 2.4 |
| 678 | 56% | 41% | 3% | 0.8 to 3 | 1.8 to 2.8 | 2.0 | 2.2 | 2.4 |
| 679 | 57% | 40% | 3% | 0.8 to 3 | 1.8 to 2.8 | 2.0 | 2.2 | 2.4 |
| 680 | 58% | 39% | 3% | 0.8 to 3 | 1.8 to 2.8 | 2.0 | 2.2 | 2.4 |
| 681 | 59% | 38% | 3% | 0.8 to 3 | 1.8 to 2.8 | 2.0 | 2.2 | 2.4 |
| 682 | 60% | 37% | 3% | 0.8 to 3 | 1.8 to 2.8 | 2.0 | 2.2 | 2.4 |
| 683 | 30% | 66.5% | 3.5% | 0.8 to 3 | 1.8 to 2.8 | 2.0 | 2.2 | 2.4 |
| 684 | 31% | 65.5% | 3.5% | 0.8 to 3 | 1.8 to 2.8 | 2.0 | 2.2 | 2.4 |

TABLE 2-continued

| | Alkyl Sulfate | | Alkyl Ether Sulfate | | | | | |
| | Alkyl Chain Length, Wt. % | | Alkyl Chain Length, Wt. % | Average mol. EO (Alternatives for each numbered species) | | | | |
| Species | 8 | 9 | 6 | Range A | Range B | Species C | Species D | Species E |
| --- | --- | --- | --- | --- | --- | --- | --- | --- |
| 685 | 32% | 64.5% | 3.5% | 0.8 to 3 | 1.8 to 2.8 | 2.0 | 2.2 | 2.4 |
| 686 | 33% | 63.5% | 3.5% | 0.8 to 3 | 1.8 to 2.8 | 2.0 | 2.2 | 2.4 |
| 687 | 34% | 62.5% | 3.5% | 0.8 to 3 | 1.8 to 2.8 | 2.0 | 2.2 | 2.4 |
| 688 | 35% | 61.5% | 3.5% | 0.8 to 3 | 1.8 to 2.8 | 2.0 | 2.2 | 2.4 |
| 689 | 36% | 60.5% | 3.5% | 0.8 to 3 | 1.8 to 2.8 | 2.0 | 2.2 | 2.4 |
| 690 | 37% | 59.5% | 3.5% | 0.8 to 3 | 1.8 to 2.8 | 2.0 | 2.2 | 2.4 |
| 691 | 38% | 58.5% | 3.5% | 0.8 to 3 | 1.8 to 2.8 | 2.0 | 2.2 | 2.4 |
| 692 | 39% | 57.5% | 3.5% | 0.8 to 3 | 1.8 to 2.8 | 2.0 | 2.2 | 2.4 |
| 693 | 40% | 56.5% | 3.5% | 0.8 to 3 | 1.8 to 2.8 | 2.0 | 2.2 | 2.4 |
| 694 | 41% | 55.5% | 3.5% | 0.8 to 3 | 1.8 to 2.8 | 2.0 | 2.2 | 2.4 |
| 695 | 42% | 54.5% | 3.5% | 0.8 to 3 | 1.8 to 2.8 | 2.0 | 2.2 | 2.4 |
| 696 | 43% | 53.5% | 3.5% | 0.8 to 3 | 1.8 to 2.8 | 2.0 | 2.2 | 2.4 |
| 697 | 44% | 52.5% | 3.5% | 0.8 to 3 | 1.8 to 2.8 | 2.0 | 2.2 | 2.4 |
| 698 | 45% | 51.5% | 3.5% | 0.8 to 3 | 1.8 to 2.8 | 2.0 | 2.2 | 2.4 |
| 699 | 46% | 50.5% | 3.5% | 0.8 to 3 | 1.8 to 2.8 | 2.0 | 2.2 | 2.4 |
| 700 | 47% | 49.5% | 3.5% | 0.8 to 3 | 1.8 to 2.8 | 2.0 | 2.2 | 2.4 |
| 701 | 48% | 48.5% | 3.5% | 0.8 to 3 | 1.8 to 2.8 | 2.0 | 2.2 | 2.4 |
| 702 | 49% | 47.5% | 3.5% | 0.8 to 3 | 1.8 to 2.8 | 2.0 | 2.2 | 2.4 |
| 703 | 50% | 46.5% | 3.5% | 0.8 to 3 | 1.8 to 2.8 | 2.0 | 2.2 | 2.4 |
| 704 | 51% | 45.5% | 3.5% | 0.8 to 3 | 1.8 to 2.8 | 2.0 | 2.2 | 2.4 |
| 705 | 52% | 44.5% | 3.5% | 0.8 to 3 | 1.8 to 2.8 | 2.0 | 2.2 | 2.4 |
| 706 | 53% | 43.5% | 3.5% | 0.8 to 3 | 1.8 to 2.8 | 2.0 | 2.2 | 2.4 |
| 707 | 54% | 42.5% | 3.5% | 0.8 to 3 | 1.8 to 2.8 | 2.0 | 2.2 | 2.4 |
| 708 | 55% | 41.5% | 3.5% | 0.8 to 3 | 1.8 to 2.8 | 2.0 | 2.2 | 2.4 |
| 709 | 56% | 40.5% | 3.5% | 0.8 to 3 | 1.8 to 2.8 | 2.0 | 2.2 | 2.4 |
| 710 | 57% | 39.5% | 3.5% | 0.8 to 3 | 1.8 to 2.8 | 2.0 | 2.2 | 2.4 |
| 711 | 58% | 38.5% | 3.5% | 0.8 to 3 | 1.8 to 2.8 | 2.0 | 2.2 | 2.4 |
| 712 | 59% | 37.5% | 3.5% | 0.8 to 3 | 1.8 to 2.8 | 2.0 | 2.2 | 2.4 |
| 713 | 60% | 36.5% | 3.5% | 0.8 to 3 | 1.8 to 2.8 | 2.0 | 2.2 | 2.4 |
| 714 | 30% | 66% | 4% | 0.8 to 3 | 1.8 to 2.8 | 2.0 | 2.2 | 2.4 |
| 715 | 31% | 65% | 4% | 0.8 to 3 | 1.8 to 2.8 | 2.0 | 2.2 | 2.4 |
| 716 | 32% | 64% | 4% | 0.8 to 3 | 1.8 to 2.8 | 2.0 | 2.2 | 2.4 |
| 717 | 33% | 63% | 4% | 0.8 to 3 | 1.8 to 2.8 | 2.0 | 2.2 | 2.4 |
| 718 | 34% | 62% | 4% | 0.8 to 3 | 1.8 to 2.8 | 2.0 | 2.2 | 2.4 |
| 719 | 35% | 61% | 4% | 0.8 to 3 | 1.8 to 2.8 | 2.0 | 2.2 | 2.4 |
| 720 | 36% | 60% | 4% | 0.8 to 3 | 1.8 to 2.8 | 2.0 | 2.2 | 2.4 |
| 721 | 37% | 59% | 4% | 0.8 to 3 | 1.8 to 2.8 | 2.0 | 2.2 | 2.4 |
| 722 | 38% | 58% | 4% | 0.8 to 3 | 1.8 to 2.8 | 2.0 | 2.2 | 2.4 |
| 723 | 39% | 57% | 4% | 0.8 to 3 | 1.8 to 2.8 | 2.0 | 2.2 | 2.4 |
| 724 | 40% | 56% | 4% | 0.8 to 3 | 1.8 to 2.8 | 2.0 | 2.2 | 2.4 |
| 725 | 41% | 55% | 4% | 0.8 to 3 | 1.8 to 2.8 | 2.0 | 2.2 | 2.4 |
| 726 | 42% | 54% | 4% | 0.8 to 3 | 1.8 to 2.8 | 2.0 | 2.2 | 2.4 |
| 727 | 43% | 53% | 4% | 0.8 to 3 | 1.8 to 2.8 | 2.0 | 2.2 | 2.4 |
| 728 | 44% | 52% | 4% | 0.8 to 3 | 1.8 to 2.8 | 2.0 | 2.2 | 2.4 |
| 729 | 45% | 51% | 4% | 0.8 to 3 | 1.8 to 2.8 | 2.0 | 2.2 | 2.4 |
| 730 | 46% | 50% | 4% | 0.8 to 3 | 1.8 to 2.8 | 2.0 | 2.2 | 2.4 |
| 731 | 47% | 49% | 4% | 0.8 to 3 | 1.8 to 2.8 | 2.0 | 2.2 | 2.4 |
| 732 | 48% | 48% | 4% | 0.8 to 3 | 1.8 to 2.8 | 2.0 | 2.2 | 2.4 |
| 733 | 49% | 47% | 4% | 0.8 to 3 | 1.8 to 2.8 | 2.0 | 2.2 | 2.4 |
| 734 | 50% | 46% | 4% | 0.8 to 3 | 1.8 to 2.8 | 2.0 | 2.2 | 2.4 |
| 735 | 51% | 45% | 4% | 0.8 to 3 | 1.8 to 2.8 | 2.0 | 2.2 | 2.4 |
| 736 | 52% | 44% | 4% | 0.8 to 3 | 1.8 to 2.8 | 2.0 | 2.2 | 2.4 |
| 737 | 53% | 43% | 4% | 0.8 to 3 | 1.8 to 2.8 | 2.0 | 2.2 | 2.4 |
| 738 | 54% | 42% | 4% | 0.8 to 3 | 1.8 to 2.8 | 2.0 | 2.2 | 2.4 |
| 739 | 55% | 41% | 4% | 0.8 to 3 | 1.8 to 2.8 | 2.0 | 2.2 | 2.4 |
| 740 | 56% | 40% | 4% | 0.8 to 3 | 1.8 to 2.8 | 2.0 | 2.2 | 2.4 |
| 741 | 57% | 39% | 4% | 0.8 to 3 | 1.8 to 2.8 | 2.0 | 2.2 | 2.4 |
| 742 | 58% | 38% | 4% | 0.8 to 3 | 1.8 to 2.8 | 2.0 | 2.2 | 2.4 |
| 743 | 59% | 37% | 4% | 0.8 to 3 | 1.8 to 2.8 | 2.0 | 2.2 | 2.4 |
| 744 | 60% | 36% | 4% | 0.8 to 3 | 1.8 to 2.8 | 2.0 | 2.2 | 2.4 |
| 745 | 30% | 65.5% | 4.5% | 0.8 to 3 | 1.8 to 2.8 | 2.0 | 2.2 | 2.4 |
| 746 | 31% | 64.5% | 4.5% | 0.8 to 3 | 1.8 to 2.8 | 2.0 | 2.2 | 2.4 |
| 747 | 32% | 63.5% | 4.5% | 0.8 to 3 | 1.8 to 2.8 | 2.0 | 2.2 | 2.4 |
| 748 | 33% | 62.5% | 4.5% | 0.8 to 3 | 1.8 to 2.8 | 2.0 | 2.2 | 2.4 |
| 749 | 34% | 61.5% | 4.5% | 0.8 to 3 | 1.8 to 2.8 | 2.0 | 2.2 | 2.4 |
| 750 | 35% | 60.5% | 4.5% | 0.8 to 3 | 1.8 to 2.8 | 2.0 | 2.2 | 2.4 |
| 751 | 36% | 59.5% | 4.5% | 0.8 to 3 | 1.8 to 2.8 | 2.0 | 2.2 | 2.4 |
| 752 | 37% | 58.5% | 4.5% | 0.8 to 3 | 1.8 to 2.8 | 2.0 | 2.2 | 2.4 |
| 753 | 38% | 57.5% | 4.5% | 0.8 to 3 | 1.8 to 2.8 | 2.0 | 2.2 | 2.4 |
| 754 | 39% | 56.5% | 4.5% | 0.8 to 3 | 1.8 to 2.8 | 2.0 | 2.2 | 2.4 |
| 755 | 40% | 55.5% | 4.5% | 0.8 to 3 | 1.8 to 2.8 | 2.0 | 2.2 | 2.4 |
| 756 | 41% | 54.5% | 4.5% | 0.8 to 3 | 1.8 to 2.8 | 2.0 | 2.2 | 2.4 |
| 757 | 42% | 53.5% | 4.5% | 0.8 to 3 | 1.8 to 2.8 | 2.0 | 2.2 | 2.4 |

TABLE 2-continued

| | Alkyl Sulfate | | Alkyl Ether Sulfate | | | | | |
| | Alkyl Chain Length, Wt. % | | Alkyl Chain Length, Wt. % | Average mol. EO (Alternatives for each numbered species) | | | | |
| Species | 8 | 9 | 6 | Range A | Range B | Species C | Species D | Species E |
|---|---|---|---|---|---|---|---|---|
| 758 | 43% | 52.5% | 4.5% | 0.8 to 3 | 1.8 to 2.8 | 2.0 | 2.2 | 2.4 |
| 759 | 44% | 51.5% | 4.5% | 0.8 to 3 | 1.8 to 2.8 | 2.0 | 2.2 | 2.4 |
| 760 | 45% | 50.5% | 4.5% | 0.8 to 3 | 1.8 to 2.8 | 2.0 | 2.2 | 2.4 |
| 761 | 46% | 49.5% | 4.5% | 0.8 to 3 | 1.8 to 2.8 | 2.0 | 2.2 | 2.4 |
| 762 | 47% | 48.5% | 4.5% | 0.8 to 3 | 1.8 to 2.8 | 2.0 | 2.2 | 2.4 |
| 763 | 48% | 47.5% | 4.5% | 0.8 to 3 | 1.8 to 2.8 | 2.0 | 2.2 | 2.4 |
| 764 | 49% | 46.5% | 4.5% | 0.8 to 3 | 1.8 to 2.8 | 2.0 | 2.2 | 2.4 |
| 765 | 50% | 45.5% | 4.5% | 0.8 to 3 | 1.8 to 2.8 | 2.0 | 2.2 | 2.4 |
| 766 | 51% | 44.5% | 4.5% | 0.8 to 3 | 1.8 to 2.8 | 2.0 | 2.2 | 2.4 |
| 767 | 52% | 43.5% | 4.5% | 0.8 to 3 | 1.8 to 2.8 | 2.0 | 2.2 | 2.4 |
| 768 | 53% | 42.5% | 4.5% | 0.8 to 3 | 1.8 to 2.8 | 2.0 | 2.2 | 2.4 |
| 769 | 54% | 41.5% | 4.5% | 0.8 to 3 | 1.8 to 2.8 | 2.0 | 2.2 | 2.4 |
| 770 | 55% | 40.5% | 4.5% | 0.8 to 3 | 1.8 to 2.8 | 2.0 | 2.2 | 2.4 |
| 771 | 56% | 39.5% | 4.5% | 0.8 to 3 | 1.8 to 2.8 | 2.0 | 2.2 | 2.4 |
| 772 | 57% | 38.5% | 4.5% | 0.8 to 3 | 1.8 to 2.8 | 2.0 | 2.2 | 2.4 |
| 773 | 58% | 37.5% | 4.5% | 0.8 to 3 | 1.8 to 2.8 | 2.0 | 2.2 | 2.4 |
| 774 | 59% | 36.5% | 4.5% | 0.8 to 3 | 1.8 to 2.8 | 2.0 | 2.2 | 2.4 |
| 775 | 60% | 35.5% | 4.5% | 0.8 to 3 | 1.8 to 2.8 | 2.0 | 2.2 | 2.4 |
| 776 | 30% | 65% | 5% | 0.8 to 3 | 1.8 to 2.8 | 2.0 | 2.2 | 2.4 |
| 777 | 31% | 64% | 5% | 0.8 to 3 | 1.8 to 2.8 | 2.0 | 2.2 | 2.4 |
| 778 | 32% | 63% | 5% | 0.8 to 3 | 1.8 to 2.8 | 2.0 | 2.2 | 2.4 |
| 779 | 33% | 62% | 5% | 0.8 to 3 | 1.8 to 2.8 | 2.0 | 2.2 | 2.4 |
| 780 | 34% | 61% | 5% | 0.8 to 3 | 1.8 to 2.8 | 2.0 | 2.2 | 2.4 |
| 781 | 35% | 60% | 5% | 0.8 to 3 | 1.8 to 2.8 | 2.0 | 2.2 | 2.4 |
| 782 | 36% | 59% | 5% | 0.8 to 3 | 1.8 to 2.8 | 2.0 | 2.2 | 2.4 |
| 783 | 37% | 58% | 5% | 0.8 to 3 | 1.8 to 2.8 | 2.0 | 2.2 | 2.4 |
| 784 | 38% | 57% | 5% | 0.8 to 3 | 1.8 to 2.8 | 2.0 | 2.2 | 2.4 |
| 785 | 39% | 56% | 5% | 0.8 to 3 | 1.8 to 2.8 | 2.0 | 2.2 | 2.4 |
| 786 | 40% | 55% | 5% | 0.8 to 3 | 1.8 to 2.8 | 2.0 | 2.2 | 2.4 |
| 787 | 41% | 54% | 5% | 0.8 to 3 | 1.8 to 2.8 | 2.0 | 2.2 | 2.4 |
| 788 | 42% | 53% | 5% | 0.8 to 3 | 1.8 to 2.8 | 2.0 | 2.2 | 2.4 |
| 789 | 43% | 52% | 5% | 0.8 to 3 | 1.8 to 2.8 | 2.0 | 2.2 | 2.4 |
| 790 | 44% | 51% | 5% | 0.8 to 3 | 1.8 to 2.8 | 2.0 | 2.2 | 2.4 |
| 791 | 45% | 50% | 5% | 0.8 to 3 | 1.8 to 2.8 | 2.0 | 2.2 | 2.4 |
| 792 | 46% | 49% | 5% | 0.8 to 3 | 1.8 to 2.8 | 2.0 | 2.2 | 2.4 |
| 793 | 47% | 48% | 5% | 0.8 to 3 | 1.8 to 2.8 | 2.0 | 2.2 | 2.4 |
| 794 | 48% | 47% | 5% | 0.8 to 3 | 1.8 to 2.8 | 2.0 | 2.2 | 2.4 |
| 795 | 49% | 46% | 5% | 0.8 to 3 | 1.8 to 2.8 | 2.0 | 2.2 | 2.4 |
| 796 | 50% | 45% | 5% | 0.8 to 3 | 1.8 to 2.8 | 2.0 | 2.2 | 2.4 |
| 797 | 51% | 44% | 5% | 0.8 to 3 | 1.8 to 2.8 | 2.0 | 2.2 | 2.4 |
| 798 | 52% | 43% | 5% | 0.8 to 3 | 1.8 to 2.8 | 2.0 | 2.2 | 2.4 |
| 799 | 53% | 42% | 5% | 0.8 to 3 | 1.8 to 2.8 | 2.0 | 2.2 | 2.4 |
| 800 | 54% | 41% | 5% | 0.8 to 3 | 1.8 to 2.8 | 2.0 | 2.2 | 2.4 |
| 801 | 55% | 40% | 5% | 0.8 to 3 | 1.8 to 2.8 | 2.0 | 2.2 | 2.4 |
| 802 | 56% | 39% | 5% | 0.8 to 3 | 1.8 to 2.8 | 2.0 | 2.2 | 2.4 |
| 803 | 57% | 38% | 5% | 0.8 to 3 | 1.8 to 2.8 | 2.0 | 2.2 | 2.4 |
| 804 | 58% | 37% | 5% | 0.8 to 3 | 1.8 to 2.8 | 2.0 | 2.2 | 2.4 |
| 805 | 59% | 36% | 5% | 0.8 to 3 | 1.8 to 2.8 | 2.0 | 2.2 | 2.4 |
| 806 | 60% | 35% | 5% | 0.8 to 3 | 1.8 to 2.8 | 2.0 | 2.2 | 2.4 |
| 807 | 30% | 64.5% | 5.5% | 0.8 to 3 | 1.8 to 2.8 | 2.0 | 2.2 | 2.4 |
| 808 | 31% | 63.5% | 5.5% | 0.8 to 3 | 1.8 to 2.8 | 2.0 | 2.2 | 2.4 |
| 809 | 32% | 62.5% | 5.5% | 0.8 to 3 | 1.8 to 2.8 | 2.0 | 2.2 | 2.4 |
| 810 | 33% | 61.5% | 5.5% | 0.8 to 3 | 1.8 to 2.8 | 2.0 | 2.2 | 2.4 |
| 811 | 34% | 60.5% | 5.5% | 0.8 to 3 | 1.8 to 2.8 | 2.0 | 2.2 | 2.4 |
| 812 | 35% | 59.5% | 5.5% | 0.8 to 3 | 1.8 to 2.8 | 2.0 | 2.2 | 2.4 |
| 813 | 36% | 58.5% | 5.5% | 0.8 to 3 | 1.8 to 2.8 | 2.0 | 2.2 | 2.4 |
| 814 | 37% | 57.5% | 5.5% | 0.8 to 3 | 1.8 to 2.8 | 2.0 | 2.2 | 2.4 |
| 815 | 38% | 56.5% | 5.5% | 0.8 to 3 | 1.8 to 2.8 | 2.0 | 2.2 | 2.4 |
| 816 | 39% | 55.5% | 5.5% | 0.8 to 3 | 1.8 to 2.8 | 2.0 | 2.2 | 2.4 |
| 817 | 40% | 54.5% | 5.5% | 0.8 to 3 | 1.8 to 2.8 | 2.0 | 2.2 | 2.4 |
| 818 | 41% | 53.5% | 5.5% | 0.8 to 3 | 1.8 to 2.8 | 2.0 | 2.2 | 2.4 |
| 819 | 42% | 52.5% | 5.5% | 0.8 to 3 | 1.8 to 2.8 | 2.0 | 2.2 | 2.4 |
| 820 | 43% | 51.5% | 5.5% | 0.8 to 3 | 1.8 to 2.8 | 2.0 | 2.2 | 2.4 |
| 821 | 44% | 50.5% | 5.5% | 0.8 to 3 | 1.8 to 2.8 | 2.0 | 2.2 | 2.4 |
| 822 | 45% | 49.5% | 5.5% | 0.8 to 3 | 1.8 to 2.8 | 2.0 | 2.2 | 2.4 |
| 823 | 46% | 48.5% | 5.5% | 0.8 to 3 | 1.8 to 2.8 | 2.0 | 2.2 | 2.4 |
| 824 | 47% | 47.5% | 5.5% | 0.8 to 3 | 1.8 to 2.8 | 2.0 | 2.2 | 2.4 |
| 825 | 48% | 46.5% | 5.5% | 0.8 to 3 | 1.8 to 2.8 | 2.0 | 2.2 | 2.4 |
| 826 | 49% | 45.5% | 5.5% | 0.8 to 3 | 1.8 to 2.8 | 2.0 | 2.2 | 2.4 |
| 827 | 50% | 44.5% | 5.5% | 0.8 to 3 | 1.8 to 2.8 | 2.0 | 2.2 | 2.4 |
| 828 | 51% | 43.5% | 5.5% | 0.8 to 3 | 1.8 to 2.8 | 2.0 | 2.2 | 2.4 |
| 829 | 52% | 42.5% | 5.5% | 0.8 to 3 | 1.8 to 2.8 | 2.0 | 2.2 | 2.4 |
| 830 | 53% | 41.5% | 5.5% | 0.8 to 3 | 1.8 to 2.8 | 2.0 | 2.2 | 2.4 |

TABLE 2-continued

|  | Alkyl Sulfate | | Alkyl Ether Sulfate | | | | | |
|---|---|---|---|---|---|---|---|---|
|  | Alkyl Chain Length, Wt. % | Alkyl Chain Length, Wt. % | Average mol. EO (Alternatives for each numbered species) | | | | | |
| Species | 8 | 9 | 6 | Range A | Range B | Species C | Species D | Species E |
| 831 | 54% | 40.5% | 5.5% | 0.8 to 3 | 1.8 to 2.8 | 2.0 | 2.2 | 2.4 |
| 832 | 55% | 39.5% | 5.5% | 0.8 to 3 | 1.8 to 2.8 | 2.0 | 2.2 | 2.4 |
| 833 | 56% | 38.5% | 5.5% | 0.8 to 3 | 1.8 to 2.8 | 2.0 | 2.2 | 2.4 |
| 834 | 57% | 37.5% | 5.5% | 0.8 to 3 | 1.8 to 2.8 | 2.0 | 2.2 | 2.4 |
| 835 | 58% | 36.5% | 5.5% | 0.8 to 3 | 1.8 to 2.8 | 2.0 | 2.2 | 2.4 |
| 836 | 59% | 35.5% | 5.5% | 0.8 to 3 | 1.8 to 2.8 | 2.0 | 2.2 | 2.4 |
| 837 | 60% | 34.5% | 5.5% | 0.8 to 3 | 1.8 to 2.8 | 2.0 | 2.2 | 2.4 |
| 838 | 30% | 64% | 6% | 0.8 to 3 | 1.8 to 2.8 | 2.0 | 2.2 | 2.4 |
| 839 | 31% | 63% | 6% | 0.8 to 3 | 1.8 to 2.8 | 2.0 | 2.2 | 2.4 |
| 840 | 32% | 62% | 6% | 0.8 to 3 | 1.8 to 2.8 | 2.0 | 2.2 | 2.4 |
| 841 | 33% | 61% | 6% | 0.8 to 3 | 1.8 to 2.8 | 2.0 | 2.2 | 2.4 |
| 842 | 34% | 60% | 6% | 0.8 to 3 | 1.8 to 2.8 | 2.0 | 2.2 | 2.4 |
| 843 | 35% | 59% | 6% | 0.8 to 3 | 1.8 to 2.8 | 2.0 | 2.2 | 2.4 |
| 844 | 36% | 58% | 6% | 0.8 to 3 | 1.8 to 2.8 | 2.0 | 2.2 | 2.4 |
| 845 | 37% | 57% | 6% | 0.8 to 3 | 1.8 to 2.8 | 2.0 | 2.2 | 2.4 |
| 846 | 38% | 56% | 6% | 0.8 to 3 | 1.8 to 2.8 | 2.0 | 2.2 | 2.4 |
| 847 | 39% | 55% | 6% | 0.8 to 3 | 1.8 to 2.8 | 2.0 | 2.2 | 2.4 |
| 848 | 40% | 54% | 6% | 0.8 to 3 | 1.8 to 2.8 | 2.0 | 2.2 | 2.4 |
| 849 | 41% | 53% | 6% | 0.8 to 3 | 1.8 to 2.8 | 2.0 | 2.2 | 2.4 |
| 850 | 42% | 52% | 6% | 0.8 to 3 | 1.8 to 2.8 | 2.0 | 2.2 | 2.4 |
| 851 | 43% | 51% | 6% | 0.8 to 3 | 1.8 to 2.8 | 2.0 | 2.2 | 2.4 |
| 852 | 44% | 50% | 6% | 0.8 to 3 | 1.8 to 2.8 | 2.0 | 2.2 | 2.4 |
| 853 | 45% | 49% | 6% | 0.8 to 3 | 1.8 to 2.8 | 2.0 | 2.2 | 2.4 |
| 854 | 46% | 48% | 6% | 0.8 to 3 | 1.8 to 2.8 | 2.0 | 2.2 | 2.4 |
| 855 | 47% | 47% | 6% | 0.8 to 3 | 1.8 to 2.8 | 2.0 | 2.2 | 2.4 |
| 856 | 48% | 46% | 6% | 0.8 to 3 | 1.8 to 2.8 | 2.0 | 2.2 | 2.4 |
| 857 | 49% | 45% | 6% | 0.8 to 3 | 1.8 to 2.8 | 2.0 | 2.2 | 2.4 |
| 858 | 50% | 44% | 6% | 0.8 to 3 | 1.8 to 2.8 | 2.0 | 2.2 | 2.4 |
| 859 | 51% | 43% | 6% | 0.8 to 3 | 1.8 to 2.8 | 2.0 | 2.2 | 2.4 |
| 860 | 52% | 42% | 6% | 0.8 to 3 | 1.8 to 2.8 | 2.0 | 2.2 | 2.4 |
| 861 | 53% | 41% | 6% | 0.8 to 3 | 1.8 to 2.8 | 2.0 | 2.2 | 2.4 |
| 862 | 54% | 40% | 6% | 0.8 to 3 | 1.8 to 2.8 | 2.0 | 2.2 | 2.4 |
| 863 | 55% | 39% | 6% | 0.8 to 3 | 1.8 to 2.8 | 2.0 | 2.2 | 2.4 |
| 864 | 56% | 38% | 6% | 0.8 to 3 | 1.8 to 2.8 | 2.0 | 2.2 | 2.4 |
| 865 | 57% | 37% | 6% | 0.8 to 3 | 1.8 to 2.8 | 2.0 | 2.2 | 2.4 |
| 866 | 58% | 36% | 6% | 0.8 to 3 | 1.8 to 2.8 | 2.0 | 2.2 | 2.4 |
| 867 | 59% | 35% | 6% | 0.8 to 3 | 1.8 to 2.8 | 2.0 | 2.2 | 2.4 |
| 868 | 60% | 34% | 6% | 0.8 to 3 | 1.8 to 2.8 | 2.0 | 2.2 | 2.4 |
| 869 | 30% | 63.5% | 6.5% | 0.8 to 3 | 1.8 to 2.8 | 2.0 | 2.2 | 2.4 |
| 870 | 31% | 62.5% | 6.5% | 0.8 to 3 | 1.8 to 2.8 | 2.0 | 2.2 | 2.4 |
| 871 | 32% | 61.5% | 6.5% | 0.8 to 3 | 1.8 to 2.8 | 2.0 | 2.2 | 2.4 |
| 872 | 33% | 60.5% | 6.5% | 0.8 to 3 | 1.8 to 2.8 | 2.0 | 2.2 | 2.4 |
| 873 | 34% | 59.5% | 6.5% | 0.8 to 3 | 1.8 to 2.8 | 2.0 | 2.2 | 2.4 |
| 874 | 35% | 58.5% | 6.5% | 0.8 to 3 | 1.8 to 2.8 | 2.0 | 2.2 | 2.4 |
| 875 | 36% | 57.5% | 6.5% | 0.8 to 3 | 1.8 to 2.8 | 2.0 | 2.2 | 2.4 |
| 876 | 37% | 56.5% | 6.5% | 0.8 to 3 | 1.8 to 2.8 | 2.0 | 2.2 | 2.4 |
| 877 | 38% | 55.5% | 6.5% | 0.8 to 3 | 1.8 to 2.8 | 2.0 | 2.2 | 2.4 |
| 878 | 39% | 54.5% | 6.5% | 0.8 to 3 | 1.8 to 2.8 | 2.0 | 2.2 | 2.4 |
| 879 | 40% | 53.5% | 6.5% | 0.8 to 3 | 1.8 to 2.8 | 2.0 | 2.2 | 2.4 |
| 880 | 41% | 52.5% | 6.5% | 0.8 to 3 | 1.8 to 2.8 | 2.0 | 2.2 | 2.4 |
| 881 | 42% | 51.5% | 6.5% | 0.8 to 3 | 1.8 to 2.8 | 2.0 | 2.2 | 2.4 |
| 882 | 43% | 50.5% | 6.5% | 0.8 to 3 | 1.8 to 2.8 | 2.0 | 2.2 | 2.4 |
| 883 | 44% | 49.5% | 6.5% | 0.8 to 3 | 1.8 to 2.8 | 2.0 | 2.2 | 2.4 |
| 884 | 45% | 48.5% | 6.5% | 0.8 to 3 | 1.8 to 2.8 | 2.0 | 2.2 | 2.4 |
| 885 | 46% | 47.5% | 6.5% | 0.8 to 3 | 1.8 to 2.8 | 2.0 | 2.2 | 2.4 |
| 886 | 47% | 46.5% | 6.5% | 0.8 to 3 | 1.8 to 2.8 | 2.0 | 2.2 | 2.4 |
| 887 | 48% | 45.5% | 6.5% | 0.8 to 3 | 1.8 to 2.8 | 2.0 | 2.2 | 2.4 |
| 888 | 49% | 44.5% | 6.5% | 0.8 to 3 | 1.8 to 2.8 | 2.0 | 2.2 | 2.4 |
| 889 | 50% | 43.5% | 6.5% | 0.8 to 3 | 1.8 to 2.8 | 2.0 | 2.2 | 2.4 |
| 890 | 51% | 42.5% | 6.5% | 0.8 to 3 | 1.8 to 2.8 | 2.0 | 2.2 | 2.4 |
| 891 | 52% | 41.5% | 6.5% | 0.8 to 3 | 1.8 to 2.8 | 2.0 | 2.2 | 2.4 |
| 892 | 53% | 40.5% | 6.5% | 0.8 to 3 | 1.8 to 2.8 | 2.0 | 2.2 | 2.4 |
| 893 | 54% | 39.5% | 6.5% | 0.8 to 3 | 1.8 to 2.8 | 2.0 | 2.2 | 2.4 |
| 894 | 55% | 38.5% | 6.5% | 0.8 to 3 | 1.8 to 2.8 | 2.0 | 2.2 | 2.4 |
| 895 | 56% | 37.5% | 6.5% | 0.8 to 3 | 1.8 to 2.8 | 2.0 | 2.2 | 2.4 |
| 896 | 57% | 36.5% | 6.5% | 0.8 to 3 | 1.8 to 2.8 | 2.0 | 2.2 | 2.4 |
| 897 | 58% | 35.5% | 6.5% | 0.8 to 3 | 1.8 to 2.8 | 2.0 | 2.2 | 2.4 |
| 898 | 59% | 34.5% | 6.5% | 0.8 to 3 | 1.8 to 2.8 | 2.0 | 2.2 | 2.4 |
| 899 | 60% | 33.5% | 6.5% | 0.8 to 3 | 1.8 to 2.8 | 2.0 | 2.2 | 2.4 |
| 900 | 30% | 63% | 7% | 0.8 to 3 | 1.8 to 2.8 | 2.0 | 2.2 | 2.4 |
| 901 | 31% | 62% | 7% | 0.8 to 3 | 1.8 to 2.8 | 2.0 | 2.2 | 2.4 |
| 902 | 32% | 61% | 7% | 0.8 to 3 | 1.8 to 2.8 | 2.0 | 2.2 | 2.4 |
| 903 | 33% | 60% | 7% | 0.8 to 3 | 1.8 to 2.8 | 2.0 | 2.2 | 2.4 |

TABLE 2-continued

| | Alkyl Sulfate | | Alkyl Ether Sulfate | | | | | |
| | Alkyl Chain Length, Wt. % | | Alkyl Chain Length, Wt. % | Average mol. EO (Alternatives for each numbered species) | | | | |
| Species | 8 | 9 | 6 | Range A | Range B | Species C | Species D | Species E |
|---|---|---|---|---|---|---|---|---|
| 904 | 34% | 59% | 7% | 0.8 to 3 | 1.8 to 2.8 | 2.0 | 2.2 | 2.4 |
| 905 | 35% | 58% | 7% | 0.8 to 3 | 1.8 to 2.8 | 2.0 | 2.2 | 2.4 |
| 906 | 36% | 57% | 7% | 0.8 to 3 | 1.8 to 2.8 | 2.0 | 2.2 | 2.4 |
| 907 | 37% | 56% | 7% | 0.8 to 3 | 1.8 to 2.8 | 2.0 | 2.2 | 2.4 |
| 908 | 38% | 55% | 7% | 0.8 to 3 | 1.8 to 2.8 | 2.0 | 2.2 | 2.4 |
| 909 | 39% | 54% | 7% | 0.8 to 3 | 1.8 to 2.8 | 2.0 | 2.2 | 2.4 |
| 910 | 40% | 53% | 7% | 0.8 to 3 | 1.8 to 2.8 | 2.0 | 2.2 | 2.4 |
| 911 | 41% | 52% | 7% | 0.8 to 3 | 1.8 to 2.8 | 2.0 | 2.2 | 2.4 |
| 912 | 42% | 51% | 7% | 0.8 to 3 | 1.8 to 2.8 | 2.0 | 2.2 | 2.4 |
| 913 | 43% | 50% | 7% | 0.8 to 3 | 1.8 to 2.8 | 2.0 | 2.2 | 2.4 |
| 914 | 44% | 49% | 7% | 0.8 to 3 | 1.8 to 2.8 | 2.0 | 2.2 | 2.4 |
| 915 | 45% | 48% | 7% | 0.8 to 3 | 1.8 to 2.8 | 2.0 | 2.2 | 2.4 |
| 916 | 46% | 47% | 7% | 0.8 to 3 | 1.8 to 2.8 | 2.0 | 2.2 | 2.4 |
| 917 | 47% | 46% | 7% | 0.8 to 3 | 1.8 to 2.8 | 2.0 | 2.2 | 2.4 |
| 918 | 48% | 45% | 7% | 0.8 to 3 | 1.8 to 2.8 | 2.0 | 2.2 | 2.4 |
| 919 | 49% | 44% | 7% | 0.8 to 3 | 1.8 to 2.8 | 2.0 | 2.2 | 2.4 |
| 920 | 50% | 43% | 7% | 0.8 to 3 | 1.8 to 2.8 | 2.0 | 2.2 | 2.4 |
| 921 | 51% | 42% | 7% | 0.8 to 3 | 1.8 to 2.8 | 2.0 | 2.2 | 2.4 |
| 922 | 52% | 41% | 7% | 0.8 to 3 | 1.8 to 2.8 | 2.0 | 2.2 | 2.4 |
| 923 | 53% | 40% | 7% | 0.8 to 3 | 1.8 to 2.8 | 2.0 | 2.2 | 2.4 |
| 924 | 54% | 39% | 7% | 0.8 to 3 | 1.8 to 2.8 | 2.0 | 2.2 | 2.4 |
| 925 | 55% | 38% | 7% | 0.8 to 3 | 1.8 to 2.8 | 2.0 | 2.2 | 2.4 |
| 926 | 56% | 37% | 7% | 0.8 to 3 | 1.8 to 2.8 | 2.0 | 2.2 | 2.4 |
| 927 | 57% | 36% | 7% | 0.8 to 3 | 1.8 to 2.8 | 2.0 | 2.2 | 2.4 |
| 928 | 58% | 35% | 7% | 0.8 to 3 | 1.8 to 2.8 | 2.0 | 2.2 | 2.4 |
| 929 | 59% | 34% | 7% | 0.8 to 3 | 1.8 to 2.8 | 2.0 | 2.2 | 2.4 |
| 930 | 60% | 33% | 7% | 0.8 to 3 | 1.8 to 2.8 | 2.0 | 2.2 | 2.4 |

TABLE 3

| | Alkyl Sulfate | | Alkyl Ether Sulfate | | | | | |
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
|---|---|---|---|---|---|---|---|---|
| 931 | 30% | 70% | 0% | 0.8 to 3 | 1.8 to 2.8 | 2.0 | 2.2 | 2.4 |
| 932 | 31% | 69% | 0% | 0.8 to 3 | 1.8 to 2.8 | 2.0 | 2.2 | 2.4 |
| 933 | 32% | 68% | 0% | 0.8 to 3 | 1.8 to 2.8 | 2.0 | 2.2 | 2.4 |
| 934 | 33% | 67% | 0% | 0.8 to 3 | 1.8 to 2.8 | 2.0 | 2.2 | 2.4 |
| 935 | 34% | 66% | 0% | 0.8 to 3 | 1.8 to 2.8 | 2.0 | 2.2 | 2.4 |
| 936 | 35% | 65% | 0% | 0.8 to 3 | 1.8 to 2.8 | 2.0 | 2.2 | 2.4 |
| 937 | 36% | 64% | 0% | 0.8 to 3 | 1.8 to 2.8 | 2.0 | 2.2 | 2.4 |
| 938 | 37% | 63% | 0% | 0.8 to 3 | 1.8 to 2.8 | 2.0 | 2.2 | 2.4 |
| 939 | 38% | 62% | 0% | 0.8 to 3 | 1.8 to 2.8 | 2.0 | 2.2 | 2.4 |
| 940 | 39% | 61% | 0% | 0.8 to 3 | 1.8 to 2.8 | 2.0 | 2.2 | 2.4 |
| 941 | 40% | 60% | 0% | 0.8 to 3 | 1.8 to 2.8 | 2.0 | 2.2 | 2.4 |
| 942 | 41% | 59% | 0% | 0.8 to 3 | 1.8 to 2.8 | 2.0 | 2.2 | 2.4 |
| 943 | 42% | 58% | 0% | 0.8 to 3 | 1.8 to 2.8 | 2.0 | 2.2 | 2.4 |
| 944 | 43% | 57% | 0% | 0.8 to 3 | 1.8 to 2.8 | 2.0 | 2.2 | 2.4 |
| 945 | 44% | 56% | 0% | 0.8 to 3 | 1.8 to 2.8 | 2.0 | 2.2 | 2.4 |
| 946 | 45% | 55% | 0% | 0.8 to 3 | 1.8 to 2.8 | 2.0 | 2.2 | 2.4 |
| 947 | 46% | 54% | 0% | 0.8 to 3 | 1.8 to 2.8 | 2.0 | 2.2 | 2.4 |
| 948 | 47% | 53% | 0% | 0.8 to 3 | 1.8 to 2.8 | 2.0 | 2.2 | 2.4 |
| 949 | 48% | 52% | 0% | 0.8 to 3 | 1.8 to 2.8 | 2.0 | 2.2 | 2.4 |
| 950 | 49% | 51% | 0% | 0.8 to 3 | 1.8 to 2.8 | 2.0 | 2.2 | 2.4 |
| 951 | 50% | 50% | 0% | 0.8 to 3 | 1.8 to 2.8 | 2.0 | 2.2 | 2.4 |
| 952 | 51% | 49% | 0% | 0.8 to 3 | 1.8 to 2.8 | 2.0 | 2.2 | 2.4 |
| 953 | 52% | 48% | 0% | 0.8 to 3 | 1.8 to 2.8 | 2.0 | 2.2 | 2.4 |
| 954 | 53% | 47% | 0% | 0.8 to 3 | 1.8 to 2.8 | 2.0 | 2.2 | 2.4 |
| 955 | 54% | 46% | 0% | 0.8 to 3 | 1.8 to 2.8 | 2.0 | 2.2 | 2.4 |
| 956 | 55% | 45% | 0% | 0.8 to 3 | 1.8 to 2.8 | 2.0 | 2.2 | 2.4 |
| 957 | 56% | 44% | 0% | 0.8 to 3 | 1.8 to 2.8 | 2.0 | 2.2 | 2.4 |
| 958 | 57% | 43% | 0% | 0.8 to 3 | 1.8 to 2.8 | 2.0 | 2.2 | 2.4 |
| 959 | 58% | 42% | 0% | 0.8 to 3 | 1.8 to 2.8 | 2.0 | 2.2 | 2.4 |
| 960 | 59% | 41% | 0% | 0.8 to 3 | 1.8 to 2.8 | 2.0 | 2.2 | 2.4 |
| 961 | 60% | 40% | 0% | 0.8 to 3 | 1.8 to 2.8 | 2.0 | 2.2 | 2.4 |
| 962 | 30% | 69.5% | 0.5% | 0.8 to 3 | 1.8 to 2.8 | 2.0 | 2.2 | 2.4 |
| 963 | 31% | 68.5% | 0.5% | 0.8 to 3 | 1.8 to 2.8 | 2.0 | 2.2 | 2.4 |

TABLE 3-continued

| | Alkyl Sulfate | | Alkyl Ether Sulfate | | | | | |
|---|---|---|---|---|---|---|---|---|
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
| 964 | 32% | 67.5% | 0.5% | 0.8 to 3 | 1.8 to 2.8 | 2.0 | 2.2 | 2.4 |
| 965 | 33% | 66.5% | 0.5% | 0.8 to 3 | 1.8 to 2.8 | 2.0 | 2.2 | 2.4 |
| 966 | 34% | 65.5% | 0.5% | 0.8 to 3 | 1.8 to 2.8 | 2.0 | 2.2 | 2.4 |
| 967 | 35% | 64.5% | 0.5% | 0.8 to 3 | 1.8 to 2.8 | 2.0 | 2.2 | 2.4 |
| 968 | 36% | 63.5% | 0.5% | 0.8 to 3 | 1.8 to 2.8 | 2.0 | 2.2 | 2.4 |
| 969 | 37% | 62.5% | 0.5% | 0.8 to 3 | 1.8 to 2.8 | 2.0 | 2.2 | 2.4 |
| 970 | 38% | 61.5% | 0.5% | 0.8 to 3 | 1.8 to 2.8 | 2.0 | 2.2 | 2.4 |
| 971 | 39% | 60.5% | 0.5% | 0.8 to 3 | 1.8 to 2.8 | 2.0 | 2.2 | 2.4 |
| 972 | 40% | 59.5% | 0.5% | 0.8 to 3 | 1.8 to 2.8 | 2.0 | 2.2 | 2.4 |
| 973 | 41% | 58.5% | 0.5% | 0.8 to 3 | 1.8 to 2.8 | 2.0 | 2.2 | 2.4 |
| 974 | 42% | 57.5% | 0.5% | 0.8 to 3 | 1.8 to 2.8 | 2.0 | 2.2 | 2.4 |
| 975 | 43% | 56.5% | 0.5% | 0.8 to 3 | 1.8 to 2.8 | 2.0 | 2.2 | 2.4 |
| 976 | 44% | 55.5% | 0.5% | 0.8 to 3 | 1.8 to 2.8 | 2.0 | 2.2 | 2.4 |
| 977 | 45% | 54.5% | 0.5% | 0.8 to 3 | 1.8 to 2.8 | 2.0 | 2.2 | 2.4 |
| 978 | 46% | 53.5% | 0.5% | 0.8 to 3 | 1.8 to 2.8 | 2.0 | 2.2 | 2.4 |
| 979 | 47% | 52.5% | 0.5% | 0.8 to 3 | 1.8 to 2.8 | 2.0 | 2.2 | 2.4 |
| 980 | 48% | 51.5% | 0.5% | 0.8 to 3 | 1.8 to 2.8 | 2.0 | 2.2 | 2.4 |
| 981 | 49% | 50.5% | 0.5% | 0.8 to 3 | 1.8 to 2.8 | 2.0 | 2.2 | 2.4 |
| 982 | 50% | 49.5% | 0.5% | 0.8 to 3 | 1.8 to 2.8 | 2.0 | 2.2 | 2.4 |
| 983 | 51% | 48.5% | 0.5% | 0.8 to 3 | 1.8 to 2.8 | 2.0 | 2.2 | 2.4 |
| 984 | 52% | 47.5% | 0.5% | 0.8 to 3 | 1.8 to 2.8 | 2.0 | 2.2 | 2.4 |
| 985 | 53% | 46.5% | 0.5% | 0.8 to 3 | 1.8 to 2.8 | 2.0 | 2.2 | 2.4 |
| 986 | 54% | 45.5% | 0.5% | 0.8 to 3 | 1.8 to 2.8 | 2.0 | 2.2 | 2.4 |
| 987 | 55% | 44.5% | 0.5% | 0.8 to 3 | 1.8 to 2.8 | 2.0 | 2.2 | 2.4 |
| 988 | 56% | 43.5% | 0.5% | 0.8 to 3 | 1.8 to 2.8 | 2.0 | 2.2 | 2.4 |
| 989 | 57% | 42.5% | 0.5% | 0.8 to 3 | 1.8 to 2.8 | 2.0 | 2.2 | 2.4 |
| 990 | 58% | 41.5% | 0.5% | 0.8 to 3 | 1.8 to 2.8 | 2.0 | 2.2 | 2.4 |
| 991 | 59% | 40.5% | 0.5% | 0.8 to 3 | 1.8 to 2.8 | 2.0 | 2.2 | 2.4 |
| 992 | 60% | 39.5% | 0.5% | 0.8 to 3 | 1.8 to 2.8 | 2.0 | 2.2 | 2.4 |
| 993 | 30% | 69% | 1% | 0.8 to 3 | 1.8 to 2.8 | 2.0 | 2.2 | 2.4 |
| 994 | 31% | 68% | 1% | 0.8 to 3 | 1.8 to 2.8 | 2.0 | 2.2 | 2.4 |
| 995 | 32% | 67% | 1% | 0.8 to 3 | 1.8 to 2.8 | 2.0 | 2.2 | 2.4 |
| 996 | 33% | 66% | 1% | 0.8 to 3 | 1.8 to 2.8 | 2.0 | 2.2 | 2.4 |
| 997 | 34% | 65% | 1% | 0.8 to 3 | 1.8 to 2.8 | 2.0 | 2.2 | 2.4 |
| 998 | 35% | 64% | 1% | 0.8 to 3 | 1.8 to 2.8 | 2.0 | 2.2 | 2.4 |
| 999 | 36% | 63% | 1% | 0.8 to 3 | 1.8 to 2.8 | 2.0 | 2.2 | 2.4 |
| 1000 | 37% | 62% | 1% | 0.8 to 3 | 1.8 to 2.8 | 2.0 | 2.2 | 2.4 |
| 1001 | 38% | 61% | 1% | 0.8 to 3 | 1.8 to 2.8 | 2.0 | 2.2 | 2.4 |
| 1002 | 39% | 60% | 1% | 0.8 to 3 | 1.8 to 2.8 | 2.0 | 2.2 | 2.4 |
| 1003 | 40% | 59% | 1% | 0.8 to 3 | 1.8 to 2.8 | 2.0 | 2.2 | 2.4 |
| 1004 | 41% | 58% | 1% | 0.8 to 3 | 1.8 to 2.8 | 2.0 | 2.2 | 2.4 |
| 1005 | 42% | 57% | 1% | 0.8 to 3 | 1.8 to 2.8 | 2.0 | 2.2 | 2.4 |
| 1006 | 43% | 56% | 1% | 0.8 to 3 | 1.8 to 2.8 | 2.0 | 2.2 | 2.4 |
| 1007 | 44% | 55% | 1% | 0.8 to 3 | 1.8 to 2.8 | 2.0 | 2.2 | 2.4 |
| 1008 | 45% | 54% | 1% | 0.8 to 3 | 1.8 to 2.8 | 2.0 | 2.2 | 2.4 |
| 1009 | 46% | 53% | 1% | 0.8 to 3 | 1.8 to 2.8 | 2.0 | 2.2 | 2.4 |
| 1010 | 47% | 52% | 1% | 0.8 to 3 | 1.8 to 2.8 | 2.0 | 2.2 | 2.4 |
| 1011 | 48% | 51% | 1% | 0.8 to 3 | 1.8 to 2.8 | 2.0 | 2.2 | 2.4 |
| 1012 | 49% | 50% | 1% | 0.8 to 3 | 1.8 to 2.8 | 2.0 | 2.2 | 2.4 |
| 1013 | 50% | 49% | 1% | 0.8 to 3 | 1.8 to 2.8 | 2.0 | 2.2 | 2.4 |
| 1014 | 51% | 48% | 1% | 0.8 to 3 | 1.8 to 2.8 | 2.0 | 2.2 | 2.4 |
| 1015 | 52% | 47% | 1% | 0.8 to 3 | 1.8 to 2.8 | 2.0 | 2.2 | 2.4 |
| 1016 | 53% | 46% | 1% | 0.8 to 3 | 1.8 to 2.8 | 2.0 | 2.2 | 2.4 |
| 1017 | 54% | 45% | 1% | 0.8 to 3 | 1.8 to 2.8 | 2.0 | 2.2 | 2.4 |
| 1018 | 55% | 44% | 1% | 0.8 to 3 | 1.8 to 2.8 | 2.0 | 2.2 | 2.4 |
| 1019 | 56% | 43% | 1% | 0.8 to 3 | 1.8 to 2.8 | 2.0 | 2.2 | 2.4 |
| 1020 | 57% | 42% | 1% | 0.8 to 3 | 1.8 to 2.8 | 2.0 | 2.2 | 2.4 |
| 1021 | 58% | 41% | 1% | 0.8 to 3 | 1.8 to 2.8 | 2.0 | 2.2 | 2.4 |
| 1022 | 59% | 40% | 1% | 0.8 to 3 | 1.8 to 2.8 | 2.0 | 2.2 | 2.4 |
| 1023 | 60% | 39% | 1% | 0.8 to 3 | 1.8 to 2.8 | 2.0 | 2.2 | 2.4 |
| 1024 | 30% | 68.5% | 1.5% | 0.8 to 3 | 1.8 to 2.8 | 2.0 | 2.2 | 2.4 |
| 1025 | 31% | 67.5% | 1.5% | 0.8 to 3 | 1.8 to 2.8 | 2.0 | 2.2 | 2.4 |
| 1026 | 32% | 66.5% | 1.5% | 0.8 to 3 | 1.8 to 2.8 | 2.0 | 2.2 | 2.4 |
| 1027 | 33% | 65.5% | 1.5% | 0.8 to 3 | 1.8 to 2.8 | 2.0 | 2.2 | 2.4 |
| 1028 | 34% | 64.5% | 1.5% | 0.8 to 3 | 1.8 to 2.8 | 2.0 | 2.2 | 2.4 |
| 1029 | 35% | 63.5% | 1.5% | 0.8 to 3 | 1.8 to 2.8 | 2.0 | 2.2 | 2.4 |
| 1030 | 36% | 62.5% | 1.5% | 0.8 to 3 | 1.8 to 2.8 | 2.0 | 2.2 | 2.4 |
| 1031 | 37% | 61.5% | 1.5% | 0.8 to 3 | 1.8 to 2.8 | 2.0 | 2.2 | 2.4 |
| 1032 | 38% | 60.5% | 1.5% | 0.8 to 3 | 1.8 to 2.8 | 2.0 | 2.2 | 2.4 |
| 1033 | 39% | 59.5% | 1.5% | 0.8 to 3 | 1.8 to 2.8 | 2.0 | 2.2 | 2.4 |
| 1034 | 40% | 58.5% | 1.5% | 0.8 to 3 | 1.8 to 2.8 | 2.0 | 2.2 | 2.4 |
| 1035 | 41% | 57.5% | 1.5% | 0.8 to 3 | 1.8 to 2.8 | 2.0 | 2.2 | 2.4 |
| 1036 | 42% | 56.5% | 1.5% | 0.8 to 3 | 1.8 to 2.8 | 2.0 | 2.2 | 2.4 |

TABLE 3-continued

| | Alkyl Sulfate | | Alkyl Ether Sulfate | | | | | |
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
| --- | --- | --- | --- | --- | --- | --- | --- | --- |
| 1037 | 43% | 55.5% | 1.5% | 0.8 to 3 | 1.8 to 2.8 | 2.0 | 2.2 | 2.4 |
| 1038 | 44% | 54.5% | 1.5% | 0.8 to 3 | 1.8 to 2.8 | 2.0 | 2.2 | 2.4 |
| 1039 | 45% | 53.5% | 1.5% | 0.8 to 3 | 1.8 to 2.8 | 2.0 | 2.2 | 2.4 |
| 1040 | 46% | 52.5% | 1.5% | 0.8 to 3 | 1.8 to 2.8 | 2.0 | 2.2 | 2.4 |
| 1041 | 47% | 51.5% | 1.5% | 0.8 to 3 | 1.8 to 2.8 | 2.0 | 2.2 | 2.4 |
| 1042 | 48% | 50.5% | 1.5% | 0.8 to 3 | 1.8 to 2.8 | 2.0 | 2.2 | 2.4 |
| 1043 | 49% | 49.5% | 1.5% | 0.8 to 3 | 1.8 to 2.8 | 2.0 | 2.2 | 2.4 |
| 1044 | 50% | 48.5% | 1.5% | 0.8 to 3 | 1.8 to 2.8 | 2.0 | 2.2 | 2.4 |
| 1045 | 51% | 47.5% | 1.5% | 0.8 to 3 | 1.8 to 2.8 | 2.0 | 2.2 | 2.4 |
| 1046 | 52% | 46.5% | 1.5% | 0.8 to 3 | 1.8 to 2.8 | 2.0 | 2.2 | 2.4 |
| 1047 | 53% | 45.5% | 1.5% | 0.8 to 3 | 1.8 to 2.8 | 2.0 | 2.2 | 2.4 |
| 1048 | 54% | 44.5% | 1.5% | 0.8 to 3 | 1.8 to 2.8 | 2.0 | 2.2 | 2.4 |
| 1049 | 55% | 43.5% | 1.5% | 0.8 to 3 | 1.8 to 2.8 | 2.0 | 2.2 | 2.4 |
| 1050 | 56% | 42.5% | 1.5% | 0.8 to 3 | 1.8 to 2.8 | 2.0 | 2.2 | 2.4 |
| 1051 | 57% | 41.5% | 1.5% | 0.8 to 3 | 1.8 to 2.8 | 2.0 | 2.2 | 2.4 |
| 1052 | 58% | 40.5% | 1.5% | 0.8 to 3 | 1.8 to 2.8 | 2.0 | 2.2 | 2.4 |
| 1053 | 59% | 39.5% | 1.5% | 0.8 to 3 | 1.8 to 2.8 | 2.0 | 2.2 | 2.4 |
| 1054 | 60% | 38.5% | 1.5% | 0.8 to 3 | 1.8 to 2.8 | 2.0 | 2.2 | 2.4 |
| 1055 | 30% | 68% | 2% | 0.8 to 3 | 1.8 to 2.8 | 2.0 | 2.2 | 2.4 |
| 1056 | 31% | 67% | 2% | 0.8 to 3 | 1.8 to 2.8 | 2.0 | 2.2 | 2.4 |
| 1057 | 32% | 66% | 2% | 0.8 to 3 | 1.8 to 2.8 | 2.0 | 2.2 | 2.4 |
| 1058 | 33% | 65% | 2% | 0.8 to 3 | 1.8 to 2.8 | 2.0 | 2.2 | 2.4 |
| 1059 | 34% | 64% | 2% | 0.8 to 3 | 1.8 to 2.8 | 2.0 | 2.2 | 2.4 |
| 1060 | 35% | 63% | 2% | 0.8 to 3 | 1.8 to 2.8 | 2.0 | 2.2 | 2.4 |
| 1061 | 36% | 62% | 2% | 0.8 to 3 | 1.8 to 2.8 | 2.0 | 2.2 | 2.4 |
| 1062 | 37% | 61% | 2% | 0.8 to 3 | 1.8 to 2.8 | 2.0 | 2.2 | 2.4 |
| 1063 | 38% | 60% | 2% | 0.8 to 3 | 1.8 to 2.8 | 2.0 | 2.2 | 2.4 |
| 1064 | 39% | 59% | 2% | 0.8 to 3 | 1.8 to 2.8 | 2.0 | 2.2 | 2.4 |
| 1065 | 40% | 58% | 2% | 0.8 to 3 | 1.8 to 2.8 | 2.0 | 2.2 | 2.4 |
| 1066 | 41% | 57% | 2% | 0.8 to 3 | 1.8 to 2.8 | 2.0 | 2.2 | 2.4 |
| 1067 | 42% | 56% | 2% | 0.8 to 3 | 1.8 to 2.8 | 2.0 | 2.2 | 2.4 |
| 1068 | 43% | 55% | 2% | 0.8 to 3 | 1.8 to 2.8 | 2.0 | 2.2 | 2.4 |
| 1069 | 44% | 54% | 2% | 0.8 to 3 | 1.8 to 2.8 | 2.0 | 2.2 | 2.4 |
| 1070 | 45% | 53% | 2% | 0.8 to 3 | 1.8 to 2.8 | 2.0 | 2.2 | 2.4 |
| 1071 | 46% | 52% | 2% | 0.8 to 3 | 1.8 to 2.8 | 2.0 | 2.2 | 2.4 |
| 1072 | 47% | 51% | 2% | 0.8 to 3 | 1.8 to 2.8 | 2.0 | 2.2 | 2.4 |
| 1073 | 48% | 50% | 2% | 0.8 to 3 | 1.8 to 2.8 | 2.0 | 2.2 | 2.4 |
| 1074 | 49% | 49% | 2% | 0.8 to 3 | 1.8 to 2.8 | 2.0 | 2.2 | 2.4 |
| 1075 | 50% | 48% | 2% | 0.8 to 3 | 1.8 to 2.8 | 2.0 | 2.2 | 2.4 |
| 1076 | 51% | 47% | 2% | 0.8 to 3 | 1.8 to 2.8 | 2.0 | 2.2 | 2.4 |
| 1077 | 52% | 46% | 2% | 0.8 to 3 | 1.8 to 2.8 | 2.0 | 2.2 | 2.4 |
| 1078 | 53% | 45% | 2% | 0.8 to 3 | 1.8 to 2.8 | 2.0 | 2.2 | 2.4 |
| 1079 | 54% | 44% | 2% | 0.8 to 3 | 1.8 to 2.8 | 2.0 | 2.2 | 2.4 |
| 1080 | 55% | 43% | 2% | 0.8 to 3 | 1.8 to 2.8 | 2.0 | 2.2 | 2.4 |
| 1081 | 56% | 42% | 2% | 0.8 to 3 | 1.8 to 2.8 | 2.0 | 2.2 | 2.4 |
| 1082 | 57% | 41% | 2% | 0.8 to 3 | 1.8 to 2.8 | 2.0 | 2.2 | 2.4 |
| 1083 | 58% | 40% | 2% | 0.8 to 3 | 1.8 to 2.8 | 2.0 | 2.2 | 2.4 |
| 1084 | 59% | 39% | 2% | 0.8 to 3 | 1.8 to 2.8 | 2.0 | 2.2 | 2.4 |
| 1085 | 60% | 38% | 2% | 0.8 to 3 | 1.8 to 2.8 | 2.0 | 2.2 | 2.4 |
| 1086 | 30% | 67.5% | 2.5% | 0.8 to 3 | 1.8 to 2.8 | 2.0 | 2.2 | 2.4 |
| 1087 | 31% | 66.5% | 2.5% | 0.8 to 3 | 1.8 to 2.8 | 2.0 | 2.2 | 2.4 |
| 1088 | 32% | 65.5% | 2.5% | 0.8 to 3 | 1.8 to 2.8 | 2.0 | 2.2 | 2.4 |
| 1089 | 33% | 64.5% | 2.5% | 0.8 to 3 | 1.8 to 2.8 | 2.0 | 2.2 | 2.4 |
| 1090 | 34% | 63.5% | 2.5% | 0.8 to 3 | 1.8 to 2.8 | 2.0 | 2.2 | 2.4 |
| 1091 | 35% | 62.5% | 2.5% | 0.8 to 3 | 1.8 to 2.8 | 2.0 | 2.2 | 2.4 |
| 1092 | 36% | 61.5% | 2.5% | 0.8 to 3 | 1.8 to 2.8 | 2.0 | 2.2 | 2.4 |
| 1093 | 37% | 60.5% | 2.5% | 0.8 to 3 | 1.8 to 2.8 | 2.0 | 2.2 | 2.4 |
| 1094 | 38% | 59.5% | 2.5% | 0.8 to 3 | 1.8 to 2.8 | 2.0 | 2.2 | 2.4 |
| 1095 | 39% | 58.5% | 2.5% | 0.8 to 3 | 1.8 to 2.8 | 2.0 | 2.2 | 2.4 |
| 1096 | 40% | 57.5% | 2.5% | 0.8 to 3 | 1.8 to 2.8 | 2.0 | 2.2 | 2.4 |
| 1097 | 41% | 56.5% | 2.5% | 0.8 to 3 | 1.8 to 2.8 | 2.0 | 2.2 | 2.4 |
| 1098 | 42% | 55.5% | 2.5% | 0.8 to 3 | 1.8 to 2.8 | 2.0 | 2.2 | 2.4 |
| 1099 | 43% | 54.5% | 2.5% | 0.8 to 3 | 1.8 to 2.8 | 2.0 | 2.2 | 2.4 |
| 1100 | 44% | 53.5% | 2.5% | 0.8 to 3 | 1.8 to 2.8 | 2.0 | 2.2 | 2.4 |
| 1101 | 45% | 52.5% | 2.5% | 0.8 to 3 | 1.8 to 2.8 | 2.0 | 2.2 | 2.4 |
| 1102 | 46% | 51.5% | 2.5% | 0.8 to 3 | 1.8 to 2.8 | 2.0 | 2.2 | 2.4 |
| 1103 | 47% | 50.5% | 2.5% | 0.8 to 3 | 1.8 to 2.8 | 2.0 | 2.2 | 2.4 |
| 1104 | 48% | 49.5% | 2.5% | 0.8 to 3 | 1.8 to 2.8 | 2.0 | 2.2 | 2.4 |
| 1105 | 49% | 48.5% | 2.5% | 0.8 to 3 | 1.8 to 2.8 | 2.0 | 2.2 | 2.4 |
| 1106 | 50% | 47.5% | 2.5% | 0.8 to 3 | 1.8 to 2.8 | 2.0 | 2.2 | 2.4 |
| 1107 | 51% | 46.5% | 2.5% | 0.8 to 3 | 1.8 to 2.8 | 2.0 | 2.2 | 2.4 |
| 1108 | 52% | 45.5% | 2.5% | 0.8 to 3 | 1.8 to 2.8 | 2.0 | 2.2 | 2.4 |
| 1109 | 53% | 44.5% | 2.5% | 0.8 to 3 | 1.8 to 2.8 | 2.0 | 2.2 | 2.4 |

TABLE 3-continued

| | Alkyl Sulfate | | Alkyl Ether Sulfate | | | | | |
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
|---|---|---|---|---|---|---|---|---|
| 1110 | 54% | 43.5% | 2.5% | 0.8 to 3 | 1.8 to 2.8 | 2.0 | 2.2 | 2.4 |
| 1111 | 55% | 42.5% | 2.5% | 0.8 to 3 | 1.8 to 2.8 | 2.0 | 2.2 | 2.4 |
| 1112 | 56% | 41.5% | 2.5% | 0.8 to 3 | 1.8 to 2.8 | 2.0 | 2.2 | 2.4 |
| 1113 | 57% | 40.5% | 2.5% | 0.8 to 3 | 1.8 to 2.8 | 2.0 | 2.2 | 2.4 |
| 1114 | 58% | 39.5% | 2.5% | 0.8 to 3 | 1.8 to 2.8 | 2.0 | 2.2 | 2.4 |
| 1115 | 59% | 38.5% | 2.5% | 0.8 to 3 | 1.8 to 2.8 | 2.0 | 2.2 | 2.4 |
| 1116 | 60% | 37.5% | 2.5% | 0.8 to 3 | 1.8 to 2.8 | 2.0 | 2.2 | 2.4 |
| 1117 | 30% | 67% | 3% | 0.8 to 3 | 1.8 to 2.8 | 2.0 | 2.2 | 2.4 |
| 1118 | 31% | 66% | 3% | 0.8 to 3 | 1.8 to 2.8 | 2.0 | 2.2 | 2.4 |
| 1119 | 32% | 65% | 3% | 0.8 to 3 | 1.8 to 2.8 | 2.0 | 2.2 | 2.4 |
| 1120 | 33% | 64% | 3% | 0.8 to 3 | 1.8 to 2.8 | 2.0 | 2.2 | 2.4 |
| 1121 | 34% | 63% | 3% | 0.8 to 3 | 1.8 to 2.8 | 2.0 | 2.2 | 2.4 |
| 1122 | 35% | 62% | 3% | 0.8 to 3 | 1.8 to 2.8 | 2.0 | 2.2 | 2.4 |
| 1123 | 36% | 61% | 3% | 0.8 to 3 | 1.8 to 2.8 | 2.0 | 2.2 | 2.4 |
| 1124 | 37% | 60% | 3% | 0.8 to 3 | 1.8 to 2.8 | 2.0 | 2.2 | 2.4 |
| 1125 | 38% | 59% | 3% | 0.8 to 3 | 1.8 to 2.8 | 2.0 | 2.2 | 2.4 |
| 1126 | 39% | 58% | 3% | 0.8 to 3 | 1.8 to 2.8 | 2.0 | 2.2 | 2.4 |
| 1127 | 40% | 57% | 3% | 0.8 to 3 | 1.8 to 2.8 | 2.0 | 2.2 | 2.4 |
| 1128 | 41% | 56% | 3% | 0.8 to 3 | 1.8 to 2.8 | 2.0 | 2.2 | 2.4 |
| 1129 | 42% | 55% | 3% | 0.8 to 3 | 1.8 to 2.8 | 2.0 | 2.2 | 2.4 |
| 1130 | 43% | 54% | 3% | 0.8 to 3 | 1.8 to 2.8 | 2.0 | 2.2 | 2.4 |
| 1131 | 44% | 53% | 3% | 0.8 to 3 | 1.8 to 2.8 | 2.0 | 2.2 | 2.4 |
| 1132 | 45% | 52% | 3% | 0.8 to 3 | 1.8 to 2.8 | 2.0 | 2.2 | 2.4 |
| 1133 | 46% | 51% | 3% | 0.8 to 3 | 1.8 to 2.8 | 2.0 | 2.2 | 2.4 |
| 1134 | 47% | 50% | 3% | 0.8 to 3 | 1.8 to 2.8 | 2.0 | 2.2 | 2.4 |
| 1135 | 48% | 49% | 3% | 0.8 to 3 | 1.8 to 2.8 | 2.0 | 2.2 | 2.4 |
| 1136 | 49% | 48% | 3% | 0.8 to 3 | 1.8 to 2.8 | 2.0 | 2.2 | 2.4 |
| 1137 | 50% | 47% | 3% | 0.8 to 3 | 1.8 to 2.8 | 2.0 | 2.2 | 2.4 |
| 1138 | 51% | 46% | 3% | 0.8 to 3 | 1.8 to 2.8 | 2.0 | 2.2 | 2.4 |
| 1139 | 52% | 45% | 3% | 0.8 to 3 | 1.8 to 2.8 | 2.0 | 2.2 | 2.4 |
| 1140 | 53% | 44% | 3% | 0.8 to 3 | 1.8 to 2.8 | 2.0 | 2.2 | 2.4 |
| 1141 | 54% | 43% | 3% | 0.8 to 3 | 1.8 to 2.8 | 2.0 | 2.2 | 2.4 |
| 1142 | 55% | 42% | 3% | 0.8 to 3 | 1.8 to 2.8 | 2.0 | 2.2 | 2.4 |
| 1143 | 56% | 41% | 3% | 0.8 to 3 | 1.8 to 2.8 | 2.0 | 2.2 | 2.4 |
| 1144 | 57% | 40% | 3% | 0.8 to 3 | 1.8 to 2.8 | 2.0 | 2.2 | 2.4 |
| 1145 | 58% | 39% | 3% | 0.8 to 3 | 1.8 to 2.8 | 2.0 | 2.2 | 2.4 |
| 1146 | 59% | 38% | 3% | 0.8 to 3 | 1.8 to 2.8 | 2.0 | 2.2 | 2.4 |
| 1147 | 60% | 37% | 3% | 0.8 to 3 | 1.8 to 2.8 | 2.0 | 2.2 | 2.4 |
| 1148 | 30% | 66.5% | 3.5% | 0.8 to 3 | 1.8 to 2.8 | 2.0 | 2.2 | 2.4 |
| 1149 | 31% | 65.5% | 3.5% | 0.8 to 3 | 1.8 to 2.8 | 2.0 | 2.2 | 2.4 |
| 1150 | 32% | 64.5% | 3.5% | 0.8 to 3 | 1.8 to 2.8 | 2.0 | 2.2 | 2.4 |
| 1151 | 33% | 63.5% | 3.5% | 0.8 to 3 | 1.8 to 2.8 | 2.0 | 2.2 | 2.4 |
| 1152 | 34% | 62.5% | 3.5% | 0.8 to 3 | 1.8 to 2.8 | 2.0 | 2.2 | 2.4 |
| 1153 | 35% | 61.5% | 3.5% | 0.8 to 3 | 1.8 to 2.8 | 2.0 | 2.2 | 2.4 |
| 1154 | 36% | 60.5% | 3.5% | 0.8 to 3 | 1.8 to 2.8 | 2.0 | 2.2 | 2.4 |
| 1155 | 37% | 59.5% | 3.5% | 0.8 to 3 | 1.8 to 2.8 | 2.0 | 2.2 | 2.4 |
| 1156 | 38% | 58.5% | 3.5% | 0.8 to 3 | 1.8 to 2.8 | 2.0 | 2.2 | 2.4 |
| 1157 | 39% | 57.5% | 3.5% | 0.8 to 3 | 1.8 to 2.8 | 2.0 | 2.2 | 2.4 |
| 1158 | 40% | 56.5% | 3.5% | 0.8 to 3 | 1.8 to 2.8 | 2.0 | 2.2 | 2.4 |
| 1159 | 41% | 55.5% | 3.5% | 0.8 to 3 | 1.8 to 2.8 | 2.0 | 2.2 | 2.4 |
| 1160 | 42% | 54.5% | 3.5% | 0.8 to 3 | 1.8 to 2.8 | 2.0 | 2.2 | 2.4 |
| 1161 | 43% | 53.5% | 3.5% | 0.8 to 3 | 1.8 to 2.8 | 2.0 | 2.2 | 2.4 |
| 1162 | 44% | 52.5% | 3.5% | 0.8 to 3 | 1.8 to 2.8 | 2.0 | 2.2 | 2.4 |
| 1163 | 45% | 51.5% | 3.5% | 0.8 to 3 | 1.8 to 2.8 | 2.0 | 2.2 | 2.4 |
| 1164 | 46% | 50.5% | 3.5% | 0.8 to 3 | 1.8 to 2.8 | 2.0 | 2.2 | 2.4 |
| 1165 | 47% | 49.5% | 3.5% | 0.8 to 3 | 1.8 to 2.8 | 2.0 | 2.2 | 2.4 |
| 1166 | 48% | 48.5% | 3.5% | 0.8 to 3 | 1.8 to 2.8 | 2.0 | 2.2 | 2.4 |
| 1167 | 49% | 47.5% | 3.5% | 0.8 to 3 | 1.8 to 2.8 | 2.0 | 2.2 | 2.4 |
| 1168 | 50% | 46.5% | 3.5% | 0.8 to 3 | 1.8 to 2.8 | 2.0 | 2.2 | 2.4 |
| 1169 | 51% | 45.5% | 3.5% | 0.8 to 3 | 1.8 to 2.8 | 2.0 | 2.2 | 2.4 |
| 1170 | 52% | 44.5% | 3.5% | 0.8 to 3 | 1.8 to 2.8 | 2.0 | 2.2 | 2.4 |
| 1171 | 53% | 43.5% | 3.5% | 0.8 to 3 | 1.8 to 2.8 | 2.0 | 2.2 | 2.4 |
| 1172 | 54% | 42.5% | 3.5% | 0.8 to 3 | 1.8 to 2.8 | 2.0 | 2.2 | 2.4 |
| 1173 | 55% | 41.5% | 3.5% | 0.8 to 3 | 1.8 to 2.8 | 2.0 | 2.2 | 2.4 |
| 1174 | 56% | 40.5% | 3.5% | 0.8 to 3 | 1.8 to 2.8 | 2.0 | 2.2 | 2.4 |
| 1175 | 57% | 39.5% | 3.5% | 0.8 to 3 | 1.8 to 2.8 | 2.0 | 2.2 | 2.4 |
| 1176 | 58% | 38.5% | 3.5% | 0.8 to 3 | 1.8 to 2.8 | 2.0 | 2.2 | 2.4 |
| 1177 | 59% | 37.5% | 3.5% | 0.8 to 3 | 1.8 to 2.8 | 2.0 | 2.2 | 2.4 |
| 1178 | 60% | 36.5% | 3.5% | 0.8 to 3 | 1.8 to 2.8 | 2.0 | 2.2 | 2.4 |
| 1179 | 30% | 66% | 4% | 0.8 to 3 | 1.8 to 2.8 | 2.0 | 2.2 | 2.4 |
| 1180 | 31% | 65% | 4% | 0.8 to 3 | 1.8 to 2.8 | 2.0 | 2.2 | 2.4 |
| 1181 | 32% | 64% | 4% | 0.8 to 3 | 1.8 to 2.8 | 2.0 | 2.2 | 2.4 |
| 1182 | 33% | 63% | 4% | 0.8 to 3 | 1.8 to 2.8 | 2.0 | 2.2 | 2.4 |

TABLE 3-continued

| | Alkyl Sulfate | | Alkyl Ether Sulfate | | | | | |
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
| --- | --- | --- | --- | --- | --- | --- | --- | --- |
| 1183 | 34% | 62% | 4% | 0.8 to 3 | 1.8 to 2.8 | 2.0 | 2.2 | 2.4 |
| 1184 | 35% | 61% | 4% | 0.8 to 3 | 1.8 to 2.8 | 2.0 | 2.2 | 2.4 |
| 1185 | 36% | 60% | 4% | 0.8 to 3 | 1.8 to 2.8 | 2.0 | 2.2 | 2.4 |
| 1186 | 37% | 59% | 4% | 0.8 to 3 | 1.8 to 2.8 | 2.0 | 2.2 | 2.4 |
| 1187 | 38% | 58% | 4% | 0.8 to 3 | 1.8 to 2.8 | 2.0 | 2.2 | 2.4 |
| 1188 | 39% | 57% | 4% | 0.8 to 3 | 1.8 to 2.8 | 2.0 | 2.2 | 2.4 |
| 1189 | 40% | 56% | 4% | 0.8 to 3 | 1.8 to 2.8 | 2.0 | 2.2 | 2.4 |
| 1190 | 41% | 55% | 4% | 0.8 to 3 | 1.8 to 2.8 | 2.0 | 2.2 | 2.4 |
| 1191 | 42% | 54% | 4% | 0.8 to 3 | 1.8 to 2.8 | 2.0 | 2.2 | 2.4 |
| 1192 | 43% | 53% | 4% | 0.8 to 3 | 1.8 to 2.8 | 2.0 | 2.2 | 2.4 |
| 1193 | 44% | 52% | 4% | 0.8 to 3 | 1.8 to 2.8 | 2.0 | 2.2 | 2.4 |
| 1194 | 45% | 51% | 4% | 0.8 to 3 | 1.8 to 2.8 | 2.0 | 2.2 | 2.4 |
| 1195 | 46% | 50% | 4% | 0.8 to 3 | 1.8 to 2.8 | 2.0 | 2.2 | 2.4 |
| 1196 | 47% | 49% | 4% | 0.8 to 3 | 1.8 to 2.8 | 2.0 | 2.2 | 2.4 |
| 1197 | 48% | 48% | 4% | 0.8 to 3 | 1.8 to 2.8 | 2.0 | 2.2 | 2.4 |
| 1198 | 49% | 47% | 4% | 0.8 to 3 | 1.8 to 2.8 | 2.0 | 2.2 | 2.4 |
| 1199 | 50% | 46% | 4% | 0.8 to 3 | 1.8 to 2.8 | 2.0 | 2.2 | 2.4 |
| 1200 | 51% | 45% | 4% | 0.8 to 3 | 1.8 to 2.8 | 2.0 | 2.2 | 2.4 |
| 1201 | 52% | 44% | 4% | 0.8 to 3 | 1.8 to 2.8 | 2.0 | 2.2 | 2.4 |
| 1202 | 53% | 43% | 4% | 0.8 to 3 | 1.8 to 2.8 | 2.0 | 2.2 | 2.4 |
| 1203 | 54% | 42% | 4% | 0.8 to 3 | 1.8 to 2.8 | 2.0 | 2.2 | 2.4 |
| 1204 | 55% | 41% | 4% | 0.8 to 3 | 1.8 to 2.8 | 2.0 | 2.2 | 2.4 |
| 1205 | 56% | 40% | 4% | 0.8 to 3 | 1.8 to 2.8 | 2.0 | 2.2 | 2.4 |
| 1206 | 57% | 39% | 4% | 0.8 to 3 | 1.8 to 2.8 | 2.0 | 2.2 | 2.4 |
| 1207 | 58% | 38% | 4% | 0.8 to 3 | 1.8 to 2.8 | 2.0 | 2.2 | 2.4 |
| 1208 | 59% | 37% | 4% | 0.8 to 3 | 1.8 to 2.8 | 2.0 | 2.2 | 2.4 |
| 1209 | 60% | 36% | 4% | 0.8 to 3 | 1.8 to 2.8 | 2.0 | 2.2 | 2.4 |
| 1210 | 30% | 65.5% | 4.5% | 0.8 to 3 | 1.8 to 2.8 | 2.0 | 2.2 | 2.4 |
| 1211 | 31% | 64.5% | 4.5% | 0.8 to 3 | 1.8 to 2.8 | 2.0 | 2.2 | 2.4 |
| 1212 | 32% | 63.5% | 4.5% | 0.8 to 3 | 1.8 to 2.8 | 2.0 | 2.2 | 2.4 |
| 1213 | 33% | 62.5% | 4.5% | 0.8 to 3 | 1.8 to 2.8 | 2.0 | 2.2 | 2.4 |
| 1214 | 34% | 61.5% | 4.5% | 0.8 to 3 | 1.8 to 2.8 | 2.0 | 2.2 | 2.4 |
| 1215 | 35% | 60.5% | 4.5% | 0.8 to 3 | 1.8 to 2.8 | 2.0 | 2.2 | 2.4 |
| 1216 | 36% | 59.5% | 4.5% | 0.8 to 3 | 1.8 to 2.8 | 2.0 | 2.2 | 2.4 |
| 1217 | 37% | 58.5% | 4.5% | 0.8 to 3 | 1.8 to 2.8 | 2.0 | 2.2 | 2.4 |
| 1218 | 38% | 57.5% | 4.5% | 0.8 to 3 | 1.8 to 2.8 | 2.0 | 2.2 | 2.4 |
| 1219 | 39% | 56.5% | 4.5% | 0.8 to 3 | 1.8 to 2.8 | 2.0 | 2.2 | 2.4 |
| 1220 | 40% | 55.5% | 4.5% | 0.8 to 3 | 1.8 to 2.8 | 2.0 | 2.2 | 2.4 |
| 1221 | 41% | 54.5% | 4.5% | 0.8 to 3 | 1.8 to 2.8 | 2.0 | 2.2 | 2.4 |
| 1222 | 42% | 53.5% | 4.5% | 0.8 to 3 | 1.8 to 2.8 | 2.0 | 2.2 | 2.4 |
| 1223 | 43% | 52.5% | 4.5% | 0.8 to 3 | 1.8 to 2.8 | 2.0 | 2.2 | 2.4 |
| 1224 | 44% | 51.5% | 4.5% | 0.8 to 3 | 1.8 to 2.8 | 2.0 | 2.2 | 2.4 |
| 1225 | 45% | 50.5% | 4.5% | 0.8 to 3 | 1.8 to 2.8 | 2.0 | 2.2 | 2.4 |
| 1226 | 46% | 49.5% | 4.5% | 0.8 to 3 | 1.8 to 2.8 | 2.0 | 2.2 | 2.4 |
| 1227 | 47% | 48.5% | 4.5% | 0.8 to 3 | 1.8 to 2.8 | 2.0 | 2.2 | 2.4 |
| 1228 | 48% | 47.5% | 4.5% | 0.8 to 3 | 1.8 to 2.8 | 2.0 | 2.2 | 2.4 |
| 1229 | 49% | 46.5% | 4.5% | 0.8 to 3 | 1.8 to 2.8 | 2.0 | 2.2 | 2.4 |
| 1230 | 50% | 45.5% | 4.5% | 0.8 to 3 | 1.8 to 2.8 | 2.0 | 2.2 | 2.4 |
| 1231 | 51% | 44.5% | 4.5% | 0.8 to 3 | 1.8 to 2.8 | 2.0 | 2.2 | 2.4 |
| 1232 | 52% | 43.5% | 4.5% | 0.8 to 3 | 1.8 to 2.8 | 2.0 | 2.2 | 2.4 |
| 1233 | 53% | 42.5% | 4.5% | 0.8 to 3 | 1.8 to 2.8 | 2.0 | 2.2 | 2.4 |
| 1234 | 54% | 41.5% | 4.5% | 0.8 to 3 | 1.8 to 2.8 | 2.0 | 2.2 | 2.4 |
| 1235 | 55% | 40.5% | 4.5% | 0.8 to 3 | 1.8 to 2.8 | 2.0 | 2.2 | 2.4 |
| 1236 | 56% | 39.5% | 4.5% | 0.8 to 3 | 1.8 to 2.8 | 2.0 | 2.2 | 2.4 |
| 1237 | 57% | 38.5% | 4.5% | 0.8 to 3 | 1.8 to 2.8 | 2.0 | 2.2 | 2.4 |
| 1238 | 58% | 37.5% | 4.5% | 0.8 to 3 | 1.8 to 2.8 | 2.0 | 2.2 | 2.4 |
| 1239 | 59% | 36.5% | 4.5% | 0.8 to 3 | 1.8 to 2.8 | 2.0 | 2.2 | 2.4 |
| 1240 | 60% | 35.5% | 4.5% | 0.8 to 3 | 1.8 to 2.8 | 2.0 | 2.2 | 2.4 |
| 1241 | 30% | 65% | 5% | 0.8 to 3 | 1.8 to 2.8 | 2.0 | 2.2 | 2.4 |
| 1242 | 31% | 64% | 5% | 0.8 to 3 | 1.8 to 2.8 | 2.0 | 2.2 | 2.4 |
| 1243 | 32% | 63% | 5% | 0.8 to 3 | 1.8 to 2.8 | 2.0 | 2.2 | 2.4 |
| 1244 | 33% | 62% | 5% | 0.8 to 3 | 1.8 to 2.8 | 2.0 | 2.2 | 2.4 |
| 1245 | 34% | 61% | 5% | 0.8 to 3 | 1.8 to 2.8 | 2.0 | 2.2 | 2.4 |
| 1246 | 35% | 60% | 5% | 0.8 to 3 | 1.8 to 2.8 | 2.0 | 2.2 | 2.4 |
| 1247 | 36% | 59% | 5% | 0.8 to 3 | 1.8 to 2.8 | 2.0 | 2.2 | 2.4 |
| 1248 | 37% | 58% | 5% | 0.8 to 3 | 1.8 to 2.8 | 2.0 | 2.2 | 2.4 |
| 1249 | 38% | 57% | 5% | 0.8 to 3 | 1.8 to 2.8 | 2.0 | 2.2 | 2.4 |
| 1250 | 39% | 56% | 5% | 0.8 to 3 | 1.8 to 2.8 | 2.0 | 2.2 | 2.4 |
| 1251 | 40% | 55% | 5% | 0.8 to 3 | 1.8 to 2.8 | 2.0 | 2.2 | 2.4 |
| 1252 | 41% | 54% | 5% | 0.8 to 3 | 1.8 to 2.8 | 2.0 | 2.2 | 2.4 |
| 1253 | 42% | 53% | 5% | 0.8 to 3 | 1.8 to 2.8 | 2.0 | 2.2 | 2.4 |
| 1254 | 43% | 52% | 5% | 0.8 to 3 | 1.8 to 2.8 | 2.0 | 2.2 | 2.4 |
| 1255 | 44% | 51% | 5% | 0.8 to 3 | 1.8 to 2.8 | 2.0 | 2.2 | 2.4 |

TABLE 3-continued

| | Alkyl Sulfate | | Alkyl Ether Sulfate | | | | | |
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
| --- | --- | --- | --- | --- | --- | --- | --- | --- |
| 1256 | 45% | 50% | 5% | 0.8 to 3 | 1.8 to 2.8 | 2.0 | 2.2 | 2.4 |
| 1257 | 46% | 49% | 5% | 0.8 to 3 | 1.8 to 2.8 | 2.0 | 2.2 | 2.4 |
| 1258 | 47% | 48% | 5% | 0.8 to 3 | 1.8 to 2.8 | 2.0 | 2.2 | 2.4 |
| 1259 | 48% | 47% | 5% | 0.8 to 3 | 1.8 to 2.8 | 2.0 | 2.2 | 2.4 |
| 1260 | 49% | 46% | 5% | 0.8 to 3 | 1.8 to 2.8 | 2.0 | 2.2 | 2.4 |
| 1261 | 50% | 45% | 5% | 0.8 to 3 | 1.8 to 2.8 | 2.0 | 2.2 | 2.4 |
| 1262 | 51% | 44% | 5% | 0.8 to 3 | 1.8 to 2.8 | 2.0 | 2.2 | 2.4 |
| 1263 | 52% | 43% | 5% | 0.8 to 3 | 1.8 to 2.8 | 2.0 | 2.2 | 2.4 |
| 1264 | 53% | 42% | 5% | 0.8 to 3 | 1.8 to 2.8 | 2.0 | 2.2 | 2.4 |
| 1265 | 54% | 41% | 5% | 0.8 to 3 | 1.8 to 2.8 | 2.0 | 2.2 | 2.4 |
| 1266 | 55% | 40% | 5% | 0.8 to 3 | 1.8 to 2.8 | 2.0 | 2.2 | 2.4 |
| 1267 | 56% | 39% | 5% | 0.8 to 3 | 1.8 to 2.8 | 2.0 | 2.2 | 2.4 |
| 1268 | 57% | 38% | 5% | 0.8 to 3 | 1.8 to 2.8 | 2.0 | 2.2 | 2.4 |
| 1269 | 58% | 37% | 5% | 0.8 to 3 | 1.8 to 2.8 | 2.0 | 2.2 | 2.4 |
| 1270 | 59% | 36% | 5% | 0.8 to 3 | 1.8 to 2.8 | 2.0 | 2.2 | 2.4 |
| 1271 | 60% | 35% | 5% | 0.8 to 3 | 1.8 to 2.8 | 2.0 | 2.2 | 2.4 |
| 1272 | 30% | 64.5% | 5.5% | 0.8 to 3 | 1.8 to 2.8 | 2.0 | 2.2 | 2.4 |
| 1273 | 31% | 63.5% | 5.5% | 0.8 to 3 | 1.8 to 2.8 | 2.0 | 2.2 | 2.4 |
| 1274 | 32% | 62.5% | 5.5% | 0.8 to 3 | 1.8 to 2.8 | 2.0 | 2.2 | 2.4 |
| 1275 | 33% | 61.5% | 5.5% | 0.8 to 3 | 1.8 to 2.8 | 2.0 | 2.2 | 2.4 |
| 1276 | 34% | 60.5% | 5.5% | 0.8 to 3 | 1.8 to 2.8 | 2.0 | 2.2 | 2.4 |
| 1277 | 35% | 59.5% | 5.5% | 0.8 to 3 | 1.8 to 2.8 | 2.0 | 2.2 | 2.4 |
| 1278 | 36% | 58.5% | 5.5% | 0.8 to 3 | 1.8 to 2.8 | 2.0 | 2.2 | 2.4 |
| 1279 | 37% | 57.5% | 5.5% | 0.8 to 3 | 1.8 to 2.8 | 2.0 | 2.2 | 2.4 |
| 1280 | 38% | 56.5% | 5.5% | 0.8 to 3 | 1.8 to 2.8 | 2.0 | 2.2 | 2.4 |
| 1281 | 39% | 55.5% | 5.5% | 0.8 to 3 | 1.8 to 2.8 | 2.0 | 2.2 | 2.4 |
| 1282 | 40% | 54.5% | 5.5% | 0.8 to 3 | 1.8 to 2.8 | 2.0 | 2.2 | 2.4 |
| 1283 | 41% | 53.5% | 5.5% | 0.8 to 3 | 1.8 to 2.8 | 2.0 | 2.2 | 2.4 |
| 1284 | 42% | 52.5% | 5.5% | 0.8 to 3 | 1.8 to 2.8 | 2.0 | 2.2 | 2.4 |
| 1285 | 43% | 51.5% | 5.5% | 0.8 to 3 | 1.8 to 2.8 | 2.0 | 2.2 | 2.4 |
| 1286 | 44% | 50.5% | 5.5% | 0.8 to 3 | 1.8 to 2.8 | 2.0 | 2.2 | 2.4 |
| 1287 | 45% | 49.5% | 5.5% | 0.8 to 3 | 1.8 to 2.8 | 2.0 | 2.2 | 2.4 |
| 1288 | 46% | 48.5% | 5.5% | 0.8 to 3 | 1.8 to 2.8 | 2.0 | 2.2 | 2.4 |
| 1289 | 47% | 47.5% | 5.5% | 0.8 to 3 | 1.8 to 2.8 | 2.0 | 2.2 | 2.4 |
| 1290 | 48% | 46.5% | 5.5% | 0.8 to 3 | 1.8 to 2.8 | 2.0 | 2.2 | 2.4 |
| 1291 | 49% | 45.5% | 5.5% | 0.8 to 3 | 1.8 to 2.8 | 2.0 | 2.2 | 2.4 |
| 1292 | 50% | 44.5% | 5.5% | 0.8 to 3 | 1.8 to 2.8 | 2.0 | 2.2 | 2.4 |
| 1293 | 51% | 43.5% | 5.5% | 0.8 to 3 | 1.8 to 2.8 | 2.0 | 2.2 | 2.4 |
| 1294 | 52% | 42.5% | 5.5% | 0.8 to 3 | 1.8 to 2.8 | 2.0 | 2.2 | 2.4 |
| 1295 | 53% | 41.5% | 5.5% | 0.8 to 3 | 1.8 to 2.8 | 2.0 | 2.2 | 2.4 |
| 1296 | 54% | 40.5% | 5.5% | 0.8 to 3 | 1.8 to 2.8 | 2.0 | 2.2 | 2.4 |
| 1297 | 55% | 39.5% | 5.5% | 0.8 to 3 | 1.8 to 2.8 | 2.0 | 2.2 | 2.4 |
| 1298 | 56% | 38.5% | 5.5% | 0.8 to 3 | 1.8 to 2.8 | 2.0 | 2.2 | 2.4 |
| 1299 | 57% | 37.5% | 5.5% | 0.8 to 3 | 1.8 to 2.8 | 2.0 | 2.2 | 2.4 |
| 1300 | 58% | 36.5% | 5.5% | 0.8 to 3 | 1.8 to 2.8 | 2.0 | 2.2 | 2.4 |
| 1301 | 59% | 35.5% | 5.5% | 0.8 to 3 | 1.8 to 2.8 | 2.0 | 2.2 | 2.4 |
| 1302 | 60% | 34.5% | 5.5% | 0.8 to 3 | 1.8 to 2.8 | 2.0 | 2.2 | 2.4 |
| 1303 | 30% | 64% | 6% | 0.8 to 3 | 1.8 to 2.8 | 2.0 | 2.2 | 2.4 |
| 1304 | 31% | 63% | 6% | 0.8 to 3 | 1.8 to 2.8 | 2.0 | 2.2 | 2.4 |
| 1305 | 32% | 62% | 6% | 0.8 to 3 | 1.8 to 2.8 | 2.0 | 2.2 | 2.4 |
| 1306 | 33% | 61% | 6% | 0.8 to 3 | 1.8 to 2.8 | 2.0 | 2.2 | 2.4 |
| 1307 | 34% | 60% | 6% | 0.8 to 3 | 1.8 to 2.8 | 2.0 | 2.2 | 2.4 |
| 1308 | 35% | 59% | 6% | 0.8 to 3 | 1.8 to 2.8 | 2.0 | 2.2 | 2.4 |
| 1309 | 36% | 58% | 6% | 0.8 to 3 | 1.8 to 2.8 | 2.0 | 2.2 | 2.4 |
| 1310 | 37% | 57% | 6% | 0.8 to 3 | 1.8 to 2.8 | 2.0 | 2.2 | 2.4 |
| 1311 | 38% | 56% | 6% | 0.8 to 3 | 1.8 to 2.8 | 2.0 | 2.2 | 2.4 |
| 1312 | 39% | 55% | 6% | 0.8 to 3 | 1.8 to 2.8 | 2.0 | 2.2 | 2.4 |
| 1313 | 40% | 54% | 6% | 0.8 to 3 | 1.8 to 2.8 | 2.0 | 2.2 | 2.4 |
| 1314 | 41% | 53% | 6% | 0.8 to 3 | 1.8 to 2.8 | 2.0 | 2.2 | 2.4 |
| 1315 | 42% | 52% | 6% | 0.8 to 3 | 1.8 to 2.8 | 2.0 | 2.2 | 2.4 |
| 1316 | 43% | 51% | 6% | 0.8 to 3 | 1.8 to 2.8 | 2.0 | 2.2 | 2.4 |
| 1317 | 44% | 50% | 6% | 0.8 to 3 | 1.8 to 2.8 | 2.0 | 2.2 | 2.4 |
| 1318 | 45% | 49% | 6% | 0.8 to 3 | 1.8 to 2.8 | 2.0 | 2.2 | 2.4 |
| 1319 | 46% | 48% | 6% | 0.8 to 3 | 1.8 to 2.8 | 2.0 | 2.2 | 2.4 |
| 1320 | 47% | 47% | 6% | 0.8 to 3 | 1.8 to 2.8 | 2.0 | 2.2 | 2.4 |
| 1321 | 48% | 46% | 6% | 0.8 to 3 | 1.8 to 2.8 | 2.0 | 2.2 | 2.4 |
| 1322 | 49% | 45% | 6% | 0.8 to 3 | 1.8 to 2.8 | 2.0 | 2.2 | 2.4 |
| 1323 | 50% | 44% | 6% | 0.8 to 3 | 1.8 to 2.8 | 2.0 | 2.2 | 2.4 |
| 1324 | 51% | 43% | 6% | 0.8 to 3 | 1.8 to 2.8 | 2.0 | 2.2 | 2.4 |
| 1325 | 52% | 42% | 6% | 0.8 to 3 | 1.8 to 2.8 | 2.0 | 2.2 | 2.4 |
| 1326 | 53% | 41% | 6% | 0.8 to 3 | 1.8 to 2.8 | 2.0 | 2.2 | 2.4 |
| 1327 | 54% | 40% | 6% | 0.8 to 3 | 1.8 to 2.8 | 2.0 | 2.2 | 2.4 |
| 1328 | 55% | 39% | 6% | 0.8 to 3 | 1.8 to 2.8 | 2.0 | 2.2 | 2.4 |

TABLE 3-continued

| | Alkyl Sulfate | | Alkyl Ether Sulfate | | | | | |
| | Alkyl Chain Length, Wt. Percentage | | Alkyl Chain Length, Wt. % | Average mol. EO (Alternatives for each numbered species) | | | | |
| Species | 8 to 10 | 9 to 11 | 6 | Range A | Range B | Species C | Species D | Species E |
| --- | --- | --- | --- | --- | --- | --- | --- | --- |
| 1329 | 56% | 38% | 6% | 0.8 to 3 | 1.8 to 2.8 | 2.0 | 2.2 | 2.4 |
| 1330 | 57% | 37% | 6% | 0.8 to 3 | 1.8 to 2.8 | 2.0 | 2.2 | 2.4 |
| 1331 | 58% | 36% | 6% | 0.8 to 3 | 1.8 to 2.8 | 2.0 | 2.2 | 2.4 |
| 1332 | 59% | 35% | 6% | 0.8 to 3 | 1.8 to 2.8 | 2.0 | 2.2 | 2.4 |
| 1333 | 60% | 34% | 6% | 0.8 to 3 | 1.8 to 2.8 | 2.0 | 2.2 | 2.4 |
| 1334 | 30% | 63.5% | 6.5% | 0.8 to 3 | 1.8 to 2.8 | 2.0 | 2.2 | 2.4 |
| 1335 | 31% | 62.5% | 6.5% | 0.8 to 3 | 1.8 to 2.8 | 2.0 | 2.2 | 2.4 |
| 1336 | 32% | 61.5% | 6.5% | 0.8 to 3 | 1.8 to 2.8 | 2.0 | 2.2 | 2.4 |
| 1337 | 33% | 60.5% | 6.5% | 0.8 to 3 | 1.8 to 2.8 | 2.0 | 2.2 | 2.4 |
| 1338 | 34% | 59.5% | 6.5% | 0.8 to 3 | 1.8 to 2.8 | 2.0 | 2.2 | 2.4 |
| 1339 | 35% | 58.5% | 6.5% | 0.8 to 3 | 1.8 to 2.8 | 2.0 | 2.2 | 2.4 |
| 1340 | 36% | 57.5% | 6.5% | 0.8 to 3 | 1.8 to 2.8 | 2.0 | 2.2 | 2.4 |
| 1341 | 37% | 56.5% | 6.5% | 0.8 to 3 | 1.8 to 2.8 | 2.0 | 2.2 | 2.4 |
| 1342 | 38% | 55.5% | 6.5% | 0.8 to 3 | 1.8 to 2.8 | 2.0 | 2.2 | 2.4 |
| 1343 | 39% | 54.5% | 6.5% | 0.8 to 3 | 1.8 to 2.8 | 2.0 | 2.2 | 2.4 |
| 1344 | 40% | 53.5% | 6.5% | 0.8 to 3 | 1.8 to 2.8 | 2.0 | 2.2 | 2.4 |
| 1345 | 41% | 52.5% | 6.5% | 0.8 to 3 | 1.8 to 2.8 | 2.0 | 2.2 | 2.4 |
| 1346 | 42% | 51.5% | 6.5% | 0.8 to 3 | 1.8 to 2.8 | 2.0 | 2.2 | 2.4 |
| 1347 | 43% | 50.5% | 6.5% | 0.8 to 3 | 1.8 to 2.8 | 2.0 | 2.2 | 2.4 |
| 1348 | 44% | 49.5% | 6.5% | 0.8 to 3 | 1.8 to 2.8 | 2.0 | 2.2 | 2.4 |
| 1349 | 45% | 48.5% | 6.5% | 0.8 to 3 | 1.8 to 2.8 | 2.0 | 2.2 | 2.4 |
| 1350 | 46% | 47.5% | 6.5% | 0.8 to 3 | 1.8 to 2.8 | 2.0 | 2.2 | 2.4 |
| 1351 | 47% | 46.5% | 6.5% | 0.8 to 3 | 1.8 to 2.8 | 2.0 | 2.2 | 2.4 |
| 1352 | 48% | 45.5% | 6.5% | 0.8 to 3 | 1.8 to 2.8 | 2.0 | 2.2 | 2.4 |
| 1353 | 49% | 44.5% | 6.5% | 0.8 to 3 | 1.8 to 2.8 | 2.0 | 2.2 | 2.4 |
| 1354 | 50% | 43.5% | 6.5% | 0.8 to 3 | 1.8 to 2.8 | 2.0 | 2.2 | 2.4 |
| 1355 | 51% | 42.5% | 6.5% | 0.8 to 3 | 1.8 to 2.8 | 2.0 | 2.2 | 2.4 |
| 1356 | 52% | 41.5% | 6.5% | 0.8 to 3 | 1.8 to 2.8 | 2.0 | 2.2 | 2.4 |
| 1357 | 53% | 40.5% | 6.5% | 0.8 to 3 | 1.8 to 2.8 | 2.0 | 2.2 | 2.4 |
| 1358 | 54% | 39.5% | 6.5% | 0.8 to 3 | 1.8 to 2.8 | 2.0 | 2.2 | 2.4 |
| 1359 | 55% | 38.5% | 6.5% | 0.8 to 3 | 1.8 to 2.8 | 2.0 | 2.2 | 2.4 |
| 1360 | 56% | 37.5% | 6.5% | 0.8 to 3 | 1.8 to 2.8 | 2.0 | 2.2 | 2.4 |
| 1361 | 57% | 36.5% | 6.5% | 0.8 to 3 | 1.8 to 2.8 | 2.0 | 2.2 | 2.4 |
| 1362 | 58% | 35.5% | 6.5% | 0.8 to 3 | 1.8 to 2.8 | 2.0 | 2.2 | 2.4 |
| 1363 | 59% | 34.5% | 6.5% | 0.8 to 3 | 1.8 to 2.8 | 2.0 | 2.2 | 2.4 |
| 1364 | 60% | 33.5% | 6.5% | 0.8 to 3 | 1.8 to 2.8 | 2.0 | 2.2 | 2.4 |
| 1365 | 30% | 63% | 7% | 0.8 to 3 | 1.8 to 2.8 | 2.0 | 2.2 | 2.4 |
| 1366 | 31% | 62% | 7% | 0.8 to 3 | 1.8 to 2.8 | 2.0 | 2.2 | 2.4 |
| 1367 | 32% | 61% | 7% | 0.8 to 3 | 1.8 to 2.8 | 2.0 | 2.2 | 2.4 |
| 1368 | 33% | 60% | 7% | 0.8 to 3 | 1.8 to 2.8 | 2.0 | 2.2 | 2.4 |
| 1369 | 34% | 59% | 7% | 0.8 to 3 | 1.8 to 2.8 | 2.0 | 2.2 | 2.4 |
| 1370 | 35% | 58% | 7% | 0.8 to 3 | 1.8 to 2.8 | 2.0 | 2.2 | 2.4 |
| 1371 | 36% | 57% | 7% | 0.8 to 3 | 1.8 to 2.8 | 2.0 | 2.2 | 2.4 |
| 1372 | 37% | 56% | 7% | 0.8 to 3 | 1.8 to 2.8 | 2.0 | 2.2 | 2.4 |
| 1373 | 38% | 55% | 7% | 0.8 to 3 | 1.8 to 2.8 | 2.0 | 2.2 | 2.4 |
| 1374 | 39% | 54% | 7% | 0.8 to 3 | 1.8 to 2.8 | 2.0 | 2.2 | 2.4 |
| 1375 | 40% | 53% | 7% | 0.8 to 3 | 1.8 to 2.8 | 2.0 | 2.2 | 2.4 |
| 1376 | 41% | 52% | 7% | 0.8 to 3 | 1.8 to 2.8 | 2.0 | 2.2 | 2.4 |
| 1377 | 42% | 51% | 7% | 0.8 to 3 | 1.8 to 2.8 | 2.0 | 2.2 | 2.4 |
| 1378 | 43% | 50% | 7% | 0.8 to 3 | 1.8 to 2.8 | 2.0 | 2.2 | 2.4 |
| 1379 | 44% | 49% | 7% | 0.8 to 3 | 1.8 to 2.8 | 2.0 | 2.2 | 2.4 |
| 1380 | 45% | 48% | 7% | 0.8 to 3 | 1.8 to 2.8 | 2.0 | 2.2 | 2.4 |
| 1381 | 46% | 47% | 7% | 0.8 to 3 | 1.8 to 2.8 | 2.0 | 2.2 | 2.4 |
| 1382 | 47% | 46% | 7% | 0.8 to 3 | 1.8 to 2.8 | 2.0 | 2.2 | 2.4 |
| 1383 | 48% | 45% | 7% | 0.8 to 3 | 1.8 to 2.8 | 2.0 | 2.2 | 2.4 |
| 1384 | 49% | 44% | 7% | 0.8 to 3 | 1.8 to 2.8 | 2.0 | 2.2 | 2.4 |
| 1385 | 50% | 43% | 7% | 0.8 to 3 | 1.8 to 2.8 | 2.0 | 2.2 | 2.4 |
| 1386 | 51% | 42% | 7% | 0.8 to 3 | 1.8 to 2.8 | 2.0 | 2.2 | 2.4 |
| 1387 | 52% | 41% | 7% | 0.8 to 3 | 1.8 to 2.8 | 2.0 | 2.2 | 2.4 |
| 1388 | 53% | 40% | 7% | 0.8 to 3 | 1.8 to 2.8 | 2.0 | 2.2 | 2.4 |
| 1389 | 54% | 39% | 7% | 0.8 to 3 | 1.8 to 2.8 | 2.0 | 2.2 | 2.4 |
| 1390 | 55% | 38% | 7% | 0.8 to 3 | 1.8 to 2.8 | 2.0 | 2.2 | 2.4 |
| 1391 | 56% | 37% | 7% | 0.8 to 3 | 1.8 to 2.8 | 2.0 | 2.2 | 2.4 |
| 1392 | 57% | 36% | 7% | 0.8 to 3 | 1.8 to 2.8 | 2.0 | 2.2 | 2.4 |
| 1393 | 58% | 35% | 7% | 0.8 to 3 | 1.8 to 2.8 | 2.0 | 2.2 | 2.4 |
| 1394 | 59% | 34% | 7% | 0.8 to 3 | 1.8 to 2.8 | 2.0 | 2.2 | 2.4 |
| 1395 | 60% | 33% | 7% | 0.8 to 3 | 1.8 to 2.8 | 2.0 | 2.2 | 2.4 |

TABLE 4

| | Alkyl Sulfate Alkyl Chain Length, Wt. % | | Alkyl Chain | Alkyl Ether Sulfate | | | | |
|---|---|---|---|---|---|---|---|---|
| | | | | Average mol. EO (Alternatives for each numbered species) | | | | |
| Species | 9 to 11 | 10 to 12 | Wt. % 6 | Range A | Range B | Species C | Species D | Species E |
| 1396 | 30% | 70% | 0% | 0.8 to 3 | 1.8 to 2.8 | 2.0 | 2.2 | 2.4 |
| 1397 | 31% | 69% | 0% | 0.8 to 3 | 1.8 to 2.8 | 2.0 | 2.2 | 2.4 |
| 1398 | 32% | 68% | 0% | 0.8 to 3 | 1.8 to 2.8 | 2.0 | 2.2 | 2.4 |
| 1399 | 33% | 67% | 0% | 0.8 to 3 | 1.8 to 2.8 | 2.0 | 2.2 | 2.4 |
| 1400 | 34% | 66% | 0% | 0.8 to 3 | 1.8 to 2.8 | 2.0 | 2.2 | 2.4 |
| 1401 | 35% | 65% | 0% | 0.8 to 3 | 1.8 to 2.8 | 2.0 | 2.2 | 2.4 |
| 1402 | 36% | 64% | 0% | 0.8 to 3 | 1.8 to 2.8 | 2.0 | 2.2 | 2.4 |
| 1403 | 37% | 63% | 0% | 0.8 to 3 | 1.8 to 2.8 | 2.0 | 2.2 | 2.4 |
| 1404 | 38% | 62% | 0% | 0.8 to 3 | 1.8 to 2.8 | 2.0 | 2.2 | 2.4 |
| 1405 | 39% | 61% | 0% | 0.8 to 3 | 1.8 to 2.8 | 2.0 | 2.2 | 2.4 |
| 1406 | 40% | 60% | 0% | 0.8 to 3 | 1.8 to 2.8 | 2.0 | 2.2 | 2.4 |
| 1407 | 41% | 59% | 0% | 0.8 to 3 | 1.8 to 2.8 | 2.0 | 2.2 | 2.4 |
| 1408 | 42% | 58% | 0% | 0.8 to 3 | 1.8 to 2.8 | 2.0 | 2.2 | 2.4 |
| 1409 | 43% | 57% | 0% | 0.8 to 3 | 1.8 to 2.8 | 2.0 | 2.2 | 2.4 |
| 1410 | 44% | 56% | 0% | 0.8 to 3 | 1.8 to 2.8 | 2.0 | 2.2 | 2.4 |
| 1411 | 45% | 55% | 0% | 0.8 to 3 | 1.8 to 2.8 | 2.0 | 2.2 | 2.4 |
| 1412 | 46% | 54% | 0% | 0.8 to 3 | 1.8 to 2.8 | 2.0 | 2.2 | 2.4 |
| 1413 | 47% | 53% | 0% | 0.8 to 3 | 1.8 to 2.8 | 2.0 | 2.2 | 2.4 |
| 1414 | 48% | 52% | 0% | 0.8 to 3 | 1.8 to 2.8 | 2.0 | 2.2 | 2.4 |
| 1415 | 49% | 51% | 0% | 0.8 to 3 | 1.8 to 2.8 | 2.0 | 2.2 | 2.4 |
| 1416 | 50% | 50% | 0% | 0.8 to 3 | 1.8 to 2.8 | 2.0 | 2.2 | 2.4 |
| 1417 | 51% | 49% | 0% | 0.8 to 3 | 1.8 to 2.8 | 2.0 | 2.2 | 2.4 |
| 1418 | 52% | 48% | 0% | 0.8 to 3 | 1.8 to 2.8 | 2.0 | 2.2 | 2.4 |
| 1419 | 53% | 47% | 0% | 0.8 to 3 | 1.8 to 2.8 | 2.0 | 2.2 | 2.4 |
| 1420 | 54% | 46% | 0% | 0.8 to 3 | 1.8 to 2.8 | 2.0 | 2.2 | 2.4 |
| 1421 | 55% | 45% | 0% | 0.8 to 3 | 1.8 to 2.8 | 2.0 | 2.2 | 2.4 |
| 1422 | 56% | 44% | 0% | 0.8 to 3 | 1.8 to 2.8 | 2.0 | 2.2 | 2.4 |
| 1423 | 57% | 43% | 0% | 0.8 to 3 | 1.8 to 2.8 | 2.0 | 2.2 | 2.4 |
| 1424 | 58% | 42% | 0% | 0.8 to 3 | 1.8 to 2.8 | 2.0 | 2.2 | 2.4 |
| 1425 | 59% | 41% | 0% | 0.8 to 3 | 1.8 to 2.8 | 2.0 | 2.2 | 2.4 |
| 1426 | 60% | 40% | 0% | 0.8 to 3 | 1.8 to 2.8 | 2.0 | 2.2 | 2.4 |
| 1427 | 30% | 69.5% | 0.5% | 0.8 to 3 | 1.8 to 2.8 | 2.0 | 2.2 | 2.4 |
| 1428 | 31% | 68.5% | 0.5% | 0.8 to 3 | 1.8 to 2.8 | 2.0 | 2.2 | 2.4 |
| 1429 | 32% | 67.5% | 0.5% | 0.8 to 3 | 1.8 to 2.8 | 2.0 | 2.2 | 2.4 |
| 1430 | 33% | 66.5% | 0.5% | 0.8 to 3 | 1.8 to 2.8 | 2.0 | 2.2 | 2.4 |
| 1431 | 34% | 65.5% | 0.5% | 0.8 to 3 | 1.8 to 2.8 | 2.0 | 2.2 | 2.4 |
| 1432 | 35% | 64.5% | 0.5% | 0.8 to 3 | 1.8 to 2.8 | 2.0 | 2.2 | 2.4 |
| 1433 | 36% | 63.5% | 0.5% | 0.8 to 3 | 1.8 to 2.8 | 2.0 | 2.2 | 2.4 |
| 1434 | 37% | 62.5% | 0.5% | 0.8 to 3 | 1.8 to 2.8 | 2.0 | 2.2 | 2.4 |
| 1435 | 38% | 61.5% | 0.5% | 0.8 to 3 | 1.8 to 2.8 | 2.0 | 2.2 | 2.4 |
| 1436 | 39% | 60.5% | 0.5% | 0.8 to 3 | 1.8 to 2.8 | 2.0 | 2.2 | 2.4 |
| 1437 | 40% | 59.5% | 0.5% | 0.8 to 3 | 1.8 to 2.8 | 2.0 | 2.2 | 2.4 |
| 1438 | 41% | 58.5% | 0.5% | 0.8 to 3 | 1.8 to 2.8 | 2.0 | 2.2 | 2.4 |
| 1439 | 42% | 57.5% | 0.5% | 0.8 to 3 | 1.8 to 2.8 | 2.0 | 2.2 | 2.4 |
| 1440 | 43% | 56.5% | 0.5% | 0.8 to 3 | 1.8 to 2.8 | 2.0 | 2.2 | 2.4 |
| 1441 | 44% | 55.5% | 0.5% | 0.8 to 3 | 1.8 to 2.8 | 2.0 | 2.2 | 2.4 |
| 1442 | 45% | 54.5% | 0.5% | 0.8 to 3 | 1.8 to 2.8 | 2.0 | 2.2 | 2.4 |
| 1443 | 46% | 53.5% | 0.5% | 0.8 to 3 | 1.8 to 2.8 | 2.0 | 2.2 | 2.4 |
| 1444 | 47% | 52.5% | 0.5% | 0.8 to 3 | 1.8 to 2.8 | 2.0 | 2.2 | 2.4 |
| 1445 | 48% | 51.5% | 0.5% | 0.8 to 3 | 1.8 to 2.8 | 2.0 | 2.2 | 2.4 |
| 1446 | 49% | 50.5% | 0.5% | 0.8 to 3 | 1.8 to 2.8 | 2.0 | 2.2 | 2.4 |
| 1447 | 50% | 49.5% | 0.5% | 0.8 to 3 | 1.8 to 2.8 | 2.0 | 2.2 | 2.4 |
| 1448 | 51% | 48.5% | 0.5% | 0.8 to 3 | 1.8 to 2.8 | 2.0 | 2.2 | 2.4 |
| 1449 | 52% | 47.5% | 0.5% | 0.8 to 3 | 1.8 to 2.8 | 2.0 | 2.2 | 2.4 |
| 1450 | 53% | 46.5% | 0.5% | 0.8 to 3 | 1.8 to 2.8 | 2.0 | 2.2 | 2.4 |
| 1451 | 54% | 45.5% | 0.5% | 0.8 to 3 | 1.8 to 2.8 | 2.0 | 2.2 | 2.4 |
| 1452 | 55% | 44.5% | 0.5% | 0.8 to 3 | 1.8 to 2.8 | 2.0 | 2.2 | 2.4 |
| 1453 | 56% | 43.5% | 0.5% | 0.8 to 3 | 1.8 to 2.8 | 2.0 | 2.2 | 2.4 |
| 1454 | 57% | 42.5% | 0.5% | 0.8 to 3 | 1.8 to 2.8 | 2.0 | 2.2 | 2.4 |
| 1455 | 58% | 41.5% | 0.5% | 0.8 to 3 | 1.8 to 2.8 | 2.0 | 2.2 | 2.4 |
| 1456 | 59% | 40.5% | 0.5% | 0.8 to 3 | 1.8 to 2.8 | 2.0 | 2.2 | 2.4 |
| 1457 | 60% | 39.5% | 0.5% | 0.8 to 3 | 1.8 to 2.8 | 2.0 | 2.2 | 2.4 |
| 1458 | 30% | 69% | 1% | 0.8 to 3 | 1.8 to 2.8 | 2.0 | 2.2 | 2.4 |
| 1459 | 31% | 68% | 1% | 0.8 to 3 | 1.8 to 2.8 | 2.0 | 2.2 | 2.4 |
| 1460 | 32% | 67% | 1% | 0.8 to 3 | 1.8 to 2.8 | 2.0 | 2.2 | 2.4 |
| 1461 | 33% | 66% | 1% | 0.8 to 3 | 1.8 to 2.8 | 2.0 | 2.2 | 2.4 |
| 1462 | 34% | 65% | 1% | 0.8 to 3 | 1.8 to 2.8 | 2.0 | 2.2 | 2.4 |
| 1463 | 35% | 64% | 1% | 0.8 to 3 | 1.8 to 2.8 | 2.0 | 2.2 | 2.4 |
| 1464 | 36% | 63% | 1% | 0.8 to 3 | 1.8 to 2.8 | 2.0 | 2.2 | 2.4 |
| 1465 | 37% | 62% | 1% | 0.8 to 3 | 1.8 to 2.8 | 2.0 | 2.2 | 2.4 |
| 1466 | 38% | 61% | 1% | 0.8 to 3 | 1.8 to 2.8 | 2.0 | 2.2 | 2.4 |
| 1467 | 39% | 60% | 1% | 0.8 to 3 | 1.8 to 2.8 | 2.0 | 2.2 | 2.4 |
| 1468 | 40% | 59% | 1% | 0.8 to 3 | 1.8 to 2.8 | 2.0 | 2.2 | 2.4 |
| 1469 | 41% | 58% | 1% | 0.8 to 3 | 1.8 to 2.8 | 2.0 | 2.2 | 2.4 |
| 1470 | 42% | 57% | 1% | 0.8 to 3 | 1.8 to 2.8 | 2.0 | 2.2 | 2.4 |
| 1471 | 43% | 56% | 1% | 0.8 to 3 | 1.8 to 2.8 | 2.0 | 2.2 | 2.4 |
| 1472 | 44% | 55% | 1% | 0.8 to 3 | 1.8 to 2.8 | 2.0 | 2.2 | 2.4 |
| 1473 | 45% | 54% | 1% | 0.8 to 3 | 1.8 to 2.8 | 2.0 | 2.2 | 2.4 |
| 1474 | 46% | 53% | 1% | 0.8 to 3 | 1.8 to 2.8 | 2.0 | 2.2 | 2.4 |
| 1475 | 47% | 52% | 1% | 0.8 to 3 | 1.8 to 2.8 | 2.0 | 2.2 | 2.4 |
| 1476 | 48% | 51% | 1% | 0.8 to 3 | 1.8 to 2.8 | 2.0 | 2.2 | 2.4 |
| 1477 | 49% | 50% | 1% | 0.8 to 3 | 1.8 to 2.8 | 2.0 | 2.2 | 2.4 |
| 1478 | 50% | 49% | 1% | 0.8 to 3 | 1.8 to 2.8 | 2.0 | 2.2 | 2.4 |
| 1479 | 51% | 48% | 1% | 0.8 to 3 | 1.8 to 2.8 | 2.0 | 2.2 | 2.4 |
| 1480 | 52% | 47% | 1% | 0.8 to 3 | 1.8 to 2.8 | 2.0 | 2.2 | 2.4 |
| 1481 | 53% | 46% | 1% | 0.8 to 3 | 1.8 to 2.8 | 2.0 | 2.2 | 2.4 |
| 1482 | 54% | 45% | 1% | 0.8 to 3 | 1.8 to 2.8 | 2.0 | 2.2 | 2.4 |
| 1483 | 55% | 44% | 1% | 0.8 to 3 | 1.8 to 2.8 | 2.0 | 2.2 | 2.4 |
| 1484 | 56% | 43% | 1% | 0.8 to 3 | 1.8 to 2.8 | 2.0 | 2.2 | 2.4 |
| 1485 | 57% | 42% | 1% | 0.8 to 3 | 1.8 to 2.8 | 2.0 | 2.2 | 2.4 |
| 1486 | 58% | 41% | 1% | 0.8 to 3 | 1.8 to 2.8 | 2.0 | 2.2 | 2.4 |
| 1487 | 59% | 40% | 1% | 0.8 to 3 | 1.8 to 2.8 | 2.0 | 2.2 | 2.4 |
| 1488 | 60% | 39% | 1% | 0.8 to 3 | 1.8 to 2.8 | 2.0 | 2.2 | 2.4 |
| 1489 | 30% | 68.5% | 1.5% | 0.8 to 3 | 1.8 to 2.8 | 2.0 | 2.2 | 2.4 |
| 1490 | 31% | 67.5% | 1.5% | 0.8 to 3 | 1.8 to 2.8 | 2.0 | 2.2 | 2.4 |
| 1491 | 32% | 66.5% | 1.5% | 0.8 to 3 | 1.8 to 2.8 | 2.0 | 2.2 | 2.4 |
| 1492 | 33% | 65.5% | 1.5% | 0.8 to 3 | 1.8 to 2.8 | 2.0 | 2.2 | 2.4 |
| 1493 | 34% | 64.5% | 1.5% | 0.8 to 3 | 1.8 to 2.8 | 2.0 | 2.2 | 2.4 |
| 1494 | 35% | 63.5% | 1.5% | 0.8 to 3 | 1.8 to 2.8 | 2.0 | 2.2 | 2.4 |
| 1495 | 36% | 62.5% | 1.5% | 0.8 to 3 | 1.8 to 2.8 | 2.0 | 2.2 | 2.4 |
| 1496 | 37% | 61.5% | 1.5% | 0.8 to 3 | 1.8 to 2.8 | 2.0 | 2.2 | 2.4 |
| 1497 | 38% | 60.5% | 1.5% | 0.8 to 3 | 1.8 to 2.8 | 2.0 | 2.2 | 2.4 |
| 1498 | 39% | 59.5% | 1.5% | 0.8 to 3 | 1.8 to 2.8 | 2.0 | 2.2 | 2.4 |
| 1499 | 40% | 58.5% | 1.5% | 0.8 to 3 | 1.8 to 2.8 | 2.0 | 2.2 | 2.4 |
| 1500 | 41% | 57.5% | 1.5% | 0.8 to 3 | 1.8 to 2.8 | 2.0 | 2.2 | 2.4 |
| 1501 | 42% | 56.5% | 1.5% | 0.8 to 3 | 1.8 to 2.8 | 2.0 | 2.2 | 2.4 |
| 1502 | 43% | 55.5% | 1.5% | 0.8 to 3 | 1.8 to 2.8 | 2.0 | 2.2 | 2.4 |
| 1503 | 44% | 54.5% | 1.5% | 0.8 to 3 | 1.8 to 2.8 | 2.0 | 2.2 | 2.4 |
| 1504 | 45% | 53.5% | 1.5% | 0.8 to 3 | 1.8 to 2.8 | 2.0 | 2.2 | 2.4 |
| 1505 | 46% | 52.5% | 1.5% | 0.8 to 3 | 1.8 to 2.8 | 2.0 | 2.2 | 2.4 |
| 1506 | 47% | 51.5% | 1.5% | 0.8 to 3 | 1.8 to 2.8 | 2.0 | 2.2 | 2.4 |
| 1507 | 48% | 50.5% | 1.5% | 0.8 to 3 | 1.8 to 2.8 | 2.0 | 2.2 | 2.4 |
| 1508 | 49% | 49.5% | 1.5% | 0.8 to 3 | 1.8 to 2.8 | 2.0 | 2.2 | 2.4 |
| 1509 | 50% | 48.5% | 1.5% | 0.8 to 3 | 1.8 to 2.8 | 2.0 | 2.2 | 2.4 |
| 1510 | 51% | 47.5% | 1.5% | 0.8 to 3 | 1.8 to 2.8 | 2.0 | 2.2 | 2.4 |
| 1511 | 52% | 46.5% | 1.5% | 0.8 to 3 | 1.8 to 2.8 | 2.0 | 2.2 | 2.4 |
| 1512 | 53% | 45.5% | 1.5% | 0.8 to 3 | 1.8 to 2.8 | 2.0 | 2.2 | 2.4 |
| 1513 | 54% | 44.5% | 1.5% | 0.8 to 3 | 1.8 to 2.8 | 2.0 | 2.2 | 2.4 |
| 1514 | 55% | 43.5% | 1.5% | 0.8 to 3 | 1.8 to 2.8 | 2.0 | 2.2 | 2.4 |
| 1515 | 56% | 42.5% | 1.5% | 0.8 to 3 | 1.8 to 2.8 | 2.0 | 2.2 | 2.4 |
| 1516 | 57% | 41.5% | 1.5% | 0.8 to 3 | 1.8 to 2.8 | 2.0 | 2.2 | 2.4 |
| 1517 | 58% | 40.5% | 1.5% | 0.8 to 3 | 1.8 to 2.8 | 2.0 | 2.2 | 2.4 |
| 1518 | 59% | 39.5% | 1.5% | 0.8 to 3 | 1.8 to 2.8 | 2.0 | 2.2 | 2.4 |
| 1519 | 60% | 38.5% | 1.5% | 0.8 to 3 | 1.8 to 2.8 | 2.0 | 2.2 | 2.4 |
| 1520 | 30% | 68% | 2% | 0.8 to 3 | 1.8 to 2.8 | 2.0 | 2.2 | 2.4 |
| 1521 | 31% | 67% | 2% | 0.8 to 3 | 1.8 to 2.8 | 2.0 | 2.2 | 2.4 |
| 1522 | 32% | 66% | 2% | 0.8 to 3 | 1.8 to 2.8 | 2.0 | 2.2 | 2.4 |
| 1523 | 33% | 65% | 2% | 0.8 to 3 | 1.8 to 2.8 | 2.0 | 2.2 | 2.4 |
| 1524 | 34% | 64% | 2% | 0.8 to 3 | 1.8 to 2.8 | 2.0 | 2.2 | 2.4 |
| 1525 | 35% | 63% | 2% | 0.8 to 3 | 1.8 to 2.8 | 2.0 | 2.2 | 2.4 |
| 1526 | 36% | 62% | 2% | 0.8 to 3 | 1.8 to 2.8 | 2.0 | 2.2 | 2.4 |
| 1527 | 37% | 61% | 2% | 0.8 to 3 | 1.8 to 2.8 | 2.0 | 2.2 | 2.4 |
| 1528 | 38% | 60% | 2% | 0.8 to 3 | 1.8 to 2.8 | 2.0 | 2.2 | 2.4 |
| 1529 | 39% | 59% | 2% | 0.8 to 3 | 1.8 to 2.8 | 2.0 | 2.2 | 2.4 |
| 1530 | 40% | 58% | 2% | 0.8 to 3 | 1.8 to 2.8 | 2.0 | 2.2 | 2.4 |
| 1531 | 41% | 57% | 2% | 0.8 to 3 | 1.8 to 2.8 | 2.0 | 2.2 | 2.4 |
| 1532 | 42% | 56% | 2% | 0.8 to 3 | 1.8 to 2.8 | 2.0 | 2.2 | 2.4 |
| 1533 | 43% | 55% | 2% | 0.8 to 3 | 1.8 to 2.8 | 2.0 | 2.2 | 2.4 |

TABLE 4-continued

| | Alkyl Sulfate Alkyl Chain Length, Wt. % | | Alkyl Ether Sulfate | | | | | |
|---|---|---|---|---|---|---|---|---|
| | | | Alkyl Chain Length, | Average mol. EO (Alternatives for each numbered species) | | | | |
| Species | 9 to 11 | 10 to 12 | Wt. % 6 | Range A | Range B | Species C | Species D | Species E |
| 1534 | 44% | 54% | 2% | 0.8 to 3 | 1.8 to 2.8 | 2.0 | 2.2 | 2.4 |
| 1535 | 45% | 53% | 2% | 0.8 to 3 | 1.8 to 2.8 | 2.0 | 2.2 | 2.4 |
| 1536 | 46% | 52% | 2% | 0.8 to 3 | 1.8 to 2.8 | 2.0 | 2.2 | 2.4 |
| 1537 | 47% | 51% | 2% | 0.8 to 3 | 1.8 to 2.8 | 2.0 | 2.2 | 2.4 |
| 1538 | 48% | 50% | 2% | 0.8 to 3 | 1.8 to 2.8 | 2.0 | 2.2 | 2.4 |
| 1539 | 49% | 49% | 2% | 0.8 to 3 | 1.8 to 2.8 | 2.0 | 2.2 | 2.4 |
| 1540 | 50% | 48% | 2% | 0.8 to 3 | 1.8 to 2.8 | 2.0 | 2.2 | 2.4 |
| 1541 | 51% | 47% | 2% | 0.8 to 3 | 1.8 to 2.8 | 2.0 | 2.2 | 2.4 |
| 1542 | 52% | 46% | 2% | 0.8 to 3 | 1.8 to 2.8 | 2.0 | 2.2 | 2.4 |
| 1543 | 53% | 45% | 2% | 0.8 to 3 | 1.8 to 2.8 | 2.0 | 2.2 | 2.4 |
| 1544 | 54% | 44% | 2% | 0.8 to 3 | 1.8 to 2.8 | 2.0 | 2.2 | 2.4 |
| 1545 | 55% | 43% | 2% | 0.8 to 3 | 1.8 to 2.8 | 2.0 | 2.2 | 2.4 |
| 1546 | 56% | 42% | 2% | 0.8 to 3 | 1.8 to 2.8 | 2.0 | 2.2 | 2.4 |
| 1547 | 57% | 41% | 2% | 0.8 to 3 | 1.8 to 2.8 | 2.0 | 2.2 | 2.4 |
| 1548 | 58% | 40% | 2% | 0.8 to 3 | 1.8 to 2.8 | 2.0 | 2.2 | 2.4 |
| 1549 | 59% | 39% | 2% | 0.8 to 3 | 1.8 to 2.8 | 2.0 | 2.2 | 2.4 |
| 1550 | 60% | 38% | 2% | 0.8 to 3 | 1.8 to 2.8 | 2.0 | 2.2 | 2.4 |
| 1551 | 30% | 67.5% | 2.5% | 0.8 to 3 | 1.8 to 2.8 | 2.0 | 2.2 | 2.4 |
| 1552 | 31% | 66.5% | 2.5% | 0.8 to 3 | 1.8 to 2.8 | 2.0 | 2.2 | 2.4 |
| 1553 | 32% | 65.5% | 2.5% | 0.8 to 3 | 1.8 to 2.8 | 2.0 | 2.2 | 2.4 |
| 1554 | 33% | 64.5% | 2.5% | 0.8 to 3 | 1.8 to 2.8 | 2.0 | 2.2 | 2.4 |
| 1555 | 34% | 63.5% | 2.5% | 0.8 to 3 | 1.8 to 2.8 | 2.0 | 2.2 | 2.4 |
| 1556 | 35% | 62.5% | 2.5% | 0.8 to 3 | 1.8 to 2.8 | 2.0 | 2.2 | 2.4 |
| 1557 | 36% | 61.5% | 2.5% | 0.8 to 3 | 1.8 to 2.8 | 2.0 | 2.2 | 2.4 |
| 1558 | 37% | 60.5% | 2.5% | 0.8 to 3 | 1.8 to 2.8 | 2.0 | 2.2 | 2.4 |
| 1559 | 38% | 59.5% | 2.5% | 0.8 to 3 | 1.8 to 2.8 | 2.0 | 2.2 | 2.4 |
| 1560 | 39% | 58.5% | 2.5% | 0.8 to 3 | 1.8 to 2.8 | 2.0 | 2.2 | 2.4 |
| 1561 | 40% | 57.5% | 2.5% | 0.8 to 3 | 1.8 to 2.8 | 2.0 | 2.2 | 2.4 |
| 1562 | 41% | 56.5% | 2.5% | 0.8 to 3 | 1.8 to 2.8 | 2.0 | 2.2 | 2.4 |
| 1563 | 42% | 55.5% | 2.5% | 0.8 to 3 | 1.8 to 2.8 | 2.0 | 2.2 | 2.4 |
| 1564 | 43% | 54.5% | 2.5% | 0.8 to 3 | 1.8 to 2.8 | 2.0 | 2.2 | 2.4 |
| 1565 | 44% | 53.5% | 2.5% | 0.8 to 3 | 1.8 to 2.8 | 2.0 | 2.2 | 2.4 |
| 1566 | 45% | 52.5% | 2.5% | 0.8 to 3 | 1.8 to 2.8 | 2.0 | 2.2 | 2.4 |
| 1567 | 46% | 51.5% | 2.5% | 0.8 to 3 | 1.8 to 2.8 | 2.0 | 2.2 | 2.4 |
| 1568 | 47% | 50.5% | 2.5% | 0.8 to 3 | 1.8 to 2.8 | 2.0 | 2.2 | 2.4 |
| 1569 | 48% | 49.5% | 2.5% | 0.8 to 3 | 1.8 to 2.8 | 2.0 | 2.2 | 2.4 |
| 1570 | 49% | 48.5% | 2.5% | 0.8 to 3 | 1.8 to 2.8 | 2.0 | 2.2 | 2.4 |
| 1571 | 50% | 47.5% | 2.5% | 0.8 to 3 | 1.8 to 2.8 | 2.0 | 2.2 | 2.4 |
| 1572 | 51% | 46.5% | 2.5% | 0.8 to 3 | 1.8 to 2.8 | 2.0 | 2.2 | 2.4 |
| 1573 | 52% | 45.5% | 2.5% | 0.8 to 3 | 1.8 to 2.8 | 2.0 | 2.2 | 2.4 |
| 1574 | 53% | 44.5% | 2.5% | 0.8 to 3 | 1.8 to 2.8 | 2.0 | 2.2 | 2.4 |
| 1575 | 54% | 43.5% | 2.5% | 0.8 to 3 | 1.8 to 2.8 | 2.0 | 2.2 | 2.4 |
| 1576 | 55% | 42.5% | 2.5% | 0.8 to 3 | 1.8 to 2.8 | 2.0 | 2.2 | 2.4 |
| 1577 | 56% | 41.5% | 2.5% | 0.8 to 3 | 1.8 to 2.8 | 2.0 | 2.2 | 2.4 |
| 1578 | 57% | 40.5% | 2.5% | 0.8 to 3 | 1.8 to 2.8 | 2.0 | 2.2 | 2.4 |
| 1579 | 58% | 39.5% | 2.5% | 0.8 to 3 | 1.8 to 2.8 | 2.0 | 2.2 | 2.4 |
| 1580 | 59% | 38.5% | 2.5% | 0.8 to 3 | 1.8 to 2.8 | 2.0 | 2.2 | 2.4 |
| 1581 | 60% | 37.5% | 2.5% | 0.8 to 3 | 1.8 to 2.8 | 2.0 | 2.2 | 2.4 |
| 1582 | 30% | 67% | 3% | 0.8 to 3 | 1.8 to 2.8 | 2.0 | 2.2 | 2.4 |
| 1583 | 31% | 66% | 3% | 0.8 to 3 | 1.8 to 2.8 | 2.0 | 2.2 | 2.4 |
| 1584 | 32% | 65% | 3% | 0.8 to 3 | 1.8 to 2.8 | 2.0 | 2.2 | 2.4 |
| 1585 | 33% | 64% | 3% | 0.8 to 3 | 1.8 to 2.8 | 2.0 | 2.2 | 2.4 |
| 1586 | 34% | 63% | 3% | 0.8 to 3 | 1.8 to 2.8 | 2.0 | 2.2 | 2.4 |
| 1587 | 35% | 62% | 3% | 0.8 to 3 | 1.8 to 2.8 | 2.0 | 2.2 | 2.4 |
| 1588 | 36% | 61% | 3% | 0.8 to 3 | 1.8 to 2.8 | 2.0 | 2.2 | 2.4 |
| 1589 | 37% | 60% | 3% | 0.8 to 3 | 1.8 to 2.8 | 2.0 | 2.2 | 2.4 |
| 1590 | 38% | 59% | 3% | 0.8 to 3 | 1.8 to 2.8 | 2.0 | 2.2 | 2.4 |
| 1591 | 39% | 58% | 3% | 0.8 to 3 | 1.8 to 2.8 | 2.0 | 2.2 | 2.4 |
| 1592 | 40% | 57% | 3% | 0.8 to 3 | 1.8 to 2.8 | 2.0 | 2.2 | 2.4 |
| 1593 | 41% | 56% | 3% | 0.8 to 3 | 1.8 to 2.8 | 2.0 | 2.2 | 2.4 |
| 1594 | 42% | 55% | 3% | 0.8 to 3 | 1.8 to 2.8 | 2.0 | 2.2 | 2.4 |
| 1595 | 43% | 54% | 3% | 0.8 to 3 | 1.8 to 2.8 | 2.0 | 2.2 | 2.4 |
| 1596 | 44% | 53% | 3% | 0.8 to 3 | 1.8 to 2.8 | 2.0 | 2.2 | 2.4 |
| 1597 | 45% | 52% | 3% | 0.8 to 3 | 1.8 to 2.8 | 2.0 | 2.2 | 2.4 |
| 1598 | 46% | 51% | 3% | 0.8 to 3 | 1.8 to 2.8 | 2.0 | 2.2 | 2.4 |
| 1599 | 47% | 50% | 3% | 0.8 to 3 | 1.8 to 2.8 | 2.0 | 2.2 | 2.4 |
| 1600 | 48% | 49% | 3% | 0.8 to 3 | 1.8 to 2.8 | 2.0 | 2.2 | 2.4 |
| 1601 | 49% | 48% | 3% | 0.8 to 3 | 1.8 to 2.8 | 2.0 | 2.2 | 2.4 |
| 1602 | 50% | 47% | 3% | 0.8 to 3 | 1.8 to 2.8 | 2.0 | 2.2 | 2.4 |
| 1603 | 51% | 46% | 3% | 0.8 to 3 | 1.8 to 2.8 | 2.0 | 2.2 | 2.4 |
| 1604 | 52% | 45% | 3% | 0.8 to 3 | 1.8 to 2.8 | 2.0 | 2.2 | 2.4 |
| 1605 | 53% | 44% | 3% | 0.8 to 3 | 1.8 to 2.8 | 2.0 | 2.2 | 2.4 |
| 1606 | 54% | 43% | 3% | 0.8 to 3 | 1.8 to 2.8 | 2.0 | 2.2 | 2.4 |
| 1607 | 55% | 42% | 3% | 0.8 to 3 | 1.8 to 2.8 | 2.0 | 2.2 | 2.4 |
| 1608 | 56% | 41% | 3% | 0.8 to 3 | 1.8 to 2.8 | 2.0 | 2.2 | 2.4 |
| 1609 | 57% | 40% | 3% | 0.8 to 3 | 1.8 to 2.8 | 2.0 | 2.2 | 2.4 |
| 1610 | 58% | 39% | 3% | 0.8 to 3 | 1.8 to 2.8 | 2.0 | 2.2 | 2.4 |
| 1611 | 59% | 38% | 3% | 0.8 to 3 | 1.8 to 2.8 | 2.0 | 2.2 | 2.4 |
| 1612 | 60% | 37% | 3% | 0.8 to 3 | 1.8 to 2.8 | 2.0 | 2.2 | 2.4 |
| 1613 | 30% | 66.5% | 3.5% | 0.8 to 3 | 1.8 to 2.8 | 2.0 | 2.2 | 2.4 |
| 1614 | 31% | 65.5% | 3.5% | 0.8 to 3 | 1.8 to 2.8 | 2.0 | 2.2 | 2.4 |
| 1615 | 32% | 64.5% | 3.5% | 0.8 to 3 | 1.8 to 2.8 | 2.0 | 2.2 | 2.4 |
| 1616 | 33% | 63.5% | 3.5% | 0.8 to 3 | 1.8 to 2.8 | 2.0 | 2.2 | 2.4 |
| 1617 | 34% | 62.5% | 3.5% | 0.8 to 3 | 1.8 to 2.8 | 2.0 | 2.2 | 2.4 |
| 1618 | 35% | 61.5% | 3.5% | 0.8 to 3 | 1.8 to 2.8 | 2.0 | 2.2 | 2.4 |
| 1619 | 36% | 60.5% | 3.5% | 0.8 to 3 | 1.8 to 2.8 | 2.0 | 2.2 | 2.4 |
| 1620 | 37% | 59.5% | 3.5% | 0.8 to 3 | 1.8 to 2.8 | 2.0 | 2.2 | 2.4 |
| 1621 | 38% | 58.5% | 3.5% | 0.8 to 3 | 1.8 to 2.8 | 2.0 | 2.2 | 2.4 |
| 1622 | 39% | 57.5% | 3.5% | 0.8 to 3 | 1.8 to 2.8 | 2.0 | 2.2 | 2.4 |
| 1623 | 40% | 56.5% | 3.5% | 0.8 to 3 | 1.8 to 2.8 | 2.0 | 2.2 | 2.4 |
| 1624 | 41% | 55.5% | 3.5% | 0.8 to 3 | 1.8 to 2.8 | 2.0 | 2.2 | 2.4 |
| 1625 | 42% | 54.5% | 3.5% | 0.8 to 3 | 1.8 to 2.8 | 2.0 | 2.2 | 2.4 |
| 1626 | 43% | 53.5% | 3.5% | 0.8 to 3 | 1.8 to 2.8 | 2.0 | 2.2 | 2.4 |
| 1627 | 44% | 52.5% | 3.5% | 0.8 to 3 | 1.8 to 2.8 | 2.0 | 2.2 | 2.4 |
| 1628 | 45% | 51.5% | 3.5% | 0.8 to 3 | 1.8 to 2.8 | 2.0 | 2.2 | 2.4 |
| 1629 | 46% | 50.5% | 3.5% | 0.8 to 3 | 1.8 to 2.8 | 2.0 | 2.2 | 2.4 |
| 1630 | 47% | 49.5% | 3.5% | 0.8 to 3 | 1.8 to 2.8 | 2.0 | 2.2 | 2.4 |
| 1631 | 48% | 48.5% | 3.5% | 0.8 to 3 | 1.8 to 2.8 | 2.0 | 2.2 | 2.4 |
| 1632 | 49% | 47.5% | 3.5% | 0.8 to 3 | 1.8 to 2.8 | 2.0 | 2.2 | 2.4 |
| 1633 | 50% | 46.5% | 3.5% | 0.8 to 3 | 1.8 to 2.8 | 2.0 | 2.2 | 2.4 |
| 1634 | 51% | 45.5% | 3.5% | 0.8 to 3 | 1.8 to 2.8 | 2.0 | 2.2 | 2.4 |
| 1635 | 52% | 44.5% | 3.5% | 0.8 to 3 | 1.8 to 2.8 | 2.0 | 2.2 | 2.4 |
| 1636 | 53% | 43.5% | 3.5% | 0.8 to 3 | 1.8 to 2.8 | 2.0 | 2.2 | 2.4 |
| 1637 | 54% | 42.5% | 3.5% | 0.8 to 3 | 1.8 to 2.8 | 2.0 | 2.2 | 2.4 |
| 1638 | 55% | 41.5% | 3.5% | 0.8 to 3 | 1.8 to 2.8 | 2.0 | 2.2 | 2.4 |
| 1639 | 56% | 40.5% | 3.5% | 0.8 to 3 | 1.8 to 2.8 | 2.0 | 2.2 | 2.4 |
| 1640 | 57% | 39.5% | 3.5% | 0.8 to 3 | 1.8 to 2.8 | 2.0 | 2.2 | 2.4 |
| 1641 | 58% | 38.5% | 3.5% | 0.8 to 3 | 1.8 to 2.8 | 2.0 | 2.2 | 2.4 |
| 1642 | 59% | 37.5% | 3.5% | 0.8 to 3 | 1.8 to 2.8 | 2.0 | 2.2 | 2.4 |
| 1643 | 60% | 36.5% | 3.5% | 0.8 to 3 | 1.8 to 2.8 | 2.0 | 2.2 | 2.4 |
| 1644 | 30% | 66% | 4% | 0.8 to 3 | 1.8 to 2.8 | 2.0 | 2.2 | 2.4 |
| 1645 | 31% | 65% | 4% | 0.8 to 3 | 1.8 to 2.8 | 2.0 | 2.2 | 2.4 |
| 1646 | 32% | 64% | 4% | 0.8 to 3 | 1.8 to 2.8 | 2.0 | 2.2 | 2.4 |
| 1647 | 33% | 63% | 4% | 0.8 to 3 | 1.8 to 2.8 | 2.0 | 2.2 | 2.4 |
| 1648 | 34% | 62% | 4% | 0.8 to 3 | 1.8 to 2.8 | 2.0 | 2.2 | 2.4 |
| 1649 | 35% | 61% | 4% | 0.8 to 3 | 1.8 to 2.8 | 2.0 | 2.2 | 2.4 |
| 1650 | 36% | 60% | 4% | 0.8 to 3 | 1.8 to 2.8 | 2.0 | 2.2 | 2.4 |
| 1651 | 37% | 59% | 4% | 0.8 to 3 | 1.8 to 2.8 | 2.0 | 2.2 | 2.4 |
| 1652 | 38% | 58% | 4% | 0.8 to 3 | 1.8 to 2.8 | 2.0 | 2.2 | 2.4 |
| 1653 | 39% | 57% | 4% | 0.8 to 3 | 1.8 to 2.8 | 2.0 | 2.2 | 2.4 |
| 1654 | 40% | 56% | 4% | 0.8 to 3 | 1.8 to 2.8 | 2.0 | 2.2 | 2.4 |
| 1655 | 41% | 55% | 4% | 0.8 to 3 | 1.8 to 2.8 | 2.0 | 2.2 | 2.4 |
| 1656 | 42% | 54% | 4% | 0.8 to 3 | 1.8 to 2.8 | 2.0 | 2.2 | 2.4 |
| 1657 | 43% | 53% | 4% | 0.8 to 3 | 1.8 to 2.8 | 2.0 | 2.2 | 2.4 |
| 1658 | 44% | 52% | 4% | 0.8 to 3 | 1.8 to 2.8 | 2.0 | 2.2 | 2.4 |
| 1659 | 45% | 51% | 4% | 0.8 to 3 | 1.8 to 2.8 | 2.0 | 2.2 | 2.4 |
| 1660 | 46% | 50% | 4% | 0.8 to 3 | 1.8 to 2.8 | 2.0 | 2.2 | 2.4 |
| 1661 | 47% | 49% | 4% | 0.8 to 3 | 1.8 to 2.8 | 2.0 | 2.2 | 2.4 |
| 1662 | 48% | 48% | 4% | 0.8 to 3 | 1.8 to 2.8 | 2.0 | 2.2 | 2.4 |
| 1663 | 49% | 47% | 4% | 0.8 to 3 | 1.8 to 2.8 | 2.0 | 2.2 | 2.4 |
| 1664 | 50% | 46% | 4% | 0.8 to 3 | 1.8 to 2.8 | 2.0 | 2.2 | 2.4 |
| 1665 | 51% | 45% | 4% | 0.8 to 3 | 1.8 to 2.8 | 2.0 | 2.2 | 2.4 |
| 1666 | 52% | 44% | 4% | 0.8 to 3 | 1.8 to 2.8 | 2.0 | 2.2 | 2.4 |
| 1667 | 53% | 43% | 4% | 0.8 to 3 | 1.8 to 2.8 | 2.0 | 2.2 | 2.4 |
| 1668 | 54% | 42% | 4% | 0.8 to 3 | 1.8 to 2.8 | 2.0 | 2.2 | 2.4 |
| 1669 | 55% | 41% | 4% | 0.8 to 3 | 1.8 to 2.8 | 2.0 | 2.2 | 2.4 |
| 1670 | 56% | 40% | 4% | 0.8 to 3 | 1.8 to 2.8 | 2.0 | 2.2 | 2.4 |
| 1671 | 57% | 39% | 4% | 0.8 to 3 | 1.8 to 2.8 | 2.0 | 2.2 | 2.4 |

TABLE 4-continued

| | Alkyl Sulfate Alkyl Chain Length, Wt. % | | Alkyl Ether Sulfate | | | | | |
|---|---|---|---|---|---|---|---|---|
| | | | Alkyl Chain Length, | Average mol. EO (Alternatives for each numbered species) | | | | |
| Species | 9 to 11 | 10 to 12 | Wt. % 6 | Range A | Range B | Species C | Species D | Species E |
| 1672 | 58% | 38% | 4% | 0.8 to 3 | 1.8 to 2.8 | 2.0 | 2.2 | 2.4 |
| 1673 | 59% | 37% | 4% | 0.8 to 3 | 1.8 to 2.8 | 2.0 | 2.2 | 2.4 |
| 1674 | 60% | 36% | 4% | 0.8 to 3 | 1.8 to 2.8 | 2.0 | 2.2 | 2.4 |
| 1675 | 30% | 65.5% | 4.5% | 0.8 to 3 | 1.8 to 2.8 | 2.0 | 2.2 | 2.4 |
| 1676 | 31% | 64.5% | 4.5% | 0.8 to 3 | 1.8 to 2.8 | 2.0 | 2.2 | 2.4 |
| 1677 | 32% | 63.5% | 4.5% | 0.8 to 3 | 1.8 to 2.8 | 2.0 | 2.2 | 2.4 |
| 1678 | 33% | 62.5% | 4.5% | 0.8 to 3 | 1.8 to 2.8 | 2.0 | 2.2 | 2.4 |
| 1679 | 34% | 61.5% | 4.5% | 0.8 to 3 | 1.8 to 2.8 | 2.0 | 2.2 | 2.4 |
| 1680 | 35% | 60.5% | 4.5% | 0.8 to 3 | 1.8 to 2.8 | 2.0 | 2.2 | 2.4 |
| 1681 | 36% | 59.5% | 4.5% | 0.8 to 3 | 1.8 to 2.8 | 2.0 | 2.2 | 2.4 |
| 1682 | 37% | 58.5% | 4.5% | 0.8 to 3 | 1.8 to 2.8 | 2.0 | 2.2 | 2.4 |
| 1683 | 38% | 57.5% | 4.5% | 0.8 to 3 | 1.8 to 2.8 | 2.0 | 2.2 | 2.4 |
| 1684 | 39% | 56.5% | 4.5% | 0.8 to 3 | 1.8 to 2.8 | 2.0 | 2.2 | 2.4 |
| 1685 | 40% | 55.5% | 4.5% | 0.8 to 3 | 1.8 to 2.8 | 2.0 | 2.2 | 2.4 |
| 1686 | 41% | 54.5% | 4.5% | 0.8 to 3 | 1.8 to 2.8 | 2.0 | 2.2 | 2.4 |
| 1687 | 42% | 53.5% | 4.5% | 0.8 to 3 | 1.8 to 2.8 | 2.0 | 2.2 | 2.4 |
| 1688 | 43% | 52.5% | 4.5% | 0.8 to 3 | 1.8 to 2.8 | 2.0 | 2.2 | 2.4 |
| 1689 | 44% | 51.5% | 4.5% | 0.8 to 3 | 1.8 to 2.8 | 2.0 | 2.2 | 2.4 |
| 1690 | 45% | 50.5% | 4.5% | 0.8 to 3 | 1.8 to 2.8 | 2.0 | 2.2 | 2.4 |
| 1691 | 46% | 49.5% | 4.5% | 0.8 to 3 | 1.8 to 2.8 | 2.0 | 2.2 | 2.4 |
| 1692 | 47% | 48.5% | 4.5% | 0.8 to 3 | 1.8 to 2.8 | 2.0 | 2.2 | 2.4 |
| 1693 | 48% | 47.5% | 4.5% | 0.8 to 3 | 1.8 to 2.8 | 2.0 | 2.2 | 2.4 |
| 1694 | 49% | 46.5% | 4.5% | 0.8 to 3 | 1.8 to 2.8 | 2.0 | 2.2 | 2.4 |
| 1695 | 50% | 45.5% | 4.5% | 0.8 to 3 | 1.8 to 2.8 | 2.0 | 2.2 | 2.4 |
| 1696 | 51% | 44.5% | 4.5% | 0.8 to 3 | 1.8 to 2.8 | 2.0 | 2.2 | 2.4 |
| 1697 | 52% | 43.5% | 4.5% | 0.8 to 3 | 1.8 to 2.8 | 2.0 | 2.2 | 2.4 |
| 1698 | 53% | 42.5% | 4.5% | 0.8 to 3 | 1.8 to 2.8 | 2.0 | 2.2 | 2.4 |
| 1699 | 54% | 41.5% | 4.5% | 0.8 to 3 | 1.8 to 2.8 | 2.0 | 2.2 | 2.4 |
| 1700 | 55% | 40.5% | 4.5% | 0.8 to 3 | 1.8 to 2.8 | 2.0 | 2.2 | 2.4 |
| 1701 | 56% | 39.5% | 4.5% | 0.8 to 3 | 1.8 to 2.8 | 2.0 | 2.2 | 2.4 |
| 1702 | 57% | 38.5% | 4.5% | 0.8 to 3 | 1.8 to 2.8 | 2.0 | 2.2 | 2.4 |
| 1703 | 58% | 37.5% | 4.5% | 0.8 to 3 | 1.8 to 2.8 | 2.0 | 2.2 | 2.4 |
| 1704 | 59% | 36.5% | 4.5% | 0.8 to 3 | 1.8 to 2.8 | 2.0 | 2.2 | 2.4 |
| 1705 | 60% | 35.5% | 4.5% | 0.8 to 3 | 1.8 to 2.8 | 2.0 | 2.2 | 2.4 |
| 1706 | 30% | 65% | 5% | 0.8 to 3 | 1.8 to 2.8 | 2.0 | 2.2 | 2.4 |
| 1707 | 31% | 64% | 5% | 0.8 to 3 | 1.8 to 2.8 | 2.0 | 2.2 | 2.4 |
| 1708 | 32% | 63% | 5% | 0.8 to 3 | 1.8 to 2.8 | 2.0 | 2.2 | 2.4 |
| 1709 | 33% | 62% | 5% | 0.8 to 3 | 1.8 to 2.8 | 2.0 | 2.2 | 2.4 |
| 1710 | 34% | 61% | 5% | 0.8 to 3 | 1.8 to 2.8 | 2.0 | 2.2 | 2.4 |
| 1711 | 35% | 60% | 5% | 0.8 to 3 | 1.8 to 2.8 | 2.0 | 2.2 | 2.4 |
| 1712 | 36% | 59% | 5% | 0.8 to 3 | 1.8 to 2.8 | 2.0 | 2.2 | 2.4 |
| 1713 | 37% | 58% | 5% | 0.8 to 3 | 1.8 to 2.8 | 2.0 | 2.2 | 2.4 |
| 1714 | 38% | 57% | 5% | 0.8 to 3 | 1.8 to 2.8 | 2.0 | 2.2 | 2.4 |
| 1715 | 39% | 56% | 5% | 0.8 to 3 | 1.8 to 2.8 | 2.0 | 2.2 | 2.4 |
| 1716 | 40% | 55% | 5% | 0.8 to 3 | 1.8 to 2.8 | 2.0 | 2.2 | 2.4 |
| 1717 | 41% | 54% | 5% | 0.8 to 3 | 1.8 to 2.8 | 2.0 | 2.2 | 2.4 |
| 1718 | 42% | 53% | 5% | 0.8 to 3 | 1.8 to 2.8 | 2.0 | 2.2 | 2.4 |
| 1719 | 43% | 52% | 5% | 0.8 to 3 | 1.8 to 2.8 | 2.0 | 2.2 | 2.4 |
| 1720 | 44% | 51% | 5% | 0.8 to 3 | 1.8 to 2.8 | 2.0 | 2.2 | 2.4 |
| 1721 | 45% | 50% | 5% | 0.8 to 3 | 1.8 to 2.8 | 2.0 | 2.2 | 2.4 |
| 1722 | 46% | 49% | 5% | 0.8 to 3 | 1.8 to 2.8 | 2.0 | 2.2 | 2.4 |
| 1723 | 47% | 48% | 5% | 0.8 to 3 | 1.8 to 2.8 | 2.0 | 2.2 | 2.4 |
| 1724 | 48% | 47% | 5% | 0.8 to 3 | 1.8 to 2.8 | 2.0 | 2.2 | 2.4 |
| 1725 | 49% | 46% | 5% | 0.8 to 3 | 1.8 to 2.8 | 2.0 | 2.2 | 2.4 |
| 1726 | 50% | 45% | 5% | 0.8 to 3 | 1.8 to 2.8 | 2.0 | 2.2 | 2.4 |
| 1727 | 51% | 44% | 5% | 0.8 to 3 | 1.8 to 2.8 | 2.0 | 2.2 | 2.4 |
| 1728 | 52% | 43% | 5% | 0.8 to 3 | 1.8 to 2.8 | 2.0 | 2.2 | 2.4 |
| 1729 | 53% | 42% | 5% | 0.8 to 3 | 1.8 to 2.8 | 2.0 | 2.2 | 2.4 |
| 1730 | 54% | 41% | 5% | 0.8 to 3 | 1.8 to 2.8 | 2.0 | 2.2 | 2.4 |
| 1731 | 55% | 40% | 5% | 0.8 to 3 | 1.8 to 2.8 | 2.0 | 2.2 | 2.4 |
| 1732 | 56% | 39% | 5% | 0.8 to 3 | 1.8 to 2.8 | 2.0 | 2.2 | 2.4 |
| 1733 | 57% | 38% | 5% | 0.8 to 3 | 1.8 to 2.8 | 2.0 | 2.2 | 2.4 |
| 1734 | 58% | 37% | 5% | 0.8 to 3 | 1.8 to 2.8 | 2.0 | 2.2 | 2.4 |
| 1735 | 59% | 36% | 5% | 0.8 to 3 | 1.8 to 2.8 | 2.0 | 2.2 | 2.4 |
| 1736 | 60% | 35% | 5% | 0.8 to 3 | 1.8 to 2.8 | 2.0 | 2.2 | 2.4 |
| 1737 | 30% | 64.5% | 5.5% | 0.8 to 3 | 1.8 to 2.8 | 2.0 | 2.2 | 2.4 |
| 1738 | 31% | 63.5% | 5.5% | 0.8 to 3 | 1.8 to 2.8 | 2.0 | 2.2 | 2.4 |
| 1739 | 32% | 62.5% | 5.5% | 0.8 to 3 | 1.8 to 2.8 | 2.0 | 2.2 | 2.4 |
| 1740 | 33% | 61.5% | 5.5% | 0.8 to 3 | 1.8 to 2.8 | 2.0 | 2.2 | 2.4 |
| 1741 | 34% | 60.5% | 5.5% | 0.8 to 3 | 1.8 to 2.8 | 2.0 | 2.2 | 2.4 |
| 1742 | 35% | 59.5% | 5.5% | 0.8 to 3 | 1.8 to 2.8 | 2.0 | 2.2 | 2.4 |
| 1743 | 36% | 58.5% | 5.5% | 0.8 to 3 | 1.8 to 2.8 | 2.0 | 2.2 | 2.4 |
| 1744 | 37% | 57.5% | 5.5% | 0.8 to 3 | 1.8 to 2.8 | 2.0 | 2.2 | 2.4 |
| 1745 | 38% | 56.5% | 5.5% | 0.8 to 3 | 1.8 to 2.8 | 2.0 | 2.2 | 2.4 |
| 1746 | 39% | 55.5% | 5.5% | 0.8 to 3 | 1.8 to 2.8 | 2.0 | 2.2 | 2.4 |
| 1747 | 40% | 54.5% | 5.5% | 0.8 to 3 | 1.8 to 2.8 | 2.0 | 2.2 | 2.4 |
| 1748 | 41% | 53.5% | 5.5% | 0.8 to 3 | 1.8 to 2.8 | 2.0 | 2.2 | 2.4 |
| 1749 | 42% | 52.5% | 5.5% | 0.8 to 3 | 1.8 to 2.8 | 2.0 | 2.2 | 2.4 |
| 1750 | 43% | 51.5% | 5.5% | 0.8 to 3 | 1.8 to 2.8 | 2.0 | 2.2 | 2.4 |
| 1751 | 44% | 50.5% | 5.5% | 0.8 to 3 | 1.8 to 2.8 | 2.0 | 2.2 | 2.4 |
| 1752 | 45% | 49.5% | 5.5% | 0.8 to 3 | 1.8 to 2.8 | 2.0 | 2.2 | 2.4 |
| 1753 | 46% | 48.5% | 5.5% | 0.8 to 3 | 1.8 to 2.8 | 2.0 | 2.2 | 2.4 |
| 1754 | 47% | 47.5% | 5.5% | 0.8 to 3 | 1.8 to 2.8 | 2.0 | 2.2 | 2.4 |
| 1755 | 48% | 46.5% | 5.5% | 0.8 to 3 | 1.8 to 2.8 | 2.0 | 2.2 | 2.4 |
| 1756 | 49% | 45.5% | 5.5% | 0.8 to 3 | 1.8 to 2.8 | 2.0 | 2.2 | 2.4 |
| 1757 | 50% | 44.5% | 5.5% | 0.8 to 3 | 1.8 to 2.8 | 2.0 | 2.2 | 2.4 |
| 1758 | 51% | 43.5% | 5.5% | 0.8 to 3 | 1.8 to 2.8 | 2.0 | 2.2 | 2.4 |
| 1759 | 52% | 42.5% | 5.5% | 0.8 to 3 | 1.8 to 2.8 | 2.0 | 2.2 | 2.4 |
| 1760 | 53% | 41.5% | 5.5% | 0.8 to 3 | 1.8 to 2.8 | 2.0 | 2.2 | 2.4 |
| 1761 | 54% | 40.5% | 5.5% | 0.8 to 3 | 1.8 to 2.8 | 2.0 | 2.2 | 2.4 |
| 1762 | 55% | 39.5% | 5.5% | 0.8 to 3 | 1.8 to 2.8 | 2.0 | 2.2 | 2.4 |
| 1763 | 56% | 38.5% | 5.5% | 0.8 to 3 | 1.8 to 2.8 | 2.0 | 2.2 | 2.4 |
| 1764 | 57% | 37.5% | 5.5% | 0.8 to 3 | 1.8 to 2.8 | 2.0 | 2.2 | 2.4 |
| 1765 | 58% | 36.5% | 5.5% | 0.8 to 3 | 1.8 to 2.8 | 2.0 | 2.2 | 2.4 |
| 1766 | 59% | 35.5% | 5.5% | 0.8 to 3 | 1.8 to 2.8 | 2.0 | 2.2 | 2.4 |
| 1767 | 60% | 34.5% | 5.5% | 0.8 to 3 | 1.8 to 2.8 | 2.0 | 2.2 | 2.4 |
| 1768 | 30% | 64% | 6% | 0.8 to 3 | 1.8 to 2.8 | 2.0 | 2.2 | 2.4 |
| 1769 | 31% | 63% | 6% | 0.8 to 3 | 1.8 to 2.8 | 2.0 | 2.2 | 2.4 |
| 1770 | 32% | 62% | 6% | 0.8 to 3 | 1.8 to 2.8 | 2.0 | 2.2 | 2.4 |
| 1771 | 33% | 61% | 6% | 0.8 to 3 | 1.8 to 2.8 | 2.0 | 2.2 | 2.4 |
| 1772 | 34% | 60% | 6% | 0.8 to 3 | 1.8 to 2.8 | 2.0 | 2.2 | 2.4 |
| 1773 | 35% | 59% | 6% | 0.8 to 3 | 1.8 to 2.8 | 2.0 | 2.2 | 2.4 |
| 1774 | 36% | 58% | 6% | 0.8 to 3 | 1.8 to 2.8 | 2.0 | 2.2 | 2.4 |
| 1775 | 37% | 57% | 6% | 0.8 to 3 | 1.8 to 2.8 | 2.0 | 2.2 | 2.4 |
| 1776 | 38% | 56% | 6% | 0.8 to 3 | 1.8 to 2.8 | 2.0 | 2.2 | 2.4 |
| 1777 | 39% | 55% | 6% | 0.8 to 3 | 1.8 to 2.8 | 2.0 | 2.2 | 2.4 |
| 1778 | 40% | 54% | 6% | 0.8 to 3 | 1.8 to 2.8 | 2.0 | 2.2 | 2.4 |
| 1779 | 41% | 53% | 6% | 0.8 to 3 | 1.8 to 2.8 | 2.0 | 2.2 | 2.4 |
| 1780 | 42% | 52% | 6% | 0.8 to 3 | 1.8 to 2.8 | 2.0 | 2.2 | 2.4 |
| 1781 | 43% | 51% | 6% | 0.8 to 3 | 1.8 to 2.8 | 2.0 | 2.2 | 2.4 |
| 1782 | 44% | 50% | 6% | 0.8 to 3 | 1.8 to 2.8 | 2.0 | 2.2 | 2.4 |
| 1783 | 45% | 49% | 6% | 0.8 to 3 | 1.8 to 2.8 | 2.0 | 2.2 | 2.4 |
| 1784 | 46% | 48% | 6% | 0.8 to 3 | 1.8 to 2.8 | 2.0 | 2.2 | 2.4 |
| 1785 | 47% | 47% | 6% | 0.8 to 3 | 1.8 to 2.8 | 2.0 | 2.2 | 2.4 |
| 1786 | 48% | 46% | 6% | 0.8 to 3 | 1.8 to 2.8 | 2.0 | 2.2 | 2.4 |
| 1787 | 49% | 45% | 6% | 0.8 to 3 | 1.8 to 2.8 | 2.0 | 2.2 | 2.4 |
| 1788 | 50% | 44% | 6% | 0.8 to 3 | 1.8 to 2.8 | 2.0 | 2.2 | 2.4 |
| 1789 | 51% | 43% | 6% | 0.8 to 3 | 1.8 to 2.8 | 2.0 | 2.2 | 2.4 |
| 1790 | 52% | 42% | 6% | 0.8 to 3 | 1.8 to 2.8 | 2.0 | 2.2 | 2.4 |
| 1791 | 53% | 41% | 6% | 0.8 to 3 | 1.8 to 2.8 | 2.0 | 2.2 | 2.4 |
| 1792 | 54% | 40% | 6% | 0.8 to 3 | 1.8 to 2.8 | 2.0 | 2.2 | 2.4 |
| 1793 | 55% | 39% | 6% | 0.8 to 3 | 1.8 to 2.8 | 2.0 | 2.2 | 2.4 |
| 1794 | 56% | 38% | 6% | 0.8 to 3 | 1.8 to 2.8 | 2.0 | 2.2 | 2.4 |
| 1795 | 57% | 37% | 6% | 0.8 to 3 | 1.8 to 2.8 | 2.0 | 2.2 | 2.4 |
| 1796 | 58% | 36% | 6% | 0.8 to 3 | 1.8 to 2.8 | 2.0 | 2.2 | 2.4 |
| 1797 | 59% | 35% | 6% | 0.8 to 3 | 1.8 to 2.8 | 2.0 | 2.2 | 2.4 |
| 1798 | 60% | 34% | 6% | 0.8 to 3 | 1.8 to 2.8 | 2.0 | 2.2 | 2.4 |
| 1799 | 30% | 63.5% | 6.5% | 0.8 to 3 | 1.8 to 2.8 | 2.0 | 2.2 | 2.4 |
| 1800 | 31% | 62.5% | 6.5% | 0.8 to 3 | 1.8 to 2.8 | 2.0 | 2.2 | 2.4 |
| 1801 | 32% | 61.5% | 6.5% | 0.8 to 3 | 1.8 to 2.8 | 2.0 | 2.2 | 2.4 |
| 1802 | 33% | 60.5% | 6.5% | 0.8 to 3 | 1.8 to 2.8 | 2.0 | 2.2 | 2.4 |
| 1803 | 34% | 59.5% | 6.5% | 0.8 to 3 | 1.8 to 2.8 | 2.0 | 2.2 | 2.4 |

TABLE 4-continued

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % 6 | Average mol. EO (Alternatives for each numbered species) | | | | |
| Species | 9 to 11 | 10 to 12 | | Range A | Range B | Species C | Species D | Species E |
| 1804 | 35% | 58.5% | 6.5% | 0.8 to 3 | 1.8 to 2.8 | 2.0 | 2.2 | 2.4 |
| 1805 | 36% | 57.5% | 6.5% | 0.8 to 3 | 1.8 to 2.8 | 2.0 | 2.2 | 2.4 |
| 1806 | 37% | 56.5% | 6.5% | 0.8 to 3 | 1.8 to 2.8 | 2.0 | 2.2 | 2.4 |
| 1807 | 38% | 55.5% | 6.5% | 0.8 to 3 | 1.8 to 2.8 | 2.0 | 2.2 | 2.4 |
| 1808 | 39% | 54.5% | 6.5% | 0.8 to 3 | 1.8 to 2.8 | 2.0 | 2.2 | 2.4 |
| 1809 | 40% | 53.5% | 6.5% | 0.8 to 3 | 1.8 to 2.8 | 2.0 | 2.2 | 2.4 |
| 1810 | 41% | 52.5% | 6.5% | 0.8 to 3 | 1.8 to 2.8 | 2.0 | 2.2 | 2.4 |
| 1811 | 42% | 51.5% | 6.5% | 0.8 to 3 | 1.8 to 2.8 | 2.0 | 2.2 | 2.4 |
| 1812 | 43% | 50.5% | 6.5% | 0.8 to 3 | 1.8 to 2.8 | 2.0 | 2.2 | 2.4 |
| 1813 | 44% | 49.5% | 6.5% | 0.8 to 3 | 1.8 to 2.8 | 2.0 | 2.2 | 2.4 |
| 1814 | 45% | 48.5% | 6.5% | 0.8 to 3 | 1.8 to 2.8 | 2.0 | 2.2 | 2.4 |
| 1815 | 46% | 47.5% | 6.5% | 0.8 to 3 | 1.8 to 2.8 | 2.0 | 2.2 | 2.4 |
| 1816 | 47% | 46.5% | 6.5% | 0.8 to 3 | 1.8 to 2.8 | 2.0 | 2.2 | 2.4 |
| 1817 | 48% | 45.5% | 6.5% | 0.8 to 3 | 1.8 to 2.8 | 2.0 | 2.2 | 2.4 |
| 1818 | 49% | 44.5% | 6.5% | 0.8 to 3 | 1.8 to 2.8 | 2.0 | 2.2 | 2.4 |
| 1819 | 50% | 43.5% | 6.5% | 0.8 to 3 | 1.8 to 2.8 | 2.0 | 2.2 | 2.4 |
| 1820 | 51% | 42.5% | 6.5% | 0.8 to 3 | 1.8 to 2.8 | 2.0 | 2.2 | 2.4 |
| 1821 | 52% | 41.5% | 6.5% | 0.8 to 3 | 1.8 to 2.8 | 2.0 | 2.2 | 2.4 |
| 1822 | 53% | 40.5% | 6.5% | 0.8 to 3 | 1.8 to 2.8 | 2.0 | 2.2 | 2.4 |
| 1823 | 54% | 39.5% | 6.5% | 0.8 to 3 | 1.8 to 2.8 | 2.0 | 2.2 | 2.4 |
| 1824 | 55% | 38.5% | 6.5% | 0.8 to 3 | 1.8 to 2.8 | 2.0 | 2.2 | 2.4 |
| 1825 | 56% | 37.5% | 6.5% | 0.8 to 3 | 1.8 to 2.8 | 2.0 | 2.2 | 2.4 |
| 1826 | 57% | 36.5% | 6.5% | 0.8 to 3 | 1.8 to 2.8 | 2.0 | 2.2 | 2.4 |
| 1827 | 58% | 35.5% | 6.5% | 0.8 to 3 | 1.8 to 2.8 | 2.0 | 2.2 | 2.4 |
| 1828 | 59% | 34.5% | 6.5% | 0.8 to 3 | 1.8 to 2.8 | 2.0 | 2.2 | 2.4 |
| 1829 | 60% | 33.5% | 6.5% | 0.8 to 3 | 1.8 to 2.8 | 2.0 | 2.2 | 2.4 |
| 1830 | 30% | 63% | 7% | 0.8 to 3 | 1.8 to 2.8 | 2.0 | 2.2 | 2.4 |
| 1831 | 31% | 62% | 7% | 0.8 to 3 | 1.8 to 2.8 | 2.0 | 2.2 | 2.4 |
| 1832 | 32% | 61% | 7% | 0.8 to 3 | 1.8 to 2.8 | 2.0 | 2.2 | 2.4 |
| 1833 | 33% | 60% | 7% | 0.8 to 3 | 1.8 to 2.8 | 2.0 | 2.2 | 2.4 |
| 1834 | 34% | 59% | 7% | 0.8 to 3 | 1.8 to 2.8 | 2.0 | 2.2 | 2.4 |
| 1835 | 35% | 58% | 7% | 0.8 to 3 | 1.8 to 2.8 | 2.0 | 2.2 | 2.4 |
| 1836 | 36% | 57% | 7% | 0.8 to 3 | 1.8 to 2.8 | 2.0 | 2.2 | 2.4 |
| 1837 | 37% | 56% | 7% | 0.8 to 3 | 1.8 to 2.8 | 2.0 | 2.2 | 2.4 |
| 1838 | 38% | 55% | 7% | 0.8 to 3 | 1.8 to 2.8 | 2.0 | 2.2 | 2.4 |
| 1839 | 39% | 54% | 7% | 0.8 to 3 | 1.8 to 2.8 | 2.0 | 2.2 | 2.4 |
| 1840 | 40% | 53% | 7% | 0.8 to 3 | 1.8 to 2.8 | 2.0 | 2.2 | 2.4 |
| 1841 | 41% | 52% | 7% | 0.8 to 3 | 1.8 to 2.8 | 2.0 | 2.2 | 2.4 |
| 1842 | 42% | 51% | 7% | 0.8 to 3 | 1.8 to 2.8 | 2.0 | 2.2 | 2.4 |
| 1843 | 43% | 50% | 7% | 0.8 to 3 | 1.8 to 2.8 | 2.0 | 2.2 | 2.4 |
| 1844 | 44% | 49% | 7% | 0.8 to 3 | 1.8 to 2.8 | 2.0 | 2.2 | 2.4 |
| 1845 | 45% | 48% | 7% | 0.8 to 3 | 1.8 to 2.8 | 2.0 | 2.2 | 2.4 |
| 1846 | 46% | 47% | 7% | 0.8 to 3 | 1.8 to 2.8 | 2.0 | 2.2 | 2.4 |
| 1847 | 47% | 46% | 7% | 0.8 to 3 | 1.8 to 2.8 | 2.0 | 2.2 | 2.4 |
| 1848 | 48% | 45% | 7% | 0.8 to 3 | 1.8 to 2.8 | 2.0 | 2.2 | 2.4 |
| 1849 | 49% | 44% | 7% | 0.8 to 3 | 1.8 to 2.8 | 2.0 | 2.2 | 2.4 |
| 1850 | 50% | 43% | 7% | 0.8 to 3 | 1.8 to 2.8 | 2.0 | 2.2 | 2.4 |
| 1851 | 51% | 42% | 7% | 0.8 to 3 | 1.8 to 2.8 | 2.0 | 2.2 | 2.4 |
| 1852 | 52% | 41% | 7% | 0.8 to 3 | 1.8 to 2.8 | 2.0 | 2.2 | 2.4 |
| 1853 | 53% | 40% | 7% | 0.8 to 3 | 1.8 to 2.8 | 2.0 | 2.2 | 2.4 |
| 1854 | 54% | 39% | 7% | 0.8 to 3 | 1.8 to 2.8 | 2.0 | 2.2 | 2.4 |
| 1855 | 55% | 38% | 7% | 0.8 to 3 | 1.8 to 2.8 | 2.0 | 2.2 | 2.4 |
| 1856 | 56% | 37% | 7% | 0.8 to 3 | 1.8 to 2.8 | 2.0 | 2.2 | 2.4 |
| 1857 | 57% | 36% | 7% | 0.8 to 3 | 1.8 to 2.8 | 2.0 | 2.2 | 2.4 |
| 1858 | 58% | 35% | 7% | 0.8 to 3 | 1.8 to 2.8 | 2.0 | 2.2 | 2.4 |
| 1859 | 59% | 34% | 7% | 0.8 to 3 | 1.8 to 2.8 | 2.0 | 2.2 | 2.4 |
| 1860 | 60% | 33% | 7% | 0.8 to 3 | 1.8 to 2.8 | 2.0 | 2.2 | 2.4 |

TABLE 5

| | Alkyl Sulfate Alkyl Chain Length, Wt. % | Alkyl Ether Sulfate | | | | | |
|---|---|---|---|---|---|---|---|
| | | Alkyl Chain Length, Wt. % 6 | Average mol. EO (Alternatives for each numbered species) | | | | |
| Species | 10 to 12 | | Range A | Range B | Species C | Species D | Species E |
| 1866 | 30% 70% | 0% | 0.8 to 3 | 1.8 to 2.8 | 2.0 | 2.2 | 2.4 |
| 1867 | 31% 69% | 0% | 0.8 to 3 | 1.8 to 2.8 | 2.0 | 2.2 | 2.4 |
| 1868 | 32% 68% | 0% | 0.8 to 3 | 1.8 to 2.8 | 2.0 | 2.2 | 2.4 |
| 1869 | 33% 67% | 0% | 0.8 to 3 | 1.8 to 2.8 | 2.0 | 2.2 | 2.4 |
| 1870 | 34% 66% | 0% | 0.8 to 3 | 1.8 to 2.8 | 2.0 | 2.2 | 2.4 |
| 1871 | 35% 65% | 0% | 0.8 to 3 | 1.8 to 2.8 | 2.0 | 2.2 | 2.4 |
| 1872 | 36% 64% | 0% | 0.8 to 3 | 1.8 to 2.8 | 2.0 | 2.2 | 2.4 |
| 1873 | 37% 63% | 0% | 0.8 to 3 | 1.8 to 2.8 | 2.0 | 2.2 | 2.4 |
| 1874 | 38% 62% | 0% | 0.8 to 3 | 1.8 to 2.8 | 2.0 | 2.2 | 2.4 |
| 1875 | 39% 61% | 0% | 0.8 to 3 | 1.8 to 2.8 | 2.0 | 2.2 | 2.4 |
| 1876 | 40% 60% | 0% | 0.8 to 3 | 1.8 to 2.8 | 2.0 | 2.2 | 2.4 |
| 1877 | 41% 59% | 0% | 0.8 to 3 | 1.8 to 2.8 | 2.0 | 2.2 | 2.4 |
| 1878 | 42% 58% | 0% | 0.8 to 3 | 1.8 to 2.8 | 2.0 | 2.2 | 2.4 |
| 1879 | 43% 57% | 0% | 0.8 to 3 | 1.8 to 2.8 | 2.0 | 2.2 | 2.4 |
| 1880 | 44% 56% | 0% | 0.8 to 3 | 1.8 to 2.8 | 2.0 | 2.2 | 2.4 |
| 1881 | 45% 55% | 0% | 0.8 to 3 | 1.8 to 2.8 | 2.0 | 2.2 | 2.4 |
| 1882 | 46% 54% | 0% | 0.8 to 3 | 1.8 to 2.8 | 2.0 | 2.2 | 2.4 |
| 1883 | 47% 53% | 0% | 0.8 to 3 | 1.8 to 2.8 | 2.0 | 2.2 | 2.4 |
| 1884 | 48% 52% | 0% | 0.8 to 3 | 1.8 to 2.8 | 2.0 | 2.2 | 2.4 |
| 1885 | 49% 51% | 0% | 0.8 to 3 | 1.8 to 2.8 | 2.0 | 2.2 | 2.4 |
| 1886 | 50% 50% | 0% | 0.8 to 3 | 1.8 to 2.8 | 2.0 | 2.2 | 2.4 |
| 1887 | 51% 49% | 0% | 0.8 to 3 | 1.8 to 2.8 | 2.0 | 2.2 | 2.4 |
| 1888 | 52% 48% | 0% | 0.8 to 3 | 1.8 to 2.8 | 2.0 | 2.2 | 2.4 |
| 1889 | 53% 47% | 0% | 0.8 to 3 | 1.8 to 2.8 | 2.0 | 2.2 | 2.4 |
| 1890 | 54% 46% | 0% | 0.8 to 3 | 1.8 to 2.8 | 2.0 | 2.2 | 2.4 |
| 1891 | 55% 45% | 0% | 0.8 to 3 | 1.8 to 2.8 | 2.0 | 2.2 | 2.4 |
| 1892 | 56% 44% | 0% | 0.8 to 3 | 1.8 to 2.8 | 2.0 | 2.2 | 2.4 |
| 1893 | 57% 43% | 0% | 0.8 to 3 | 1.8 to 2.8 | 2.0 | 2.2 | 2.4 |
| 1894 | 58% 42% | 0% | 0.8 to 3 | 1.8 to 2.8 | 2.0 | 2.2 | 2.4 |
| 1895 | 59% 41% | 0% | 0.8 to 3 | 1.8 to 2.8 | 2.0 | 2.2 | 2.4 |
| 1896 | 60% 40% | 0% | 0.8 to 3 | 1.8 to 2.8 | 2.0 | 2.2 | 2.4 |
| 1897 | 30% 70% | 0.5% | 0.8 to 3 | 1.8 to 2.8 | 2.0 | 2.2 | 2.4 |
| 1898 | 31% 69% | 0.5% | 0.8 to 3 | 1.8 to 2.8 | 2.0 | 2.2 | 2.4 |
| 1899 | 32% 68% | 0.5% | 0.8 to 3 | 1.8 to 2.8 | 2.0 | 2.2 | 2.4 |
| 1900 | 33% 67% | 0.5% | 0.8 to 3 | 1.8 to 2.8 | 2.0 | 2.2 | 2.4 |
| 1901 | 34% 66% | 0.5% | 0.8 to 3 | 1.8 to 2.8 | 2.0 | 2.2 | 2.4 |
| 1902 | 35% 65% | 0.5% | 0.8 to 3 | 1.8 to 2.8 | 2.0 | 2.2 | 2.4 |
| 1903 | 36% 64% | 0.5% | 0.8 to 3 | 1.8 to 2.8 | 2.0 | 2.2 | 2.4 |
| 1904 | 37% 63% | 0.5% | 0.8 to 3 | 1.8 to 2.8 | 2.0 | 2.2 | 2.4 |
| 1905 | 38% 62% | 0.5% | 0.8 to 3 | 1.8 to 2.8 | 2.0 | 2.2 | 2.4 |
| 1906 | 39% 61% | 0.5% | 0.8 to 3 | 1.8 to 2.8 | 2.0 | 2.2 | 2.4 |
| 1907 | 40% 60% | 0.5% | 0.8 to 3 | 1.8 to 2.8 | 2.0 | 2.2 | 2.4 |
| 1908 | 41% 59% | 0.5% | 0.8 to 3 | 1.8 to 2.8 | 2.0 | 2.2 | 2.4 |
| 1909 | 42% 58% | 0.5% | 0.8 to 3 | 1.8 to 2.8 | 2.0 | 2.2 | 2.4 |
| 1910 | 43% 57% | 0.5% | 0.8 to 3 | 1.8 to 2.8 | 2.0 | 2.2 | 2.4 |
| 1911 | 44% 56% | 0.5% | 0.8 to 3 | 1.8 to 2.8 | 2.0 | 2.2 | 2.4 |
| 1912 | 45% 55% | 0.5% | 0.8 to 3 | 1.8 to 2.8 | 2.0 | 2.2 | 2.4 |
| 1913 | 46% 54% | 0.5% | 0.8 to 3 | 1.8 to 2.8 | 2.0 | 2.2 | 2.4 |
| 1914 | 47% 53% | 0.5% | 0.8 to 3 | 1.8 to 2.8 | 2.0 | 2.2 | 2.4 |
| 1915 | 48% 52% | 0.5% | 0.8 to 3 | 1.8 to 2.8 | 2.0 | 2.2 | 2.4 |
| 1916 | 49% 51% | 0.5% | 0.8 to 3 | 1.8 to 2.8 | 2.0 | 2.2 | 2.4 |
| 1917 | 50% 50% | 0.5% | 0.8 to 3 | 1.8 to 2.8 | 2.0 | 2.2 | 2.4 |
| 1918 | 51% 49% | 0.5% | 0.8 to 3 | 1.8 to 2.8 | 2.0 | 2.2 | 2.4 |
| 1919 | 52% 48% | 0.5% | 0.8 to 3 | 1.8 to 2.8 | 2.0 | 2.2 | 2.4 |
| 1920 | 53% 47% | 0.5% | 0.8 to 3 | 1.8 to 2.8 | 2.0 | 2.2 | 2.4 |
| 1921 | 54% 46% | 0.5% | 0.8 to 3 | 1.8 to 2.8 | 2.0 | 2.2 | 2.4 |
| 1922 | 55% 45% | 0.5% | 0.8 to 3 | 1.8 to 2.8 | 2.0 | 2.2 | 2.4 |
| 1923 | 56% 44% | 0.5% | 0.8 to 3 | 1.8 to 2.8 | 2.0 | 2.2 | 2.4 |
| 1924 | 57% 43% | 0.5% | 0.8 to 3 | 1.8 to 2.8 | 2.0 | 2.2 | 2.4 |
| 1925 | 58% 42% | 0.5% | 0.8 to 3 | 1.8 to 2.8 | 2.0 | 2.2 | 2.4 |
| 1926 | 59% 41% | 0.5% | 0.8 to 3 | 1.8 to 2.8 | 2.0 | 2.2 | 2.4 |
| 1927 | 60% 40% | 0.5% | 0.8 to 3 | 1.8 to 2.8 | 2.0 | 2.2 | 2.4 |
| 1928 | 30% 69% | 1% | 0.8 to 3 | 1.8 to 2.8 | 2.0 | 2.2 | 2.4 |
| 1929 | 31% 68% | 1% | 0.8 to 3 | 1.8 to 2.8 | 2.0 | 2.2 | 2.4 |
| 1930 | 32% 67% | 1% | 0.8 to 3 | 1.8 to 2.8 | 2.0 | 2.2 | 2.4 |
| 1931 | 33% 66% | 1% | 0.8 to 3 | 1.8 to 2.8 | 2.0 | 2.2 | 2.4 |
| 1932 | 34% 65% | 1% | 0.8 to 3 | 1.8 to 2.8 | 2.0 | 2.2 | 2.4 |
| 1933 | 35% 64% | 1% | 0.8 to 3 | 1.8 to 2.8 | 2.0 | 2.2 | 2.4 |
| 1934 | 36% 63% | 1% | 0.8 to 3 | 1.8 to 2.8 | 2.0 | 2.2 | 2.4 |

TABLE 5-continued

|  | Alkyl Sulfate Alkyl Chain Length, Wt. % | | Alkyl Ether Sulfate | | | | | |
|---|---|---|---|---|---|---|---|---|
|  | | | Alkyl Chain Length, Wt. % 6 | Average mol. EO (Alternatives for each numbered species) | | | | |
| Species | 8 | 10 to 12 | | Range A | Range B | Species C | Species D | Species E |
| 1935 | 37% | 62% | 1% | 0.8 to 3 | 1.8 to 2.8 | 2.0 | 2.2 | 2.4 |
| 1936 | 38% | 61% | 1% | 0.8 to 3 | 1.8 to 2.8 | 2.0 | 2.2 | 2.4 |
| 1937 | 39% | 60% | 1% | 0.8 to 3 | 1.8 to 2.8 | 2.0 | 2.2 | 2.4 |
| 1938 | 40% | 59% | 1% | 0.8 to 3 | 1.8 to 2.8 | 2.0 | 2.2 | 2.4 |
| 1939 | 41% | 58% | 1% | 0.8 to 3 | 1.8 to 2.8 | 2.0 | 2.2 | 2.4 |
| 1940 | 42% | 57% | 1% | 0.8 to 3 | 1.8 to 2.8 | 2.0 | 2.2 | 2.4 |
| 1941 | 43% | 56% | 1% | 0.8 to 3 | 1.8 to 2.8 | 2.0 | 2.2 | 2.4 |
| 1942 | 44% | 55% | 1% | 0.8 to 3 | 1.8 to 2.8 | 2.0 | 2.2 | 2.4 |
| 1943 | 45% | 54% | 1% | 0.8 to 3 | 1.8 to 2.8 | 2.0 | 2.2 | 2.4 |
| 1944 | 46% | 53% | 1% | 0.8 to 3 | 1.8 to 2.8 | 2.0 | 2.2 | 2.4 |
| 1945 | 47% | 52% | 1% | 0.8 to 3 | 1.8 to 2.8 | 2.0 | 2.2 | 2.4 |
| 1946 | 48% | 51% | 1% | 0.8 to 3 | 1.8 to 2.8 | 2.0 | 2.2 | 2.4 |
| 1947 | 49% | 50% | 1% | 0.8 to 3 | 1.8 to 2.8 | 2.0 | 2.2 | 2.4 |
| 1948 | 50% | 49% | 1% | 0.8 to 3 | 1.8 to 2.8 | 2.0 | 2.2 | 2.4 |
| 1949 | 51% | 48% | 1% | 0.8 to 3 | 1.8 to 2.8 | 2.0 | 2.2 | 2.4 |
| 1950 | 52% | 47% | 1% | 0.8 to 3 | 1.8 to 2.8 | 2.0 | 2.2 | 2.4 |
| 1951 | 53% | 46% | 1% | 0.8 to 3 | 1.8 to 2.8 | 2.0 | 2.2 | 2.4 |
| 1952 | 54% | 45% | 1% | 0.8 to 3 | 1.8 to 2.8 | 2.0 | 2.2 | 2.4 |
| 1953 | 55% | 44% | 1% | 0.8 to 3 | 1.8 to 2.8 | 2.0 | 2.2 | 2.4 |
| 1954 | 56% | 43% | 1% | 0.8 to 3 | 1.8 to 2.8 | 2.0 | 2.2 | 2.4 |
| 1955 | 57% | 42% | 1% | 0.8 to 3 | 1.8 to 2.8 | 2.0 | 2.2 | 2.4 |
| 1956 | 58% | 41% | 1% | 0.8 to 3 | 1.8 to 2.8 | 2.0 | 2.2 | 2.4 |
| 1957 | 59% | 40% | 1% | 0.8 to 3 | 1.8 to 2.8 | 2.0 | 2.2 | 2.4 |
| 1958 | 60% | 39% | 1% | 0.8 to 3 | 1.8 to 2.8 | 2.0 | 2.2 | 2.4 |
| 1959 | 30% | 69% | 1.5% | 0.8 to 3 | 1.8 to 2.8 | 2.0 | 2.2 | 2.4 |
| 1960 | 31% | 68% | 1.5% | 0.8 to 3 | 1.8 to 2.8 | 2.0 | 2.2 | 2.4 |
| 1961 | 32% | 67% | 1.5% | 0.8 to 3 | 1.8 to 2.8 | 2.0 | 2.2 | 2.4 |
| 1962 | 33% | 66% | 1.5% | 0.8 to 3 | 1.8 to 2.8 | 2.0 | 2.2 | 2.4 |
| 1963 | 34% | 65% | 1.5% | 0.8 to 3 | 1.8 to 2.8 | 2.0 | 2.2 | 2.4 |
| 1964 | 35% | 64% | 1.5% | 0.8 to 3 | 1.8 to 2.8 | 2.0 | 2.2 | 2.4 |
| 1965 | 36% | 63% | 1.5% | 0.8 to 3 | 1.8 to 2.8 | 2.0 | 2.2 | 2.4 |
| 1966 | 37% | 62% | 1.5% | 0.8 to 3 | 1.8 to 2.8 | 2.0 | 2.2 | 2.4 |
| 1967 | 38% | 61% | 1.5% | 0.8 to 3 | 1.8 to 2.8 | 2.0 | 2.2 | 2.4 |
| 1968 | 39% | 60% | 1.5% | 0.8 to 3 | 1.8 to 2.8 | 2.0 | 2.2 | 2.4 |
| 1969 | 40% | 59% | 1.5% | 0.8 to 3 | 1.8 to 2.8 | 2.0 | 2.2 | 2.4 |
| 1970 | 41% | 58% | 1.5% | 0.8 to 3 | 1.8 to 2.8 | 2.0 | 2.2 | 2.4 |
| 1971 | 42% | 57% | 1.5% | 0.8 to 3 | 1.8 to 2.8 | 2.0 | 2.2 | 2.4 |
| 1972 | 43% | 56% | 1.5% | 0.8 to 3 | 1.8 to 2.8 | 2.0 | 2.2 | 2.4 |
| 1973 | 44% | 55% | 1.5% | 0.8 to 3 | 1.8 to 2.8 | 2.0 | 2.2 | 2.4 |
| 1974 | 45% | 54% | 1.5% | 0.8 to 3 | 1.8 to 2.8 | 2.0 | 2.2 | 2.4 |
| 1975 | 46% | 53% | 1.5% | 0.8 to 3 | 1.8 to 2.8 | 2.0 | 2.2 | 2.4 |
| 1976 | 47% | 52% | 1.5% | 0.8 to 3 | 1.8 to 2.8 | 2.0 | 2.2 | 2.4 |
| 1977 | 48% | 51% | 1.5% | 0.8 to 3 | 1.8 to 2.8 | 2.0 | 2.2 | 2.4 |
| 1978 | 49% | 50% | 1.5% | 0.8 to 3 | 1.8 to 2.8 | 2.0 | 2.2 | 2.4 |
| 1979 | 50% | 49% | 1.5% | 0.8 to 3 | 1.8 to 2.8 | 2.0 | 2.2 | 2.4 |
| 1980 | 51% | 48% | 1.5% | 0.8 to 3 | 1.8 to 2.8 | 2.0 | 2.2 | 2.4 |
| 1981 | 52% | 47% | 1.5% | 0.8 to 3 | 1.8 to 2.8 | 2.0 | 2.2 | 2.4 |
| 1982 | 53% | 46% | 1.5% | 0.8 to 3 | 1.8 to 2.8 | 2.0 | 2.2 | 2.4 |
| 1983 | 54% | 45% | 1.5% | 0.8 to 3 | 1.8 to 2.8 | 2.0 | 2.2 | 2.4 |
| 1984 | 55% | 44% | 1.5% | 0.8 to 3 | 1.8 to 2.8 | 2.0 | 2.2 | 2.4 |
| 1985 | 56% | 43% | 1.5% | 0.8 to 3 | 1.8 to 2.8 | 2.0 | 2.2 | 2.4 |
| 1986 | 57% | 42% | 1.5% | 0.8 to 3 | 1.8 to 2.8 | 2.0 | 2.2 | 2.4 |
| 1987 | 58% | 41% | 1.5% | 0.8 to 3 | 1.8 to 2.8 | 2.0 | 2.2 | 2.4 |
| 1988 | 59% | 40% | 1.5% | 0.8 to 3 | 1.8 to 2.8 | 2.0 | 2.2 | 2.4 |
| 1989 | 60% | 39% | 1.5% | 0.8 to 3 | 1.8 to 2.8 | 2.0 | 2.2 | 2.4 |
| 1990 | 30% | 68% | 2% | 0.8 to 3 | 1.8 to 2.8 | 2.0 | 2.2 | 2.4 |
| 1991 | 31% | 67% | 2% | 0.8 to 3 | 1.8 to 2.8 | 2.0 | 2.2 | 2.4 |
| 1992 | 32% | 66% | 2% | 0.8 to 3 | 1.8 to 2.8 | 2.0 | 2.2 | 2.4 |
| 1993 | 33% | 65% | 2% | 0.8 to 3 | 1.8 to 2.8 | 2.0 | 2.2 | 2.4 |
| 1994 | 34% | 64% | 2% | 0.8 to 3 | 1.8 to 2.8 | 2.0 | 2.2 | 2.4 |
| 1995 | 35% | 63% | 2% | 0.8 to 3 | 1.8 to 2.8 | 2.0 | 2.2 | 2.4 |
| 1996 | 36% | 62% | 2% | 0.8 to 3 | 1.8 to 2.8 | 2.0 | 2.2 | 2.4 |
| 1997 | 37% | 61% | 2% | 0.8 to 3 | 1.8 to 2.8 | 2.0 | 2.2 | 2.4 |
| 1998 | 38% | 60% | 2% | 0.8 to 3 | 1.8 to 2.8 | 2.0 | 2.2 | 2.4 |
| 1999 | 39% | 59% | 2% | 0.8 to 3 | 1.8 to 2.8 | 2.0 | 2.2 | 2.4 |
| 2000 | 40% | 58% | 2% | 0.8 to 3 | 1.8 to 2.8 | 2.0 | 2.2 | 2.4 |
| 2001 | 41% | 57% | 2% | 0.8 to 3 | 1.8 to 2.8 | 2.0 | 2.2 | 2.4 |
| 2002 | 42% | 56% | 2% | 0.8 to 3 | 1.8 to 2.8 | 2.0 | 2.2 | 2.4 |
| 2003 | 43% | 55% | 2% | 0.8 to 3 | 1.8 to 2.8 | 2.0 | 2.2 | 2.4 |
| 2004 | 44% | 54% | 2% | 0.8 to 3 | 1.8 to 2.8 | 2.0 | 2.2 | 2.4 |
| 2005 | 45% | 53% | 2% | 0.8 to 3 | 1.8 to 2.8 | 2.0 | 2.2 | 2.4 |
| 2006 | 46% | 52% | 2% | 0.8 to 3 | 1.8 to 2.8 | 2.0 | 2.2 | 2.4 |
| 2007 | 47% | 51% | 2% | 0.8 to 3 | 1.8 to 2.8 | 2.0 | 2.2 | 2.4 |
| 2008 | 48% | 50% | 2% | 0.8 to 3 | 1.8 to 2.8 | 2.0 | 2.2 | 2.4 |
| 2009 | 49% | 49% | 2% | 0.8 to 3 | 1.8 to 2.8 | 2.0 | 2.2 | 2.4 |
| 2010 | 50% | 48% | 2% | 0.8 to 3 | 1.8 to 2.8 | 2.0 | 2.2 | 2.4 |
| 2011 | 51% | 47% | 2% | 0.8 to 3 | 1.8 to 2.8 | 2.0 | 2.2 | 2.4 |
| 2012 | 52% | 46% | 2% | 0.8 to 3 | 1.8 to 2.8 | 2.0 | 2.2 | 2.4 |
| 2013 | 53% | 45% | 2% | 0.8 to 3 | 1.8 to 2.8 | 2.0 | 2.2 | 2.4 |
| 2014 | 54% | 44% | 2% | 0.8 to 3 | 1.8 to 2.8 | 2.0 | 2.2 | 2.4 |
| 2015 | 55% | 43% | 2% | 0.8 to 3 | 1.8 to 2.8 | 2.0 | 2.2 | 2.4 |
| 2016 | 56% | 42% | 2% | 0.8 to 3 | 1.8 to 2.8 | 2.0 | 2.2 | 2.4 |
| 2017 | 57% | 41% | 2% | 0.8 to 3 | 1.8 to 2.8 | 2.0 | 2.2 | 2.4 |
| 2018 | 58% | 40% | 2% | 0.8 to 3 | 1.8 to 2.8 | 2.0 | 2.2 | 2.4 |
| 2019 | 59% | 39% | 2% | 0.8 to 3 | 1.8 to 2.8 | 2.0 | 2.2 | 2.4 |
| 2020 | 60% | 38% | 2% | 0.8 to 3 | 1.8 to 2.8 | 2.0 | 2.2 | 2.4 |
| 2021 | 30% | 68% | 2.5% | 0.8 to 3 | 1.8 to 2.8 | 2.0 | 2.2 | 2.4 |
| 2022 | 31% | 67% | 2.5% | 0.8 to 3 | 1.8 to 2.8 | 2.0 | 2.2 | 2.4 |
| 2023 | 32% | 66% | 2.5% | 0.8 to 3 | 1.8 to 2.8 | 2.0 | 2.2 | 2.4 |
| 2024 | 33% | 65% | 2.5% | 0.8 to 3 | 1.8 to 2.8 | 2.0 | 2.2 | 2.4 |
| 2025 | 34% | 64% | 2.5% | 0.8 to 3 | 1.8 to 2.8 | 2.0 | 2.2 | 2.4 |
| 2026 | 35% | 63% | 2.5% | 0.8 to 3 | 1.8 to 2.8 | 2.0 | 2.2 | 2.4 |
| 2027 | 36% | 62% | 2.5% | 0.8 to 3 | 1.8 to 2.8 | 2.0 | 2.2 | 2.4 |
| 2028 | 37% | 61% | 2.5% | 0.8 to 3 | 1.8 to 2.8 | 2.0 | 2.2 | 2.4 |
| 2029 | 38% | 60% | 2.5% | 0.8 to 3 | 1.8 to 2.8 | 2.0 | 2.2 | 2.4 |
| 2030 | 39% | 59% | 2.5% | 0.8 to 3 | 1.8 to 2.8 | 2.0 | 2.2 | 2.4 |
| 2031 | 40% | 58% | 2.5% | 0.8 to 3 | 1.8 to 2.8 | 2.0 | 2.2 | 2.4 |
| 2032 | 41% | 57% | 2.5% | 0.8 to 3 | 1.8 to 2.8 | 2.0 | 2.2 | 2.4 |
| 2033 | 42% | 56% | 2.5% | 0.8 to 3 | 1.8 to 2.8 | 2.0 | 2.2 | 2.4 |
| 2034 | 43% | 55% | 2.5% | 0.8 to 3 | 1.8 to 2.8 | 2.0 | 2.2 | 2.4 |
| 2035 | 44% | 54% | 2.5% | 0.8 to 3 | 1.8 to 2.8 | 2.0 | 2.2 | 2.4 |
| 2036 | 45% | 53% | 2.5% | 0.8 to 3 | 1.8 to 2.8 | 2.0 | 2.2 | 2.4 |
| 2037 | 46% | 52% | 2.5% | 0.8 to 3 | 1.8 to 2.8 | 2.0 | 2.2 | 2.4 |
| 2038 | 47% | 51% | 2.5% | 0.8 to 3 | 1.8 to 2.8 | 2.0 | 2.2 | 2.4 |
| 2039 | 48% | 50% | 2.5% | 0.8 to 3 | 1.8 to 2.8 | 2.0 | 2.2 | 2.4 |
| 2040 | 49% | 49% | 2.5% | 0.8 to 3 | 1.8 to 2.8 | 2.0 | 2.2 | 2.4 |
| 2041 | 50% | 48% | 2.5% | 0.8 to 3 | 1.8 to 2.8 | 2.0 | 2.2 | 2.4 |
| 2042 | 51% | 47% | 2.5% | 0.8 to 3 | 1.8 to 2.8 | 2.0 | 2.2 | 2.4 |
| 2043 | 52% | 46% | 2.5% | 0.8 to 3 | 1.8 to 2.8 | 2.0 | 2.2 | 2.4 |
| 2044 | 53% | 45% | 2.5% | 0.8 to 3 | 1.8 to 2.8 | 2.0 | 2.2 | 2.4 |
| 2045 | 54% | 44% | 2.5% | 0.8 to 3 | 1.8 to 2.8 | 2.0 | 2.2 | 2.4 |
| 2046 | 55% | 43% | 2.5% | 0.8 to 3 | 1.8 to 2.8 | 2.0 | 2.2 | 2.4 |
| 2047 | 56% | 42% | 2.5% | 0.8 to 3 | 1.8 to 2.8 | 2.0 | 2.2 | 2.4 |
| 2048 | 57% | 41% | 2.5% | 0.8 to 3 | 1.8 to 2.8 | 2.0 | 2.2 | 2.4 |
| 2049 | 58% | 40% | 2.5% | 0.8 to 3 | 1.8 to 2.8 | 2.0 | 2.2 | 2.4 |
| 2050 | 59% | 39% | 2.5% | 0.8 to 3 | 1.8 to 2.8 | 2.0 | 2.2 | 2.4 |
| 2051 | 60% | 38% | 2.5% | 0.8 to 3 | 1.8 to 2.8 | 2.0 | 2.2 | 2.4 |
| 2052 | 30% | 67% | 3% | 0.8 to 3 | 1.8 to 2.8 | 2.0 | 2.2 | 2.4 |
| 2053 | 31% | 66% | 3% | 0.8 to 3 | 1.8 to 2.8 | 2.0 | 2.2 | 2.4 |
| 2054 | 32% | 65% | 3% | 0.8 to 3 | 1.8 to 2.8 | 2.0 | 2.2 | 2.4 |
| 2055 | 33% | 64% | 3% | 0.8 to 3 | 1.8 to 2.8 | 2.0 | 2.2 | 2.4 |
| 2056 | 34% | 63% | 3% | 0.8 to 3 | 1.8 to 2.8 | 2.0 | 2.2 | 2.4 |
| 2057 | 35% | 62% | 3% | 0.8 to 3 | 1.8 to 2.8 | 2.0 | 2.2 | 2.4 |
| 2058 | 36% | 61% | 3% | 0.8 to 3 | 1.8 to 2.8 | 2.0 | 2.2 | 2.4 |
| 2059 | 37% | 60% | 3% | 0.8 to 3 | 1.8 to 2.8 | 2.0 | 2.2 | 2.4 |
| 2060 | 38% | 59% | 3% | 0.8 to 3 | 1.8 to 2.8 | 2.0 | 2.2 | 2.4 |
| 2061 | 39% | 58% | 3% | 0.8 to 3 | 1.8 to 2.8 | 2.0 | 2.2 | 2.4 |
| 2062 | 40% | 57% | 3% | 0.8 to 3 | 1.8 to 2.8 | 2.0 | 2.2 | 2.4 |
| 2063 | 41% | 56% | 3% | 0.8 to 3 | 1.8 to 2.8 | 2.0 | 2.2 | 2.4 |
| 2064 | 42% | 55% | 3% | 0.8 to 3 | 1.8 to 2.8 | 2.0 | 2.2 | 2.4 |
| 2065 | 43% | 54% | 3% | 0.8 to 3 | 1.8 to 2.8 | 2.0 | 2.2 | 2.4 |
| 2066 | 44% | 53% | 3% | 0.8 to 3 | 1.8 to 2.8 | 2.0 | 2.2 | 2.4 |
| 2067 | 45% | 52% | 3% | 0.8 to 3 | 1.8 to 2.8 | 2.0 | 2.2 | 2.4 |
| 2068 | 46% | 51% | 3% | 0.8 to 3 | 1.8 to 2.8 | 2.0 | 2.2 | 2.4 |
| 2069 | 47% | 50% | 3% | 0.8 to 3 | 1.8 to 2.8 | 2.0 | 2.2 | 2.4 |
| 2070 | 48% | 49% | 3% | 0.8 to 3 | 1.8 to 2.8 | 2.0 | 2.2 | 2.4 |
| 2071 | 49% | 48% | 3% | 0.8 to 3 | 1.8 to 2.8 | 2.0 | 2.2 | 2.4 |
| 2072 | 50% | 47% | 3% | 0.8 to 3 | 1.8 to 2.8 | 2.0 | 2.2 | 2.4 |

TABLE 5-continued

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % 6 | Average mol. EO (Alternatives for each numbered species) | | | | |
| Species | 8 | 10 to 12 | | Range A | Range B | Species C | Species D | Species E |
| 2073 | 51% | 46% | 3% | 0.8 to 3 | 1.8 to 2.8 | 2.0 | 2.2 | 2.4 |
| 2074 | 52% | 45% | 3% | 0.8 to 3 | 1.8 to 2.8 | 2.0 | 2.2 | 2.4 |
| 2075 | 53% | 44% | 3% | 0.8 to 3 | 1.8 to 2.8 | 2.0 | 2.2 | 2.4 |
| 2076 | 54% | 43% | 3% | 0.8 to 3 | 1.8 to 2.8 | 2.0 | 2.2 | 2.4 |
| 2077 | 55% | 42% | 3% | 0.8 to 3 | 1.8 to 2.8 | 2.0 | 2.2 | 2.4 |
| 2078 | 56% | 41% | 3% | 0.8 to 3 | 1.8 to 2.8 | 2.0 | 2.2 | 2.4 |
| 2079 | 57% | 40% | 3% | 0.8 to 3 | 1.8 to 2.8 | 2.0 | 2.2 | 2.4 |
| 2080 | 58% | 39% | 3% | 0.8 to 3 | 1.8 to 2.8 | 2.0 | 2.2 | 2.4 |
| 2081 | 59% | 38% | 3% | 0.8 to 3 | 1.8 to 2.8 | 2.0 | 2.2 | 2.4 |
| 2082 | 60% | 37% | 3% | 0.8 to 3 | 1.8 to 2.8 | 2.0 | 2.2 | 2.4 |
| 2083 | 30% | 67% | 3.5% | 0.8 to 3 | 1.8 to 2.8 | 2.0 | 2.2 | 2.4 |
| 2084 | 31% | 66% | 3.5% | 0.8 to 3 | 1.8 to 2.8 | 2.0 | 2.2 | 2.4 |
| 2085 | 32% | 65% | 3.5% | 0.8 to 3 | 1.8 to 2.8 | 2.0 | 2.2 | 2.4 |
| 2086 | 33% | 64% | 3.5% | 0.8 to 3 | 1.8 to 2.8 | 2.0 | 2.2 | 2.4 |
| 2087 | 34% | 63% | 3.5% | 0.8 to 3 | 1.8 to 2.8 | 2.0 | 2.2 | 2.4 |
| 2088 | 35% | 62% | 3.5% | 0.8 to 3 | 1.8 to 2.8 | 2.0 | 2.2 | 2.4 |
| 2089 | 36% | 61% | 3.5% | 0.8 to 3 | 1.8 to 2.8 | 2.0 | 2.2 | 2.4 |
| 2090 | 37% | 60% | 3.5% | 0.8 to 3 | 1.8 to 2.8 | 2.0 | 2.2 | 2.4 |
| 2091 | 38% | 59% | 3.5% | 0.8 to 3 | 1.8 to 2.8 | 2.0 | 2.2 | 2.4 |
| 2092 | 39% | 58% | 3.5% | 0.8 to 3 | 1.8 to 2.8 | 2.0 | 2.2 | 2.4 |
| 2093 | 40% | 57% | 3.5% | 0.8 to 3 | 1.8 to 2.8 | 2.0 | 2.2 | 2.4 |
| 2094 | 41% | 56% | 3.5% | 0.8 to 3 | 1.8 to 2.8 | 2.0 | 2.2 | 2.4 |
| 2095 | 42% | 55% | 3.5% | 0.8 to 3 | 1.8 to 2.8 | 2.0 | 2.2 | 2.4 |
| 2096 | 43% | 54% | 3.5% | 0.8 to 3 | 1.8 to 2.8 | 2.0 | 2.2 | 2.4 |
| 2097 | 44% | 53% | 3.5% | 0.8 to 3 | 1.8 to 2.8 | 2.0 | 2.2 | 2.4 |
| 2098 | 45% | 52% | 3.5% | 0.8 to 3 | 1.8 to 2.8 | 2.0 | 2.2 | 2.4 |
| 2099 | 46% | 51% | 3.5% | 0.8 to 3 | 1.8 to 2.8 | 2.0 | 2.2 | 2.4 |
| 2100 | 47% | 50% | 3.5% | 0.8 to 3 | 1.8 to 2.8 | 2.0 | 2.2 | 2.4 |
| 2101 | 48% | 49% | 3.5% | 0.8 to 3 | 1.8 to 2.8 | 2.0 | 2.2 | 2.4 |
| 2102 | 49% | 48% | 3.5% | 0.8 to 3 | 1.8 to 2.8 | 2.0 | 2.2 | 2.4 |
| 2103 | 50% | 47% | 3.5% | 0.8 to 3 | 1.8 to 2.8 | 2.0 | 2.2 | 2.4 |
| 2104 | 51% | 46% | 3.5% | 0.8 to 3 | 1.8 to 2.8 | 2.0 | 2.2 | 2.4 |
| 2105 | 52% | 45% | 3.5% | 0.8 to 3 | 1.8 to 2.8 | 2.0 | 2.2 | 2.4 |
| 2106 | 53% | 44% | 3.5% | 0.8 to 3 | 1.8 to 2.8 | 2.0 | 2.2 | 2.4 |
| 2107 | 54% | 43% | 3.5% | 0.8 to 3 | 1.8 to 2.8 | 2.0 | 2.2 | 2.4 |
| 2108 | 55% | 42% | 3.5% | 0.8 to 3 | 1.8 to 2.8 | 2.0 | 2.2 | 2.4 |
| 2109 | 56% | 41% | 3.5% | 0.8 to 3 | 1.8 to 2.8 | 2.0 | 2.2 | 2.4 |
| 2110 | 57% | 40% | 3.5% | 0.8 to 3 | 1.8 to 2.8 | 2.0 | 2.2 | 2.4 |
| 2111 | 58% | 39% | 3.5% | 0.8 to 3 | 1.8 to 2.8 | 2.0 | 2.2 | 2.4 |
| 2112 | 59% | 38% | 3.5% | 0.8 to 3 | 1.8 to 2.8 | 2.0 | 2.2 | 2.4 |
| 2113 | 60% | 37% | 3.5% | 0.8 to 3 | 1.8 to 2.8 | 2.0 | 2.2 | 2.4 |
| 2114 | 30% | 66% | 4% | 0.8 to 3 | 1.8 to 2.8 | 2.0 | 2.2 | 2.4 |
| 2115 | 31% | 65% | 4% | 0.8 to 3 | 1.8 to 2.8 | 2.0 | 2.2 | 2.4 |
| 2116 | 32% | 64% | 4% | 0.8 to 3 | 1.8 to 2.8 | 2.0 | 2.2 | 2.4 |
| 2117 | 33% | 63% | 4% | 0.8 to 3 | 1.8 to 2.8 | 2.0 | 2.2 | 2.4 |
| 2118 | 34% | 62% | 4% | 0.8 to 3 | 1.8 to 2.8 | 2.0 | 2.2 | 2.4 |
| 2119 | 35% | 61% | 4% | 0.8 to 3 | 1.8 to 2.8 | 2.0 | 2.2 | 2.4 |
| 2120 | 36% | 60% | 4% | 0.8 to 3 | 1.8 to 2.8 | 2.0 | 2.2 | 2.4 |
| 2121 | 37% | 59% | 4% | 0.8 to 3 | 1.8 to 2.8 | 2.0 | 2.2 | 2.4 |
| 2122 | 38% | 58% | 4% | 0.8 to 3 | 1.8 to 2.8 | 2.0 | 2.2 | 2.4 |
| 2123 | 39% | 57% | 4% | 0.8 to 3 | 1.8 to 2.8 | 2.0 | 2.2 | 2.4 |
| 2124 | 40% | 56% | 4% | 0.8 to 3 | 1.8 to 2.8 | 2.0 | 2.2 | 2.4 |
| 2125 | 41% | 55% | 4% | 0.8 to 3 | 1.8 to 2.8 | 2.0 | 2.2 | 2.4 |
| 2126 | 42% | 54% | 4% | 0.8 to 3 | 1.8 to 2.8 | 2.0 | 2.2 | 2.4 |
| 2127 | 43% | 53% | 4% | 0.8 to 3 | 1.8 to 2.8 | 2.0 | 2.2 | 2.4 |
| 2128 | 44% | 52% | 4% | 0.8 to 3 | 1.8 to 2.8 | 2.0 | 2.2 | 2.4 |
| 2129 | 45% | 51% | 4% | 0.8 to 3 | 1.8 to 2.8 | 2.0 | 2.2 | 2.4 |
| 2130 | 46% | 50% | 4% | 0.8 to 3 | 1.8 to 2.8 | 2.0 | 2.2 | 2.4 |
| 2131 | 47% | 49% | 4% | 0.8 to 3 | 1.8 to 2.8 | 2.0 | 2.2 | 2.4 |
| 2132 | 48% | 48% | 4% | 0.8 to 3 | 1.8 to 2.8 | 2.0 | 2.2 | 2.4 |
| 2133 | 49% | 47% | 4% | 0.8 to 3 | 1.8 to 2.8 | 2.0 | 2.2 | 2.4 |
| 2134 | 50% | 46% | 4% | 0.8 to 3 | 1.8 to 2.8 | 2.0 | 2.2 | 2.4 |
| 2135 | 51% | 45% | 4% | 0.8 to 3 | 1.8 to 2.8 | 2.0 | 2.2 | 2.4 |
| 2136 | 52% | 44% | 4% | 0.8 to 3 | 1.8 to 2.8 | 2.0 | 2.2 | 2.4 |
| 2137 | 53% | 43% | 4% | 0.8 to 3 | 1.8 to 2.8 | 2.0 | 2.2 | 2.4 |
| 2138 | 54% | 42% | 4% | 0.8 to 3 | 1.8 to 2.8 | 2.0 | 2.2 | 2.4 |
| 2139 | 55% | 41% | 4% | 0.8 to 3 | 1.8 to 2.8 | 2.0 | 2.2 | 2.4 |
| 2140 | 56% | 40% | 4% | 0.8 to 3 | 1.8 to 2.8 | 2.0 | 2.2 | 2.4 |
| 2141 | 57% | 39% | 4% | 0.8 to 3 | 1.8 to 2.8 | 2.0 | 2.2 | 2.4 |
| 2142 | 58% | 38% | 4% | 0.8 to 3 | 1.8 to 2.8 | 2.0 | 2.2 | 2.4 |
| 2143 | 59% | 37% | 4% | 0.8 to 3 | 1.8 to 2.8 | 2.0 | 2.2 | 2.4 |
| 2144 | 60% | 36% | 4% | 0.8 to 3 | 1.8 to 2.8 | 2.0 | 2.2 | 2.4 |
| 2145 | 30% | 66% | 4.5% | 0.8 to 3 | 1.8 to 2.8 | 2.0 | 2.2 | 2.4 |
| 2146 | 31% | 65% | 4.5% | 0.8 to 3 | 1.8 to 2.8 | 2.0 | 2.2 | 2.4 |
| 2147 | 32% | 64% | 4.5% | 0.8 to 3 | 1.8 to 2.8 | 2.0 | 2.2 | 2.4 |
| 2148 | 33% | 63% | 4.5% | 0.8 to 3 | 1.8 to 2.8 | 2.0 | 2.2 | 2.4 |
| 2149 | 34% | 62% | 4.5% | 0.8 to 3 | 1.8 to 2.8 | 2.0 | 2.2 | 2.4 |
| 2150 | 35% | 61% | 4.5% | 0.8 to 3 | 1.8 to 2.8 | 2.0 | 2.2 | 2.4 |
| 2151 | 36% | 60% | 4.5% | 0.8 to 3 | 1.8 to 2.8 | 2.0 | 2.2 | 2.4 |
| 2152 | 37% | 59% | 4.5% | 0.8 to 3 | 1.8 to 2.8 | 2.0 | 2.2 | 2.4 |
| 2153 | 38% | 58% | 4.5% | 0.8 to 3 | 1.8 to 2.8 | 2.0 | 2.2 | 2.4 |
| 2154 | 39% | 57% | 4.5% | 0.8 to 3 | 1.8 to 2.8 | 2.0 | 2.2 | 2.4 |
| 2155 | 40% | 56% | 4.5% | 0.8 to 3 | 1.8 to 2.8 | 2.0 | 2.2 | 2.4 |
| 2156 | 41% | 55% | 4.5% | 0.8 to 3 | 1.8 to 2.8 | 2.0 | 2.2 | 2.4 |
| 2157 | 42% | 54% | 4.5% | 0.8 to 3 | 1.8 to 2.8 | 2.0 | 2.2 | 2.4 |
| 2158 | 43% | 53% | 4.5% | 0.8 to 3 | 1.8 to 2.8 | 2.0 | 2.2 | 2.4 |
| 2159 | 44% | 52% | 4.5% | 0.8 to 3 | 1.8 to 2.8 | 2.0 | 2.2 | 2.4 |
| 2160 | 45% | 51% | 4.5% | 0.8 to 3 | 1.8 to 2.8 | 2.0 | 2.2 | 2.4 |
| 2161 | 46% | 50% | 4.5% | 0.8 to 3 | 1.8 to 2.8 | 2.0 | 2.2 | 2.4 |
| 2162 | 47% | 49% | 4.5% | 0.8 to 3 | 1.8 to 2.8 | 2.0 | 2.2 | 2.4 |
| 2163 | 48% | 48% | 4.5% | 0.8 to 3 | 1.8 to 2.8 | 2.0 | 2.2 | 2.4 |
| 2164 | 49% | 47% | 4.5% | 0.8 to 3 | 1.8 to 2.8 | 2.0 | 2.2 | 2.4 |
| 2165 | 50% | 46% | 4.5% | 0.8 to 3 | 1.8 to 2.8 | 2.0 | 2.2 | 2.4 |
| 2166 | 51% | 45% | 4.5% | 0.8 to 3 | 1.8 to 2.8 | 2.0 | 2.2 | 2.4 |
| 2167 | 52% | 44% | 4.5% | 0.8 to 3 | 1.8 to 2.8 | 2.0 | 2.2 | 2.4 |
| 2168 | 53% | 43% | 4.5% | 0.8 to 3 | 1.8 to 2.8 | 2.0 | 2.2 | 2.4 |
| 2169 | 54% | 42% | 4.5% | 0.8 to 3 | 1.8 to 2.8 | 2.0 | 2.2 | 2.4 |
| 2170 | 55% | 41% | 4.5% | 0.8 to 3 | 1.8 to 2.8 | 2.0 | 2.2 | 2.4 |
| 2171 | 56% | 40% | 4.5% | 0.8 to 3 | 1.8 to 2.8 | 2.0 | 2.2 | 2.4 |
| 2172 | 57% | 39% | 4.5% | 0.8 to 3 | 1.8 to 2.8 | 2.0 | 2.2 | 2.4 |
| 2173 | 58% | 38% | 4.5% | 0.8 to 3 | 1.8 to 2.8 | 2.0 | 2.2 | 2.4 |
| 2174 | 59% | 37% | 4.5% | 0.8 to 3 | 1.8 to 2.8 | 2.0 | 2.2 | 2.4 |
| 2175 | 60% | 36% | 4.5% | 0.8 to 3 | 1.8 to 2.8 | 2.0 | 2.2 | 2.4 |
| 2176 | 30% | 65% | 5% | 0.8 to 3 | 1.8 to 2.8 | 2.0 | 2.2 | 2.4 |
| 2177 | 31% | 64% | 5% | 0.8 to 3 | 1.8 to 2.8 | 2.0 | 2.2 | 2.4 |
| 2178 | 32% | 63% | 5% | 0.8 to 3 | 1.8 to 2.8 | 2.0 | 2.2 | 2.4 |
| 2179 | 33% | 62% | 5% | 0.8 to 3 | 1.8 to 2.8 | 2.0 | 2.2 | 2.4 |
| 2180 | 34% | 61% | 5% | 0.8 to 3 | 1.8 to 2.8 | 2.0 | 2.2 | 2.4 |
| 2181 | 35% | 60% | 5% | 0.8 to 3 | 1.8 to 2.8 | 2.0 | 2.2 | 2.4 |
| 2182 | 36% | 59% | 5% | 0.8 to 3 | 1.8 to 2.8 | 2.0 | 2.2 | 2.4 |
| 2183 | 37% | 58% | 5% | 0.8 to 3 | 1.8 to 2.8 | 2.0 | 2.2 | 2.4 |
| 2184 | 38% | 57% | 5% | 0.8 to 3 | 1.8 to 2.8 | 2.0 | 2.2 | 2.4 |
| 2185 | 39% | 56% | 5% | 0.8 to 3 | 1.8 to 2.8 | 2.0 | 2.2 | 2.4 |
| 2186 | 40% | 55% | 5% | 0.8 to 3 | 1.8 to 2.8 | 2.0 | 2.2 | 2.4 |
| 2187 | 41% | 54% | 5% | 0.8 to 3 | 1.8 to 2.8 | 2.0 | 2.2 | 2.4 |
| 2188 | 42% | 53% | 5% | 0.8 to 3 | 1.8 to 2.8 | 2.0 | 2.2 | 2.4 |
| 2189 | 43% | 52% | 5% | 0.8 to 3 | 1.8 to 2.8 | 2.0 | 2.2 | 2.4 |
| 2190 | 44% | 51% | 5% | 0.8 to 3 | 1.8 to 2.8 | 2.0 | 2.2 | 2.4 |
| 2191 | 45% | 50% | 5% | 0.8 to 3 | 1.8 to 2.8 | 2.0 | 2.2 | 2.4 |
| 2192 | 46% | 49% | 5% | 0.8 to 3 | 1.8 to 2.8 | 2.0 | 2.2 | 2.4 |
| 2193 | 47% | 48% | 5% | 0.8 to 3 | 1.8 to 2.8 | 2.0 | 2.2 | 2.4 |
| 2194 | 48% | 47% | 5% | 0.8 to 3 | 1.8 to 2.8 | 2.0 | 2.2 | 2.4 |
| 2195 | 49% | 46% | 5% | 0.8 to 3 | 1.8 to 2.8 | 2.0 | 2.2 | 2.4 |
| 2196 | 50% | 45% | 5% | 0.8 to 3 | 1.8 to 2.8 | 2.0 | 2.2 | 2.4 |
| 2197 | 51% | 44% | 5% | 0.8 to 3 | 1.8 to 2.8 | 2.0 | 2.2 | 2.4 |
| 2198 | 52% | 43% | 5% | 0.8 to 3 | 1.8 to 2.8 | 2.0 | 2.2 | 2.4 |
| 2199 | 53% | 42% | 5% | 0.8 to 3 | 1.8 to 2.8 | 2.0 | 2.2 | 2.4 |
| 2200 | 54% | 41% | 5% | 0.8 to 3 | 1.8 to 2.8 | 2.0 | 2.2 | 2.4 |
| 2201 | 55% | 40% | 5% | 0.8 to 3 | 1.8 to 2.8 | 2.0 | 2.2 | 2.4 |
| 2202 | 56% | 39% | 5% | 0.8 to 3 | 1.8 to 2.8 | 2.0 | 2.2 | 2.4 |
| 2203 | 57% | 38% | 5% | 0.8 to 3 | 1.8 to 2.8 | 2.0 | 2.2 | 2.4 |
| 2204 | 58% | 37% | 5% | 0.8 to 3 | 1.8 to 2.8 | 2.0 | 2.2 | 2.4 |
| 2205 | 59% | 36% | 5% | 0.8 to 3 | 1.8 to 2.8 | 2.0 | 2.2 | 2.4 |

TABLE 5

| | Alkyl Sulfate Alkyl Chain Length, Wt. % | | Alkyl Chain Length, Wt. % | Alkyl Ether Sulfate Average mol. EO (Alternatives for each numbered species) | | | | |
|---|---|---|---|---|---|---|---|---|
| | | | | | | Species C | Species D | Species E |
| Species | 8 | 10 to 12 | 6 | Range A | Range B | C | D | E |
| 2206 | 60% | 35% | 5% | 0.8 to 3 | 1.8 to 2.8 | 2.0 | 2.2 | 2.4 |
| 2207 | 30% | 65% | 5.5% | 0.8 to 3 | 1.8 to 2.8 | 2.0 | 2.2 | 2.4 |
| 2208 | 31% | 64% | 5.5% | 0.8 to 3 | 1.8 to 2.8 | 2.0 | 2.2 | 2.4 |
| 2209 | 32% | 63% | 5.5% | 0.8 to 3 | 1.8 to 2.8 | 2.0 | 2.2 | 2.4 |
| 2210 | 33% | 62% | 5.5% | 0.8 to 3 | 1.8 to 2.8 | 2.0 | 2.2 | 2.4 |
| 2211 | 34% | 61% | 5.5% | 0.8 to 3 | 1.8 to 2.8 | 2.0 | 2.2 | 2.4 |
| 2212 | 35% | 60% | 5.5% | 0.8 to 3 | 1.8 to 2.8 | 2.0 | 2.2 | 2.4 |
| 2213 | 36% | 59% | 5.5% | 0.8 to 3 | 1.8 to 2.8 | 2.0 | 2.2 | 2.4 |
| 2214 | 37% | 58% | 5.5% | 0.8 to 3 | 1.8 to 2.8 | 2.0 | 2.2 | 2.4 |
| 2215 | 38% | 57% | 5.5% | 0.8 to 3 | 1.8 to 2.8 | 2.0 | 2.2 | 2.4 |
| 2216 | 39% | 56% | 5.5% | 0.8 to 3 | 1.8 to 2.8 | 2.0 | 2.2 | 2.4 |
| 2217 | 40% | 55% | 5.5% | 0.8 to 3 | 1.8 to 2.8 | 2.0 | 2.2 | 2.4 |
| 2218 | 41% | 54% | 5.5% | 0.8 to 3 | 1.8 to 2.8 | 2.0 | 2.2 | 2.4 |
| 2219 | 42% | 53% | 5.5% | 0.8 to 3 | 1.8 to 2.8 | 2.0 | 2.2 | 2.4 |
| 2220 | 43% | 52% | 5.5% | 0.8 to 3 | 1.8 to 2.8 | 2.0 | 2.2 | 2.4 |
| 2221 | 44% | 51% | 5.5% | 0.8 to 3 | 1.8 to 2.8 | 2.0 | 2.2 | 2.4 |
| 2222 | 45% | 50% | 5.5% | 0.8 to 3 | 1.8 to 2.8 | 2.0 | 2.2 | 2.4 |
| 2223 | 46% | 49% | 5.5% | 0.8 to 3 | 1.8 to 2.8 | 2.0 | 2.2 | 2.4 |
| 2224 | 47% | 48% | 5.5% | 0.8 to 3 | 1.8 to 2.8 | 2.0 | 2.2 | 2.4 |
| 2225 | 48% | 47% | 5.5% | 0.8 to 3 | 1.8 to 2.8 | 2.0 | 2.2 | 2.4 |
| 2226 | 49% | 46% | 5.5% | 0.8 to 3 | 1.8 to 2.8 | 2.0 | 2.2 | 2.4 |
| 2227 | 50% | 45% | 5.5% | 0.8 to 3 | 1.8 to 2.8 | 2.0 | 2.2 | 2.4 |
| 2228 | 51% | 44% | 5.5% | 0.8 to 3 | 1.8 to 2.8 | 2.0 | 2.2 | 2.4 |
| 2229 | 52% | 43% | 5.5% | 0.8 to 3 | 1.8 to 2.8 | 2.0 | 2.2 | 2.4 |
| 2230 | 53% | 42% | 5.5% | 0.8 to 3 | 1.8 to 2.8 | 2.0 | 2.2 | 2.4 |
| 2231 | 54% | 41% | 5.5% | 0.8 to 3 | 1.8 to 2.8 | 2.0 | 2.2 | 2.4 |
| 2232 | 55% | 40% | 5.5% | 0.8 to 3 | 1.8 to 2.8 | 2.0 | 2.2 | 2.4 |
| 2233 | 56% | 39% | 5.5% | 0.8 to 3 | 1.8 to 2.8 | 2.0 | 2.2 | 2.4 |
| 2234 | 57% | 38% | 5.5% | 0.8 to 3 | 1.8 to 2.8 | 2.0 | 2.2 | 2.4 |
| 2235 | 58% | 37% | 5.5% | 0.8 to 3 | 1.8 to 2.8 | 2.0 | 2.2 | 2.4 |
| 2236 | 59% | 36% | 5.5% | 0.8 to 3 | 1.8 to 2.8 | 2.0 | 2.2 | 2.4 |
| 2237 | 60% | 35% | 5.5% | 0.8 to 3 | 1.8 to 2.8 | 2.0 | 2.2 | 2.4 |
| 2238 | 30% | 64% | 6% | 0.8 to 3 | 1.8 to 2.8 | 2.0 | 2.2 | 2.4 |
| 2239 | 31% | 63% | 6% | 0.8 to 3 | 1.8 to 2.8 | 2.0 | 2.2 | 2.4 |
| 2240 | 32% | 62% | 6% | 0.8 to 3 | 1.8 to 2.8 | 2.0 | 2.2 | 2.4 |
| 2241 | 33% | 61% | 6% | 0.8 to 3 | 1.8 to 2.8 | 2.0 | 2.2 | 2.4 |
| 2242 | 34% | 60% | 6% | 0.8 to 3 | 1.8 to 2.8 | 2.0 | 2.2 | 2.4 |
| 2243 | 35% | 59% | 6% | 0.8 to 3 | 1.8 to 2.8 | 2.0 | 2.2 | 2.4 |
| 2244 | 36% | 58% | 6% | 0.8 to 3 | 1.8 to 2.8 | 2.0 | 2.2 | 2.4 |
| 2245 | 37% | 57% | 6% | 0.8 to 3 | 1.8 to 2.8 | 2.0 | 2.2 | 2.4 |
| 2246 | 38% | 56% | 6% | 0.8 to 3 | 1.8 to 2.8 | 2.0 | 2.2 | 2.4 |
| 2247 | 39% | 55% | 6% | 0.8 to 3 | 1.8 to 2.8 | 2.0 | 2.2 | 2.4 |
| 2248 | 40% | 54% | 6% | 0.8 to 3 | 1.8 to 2.8 | 2.0 | 2.2 | 2.4 |
| 2249 | 41% | 53% | 6% | 0.8 to 3 | 1.8 to 2.8 | 2.0 | 2.2 | 2.4 |
| 2250 | 42% | 52% | 6% | 0.8 to 3 | 1.8 to 2.8 | 2.0 | 2.2 | 2.4 |
| 2251 | 43% | 51% | 6% | 0.8 to 3 | 1.8 to 2.8 | 2.0 | 2.2 | 2.4 |
| 2252 | 44% | 50% | 6% | 0.8 to 3 | 1.8 to 2.8 | 2.0 | 2.2 | 2.4 |
| 2253 | 45% | 49% | 6% | 0.8 to 3 | 1.8 to 2.8 | 2.0 | 2.2 | 2.4 |
| 2254 | 46% | 48% | 6% | 0.8 to 3 | 1.8 to 2.8 | 2.0 | 2.2 | 2.4 |
| 2255 | 47% | 47% | 6% | 0.8 to 3 | 1.8 to 2.8 | 2.0 | 2.2 | 2.4 |
| 2256 | 48% | 46% | 6% | 0.8 to 3 | 1.8 to 2.8 | 2.0 | 2.2 | 2.4 |
| 2257 | 49% | 45% | 6% | 0.8 to 3 | 1.8 to 2.8 | 2.0 | 2.2 | 2.4 |
| 2258 | 50% | 44% | 6% | 0.8 to 3 | 1.8 to 2.8 | 2.0 | 2.2 | 2.4 |
| 2259 | 51% | 43% | 6% | 0.8 to 3 | 1.8 to 2.8 | 2.0 | 2.2 | 2.4 |
| 2260 | 52% | 42% | 6% | 0.8 to 3 | 1.8 to 2.8 | 2.0 | 2.2 | 2.4 |
| 2261 | 53% | 41% | 6% | 0.8 to 3 | 1.8 to 2.8 | 2.0 | 2.2 | 2.4 |
| 2262 | 54% | 40% | 6% | 0.8 to 3 | 1.8 to 2.8 | 2.0 | 2.2 | 2.4 |
| 2263 | 55% | 39% | 6% | 0.8 to 3 | 1.8 to 2.8 | 2.0 | 2.2 | 2.4 |
| 2264 | 56% | 38% | 6% | 0.8 to 3 | 1.8 to 2.8 | 2.0 | 2.2 | 2.4 |
| 2265 | 57% | 37% | 6% | 0.8 to 3 | 1.8 to 2.8 | 2.0 | 2.2 | 2.4 |
| 2266 | 58% | 36% | 6% | 0.8 to 3 | 1.8 to 2.8 | 2.0 | 2.2 | 2.4 |
| 2267 | 59% | 35% | 6% | 0.8 to 3 | 1.8 to 2.8 | 2.0 | 2.2 | 2.4 |
| 2268 | 60% | 34% | 6% | 0.8 to 3 | 1.8 to 2.8 | 2.0 | 2.2 | 2.4 |
| 2269 | 30% | 64% | 6.5% | 0.8 to 3 | 1.8 to 2.8 | 2.0 | 2.2 | 2.4 |
| 2270 | 31% | 63% | 6.5% | 0.8 to 3 | 1.8 to 2.8 | 2.0 | 2.2 | 2.4 |
| 2271 | 32% | 62% | 6.5% | 0.8 to 3 | 1.8 to 2.8 | 2.0 | 2.2 | 2.4 |
| 2272 | 33% | 61% | 6.5% | 0.8 to 3 | 1.8 to 2.8 | 2.0 | 2.2 | 2.4 |
| 2273 | 34% | 60% | 6.5% | 0.8 to 3 | 1.8 to 2.8 | 2.0 | 2.2 | 2.4 |
| 2274 | 35% | 59% | 6.5% | 0.8 to 3 | 1.8 to 2.8 | 2.0 | 2.2 | 2.4 |

TABLE 5-continued

| | | | Alkyl Ether Sulfate | | | | |
|---|---|---|---|---|---|---|---|
| | Alkyl Sulfate Alkyl Chain Length, Wt. % | Alkyl Chain Length, Wt. % | Average mol. EO (Alternatives for each numbered species) | | | | |
| Species | 8 | 10 to 12 | Range A | Range B | Species C | Species D | Species E |
| 2275 | 36% | 58% | 6.5% | 0.8 to 3 | 1.8 to 2.8 | 2.0 | 2.2 | 2.4 |
| 2276 | 37% | 57% | 6.5% | 0.8 to 3 | 1.8 to 2.8 | 2.0 | 2.2 | 2.4 |
| 2277 | 38% | 56% | 6.5% | 0.8 to 3 | 1.8 to 2.8 | 2.0 | 2.2 | 2.4 |
| 2278 | 39% | 55% | 6.5% | 0.8 to 3 | 1.8 to 2.8 | 2.0 | 2.2 | 2.4 |
| 2279 | 40% | 54% | 6.5% | 0.8 to 3 | 1.8 to 2.8 | 2.0 | 2.2 | 2.4 |
| 2280 | 41% | 53% | 6.5% | 0.8 to 3 | 1.8 to 2.8 | 2.0 | 2.2 | 2.4 |
| 2281 | 42% | 52% | 6.5% | 0.8 to 3 | 1.8 to 2.8 | 2.0 | 2.2 | 2.4 |
| 2282 | 43% | 51% | 6.5% | 0.8 to 3 | 1.8 to 2.8 | 2.0 | 2.2 | 2.4 |
| 2283 | 44% | 50% | 6.5% | 0.8 to 3 | 1.8 to 2.8 | 2.0 | 2.2 | 2.4 |
| 2284 | 45% | 49% | 6.5% | 0.8 to 3 | 1.8 to 2.8 | 2.0 | 2.2 | 2.4 |
| 2285 | 46% | 48% | 6.5% | 0.8 to 3 | 1.8 to 2.8 | 2.0 | 2.2 | 2.4 |
| 2286 | 47% | 47% | 6.5% | 0.8 to 3 | 1.8 to 2.8 | 2.0 | 2.2 | 2.4 |
| 2287 | 48% | 46% | 6.5% | 0.8 to 3 | 1.8 to 2.8 | 2.0 | 2.2 | 2.4 |
| 2288 | 49% | 45% | 6.5% | 0.8 to 3 | 1.8 to 2.8 | 2.0 | 2.2 | 2.4 |
| 2289 | 50% | 44% | 6.5% | 0.8 to 3 | 1.8 to 2.8 | 2.0 | 2.2 | 2.4 |
| 2290 | 51% | 43% | 6.5% | 0.8 to 3 | 1.8 to 2.8 | 2.0 | 2.2 | 2.4 |
| 2291 | 52% | 42% | 6.5% | 0.8 to 3 | 1.8 to 2.8 | 2.0 | 2.2 | 2.4 |
| 2292 | 53% | 41% | 6.5% | 0.8 to 3 | 1.8 to 2.8 | 2.0 | 2.2 | 2.4 |
| 2293 | 54% | 40% | 6.5% | 0.8 to 3 | 1.8 to 2.8 | 2.0 | 2.2 | 2.4 |
| 2294 | 55% | 39% | 6.5% | 0.8 to 3 | 1.8 to 2.8 | 2.0 | 2.2 | 2.4 |
| 2295 | 56% | 38% | 6.5% | 0.8 to 3 | 1.8 to 2.8 | 2.0 | 2.2 | 2.4 |
| 2296 | 57% | 37% | 6.5% | 0.8 to 3 | 1.8 to 2.8 | 2.0 | 2.2 | 2.4 |
| 2297 | 58% | 36% | 6.5% | 0.8 to 3 | 1.8 to 2.8 | 2.0 | 2.2 | 2.4 |
| 2298 | 59% | 35% | 6.5% | 0.8 to 3 | 1.8 to 2.8 | 2.0 | 2.2 | 2.4 |
| 2299 | 60% | 34% | 6.5% | 0.8 to 3 | 1.8 to 2.8 | 2.0 | 2.2 | 2.4 |
| 2300 | 30% | 63% | 7% | 0.8 to 3 | 1.8 to 2.8 | 2.0 | 2.2 | 2.4 |
| 2301 | 31% | 62% | 7% | 0.8 to 3 | 1.8 to 2.8 | 2.0 | 2.2 | 2.4 |
| 2302 | 32% | 61% | 7% | 0.8 to 3 | 1.8 to 2.8 | 2.0 | 2.2 | 2.4 |
| 2303 | 33% | 60% | 7% | 0.8 to 3 | 1.8 to 2.8 | 2.0 | 2.2 | 2.4 |
| 2304 | 34% | 59% | 7% | 0.8 to 3 | 1.8 to 2.8 | 2.0 | 2.2 | 2.4 |
| 2305 | 35% | 58% | 7% | 0.8 to 3 | 1.8 to 2.8 | 2.0 | 2.2 | 2.4 |
| 2306 | 36% | 57% | 7% | 0.8 to 3 | 1.8 to 2.8 | 2.0 | 2.2 | 2.4 |
| 2307 | 37% | 56% | 7% | 0.8 to 3 | 1.8 to 2.8 | 2.0 | 2.2 | 2.4 |

TABLE 6

| | | | Alkyl Ether Sulfate | | | | |
|---|---|---|---|---|---|---|---|
| | Alkyl Sulfate Alkyl Chain Length, Wt. % | Alkyl Chain Length, Wt. % | Average mol. EO (Alternatives for each numbered species) | | | | |
| Species | 8 | 8 to 10 | 8 to 10 | Range A | Range B | Species C | Species D | Species E |
| 2331 | 30% | 70% | 0% | 0.8 to 3 | 1.8 to 2.8 | 2.0 | 2.2 | 2.4 |
| 2332 | 31% | 69% | 0% | 0.8 to 3 | 1.8 to 2.8 | 2.0 | 2.2 | 2.4 |
| 2333 | 32% | 68% | 0% | 0.8 to 3 | 1.8 to 2.8 | 2.0 | 2.2 | 2.4 |
| 2334 | 33% | 67% | 0% | 0.8 to 3 | 1.8 to 2.8 | 2.0 | 2.2 | 2.4 |
| 2335 | 34% | 66% | 0% | 0.8 to 3 | 1.8 to 2.8 | 2.0 | 2.2 | 2.4 |
| 2336 | 35% | 65% | 0% | 0.8 to 3 | 1.8 to 2.8 | 2.0 | 2.2 | 2.4 |
| 2337 | 36% | 64% | 0% | 0.8 to 3 | 1.8 to 2.8 | 2.0 | 2.2 | 2.4 |
| 2338 | 37% | 63% | 0% | 0.8 to 3 | 1.8 to 2.8 | 2.0 | 2.2 | 2.4 |
| 2339 | 38% | 62% | 0% | 0.8 to 3 | 1.8 to 2.8 | 2.0 | 2.2 | 2.4 |
| 2340 | 39% | 61% | 0% | 0.8 to 3 | 1.8 to 2.8 | 2.0 | 2.2 | 2.4 |
| 2341 | 40% | 60% | 0% | 0.8 to 3 | 1.8 to 2.8 | 2.0 | 2.2 | 2.4 |
| 2342 | 41% | 59% | 0% | 0.8 to 3 | 1.8 to 2.8 | 2.0 | 2.2 | 2.4 |
| 2343 | 42% | 58% | 0% | 0.8 to 3 | 1.8 to 2.8 | 2.0 | 2.2 | 2.4 |
| 2344 | 43% | 57% | 0% | 0.8 to 3 | 1.8 to 2.8 | 2.0 | 2.2 | 2.4 |
| 2345 | 44% | 56% | 0% | 0.8 to 3 | 1.8 to 2.8 | 2.0 | 2.2 | 2.4 |
| 2346 | 45% | 55% | 0% | 0.8 to 3 | 1.8 to 2.8 | 2.0 | 2.2 | 2.4 |
| 2347 | 46% | 54% | 0% | 0.8 to 3 | 1.8 to 2.8 | 2.0 | 2.2 | 2.4 |
| 2348 | 47% | 53% | 0% | 0.8 to 3 | 1.8 to 2.8 | 2.0 | 2.2 | 2.4 |
| 2349 | 48% | 52% | 0% | 0.8 to 3 | 1.8 to 2.8 | 2.0 | 2.2 | 2.4 |
| 2350 | 49% | 51% | 0% | 0.8 to 3 | 1.8 to 2.8 | 2.0 | 2.2 | 2.4 |

TABLE 6-continued

| | | | Alkyl Ether Sulfate | | | | |
| | Alkyl Sulfate Alkyl Chain Length, Wt. % | Alkyl Chain Length, Wt. % | Average mol. EO (Alternatives for each numbered species) | | | | |
| Species | 8 | 8 to 10 | 8 to 10 | Range A | Range B | Species C | Species D | Species E |
| --- | --- | --- | --- | --- | --- | --- | --- | --- |
| 2351 | 50% | 50% | 0% | 0.8 to 3 | 1.8 to 2.8 | 2.0 | 2.2 | 2.4 |
| 2352 | 51% | 49% | 0% | 0.8 to 3 | 1.8 to 2.8 | 2.0 | 2.2 | 2.4 |
| 2353 | 52% | 48% | 0% | 0.8 to 3 | 1.8 to 2.8 | 2.0 | 2.2 | 2.4 |
| 2354 | 53% | 47% | 0% | 0.8 to 3 | 1.8 to 2.8 | 2.0 | 2.2 | 2.4 |
| 2355 | 54% | 46% | 0% | 0.8 to 3 | 1.8 to 2.8 | 2.0 | 2.2 | 2.4 |
| 2356 | 55% | 45% | 0% | 0.8 to 3 | 1.8 to 2.8 | 2.0 | 2.2 | 2.4 |
| 2357 | 56% | 44% | 0% | 0.8 to 3 | 1.8 to 2.8 | 2.0 | 2.2 | 2.4 |
| 2358 | 57% | 43% | 0% | 0.8 to 3 | 1.8 to 2.8 | 2.0 | 2.2 | 2.4 |
| 2359 | 58% | 42% | 0% | 0.8 to 3 | 1.8 to 2.8 | 2.0 | 2.2 | 2.4 |
| 2360 | 59% | 41% | 0% | 0.8 to 3 | 1.8 to 2.8 | 2.0 | 2.2 | 2.4 |
| 2361 | 60% | 40% | 0% | 0.8 to 3 | 1.8 to 2.8 | 2.0 | 2.2 | 2.4 |
| 2362 | 30% | 69.5% | 0.5% | 0.8 to 3 | 1.8 to 2.8 | 2.0 | 2.2 | 2.4 |
| 2363 | 31% | 68.5% | 0.5% | 0.8 to 3 | 1.8 to 2.8 | 2.0 | 2.2 | 2.4 |
| 2364 | 32% | 67.5% | 0.5% | 0.8 to 3 | 1.8 to 2.8 | 2.0 | 2.2 | 2.4 |
| 2365 | 33% | 66.5% | 0.5% | 0.8 to 3 | 1.8 to 2.8 | 2.0 | 2.2 | 2.4 |
| 2366 | 34% | 65.5% | 0.5% | 0.8 to 3 | 1.8 to 2.8 | 2.0 | 2.2 | 2.4 |
| 2367 | 35% | 64.5% | 0.5% | 0.8 to 3 | 1.8 to 2.8 | 2.0 | 2.2 | 2.4 |
| 2368 | 36% | 63.5% | 0.5% | 0.8 to 3 | 1.8 to 2.8 | 2.0 | 2.2 | 2.4 |
| 2369 | 37% | 62.5% | 0.5% | 0.8 to 3 | 1.8 to 2.8 | 2.0 | 2.2 | 2.4 |
| 2370 | 38% | 61.5% | 0.5% | 0.8 to 3 | 1.8 to 2.8 | 2.0 | 2.2 | 2.4 |
| 2371 | 39% | 60.5% | 0.5% | 0.8 to 3 | 1.8 to 2.8 | 2.0 | 2.2 | 2.4 |
| 2372 | 40% | 59.5% | 0.5% | 0.8 to 3 | 1.8 to 2.8 | 2.0 | 2.2 | 2.4 |
| 2373 | 41% | 58.5% | 0.5% | 0.8 to 3 | 1.8 to 2.8 | 2.0 | 2.2 | 2.4 |
| 2374 | 42% | 57.5% | 0.5% | 0.8 to 3 | 1.8 to 2.8 | 2.0 | 2.2 | 2.4 |
| 2375 | 43% | 56.5% | 0.5% | 0.8 to 3 | 1.8 to 2.8 | 2.0 | 2.2 | 2.4 |
| 2376 | 44% | 55.5% | 0.5% | 0.8 to 3 | 1.8 to 2.8 | 2.0 | 2.2 | 2.4 |
| 2377 | 45% | 54.5% | 0.5% | 0.8 to 3 | 1.8 to 2.8 | 2.0 | 2.2 | 2.4 |
| 2378 | 46% | 53.5% | 0.5% | 0.8 to 3 | 1.8 to 2.8 | 2.0 | 2.2 | 2.4 |
| 2379 | 47% | 52.5% | 0.5% | 0.8 to 3 | 1.8 to 2.8 | 2.0 | 2.2 | 2.4 |
| 2380 | 48% | 51.5% | 0.5% | 0.8 to 3 | 1.8 to 2.8 | 2.0 | 2.2 | 2.4 |
| 2381 | 49% | 50.5% | 0.5% | 0.8 to 3 | 1.8 to 2.8 | 2.0 | 2.2 | 2.4 |
| 2382 | 50% | 49.5% | 0.5% | 0.8 to 3 | 1.8 to 2.8 | 2.0 | 2.2 | 2.4 |
| 2383 | 51% | 48.5% | 0.5% | 0.8 to 3 | 1.8 to 2.8 | 2.0 | 2.2 | 2.4 |
| 2384 | 52% | 47.5% | 0.5% | 0.8 to 3 | 1.8 to 2.8 | 2.0 | 2.2 | 2.4 |
| 2385 | 53% | 46.5% | 0.5% | 0.8 to 3 | 1.8 to 2.8 | 2.0 | 2.2 | 2.4 |
| 2386 | 54% | 45.5% | 0.5% | 0.8 to 3 | 1.8 to 2.8 | 2.0 | 2.2 | 2.4 |
| 2387 | 55% | 44.5% | 0.5% | 0.8 to 3 | 1.8 to 2.8 | 2.0 | 2.2 | 2.4 |
| 2388 | 56% | 43.5% | 0.5% | 0.8 to 3 | 1.8 to 2.8 | 2.0 | 2.2 | 2.4 |
| 2389 | 57% | 42.5% | 0.5% | 0.8 to 3 | 1.8 to 2.8 | 2.0 | 2.2 | 2.4 |
| 2390 | 58% | 41.5% | 0.5% | 0.8 to 3 | 1.8 to 2.8 | 2.0 | 2.2 | 2.4 |
| 2391 | 59% | 40.5% | 0.5% | 0.8 to 3 | 1.8 to 2.8 | 2.0 | 2.2 | 2.4 |
| 2392 | 60% | 39.5% | 0.5% | 0.8 to 3 | 1.8 to 2.8 | 2.0 | 2.2 | 2.4 |
| 2393 | 30% | 69% | 1% | 0.8 to 3 | 1.8 to 2.8 | 2.0 | 2.2 | 2.4 |
| 2394 | 31% | 68% | 1% | 0.8 to 3 | 1.8 to 2.8 | 2.0 | 2.2 | 2.4 |
| 2395 | 32% | 67% | 1% | 0.8 to 3 | 1.8 to 2.8 | 2.0 | 2.2 | 2.4 |
| 2396 | 33% | 66% | 1% | 0.8 to 3 | 1.8 to 2.8 | 2.0 | 2.2 | 2.4 |
| 2397 | 34% | 65% | 1% | 0.8 to 3 | 1.8 to 2.8 | 2.0 | 2.2 | 2.4 |
| 2398 | 35% | 64% | 1% | 0.8 to 3 | 1.8 to 2.8 | 2.0 | 2.2 | 2.4 |
| 2399 | 36% | 63% | 1% | 0.8 to 3 | 1.8 to 2.8 | 2.0 | 2.2 | 2.4 |
| 2400 | 37% | 62% | 1% | 0.8 to 3 | 1.8 to 2.8 | 2.0 | 2.2 | 2.4 |
| 2401 | 38% | 61% | 1% | 0.8 to 3 | 1.8 to 2.8 | 2.0 | 2.2 | 2.4 |
| 2402 | 39% | 60% | 1% | 0.8 to 3 | 1.8 to 2.8 | 2.0 | 2.2 | 2.4 |
| 2403 | 40% | 59% | 1% | 0.8 to 3 | 1.8 to 2.8 | 2.0 | 2.2 | 2.4 |
| 2404 | 41% | 58% | 1% | 0.8 to 3 | 1.8 to 2.8 | 2.0 | 2.2 | 2.4 |
| 2405 | 42% | 57% | 1% | 0.8 to 3 | 1.8 to 2.8 | 2.0 | 2.2 | 2.4 |
| 2406 | 43% | 56% | 1% | 0.8 to 3 | 1.8 to 2.8 | 2.0 | 2.2 | 2.4 |
| 2407 | 44% | 55% | 1% | 0.8 to 3 | 1.8 to 2.8 | 2.0 | 2.2 | 2.4 |
| 2408 | 45% | 54% | 1% | 0.8 to 3 | 1.8 to 2.8 | 2.0 | 2.2 | 2.4 |
| 2409 | 46% | 53% | 1% | 0.8 to 3 | 1.8 to 2.8 | 2.0 | 2.2 | 2.4 |
| 2410 | 47% | 52% | 1% | 0.8 to 3 | 1.8 to 2.8 | 2.0 | 2.2 | 2.4 |
| 2411 | 48% | 51% | 1% | 0.8 to 3 | 1.8 to 2.8 | 2.0 | 2.2 | 2.4 |
| 2412 | 49% | 50% | 1% | 0.8 to 3 | 1.8 to 2.8 | 2.0 | 2.2 | 2.4 |
| 2413 | 50% | 49% | 1% | 0.8 to 3 | 1.8 to 2.8 | 2.0 | 2.2 | 2.4 |
| 2414 | 51% | 48% | 1% | 0.8 to 3 | 1.8 to 2.8 | 2.0 | 2.2 | 2.4 |
| 2415 | 52% | 47% | 1% | 0.8 to 3 | 1.8 to 2.8 | 2.0 | 2.2 | 2.4 |
| 2416 | 53% | 46% | 1% | 0.8 to 3 | 1.8 to 2.8 | 2.0 | 2.2 | 2.4 |
| 2417 | 54% | 45% | 1% | 0.8 to 3 | 1.8 to 2.8 | 2.0 | 2.2 | 2.4 |
| 2418 | 55% | 44% | 1% | 0.8 to 3 | 1.8 to 2.8 | 2.0 | 2.2 | 2.4 |
| 2419 | 56% | 43% | 1% | 0.8 to 3 | 1.8 to 2.8 | 2.0 | 2.2 | 2.4 |
| 2420 | 57% | 42% | 1% | 0.8 to 3 | 1.8 to 2.8 | 2.0 | 2.2 | 2.4 |

TABLE 6-continued

| | | | Alkyl Ether Sulfate | | | | |
|---|---|---|---|---|---|---|---|
| | Alkyl Sulfate Alkyl Chain Length, Wt. % | Alkyl Chain Length, Wt. % | Average mol. EO (Alternatives for each numbered species) | | | | |
| Species | 8 | 8 to 10 | 8 to 10 | Range A | Range B | Species C | Species D | Species E |
| 2421 | 58% | 41% | 1% | 0.8 to 3 | 1.8 to 2.8 | 2.0 | 2.2 | 2.4 |
| 2422 | 59% | 40% | 1% | 0.8 to 3 | 1.8 to 2.8 | 2.0 | 2.2 | 2.4 |
| 2423 | 60% | 39% | 1% | 0.8 to 3 | 1.8 to 2.8 | 2.0 | 2.2 | 2.4 |
| 2424 | 30% | 68.5% | 1.5% | 0.8 to 3 | 1.8 to 2.8 | 2.0 | 2.2 | 2.4 |
| 2425 | 31% | 67.5% | 1.5% | 0.8 to 3 | 1.8 to 2.8 | 2.0 | 2.2 | 2.4 |
| 2426 | 32% | 66.5% | 1.5% | 0.8 to 3 | 1.8 to 2.8 | 2.0 | 2.2 | 2.4 |
| 2427 | 33% | 65.5% | 1.5% | 0.8 to 3 | 1.8 to 2.8 | 2.0 | 2.2 | 2.4 |
| 2428 | 34% | 64.5% | 1.5% | 0.8 to 3 | 1.8 to 2.8 | 2.0 | 2.2 | 2.4 |
| 2429 | 35% | 63.5% | 1.5% | 0.8 to 3 | 1.8 to 2.8 | 2.0 | 2.2 | 2.4 |
| 2430 | 36% | 62.5% | 1.5% | 0.8 to 3 | 1.8 to 2.8 | 2.0 | 2.2 | 2.4 |
| 2431 | 37% | 61.5% | 1.5% | 0.8 to 3 | 1.8 to 2.8 | 2.0 | 2.2 | 2.4 |
| 2432 | 38% | 60.5% | 1.5% | 0.8 to 3 | 1.8 to 2.8 | 2.0 | 2.2 | 2.4 |
| 2433 | 39% | 59.5% | 1.5% | 0.8 to 3 | 1.8 to 2.8 | 2.0 | 2.2 | 2.4 |
| 2434 | 40% | 58.5% | 1.5% | 0.8 to 3 | 1.8 to 2.8 | 2.0 | 2.2 | 2.4 |
| 2435 | 41% | 57.5% | 1.5% | 0.8 to 3 | 1.8 to 2.8 | 2.0 | 2.2 | 2.4 |
| 2436 | 42% | 56.5% | 1.5% | 0.8 to 3 | 1.8 to 2.8 | 2.0 | 2.2 | 2.4 |
| 2437 | 43% | 55.5% | 1.5% | 0.8 to 3 | 1.8 to 2.8 | 2.0 | 2.2 | 2.4 |
| 2438 | 44% | 54.5% | 1.5% | 0.8 to 3 | 1.8 to 2.8 | 2.0 | 2.2 | 2.4 |
| 2439 | 45% | 53.5% | 1.5% | 0.8 to 3 | 1.8 to 2.8 | 2.0 | 2.2 | 2.4 |
| 2440 | 46% | 52.5% | 1.5% | 0.8 to 3 | 1.8 to 2.8 | 2.0 | 2.2 | 2.4 |
| 2441 | 47% | 51.5% | 1.5% | 0.8 to 3 | 1.8 to 2.8 | 2.0 | 2.2 | 2.4 |
| 2442 | 48% | 50.5% | 1.5% | 0.8 to 3 | 1.8 to 2.8 | 2.0 | 2.2 | 2.4 |
| 2443 | 49% | 49.5% | 1.5% | 0.8 to 3 | 1.8 to 2.8 | 2.0 | 2.2 | 2.4 |
| 2444 | 50% | 48.5% | 1.5% | 0.8 to 3 | 1.8 to 2.8 | 2.0 | 2.2 | 2.4 |
| 2445 | 51% | 47.5% | 1.5% | 0.8 to 3 | 1.8 to 2.8 | 2.0 | 2.2 | 2.4 |
| 2446 | 52% | 46.5% | 1.5% | 0.8 to 3 | 1.8 to 2.8 | 2.0 | 2.2 | 2.4 |
| 2447 | 53% | 45.5% | 1.5% | 0.8 to 3 | 1.8 to 2.8 | 2.0 | 2.2 | 2.4 |
| 2448 | 54% | 44.5% | 1.5% | 0.8 to 3 | 1.8 to 2.8 | 2.0 | 2.2 | 2.4 |
| 2449 | 55% | 43.5% | 1.5% | 0.8 to 3 | 1.8 to 2.8 | 2.0 | 2.2 | 2.4 |
| 2450 | 56% | 42.5% | 1.5% | 0.8 to 3 | 1.8 to 2.8 | 2.0 | 2.2 | 2.4 |
| 2451 | 57% | 41.5% | 1.5% | 0.8 to 3 | 1.8 to 2.8 | 2.0 | 2.2 | 2.4 |
| 2452 | 58% | 40.5% | 1.5% | 0.8 to 3 | 1.8 to 2.8 | 2.0 | 2.2 | 2.4 |
| 2453 | 59% | 39.5% | 1.5% | 0.8 to 3 | 1.8 to 2.8 | 2.0 | 2.2 | 2.4 |
| 2454 | 60% | 38.5% | 1.5% | 0.8 to 3 | 1.8 to 2.8 | 2.0 | 2.2 | 2.4 |
| 2455 | 30% | 68% | 2% | 0.8 to 3 | 1.8 to 2.8 | 2.0 | 2.2 | 2.4 |
| 2456 | 31% | 67% | 2% | 0.8 to 3 | 1.8 to 2.8 | 2.0 | 2.2 | 2.4 |
| 2457 | 32% | 66% | 2% | 0.8 to 3 | 1.8 to 2.8 | 2.0 | 2.2 | 2.4 |
| 2458 | 33% | 65% | 2% | 0.8 to 3 | 1.8 to 2.8 | 2.0 | 2.2 | 2.4 |
| 2459 | 34% | 64% | 2% | 0.8 to 3 | 1.8 to 2.8 | 2.0 | 2.2 | 2.4 |
| 2460 | 35% | 63% | 2% | 0.8 to 3 | 1.8 to 2.8 | 2.0 | 2.2 | 2.4 |
| 2461 | 36% | 62% | 2% | 0.8 to 3 | 1.8 to 2.8 | 2.0 | 2.2 | 2.4 |
| 2462 | 37% | 61% | 2% | 0.8 to 3 | 1.8 to 2.8 | 2.0 | 2.2 | 2.4 |
| 2463 | 38% | 60% | 2% | 0.8 to 3 | 1.8 to 2.8 | 2.0 | 2.2 | 2.4 |
| 2464 | 39% | 59% | 2% | 0.8 to 3 | 1.8 to 2.8 | 2.0 | 2.2 | 2.4 |
| 2465 | 40% | 58% | 2% | 0.8 to 3 | 1.8 to 2.8 | 2.0 | 2.2 | 2.4 |
| 2466 | 41% | 57% | 2% | 0.8 to 3 | 1.8 to 2.8 | 2.0 | 2.2 | 2.4 |
| 2467 | 42% | 56% | 2% | 0.8 to 3 | 1.8 to 2.8 | 2.0 | 2.2 | 2.4 |
| 2468 | 43% | 55% | 2% | 0.8 to 3 | 1.8 to 2.8 | 2.0 | 2.2 | 2.4 |
| 2469 | 44% | 54% | 2% | 0.8 to 3 | 1.8 to 2.8 | 2.0 | 2.2 | 2.4 |
| 2470 | 45% | 53% | 2% | 0.8 to 3 | 1.8 to 2.8 | 2.0 | 2.2 | 2.4 |
| 2471 | 46% | 52% | 2% | 0.8 to 3 | 1.8 to 2.8 | 2.0 | 2.2 | 2.4 |
| 2472 | 47% | 51% | 2% | 0.8 to 3 | 1.8 to 2.8 | 2.0 | 2.2 | 2.4 |
| 2473 | 48% | 50% | 2% | 0.8 to 3 | 1.8 to 2.8 | 2.0 | 2.2 | 2.4 |
| 2474 | 49% | 49% | 2% | 0.8 to 3 | 1.8 to 2.8 | 2.0 | 2.2 | 2.4 |
| 2475 | 50% | 48% | 2% | 0.8 to 3 | 1.8 to 2.8 | 2.0 | 2.2 | 2.4 |
| 2476 | 51% | 47% | 2% | 0.8 to 3 | 1.8 to 2.8 | 2.0 | 2.2 | 2.4 |
| 2477 | 52% | 46% | 2% | 0.8 to 3 | 1.8 to 2.8 | 2.0 | 2.2 | 2.4 |
| 2478 | 53% | 45% | 2% | 0.8 to 3 | 1.8 to 2.8 | 2.0 | 2.2 | 2.4 |
| 2479 | 54% | 44% | 2% | 0.8 to 3 | 1.8 to 2.8 | 2.0 | 2.2 | 2.4 |
| 2480 | 55% | 43% | 2% | 0.8 to 3 | 1.8 to 2.8 | 2.0 | 2.2 | 2.4 |
| 2481 | 56% | 42% | 2% | 0.8 to 3 | 1.8 to 2.8 | 2.0 | 2.2 | 2.4 |
| 2482 | 57% | 41% | 2% | 0.8 to 3 | 1.8 to 2.8 | 2.0 | 2.2 | 2.4 |
| 2483 | 58% | 40% | 2% | 0.8 to 3 | 1.8 to 2.8 | 2.0 | 2.2 | 2.4 |
| 2484 | 59% | 39% | 2% | 0.8 to 3 | 1.8 to 2.8 | 2.0 | 2.2 | 2.4 |
| 2485 | 60% | 38% | 2% | 0.8 to 3 | 1.8 to 2.8 | 2.0 | 2.2 | 2.4 |
| 2486 | 30% | 67.5% | 2.5% | 0.8 to 3 | 1.8 to 2.8 | 2.0 | 2.2 | 2.4 |
| 2487 | 31% | 66.5% | 2.5% | 0.8 to 3 | 1.8 to 2.8 | 2.0 | 2.2 | 2.4 |
| 2488 | 32% | 65.5% | 2.5% | 0.8 to 3 | 1.8 to 2.8 | 2.0 | 2.2 | 2.4 |
| 2489 | 33% | 64.5% | 2.5% | 0.8 to 3 | 1.8 to 2.8 | 2.0 | 2.2 | 2.4 |
| 2490 | 34% | 63.5% | 2.5% | 0.8 to 3 | 1.8 to 2.8 | 2.0 | 2.2 | 2.4 |

TABLE 6-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 | 8 to 10 | 8 to 10 | Range A | Range B | Species C | Species D | Species E |
| 2491 | 35% | 62.5% | 2.5% | 0.8 to 3 | 1.8 to 2.8 | 2.0 | 2.2 | 2.4 |
| 2492 | 36% | 61.5% | 2.5% | 0.8 to 3 | 1.8 to 2.8 | 2.0 | 2.2 | 2.4 |
| 2493 | 37% | 60.5% | 2.5% | 0.8 to 3 | 1.8 to 2.8 | 2.0 | 2.2 | 2.4 |
| 2494 | 38% | 59.5% | 2.5% | 0.8 to 3 | 1.8 to 2.8 | 2.0 | 2.2 | 2.4 |
| 2495 | 39% | 58.5% | 2.5% | 0.8 to 3 | 1.8 to 2.8 | 2.0 | 2.2 | 2.4 |
| 2496 | 40% | 57.5% | 2.5% | 0.8 to 3 | 1.8 to 2.8 | 2.0 | 2.2 | 2.4 |
| 2497 | 41% | 56.5% | 2.5% | 0.8 to 3 | 1.8 to 2.8 | 2.0 | 2.2 | 2.4 |
| 2498 | 42% | 55.5% | 2.5% | 0.8 to 3 | 1.8 to 2.8 | 2.0 | 2.2 | 2.4 |
| 2499 | 43% | 54.5% | 2.5% | 0.8 to 3 | 1.8 to 2.8 | 2.0 | 2.2 | 2.4 |
| 2500 | 44% | 53.5% | 2.5% | 0.8 to 3 | 1.8 to 2.8 | 2.0 | 2.2 | 2.4 |
| 2501 | 45% | 52.5% | 2.5% | 0.8 to 3 | 1.8 to 2.8 | 2.0 | 2.2 | 2.4 |
| 2502 | 46% | 51.5% | 2.5% | 0.8 to 3 | 1.8 to 2.8 | 2.0 | 2.2 | 2.4 |
| 2503 | 47% | 50.5% | 2.5% | 0.8 to 3 | 1.8 to 2.8 | 2.0 | 2.2 | 2.4 |
| 2504 | 48% | 49.5% | 2.5% | 0.8 to 3 | 1.8 to 2.8 | 2.0 | 2.2 | 2.4 |
| 2505 | 49% | 48.5% | 2.5% | 0.8 to 3 | 1.8 to 2.8 | 2.0 | 2.2 | 2.4 |
| 2506 | 50% | 47.5% | 2.5% | 0.8 to 3 | 1.8 to 2.8 | 2.0 | 2.2 | 2.4 |
| 2507 | 51% | 46.5% | 2.5% | 0.8 to 3 | 1.8 to 2.8 | 2.0 | 2.2 | 2.4 |
| 2508 | 52% | 45.5% | 2.5% | 0.8 to 3 | 1.8 to 2.8 | 2.0 | 2.2 | 2.4 |
| 2509 | 53% | 44.5% | 2.5% | 0.8 to 3 | 1.8 to 2.8 | 2.0 | 2.2 | 2.4 |
| 2510 | 54% | 43.5% | 2.5% | 0.8 to 3 | 1.8 to 2.8 | 2.0 | 2.2 | 2.4 |
| 2511 | 55% | 42.5% | 2.5% | 0.8 to 3 | 1.8 to 2.8 | 2.0 | 2.2 | 2.4 |
| 2512 | 56% | 41.5% | 2.5% | 0.8 to 3 | 1.8 to 2.8 | 2.0 | 2.2 | 2.4 |
| 2513 | 57% | 40.5% | 2.5% | 0.8 to 3 | 1.8 to 2.8 | 2.0 | 2.2 | 2.4 |
| 2514 | 58% | 39.5% | 2.5% | 0.8 to 3 | 1.8 to 2.8 | 2.0 | 2.2 | 2.4 |
| 2515 | 59% | 38.5% | 2.5% | 0.8 to 3 | 1.8 to 2.8 | 2.0 | 2.2 | 2.4 |
| 2516 | 60% | 37.5% | 2.5% | 0.8 to 3 | 1.8 to 2.8 | 2.0 | 2.2 | 2.4 |
| 2517 | 30% | 67% | 3% | 0.8 to 3 | 1.8 to 2.8 | 2.0 | 2.2 | 2.4 |
| 2518 | 31% | 66% | 3% | 0.8 to 3 | 1.8 to 2.8 | 2.0 | 2.2 | 2.4 |
| 2519 | 32% | 65% | 3% | 0.8 to 3 | 1.8 to 2.8 | 2.0 | 2.2 | 2.4 |
| 2520 | 33% | 64% | 3% | 0.8 to 3 | 1.8 to 2.8 | 2.0 | 2.2 | 2.4 |
| 2521 | 34% | 63% | 3% | 0.8 to 3 | 1.8 to 2.8 | 2.0 | 2.2 | 2.4 |
| 2522 | 35% | 62% | 3% | 0.8 to 3 | 1.8 to 2.8 | 2.0 | 2.2 | 2.4 |
| 2523 | 36% | 61% | 3% | 0.8 to 3 | 1.8 to 2.8 | 2.0 | 2.2 | 2.4 |
| 2524 | 37% | 60% | 3% | 0.8 to 3 | 1.8 to 2.8 | 2.0 | 2.2 | 2.4 |
| 2525 | 38% | 59% | 3% | 0.8 to 3 | 1.8 to 2.8 | 2.0 | 2.2 | 2.4 |
| 2526 | 39% | 58% | 3% | 0.8 to 3 | 1.8 to 2.8 | 2.0 | 2.2 | 2.4 |
| 2527 | 40% | 57% | 3% | 0.8 to 3 | 1.8 to 2.8 | 2.0 | 2.2 | 2.4 |
| 2528 | 41% | 56% | 3% | 0.8 to 3 | 1.8 to 2.8 | 2.0 | 2.2 | 2.4 |
| 2529 | 42% | 55% | 3% | 0.8 to 3 | 1.8 to 2.8 | 2.0 | 2.2 | 2.4 |
| 2530 | 43% | 54% | 3% | 0.8 to 3 | 1.8 to 2.8 | 2.0 | 2.2 | 2.4 |
| 2531 | 44% | 53% | 3% | 0.8 to 3 | 1.8 to 2.8 | 2.0 | 2.2 | 2.4 |
| 2532 | 45% | 52% | 3% | 0.8 to 3 | 1.8 to 2.8 | 2.0 | 2.2 | 2.4 |
| 2533 | 46% | 51% | 3% | 0.8 to 3 | 1.8 to 2.8 | 2.0 | 2.2 | 2.4 |
| 2534 | 47% | 50% | 3% | 0.8 to 3 | 1.8 to 2.8 | 2.0 | 2.2 | 2.4 |
| 2535 | 48% | 49% | 3% | 0.8 to 3 | 1.8 to 2.8 | 2.0 | 2.2 | 2.4 |
| 2536 | 49% | 48% | 3% | 0.8 to 3 | 1.8 to 2.8 | 2.0 | 2.2 | 2.4 |
| 2537 | 50% | 47% | 3% | 0.8 to 3 | 1.8 to 2.8 | 2.0 | 2.2 | 2.4 |
| 2538 | 51% | 46% | 3% | 0.8 to 3 | 1.8 to 2.8 | 2.0 | 2.2 | 2.4 |
| 2539 | 52% | 45% | 3% | 0.8 to 3 | 1.8 to 2.8 | 2.0 | 2.2 | 2.4 |
| 2540 | 53% | 44% | 3% | 0.8 to 3 | 1.8 to 2.8 | 2.0 | 2.2 | 2.4 |
| 2541 | 54% | 43% | 3% | 0.8 to 3 | 1.8 to 2.8 | 2.0 | 2.2 | 2.4 |
| 2542 | 55% | 42% | 3% | 0.8 to 3 | 1.8 to 2.8 | 2.0 | 2.2 | 2.4 |
| 2543 | 56% | 41% | 3% | 0.8 to 3 | 1.8 to 2.8 | 2.0 | 2.2 | 2.4 |
| 2544 | 57% | 40% | 3% | 0.8 to 3 | 1.8 to 2.8 | 2.0 | 2.2 | 2.4 |
| 2545 | 58% | 39% | 3% | 0.8 to 3 | 1.8 to 2.8 | 2.0 | 2.2 | 2.4 |
| 2546 | 59% | 38% | 3% | 0.8 to 3 | 1.8 to 2.8 | 2.0 | 2.2 | 2.4 |
| 2547 | 60% | 37% | 3% | 0.8 to 3 | 1.8 to 2.8 | 2.0 | 2.2 | 2.4 |
| 2548 | 30% | 66.5% | 3.5% | 0.8 to 3 | 1.8 to 2.8 | 2.0 | 2.2 | 2.4 |
| 2549 | 31% | 65.5% | 3.5% | 0.8 to 3 | 1.8 to 2.8 | 2.0 | 2.2 | 2.4 |
| 2550 | 32% | 64.5% | 3.5% | 0.8 to 3 | 1.8 to 2.8 | 2.0 | 2.2 | 2.4 |
| 2551 | 33% | 63.5% | 3.5% | 0.8 to 3 | 1.8 to 2.8 | 2.0 | 2.2 | 2.4 |
| 2552 | 34% | 62.5% | 3.5% | 0.8 to 3 | 1.8 to 2.8 | 2.0 | 2.2 | 2.4 |
| 2553 | 35% | 61.5% | 3.5% | 0.8 to 3 | 1.8 to 2.8 | 2.0 | 2.2 | 2.4 |
| 2554 | 36% | 60.5% | 3.5% | 0.8 to 3 | 1.8 to 2.8 | 2.0 | 2.2 | 2.4 |
| 2555 | 37% | 59.5% | 3.5% | 0.8 to 3 | 1.8 to 2.8 | 2.0 | 2.2 | 2.4 |
| 2556 | 38% | 58.5% | 3.5% | 0.8 to 3 | 1.8 to 2.8 | 2.0 | 2.2 | 2.4 |
| 2557 | 39% | 57.5% | 3.5% | 0.8 to 3 | 1.8 to 2.8 | 2.0 | 2.2 | 2.4 |
| 2558 | 40% | 56.5% | 3.5% | 0.8 to 3 | 1.8 to 2.8 | 2.0 | 2.2 | 2.4 |
| 2559 | 41% | 55.5% | 3.5% | 0.8 to 3 | 1.8 to 2.8 | 2.0 | 2.2 | 2.4 |
| 2560 | 42% | 54.5% | 3.5% | 0.8 to 3 | 1.8 to 2.8 | 2.0 | 2.2 | 2.4 |

TABLE 6-continued

|  | Alkyl Sulfate Alkyl Chain Length, Wt. % | Alkyl Ether Sulfate | | | | | |
|---|---|---|---|---|---|---|---|
|  |  | Alkyl Chain Length, Wt. % | Average mol. EO (Alternatives for each numbered species) | | | | |
| Species | 8 to 10 | 8 to 10 | Range A | Range B | Species C | Species D | Species E |
| 2561 | 43% | 53.5% | 3.5% | 0.8 to 3 | 1.8 to 2.8 | 2.0 | 2.2 | 2.4 |
| 2562 | 44% | 52.5% | 3.5% | 0.8 to 3 | 1.8 to 2.8 | 2.0 | 2.2 | 2.4 |
| 2563 | 45% | 51.5% | 3.5% | 0.8 to 3 | 1.8 to 2.8 | 2.0 | 2.2 | 2.4 |
| 2564 | 46% | 50.5% | 3.5% | 0.8 to 3 | 1.8 to 2.8 | 2.0 | 2.2 | 2.4 |
| 2565 | 47% | 49.5% | 3.5% | 0.8 to 3 | 1.8 to 2.8 | 2.0 | 2.2 | 2.4 |
| 2566 | 48% | 48.5% | 3.5% | 0.8 to 3 | 1.8 to 2.8 | 2.0 | 2.2 | 2.4 |
| 2567 | 49% | 47.5% | 3.5% | 0.8 to 3 | 1.8 to 2.8 | 2.0 | 2.2 | 2.4 |
| 2568 | 50% | 46.5% | 3.5% | 0.8 to 3 | 1.8 to 2.8 | 2.0 | 2.2 | 2.4 |
| 2569 | 51% | 45.5% | 3.5% | 0.8 to 3 | 1.8 to 2.8 | 2.0 | 2.2 | 2.4 |
| 2570 | 52% | 44.5% | 3.5% | 0.8 to 3 | 1.8 to 2.8 | 2.0 | 2.2 | 2.4 |
| 2571 | 53% | 43.5% | 3.5% | 0.8 to 3 | 1.8 to 2.8 | 2.0 | 2.2 | 2.4 |
| 2572 | 54% | 42.5% | 3.5% | 0.8 to 3 | 1.8 to 2.8 | 2.0 | 2.2 | 2.4 |
| 2573 | 55% | 41.5% | 3.5% | 0.8 to 3 | 1.8 to 2.8 | 2.0 | 2.2 | 2.4 |
| 2574 | 56% | 40.5% | 3.5% | 0.8 to 3 | 1.8 to 2.8 | 2.0 | 2.2 | 2.4 |
| 2575 | 57% | 39.5% | 3.5% | 0.8 to 3 | 1.8 to 2.8 | 2.0 | 2.2 | 2.4 |
| 2576 | 58% | 38.5% | 3.5% | 0.8 to 3 | 1.8 to 2.8 | 2.0 | 2.2 | 2.4 |
| 2577 | 59% | 37.5% | 3.5% | 0.8 to 3 | 1.8 to 2.8 | 2.0 | 2.2 | 2.4 |
| 2578 | 60% | 36.5% | 3.5% | 0.8 to 3 | 1.8 to 2.8 | 2.0 | 2.2 | 2.4 |
| 2579 | 30% | 66% | 4% | 0.8 to 3 | 1.8 to 2.8 | 2.0 | 2.2 | 2.4 |
| 2580 | 31% | 65% | 4% | 0.8 to 3 | 1.8 to 2.8 | 2.0 | 2.2 | 2.4 |
| 2581 | 32% | 64% | 4% | 0.8 to 3 | 1.8 to 2.8 | 2.0 | 2.2 | 2.4 |
| 2582 | 33% | 63% | 4% | 0.8 to 3 | 1.8 to 2.8 | 2.0 | 2.2 | 2.4 |
| 2583 | 34% | 62% | 4% | 0.8 to 3 | 1.8 to 2.8 | 2.0 | 2.2 | 2.4 |
| 2584 | 35% | 61% | 4% | 0.8 to 3 | 1.8 to 2.8 | 2.0 | 2.2 | 2.4 |
| 2585 | 36% | 60% | 4% | 0.8 to 3 | 1.8 to 2.8 | 2.0 | 2.2 | 2.4 |
| 2586 | 37% | 59% | 4% | 0.8 to 3 | 1.8 to 2.8 | 2.0 | 2.2 | 2.4 |
| 2587 | 38% | 58% | 4% | 0.8 to 3 | 1.8 to 2.8 | 2.0 | 2.2 | 2.4 |
| 2588 | 39% | 57% | 4% | 0.8 to 3 | 1.8 to 2.8 | 2.0 | 2.2 | 2.4 |
| 2589 | 40% | 56% | 4% | 0.8 to 3 | 1.8 to 2.8 | 2.0 | 2.2 | 2.4 |
| 2590 | 41% | 55% | 4% | 0.8 to 3 | 1.8 to 2.8 | 2.0 | 2.2 | 2.4 |
| 2591 | 42% | 54% | 4% | 0.8 to 3 | 1.8 to 2.8 | 2.0 | 2.2 | 2.4 |
| 2592 | 43% | 53% | 4% | 0.8 to 3 | 1.8 to 2.8 | 2.0 | 2.2 | 2.4 |
| 2593 | 44% | 52% | 4% | 0.8 to 3 | 1.8 to 2.8 | 2.0 | 2.2 | 2.4 |
| 2594 | 45% | 51% | 4% | 0.8 to 3 | 1.8 to 2.8 | 2.0 | 2.2 | 2.4 |
| 2595 | 46% | 50% | 4% | 0.8 to 3 | 1.8 to 2.8 | 2.0 | 2.2 | 2.4 |
| 2596 | 47% | 49% | 4% | 0.8 to 3 | 1.8 to 2.8 | 2.0 | 2.2 | 2.4 |
| 2597 | 48% | 48% | 4% | 0.8 to 3 | 1.8 to 2.8 | 2.0 | 2.2 | 2.4 |
| 2598 | 49% | 47% | 4% | 0.8 to 3 | 1.8 to 2.8 | 2.0 | 2.2 | 2.4 |
| 2599 | 50% | 46% | 4% | 0.8 to 3 | 1.8 to 2.8 | 2.0 | 2.2 | 2.4 |
| 2600 | 51% | 45% | 4% | 0.8 to 3 | 1.8 to 2.8 | 2.0 | 2.2 | 2.4 |
| 2601 | 52% | 44% | 4% | 0.8 to 3 | 1.8 to 2.8 | 2.0 | 2.2 | 2.4 |
| 2602 | 53% | 43% | 4% | 0.8 to 3 | 1.8 to 2.8 | 2.0 | 2.2 | 2.4 |
| 2603 | 54% | 42% | 4% | 0.8 to 3 | 1.8 to 2.8 | 2.0 | 2.2 | 2.4 |
| 2604 | 55% | 41% | 4% | 0.8 to 3 | 1.8 to 2.8 | 2.0 | 2.2 | 2.4 |
| 2605 | 56% | 40% | 4% | 0.8 to 3 | 1.8 to 2.8 | 2.0 | 2.2 | 2.4 |
| 2606 | 57% | 39% | 4% | 0.8 to 3 | 1.8 to 2.8 | 2.0 | 2.2 | 2.4 |
| 2607 | 58% | 38% | 4% | 0.8 to 3 | 1.8 to 2.8 | 2.0 | 2.2 | 2.4 |
| 2608 | 59% | 37% | 4% | 0.8 to 3 | 1.8 to 2.8 | 2.0 | 2.2 | 2.4 |
| 2609 | 60% | 36% | 4% | 0.8 to 3 | 1.8 to 2.8 | 2.0 | 2.2 | 2.4 |
| 2610 | 30% | 65.5% | 4.5% | 0.8 to 3 | 1.8 to 2.8 | 2.0 | 2.2 | 2.4 |
| 2611 | 31% | 64.5% | 4.5% | 0.8 to 3 | 1.8 to 2.8 | 2.0 | 2.2 | 2.4 |
| 2612 | 32% | 63.5% | 4.5% | 0.8 to 3 | 1.8 to 2.8 | 2.0 | 2.2 | 2.4 |
| 2613 | 33% | 62.5% | 4.5% | 0.8 to 3 | 1.8 to 2.8 | 2.0 | 2.2 | 2.4 |
| 2614 | 34% | 61.5% | 4.5% | 0.8 to 3 | 1.8 to 2.8 | 2.0 | 2.2 | 2.4 |
| 2615 | 35% | 60.5% | 4.5% | 0.8 to 3 | 1.8 to 2.8 | 2.0 | 2.2 | 2.4 |
| 2616 | 36% | 59.5% | 4.5% | 0.8 to 3 | 1.8 to 2.8 | 2.0 | 2.2 | 2.4 |
| 2617 | 37% | 58.5% | 4.5% | 0.8 to 3 | 1.8 to 2.8 | 2.0 | 2.2 | 2.4 |
| 2618 | 38% | 57.5% | 4.5% | 0.8 to 3 | 1.8 to 2.8 | 2.0 | 2.2 | 2.4 |
| 2619 | 39% | 56.5% | 4.5% | 0.8 to 3 | 1.8 to 2.8 | 2.0 | 2.2 | 2.4 |
| 2620 | 40% | 55.5% | 4.5% | 0.8 to 3 | 1.8 to 2.8 | 2.0 | 2.2 | 2.4 |
| 2621 | 41% | 54.5% | 4.5% | 0.8 to 3 | 1.8 to 2.8 | 2.0 | 2.2 | 2.4 |
| 2622 | 42% | 53.5% | 4.5% | 0.8 to 3 | 1.8 to 2.8 | 2.0 | 2.2 | 2.4 |
| 2623 | 43% | 52.5% | 4.5% | 0.8 to 3 | 1.8 to 2.8 | 2.0 | 2.2 | 2.4 |
| 2624 | 44% | 51.5% | 4.5% | 0.8 to 3 | 1.8 to 2.8 | 2.0 | 2.2 | 2.4 |
| 2625 | 45% | 50.5% | 4.5% | 0.8 to 3 | 1.8 to 2.8 | 2.0 | 2.2 | 2.4 |
| 2626 | 46% | 49.5% | 4.5% | 0.8 to 3 | 1.8 to 2.8 | 2.0 | 2.2 | 2.4 |
| 2627 | 47% | 48.5% | 4.5% | 0.8 to 3 | 1.8 to 2.8 | 2.0 | 2.2 | 2.4 |
| 2628 | 48% | 47.5% | 4.5% | 0.8 to 3 | 1.8 to 2.8 | 2.0 | 2.2 | 2.4 |
| 2629 | 49% | 46.5% | 4.5% | 0.8 to 3 | 1.8 to 2.8 | 2.0 | 2.2 | 2.4 |
| 2630 | 50% | 45.5% | 4.5% | 0.8 to 3 | 1.8 to 2.8 | 2.0 | 2.2 | 2.4 |

TABLE 6-continued

| | Alkyl Sulfate Alkyl Chain Length, Wt. % | Alkyl Ether Sulfate | | | | | | |
|---|---|---|---|---|---|---|---|---|
| | | Alkyl Chain Length, Wt. % | Average mol. EO (Alternatives for each numbered species) | | | | | |
| Species | 8 | 8 to 10 | 8 to 10 | Range A | Range B | Species C | Species D | Species E |
| 2631 | 51% | 44.5% | 4.5% | 0.8 to 3 | 1.8 to 2.8 | 2.0 | 2.2 | 2.4 |
| 2632 | 52% | 43.5% | 4.5% | 0.8 to 3 | 1.8 to 2.8 | 2.0 | 2.2 | 2.4 |
| 2633 | 53% | 42.5% | 4.5% | 0.8 to 3 | 1.8 to 2.8 | 2.0 | 2.2 | 2.4 |
| 2634 | 54% | 41.5% | 4.5% | 0.8 to 3 | 1.8 to 2.8 | 2.0 | 2.2 | 2.4 |
| 2635 | 55% | 40.5% | 4.5% | 0.8 to 3 | 1.8 to 2.8 | 2.0 | 2.2 | 2.4 |
| 2636 | 56% | 39.5% | 4.5% | 0.8 to 3 | 1.8 to 2.8 | 2.0 | 2.2 | 2.4 |
| 2637 | 57% | 38.5% | 4.5% | 0.8 to 3 | 1.8 to 2.8 | 2.0 | 2.2 | 2.4 |
| 2638 | 58% | 37.5% | 4.5% | 0.8 to 3 | 1.8 to 2.8 | 2.0 | 2.2 | 2.4 |
| 2639 | 59% | 36.5% | 4.5% | 0.8 to 3 | 1.8 to 2.8 | 2.0 | 2.2 | 2.4 |
| 2640 | 60% | 35.5% | 4.5% | 0.8 to 3 | 1.8 to 2.8 | 2.0 | 2.2 | 2.4 |
| 2641 | 30% | 65% | 5% | 0.8 to 3 | 1.8 to 2.8 | 2.0 | 2.2 | 2.4 |
| 2642 | 31% | 64% | 5% | 0.8 to 3 | 1.8 to 2.8 | 2.0 | 2.2 | 2.4 |
| 2643 | 32% | 63% | 5% | 0.8 to 3 | 1.8 to 2.8 | 2.0 | 2.2 | 2.4 |
| 2644 | 33% | 62% | 5% | 0.8 to 3 | 1.8 to 2.8 | 2.0 | 2.2 | 2.4 |
| 2645 | 34% | 61% | 5% | 0.8 to 3 | 1.8 to 2.8 | 2.0 | 2.2 | 2.4 |
| 2646 | 35% | 60% | 5% | 0.8 to 3 | 1.8 to 2.8 | 2.0 | 2.2 | 2.4 |
| 2647 | 36% | 59% | 5% | 0.8 to 3 | 1.8 to 2.8 | 2.0 | 2.2 | 2.4 |
| 2648 | 37% | 58% | 5% | 0.8 to 3 | 1.8 to 2.8 | 2.0 | 2.2 | 2.4 |
| 2649 | 38% | 57% | 5% | 0.8 to 3 | 1.8 to 2.8 | 2.0 | 2.2 | 2.4 |
| 2650 | 39% | 56% | 5% | 0.8 to 3 | 1.8 to 2.8 | 2.0 | 2.2 | 2.4 |
| 2651 | 40% | 55% | 5% | 0.8 to 3 | 1.8 to 2.8 | 2.0 | 2.2 | 2.4 |
| 2652 | 41% | 54% | 5% | 0.8 to 3 | 1.8 to 2.8 | 2.0 | 2.2 | 2.4 |
| 2653 | 42% | 53% | 5% | 0.8 to 3 | 1.8 to 2.8 | 2.0 | 2.2 | 2.4 |
| 2654 | 43% | 52% | 5% | 0.8 to 3 | 1.8 to 2.8 | 2.0 | 2.2 | 2.4 |
| 2655 | 44% | 51% | 5% | 0.8 to 3 | 1.8 to 2.8 | 2.0 | 2.2 | 2.4 |
| 2656 | 45% | 50% | 5% | 0.8 to 3 | 1.8 to 2.8 | 2.0 | 2.2 | 2.4 |
| 2657 | 46% | 49% | 5% | 0.8 to 3 | 1.8 to 2.8 | 2.0 | 2.2 | 2.4 |
| 2658 | 47% | 48% | 5% | 0.8 to 3 | 1.8 to 2.8 | 2.0 | 2.2 | 2.4 |
| 2659 | 48% | 47% | 5% | 0.8 to 3 | 1.8 to 2.8 | 2.0 | 2.2 | 2.4 |
| 2660 | 49% | 46% | 5% | 0.8 to 3 | 1.8 to 2.8 | 2.0 | 2.2 | 2.4 |
| 2661 | 50% | 45% | 5% | 0.8 to 3 | 1.8 to 2.8 | 2.0 | 2.2 | 2.4 |
| 2662 | 51% | 44% | 5% | 0.8 to 3 | 1.8 to 2.8 | 2.0 | 2.2 | 2.4 |
| 2663 | 52% | 43% | 5% | 0.8 to 3 | 1.8 to 2.8 | 2.0 | 2.2 | 2.4 |
| 2664 | 53% | 42% | 5% | 0.8 to 3 | 1.8 to 2.8 | 2.0 | 2.2 | 2.4 |
| 2665 | 54% | 41% | 5% | 0.8 to 3 | 1.8 to 2.8 | 2.0 | 2.2 | 2.4 |
| 2666 | 55% | 40% | 5% | 0.8 to 3 | 1.8 to 2.8 | 2.0 | 2.2 | 2.4 |
| 2667 | 56% | 39% | 5% | 0.8 to 3 | 1.8 to 2.8 | 2.0 | 2.2 | 2.4 |
| 2668 | 57% | 38% | 5% | 0.8 to 3 | 1.8 to 2.8 | 2.0 | 2.2 | 2.4 |
| 2669 | 58% | 37% | 5% | 0.8 to 3 | 1.8 to 2.8 | 2.0 | 2.2 | 2.4 |
| 2670 | 59% | 36% | 5% | 0.8 to 3 | 1.8 to 2.8 | 2.0 | 2.2 | 2.4 |
| 2671 | 60% | 35% | 5% | 0.8 to 3 | 1.8 to 2.8 | 2.0 | 2.2 | 2.4 |
| 2672 | 30% | 64.5% | 5.5% | 0.8 to 3 | 1.8 to 2.8 | 2.0 | 2.2 | 2.4 |
| 2673 | 31% | 63.5% | 5.5% | 0.8 to 3 | 1.8 to 2.8 | 2.0 | 2.2 | 2.4 |
| 2674 | 32% | 62.5% | 5.5% | 0.8 to 3 | 1.8 to 2.8 | 2.0 | 2.2 | 2.4 |
| 2675 | 33% | 61.5% | 5.5% | 0.8 to 3 | 1.8 to 2.8 | 2.0 | 2.2 | 2.4 |
| 2676 | 34% | 60.5% | 5.5% | 0.8 to 3 | 1.8 to 2.8 | 2.0 | 2.2 | 2.4 |
| 2677 | 35% | 59.5% | 5.5% | 0.8 to 3 | 1.8 to 2.8 | 2.0 | 2.2 | 2.4 |
| 2678 | 36% | 58.5% | 5.5% | 0.8 to 3 | 1.8 to 2.8 | 2.0 | 2.2 | 2.4 |
| 2679 | 37% | 57.5% | 5.5% | 0.8 to 3 | 1.8 to 2.8 | 2.0 | 2.2 | 2.4 |
| 2680 | 38% | 56.5% | 5.5% | 0.8 to 3 | 1.8 to 2.8 | 2.0 | 2.2 | 2.4 |
| 2681 | 39% | 55.5% | 5.5% | 0.8 to 3 | 1.8 to 2.8 | 2.0 | 2.2 | 2.4 |
| 2682 | 40% | 54.5% | 5.5% | 0.8 to 3 | 1.8 to 2.8 | 2.0 | 2.2 | 2.4 |
| 2683 | 41% | 53.5% | 5.5% | 0.8 to 3 | 1.8 to 2.8 | 2.0 | 2.2 | 2.4 |
| 2684 | 42% | 52.5% | 5.5% | 0.8 to 3 | 1.8 to 2.8 | 2.0 | 2.2 | 2.4 |
| 2685 | 43% | 51.5% | 5.5% | 0.8 to 3 | 1.8 to 2.8 | 2.0 | 2.2 | 2.4 |
| 2686 | 44% | 50.5% | 5.5% | 0.8 to 3 | 1.8 to 2.8 | 2.0 | 2.2 | 2.4 |
| 2687 | 45% | 49.5% | 5.5% | 0.8 to 3 | 1.8 to 2.8 | 2.0 | 2.2 | 2.4 |
| 2688 | 46% | 48.5% | 5.5% | 0.8 to 3 | 1.8 to 2.8 | 2.0 | 2.2 | 2.4 |
| 2689 | 47% | 47.5% | 5.5% | 0.8 to 3 | 1.8 to 2.8 | 2.0 | 2.2 | 2.4 |
| 2690 | 48% | 46.5% | 5.5% | 0.8 to 3 | 1.8 to 2.8 | 2.0 | 2.2 | 2.4 |
| 2691 | 49% | 45.5% | 5.5% | 0.8 to 3 | 1.8 to 2.8 | 2.0 | 2.2 | 2.4 |
| 2692 | 50% | 44.5% | 5.5% | 0.8 to 3 | 1.8 to 2.8 | 2.0 | 2.2 | 2.4 |
| 2693 | 51% | 43.5% | 5.5% | 0.8 to 3 | 1.8 to 2.8 | 2.0 | 2.2 | 2.4 |
| 2694 | 52% | 42.5% | 5.5% | 0.8 to 3 | 1.8 to 2.8 | 2.0 | 2.2 | 2.4 |
| 2695 | 53% | 41.5% | 5.5% | 0.8 to 3 | 1.8 to 2.8 | 2.0 | 2.2 | 2.4 |
| 2696 | 54% | 40.5% | 5.5% | 0.8 to 3 | 1.8 to 2.8 | 2.0 | 2.2 | 2.4 |
| 2697 | 55% | 39.5% | 5.5% | 0.8 to 3 | 1.8 to 2.8 | 2.0 | 2.2 | 2.4 |
| 2698 | 56% | 38.5% | 5.5% | 0.8 to 3 | 1.8 to 2.8 | 2.0 | 2.2 | 2.4 |
| 2699 | 57% | 37.5% | 5.5% | 0.8 to 3 | 1.8 to 2.8 | 2.0 | 2.2 | 2.4 |
| 2700 | 58% | 36.5% | 5.5% | 0.8 to 3 | 1.8 to 2.8 | 2.0 | 2.2 | 2.4 |

TABLE 6-continued

| | Alkyl Sulfate Alkyl Chain Length, Wt. % | Alkyl Ether Sulfate ||||||
|---|---|---|---|---|---|---|---|
| | | Alkyl Chain Length, Wt. % | Average mol. EO (Alternatives for each numbered species) |||||
| Species | 8 to 10 | 8 to 10 | Range A | Range B | Species C | Species D | Species E |
| | 8 | | | | | | |
|---|---|---|---|---|---|---|---|
| 2701 | 59% | 35.5% | 5.5% | 0.8 to 3 | 1.8 to 2.8 | 2.0 | 2.2 | 2.4 |
| 2702 | 60% | 34.5% | 5.5% | 0.8 to 3 | 1.8 to 2.8 | 2.0 | 2.2 | 2.4 |
| 2703 | 30% | 64% | 6% | 0.8 to 3 | 1.8 to 2.8 | 2.0 | 2.2 | 2.4 |
| 2704 | 31% | 63% | 6% | 0.8 to 3 | 1.8 to 2.8 | 2.0 | 2.2 | 2.4 |
| 2705 | 32% | 62% | 6% | 0.8 to 3 | 1.8 to 2.8 | 2.0 | 2.2 | 2.4 |
| 2706 | 33% | 61% | 6% | 0.8 to 3 | 1.8 to 2.8 | 2.0 | 2.2 | 2.4 |
| 2707 | 34% | 60% | 6% | 0.8 to 3 | 1.8 to 2.8 | 2.0 | 2.2 | 2.4 |
| 2708 | 35% | 59% | 6% | 0.8 to 3 | 1.8 to 2.8 | 2.0 | 2.2 | 2.4 |
| 2709 | 36% | 58% | 6% | 0.8 to 3 | 1.8 to 2.8 | 2.0 | 2.2 | 2.4 |
| 2710 | 37% | 57% | 6% | 0.8 to 3 | 1.8 to 2.8 | 2.0 | 2.2 | 2.4 |
| 2711 | 38% | 56% | 6% | 0.8 to 3 | 1.8 to 2.8 | 2.0 | 2.2 | 2.4 |
| 2712 | 39% | 55% | 6% | 0.8 to 3 | 1.8 to 2.8 | 2.0 | 2.2 | 2.4 |
| 2713 | 40% | 54% | 6% | 0.8 to 3 | 1.8 to 2.8 | 2.0 | 2.2 | 2.4 |
| 2714 | 41% | 53% | 6% | 0.8 to 3 | 1.8 to 2.8 | 2.0 | 2.2 | 2.4 |
| 2715 | 42% | 52% | 6% | 0.8 to 3 | 1.8 to 2.8 | 2.0 | 2.2 | 2.4 |
| 2716 | 43% | 51% | 6% | 0.8 to 3 | 1.8 to 2.8 | 2.0 | 2.2 | 2.4 |
| 2717 | 44% | 50% | 6% | 0.8 to 3 | 1.8 to 2.8 | 2.0 | 2.2 | 2.4 |
| 2718 | 45% | 49% | 6% | 0.8 to 3 | 1.8 to 2.8 | 2.0 | 2.2 | 2.4 |
| 2719 | 46% | 48% | 6% | 0.8 to 3 | 1.8 to 2.8 | 2.0 | 2.2 | 2.4 |
| 2720 | 47% | 47% | 6% | 0.8 to 3 | 1.8 to 2.8 | 2.0 | 2.2 | 2.4 |
| 2721 | 48% | 46% | 6% | 0.8 to 3 | 1.8 to 2.8 | 2.0 | 2.2 | 2.4 |
| 2722 | 49% | 45% | 6% | 0.8 to 3 | 1.8 to 2.8 | 2.0 | 2.2 | 2.4 |
| 2723 | 50% | 44% | 6% | 0.8 to 3 | 1.8 to 2.8 | 2.0 | 2.2 | 2.4 |
| 2724 | 51% | 43% | 6% | 0.8 to 3 | 1.8 to 2.8 | 2.0 | 2.2 | 2.4 |
| 2725 | 52% | 42% | 6% | 0.8 to 3 | 1.8 to 2.8 | 2.0 | 2.2 | 2.4 |
| 2726 | 53% | 41% | 6% | 0.8 to 3 | 1.8 to 2.8 | 2.0 | 2.2 | 2.4 |
| 2727 | 54% | 40% | 6% | 0.8 to 3 | 1.8 to 2.8 | 2.0 | 2.2 | 2.4 |
| 2728 | 55% | 39% | 6% | 0.8 to 3 | 1.8 to 2.8 | 2.0 | 2.2 | 2.4 |
| 2729 | 56% | 38% | 6% | 0.8 to 3 | 1.8 to 2.8 | 2.0 | 2.2 | 2.4 |
| 2730 | 57% | 37% | 6% | 0.8 to 3 | 1.8 to 2.8 | 2.0 | 2.2 | 2.4 |
| 2731 | 58% | 36% | 6% | 0.8 to 3 | 1.8 to 2.8 | 2.0 | 2.2 | 2.4 |
| 2732 | 59% | 35% | 6% | 0.8 to 3 | 1.8 to 2.8 | 2.0 | 2.2 | 2.4 |
| 2733 | 60% | 34% | 6% | 0.8 to 3 | 1.8 to 2.8 | 2.0 | 2.2 | 2.4 |
| 2734 | 30% | 63.5% | 6.5% | 0.8 to 3 | 1.8 to 2.8 | 2.0 | 2.2 | 2.4 |
| 2735 | 31% | 62.5% | 6.5% | 0.8 to 3 | 1.8 to 2.8 | 2.0 | 2.2 | 2.4 |
| 2736 | 32% | 61.5% | 6.5% | 0.8 to 3 | 1.8 to 2.8 | 2.0 | 2.2 | 2.4 |
| 2737 | 33% | 60.5% | 6.5% | 0.8 to 3 | 1.8 to 2.8 | 2.0 | 2.2 | 2.4 |
| 2738 | 34% | 59.5% | 6.5% | 0.8 to 3 | 1.8 to 2.8 | 2.0 | 2.2 | 2.4 |
| 2739 | 35% | 58.5% | 6.5% | 0.8 to 3 | 1.8 to 2.8 | 2.0 | 2.2 | 2.4 |
| 2740 | 36% | 57.5% | 6.5% | 0.8 to 3 | 1.8 to 2.8 | 2.0 | 2.2 | 2.4 |
| 2741 | 37% | 56.5% | 6.5% | 0.8 to 3 | 1.8 to 2.8 | 2.0 | 2.2 | 2.4 |
| 2742 | 38% | 55.5% | 6.5% | 0.8 to 3 | 1.8 to 2.8 | 2.0 | 2.2 | 2.4 |
| 2743 | 39% | 54.5% | 6.5% | 0.8 to 3 | 1.8 to 2.8 | 2.0 | 2.2 | 2.4 |
| 2744 | 40% | 53.5% | 6.5% | 0.8 to 3 | 1.8 to 2.8 | 2.0 | 2.2 | 2.4 |
| 2745 | 41% | 52.5% | 6.5% | 0.8 to 3 | 1.8 to 2.8 | 2.0 | 2.2 | 2.4 |
| 2746 | 42% | 51.5% | 6.5% | 0.8 to 3 | 1.8 to 2.8 | 2.0 | 2.2 | 2.4 |
| 2747 | 43% | 50.5% | 6.5% | 0.8 to 3 | 1.8 to 2.8 | 2.0 | 2.2 | 2.4 |
| 2748 | 44% | 49.5% | 6.5% | 0.8 to 3 | 1.8 to 2.8 | 2.0 | 2.2 | 2.4 |
| 2749 | 45% | 48.5% | 6.5% | 0.8 to 3 | 1.8 to 2.8 | 2.0 | 2.2 | 2.4 |
| 2750 | 46% | 47.5% | 6.5% | 0.8 to 3 | 1.8 to 2.8 | 2.0 | 2.2 | 2.4 |
| 2751 | 47% | 46.5% | 6.5% | 0.8 to 3 | 1.8 to 2.8 | 2.0 | 2.2 | 2.4 |
| 2752 | 48% | 45.5% | 6.5% | 0.8 to 3 | 1.8 to 2.8 | 2.0 | 2.2 | 2.4 |
| 2753 | 49% | 44.5% | 6.5% | 0.8 to 3 | 1.8 to 2.8 | 2.0 | 2.2 | 2.4 |
| 2754 | 50% | 43.5% | 6.5% | 0.8 to 3 | 1.8 to 2.8 | 2.0 | 2.2 | 2.4 |
| 2755 | 51% | 42.5% | 6.5% | 0.8 to 3 | 1.8 to 2.8 | 2.0 | 2.2 | 2.4 |
| 2756 | 52% | 41.5% | 6.5% | 0.8 to 3 | 1.8 to 2.8 | 2.0 | 2.2 | 2.4 |
| 2757 | 53% | 40.5% | 6.5% | 0.8 to 3 | 1.8 to 2.8 | 2.0 | 2.2 | 2.4 |
| 2758 | 54% | 39.5% | 6.5% | 0.8 to 3 | 1.8 to 2.8 | 2.0 | 2.2 | 2.4 |
| 2759 | 55% | 38.5% | 6.5% | 0.8 to 3 | 1.8 to 2.8 | 2.0 | 2.2 | 2.4 |
| 2760 | 56% | 37.5% | 6.5% | 0.8 to 3 | 1.8 to 2.8 | 2.0 | 2.2 | 2.4 |
| 2761 | 57% | 36.5% | 6.5% | 0.8 to 3 | 1.8 to 2.8 | 2.0 | 2.2 | 2.4 |
| 2762 | 58% | 35.5% | 6.5% | 0.8 to 3 | 1.8 to 2.8 | 2.0 | 2.2 | 2.4 |
| 2763 | 59% | 34.5% | 6.5% | 0.8 to 3 | 1.8 to 2.8 | 2.0 | 2.2 | 2.4 |
| 2764 | 60% | 33.5% | 6.5% | 0.8 to 3 | 1.8 to 2.8 | 2.0 | 2.2 | 2.4 |
| 2765 | 30% | 63% | 7% | 0.8 to 3 | 1.8 to 2.8 | 2.0 | 2.2 | 2.4 |
| 2766 | 31% | 62% | 7% | 0.8 to 3 | 1.8 to 2.8 | 2.0 | 2.2 | 2.4 |
| 2767 | 32% | 61% | 7% | 0.8 to 3 | 1.8 to 2.8 | 2.0 | 2.2 | 2.4 |
| 2768 | 33% | 60% | 7% | 0.8 to 3 | 1.8 to 2.8 | 2.0 | 2.2 | 2.4 |
| 2769 | 34% | 59% | 7% | 0.8 to 3 | 1.8 to 2.8 | 2.0 | 2.2 | 2.4 |
| 2770 | 35% | 58% | 7% | 0.8 to 3 | 1.8 to 2.8 | 2.0 | 2.2 | 2.4 |

TABLE 6-continued

| | Alkyl Sulfate Alkyl Chain Length, Wt. % | Alkyl Ether Sulfate | | | | | | |
|---|---|---|---|---|---|---|---|---|
| | | Alkyl Chain Length, Wt. % | | Average mol. EO (Alternatives for each numbered species) | | | | |
| Species | 8 | 8 to 10 | 8 to 10 | Range A | Range B | Species C | Species D | Species E |
| 2771 | 36% | 57% | 7% | 0.8 to 3 | 1.8 to 2.8 | 2.0 | 2.2 | 2.4 |
| 2772 | 37% | 56% | 7% | 0.8 to 3 | 1.8 to 2.8 | 2.0 | 2.2 | 2.4 |
| 2773 | 38% | 55% | 7% | 0.8 to 3 | 1.8 to 2.8 | 2.0 | 2.2 | 2.4 |
| 2774 | 39% | 54% | 7% | 0.8 to 3 | 1.8 to 2.8 | 2.0 | 2.2 | 2.4 |
| 2775 | 40% | 53% | 7% | 0.8 to 3 | 1.8 to 2.8 | 2.0 | 2.2 | 2.4 |
| 2776 | 41% | 52% | 7% | 0.8 to 3 | 1.8 to 2.8 | 2.0 | 2.2 | 2.4 |
| 2777 | 42% | 51% | 7% | 0.8 to 3 | 1.8 to 2.8 | 2.0 | 2.2 | 2.4 |
| 2778 | 43% | 50% | 7% | 0.8 to 3 | 1.8 to 2.8 | 2.0 | 2.2 | 2.4 |
| 2779 | 44% | 49% | 7% | 0.8 to 3 | 1.8 to 2.8 | 2.0 | 2.2 | 2.4 |
| 2780 | 45% | 48% | 7% | 0.8 to 3 | 1.8 to 2.8 | 2.0 | 2.2 | 2.4 |
| 2781 | 46% | 47% | 7% | 0.8 to 3 | 1.8 to 2.8 | 2.0 | 2.2 | 2.4 |
| 2782 | 47% | 46% | 7% | 0.8 to 3 | 1.8 to 2.8 | 2.0 | 2.2 | 2.4 |
| 2783 | 48% | 45% | 7% | 0.8 to 3 | 1.8 to 2.8 | 2.0 | 2.2 | 2.4 |
| 2784 | 49% | 44% | 7% | 0.8 to 3 | 1.8 to 2.8 | 2.0 | 2.2 | 2.4 |
| 2785 | 50% | 43% | 7% | 0.8 to 3 | 1.8 to 2.8 | 2.0 | 2.2 | 2.4 |
| 2786 | 51% | 42% | 7% | 0.8 to 3 | 1.8 to 2.8 | 2.0 | 2.2 | 2.4 |
| 2787 | 52% | 41% | 7% | 0.8 to 3 | 1.8 to 2.8 | 2.0 | 2.2 | 2.4 |
| 2788 | 53% | 40% | 7% | 0.8 to 3 | 1.8 to 2.8 | 2.0 | 2.2 | 2.4 |
| 2789 | 54% | 39% | 7% | 0.8 to 3 | 1.8 to 2.8 | 2.0 | 2.2 | 2.4 |
| 2790 | 55% | 38% | 7% | 0.8 to 3 | 1.8 to 2.8 | 2.0 | 2.2 | 2.4 |
| 2791 | 56% | 37% | 7% | 0.8 to 3 | 1.8 to 2.8 | 2.0 | 2.2 | 2.4 |
| 2792 | 57% | 36% | 7% | 0.8 to 3 | 1.8 to 2.8 | 2.0 | 2.2 | 2.4 |
| 2793 | 58% | 35% | 7% | 0.8 to 3 | 1.8 to 2.8 | 2.0 | 2.2 | 2.4 |
| 2794 | 59% | 34% | 7% | 0.8 to 3 | 1.8 to 2.8 | 2.0 | 2.2 | 2.4 |
| 2795 | 60% | 33% | 7% | 0.8 to 3 | 1.8 to 2.8 | 2.0 | 2.2 | 2.4 |

TABLE 7

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % | Average mol. EO (Alternatives for each numbered species) | | | | |
| Species | 8 | 9 | 8 to 10 | Range A | Range B | Species C | Species D | Species E |
| 2796 | 30% | 70% | 0% | 0.8 to 3 | 1.8 to 2.8 | 2.0 | 2.2 | 2.4 |
| 2797 | 31% | 69% | 0% | 0.8 to 3 | 1.8 to 2.8 | 2.0 | 2.2 | 2.4 |
| 2798 | 32% | 68% | 0% | 0.8 to 3 | 1.8 to 2.8 | 2.0 | 2.2 | 2.4 |
| 2799 | 33% | 67% | 0% | 0.8 to 3 | 1.8 to 2.8 | 2.0 | 2.2 | 2.4 |
| 2800 | 34% | 66% | 0% | 0.8 to 3 | 1.8 to 2.8 | 2.0 | 2.2 | 2.4 |
| 2801 | 35% | 65% | 0% | 0.8 to 3 | 1.8 to 2.8 | 2.0 | 2.2 | 2.4 |
| 2802 | 36% | 64% | 0% | 0.8 to 3 | 1.8 to 2.8 | 2.0 | 2.2 | 2.4 |
| 2803 | 37% | 63% | 0% | 0.8 to 3 | 1.8 to 2.8 | 2.0 | 2.2 | 2.4 |
| 2804 | 38% | 62% | 0% | 0.8 to 3 | 1.8 to 2.8 | 2.0 | 2.2 | 2.4 |
| 2805 | 39% | 61% | 0% | 0.8 to 3 | 1.8 to 2.8 | 2.0 | 2.2 | 2.4 |
| 2806 | 40% | 60% | 0% | 0.8 to 3 | 1.8 to 2.8 | 2.0 | 2.2 | 2.4 |
| 2807 | 41% | 59% | 0% | 0.8 to 3 | 1.8 to 2.8 | 2.0 | 2.2 | 2.4 |
| 2808 | 42% | 58% | 0% | 0.8 to 3 | 1.8 to 2.8 | 2.0 | 2.2 | 2.4 |
| 2809 | 43% | 57% | 0% | 0.8 to 3 | 1.8 to 2.8 | 2.0 | 2.2 | 2.4 |
| 2810 | 44% | 56% | 0% | 0.8 to 3 | 1.8 to 2.8 | 2.0 | 2.2 | 2.4 |
| 2811 | 45% | 55% | 0% | 0.8 to 3 | 1.8 to 2.8 | 2.0 | 2.2 | 2.4 |
| 2812 | 46% | 54% | 0% | 0.8 to 3 | 1.8 to 2.8 | 2.0 | 2.2 | 2.4 |
| 2813 | 47% | 53% | 0% | 0.8 to 3 | 1.8 to 2.8 | 2.0 | 2.2 | 2.4 |
| 2814 | 48% | 52% | 0% | 0.8 to 3 | 1.8 to 2.8 | 2.0 | 2.2 | 2.4 |
| 2815 | 49% | 51% | 0% | 0.8 to 3 | 1.8 to 2.8 | 2.0 | 2.2 | 2.4 |
| 2816 | 50% | 50% | 0% | 0.8 to 3 | 1.8 to 2.8 | 2.0 | 2.2 | 2.4 |
| 2817 | 51% | 49% | 0% | 0.8 to 3 | 1.8 to 2.8 | 2.0 | 2.2 | 2.4 |
| 2818 | 52% | 48% | 0% | 0.8 to 3 | 1.8 to 2.8 | 2.0 | 2.2 | 2.4 |
| 2819 | 53% | 47% | 0% | 0.8 to 3 | 1.8 to 2.8 | 2.0 | 2.2 | 2.4 |
| 2820 | 54% | 46% | 0% | 0.8 to 3 | 1.8 to 2.8 | 2.0 | 2.2 | 2.4 |
| 2821 | 55% | 45% | 0% | 0.8 to 3 | 1.8 to 2.8 | 2.0 | 2.2 | 2.4 |
| 2822 | 56% | 44% | 0% | 0.8 to 3 | 1.8 to 2.8 | 2.0 | 2.2 | 2.4 |
| 2823 | 57% | 43% | 0% | 0.8 to 3 | 1.8 to 2.8 | 2.0 | 2.2 | 2.4 |

TABLE 7-continued

| | Alkyl Sulfate Alkyl Chain Length, Wt. % | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| | | | 8 to | | | Species | Species | Species |
| Species | 8 | 9 | 10 | Range A | Range B | C | D | E |
| 2824 | 58% | 42% | 0% | 0.8 to 3 | 1.8 to 2.8 | 2.0 | 2.2 | 2.4 |
| 2825 | 59% | 41% | 0% | 0.8 to 3 | 1.8 to 2.8 | 2.0 | 2.2 | 2.4 |
| 2826 | 60% | 40% | 0% | 0.8 to 3 | 1.8 to 2.8 | 2.0 | 2.2 | 2.4 |
| 2827 | 30% | 69.5% | 0.5% | 0.8 to 3 | 1.8 to 2.8 | 2.0 | 2.2 | 2.4 |
| 2828 | 31% | 68.5% | 0.5% | 0.8 to 3 | 1.8 to 2.8 | 2.0 | 2.2 | 2.4 |
| 2829 | 32% | 67.5% | 0.5% | 0.8 to 3 | 1.8 to 2.8 | 2.0 | 2.2 | 2.4 |
| 2830 | 33% | 66.5% | 0.5% | 0.8 to 3 | 1.8 to 2.8 | 2.0 | 2.2 | 2.4 |
| 2831 | 34% | 65.5% | 0.5% | 0.8 to 3 | 1.8 to 2.8 | 2.0 | 2.2 | 2.4 |
| 2832 | 35% | 64.5% | 0.5% | 0.8 to 3 | 1.8 to 2.8 | 2.0 | 2.2 | 2.4 |
| 2833 | 36% | 63.5% | 0.5% | 0.8 to 3 | 1.8 to 2.8 | 2.0 | 2.2 | 2.4 |
| 2834 | 37% | 62.5% | 0.5% | 0.8 to 3 | 1.8 to 2.8 | 2.0 | 2.2 | 2.4 |
| 2835 | 38% | 61.5% | 0.5% | 0.8 to 3 | 1.8 to 2.8 | 2.0 | 2.2 | 2.4 |
| 2836 | 39% | 60.5% | 0.5% | 0.8 to 3 | 1.8 to 2.8 | 2.0 | 2.2 | 2.4 |
| 2837 | 40% | 59.5% | 0.5% | 0.8 to 3 | 1.8 to 2.8 | 2.0 | 2.2 | 2.4 |
| 2838 | 41% | 58.5% | 0.5% | 0.8 to 3 | 1.8 to 2.8 | 2.0 | 2.2 | 2.4 |
| 2839 | 42% | 57.5% | 0.5% | 0.8 to 3 | 1.8 to 2.8 | 2.0 | 2.2 | 2.4 |
| 2840 | 43% | 56.5% | 0.5% | 0.8 to 3 | 1.8 to 2.8 | 2.0 | 2.2 | 2.4 |
| 2841 | 44% | 55.5% | 0.5% | 0.8 to 3 | 1.8 to 2.8 | 2.0 | 2.2 | 2.4 |
| 2842 | 45% | 54.5% | 0.5% | 0.8 to 3 | 1.8 to 2.8 | 2.0 | 2.2 | 2.4 |
| 2843 | 46% | 53.5% | 0.5% | 0.8 to 3 | 1.8 to 2.8 | 2.0 | 2.2 | 2.4 |
| 2844 | 47% | 52.5% | 0.5% | 0.8 to 3 | 1.8 to 2.8 | 2.0 | 2.2 | 2.4 |
| 2845 | 48% | 51.5% | 0.5% | 0.8 to 3 | 1.8 to 2.8 | 2.0 | 2.2 | 2.4 |
| 2846 | 49% | 50.5% | 0.5% | 0.8 to 3 | 1.8 to 2.8 | 2.0 | 2.2 | 2.4 |
| 2847 | 50% | 49.5% | 0.5% | 0.8 to 3 | 1.8 to 2.8 | 2.0 | 2.2 | 2.4 |
| 2848 | 51% | 48.5% | 0.5% | 0.8 to 3 | 1.8 to 2.8 | 2.0 | 2.2 | 2.4 |
| 2849 | 52% | 47.5% | 0.5% | 0.8 to 3 | 1.8 to 2.8 | 2.0 | 2.2 | 2.4 |
| 2850 | 53% | 46.5% | 0.5% | 0.8 to 3 | 1.8 to 2.8 | 2.0 | 2.2 | 2.4 |
| 2851 | 54% | 45.5% | 0.5% | 0.8 to 3 | 1.8 to 2.8 | 2.0 | 2.2 | 2.4 |
| 2852 | 55% | 44.5% | 0.5% | 0.8 to 3 | 1.8 to 2.8 | 2.0 | 2.2 | 2.4 |
| 2853 | 56% | 43.5% | 0.5% | 0.8 to 3 | 1.8 to 2.8 | 2.0 | 2.2 | 2.4 |
| 2854 | 57% | 42.5% | 0.5% | 0.8 to 3 | 1.8 to 2.8 | 2.0 | 2.2 | 2.4 |
| 2855 | 58% | 41.5% | 0.5% | 0.8 to 3 | 1.8 to 2.8 | 2.0 | 2.2 | 2.4 |
| 2856 | 59% | 40.5% | 0.5% | 0.8 to 3 | 1.8 to 2.8 | 2.0 | 2.2 | 2.4 |
| 2857 | 60% | 39.5% | 0.5% | 0.8 to 3 | 1.8 to 2.8 | 2.0 | 2.2 | 2.4 |
| 2858 | 30% | 69% | 1% | 0.8 to 3 | 1.8 to 2.8 | 2.0 | 2.2 | 2.4 |
| 2859 | 31% | 68% | 1% | 0.8 to 3 | 1.8 to 2.8 | 2.0 | 2.2 | 2.4 |
| 2860 | 32% | 67% | 1% | 0.8 to 3 | 1.8 to 2.8 | 2.0 | 2.2 | 2.4 |
| 2861 | 33% | 66% | 1% | 0.8 to 3 | 1.8 to 2.8 | 2.0 | 2.2 | 2.4 |
| 2862 | 34% | 65% | 1% | 0.8 to 3 | 1.8 to 2.8 | 2.0 | 2.2 | 2.4 |
| 2863 | 35% | 64% | 1% | 0.8 to 3 | 1.8 to 2.8 | 2.0 | 2.2 | 2.4 |
| 2864 | 36% | 63% | 1% | 0.8 to 3 | 1.8 to 2.8 | 2.0 | 2.2 | 2.4 |
| 2865 | 37% | 62% | 1% | 0.8 to 3 | 1.8 to 2.8 | 2.0 | 2.2 | 2.4 |
| 2866 | 38% | 61% | 1% | 0.8 to 3 | 1.8 to 2.8 | 2.0 | 2.2 | 2.4 |
| 2867 | 39% | 60% | 1% | 0.8 to 3 | 1.8 to 2.8 | 2.0 | 2.2 | 2.4 |
| 2868 | 40% | 59% | 1% | 0.8 to 3 | 1.8 to 2.8 | 2.0 | 2.2 | 2.4 |
| 2869 | 41% | 58% | 1% | 0.8 to 3 | 1.8 to 2.8 | 2.0 | 2.2 | 2.4 |
| 2870 | 42% | 57% | 1% | 0.8 to 3 | 1.8 to 2.8 | 2.0 | 2.2 | 2.4 |
| 2871 | 43% | 56% | 1% | 0.8 to 3 | 1.8 to 2.8 | 2.0 | 2.2 | 2.4 |
| 2872 | 44% | 55% | 1% | 0.8 to 3 | 1.8 to 2.8 | 2.0 | 2.2 | 2.4 |
| 2873 | 45% | 54% | 1% | 0.8 to 3 | 1.8 to 2.8 | 2.0 | 2.2 | 2.4 |
| 2874 | 46% | 53% | 1% | 0.8 to 3 | 1.8 to 2.8 | 2.0 | 2.2 | 2.4 |
| 2875 | 47% | 52% | 1% | 0.8 to 3 | 1.8 to 2.8 | 2.0 | 2.2 | 2.4 |
| 2876 | 48% | 51% | 1% | 0.8 to 3 | 1.8 to 2.8 | 2.0 | 2.2 | 2.4 |
| 2877 | 49% | 50% | 1% | 0.8 to 3 | 1.8 to 2.8 | 2.0 | 2.2 | 2.4 |
| 2878 | 50% | 49% | 1% | 0.8 to 3 | 1.8 to 2.8 | 2.0 | 2.2 | 2.4 |
| 2879 | 51% | 48% | 1% | 0.8 to 3 | 1.8 to 2.8 | 2.0 | 2.2 | 2.4 |
| 2880 | 52% | 47% | 1% | 0.8 to 3 | 1.8 to 2.8 | 2.0 | 2.2 | 2.4 |
| 2881 | 53% | 46% | 1% | 0.8 to 3 | 1.8 to 2.8 | 2.0 | 2.2 | 2.4 |
| 2882 | 54% | 45% | 1% | 0.8 to 3 | 1.8 to 2.8 | 2.0 | 2.2 | 2.4 |
| 2883 | 55% | 44% | 1% | 0.8 to 3 | 1.8 to 2.8 | 2.0 | 2.2 | 2.4 |
| 2884 | 56% | 43% | 1% | 0.8 to 3 | 1.8 to 2.8 | 2.0 | 2.2 | 2.4 |
| 2885 | 57% | 42% | 1% | 0.8 to 3 | 1.8 to 2.8 | 2.0 | 2.2 | 2.4 |
| 2886 | 58% | 41% | 1% | 0.8 to 3 | 1.8 to 2.8 | 2.0 | 2.2 | 2.4 |
| 2887 | 59% | 40% | 1% | 0.8 to 3 | 1.8 to 2.8 | 2.0 | 2.2 | 2.4 |
| 2888 | 60% | 39% | 1% | 0.8 to 3 | 1.8 to 2.8 | 2.0 | 2.2 | 2.4 |
| 2889 | 30% | 68.5% | 1.5% | 0.8 to 3 | 1.8 to 2.8 | 2.0 | 2.2 | 2.4 |
| 2890 | 31% | 67.5% | 1.5% | 0.8 to 3 | 1.8 to 2.8 | 2.0 | 2.2 | 2.4 |
| 2891 | 32% | 66.5% | 1.5% | 0.8 to 3 | 1.8 to 2.8 | 2.0 | 2.2 | 2.4 |
| 2892 | 33% | 65.5% | 1.5% | 0.8 to 3 | 1.8 to 2.8 | 2.0 | 2.2 | 2.4 |

TABLE 7-continued

| | | | | Alkyl Ether Sulfate | | | | |
|---|---|---|---|---|---|---|---|---|
| | Alkyl Sulfate Alkyl Chain Length, Wt. % | | Alkyl Chain Length, Wt. % | Average mol. EO (Alternatives for each numbered species) | | | | |
| Species | 8 | 9 | 8 to 10 | Range A | Range B | Species C | Species D | Species E |
| 2893 | 34% | 64.5% | 1.5% | 0.8 to 3 | 1.8 to 2.8 | 2.0 | 2.2 | 2.4 |
| 2894 | 35% | 63.5% | 1.5% | 0.8 to 3 | 1.8 to 2.8 | 2.0 | 2.2 | 2.4 |
| 2895 | 36% | 62.5% | 1.5% | 0.8 to 3 | 1.8 to 2.8 | 2.0 | 2.2 | 2.4 |
| 2896 | 37% | 61.5% | 1.5% | 0.8 to 3 | 1.8 to 2.8 | 2.0 | 2.2 | 2.4 |
| 2897 | 38% | 60.5% | 1.5% | 0.8 to 3 | 1.8 to 2.8 | 2.0 | 2.2 | 2.4 |
| 2898 | 39% | 59.5% | 1.5% | 0.8 to 3 | 1.8 to 2.8 | 2.0 | 2.2 | 2.4 |
| 2899 | 40% | 58.5% | 1.5% | 0.8 to 3 | 1.8 to 2.8 | 2.0 | 2.2 | 2.4 |
| 2900 | 41% | 57.5% | 1.5% | 0.8 to 3 | 1.8 to 2.8 | 2.0 | 2.2 | 2.4 |
| 2901 | 42% | 56.5% | 1.5% | 0.8 to 3 | 1.8 to 2.8 | 2.0 | 2.2 | 2.4 |
| 2902 | 43% | 55.5% | 1.5% | 0.8 to 3 | 1.8 to 2.8 | 2.0 | 2.2 | 2.4 |
| 2903 | 44% | 54.5% | 1.5% | 0.8 to 3 | 1.8 to 2.8 | 2.0 | 2.2 | 2.4 |
| 2904 | 45% | 53.5% | 1.5% | 0.8 to 3 | 1.8 to 2.8 | 2.0 | 2.2 | 2.4 |
| 2905 | 46% | 52.5% | 1.5% | 0.8 to 3 | 1.8 to 2.8 | 2.0 | 2.2 | 2.4 |
| 2906 | 47% | 51.5% | 1.5% | 0.8 to 3 | 1.8 to 2.8 | 2.0 | 2.2 | 2.4 |
| 2907 | 48% | 50.5% | 1.5% | 0.8 to 3 | 1.8 to 2.8 | 2.0 | 2.2 | 2.4 |
| 2908 | 49% | 49.5% | 1.5% | 0.8 to 3 | 1.8 to 2.8 | 2.0 | 2.2 | 2.4 |
| 2909 | 50% | 48.5% | 1.5% | 0.8 to 3 | 1.8 to 2.8 | 2.0 | 2.2 | 2.4 |
| 2910 | 51% | 47.5% | 1.5% | 0.8 to 3 | 1.8 to 2.8 | 2.0 | 2.2 | 2.4 |
| 2911 | 52% | 46.5% | 1.5% | 0.8 to 3 | 1.8 to 2.8 | 2.0 | 2.2 | 2.4 |
| 2912 | 53% | 45.5% | 1.5% | 0.8 to 3 | 1.8 to 2.8 | 2.0 | 2.2 | 2.4 |
| 2913 | 54% | 44.5% | 1.5% | 0.8 to 3 | 1.8 to 2.8 | 2.0 | 2.2 | 2.4 |
| 2914 | 55% | 43.5% | 1.5% | 0.8 to 3 | 1.8 to 2.8 | 2.0 | 2.2 | 2.4 |
| 2915 | 56% | 42.5% | 1.5% | 0.8 to 3 | 1.8 to 2.8 | 2.0 | 2.2 | 2.4 |
| 2916 | 57% | 41.5% | 1.5% | 0.8 to 3 | 1.8 to 2.8 | 2.0 | 2.2 | 2.4 |
| 2917 | 58% | 40.5% | 1.5% | 0.8 to 3 | 1.8 to 2.8 | 2.0 | 2.2 | 2.4 |
| 2918 | 59% | 39.5% | 1.5% | 0.8 to 3 | 1.8 to 2.8 | 2.0 | 2.2 | 2.4 |
| 2919 | 60% | 38.5% | 1.5% | 0.8 to 3 | 1.8 to 2.8 | 2.0 | 2.2 | 2.4 |
| 2920 | 30% | 68% | 2% | 0.8 to 3 | 1.8 to 2.8 | 2.0 | 2.2 | 2.4 |
| 2921 | 31% | 67% | 2% | 0.8 to 3 | 1.8 to 2.8 | 2.0 | 2.2 | 2.4 |
| 2922 | 32% | 66% | 2% | 0.8 to 3 | 1.8 to 2.8 | 2.0 | 2.2 | 2.4 |
| 2923 | 33% | 65% | 2% | 0.8 to 3 | 1.8 to 2.8 | 2.0 | 2.2 | 2.4 |
| 2924 | 34% | 64% | 2% | 0.8 to 3 | 1.8 to 2.8 | 2.0 | 2.2 | 2.4 |
| 2925 | 35% | 63% | 2% | 0.8 to 3 | 1.8 to 2.8 | 2.0 | 2.2 | 2.4 |
| 2926 | 36% | 62% | 2% | 0.8 to 3 | 1.8 to 2.8 | 2.0 | 2.2 | 2.4 |
| 2927 | 37% | 61% | 2% | 0.8 to 3 | 1.8 to 2.8 | 2.0 | 2.2 | 2.4 |
| 2928 | 38% | 60% | 2% | 0.8 to 3 | 1.8 to 2.8 | 2.0 | 2.2 | 2.4 |
| 2929 | 39% | 59% | 2% | 0.8 to 3 | 1.8 to 2.8 | 2.0 | 2.2 | 2.4 |
| 2930 | 40% | 58% | 2% | 0.8 to 3 | 1.8 to 2.8 | 2.0 | 2.2 | 2.4 |
| 2931 | 41% | 57% | 2% | 0.8 to 3 | 1.8 to 2.8 | 2.0 | 2.2 | 2.4 |
| 2932 | 42% | 56% | 2% | 0.8 to 3 | 1.8 to 2.8 | 2.0 | 2.2 | 2.4 |
| 2933 | 43% | 55% | 2% | 0.8 to 3 | 1.8 to 2.8 | 2.0 | 2.2 | 2.4 |
| 2934 | 44% | 54% | 2% | 0.8 to 3 | 1.8 to 2.8 | 2.0 | 2.2 | 2.4 |
| 2935 | 45% | 53% | 2% | 0.8 to 3 | 1.8 to 2.8 | 2.0 | 2.2 | 2.4 |
| 2936 | 46% | 52% | 2% | 0.8 to 3 | 1.8 to 2.8 | 2.0 | 2.2 | 2.4 |
| 2937 | 47% | 51% | 2% | 0.8 to 3 | 1.8 to 2.8 | 2.0 | 2.2 | 2.4 |
| 2938 | 48% | 50% | 2% | 0.8 to 3 | 1.8 to 2.8 | 2.0 | 2.2 | 2.4 |
| 2939 | 49% | 49% | 2% | 0.8 to 3 | 1.8 to 2.8 | 2.0 | 2.2 | 2.4 |
| 2940 | 50% | 48% | 2% | 0.8 to 3 | 1.8 to 2.8 | 2.0 | 2.2 | 2.4 |
| 2941 | 51% | 47% | 2% | 0.8 to 3 | 1.8 to 2.8 | 2.0 | 2.2 | 2.4 |
| 2942 | 52% | 46% | 2% | 0.8 to 3 | 1.8 to 2.8 | 2.0 | 2.2 | 2.4 |
| 2943 | 53% | 45% | 2% | 0.8 to 3 | 1.8 to 2.8 | 2.0 | 2.2 | 2.4 |
| 2944 | 54% | 44% | 2% | 0.8 to 3 | 1.8 to 2.8 | 2.0 | 2.2 | 2.4 |
| 2945 | 55% | 43% | 2% | 0.8 to 3 | 1.8 to 2.8 | 2.0 | 2.2 | 2.4 |
| 2946 | 56% | 42% | 2% | 0.8 to 3 | 1.8 to 2.8 | 2.0 | 2.2 | 2.4 |
| 2947 | 57% | 41% | 2% | 0.8 to 3 | 1.8 to 2.8 | 2.0 | 2.2 | 2.4 |
| 2948 | 58% | 40% | 2% | 0.8 to 3 | 1.8 to 2.8 | 2.0 | 2.2 | 2.4 |
| 2949 | 59% | 39% | 2% | 0.8 to 3 | 1.8 to 2.8 | 2.0 | 2.2 | 2.4 |
| 2950 | 60% | 38% | 2% | 0.8 to 3 | 1.8 to 2.8 | 2.0 | 2.2 | 2.4 |
| 2951 | 30% | 67.5% | 2.5% | 0.8 to 3 | 1.8 to 2.8 | 2.0 | 2.2 | 2.4 |
| 2952 | 31% | 66.5% | 2.5% | 0.8 to 3 | 1.8 to 2.8 | 2.0 | 2.2 | 2.4 |
| 2953 | 32% | 65.5% | 2.5% | 0.8 to 3 | 1.8 to 2.8 | 2.0 | 2.2 | 2.4 |
| 2954 | 33% | 64.5% | 2.5% | 0.8 to 3 | 1.8 to 2.8 | 2.0 | 2.2 | 2.4 |
| 2955 | 34% | 63.5% | 2.5% | 0.8 to 3 | 1.8 to 2.8 | 2.0 | 2.2 | 2.4 |
| 2956 | 35% | 62.5% | 2.5% | 0.8 to 3 | 1.8 to 2.8 | 2.0 | 2.2 | 2.4 |
| 2957 | 36% | 61.5% | 2.5% | 0.8 to 3 | 1.8 to 2.8 | 2.0 | 2.2 | 2.4 |
| 2958 | 37% | 60.5% | 2.5% | 0.8 to 3 | 1.8 to 2.8 | 2.0 | 2.2 | 2.4 |
| 2959 | 38% | 59.5% | 2.5% | 0.8 to 3 | 1.8 to 2.8 | 2.0 | 2.2 | 2.4 |
| 2960 | 39% | 58.5% | 2.5% | 0.8 to 3 | 1.8 to 2.8 | 2.0 | 2.2 | 2.4 |
| 2961 | 40% | 57.5% | 2.5% | 0.8 to 3 | 1.8 to 2.8 | 2.0 | 2.2 | 2.4 |

TABLE 7-continued

|  | Alkyl Ether Sulfate | | | | | | | |
|---|---|---|---|---|---|---|---|---|
|  | Alkyl Sulfate Alkyl Chain Length, Wt. % | | Alkyl Chain Length, Wt. % 8 to | Average mol. EO (Alternatives for each numbered species) | | | | |
| Species | 8 | 9 | 10 | Range A | Range B | Species C | Species D | Species E |
| 2962 | 41% | 56.5% | 2.5% | 0.8 to 3 | 1.8 to 2.8 | 2.0 | 2.2 | 2.4 |
| 2963 | 42% | 55.5% | 2.5% | 0.8 to 3 | 1.8 to 2.8 | 2.0 | 2.2 | 2.4 |
| 2964 | 43% | 54.5% | 2.5% | 0.8 to 3 | 1.8 to 2.8 | 2.0 | 2.2 | 2.4 |
| 2965 | 44% | 53.5% | 2.5% | 0.8 to 3 | 1.8 to 2.8 | 2.0 | 2.2 | 2.4 |
| 2966 | 45% | 52.5% | 2.5% | 0.8 to 3 | 1.8 to 2.8 | 2.0 | 2.2 | 2.4 |
| 2967 | 46% | 51.5% | 2.5% | 0.8 to 3 | 1.8 to 2.8 | 2.0 | 2.2 | 2.4 |
| 2968 | 47% | 50.5% | 2.5% | 0.8 to 3 | 1.8 to 2.8 | 2.0 | 2.2 | 2.4 |
| 2969 | 48% | 49.5% | 2.5% | 0.8 to 3 | 1.8 to 2.8 | 2.0 | 2.2 | 2.4 |
| 2970 | 49% | 48.5% | 2.5% | 0.8 to 3 | 1.8 to 2.8 | 2.0 | 2.2 | 2.4 |
| 2971 | 50% | 47.5% | 2.5% | 0.8 to 3 | 1.8 to 2.8 | 2.0 | 2.2 | 2.4 |
| 2972 | 51% | 46.5% | 2.5% | 0.8 to 3 | 1.8 to 2.8 | 2.0 | 2.2 | 2.4 |
| 2973 | 52% | 45.5% | 2.5% | 0.8 to 3 | 1.8 to 2.8 | 2.0 | 2.2 | 2.4 |
| 2974 | 53% | 44.5% | 2.5% | 0.8 to 3 | 1.8 to 2.8 | 2.0 | 2.2 | 2.4 |
| 2975 | 54% | 43.5% | 2.5% | 0.8 to 3 | 1.8 to 2.8 | 2.0 | 2.2 | 2.4 |
| 2976 | 55% | 42.5% | 2.5% | 0.8 to 3 | 1.8 to 2.8 | 2.0 | 2.2 | 2.4 |
| 2977 | 56% | 41.5% | 2.5% | 0.8 to 3 | 1.8 to 2.8 | 2.0 | 2.2 | 2.4 |
| 2978 | 57% | 40.5% | 2.5% | 0.8 to 3 | 1.8 to 2.8 | 2.0 | 2.2 | 2.4 |
| 2979 | 58% | 39.5% | 2.5% | 0.8 to 3 | 1.8 to 2.8 | 2.0 | 2.2 | 2.4 |
| 2980 | 59% | 38.5% | 2.5% | 0.8 to 3 | 1.8 to 2.8 | 2.0 | 2.2 | 2.4 |
| 2981 | 60% | 37.5% | 2.5% | 0.8 to 3 | 1.8 to 2.8 | 2.0 | 2.2 | 2.4 |
| 2982 | 30% | 67% | 3% | 0.8 to 3 | 1.8 to 2.8 | 2.0 | 2.2 | 2.4 |
| 2983 | 31% | 66% | 3% | 0.8 to 3 | 1.8 to 2.8 | 2.0 | 2.2 | 2.4 |
| 2984 | 32% | 65% | 3% | 0.8 to 3 | 1.8 to 2.8 | 2.0 | 2.2 | 2.4 |
| 2985 | 33% | 64% | 3% | 0.8 to 3 | 1.8 to 2.8 | 2.0 | 2.2 | 2.4 |
| 2986 | 34% | 63% | 3% | 0.8 to 3 | 1.8 to 2.8 | 2.0 | 2.2 | 2.4 |
| 2987 | 35% | 62% | 3% | 0.8 to 3 | 1.8 to 2.8 | 2.0 | 2.2 | 2.4 |
| 2988 | 36% | 61% | 3% | 0.8 to 3 | 1.8 to 2.8 | 2.0 | 2.2 | 2.4 |
| 2989 | 37% | 60% | 3% | 0.8 to 3 | 1.8 to 2.8 | 2.0 | 2.2 | 2.4 |
| 2990 | 38% | 59% | 3% | 0.8 to 3 | 1.8 to 2.8 | 2.0 | 2.2 | 2.4 |
| 2991 | 39% | 58% | 3% | 0.8 to 3 | 1.8 to 2.8 | 2.0 | 2.2 | 2.4 |
| 2992 | 40% | 57% | 3% | 0.8 to 3 | 1.8 to 2.8 | 2.0 | 2.2 | 2.4 |
| 2993 | 41% | 56% | 3% | 0.8 to 3 | 1.8 to 2.8 | 2.0 | 2.2 | 2.4 |
| 2994 | 42% | 55% | 3% | 0.8 to 3 | 1.8 to 2.8 | 2.0 | 2.2 | 2.4 |
| 2995 | 43% | 54% | 3% | 0.8 to 3 | 1.8 to 2.8 | 2.0 | 2.2 | 2.4 |
| 2996 | 44% | 53% | 3% | 0.8 to 3 | 1.8 to 2.8 | 2.0 | 2.2 | 2.4 |
| 2997 | 45% | 52% | 3% | 0.8 to 3 | 1.8 to 2.8 | 2.0 | 2.2 | 2.4 |
| 2998 | 46% | 51% | 3% | 0.8 to 3 | 1.8 to 2.8 | 2.0 | 2.2 | 2.4 |
| 2999 | 47% | 50% | 3% | 0.8 to 3 | 1.8 to 2.8 | 2.0 | 2.2 | 2.4 |
| 3000 | 48% | 49% | 3% | 0.8 to 3 | 1.8 to 2.8 | 2.0 | 2.2 | 2.4 |
| 3001 | 49% | 48% | 3% | 0.8 to 3 | 1.8 to 2.8 | 2.0 | 2.2 | 2.4 |
| 3002 | 50% | 47% | 3% | 0.8 to 3 | 1.8 to 2.8 | 2.0 | 2.2 | 2.4 |
| 3003 | 51% | 46% | 3% | 0.8 to 3 | 1.8 to 2.8 | 2.0 | 2.2 | 2.4 |
| 3004 | 52% | 45% | 3% | 0.8 to 3 | 1.8 to 2.8 | 2.0 | 2.2 | 2.4 |
| 3005 | 53% | 44% | 3% | 0.8 to 3 | 1.8 to 2.8 | 2.0 | 2.2 | 2.4 |
| 3006 | 54% | 43% | 3% | 0.8 to 3 | 1.8 to 2.8 | 2.0 | 2.2 | 2.4 |
| 3007 | 55% | 42% | 3% | 0.8 to 3 | 1.8 to 2.8 | 2.0 | 2.2 | 2.4 |
| 3008 | 56% | 41% | 3% | 0.8 to 3 | 1.8 to 2.8 | 2.0 | 2.2 | 2.4 |
| 3009 | 57% | 40% | 3% | 0.8 to 3 | 1.8 to 2.8 | 2.0 | 2.2 | 2.4 |
| 3010 | 58% | 39% | 3% | 0.8 to 3 | 1.8 to 2.8 | 2.0 | 2.2 | 2.4 |
| 3011 | 59% | 38% | 3% | 0.8 to 3 | 1.8 to 2.8 | 2.0 | 2.2 | 2.4 |
| 3012 | 60% | 37% | 3% | 0.8 to 3 | 1.8 to 2.8 | 2.0 | 2.2 | 2.4 |
| 3013 | 30% | 66.5% | 3.5% | 0.8 to 3 | 1.8 to 2.8 | 2.0 | 2.2 | 2.4 |
| 3014 | 31% | 65.5% | 3.5% | 0.8 to 3 | 1.8 to 2.8 | 2.0 | 2.2 | 2.4 |
| 3015 | 32% | 64.5% | 3.5% | 0.8 to 3 | 1.8 to 2.8 | 2.0 | 2.2 | 2.4 |
| 3016 | 33% | 63.5% | 3.5% | 0.8 to 3 | 1.8 to 2.8 | 2.0 | 2.2 | 2.4 |
| 3017 | 34% | 62.5% | 3.5% | 0.8 to 3 | 1.8 to 2.8 | 2.0 | 2.2 | 2.4 |
| 3018 | 35% | 61.5% | 3.5% | 0.8 to 3 | 1.8 to 2.8 | 2.0 | 2.2 | 2.4 |
| 3019 | 36% | 60.5% | 3.5% | 0.8 to 3 | 1.8 to 2.8 | 2.0 | 2.2 | 2.4 |
| 3020 | 37% | 59.5% | 3.5% | 0.8 to 3 | 1.8 to 2.8 | 2.0 | 2.2 | 2.4 |
| 3021 | 38% | 58.5% | 3.5% | 0.8 to 3 | 1.8 to 2.8 | 2.0 | 2.2 | 2.4 |
| 3022 | 39% | 57.5% | 3.5% | 0.8 to 3 | 1.8 to 2.8 | 2.0 | 2.2 | 2.4 |
| 3023 | 40% | 56.5% | 3.5% | 0.8 to 3 | 1.8 to 2.8 | 2.0 | 2.2 | 2.4 |
| 3024 | 41% | 55.5% | 3.5% | 0.8 to 3 | 1.8 to 2.8 | 2.0 | 2.2 | 2.4 |
| 3025 | 42% | 54.5% | 3.5% | 0.8 to 3 | 1.8 to 2.8 | 2.0 | 2.2 | 2.4 |
| 3026 | 43% | 53.5% | 3.5% | 0.8 to 3 | 1.8 to 2.8 | 2.0 | 2.2 | 2.4 |
| 3027 | 44% | 52.5% | 3.5% | 0.8 to 3 | 1.8 to 2.8 | 2.0 | 2.2 | 2.4 |
| 3028 | 45% | 51.5% | 3.5% | 0.8 to 3 | 1.8 to 2.8 | 2.0 | 2.2 | 2.4 |
| 3029 | 46% | 50.5% | 3.5% | 0.8 to 3 | 1.8 to 2.8 | 2.0 | 2.2 | 2.4 |
| 3030 | 47% | 49.5% | 3.5% | 0.8 to 3 | 1.8 to 2.8 | 2.0 | 2.2 | 2.4 |

TABLE 7-continued

| | Alkyl Ether Sulfate | | | | | | | |
|---|---|---|---|---|---|---|---|---|
| | Alkyl Sulfate Alkyl Chain Length, Wt. % | | Alkyl Chain Length, Wt. % | Average mol. EO (Alternatives for each numbered species) | | | | |
| Species | 8 | 9 | 8 to 10 | Range A | Range B | Species C | Species D | Species E |
| 3031 | 48% | 48.5% | 3.5% | 0.8 to 3 | 1.8 to 2.8 | 2.0 | 2.2 | 2.4 |
| 3032 | 49% | 47.5% | 3.5% | 0.8 to 3 | 1.8 to 2.8 | 2.0 | 2.2 | 2.4 |
| 3033 | 50% | 46.5% | 3.5% | 0.8 to 3 | 1.8 to 2.8 | 2.0 | 2.2 | 2.4 |
| 3034 | 51% | 45.5% | 3.5% | 0.8 to 3 | 1.8 to 2.8 | 2.0 | 2.2 | 2.4 |
| 3035 | 52% | 44.5% | 3.5% | 0.8 to 3 | 1.8 to 2.8 | 2.0 | 2.2 | 2.4 |
| 3036 | 53% | 43.5% | 3.5% | 0.8 to 3 | 1.8 to 2.8 | 2.0 | 2.2 | 2.4 |
| 3037 | 54% | 42.5% | 3.5% | 0.8 to 3 | 1.8 to 2.8 | 2.0 | 2.2 | 2.4 |
| 3038 | 55% | 41.5% | 3.5% | 0.8 to 3 | 1.8 to 2.8 | 2.0 | 2.2 | 2.4 |
| 3039 | 56% | 40.5% | 3.5% | 0.8 to 3 | 1.8 to 2.8 | 2.0 | 2.2 | 2.4 |
| 3040 | 57% | 39.5% | 3.5% | 0.8 to 3 | 1.8 to 2.8 | 2.0 | 2.2 | 2.4 |
| 3041 | 58% | 38.5% | 3.5% | 0.8 to 3 | 1.8 to 2.8 | 2.0 | 2.2 | 2.4 |
| 3042 | 59% | 37.5% | 3.5% | 0.8 to 3 | 1.8 to 2.8 | 2.0 | 2.2 | 2.4 |
| 3043 | 60% | 36.5% | 3.5% | 0.8 to 3 | 1.8 to 2.8 | 2.0 | 2.2 | 2.4 |
| 3044 | 30% | 66% | 4% | 0.8 to 3 | 1.8 to 2.8 | 2.0 | 2.2 | 2.4 |
| 3045 | 31% | 65% | 4% | 0.8 to 3 | 1.8 to 2.8 | 2.0 | 2.2 | 2.4 |
| 3046 | 32% | 64% | 4% | 0.8 to 3 | 1.8 to 2.8 | 2.0 | 2.2 | 2.4 |
| 3047 | 33% | 63% | 4% | 0.8 to 3 | 1.8 to 2.8 | 2.0 | 2.2 | 2.4 |
| 3048 | 34% | 62% | 4% | 0.8 to 3 | 1.8 to 2.8 | 2.0 | 2.2 | 2.4 |
| 3049 | 35% | 61% | 4% | 0.8 to 3 | 1.8 to 2.8 | 2.0 | 2.2 | 2.4 |
| 3050 | 36% | 60% | 4% | 0.8 to 3 | 1.8 to 2.8 | 2.0 | 2.2 | 2.4 |
| 3051 | 37% | 59% | 4% | 0.8 to 3 | 1.8 to 2.8 | 2.0 | 2.2 | 2.4 |
| 3052 | 38% | 58% | 4% | 0.8 to 3 | 1.8 to 2.8 | 2.0 | 2.2 | 2.4 |
| 3053 | 39% | 57% | 4% | 0.8 to 3 | 1.8 to 2.8 | 2.0 | 2.2 | 2.4 |
| 3054 | 40% | 56% | 4% | 0.8 to 3 | 1.8 to 2.8 | 2.0 | 2.2 | 2.4 |
| 3055 | 41% | 55% | 4% | 0.8 to 3 | 1.8 to 2.8 | 2.0 | 2.2 | 2.4 |
| 3056 | 42% | 54% | 4% | 0.8 to 3 | 1.8 to 2.8 | 2.0 | 2.2 | 2.4 |
| 3057 | 43% | 53% | 4% | 0.8 to 3 | 1.8 to 2.8 | 2.0 | 2.2 | 2.4 |
| 3058 | 44% | 52% | 4% | 0.8 to 3 | 1.8 to 2.8 | 2.0 | 2.2 | 2.4 |
| 3059 | 45% | 51% | 4% | 0.8 to 3 | 1.8 to 2.8 | 2.0 | 2.2 | 2.4 |
| 3060 | 46% | 50% | 4% | 0.8 to 3 | 1.8 to 2.8 | 2.0 | 2.2 | 2.4 |
| 3061 | 47% | 49% | 4% | 0.8 to 3 | 1.8 to 2.8 | 2.0 | 2.2 | 2.4 |
| 3062 | 48% | 48% | 4% | 0.8 to 3 | 1.8 to 2.8 | 2.0 | 2.2 | 2.4 |
| 3063 | 49% | 47% | 4% | 0.8 to 3 | 1.8 to 2.8 | 2.0 | 2.2 | 2.4 |
| 3064 | 50% | 46% | 4% | 0.8 to 3 | 1.8 to 2.8 | 2.0 | 2.2 | 2.4 |
| 3065 | 51% | 45% | 4% | 0.8 to 3 | 1.8 to 2.8 | 2.0 | 2.2 | 2.4 |
| 3066 | 52% | 44% | 4% | 0.8 to 3 | 1.8 to 2.8 | 2.0 | 2.2 | 2.4 |
| 3067 | 53% | 43% | 4% | 0.8 to 3 | 1.8 to 2.8 | 2.0 | 2.2 | 2.4 |
| 3068 | 54% | 42% | 4% | 0.8 to 3 | 1.8 to 2.8 | 2.0 | 2.2 | 2.4 |
| 3069 | 55% | 41% | 4% | 0.8 to 3 | 1.8 to 2.8 | 2.0 | 2.2 | 2.4 |
| 3070 | 56% | 40% | 4% | 0.8 to 3 | 1.8 to 2.8 | 2.0 | 2.2 | 2.4 |
| 3071 | 57% | 39% | 4% | 0.8 to 3 | 1.8 to 2.8 | 2.0 | 2.2 | 2.4 |
| 3072 | 58% | 38% | 4% | 0.8 to 3 | 1.8 to 2.8 | 2.0 | 2.2 | 2.4 |
| 3073 | 59% | 37% | 4% | 0.8 to 3 | 1.8 to 2.8 | 2.0 | 2.2 | 2.4 |
| 3074 | 60% | 36% | 4% | 0.8 to 3 | 1.8 to 2.8 | 2.0 | 2.2 | 2.4 |
| 3075 | 30% | 65.5% | 4.5% | 0.8 to 3 | 1.8 to 2.8 | 2.0 | 2.2 | 2.4 |
| 3076 | 31% | 64.5% | 4.5% | 0.8 to 3 | 1.8 to 2.8 | 2.0 | 2.2 | 2.4 |
| 3077 | 32% | 63.5% | 4.5% | 0.8 to 3 | 1.8 to 2.8 | 2.0 | 2.2 | 2.4 |
| 3078 | 33% | 62.5% | 4.5% | 0.8 to 3 | 1.8 to 2.8 | 2.0 | 2.2 | 2.4 |
| 3079 | 34% | 61.5% | 4.5% | 0.8 to 3 | 1.8 to 2.8 | 2.0 | 2.2 | 2.4 |
| 3080 | 35% | 60.5% | 4.5% | 0.8 to 3 | 1.8 to 2.8 | 2.0 | 2.2 | 2.4 |
| 3081 | 36% | 59.5% | 4.5% | 0.8 to 3 | 1.8 to 2.8 | 2.0 | 2.2 | 2.4 |
| 3082 | 37% | 58.5% | 4.5% | 0.8 to 3 | 1.8 to 2.8 | 2.0 | 2.2 | 2.4 |
| 3083 | 38% | 57.5% | 4.5% | 0.8 to 3 | 1.8 to 2.8 | 2.0 | 2.2 | 2.4 |
| 3084 | 39% | 56.5% | 4.5% | 0.8 to 3 | 1.8 to 2.8 | 2.0 | 2.2 | 2.4 |
| 3085 | 40% | 55.5% | 4.5% | 0.8 to 3 | 1.8 to 2.8 | 2.0 | 2.2 | 2.4 |
| 3086 | 41% | 54.5% | 4.5% | 0.8 to 3 | 1.8 to 2.8 | 2.0 | 2.2 | 2.4 |
| 3087 | 42% | 53.5% | 4.5% | 0.8 to 3 | 1.8 to 2.8 | 2.0 | 2.2 | 2.4 |
| 3088 | 43% | 52.5% | 4.5% | 0.8 to 3 | 1.8 to 2.8 | 2.0 | 2.2 | 2.4 |
| 3089 | 44% | 51.5% | 4.5% | 0.8 to 3 | 1.8 to 2.8 | 2.0 | 2.2 | 2.4 |
| 3090 | 45% | 50.5% | 4.5% | 0.8 to 3 | 1.8 to 2.8 | 2.0 | 2.2 | 2.4 |
| 3091 | 46% | 49.5% | 4.5% | 0.8 to 3 | 1.8 to 2.8 | 2.0 | 2.2 | 2.4 |
| 3092 | 47% | 48.5% | 4.5% | 0.8 to 3 | 1.8 to 2.8 | 2.0 | 2.2 | 2.4 |
| 3093 | 48% | 47.5% | 4.5% | 0.8 to 3 | 1.8 to 2.8 | 2.0 | 2.2 | 2.4 |
| 3094 | 49% | 46.5% | 4.5% | 0.8 to 3 | 1.8 to 2.8 | 2.0 | 2.2 | 2.4 |
| 3095 | 50% | 45.5% | 4.5% | 0.8 to 3 | 1.8 to 2.8 | 2.0 | 2.2 | 2.4 |
| 3096 | 51% | 44.5% | 4.5% | 0.8 to 3 | 1.8 to 2.8 | 2.0 | 2.2 | 2.4 |
| 3097 | 52% | 43.5% | 4.5% | 0.8 to 3 | 1.8 to 2.8 | 2.0 | 2.2 | 2.4 |
| 3098 | 53% | 42.5% | 4.5% | 0.8 to 3 | 1.8 to 2.8 | 2.0 | 2.2 | 2.4 |
| 3099 | 54% | 41.5% | 4.5% | 0.8 to 3 | 1.8 to 2.8 | 2.0 | 2.2 | 2.4 |

TABLE 7-continued

| | Alkyl Sulfate Alkyl Chain Length, Wt. % | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| | | | 8 to | | | Species | Species | Species |
| Species | 8 | 9 | 10 | Range A | Range B | C | D | E |
| 3100 | 55% | 40.5% | 4.5% | 0.8 to 3 | 1.8 to 2.8 | 2.0 | 2.2 | 2.4 |
| 3101 | 56% | 39.5% | 4.5% | 0.8 to 3 | 1.8 to 2.8 | 2.0 | 2.2 | 2.4 |
| 3102 | 57% | 38.5% | 4.5% | 0.8 to 3 | 1.8 to 2.8 | 2.0 | 2.2 | 2.4 |
| 3103 | 58% | 37.5% | 4.5% | 0.8 to 3 | 1.8 to 2.8 | 2.0 | 2.2 | 2.4 |
| 3104 | 59% | 36.5% | 4.5% | 0.8 to 3 | 1.8 to 2.8 | 2.0 | 2.2 | 2.4 |
| 3105 | 60% | 35.5% | 4.5% | 0.8 to 3 | 1.8 to 2.8 | 2.0 | 2.2 | 2.4 |
| 3106 | 30% | 65% | 5% | 0.8 to 3 | 1.8 to 2.8 | 2.0 | 2.2 | 2.4 |
| 3107 | 31% | 64% | 5% | 0.8 to 3 | 1.8 to 2.8 | 2.0 | 2.2 | 2.4 |
| 3108 | 32% | 63% | 5% | 0.8 to 3 | 1.8 to 2.8 | 2.0 | 2.2 | 2.4 |
| 3109 | 33% | 62% | 5% | 0.8 to 3 | 1.8 to 2.8 | 2.0 | 2.2 | 2.4 |
| 3110 | 34% | 61% | 5% | 0.8 to 3 | 1.8 to 2.8 | 2.0 | 2.2 | 2.4 |
| 3111 | 35% | 60% | 5% | 0.8 to 3 | 1.8 to 2.8 | 2.0 | 2.2 | 2.4 |
| 3112 | 36% | 59% | 5% | 0.8 to 3 | 1.8 to 2.8 | 2.0 | 2.2 | 2.4 |
| 3113 | 37% | 58% | 5% | 0.8 to 3 | 1.8 to 2.8 | 2.0 | 2.2 | 2.4 |
| 3114 | 38% | 57% | 5% | 0.8 to 3 | 1.8 to 2.8 | 2.0 | 2.2 | 2.4 |
| 3115 | 39% | 56% | 5% | 0.8 to 3 | 1.8 to 2.8 | 2.0 | 2.2 | 2.4 |
| 3116 | 40% | 55% | 5% | 0.8 to 3 | 1.8 to 2.8 | 2.0 | 2.2 | 2.4 |
| 3117 | 41% | 54% | 5% | 0.8 to 3 | 1.8 to 2.8 | 2.0 | 2.2 | 2.4 |
| 3118 | 42% | 53% | 5% | 0.8 to 3 | 1.8 to 2.8 | 2.0 | 2.2 | 2.4 |
| 3119 | 43% | 52% | 5% | 0.8 to 3 | 1.8 to 2.8 | 2.0 | 2.2 | 2.4 |
| 3120 | 44% | 51% | 5% | 0.8 to 3 | 1.8 to 2.8 | 2.0 | 2.2 | 2.4 |
| 3121 | 45% | 50% | 5% | 0.8 to 3 | 1.8 to 2.8 | 2.0 | 2.2 | 2.4 |
| 3122 | 46% | 49% | 5% | 0.8 to 3 | 1.8 to 2.8 | 2.0 | 2.2 | 2.4 |
| 3123 | 47% | 48% | 5% | 0.8 to 3 | 1.8 to 2.8 | 2.0 | 2.2 | 2.4 |
| 3124 | 48% | 47% | 5% | 0.8 to 3 | 1.8 to 2.8 | 2.0 | 2.2 | 2.4 |
| 3125 | 49% | 46% | 5% | 0.8 to 3 | 1.8 to 2.8 | 2.0 | 2.2 | 2.4 |
| 3126 | 50% | 45% | 5% | 0.8 to 3 | 1.8 to 2.8 | 2.0 | 2.2 | 2.4 |
| 3127 | 51% | 44% | 5% | 0.8 to 3 | 1.8 to 2.8 | 2.0 | 2.2 | 2.4 |
| 3128 | 52% | 43% | 5% | 0.8 to 3 | 1.8 to 2.8 | 2.0 | 2.2 | 2.4 |
| 3129 | 53% | 42% | 5% | 0.8 to 3 | 1.8 to 2.8 | 2.0 | 2.2 | 2.4 |
| 3130 | 54% | 41% | 5% | 0.8 to 3 | 1.8 to 2.8 | 2.0 | 2.2 | 2.4 |
| 3131 | 55% | 40% | 5% | 0.8 to 3 | 1.8 to 2.8 | 2.0 | 2.2 | 2.4 |
| 3132 | 56% | 39% | 5% | 0.8 to 3 | 1.8 to 2.8 | 2.0 | 2.2 | 2.4 |
| 3133 | 57% | 38% | 5% | 0.8 to 3 | 1.8 to 2.8 | 2.0 | 2.2 | 2.4 |
| 3134 | 58% | 37% | 5% | 0.8 to 3 | 1.8 to 2.8 | 2.0 | 2.2 | 2.4 |
| 3135 | 59% | 36% | 5% | 0.8 to 3 | 1.8 to 2.8 | 2.0 | 2.2 | 2.4 |
| 3136 | 60% | 35% | 5% | 0.8 to 3 | 1.8 to 2.8 | 2.0 | 2.2 | 2.4 |
| 3137 | 30% | 64.5% | 5.5% | 0.8 to 3 | 1.8 to 2.8 | 2.0 | 2.2 | 2.4 |
| 3138 | 31% | 63.5% | 5.5% | 0.8 to 3 | 1.8 to 2.8 | 2.0 | 2.2 | 2.4 |
| 3139 | 32% | 62.5% | 5.5% | 0.8 to 3 | 1.8 to 2.8 | 2.0 | 2.2 | 2.4 |
| 3140 | 33% | 61.5% | 5.5% | 0.8 to 3 | 1.8 to 2.8 | 2.0 | 2.2 | 2.4 |
| 3141 | 34% | 60.5% | 5.5% | 0.8 to 3 | 1.8 to 2.8 | 2.0 | 2.2 | 2.4 |
| 3142 | 35% | 59.5% | 5.5% | 0.8 to 3 | 1.8 to 2.8 | 2.0 | 2.2 | 2.4 |
| 3143 | 36% | 58.5% | 5.5% | 0.8 to 3 | 1.8 to 2.8 | 2.0 | 2.2 | 2.4 |
| 3144 | 37% | 57.5% | 5.5% | 0.8 to 3 | 1.8 to 2.8 | 2.0 | 2.2 | 2.4 |
| 3145 | 38% | 56.5% | 5.5% | 0.8 to 3 | 1.8 to 2.8 | 2.0 | 2.2 | 2.4 |
| 3146 | 39% | 55.5% | 5.5% | 0.8 to 3 | 1.8 to 2.8 | 2.0 | 2.2 | 2.4 |
| 3147 | 40% | 54.5% | 5.5% | 0.8 to 3 | 1.8 to 2.8 | 2.0 | 2.2 | 2.4 |
| 3148 | 41% | 53.5% | 5.5% | 0.8 to 3 | 1.8 to 2.8 | 2.0 | 2.2 | 2.4 |
| 3149 | 42% | 52.5% | 5.5% | 0.8 to 3 | 1.8 to 2.8 | 2.0 | 2.2 | 2.4 |
| 3150 | 43% | 51.5% | 5.5% | 0.8 to 3 | 1.8 to 2.8 | 2.0 | 2.2 | 2.4 |
| 3151 | 44% | 50.5% | 5.5% | 0.8 to 3 | 1.8 to 2.8 | 2.0 | 2.2 | 2.4 |
| 3152 | 45% | 49.5% | 5.5% | 0.8 to 3 | 1.8 to 2.8 | 2.0 | 2.2 | 2.4 |
| 3153 | 46% | 48.5% | 5.5% | 0.8 to 3 | 1.8 to 2.8 | 2.0 | 2.2 | 2.4 |
| 3154 | 47% | 47.5% | 5.5% | 0.8 to 3 | 1.8 to 2.8 | 2.0 | 2.2 | 2.4 |
| 3155 | 48% | 46.5% | 5.5% | 0.8 to 3 | 1.8 to 2.8 | 2.0 | 2.2 | 2.4 |
| 3156 | 49% | 45.5% | 5.5% | 0.8 to 3 | 1.8 to 2.8 | 2.0 | 2.2 | 2.4 |
| 3157 | 50% | 44.5% | 5.5% | 0.8 to 3 | 1.8 to 2.8 | 2.0 | 2.2 | 2.4 |
| 3158 | 51% | 43.5% | 5.5% | 0.8 to 3 | 1.8 to 2.8 | 2.0 | 2.2 | 2.4 |
| 3159 | 52% | 42.5% | 5.5% | 0.8 to 3 | 1.8 to 2.8 | 2.0 | 2.2 | 2.4 |
| 3160 | 53% | 41.5% | 5.5% | 0.8 to 3 | 1.8 to 2.8 | 2.0 | 2.2 | 2.4 |
| 3161 | 54% | 40.5% | 5.5% | 0.8 to 3 | 1.8 to 2.8 | 2.0 | 2.2 | 2.4 |
| 3162 | 55% | 39.5% | 5.5% | 0.8 to 3 | 1.8 to 2.8 | 2.0 | 2.2 | 2.4 |
| 3163 | 56% | 38.5% | 5.5% | 0.8 to 3 | 1.8 to 2.8 | 2.0 | 2.2 | 2.4 |
| 3164 | 57% | 37.5% | 5.5% | 0.8 to 3 | 1.8 to 2.8 | 2.0 | 2.2 | 2.4 |
| 3165 | 58% | 36.5% | 5.5% | 0.8 to 3 | 1.8 to 2.8 | 2.0 | 2.2 | 2.4 |
| 3166 | 59% | 35.5% | 5.5% | 0.8 to 3 | 1.8 to 2.8 | 2.0 | 2.2 | 2.4 |
| 3167 | 60% | 34.5% | 5.5% | 0.8 to 3 | 1.8 to 2.8 | 2.0 | 2.2 | 2.4 |
| 3168 | 30% | 64% | 6% | 0.8 to 3 | 1.8 to 2.8 | 2.0 | 2.2 | 2.4 |

TABLE 7-continued

| | Alkyl Sulfate Alkyl Chain Length, Wt. % | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| | 8 | 9 | 8 to 10 | Range A | Range B | Species C | Species D | Species E |
| Species | | | | | | | | |
| 3169 | 31% | 63% | 6% | 0.8 to 3 | 1.8 to 2.8 | 2.0 | 2.2 | 2.4 |
| 3170 | 32% | 62% | 6% | 0.8 to 3 | 1.8 to 2.8 | 2.0 | 2.2 | 2.4 |
| 3171 | 33% | 61% | 6% | 0.8 to 3 | 1.8 to 2.8 | 2.0 | 2.2 | 2.4 |
| 3172 | 34% | 60% | 6% | 0.8 to 3 | 1.8 to 2.8 | 2.0 | 2.2 | 2.4 |
| 3173 | 35% | 59% | 6% | 0.8 to 3 | 1.8 to 2.8 | 2.0 | 2.2 | 2.4 |
| 3174 | 36% | 58% | 6% | 0.8 to 3 | 1.8 to 2.8 | 2.0 | 2.2 | 2.4 |
| 3175 | 37% | 57% | 6% | 0.8 to 3 | 1.8 to 2.8 | 2.0 | 2.2 | 2.4 |
| 3176 | 38% | 56% | 6% | 0.8 to 3 | 1.8 to 2.8 | 2.0 | 2.2 | 2.4 |
| 3177 | 39% | 55% | 6% | 0.8 to 3 | 1.8 to 2.8 | 2.0 | 2.2 | 2.4 |
| 3178 | 40% | 54% | 6% | 0.8 to 3 | 1.8 to 2.8 | 2.0 | 2.2 | 2.4 |
| 3179 | 41% | 53% | 6% | 0.8 to 3 | 1.8 to 2.8 | 2.0 | 2.2 | 2.4 |
| 3180 | 42% | 52% | 6% | 0.8 to 3 | 1.8 to 2.8 | 2.0 | 2.2 | 2.4 |
| 3181 | 43% | 51% | 6% | 0.8 to 3 | 1.8 to 2.8 | 2.0 | 2.2 | 2.4 |
| 3182 | 44% | 50% | 6% | 0.8 to 3 | 1.8 to 2.8 | 2.0 | 2.2 | 2.4 |
| 3183 | 45% | 49% | 6% | 0.8 to 3 | 1.8 to 2.8 | 2.0 | 2.2 | 2.4 |
| 3184 | 46% | 48% | 6% | 0.8 to 3 | 1.8 to 2.8 | 2.0 | 2.2 | 2.4 |
| 3185 | 47% | 47% | 6% | 0.8 to 3 | 1.8 to 2.8 | 2.0 | 2.2 | 2.4 |
| 3186 | 48% | 46% | 6% | 0.8 to 3 | 1.8 to 2.8 | 2.0 | 2.2 | 2.4 |
| 3187 | 49% | 45% | 6% | 0.8 to 3 | 1.8 to 2.8 | 2.0 | 2.2 | 2.4 |
| 3188 | 50% | 44% | 6% | 0.8 to 3 | 1.8 to 2.8 | 2.0 | 2.2 | 2.4 |
| 3189 | 51% | 43% | 6% | 0.8 to 3 | 1.8 to 2.8 | 2.0 | 2.2 | 2.4 |
| 3190 | 52% | 42% | 6% | 0.8 to 3 | 1.8 to 2.8 | 2.0 | 2.2 | 2.4 |
| 3191 | 53% | 41% | 6% | 0.8 to 3 | 1.8 to 2.8 | 2.0 | 2.2 | 2.4 |
| 3192 | 54% | 40% | 6% | 0.8 to 3 | 1.8 to 2.8 | 2.0 | 2.2 | 2.4 |
| 3193 | 55% | 39% | 6% | 0.8 to 3 | 1.8 to 2.8 | 2.0 | 2.2 | 2.4 |
| 3194 | 56% | 38% | 6% | 0.8 to 3 | 1.8 to 2.8 | 2.0 | 2.2 | 2.4 |
| 3195 | 57% | 37% | 6% | 0.8 to 3 | 1.8 to 2.8 | 2.0 | 2.2 | 2.4 |
| 3196 | 58% | 36% | 6% | 0.8 to 3 | 1.8 to 2.8 | 2.0 | 2.2 | 2.4 |
| 3197 | 59% | 35% | 6% | 0.8 to 3 | 1.8 to 2.8 | 2.0 | 2.2 | 2.4 |
| 3198 | 60% | 34% | 6% | 0.8 to 3 | 1.8 to 2.8 | 2.0 | 2.2 | 2.4 |
| 3199 | 30% | 63.5% | 6.5% | 0.8 to 3 | 1.8 to 2.8 | 2.0 | 2.2 | 2.4 |
| 3200 | 31% | 62.5% | 6.5% | 0.8 to 3 | 1.8 to 2.8 | 2.0 | 2.2 | 2.4 |
| 3201 | 32% | 61.5% | 6.5% | 0.8 to 3 | 1.8 to 2.8 | 2.0 | 2.2 | 2.4 |
| 3202 | 33% | 60.5% | 6.5% | 0.8 to 3 | 1.8 to 2.8 | 2.0 | 2.2 | 2.4 |
| 3203 | 34% | 59.5% | 6.5% | 0.8 to 3 | 1.8 to 2.8 | 2.0 | 2.2 | 2.4 |
| 3204 | 35% | 58.5% | 6.5% | 0.8 to 3 | 1.8 to 2.8 | 2.0 | 2.2 | 2.4 |
| 3205 | 36% | 57.5% | 6.5% | 0.8 to 3 | 1.8 to 2.8 | 2.0 | 2.2 | 2.4 |
| 3206 | 37% | 56.5% | 6.5% | 0.8 to 3 | 1.8 to 2.8 | 2.0 | 2.2 | 2.4 |
| 3207 | 38% | 55.5% | 6.5% | 0.8 to 3 | 1.8 to 2.8 | 2.0 | 2.2 | 2.4 |
| 3208 | 39% | 54.5% | 6.5% | 0.8 to 3 | 1.8 to 2.8 | 2.0 | 2.2 | 2.4 |
| 3209 | 40% | 53.5% | 6.5% | 0.8 to 3 | 1.8 to 2.8 | 2.0 | 2.2 | 2.4 |
| 3210 | 41% | 52.5% | 6.5% | 0.8 to 3 | 1.8 to 2.8 | 2.0 | 2.2 | 2.4 |
| 3211 | 42% | 51.5% | 6.5% | 0.8 to 3 | 1.8 to 2.8 | 2.0 | 2.2 | 2.4 |
| 3212 | 43% | 50.5% | 6.5% | 0.8 to 3 | 1.8 to 2.8 | 2.0 | 2.2 | 2.4 |
| 3213 | 44% | 49.5% | 6.5% | 0.8 to 3 | 1.8 to 2.8 | 2.0 | 2.2 | 2.4 |
| 3214 | 45% | 48.5% | 6.5% | 0.8 to 3 | 1.8 to 2.8 | 2.0 | 2.2 | 2.4 |
| 3215 | 46% | 47.5% | 6.5% | 0.8 to 3 | 1.8 to 2.8 | 2.0 | 2.2 | 2.4 |
| 3216 | 47% | 46.5% | 6.5% | 0.8 to 3 | 1.8 to 2.8 | 2.0 | 2.2 | 2.4 |
| 3217 | 48% | 45.5% | 6.5% | 0.8 to 3 | 1.8 to 2.8 | 2.0 | 2.2 | 2.4 |
| 3218 | 49% | 44.5% | 6.5% | 0.8 to 3 | 1.8 to 2.8 | 2.0 | 2.2 | 2.4 |
| 3219 | 50% | 43.5% | 6.5% | 0.8 to 3 | 1.8 to 2.8 | 2.0 | 2.2 | 2.4 |
| 3220 | 51% | 42.5% | 6.5% | 0.8 to 3 | 1.8 to 2.8 | 2.0 | 2.2 | 2.4 |
| 3221 | 52% | 41.5% | 6.5% | 0.8 to 3 | 1.8 to 2.8 | 2.0 | 2.2 | 2.4 |
| 3222 | 53% | 40.5% | 6.5% | 0.8 to 3 | 1.8 to 2.8 | 2.0 | 2.2 | 2.4 |
| 3223 | 54% | 39.5% | 6.5% | 0.8 to 3 | 1.8 to 2.8 | 2.0 | 2.2 | 2.4 |
| 3224 | 55% | 38.5% | 6.5% | 0.8 to 3 | 1.8 to 2.8 | 2.0 | 2.2 | 2.4 |
| 3225 | 56% | 37.5% | 6.5% | 0.8 to 3 | 1.8 to 2.8 | 2.0 | 2.2 | 2.4 |
| 3226 | 57% | 36.5% | 6.5% | 0.8 to 3 | 1.8 to 2.8 | 2.0 | 2.2 | 2.4 |
| 3227 | 58% | 35.5% | 6.5% | 0.8 to 3 | 1.8 to 2.8 | 2.0 | 2.2 | 2.4 |
| 3228 | 59% | 34.5% | 6.5% | 0.8 to 3 | 1.8 to 2.8 | 2.0 | 2.2 | 2.4 |
| 3229 | 60% | 33.5% | 6.5% | 0.8 to 3 | 1.8 to 2.8 | 2.0 | 2.2 | 2.4 |
| 3230 | 30% | 63% | 7% | 0.8 to 3 | 1.8 to 2.8 | 2.0 | 2.2 | 2.4 |
| 3231 | 31% | 62% | 7% | 0.8 to 3 | 1.8 to 2.8 | 2.0 | 2.2 | 2.4 |
| 3232 | 32% | 61% | 7% | 0.8 to 3 | 1.8 to 2.8 | 2.0 | 2.2 | 2.4 |
| 3233 | 33% | 60% | 7% | 0.8 to 3 | 1.8 to 2.8 | 2.0 | 2.2 | 2.4 |
| 3234 | 34% | 59% | 7% | 0.8 to 3 | 1.8 to 2.8 | 2.0 | 2.2 | 2.4 |
| 3235 | 35% | 58% | 7% | 0.8 to 3 | 1.8 to 2.8 | 2.0 | 2.2 | 2.4 |
| 3236 | 36% | 57% | 7% | 0.8 to 3 | 1.8 to 2.8 | 2.0 | 2.2 | 2.4 |
| 3237 | 37% | 56% | 7% | 0.8 to 3 | 1.8 to 2.8 | 2.0 | 2.2 | 2.4 |

TABLE 7-continued

| | | Alkyl Ether Sulfate | | | | | |
|---|---|---|---|---|---|---|---|
| | Alkyl Sulfate Alkyl Chain Length, Wt. % | Alkyl Chain Length, Wt. % 8 to | Average mol. EO (Alternatives for each numbered species) | | | | |
| Species | 8 | 9 | 10 | Range A | Range B | Species C | Species D | Species E |
| 3238 | 38% | 55% | 7% | 0.8 to 3 | 1.8 to 2.8 | 2.0 | 2.2 | 2.4 |
| 3239 | 39% | 54% | 7% | 0.8 to 3 | 1.8 to 2.8 | 2.0 | 2.2 | 2.4 |
| 3240 | 40% | 53% | 7% | 0.8 to 3 | 1.8 to 2.8 | 2.0 | 2.2 | 2.4 |
| 3241 | 41% | 52% | 7% | 0.8 to 3 | 1.8 to 2.8 | 2.0 | 2.2 | 2.4 |
| 3242 | 42% | 51% | 7% | 0.8 to 3 | 1.8 to 2.8 | 2.0 | 2.2 | 2.4 |
| 3243 | 43% | 50% | 7% | 0.8 to 3 | 1.8 to 2.8 | 2.0 | 2.2 | 2.4 |
| 3244 | 44% | 49% | 7% | 0.8 to 3 | 1.8 to 2.8 | 2.0 | 2.2 | 2.4 |
| 3245 | 45% | 48% | 7% | 0.8 to 3 | 1.8 to 2.8 | 2.0 | 2.2 | 2.4 |
| 3246 | 46% | 47% | 7% | 0.8 to 3 | 1.8 to 2.8 | 2.0 | 2.2 | 2.4 |
| 3247 | 47% | 46% | 7% | 0.8 to 3 | 1.8 to 2.8 | 2.0 | 2.2 | 2.4 |
| 3248 | 48% | 45% | 7% | 0.8 to 3 | 1.8 to 2.8 | 2.0 | 2.2 | 2.4 |
| 3249 | 49% | 44% | 7% | 0.8 to 3 | 1.8 to 2.8 | 2.0 | 2.2 | 2.4 |
| 3250 | 50% | 43% | 7% | 0.8 to 3 | 1.8 to 2.8 | 2.0 | 2.2 | 2.4 |
| 3251 | 51% | 42% | 7% | 0.8 to 3 | 1.8 to 2.8 | 2.0 | 2.2 | 2.4 |
| 3252 | 52% | 41% | 7% | 0.8 to 3 | 1.8 to 2.8 | 2.0 | 2.2 | 2.4 |
| 3253 | 53% | 40% | 7% | 0.8 to 3 | 1.8 to 2.8 | 2.0 | 2.2 | 2.4 |
| 3254 | 54% | 39% | 7% | 0.8 to 3 | 1.8 to 2.8 | 2.0 | 2.2 | 2.4 |
| 3255 | 55% | 38% | 7% | 0.8 to 3 | 1.8 to 2.8 | 2.0 | 2.2 | 2.4 |
| 3256 | 56% | 37% | 7% | 0.8 to 3 | 1.8 to 2.8 | 2.0 | 2.2 | 2.4 |
| 3257 | 57% | 36% | 7% | 0.8 to 3 | 1.8 to 2.8 | 2.0 | 2.2 | 2.4 |
| 3258 | 58% | 35% | 7% | 0.8 to 3 | 1.8 to 2.8 | 2.0 | 2.2 | 2.4 |
| 3259 | 59% | 34% | 7% | 0.8 to 3 | 1.8 to 2.8 | 2.0 | 2.2 | 2.4 |
| 3260 | 60% | 33% | 7% | 0.8 to 3 | 1.8 to 2.8 | 2.0 | 2.2 | 2.4 |

TABLE 8

| | | Alkyl Ether Sulfate | | | | | |
|---|---|---|---|---|---|---|---|
| | Alkyl Sulfate Alkyl Chain Length, Wt. Percentage | Alkyl Chain Length, Wt. % | Average mol. EO (Alternatives for each numbered species) | | | | |
| Species | 8 to 10 | 9 to 11 | 8 to 10 | Range A | Range B | Species C | Species D | Species E |
| 3261 | 30% | 70% | 0% | 0.8 to 3 | 1.8 to 2.8 | 2.0 | 2.2 | 2.4 |
| 3262 | 31% | 69% | 0% | 0.8 to 3 | 1.8 to 2.8 | 2.0 | 2.2 | 2.4 |
| 3263 | 32% | 68% | 0% | 0.8 to 3 | 1.8 to 2.8 | 2.0 | 2.2 | 2.4 |
| 3264 | 33% | 67% | 0% | 0.8 to 3 | 1.8 to 2.8 | 2.0 | 2.2 | 2.4 |
| 3265 | 34% | 66% | 0% | 0.8 to 3 | 1.8 to 2.8 | 2.0 | 2.2 | 2.4 |
| 3266 | 35% | 65% | 0% | 0.8 to 3 | 1.8 to 2.8 | 2.0 | 2.2 | 2.4 |
| 3267 | 36% | 64% | 0% | 0.8 to 3 | 1.8 to 2.8 | 2.0 | 2.2 | 2.4 |
| 3268 | 37% | 63% | 0% | 0.8 to 3 | 1.8 to 2.8 | 2.0 | 2.2 | 2.4 |
| 3269 | 38% | 62% | 0% | 0.8 to 3 | 1.8 to 2.8 | 2.0 | 2.2 | 2.4 |
| 3270 | 39% | 61% | 0% | 0.8 to 3 | 1.8 to 2.8 | 2.0 | 2.2 | 2.4 |
| 3271 | 40% | 60% | 0% | 0.8 to 3 | 1.8 to 2.8 | 2.0 | 2.2 | 2.4 |
| 3272 | 41% | 59% | 0% | 0.8 to 3 | 1.8 to 2.8 | 2.0 | 2.2 | 2.4 |
| 3273 | 42% | 58% | 0% | 0.8 to 3 | 1.8 to 2.8 | 2.0 | 2.2 | 2.4 |
| 3274 | 43% | 57% | 0% | 0.8 to 3 | 1.8 to 2.8 | 2.0 | 2.2 | 2.4 |
| 3275 | 44% | 56% | 0% | 0.8 to 3 | 1.8 to 2.8 | 2.0 | 2.2 | 2.4 |
| 3276 | 45% | 55% | 0% | 0.8 to 3 | 1.8 to 2.8 | 2.0 | 2.2 | 2.4 |
| 3277 | 46% | 54% | 0% | 0.8 to 3 | 1.8 to 2.8 | 2.0 | 2.2 | 2.4 |
| 3278 | 47% | 53% | 0% | 0.8 to 3 | 1.8 to 2.8 | 2.0 | 2.2 | 2.4 |
| 3279 | 48% | 52% | 0% | 0.8 to 3 | 1.8 to 2.8 | 2.0 | 2.2 | 2.4 |
| 3280 | 49% | 51% | 0% | 0.8 to 3 | 1.8 to 2.8 | 2.0 | 2.2 | 2.4 |
| 3281 | 50% | 50% | 0% | 0.8 to 3 | 1.8 to 2.8 | 2.0 | 2.2 | 2.4 |
| 3282 | 51% | 49% | 0% | 0.8 to 3 | 1.8 to 2.8 | 2.0 | 2.2 | 2.4 |
| 3283 | 52% | 48% | 0% | 0.8 to 3 | 1.8 to 2.8 | 2.0 | 2.2 | 2.4 |
| 3284 | 53% | 47% | 0% | 0.8 to 3 | 1.8 to 2.8 | 2.0 | 2.2 | 2.4 |
| 3285 | 54% | 46% | 0% | 0.8 to 3 | 1.8 to 2.8 | 2.0 | 2.2 | 2.4 |
| 3286 | 55% | 45% | 0% | 0.8 to 3 | 1.8 to 2.8 | 2.0 | 2.2 | 2.4 |
| 3287 | 56% | 44% | 0% | 0.8 to 3 | 1.8 to 2.8 | 2.0 | 2.2 | 2.4 |
| 3288 | 57% | 43% | 0% | 0.8 to 3 | 1.8 to 2.8 | 2.0 | 2.2 | 2.4 |
| 3289 | 58% | 42% | 0% | 0.8 to 3 | 1.8 to 2.8 | 2.0 | 2.2 | 2.4 |
| 3290 | 59% | 41% | 0% | 0.8 to 3 | 1.8 to 2.8 | 2.0 | 2.2 | 2.4 |

TABLE 8-continued

|  | Alkyl Sulfate Alkyl Chain Length, Wt. Percentage | | Alkyl Chain Length, Wt. % | Alkyl Ether Sulfate | | | | |
|---|---|---|---|---|---|---|---|---|
|  | | | | Average mol. EO (Alternatives for each numbered species) | | | | |
| Species | 8 to 10 | 9 to 11 | 8 to 10 | Range A | Range B | Species C | Species D | Species E |
| 3291 | 60% | 40% | 0% | 0.8 to 3 | 1.8 to 2.8 | 2.0 | 2.2 | 2.4 |
| 3292 | 30% | 69.5% | 0.5% | 0.8 to 3 | 1.8 to 2.8 | 2.0 | 2.2 | 2.4 |
| 3293 | 31% | 68.5% | 0.5% | 0.8 to 3 | 1.8 to 2.8 | 2.0 | 2.2 | 2.4 |
| 3294 | 32% | 67.5% | 0.5% | 0.8 to 3 | 1.8 to 2.8 | 2.0 | 2.2 | 2.4 |
| 3295 | 33% | 66.5% | 0.5% | 0.8 to 3 | 1.8 to 2.8 | 2.0 | 2.2 | 2.4 |
| 3296 | 34% | 65.5% | 0.5% | 0.8 to 3 | 1.8 to 2.8 | 2.0 | 2.2 | 2.4 |
| 3297 | 35% | 64.5% | 0.5% | 0.8 to 3 | 1.8 to 2.8 | 2.0 | 2.2 | 2.4 |
| 3298 | 36% | 63.5% | 0.5% | 0.8 to 3 | 1.8 to 2.8 | 2.0 | 2.2 | 2.4 |
| 3299 | 37% | 62.5% | 0.5% | 0.8 to 3 | 1.8 to 2.8 | 2.0 | 2.2 | 2.4 |
| 3300 | 38% | 61.5% | 0.5% | 0.8 to 3 | 1.8 to 2.8 | 2.0 | 2.2 | 2.4 |
| 3301 | 39% | 60.5% | 0.5% | 0.8 to 3 | 1.8 to 2.8 | 2.0 | 2.2 | 2.4 |
| 3302 | 40% | 59.5% | 0.5% | 0.8 to 3 | 1.8 to 2.8 | 2.0 | 2.2 | 2.4 |
| 3303 | 41% | 58.5% | 0.5% | 0.8 to 3 | 1.8 to 2.8 | 2.0 | 2.2 | 2.4 |
| 3304 | 42% | 57.5% | 0.5% | 0.8 to 3 | 1.8 to 2.8 | 2.0 | 2.2 | 2.4 |
| 3305 | 43% | 56.5% | 0.5% | 0.8 to 3 | 1.8 to 2.8 | 2.0 | 2.2 | 2.4 |
| 3306 | 44% | 55.5% | 0.5% | 0.8 to 3 | 1.8 to 2.8 | 2.0 | 2.2 | 2.4 |
| 3307 | 45% | 54.5% | 0.5% | 0.8 to 3 | 1.8 to 2.8 | 2.0 | 2.2 | 2.4 |
| 3308 | 46% | 53.5% | 0.5% | 0.8 to 3 | 1.8 to 2.8 | 2.0 | 2.2 | 2.4 |
| 3309 | 47% | 52.5% | 0.5% | 0.8 to 3 | 1.8 to 2.8 | 2.0 | 2.2 | 2.4 |
| 3310 | 48% | 51.5% | 0.5% | 0.8 to 3 | 1.8 to 2.8 | 2.0 | 2.2 | 2.4 |
| 3311 | 49% | 50.5% | 0.5% | 0.8 to 3 | 1.8 to 2.8 | 2.0 | 2.2 | 2.4 |
| 3312 | 50% | 49.5% | 0.5% | 0.8 to 3 | 1.8 to 2.8 | 2.0 | 2.2 | 2.4 |
| 3313 | 51% | 48.5% | 0.5% | 0.8 to 3 | 1.8 to 2.8 | 2.0 | 2.2 | 2.4 |
| 3314 | 52% | 47.5% | 0.5% | 0.8 to 3 | 1.8 to 2.8 | 2.0 | 2.2 | 2.4 |
| 3315 | 53% | 46.5% | 0.5% | 0.8 to 3 | 1.8 to 2.8 | 2.0 | 2.2 | 2.4 |
| 3316 | 54% | 45.5% | 0.5% | 0.8 to 3 | 1.8 to 2.8 | 2.0 | 2.2 | 2.4 |
| 3317 | 55% | 44.5% | 0.5% | 0.8 to 3 | 1.8 to 2.8 | 2.0 | 2.2 | 2.4 |
| 3318 | 56% | 43.5% | 0.5% | 0.8 to 3 | 1.8 to 2.8 | 2.0 | 2.2 | 2.4 |
| 3319 | 57% | 42.5% | 0.5% | 0.8 to 3 | 1.8 to 2.8 | 2.0 | 2.2 | 2.4 |
| 3320 | 58% | 41.5% | 0.5% | 0.8 to 3 | 1.8 to 2.8 | 2.0 | 2.2 | 2.4 |
| 3321 | 59% | 40.5% | 0.5% | 0.8 to 3 | 1.8 to 2.8 | 2.0 | 2.2 | 2.4 |
| 3322 | 60% | 39.5% | 0.5% | 0.8 to 3 | 1.8 to 2.8 | 2.0 | 2.2 | 2.4 |
| 3323 | 30% | 69% | 1% | 0.8 to 3 | 1.8 to 2.8 | 2.0 | 2.2 | 2.4 |
| 3324 | 31% | 68% | 1% | 0.8 to 3 | 1.8 to 2.8 | 2.0 | 2.2 | 2.4 |
| 3325 | 32% | 67% | 1% | 0.8 to 3 | 1.8 to 2.8 | 2.0 | 2.2 | 2.4 |
| 3326 | 33% | 66% | 1% | 0.8 to 3 | 1.8 to 2.8 | 2.0 | 2.2 | 2.4 |
| 3327 | 34% | 65% | 1% | 0.8 to 3 | 1.8 to 2.8 | 2.0 | 2.2 | 2.4 |
| 3328 | 35% | 64% | 1% | 0.8 to 3 | 1.8 to 2.8 | 2.0 | 2.2 | 2.4 |
| 3329 | 36% | 63% | 1% | 0.8 to 3 | 1.8 to 2.8 | 2.0 | 2.2 | 2.4 |
| 3330 | 37% | 62% | 1% | 0.8 to 3 | 1.8 to 2.8 | 2.0 | 2.2 | 2.4 |
| 3331 | 38% | 61% | 1% | 0.8 to 3 | 1.8 to 2.8 | 2.0 | 2.2 | 2.4 |
| 3332 | 39% | 60% | 1% | 0.8 to 3 | 1.8 to 2.8 | 2.0 | 2.2 | 2.4 |
| 3333 | 40% | 59% | 1% | 0.8 to 3 | 1.8 to 2.8 | 2.0 | 2.2 | 2.4 |
| 3334 | 41% | 58% | 1% | 0.8 to 3 | 1.8 to 2.8 | 2.0 | 2.2 | 2.4 |
| 3335 | 42% | 57% | 1% | 0.8 to 3 | 1.8 to 2.8 | 2.0 | 2.2 | 2.4 |
| 3336 | 43% | 56% | 1% | 0.8 to 3 | 1.8 to 2.8 | 2.0 | 2.2 | 2.4 |
| 3337 | 44% | 55% | 1% | 0.8 to 3 | 1.8 to 2.8 | 2.0 | 2.2 | 2.4 |
| 3338 | 45% | 54% | 1% | 0.8 to 3 | 1.8 to 2.8 | 2.0 | 2.2 | 2.4 |
| 3339 | 46% | 53% | 1% | 0.8 to 3 | 1.8 to 2.8 | 2.0 | 2.2 | 2.4 |
| 3340 | 47% | 52% | 1% | 0.8 to 3 | 1.8 to 2.8 | 2.0 | 2.2 | 2.4 |
| 3341 | 48% | 51% | 1% | 0.8 to 3 | 1.8 to 2.8 | 2.0 | 2.2 | 2.4 |
| 3342 | 49% | 50% | 1% | 0.8 to 3 | 1.8 to 2.8 | 2.0 | 2.2 | 2.4 |
| 3343 | 50% | 49% | 1% | 0.8 to 3 | 1.8 to 2.8 | 2.0 | 2.2 | 2.4 |
| 3344 | 51% | 48% | 1% | 0.8 to 3 | 1.8 to 2.8 | 2.0 | 2.2 | 2.4 |
| 3345 | 52% | 47% | 1% | 0.8 to 3 | 1.8 to 2.8 | 2.0 | 2.2 | 2.4 |
| 3346 | 53% | 46% | 1% | 0.8 to 3 | 1.8 to 2.8 | 2.0 | 2.2 | 2.4 |
| 3347 | 54% | 45% | 1% | 0.8 to 3 | 1.8 to 2.8 | 2.0 | 2.2 | 2.4 |
| 3348 | 55% | 44% | 1% | 0.8 to 3 | 1.8 to 2.8 | 2.0 | 2.2 | 2.4 |
| 3349 | 56% | 43% | 1% | 0.8 to 3 | 1.8 to 2.8 | 2.0 | 2.2 | 2.4 |
| 3350 | 57% | 42% | 1% | 0.8 to 3 | 1.8 to 2.8 | 2.0 | 2.2 | 2.4 |
| 3351 | 58% | 41% | 1% | 0.8 to 3 | 1.8 to 2.8 | 2.0 | 2.2 | 2.4 |
| 3352 | 59% | 40% | 1% | 0.8 to 3 | 1.8 to 2.8 | 2.0 | 2.2 | 2.4 |
| 3353 | 60% | 39% | 1% | 0.8 to 3 | 1.8 to 2.8 | 2.0 | 2.2 | 2.4 |
| 3354 | 30% | 68.5% | 1.5% | 0.8 to 3 | 1.8 to 2.8 | 2.0 | 2.2 | 2.4 |
| 3355 | 31% | 67.5% | 1.5% | 0.8 to 3 | 1.8 to 2.8 | 2.0 | 2.2 | 2.4 |
| 3356 | 32% | 66.5% | 1.5% | 0.8 to 3 | 1.8 to 2.8 | 2.0 | 2.2 | 2.4 |
| 3357 | 33% | 65.5% | 1.5% | 0.8 to 3 | 1.8 to 2.8 | 2.0 | 2.2 | 2.4 |
| 3358 | 34% | 64.5% | 1.5% | 0.8 to 3 | 1.8 to 2.8 | 2.0 | 2.2 | 2.4 |
| 3359 | 35% | 63.5% | 1.5% | 0.8 to 3 | 1.8 to 2.8 | 2.0 | 2.2 | 2.4 |
| 3360 | 36% | 62.5% | 1.5% | 0.8 to 3 | 1.8 to 2.8 | 2.0 | 2.2 | 2.4 |

TABLE 8-continued

| | Alkyl Sulfate Alkyl Chain Length, Wt. Percentage | | Alkyl Ether Sulfate | | | | | |
|---|---|---|---|---|---|---|---|---|
| | | | Alkyl Chain Length, Wt. % | Average mol. EO (Alternatives for each numbered species) | | | | |
| Species | 8 to 10 | 9 to 11 | 8 to 10 | Range A | Range B | Species C | Species D | Species E |
| 3361 | 37% | 61.5% | 1.5% | 0.8 to 3 | 1.8 to 2.8 | 2.0 | 2.2 | 2.4 |
| 3362 | 38% | 60.5% | 1.5% | 0.8 to 3 | 1.8 to 2.8 | 2.0 | 2.2 | 2.4 |
| 3363 | 39% | 59.5% | 1.5% | 0.8 to 3 | 1.8 to 2.8 | 2.0 | 2.2 | 2.4 |
| 3364 | 40% | 58.5% | 1.5% | 0.8 to 3 | 1.8 to 2.8 | 2.0 | 2.2 | 2.4 |
| 3365 | 41% | 57.5% | 1.5% | 0.8 to 3 | 1.8 to 2.8 | 2.0 | 2.2 | 2.4 |
| 3366 | 42% | 56.5% | 1.5% | 0.8 to 3 | 1.8 to 2.8 | 2.0 | 2.2 | 2.4 |
| 3367 | 43% | 55.5% | 1.5% | 0.8 to 3 | 1.8 to 2.8 | 2.0 | 2.2 | 2.4 |
| 3368 | 44% | 54.5% | 1.5% | 0.8 to 3 | 1.8 to 2.8 | 2.0 | 2.2 | 2.4 |
| 3369 | 45% | 53.5% | 1.5% | 0.8 to 3 | 1.8 to 2.8 | 2.0 | 2.2 | 2.4 |
| 3370 | 46% | 52.5% | 1.5% | 0.8 to 3 | 1.8 to 2.8 | 2.0 | 2.2 | 2.4 |
| 3371 | 47% | 51.5% | 1.5% | 0.8 to 3 | 1.8 to 2.8 | 2.0 | 2.2 | 2.4 |
| 3372 | 48% | 50.5% | 1.5% | 0.8 to 3 | 1.8 to 2.8 | 2.0 | 2.2 | 2.4 |
| 3373 | 49% | 49.5% | 1.5% | 0.8 to 3 | 1.8 to 2.8 | 2.0 | 2.2 | 2.4 |
| 3374 | 50% | 48.5% | 1.5% | 0.8 to 3 | 1.8 to 2.8 | 2.0 | 2.2 | 2.4 |
| 3375 | 51% | 47.5% | 1.5% | 0.8 to 3 | 1.8 to 2.8 | 2.0 | 2.2 | 2.4 |
| 3376 | 52% | 46.5% | 1.5% | 0.8 to 3 | 1.8 to 2.8 | 2.0 | 2.2 | 2.4 |
| 3377 | 53% | 45.5% | 1.5% | 0.8 to 3 | 1.8 to 2.8 | 2.0 | 2.2 | 2.4 |
| 3378 | 54% | 44.5% | 1.5% | 0.8 to 3 | 1.8 to 2.8 | 2.0 | 2.2 | 2.4 |
| 3379 | 55% | 43.5% | 1.5% | 0.8 to 3 | 1.8 to 2.8 | 2.0 | 2.2 | 2.4 |
| 3380 | 56% | 42.5% | 1.5% | 0.8 to 3 | 1.8 to 2.8 | 2.0 | 2.2 | 2.4 |
| 3381 | 57% | 41.5% | 1.5% | 0.8 to 3 | 1.8 to 2.8 | 2.0 | 2.2 | 2.4 |
| 3382 | 58% | 40.5% | 1.5% | 0.8 to 3 | 1.8 to 2.8 | 2.0 | 2.2 | 2.4 |
| 3383 | 59% | 39.5% | 1.5% | 0.8 to 3 | 1.8 to 2.8 | 2.0 | 2.2 | 2.4 |
| 3384 | 60% | 38.5% | 1.5% | 0.8 to 3 | 1.8 to 2.8 | 2.0 | 2.2 | 2.4 |
| 3385 | 30% | 68% | 2% | 0.8 to 3 | 1.8 to 2.8 | 2.0 | 2.2 | 2.4 |
| 3386 | 31% | 67% | 2% | 0.8 to 3 | 1.8 to 2.8 | 2.0 | 2.2 | 2.4 |
| 3387 | 32% | 66% | 2% | 0.8 to 3 | 1.8 to 2.8 | 2.0 | 2.2 | 2.4 |
| 3388 | 33% | 65% | 2% | 0.8 to 3 | 1.8 to 2.8 | 2.0 | 2.2 | 2.4 |
| 3389 | 34% | 64% | 2% | 0.8 to 3 | 1.8 to 2.8 | 2.0 | 2.2 | 2.4 |
| 3390 | 35% | 63% | 2% | 0.8 to 3 | 1.8 to 2.8 | 2.0 | 2.2 | 2.4 |
| 3391 | 36% | 62% | 2% | 0.8 to 3 | 1.8 to 2.8 | 2.0 | 2.2 | 2.4 |
| 3392 | 37% | 61% | 2% | 0.8 to 3 | 1.8 to 2.8 | 2.0 | 2.2 | 2.4 |
| 3393 | 38% | 60% | 2% | 0.8 to 3 | 1.8 to 2.8 | 2.0 | 2.2 | 2.4 |
| 3394 | 39% | 59% | 2% | 0.8 to 3 | 1.8 to 2.8 | 2.0 | 2.2 | 2.4 |
| 3395 | 40% | 58% | 2% | 0.8 to 3 | 1.8 to 2.8 | 2.0 | 2.2 | 2.4 |
| 3396 | 41% | 57% | 2% | 0.8 to 3 | 1.8 to 2.8 | 2.0 | 2.2 | 2.4 |
| 3397 | 42% | 56% | 2% | 0.8 to 3 | 1.8 to 2.8 | 2.0 | 2.2 | 2.4 |
| 3398 | 43% | 55% | 2% | 0.8 to 3 | 1.8 to 2.8 | 2.0 | 2.2 | 2.4 |
| 3399 | 44% | 54% | 2% | 0.8 to 3 | 1.8 to 2.8 | 2.0 | 2.2 | 2.4 |
| 3400 | 45% | 53% | 2% | 0.8 to 3 | 1.8 to 2.8 | 2.0 | 2.2 | 2.4 |
| 3401 | 46% | 52% | 2% | 0.8 to 3 | 1.8 to 2.8 | 2.0 | 2.2 | 2.4 |
| 3402 | 47% | 51% | 2% | 0.8 to 3 | 1.8 to 2.8 | 2.0 | 2.2 | 2.4 |
| 3403 | 48% | 50% | 2% | 0.8 to 3 | 1.8 to 2.8 | 2.0 | 2.2 | 2.4 |
| 3404 | 49% | 49% | 2% | 0.8 to 3 | 1.8 to 2.8 | 2.0 | 2.2 | 2.4 |
| 3405 | 50% | 48% | 2% | 0.8 to 3 | 1.8 to 2.8 | 2.0 | 2.2 | 2.4 |
| 3406 | 51% | 47% | 2% | 0.8 to 3 | 1.8 to 2.8 | 2.0 | 2.2 | 2.4 |
| 3407 | 52% | 46% | 2% | 0.8 to 3 | 1.8 to 2.8 | 2.0 | 2.2 | 2.4 |
| 3408 | 53% | 45% | 2% | 0.8 to 3 | 1.8 to 2.8 | 2.0 | 2.2 | 2.4 |
| 3409 | 54% | 44% | 2% | 0.8 to 3 | 1.8 to 2.8 | 2.0 | 2.2 | 2.4 |
| 3410 | 55% | 43% | 2% | 0.8 to 3 | 1.8 to 2.8 | 2.0 | 2.2 | 2.4 |
| 3411 | 56% | 42% | 2% | 0.8 to 3 | 1.8 to 2.8 | 2.0 | 2.2 | 2.4 |
| 3412 | 57% | 41% | 2% | 0.8 to 3 | 1.8 to 2.8 | 2.0 | 2.2 | 2.4 |
| 3413 | 58% | 40% | 2% | 0.8 to 3 | 1.8 to 2.8 | 2.0 | 2.2 | 2.4 |
| 3414 | 59% | 39% | 2% | 0.8 to 3 | 1.8 to 2.8 | 2.0 | 2.2 | 2.4 |
| 3415 | 60% | 38% | 2% | 0.8 to 3 | 1.8 to 2.8 | 2.0 | 2.2 | 2.4 |
| 3416 | 30% | 67.5% | 2.5% | 0.8 to 3 | 1.8 to 2.8 | 2.0 | 2.2 | 2.4 |
| 3417 | 31% | 66.5% | 2.5% | 0.8 to 3 | 1.8 to 2.8 | 2.0 | 2.2 | 2.4 |
| 3418 | 32% | 65.5% | 2.5% | 0.8 to 3 | 1.8 to 2.8 | 2.0 | 2.2 | 2.4 |
| 3419 | 33% | 64.5% | 2.5% | 0.8 to 3 | 1.8 to 2.8 | 2.0 | 2.2 | 2.4 |
| 3420 | 34% | 63.5% | 2.5% | 0.8 to 3 | 1.8 to 2.8 | 2.0 | 2.2 | 2.4 |
| 3421 | 35% | 62.5% | 2.5% | 0.8 to 3 | 1.8 to 2.8 | 2.0 | 2.2 | 2.4 |
| 3422 | 36% | 61.5% | 2.5% | 0.8 to 3 | 1.8 to 2.8 | 2.0 | 2.2 | 2.4 |
| 3423 | 37% | 60.5% | 2.5% | 0.8 to 3 | 1.8 to 2.8 | 2.0 | 2.2 | 2.4 |
| 3424 | 38% | 59.5% | 2.5% | 0.8 to 3 | 1.8 to 2.8 | 2.0 | 2.2 | 2.4 |
| 3425 | 39% | 58.5% | 2.5% | 0.8 to 3 | 1.8 to 2.8 | 2.0 | 2.2 | 2.4 |
| 3426 | 40% | 57.5% | 2.5% | 0.8 to 3 | 1.8 to 2.8 | 2.0 | 2.2 | 2.4 |
| 3427 | 41% | 56.5% | 2.5% | 0.8 to 3 | 1.8 to 2.8 | 2.0 | 2.2 | 2.4 |
| 3428 | 42% | 55.5% | 2.5% | 0.8 to 3 | 1.8 to 2.8 | 2.0 | 2.2 | 2.4 |
| 3429 | 43% | 54.5% | 2.5% | 0.8 to 3 | 1.8 to 2.8 | 2.0 | 2.2 | 2.4 |
| 3430 | 44% | 53.5% | 2.5% | 0.8 to 3 | 1.8 to 2.8 | 2.0 | 2.2 | 2.4 |

TABLE 8-continued

| | Alkyl Sulfate Alkyl Chain Length, Wt. Percentage | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| Species | 8 to 10 | 9 to 11 | 8 to 10 | Range A | Range B | Species C | Species D | Species E |
| 3431 | 45% | 52.5% | 2.5% | 0.8 to 3 | 1.8 to 2.8 | 2.0 | 2.2 | 2.4 |
| 3432 | 46% | 51.5% | 2.5% | 0.8 to 3 | 1.8 to 2.8 | 2.0 | 2.2 | 2.4 |
| 3433 | 47% | 50.5% | 2.5% | 0.8 to 3 | 1.8 to 2.8 | 2.0 | 2.2 | 2.4 |
| 3434 | 48% | 49.5% | 2.5% | 0.8 to 3 | 1.8 to 2.8 | 2.0 | 2.2 | 2.4 |
| 3435 | 49% | 48.5% | 2.5% | 0.8 to 3 | 1.8 to 2.8 | 2.0 | 2.2 | 2.4 |
| 3436 | 50% | 47.5% | 2.5% | 0.8 to 3 | 1.8 to 2.8 | 2.0 | 2.2 | 2.4 |
| 3437 | 51% | 46.5% | 2.5% | 0.8 to 3 | 1.8 to 2.8 | 2.0 | 2.2 | 2.4 |
| 3438 | 52% | 45.5% | 2.5% | 0.8 to 3 | 1.8 to 2.8 | 2.0 | 2.2 | 2.4 |
| 3439 | 53% | 44.5% | 2.5% | 0.8 to 3 | 1.8 to 2.8 | 2.0 | 2.2 | 2.4 |
| 3440 | 54% | 43.5% | 2.5% | 0.8 to 3 | 1.8 to 2.8 | 2.0 | 2.2 | 2.4 |
| 3441 | 55% | 42.5% | 2.5% | 0.8 to 3 | 1.8 to 2.8 | 2.0 | 2.2 | 2.4 |
| 3442 | 56% | 41.5% | 2.5% | 0.8 to 3 | 1.8 to 2.8 | 2.0 | 2.2 | 2.4 |
| 3443 | 57% | 40.5% | 2.5% | 0.8 to 3 | 1.8 to 2.8 | 2.0 | 2.2 | 2.4 |
| 3444 | 58% | 39.5% | 2.5% | 0.8 to 3 | 1.8 to 2.8 | 2.0 | 2.2 | 2.4 |
| 3445 | 59% | 38.5% | 2.5% | 0.8 to 3 | 1.8 to 2.8 | 2.0 | 2.2 | 2.4 |
| 3446 | 60% | 37.5% | 2.5% | 0.8 to 3 | 1.8 to 2.8 | 2.0 | 2.2 | 2.4 |
| 3447 | 30% | 67% | 3% | 0.8 to 3 | 1.8 to 2.8 | 2.0 | 2.2 | 2.4 |
| 3448 | 31% | 66% | 3% | 0.8 to 3 | 1.8 to 2.8 | 2.0 | 2.2 | 2.4 |
| 3449 | 32% | 65% | 3% | 0.8 to 3 | 1.8 to 2.8 | 2.0 | 2.2 | 2.4 |
| 3450 | 33% | 64% | 3% | 0.8 to 3 | 1.8 to 2.8 | 2.0 | 2.2 | 2.4 |
| 3451 | 34% | 63% | 3% | 0.8 to 3 | 1.8 to 2.8 | 2.0 | 2.2 | 2.4 |
| 3452 | 35% | 62% | 3% | 0.8 to 3 | 1.8 to 2.8 | 2.0 | 2.2 | 2.4 |
| 3453 | 36% | 61% | 3% | 0.8 to 3 | 1.8 to 2.8 | 2.0 | 2.2 | 2.4 |
| 3454 | 37% | 60% | 3% | 0.8 to 3 | 1.8 to 2.8 | 2.0 | 2.2 | 2.4 |
| 3455 | 38% | 59% | 3% | 0.8 to 3 | 1.8 to 2.8 | 2.0 | 2.2 | 2.4 |
| 3456 | 39% | 58% | 3% | 0.8 to 3 | 1.8 to 2.8 | 2.0 | 2.2 | 2.4 |
| 3457 | 40% | 57% | 3% | 0.8 to 3 | 1.8 to 2.8 | 2.0 | 2.2 | 2.4 |
| 3458 | 41% | 56% | 3% | 0.8 to 3 | 1.8 to 2.8 | 2.0 | 2.2 | 2.4 |
| 3459 | 42% | 55% | 3% | 0.8 to 3 | 1.8 to 2.8 | 2.0 | 2.2 | 2.4 |
| 3460 | 43% | 54% | 3% | 0.8 to 3 | 1.8 to 2.8 | 2.0 | 2.2 | 2.4 |
| 3461 | 44% | 53% | 3% | 0.8 to 3 | 1.8 to 2.8 | 2.0 | 2.2 | 2.4 |
| 3462 | 45% | 52% | 3% | 0.8 to 3 | 1.8 to 2.8 | 2.0 | 2.2 | 2.4 |
| 3463 | 46% | 51% | 3% | 0.8 to 3 | 1.8 to 2.8 | 2.0 | 2.2 | 2.4 |
| 3464 | 47% | 50% | 3% | 0.8 to 3 | 1.8 to 2.8 | 2.0 | 2.2 | 2.4 |
| 3465 | 48% | 49% | 3% | 0.8 to 3 | 1.8 to 2.8 | 2.0 | 2.2 | 2.4 |
| 3466 | 49% | 48% | 3% | 0.8 to 3 | 1.8 to 2.8 | 2.0 | 2.2 | 2.4 |
| 3467 | 50% | 47% | 3% | 0.8 to 3 | 1.8 to 2.8 | 2.0 | 2.2 | 2.4 |
| 3468 | 51% | 46% | 3% | 0.8 to 3 | 1.8 to 2.8 | 2.0 | 2.2 | 2.4 |
| 3469 | 52% | 45% | 3% | 0.8 to 3 | 1.8 to 2.8 | 2.0 | 2.2 | 2.4 |
| 3470 | 53% | 44% | 3% | 0.8 to 3 | 1.8 to 2.8 | 2.0 | 2.2 | 2.4 |
| 3471 | 54% | 43% | 3% | 0.8 to 3 | 1.8 to 2.8 | 2.0 | 2.2 | 2.4 |
| 3472 | 55% | 42% | 3% | 0.8 to 3 | 1.8 to 2.8 | 2.0 | 2.2 | 2.4 |
| 3473 | 56% | 41% | 3% | 0.8 to 3 | 1.8 to 2.8 | 2.0 | 2.2 | 2.4 |
| 3474 | 57% | 40% | 3% | 0.8 to 3 | 1.8 to 2.8 | 2.0 | 2.2 | 2.4 |
| 3475 | 58% | 39% | 3% | 0.8 to 3 | 1.8 to 2.8 | 2.0 | 2.2 | 2.4 |
| 3476 | 59% | 38% | 3% | 0.8 to 3 | 1.8 to 2.8 | 2.0 | 2.2 | 2.4 |
| 3477 | 60% | 37% | 3% | 0.8 to 3 | 1.8 to 2.8 | 2.0 | 2.2 | 2.4 |
| 3478 | 30% | 66.5% | 3.5% | 0.8 to 3 | 1.8 to 2.8 | 2.0 | 2.2 | 2.4 |
| 3479 | 31% | 65.5% | 3.5% | 0.8 to 3 | 1.8 to 2.8 | 2.0 | 2.2 | 2.4 |
| 3480 | 32% | 64.5% | 3.5% | 0.8 to 3 | 1.8 to 2.8 | 2.0 | 2.2 | 2.4 |
| 3481 | 33% | 63.5% | 3.5% | 0.8 to 3 | 1.8 to 2.8 | 2.0 | 2.2 | 2.4 |
| 3482 | 34% | 62.5% | 3.5% | 0.8 to 3 | 1.8 to 2.8 | 2.0 | 2.2 | 2.4 |
| 3483 | 35% | 61.5% | 3.5% | 0.8 to 3 | 1.8 to 2.8 | 2.0 | 2.2 | 2.4 |
| 3484 | 36% | 60.5% | 3.5% | 0.8 to 3 | 1.8 to 2.8 | 2.0 | 2.2 | 2.4 |
| 3485 | 37% | 59.5% | 3.5% | 0.8 to 3 | 1.8 to 2.8 | 2.0 | 2.2 | 2.4 |
| 3486 | 38% | 58.5% | 3.5% | 0.8 to 3 | 1.8 to 2.8 | 2.0 | 2.2 | 2.4 |
| 3487 | 39% | 57.5% | 3.5% | 0.8 to 3 | 1.8 to 2.8 | 2.0 | 2.2 | 2.4 |
| 3488 | 40% | 56.5% | 3.5% | 0.8 to 3 | 1.8 to 2.8 | 2.0 | 2.2 | 2.4 |
| 3489 | 41% | 55.5% | 3.5% | 0.8 to 3 | 1.8 to 2.8 | 2.0 | 2.2 | 2.4 |
| 3490 | 42% | 54.5% | 3.5% | 0.8 to 3 | 1.8 to 2.8 | 2.0 | 2.2 | 2.4 |
| 3491 | 43% | 53.5% | 3.5% | 0.8 to 3 | 1.8 to 2.8 | 2.0 | 2.2 | 2.4 |
| 3492 | 44% | 52.5% | 3.5% | 0.8 to 3 | 1.8 to 2.8 | 2.0 | 2.2 | 2.4 |
| 3493 | 45% | 51.5% | 3.5% | 0.8 to 3 | 1.8 to 2.8 | 2.0 | 2.2 | 2.4 |
| 3494 | 46% | 50.5% | 3.5% | 0.8 to 3 | 1.8 to 2.8 | 2.0 | 2.2 | 2.4 |
| 3495 | 47% | 49.5% | 3.5% | 0.8 to 3 | 1.8 to 2.8 | 2.0 | 2.2 | 2.4 |
| 3496 | 48% | 48.5% | 3.5% | 0.8 to 3 | 1.8 to 2.8 | 2.0 | 2.2 | 2.4 |
| 3497 | 49% | 47.5% | 3.5% | 0.8 to 3 | 1.8 to 2.8 | 2.0 | 2.2 | 2.4 |
| 3498 | 50% | 46.5% | 3.5% | 0.8 to 3 | 1.8 to 2.8 | 2.0 | 2.2 | 2.4 |
| 3499 | 51% | 45.5% | 3.5% | 0.8 to 3 | 1.8 to 2.8 | 2.0 | 2.2 | 2.4 |
| 3500 | 52% | 44.5% | 3.5% | 0.8 to 3 | 1.8 to 2.8 | 2.0 | 2.2 | 2.4 |

TABLE 8-continued

| | Alkyl Sulfate Alkyl Chain Length, Wt. Percentage | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| Species | 8 to 10 | 9 to 11 | 8 to 10 | Range A | Range B | Species C | Species D | Species E |
| 3501 | 53% | 43.5% | 3.5% | 0.8 to 3 | 1.8 to 2.8 | 2.0 | 2.2 | 2.4 |
| 3502 | 54% | 42.5% | 3.5% | 0.8 to 3 | 1.8 to 2.8 | 2.0 | 2.2 | 2.4 |
| 3503 | 55% | 41.5% | 3.5% | 0.8 to 3 | 1.8 to 2.8 | 2.0 | 2.2 | 2.4 |
| 3504 | 56% | 40.5% | 3.5% | 0.8 to 3 | 1.8 to 2.8 | 2.0 | 2.2 | 2.4 |
| 3505 | 57% | 39.5% | 3.5% | 0.8 to 3 | 1.8 to 2.8 | 2.0 | 2.2 | 2.4 |
| 3506 | 58% | 38.5% | 3.5% | 0.8 to 3 | 1.8 to 2.8 | 2.0 | 2.2 | 2.4 |
| 3507 | 59% | 37.5% | 3.5% | 0.8 to 3 | 1.8 to 2.8 | 2.0 | 2.2 | 2.4 |
| 3508 | 60% | 36.5% | 3.5% | 0.8 to 3 | 1.8 to 2.8 | 2.0 | 2.2 | 2.4 |
| 3509 | 30% | 66% | 4% | 0.8 to 3 | 1.8 to 2.8 | 2.0 | 2.2 | 2.4 |
| 3510 | 31% | 65% | 4% | 0.8 to 3 | 1.8 to 2.8 | 2.0 | 2.2 | 2.4 |
| 3511 | 32% | 64% | 4% | 0.8 to 3 | 1.8 to 2.8 | 2.0 | 2.2 | 2.4 |
| 3512 | 33% | 63% | 4% | 0.8 to 3 | 1.8 to 2.8 | 2.0 | 2.2 | 2.4 |
| 3513 | 34% | 62% | 4% | 0.8 to 3 | 1.8 to 2.8 | 2.0 | 2.2 | 2.4 |
| 3514 | 35% | 61% | 4% | 0.8 to 3 | 1.8 to 2.8 | 2.0 | 2.2 | 2.4 |
| 3515 | 36% | 60% | 4% | 0.8 to 3 | 1.8 to 2.8 | 2.0 | 2.2 | 2.4 |
| 3516 | 37% | 59% | 4% | 0.8 to 3 | 1.8 to 2.8 | 2.0 | 2.2 | 2.4 |
| 3517 | 38% | 58% | 4% | 0.8 to 3 | 1.8 to 2.8 | 2.0 | 2.2 | 2.4 |
| 3518 | 39% | 57% | 4% | 0.8 to 3 | 1.8 to 2.8 | 2.0 | 2.2 | 2.4 |
| 3519 | 40% | 56% | 4% | 0.8 to 3 | 1.8 to 2.8 | 2.0 | 2.2 | 2.4 |
| 3520 | 41% | 55% | 4% | 0.8 to 3 | 1.8 to 2.8 | 2.0 | 2.2 | 2.4 |
| 3521 | 42% | 54% | 4% | 0.8 to 3 | 1.8 to 2.8 | 2.0 | 2.2 | 2.4 |
| 3522 | 43% | 53% | 4% | 0.8 to 3 | 1.8 to 2.8 | 2.0 | 2.2 | 2.4 |
| 3523 | 44% | 52% | 4% | 0.8 to 3 | 1.8 to 2.8 | 2.0 | 2.2 | 2.4 |
| 3524 | 45% | 51% | 4% | 0.8 to 3 | 1.8 to 2.8 | 2.0 | 2.2 | 2.4 |
| 3525 | 46% | 50% | 4% | 0.8 to 3 | 1.8 to 2.8 | 2.0 | 2.2 | 2.4 |
| 3526 | 47% | 49% | 4% | 0.8 to 3 | 1.8 to 2.8 | 2.0 | 2.2 | 2.4 |
| 3527 | 48% | 48% | 4% | 0.8 to 3 | 1.8 to 2.8 | 2.0 | 2.2 | 2.4 |
| 3528 | 49% | 47% | 4% | 0.8 to 3 | 1.8 to 2.8 | 2.0 | 2.2 | 2.4 |
| 3529 | 50% | 46% | 4% | 0.8 to 3 | 1.8 to 2.8 | 2.0 | 2.2 | 2.4 |
| 3530 | 51% | 45% | 4% | 0.8 to 3 | 1.8 to 2.8 | 2.0 | 2.2 | 2.4 |
| 3531 | 52% | 44% | 4% | 0.8 to 3 | 1.8 to 2.8 | 2.0 | 2.2 | 2.4 |
| 3532 | 53% | 43% | 4% | 0.8 to 3 | 1.8 to 2.8 | 2.0 | 2.2 | 2.4 |
| 3533 | 54% | 42% | 4% | 0.8 to 3 | 1.8 to 2.8 | 2.0 | 2.2 | 2.4 |
| 3534 | 55% | 41% | 4% | 0.8 to 3 | 1.8 to 2.8 | 2.0 | 2.2 | 2.4 |
| 3535 | 56% | 40% | 4% | 0.8 to 3 | 1.8 to 2.8 | 2.0 | 2.2 | 2.4 |
| 3536 | 57% | 39% | 4% | 0.8 to 3 | 1.8 to 2.8 | 2.0 | 2.2 | 2.4 |
| 3537 | 58% | 38% | 4% | 0.8 to 3 | 1.8 to 2.8 | 2.0 | 2.2 | 2.4 |
| 3538 | 59% | 37% | 4% | 0.8 to 3 | 1.8 to 2.8 | 2.0 | 2.2 | 2.4 |
| 3539 | 60% | 36% | 4% | 0.8 to 3 | 1.8 to 2.8 | 2.0 | 2.2 | 2.4 |
| 3540 | 30% | 65.5% | 4.5% | 0.8 to 3 | 1.8 to 2.8 | 2.0 | 2.2 | 2.4 |
| 3541 | 31% | 64.5% | 4.5% | 0.8 to 3 | 1.8 to 2.8 | 2.0 | 2.2 | 2.4 |
| 3542 | 32% | 63.5% | 4.5% | 0.8 to 3 | 1.8 to 2.8 | 2.0 | 2.2 | 2.4 |
| 3543 | 33% | 62.5% | 4.5% | 0.8 to 3 | 1.8 to 2.8 | 2.0 | 2.2 | 2.4 |
| 3544 | 34% | 61.5% | 4.5% | 0.8 to 3 | 1.8 to 2.8 | 2.0 | 2.2 | 2.4 |
| 3545 | 35% | 60.5% | 4.5% | 0.8 to 3 | 1.8 to 2.8 | 2.0 | 2.2 | 2.4 |
| 3546 | 36% | 59.5% | 4.5% | 0.8 to 3 | 1.8 to 2.8 | 2.0 | 2.2 | 2.4 |
| 3547 | 37% | 58.5% | 4.5% | 0.8 to 3 | 1.8 to 2.8 | 2.0 | 2.2 | 2.4 |
| 3548 | 38% | 57.5% | 4.5% | 0.8 to 3 | 1.8 to 2.8 | 2.0 | 2.2 | 2.4 |
| 3549 | 39% | 56.5% | 4.5% | 0.8 to 3 | 1.8 to 2.8 | 2.0 | 2.2 | 2.4 |
| 3550 | 40% | 55.5% | 4.5% | 0.8 to 3 | 1.8 to 2.8 | 2.0 | 2.2 | 2.4 |
| 3551 | 41% | 54.5% | 4.5% | 0.8 to 3 | 1.8 to 2.8 | 2.0 | 2.2 | 2.4 |
| 3552 | 42% | 53.5% | 4.5% | 0.8 to 3 | 1.8 to 2.8 | 2.0 | 2.2 | 2.4 |
| 3553 | 43% | 52.5% | 4.5% | 0.8 to 3 | 1.8 to 2.8 | 2.0 | 2.2 | 2.4 |
| 3554 | 44% | 51.5% | 4.5% | 0.8 to 3 | 1.8 to 2.8 | 2.0 | 2.2 | 2.4 |
| 3555 | 45% | 50.5% | 4.5% | 0.8 to 3 | 1.8 to 2.8 | 2.0 | 2.2 | 2.4 |
| 3556 | 46% | 49.5% | 4.5% | 0.8 to 3 | 1.8 to 2.8 | 2.0 | 2.2 | 2.4 |
| 3557 | 47% | 48.5% | 4.5% | 0.8 to 3 | 1.8 to 2.8 | 2.0 | 2.2 | 2.4 |
| 3558 | 48% | 47.5% | 4.5% | 0.8 to 3 | 1.8 to 2.8 | 2.0 | 2.2 | 2.4 |
| 3559 | 49% | 46.5% | 4.5% | 0.8 to 3 | 1.8 to 2.8 | 2.0 | 2.2 | 2.4 |
| 3560 | 50% | 45.5% | 4.5% | 0.8 to 3 | 1.8 to 2.8 | 2.0 | 2.2 | 2.4 |
| 3561 | 51% | 44.5% | 4.5% | 0.8 to 3 | 1.8 to 2.8 | 2.0 | 2.2 | 2.4 |
| 3562 | 52% | 43.5% | 4.5% | 0.8 to 3 | 1.8 to 2.8 | 2.0 | 2.2 | 2.4 |
| 3563 | 53% | 42.5% | 4.5% | 0.8 to 3 | 1.8 to 2.8 | 2.0 | 2.2 | 2.4 |
| 3564 | 54% | 41.5% | 4.5% | 0.8 to 3 | 1.8 to 2.8 | 2.0 | 2.2 | 2.4 |
| 3565 | 55% | 40.5% | 4.5% | 0.8 to 3 | 1.8 to 2.8 | 2.0 | 2.2 | 2.4 |
| 3566 | 56% | 39.5% | 4.5% | 0.8 to 3 | 1.8 to 2.8 | 2.0 | 2.2 | 2.4 |
| 3567 | 57% | 38.5% | 4.5% | 0.8 to 3 | 1.8 to 2.8 | 2.0 | 2.2 | 2.4 |
| 3568 | 58% | 37.5% | 4.5% | 0.8 to 3 | 1.8 to 2.8 | 2.0 | 2.2 | 2.4 |
| 3569 | 59% | 36.5% | 4.5% | 0.8 to 3 | 1.8 to 2.8 | 2.0 | 2.2 | 2.4 |
| 3570 | 60% | 35.5% | 4.5% | 0.8 to 3 | 1.8 to 2.8 | 2.0 | 2.2 | 2.4 |

TABLE 8-continued

| | Alkyl Sulfate Alkyl Chain Length, Wt. Percentage | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| Species | 8 to 10 | 9 to 11 | 8 to 10 | Range A | Range B | Species C | Species D | Species E |
| 3571 | 30% | 65% | 5% | 0.8 to 3 | 1.8 to 2.8 | 2.0 | 2.2 | 2.4 |
| 3572 | 31% | 64% | 5% | 0.8 to 3 | 1.8 to 2.8 | 2.0 | 2.2 | 2.4 |
| 3573 | 32% | 63% | 5% | 0.8 to 3 | 1.8 to 2.8 | 2.0 | 2.2 | 2.4 |
| 3574 | 33% | 62% | 5% | 0.8 to 3 | 1.8 to 2.8 | 2.0 | 2.2 | 2.4 |
| 3575 | 34% | 61% | 5% | 0.8 to 3 | 1.8 to 2.8 | 2.0 | 2.2 | 2.4 |
| 3576 | 35% | 60% | 5% | 0.8 to 3 | 1.8 to 2.8 | 2.0 | 2.2 | 2.4 |
| 3577 | 36% | 59% | 5% | 0.8 to 3 | 1.8 to 2.8 | 2.0 | 2.2 | 2.4 |
| 3578 | 37% | 58% | 5% | 0.8 to 3 | 1.8 to 2.8 | 2.0 | 2.2 | 2.4 |
| 3579 | 38% | 57% | 5% | 0.8 to 3 | 1.8 to 2.8 | 2.0 | 2.2 | 2.4 |
| 3580 | 39% | 56% | 5% | 0.8 to 3 | 1.8 to 2.8 | 2.0 | 2.2 | 2.4 |
| 3581 | 40% | 55% | 5% | 0.8 to 3 | 1.8 to 2.8 | 2.0 | 2.2 | 2.4 |
| 3582 | 41% | 54% | 5% | 0.8 to 3 | 1.8 to 2.8 | 2.0 | 2.2 | 2.4 |
| 3583 | 42% | 53% | 5% | 0.8 to 3 | 1.8 to 2.8 | 2.0 | 2.2 | 2.4 |
| 3584 | 43% | 52% | 5% | 0.8 to 3 | 1.8 to 2.8 | 2.0 | 2.2 | 2.4 |
| 3585 | 44% | 51% | 5% | 0.8 to 3 | 1.8 to 2.8 | 2.0 | 2.2 | 2.4 |
| 3586 | 45% | 50% | 5% | 0.8 to 3 | 1.8 to 2.8 | 2.0 | 2.2 | 2.4 |
| 3587 | 46% | 49% | 5% | 0.8 to 3 | 1.8 to 2.8 | 2.0 | 2.2 | 2.4 |
| 3588 | 47% | 48% | 5% | 0.8 to 3 | 1.8 to 2.8 | 2.0 | 2.2 | 2.4 |
| 3589 | 48% | 47% | 5% | 0.8 to 3 | 1.8 to 2.8 | 2.0 | 2.2 | 2.4 |
| 3590 | 49% | 46% | 5% | 0.8 to 3 | 1.8 to 2.8 | 2.0 | 2.2 | 2.4 |
| 3591 | 50% | 45% | 5% | 0.8 to 3 | 1.8 to 2.8 | 2.0 | 2.2 | 2.4 |
| 3592 | 51% | 44% | 5% | 0.8 to 3 | 1.8 to 2.8 | 2.0 | 2.2 | 2.4 |
| 3593 | 52% | 43% | 5% | 0.8 to 3 | 1.8 to 2.8 | 2.0 | 2.2 | 2.4 |
| 3594 | 53% | 42% | 5% | 0.8 to 3 | 1.8 to 2.8 | 2.0 | 2.2 | 2.4 |
| 3595 | 54% | 41% | 5% | 0.8 to 3 | 1.8 to 2.8 | 2.0 | 2.2 | 2.4 |
| 3596 | 55% | 40% | 5% | 0.8 to 3 | 1.8 to 2.8 | 2.0 | 2.2 | 2.4 |
| 3597 | 56% | 39% | 5% | 0.8 to 3 | 1.8 to 2.8 | 2.0 | 2.2 | 2.4 |
| 3598 | 57% | 38% | 5% | 0.8 to 3 | 1.8 to 2.8 | 2.0 | 2.2 | 2.4 |
| 3599 | 58% | 37% | 5% | 0.8 to 3 | 1.8 to 2.8 | 2.0 | 2.2 | 2.4 |
| 3600 | 59% | 36% | 5% | 0.8 to 3 | 1.8 to 2.8 | 2.0 | 2.2 | 2.4 |
| 3601 | 60% | 35% | 5% | 0.8 to 3 | 1.8 to 2.8 | 2.0 | 2.2 | 2.4 |
| 3602 | 30% | 64.5% | 5.5% | 0.8 to 3 | 1.8 to 2.8 | 2.0 | 2.2 | 2.4 |
| 3603 | 31% | 63.5% | 5.5% | 0.8 to 3 | 1.8 to 2.8 | 2.0 | 2.2 | 2.4 |
| 3604 | 32% | 62.5% | 5.5% | 0.8 to 3 | 1.8 to 2.8 | 2.0 | 2.2 | 2.4 |
| 3605 | 33% | 61.5% | 5.5% | 0.8 to 3 | 1.8 to 2.8 | 2.0 | 2.2 | 2.4 |
| 3606 | 34% | 60.5% | 5.5% | 0.8 to 3 | 1.8 to 2.8 | 2.0 | 2.2 | 2.4 |
| 3607 | 35% | 59.5% | 5.5% | 0.8 to 3 | 1.8 to 2.8 | 2.0 | 2.2 | 2.4 |
| 3608 | 36% | 58.5% | 5.5% | 0.8 to 3 | 1.8 to 2.8 | 2.0 | 2.2 | 2.4 |
| 3609 | 37% | 57.5% | 5.5% | 0.8 to 3 | 1.8 to 2.8 | 2.0 | 2.2 | 2.4 |
| 3610 | 38% | 56.5% | 5.5% | 0.8 to 3 | 1.8 to 2.8 | 2.0 | 2.2 | 2.4 |
| 3611 | 39% | 55.5% | 5.5% | 0.8 to 3 | 1.8 to 2.8 | 2.0 | 2.2 | 2.4 |
| 3612 | 40% | 54.5% | 5.5% | 0.8 to 3 | 1.8 to 2.8 | 2.0 | 2.2 | 2.4 |
| 3613 | 41% | 53.5% | 5.5% | 0.8 to 3 | 1.8 to 2.8 | 2.0 | 2.2 | 2.4 |
| 3614 | 42% | 52.5% | 5.5% | 0.8 to 3 | 1.8 to 2.8 | 2.0 | 2.2 | 2.4 |
| 3615 | 43% | 51.5% | 5.5% | 0.8 to 3 | 1.8 to 2.8 | 2.0 | 2.2 | 2.4 |
| 3616 | 44% | 50.5% | 5.5% | 0.8 to 3 | 1.8 to 2.8 | 2.0 | 2.2 | 2.4 |
| 3617 | 45% | 49.5% | 5.5% | 0.8 to 3 | 1.8 to 2.8 | 2.0 | 2.2 | 2.4 |
| 3618 | 46% | 48.5% | 5.5% | 0.8 to 3 | 1.8 to 2.8 | 2.0 | 2.2 | 2.4 |
| 3619 | 47% | 47.5% | 5.5% | 0.8 to 3 | 1.8 to 2.8 | 2.0 | 2.2 | 2.4 |
| 3620 | 48% | 46.5% | 5.5% | 0.8 to 3 | 1.8 to 2.8 | 2.0 | 2.2 | 2.4 |
| 3621 | 49% | 45.5% | 5.5% | 0.8 to 3 | 1.8 to 2.8 | 2.0 | 2.2 | 2.4 |
| 3622 | 50% | 44.5% | 5.5% | 0.8 to 3 | 1.8 to 2.8 | 2.0 | 2.2 | 2.4 |
| 3623 | 51% | 43.5% | 5.5% | 0.8 to 3 | 1.8 to 2.8 | 2.0 | 2.2 | 2.4 |
| 3624 | 52% | 42.5% | 5.5% | 0.8 to 3 | 1.8 to 2.8 | 2.0 | 2.2 | 2.4 |
| 3625 | 53% | 41.5% | 5.5% | 0.8 to 3 | 1.8 to 2.8 | 2.0 | 2.2 | 2.4 |
| 3626 | 54% | 40.5% | 5.5% | 0.8 to 3 | 1.8 to 2.8 | 2.0 | 2.2 | 2.4 |
| 3627 | 55% | 39.5% | 5.5% | 0.8 to 3 | 1.8 to 2.8 | 2.0 | 2.2 | 2.4 |
| 3628 | 56% | 38.5% | 5.5% | 0.8 to 3 | 1.8 to 2.8 | 2.0 | 2.2 | 2.4 |
| 3629 | 57% | 37.5% | 5.5% | 0.8 to 3 | 1.8 to 2.8 | 2.0 | 2.2 | 2.4 |
| 3630 | 58% | 36.5% | 5.5% | 0.8 to 3 | 1.8 to 2.8 | 2.0 | 2.2 | 2.4 |
| 3631 | 59% | 35.5% | 5.5% | 0.8 to 3 | 1.8 to 2.8 | 2.0 | 2.2 | 2.4 |
| 3632 | 60% | 34.5% | 5.5% | 0.8 to 3 | 1.8 to 2.8 | 2.0 | 2.2 | 2.4 |
| 3633 | 30% | 64% | 6% | 0.8 to 3 | 1.8 to 2.8 | 2.0 | 2.2 | 2.4 |
| 3634 | 31% | 63% | 6% | 0.8 to 3 | 1.8 to 2.8 | 2.0 | 2.2 | 2.4 |
| 3635 | 32% | 62% | 6% | 0.8 to 3 | 1.8 to 2.8 | 2.0 | 2.2 | 2.4 |
| 3636 | 33% | 61% | 6% | 0.8 to 3 | 1.8 to 2.8 | 2.0 | 2.2 | 2.4 |
| 3637 | 34% | 60% | 6% | 0.8 to 3 | 1.8 to 2.8 | 2.0 | 2.2 | 2.4 |
| 3638 | 35% | 59% | 6% | 0.8 to 3 | 1.8 to 2.8 | 2.0 | 2.2 | 2.4 |
| 3639 | 36% | 58% | 6% | 0.8 to 3 | 1.8 to 2.8 | 2.0 | 2.2 | 2.4 |
| 3640 | 37% | 57% | 6% | 0.8 to 3 | 1.8 to 2.8 | 2.0 | 2.2 | 2.4 |

TABLE 8-continued

|  | Alkyl Sulfate Alkyl Chain Length, Wt. Percentage | | Alkyl Chain Length, Wt. % | Alkyl Ether Sulfate | | | | |
|---|---|---|---|---|---|---|---|---|
|  | | | | Average mol. EO (Alternatives for each numbered species) | | | | |
| Species | 8 to 10 | 9 to 11 | 8 to 10 | Range A | Range B | Species C | Species D | Species E |
| 3641 | 38% | 56% | 6% | 0.8 to 3 | 1.8 to 2.8 | 2.0 | 2.2 | 2.4 |
| 3642 | 39% | 55% | 6% | 0.8 to 3 | 1.8 to 2.8 | 2.0 | 2.2 | 2.4 |
| 3643 | 40% | 54% | 6% | 0.8 to 3 | 1.8 to 2.8 | 2.0 | 2.2 | 2.4 |
| 3644 | 41% | 53% | 6% | 0.8 to 3 | 1.8 to 2.8 | 2.0 | 2.2 | 2.4 |
| 3645 | 42% | 52% | 6% | 0.8 to 3 | 1.8 to 2.8 | 2.0 | 2.2 | 2.4 |
| 3646 | 43% | 51% | 6% | 0.8 to 3 | 1.8 to 2.8 | 2.0 | 2.2 | 2.4 |
| 3647 | 44% | 50% | 6% | 0.8 to 3 | 1.8 to 2.8 | 2.0 | 2.2 | 2.4 |
| 3648 | 45% | 49% | 6% | 0.8 to 3 | 1.8 to 2.8 | 2.0 | 2.2 | 2.4 |
| 3649 | 46% | 48% | 6% | 0.8 to 3 | 1.8 to 2.8 | 2.0 | 2.2 | 2.4 |
| 3650 | 47% | 47% | 6% | 0.8 to 3 | 1.8 to 2.8 | 2.0 | 2.2 | 2.4 |
| 3651 | 48% | 46% | 6% | 0.8 to 3 | 1.8 to 2.8 | 2.0 | 2.2 | 2.4 |
| 3652 | 49% | 45% | 6% | 0.8 to 3 | 1.8 to 2.8 | 2.0 | 2.2 | 2.4 |
| 3653 | 50% | 44% | 6% | 0.8 to 3 | 1.8 to 2.8 | 2.0 | 2.2 | 2.4 |
| 3654 | 51% | 43% | 6% | 0.8 to 3 | 1.8 to 2.8 | 2.0 | 2.2 | 2.4 |
| 3655 | 52% | 42% | 6% | 0.8 to 3 | 1.8 to 2.8 | 2.0 | 2.2 | 2.4 |
| 3656 | 53% | 41% | 6% | 0.8 to 3 | 1.8 to 2.8 | 2.0 | 2.2 | 2.4 |
| 3657 | 54% | 40% | 6% | 0.8 to 3 | 1.8 to 2.8 | 2.0 | 2.2 | 2.4 |
| 3658 | 55% | 39% | 6% | 0.8 to 3 | 1.8 to 2.8 | 2.0 | 2.2 | 2.4 |
| 3659 | 56% | 38% | 6% | 0.8 to 3 | 1.8 to 2.8 | 2.0 | 2.2 | 2.4 |
| 3660 | 57% | 37% | 6% | 0.8 to 3 | 1.8 to 2.8 | 2.0 | 2.2 | 2.4 |
| 3661 | 58% | 36% | 6% | 0.8 to 3 | 1.8 to 2.8 | 2.0 | 2.2 | 2.4 |
| 3662 | 59% | 35% | 6% | 0.8 to 3 | 1.8 to 2.8 | 2.0 | 2.2 | 2.4 |
| 3663 | 60% | 34% | 6% | 0.8 to 3 | 1.8 to 2.8 | 2.0 | 2.2 | 2.4 |
| 3664 | 30% | 63.5% | 6.5% | 0.8 to 3 | 1.8 to 2.8 | 2.0 | 2.2 | 2.4 |
| 3665 | 31% | 62.5% | 6.5% | 0.8 to 3 | 1.8 to 2.8 | 2.0 | 2.2 | 2.4 |
| 3666 | 32% | 61.5% | 6.5% | 0.8 to 3 | 1.8 to 2.8 | 2.0 | 2.2 | 2.4 |
| 3667 | 33% | 60.5% | 6.5% | 0.8 to 3 | 1.8 to 2.8 | 2.0 | 2.2 | 2.4 |
| 3668 | 34% | 59.5% | 6.5% | 0.8 to 3 | 1.8 to 2.8 | 2.0 | 2.2 | 2.4 |
| 3669 | 35% | 58.5% | 6.5% | 0.8 to 3 | 1.8 to 2.8 | 2.0 | 2.2 | 2.4 |
| 3670 | 36% | 57.5% | 6.5% | 0.8 to 3 | 1.8 to 2.8 | 2.0 | 2.2 | 2.4 |
| 3671 | 37% | 56.5% | 6.5% | 0.8 to 3 | 1.8 to 2.8 | 2.0 | 2.2 | 2.4 |
| 3672 | 38% | 55.5% | 6.5% | 0.8 to 3 | 1.8 to 2.8 | 2.0 | 2.2 | 2.4 |
| 3673 | 39% | 54.5% | 6.5% | 0.8 to 3 | 1.8 to 2.8 | 2.0 | 2.2 | 2.4 |
| 3674 | 40% | 53.5% | 6.5% | 0.8 to 3 | 1.8 to 2.8 | 2.0 | 2.2 | 2.4 |
| 3675 | 41% | 52.5% | 6.5% | 0.8 to 3 | 1.8 to 2.8 | 2.0 | 2.2 | 2.4 |
| 3676 | 42% | 51.5% | 6.5% | 0.8 to 3 | 1.8 to 2.8 | 2.0 | 2.2 | 2.4 |
| 3677 | 43% | 50.5% | 6.5% | 0.8 to 3 | 1.8 to 2.8 | 2.0 | 2.2 | 2.4 |
| 3678 | 44% | 49.5% | 6.5% | 0.8 to 3 | 1.8 to 2.8 | 2.0 | 2.2 | 2.4 |
| 3679 | 45% | 48.5% | 6.5% | 0.8 to 3 | 1.8 to 2.8 | 2.0 | 2.2 | 2.4 |
| 3680 | 46% | 47.5% | 6.5% | 0.8 to 3 | 1.8 to 2.8 | 2.0 | 2.2 | 2.4 |
| 3681 | 47% | 46.5% | 6.5% | 0.8 to 3 | 1.8 to 2.8 | 2.0 | 2.2 | 2.4 |
| 3682 | 48% | 45.5% | 6.5% | 0.8 to 3 | 1.8 to 2.8 | 2.0 | 2.2 | 2.4 |
| 3683 | 49% | 44.5% | 6.5% | 0.8 to 3 | 1.8 to 2.8 | 2.0 | 2.2 | 2.4 |
| 3684 | 50% | 43.5% | 6.5% | 0.8 to 3 | 1.8 to 2.8 | 2.0 | 2.2 | 2.4 |
| 3685 | 51% | 42.5% | 6.5% | 0.8 to 3 | 1.8 to 2.8 | 2.0 | 2.2 | 2.4 |
| 3686 | 52% | 41.5% | 6.5% | 0.8 to 3 | 1.8 to 2.8 | 2.0 | 2.2 | 2.4 |
| 3687 | 53% | 40.5% | 6.5% | 0.8 to 3 | 1.8 to 2.8 | 2.0 | 2.2 | 2.4 |
| 3688 | 54% | 39.5% | 6.5% | 0.8 to 3 | 1.8 to 2.8 | 2.0 | 2.2 | 2.4 |
| 3689 | 55% | 38.5% | 6.5% | 0.8 to 3 | 1.8 to 2.8 | 2.0 | 2.2 | 2.4 |
| 3690 | 56% | 37.5% | 6.5% | 0.8 to 3 | 1.8 to 2.8 | 2.0 | 2.2 | 2.4 |
| 3691 | 57% | 36.5% | 6.5% | 0.8 to 3 | 1.8 to 2.8 | 2.0 | 2.2 | 2.4 |
| 3692 | 58% | 35.5% | 6.5% | 0.8 to 3 | 1.8 to 2.8 | 2.0 | 2.2 | 2.4 |
| 3693 | 59% | 34.5% | 6.5% | 0.8 to 3 | 1.8 to 2.8 | 2.0 | 2.2 | 2.4 |
| 3694 | 60% | 33.5% | 6.5% | 0.8 to 3 | 1.8 to 2.8 | 2.0 | 2.2 | 2.4 |
| 3695 | 30% | 63% | 7% | 0.8 to 3 | 1.8 to 2.8 | 2.0 | 2.2 | 2.4 |
| 3696 | 31% | 62% | 7% | 0.8 to 3 | 1.8 to 2.8 | 2.0 | 2.2 | 2.4 |
| 3697 | 32% | 61% | 7% | 0.8 to 3 | 1.8 to 2.8 | 2.0 | 2.2 | 2.4 |
| 3698 | 33% | 60% | 7% | 0.8 to 3 | 1.8 to 2.8 | 2.0 | 2.2 | 2.4 |
| 3699 | 34% | 59% | 7% | 0.8 to 3 | 1.8 to 2.8 | 2.0 | 2.2 | 2.4 |
| 3700 | 35% | 58% | 7% | 0.8 to 3 | 1.8 to 2.8 | 2.0 | 2.2 | 2.4 |
| 3701 | 36% | 57% | 7% | 0.8 to 3 | 1.8 to 2.8 | 2.0 | 2.2 | 2.4 |
| 3702 | 37% | 56% | 7% | 0.8 to 3 | 1.8 to 2.8 | 2.0 | 2.2 | 2.4 |
| 3703 | 38% | 55% | 7% | 0.8 to 3 | 1.8 to 2.8 | 2.0 | 2.2 | 2.4 |
| 3704 | 39% | 54% | 7% | 0.8 to 3 | 1.8 to 2.8 | 2.0 | 2.2 | 2.4 |
| 3705 | 40% | 53% | 7% | 0.8 to 3 | 1.8 to 2.8 | 2.0 | 2.2 | 2.4 |
| 3706 | 41% | 52% | 7% | 0.8 to 3 | 1.8 to 2.8 | 2.0 | 2.2 | 2.4 |
| 3707 | 42% | 51% | 7% | 0.8 to 3 | 1.8 to 2.8 | 2.0 | 2.2 | 2.4 |
| 3708 | 43% | 50% | 7% | 0.8 to 3 | 1.8 to 2.8 | 2.0 | 2.2 | 2.4 |
| 3709 | 44% | 49% | 7% | 0.8 to 3 | 1.8 to 2.8 | 2.0 | 2.2 | 2.4 |
| 3710 | 45% | 48% | 7% | 0.8 to 3 | 1.8 to 2.8 | 2.0 | 2.2 | 2.4 |

TABLE 8-continued

<table>
<tr><th colspan="8">Alkyl Ether Sulfate</th></tr>
<tr><th></th><th>Alkyl Sulfate Alkyl Chain Length, Wt. Percentage</th><th></th><th>Alkyl Chain Length, Wt. %</th><th colspan="5">Average mol. EO (Alternatives for each numbered species)</th></tr>
<tr><th>Species</th><th>8 to 10</th><th>9 to 11</th><th>8 to 10</th><th>Range A</th><th>Range B</th><th>Species C</th><th>Species D</th><th>Species E</th></tr>
<tr><td>3711</td><td>46%</td><td>47%</td><td>7%</td><td>0.8 to 3</td><td>1.8 to 2.8</td><td>2.0</td><td>2.2</td><td>2.4</td></tr>
<tr><td>3712</td><td>47%</td><td>46%</td><td>7%</td><td>0.8 to 3</td><td>1.8 to 2.8</td><td>2.0</td><td>2.2</td><td>2.4</td></tr>
<tr><td>3713</td><td>48%</td><td>45%</td><td>7%</td><td>0.8 to 3</td><td>1.8 to 2.8</td><td>2.0</td><td>2.2</td><td>2.4</td></tr>
<tr><td>3714</td><td>49%</td><td>44%</td><td>7%</td><td>0.8 to 3</td><td>1.8 to 2.8</td><td>2.0</td><td>2.2</td><td>2.4</td></tr>
<tr><td>3715</td><td>50%</td><td>43%</td><td>7%</td><td>0.8 to 3</td><td>1.8 to 2.8</td><td>2.0</td><td>2.2</td><td>2.4</td></tr>
<tr><td>3716</td><td>51%</td><td>42%</td><td>7%</td><td>0.8 to 3</td><td>1.8 to 2.8</td><td>2.0</td><td>2.2</td><td>2.4</td></tr>
<tr><td>3717</td><td>52%</td><td>41%</td><td>7%</td><td>0.8 to 3</td><td>1.8 to 2.8</td><td>2.0</td><td>2.2</td><td>2.4</td></tr>
<tr><td>3718</td><td>53%</td><td>40%</td><td>7%</td><td>0.8 to 3</td><td>1.8 to 2.8</td><td>2.0</td><td>2.2</td><td>2.4</td></tr>
<tr><td>3719</td><td>54%</td><td>39%</td><td>7%</td><td>0.8 to 3</td><td>1.8 to 2.8</td><td>2.0</td><td>2.2</td><td>2.4</td></tr>
<tr><td>3720</td><td>55%</td><td>38%</td><td>7%</td><td>0.8 to 3</td><td>1.8 to 2.8</td><td>2.0</td><td>2.2</td><td>2.4</td></tr>
<tr><td>3721</td><td>56%</td><td>37%</td><td>7%</td><td>0.8 to 3</td><td>1.8 to 2.8</td><td>2.0</td><td>2.2</td><td>2.4</td></tr>
<tr><td>3722</td><td>57%</td><td>36%</td><td>7%</td><td>0.8 to 3</td><td>1.8 to 2.8</td><td>2.0</td><td>2.2</td><td>2.4</td></tr>
<tr><td>3723</td><td>58%</td><td>35%</td><td>7%</td><td>0.8 to 3</td><td>1.8 to 2.8</td><td>2.0</td><td>2.2</td><td>2.4</td></tr>
<tr><td>3724</td><td>59%</td><td>34%</td><td>7%</td><td>0.8 to 3</td><td>1.8 to 2.8</td><td>2.0</td><td>2.2</td><td>2.4</td></tr>
<tr><td>3725</td><td>60%</td><td>33%</td><td>7%</td><td>0.8 to 3</td><td>1.8 to 2.8</td><td>2.0</td><td>2.2</td><td>2.4</td></tr>
</table>

TABLE 9

<table>
<tr><th colspan="8">Alkyl Ether Sulfate</th></tr>
<tr><th></th><th>Alkyl Sulfate Alkyl Chain Length, Wt. %</th><th></th><th>Alkyl Chain Length, Wt. %</th><th colspan="5">Average mol. EO (Alternatives for each numbered species)</th></tr>
<tr><th>Species</th><th>9 to 11</th><th>10 to 12</th><th>8 to 10</th><th>Range A</th><th>Range B</th><th>Species C</th><th>Species D</th><th>Species E</th></tr>
<tr><td>3726</td><td>30%</td><td>70%</td><td>0%</td><td>0.8 to 3</td><td>1.8 to 2.8</td><td>2.0</td><td>2.2</td><td>2.4</td></tr>
<tr><td>3727</td><td>31%</td><td>69%</td><td>0%</td><td>0.8 to 3</td><td>1.8 to 2.8</td><td>2.0</td><td>2.2</td><td>2.4</td></tr>
<tr><td>3728</td><td>32%</td><td>68%</td><td>0%</td><td>0.8 to 3</td><td>1.8 to 2.8</td><td>2.0</td><td>2.2</td><td>2.4</td></tr>
<tr><td>3729</td><td>33%</td><td>67%</td><td>0%</td><td>0.8 to 3</td><td>1.8 to 2.8</td><td>2.0</td><td>2.2</td><td>2.4</td></tr>
<tr><td>3730</td><td>34%</td><td>66%</td><td>0%</td><td>0.8 to 3</td><td>1.8 to 2.8</td><td>2.0</td><td>2.2</td><td>2.4</td></tr>
<tr><td>3731</td><td>35%</td><td>65%</td><td>0%</td><td>0.8 to 3</td><td>1.8 to 2.8</td><td>2.0</td><td>2.2</td><td>2.4</td></tr>
<tr><td>3732</td><td>36%</td><td>64%</td><td>0%</td><td>0.8 to 3</td><td>1.8 to 2.8</td><td>2.0</td><td>2.2</td><td>2.4</td></tr>
<tr><td>3733</td><td>37%</td><td>63%</td><td>0%</td><td>0.8 to 3</td><td>1.8 to 2.8</td><td>2.0</td><td>2.2</td><td>2.4</td></tr>
<tr><td>3734</td><td>38%</td><td>62%</td><td>0%</td><td>0.8 to 3</td><td>1.8 to 2.8</td><td>2.0</td><td>2.2</td><td>2.4</td></tr>
<tr><td>3735</td><td>39%</td><td>61%</td><td>0%</td><td>0.8 to 3</td><td>1.8 to 2.8</td><td>2.0</td><td>2.2</td><td>2.4</td></tr>
<tr><td>3736</td><td>40%</td><td>60%</td><td>0%</td><td>0.8 to 3</td><td>1.8 to 2.8</td><td>2.0</td><td>2.2</td><td>2.4</td></tr>
<tr><td>3737</td><td>41%</td><td>59%</td><td>0%</td><td>0.8 to 3</td><td>1.8 to 2.8</td><td>2.0</td><td>2.2</td><td>2.4</td></tr>
<tr><td>3738</td><td>42%</td><td>58%</td><td>0%</td><td>0.8 to 3</td><td>1.8 to 2.8</td><td>2.0</td><td>2.2</td><td>2.4</td></tr>
<tr><td>3739</td><td>43%</td><td>57%</td><td>0%</td><td>0.8 to 3</td><td>1.8 to 2.8</td><td>2.0</td><td>2.2</td><td>2.4</td></tr>
<tr><td>3740</td><td>44%</td><td>56%</td><td>0%</td><td>0.8 to 3</td><td>1.8 to 2.8</td><td>2.0</td><td>2.2</td><td>2.4</td></tr>
<tr><td>3741</td><td>45%</td><td>55%</td><td>0%</td><td>0.8 to 3</td><td>1.8 to 2.8</td><td>2.0</td><td>2.2</td><td>2.4</td></tr>
<tr><td>3742</td><td>46%</td><td>54%</td><td>0%</td><td>0.8 to 3</td><td>1.8 to 2.8</td><td>2.0</td><td>2.2</td><td>2.4</td></tr>
<tr><td>3743</td><td>47%</td><td>53%</td><td>0%</td><td>0.8 to 3</td><td>1.8 to 2.8</td><td>2.0</td><td>2.2</td><td>2.4</td></tr>
<tr><td>3744</td><td>48%</td><td>52%</td><td>0%</td><td>0.8 to 3</td><td>1.8 to 2.8</td><td>2.0</td><td>2.2</td><td>2.4</td></tr>
<tr><td>3745</td><td>49%</td><td>51%</td><td>0%</td><td>0.8 to 3</td><td>1.8 to 2.8</td><td>2.0</td><td>2.2</td><td>2.4</td></tr>
<tr><td>3746</td><td>50%</td><td>50%</td><td>0%</td><td>0.8 to 3</td><td>1.8 to 2.8</td><td>2.0</td><td>2.2</td><td>2.4</td></tr>
<tr><td>3747</td><td>51%</td><td>49%</td><td>0%</td><td>0.8 to 3</td><td>1.8 to 2.8</td><td>2.0</td><td>2.2</td><td>2.4</td></tr>
<tr><td>3748</td><td>52%</td><td>48%</td><td>0%</td><td>0.8 to 3</td><td>1.8 to 2.8</td><td>2.0</td><td>2.2</td><td>2.4</td></tr>
<tr><td>3749</td><td>53%</td><td>47%</td><td>0%</td><td>0.8 to 3</td><td>1.8 to 2.8</td><td>2.0</td><td>2.2</td><td>2.4</td></tr>
<tr><td>3750</td><td>54%</td><td>46%</td><td>0%</td><td>0.8 to 3</td><td>1.8 to 2.8</td><td>2.0</td><td>2.2</td><td>2.4</td></tr>
<tr><td>3751</td><td>55%</td><td>45%</td><td>0%</td><td>0.8 to 3</td><td>1.8 to 2.8</td><td>2.0</td><td>2.2</td><td>2.4</td></tr>
<tr><td>3752</td><td>56%</td><td>44%</td><td>0%</td><td>0.8 to 3</td><td>1.8 to 2.8</td><td>2.0</td><td>2.2</td><td>2.4</td></tr>
<tr><td>3753</td><td>57%</td><td>43%</td><td>0%</td><td>0.8 to 3</td><td>1.8 to 2.8</td><td>2.0</td><td>2.2</td><td>2.4</td></tr>
<tr><td>3754</td><td>58%</td><td>42%</td><td>0%</td><td>0.8 to 3</td><td>1.8 to 2.8</td><td>2.0</td><td>2.2</td><td>2.4</td></tr>
<tr><td>3755</td><td>59%</td><td>41%</td><td>0%</td><td>0.8 to 3</td><td>1.8 to 2.8</td><td>2.0</td><td>2.2</td><td>2.4</td></tr>
<tr><td>3756</td><td>60%</td><td>40%</td><td>0%</td><td>0.8 to 3</td><td>1.8 to 2.8</td><td>2.0</td><td>2.2</td><td>2.4</td></tr>
<tr><td>3757</td><td>30%</td><td>69.5%</td><td>0.5%</td><td>0.8 to 3</td><td>1.8 to 2.8</td><td>2.0</td><td>2.2</td><td>2.4</td></tr>
<tr><td>3758</td><td>31%</td><td>68.5%</td><td>0.5%</td><td>0.8 to 3</td><td>1.8 to 2.8</td><td>2.0</td><td>2.2</td><td>2.4</td></tr>
<tr><td>3759</td><td>32%</td><td>67.5%</td><td>0.5%</td><td>0.8 to 3</td><td>1.8 to 2.8</td><td>2.0</td><td>2.2</td><td>2.4</td></tr>
<tr><td>3760</td><td>33%</td><td>66.5%</td><td>0.5%</td><td>0.8 to 3</td><td>1.8 to 2.8</td><td>2.0</td><td>2.2</td><td>2.4</td></tr>
<tr><td>3761</td><td>34%</td><td>65.5%</td><td>0.5%</td><td>0.8 to 3</td><td>1.8 to 2.8</td><td>2.0</td><td>2.2</td><td>2.4</td></tr>
<tr><td>3762</td><td>35%</td><td>64.5%</td><td>0.5%</td><td>0.8 to 3</td><td>1.8 to 2.8</td><td>2.0</td><td>2.2</td><td>2.4</td></tr>
<tr><td>3763</td><td>36%</td><td>63.5%</td><td>0.5%</td><td>0.8 to 3</td><td>1.8 to 2.8</td><td>2.0</td><td>2.2</td><td>2.4</td></tr>
<tr><td>3764</td><td>37%</td><td>62.5%</td><td>0.5%</td><td>0.8 to 3</td><td>1.8 to 2.8</td><td>2.0</td><td>2.2</td><td>2.4</td></tr>
</table>

TABLE 9-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 9 to 11 | 10 to 12 | 8 to 10 | Range A | Range B | Species C | Species D | Species E |
| 3765 | 38% | 61.5% | 0.5% | 0.8 to 3 | 1.8 to 2.8 | 2.0 | 2.2 | 2.4 |
| 3766 | 39% | 60.5% | 0.5% | 0.8 to 3 | 1.8 to 2.8 | 2.0 | 2.2 | 2.4 |
| 3767 | 40% | 59.5% | 0.5% | 0.8 to 3 | 1.8 to 2.8 | 2.0 | 2.2 | 2.4 |
| 3768 | 41% | 58.5% | 0.5% | 0.8 to 3 | 1.8 to 2.8 | 2.0 | 2.2 | 2.4 |
| 3769 | 42% | 57.5% | 0.5% | 0.8 to 3 | 1.8 to 2.8 | 2.0 | 2.2 | 2.4 |
| 3770 | 43% | 56.5% | 0.5% | 0.8 to 3 | 1.8 to 2.8 | 2.0 | 2.2 | 2.4 |
| 3771 | 44% | 55.5% | 0.5% | 0.8 to 3 | 1.8 to 2.8 | 2.0 | 2.2 | 2.4 |
| 3772 | 45% | 54.5% | 0.5% | 0.8 to 3 | 1.8 to 2.8 | 2.0 | 2.2 | 2.4 |
| 3773 | 46% | 53.5% | 0.5% | 0.8 to 3 | 1.8 to 2.8 | 2.0 | 2.2 | 2.4 |
| 3774 | 47% | 52.5% | 0.5% | 0.8 to 3 | 1.8 to 2.8 | 2.0 | 2.2 | 2.4 |
| 3775 | 48% | 51.5% | 0.5% | 0.8 to 3 | 1.8 to 2.8 | 2.0 | 2.2 | 2.4 |
| 3776 | 49% | 50.5% | 0.5% | 0.8 to 3 | 1.8 to 2.8 | 2.0 | 2.2 | 2.4 |
| 3777 | 50% | 49.5% | 0.5% | 0.8 to 3 | 1.8 to 2.8 | 2.0 | 2.2 | 2.4 |
| 3778 | 51% | 48.5% | 0.5% | 0.8 to 3 | 1.8 to 2.8 | 2.0 | 2.2 | 2.4 |
| 3779 | 52% | 47.5% | 0.5% | 0.8 to 3 | 1.8 to 2.8 | 2.0 | 2.2 | 2.4 |
| 3780 | 53% | 46.5% | 0.5% | 0.8 to 3 | 1.8 to 2.8 | 2.0 | 2.2 | 2.4 |
| 3781 | 54% | 45.5% | 0.5% | 0.8 to 3 | 1.8 to 2.8 | 2.0 | 2.2 | 2.4 |
| 3782 | 55% | 44.5% | 0.5% | 0.8 to 3 | 1.8 to 2.8 | 2.0 | 2.2 | 2.4 |
| 3783 | 56% | 43.5% | 0.5% | 0.8 to 3 | 1.8 to 2.8 | 2.0 | 2.2 | 2.4 |
| 3784 | 57% | 42.5% | 0.5% | 0.8 to 3 | 1.8 to 2.8 | 2.0 | 2.2 | 2.4 |
| 3785 | 58% | 41.5% | 0.5% | 0.8 to 3 | 1.8 to 2.8 | 2.0 | 2.2 | 2.4 |
| 3786 | 59% | 40.5% | 0.5% | 0.8 to 3 | 1.8 to 2.8 | 2.0 | 2.2 | 2.4 |
| 3787 | 60% | 39.5% | 0.5% | 0.8 to 3 | 1.8 to 2.8 | 2.0 | 2.2 | 2.4 |
| 3788 | 30% | 69% | 1% | 0.8 to 3 | 1.8 to 2.8 | 2.0 | 2.2 | 2.4 |
| 3789 | 31% | 68% | 1% | 0.8 to 3 | 1.8 to 2.8 | 2.0 | 2.2 | 2.4 |
| 3790 | 32% | 67% | 1% | 0.8 to 3 | 1.8 to 2.8 | 2.0 | 2.2 | 2.4 |
| 3791 | 33% | 66% | 1% | 0.8 to 3 | 1.8 to 2.8 | 2.0 | 2.2 | 2.4 |
| 3792 | 34% | 65% | 1% | 0.8 to 3 | 1.8 to 2.8 | 2.0 | 2.2 | 2.4 |
| 3793 | 35% | 64% | 1% | 0.8 to 3 | 1.8 to 2.8 | 2.0 | 2.2 | 2.4 |
| 3794 | 36% | 63% | 1% | 0.8 to 3 | 1.8 to 2.8 | 2.0 | 2.2 | 2.4 |
| 3795 | 37% | 62% | 1% | 0.8 to 3 | 1.8 to 2.8 | 2.0 | 2.2 | 2.4 |
| 3796 | 38% | 61% | 1% | 0.8 to 3 | 1.8 to 2.8 | 2.0 | 2.2 | 2.4 |
| 3797 | 39% | 60% | 1% | 0.8 to 3 | 1.8 to 2.8 | 2.0 | 2.2 | 2.4 |
| 3798 | 40% | 59% | 1% | 0.8 to 3 | 1.8 to 2.8 | 2.0 | 2.2 | 2.4 |
| 3799 | 41% | 58% | 1% | 0.8 to 3 | 1.8 to 2.8 | 2.0 | 2.2 | 2.4 |
| 3800 | 42% | 57% | 1% | 0.8 to 3 | 1.8 to 2.8 | 2.0 | 2.2 | 2.4 |
| 3801 | 43% | 56% | 1% | 0.8 to 3 | 1.8 to 2.8 | 2.0 | 2.2 | 2.4 |
| 3802 | 44% | 55% | 1% | 0.8 to 3 | 1.8 to 2.8 | 2.0 | 2.2 | 2.4 |
| 3803 | 45% | 54% | 1% | 0.8 to 3 | 1.8 to 2.8 | 2.0 | 2.2 | 2.4 |
| 3804 | 46% | 53% | 1% | 0.8 to 3 | 1.8 to 2.8 | 2.0 | 2.2 | 2.4 |
| 3805 | 47% | 52% | 1% | 0.8 to 3 | 1.8 to 2.8 | 2.0 | 2.2 | 2.4 |
| 3806 | 48% | 51% | 1% | 0.8 to 3 | 1.8 to 2.8 | 2.0 | 2.2 | 2.4 |
| 3807 | 49% | 50% | 1% | 0.8 to 3 | 1.8 to 2.8 | 2.0 | 2.2 | 2.4 |
| 3808 | 50% | 49% | 1% | 0.8 to 3 | 1.8 to 2.8 | 2.0 | 2.2 | 2.4 |
| 3809 | 51% | 48% | 1% | 0.8 to 3 | 1.8 to 2.8 | 2.0 | 2.2 | 2.4 |
| 3810 | 52% | 47% | 1% | 0.8 to 3 | 1.8 to 2.8 | 2.0 | 2.2 | 2.4 |
| 3811 | 53% | 46% | 1% | 0.8 to 3 | 1.8 to 2.8 | 2.0 | 2.2 | 2.4 |
| 3812 | 54% | 45% | 1% | 0.8 to 3 | 1.8 to 2.8 | 2.0 | 2.2 | 2.4 |
| 3813 | 55% | 44% | 1% | 0.8 to 3 | 1.8 to 2.8 | 2.0 | 2.2 | 2.4 |
| 3814 | 56% | 43% | 1% | 0.8 to 3 | 1.8 to 2.8 | 2.0 | 2.2 | 2.4 |
| 3815 | 57% | 42% | 1% | 0.8 to 3 | 1.8 to 2.8 | 2.0 | 2.2 | 2.4 |
| 3816 | 58% | 41% | 1% | 0.8 to 3 | 1.8 to 2.8 | 2.0 | 2.2 | 2.4 |
| 3817 | 59% | 40% | 1% | 0.8 to 3 | 1.8 to 2.8 | 2.0 | 2.2 | 2.4 |
| 3818 | 60% | 39% | 1% | 0.8 to 3 | 1.8 to 2.8 | 2.0 | 2.2 | 2.4 |
| 3819 | 30% | 68.5% | 1.5% | 0.8 to 3 | 1.8 to 2.8 | 2.0 | 2.2 | 2.4 |
| 3820 | 31% | 67.5% | 1.5% | 0.8 to 3 | 1.8 to 2.8 | 2.0 | 2.2 | 2.4 |
| 3821 | 32% | 66.5% | 1.5% | 0.8 to 3 | 1.8 to 2.8 | 2.0 | 2.2 | 2.4 |
| 3822 | 33% | 65.5% | 1.5% | 0.8 to 3 | 1.8 to 2.8 | 2.0 | 2.2 | 2.4 |
| 3823 | 34% | 64.5% | 1.5% | 0.8 to 3 | 1.8 to 2.8 | 2.0 | 2.2 | 2.4 |
| 3824 | 35% | 63.5% | 1.5% | 0.8 to 3 | 1.8 to 2.8 | 2.0 | 2.2 | 2.4 |
| 3825 | 36% | 62.5% | 1.5% | 0.8 to 3 | 1.8 to 2.8 | 2.0 | 2.2 | 2.4 |
| 3826 | 37% | 61.5% | 1.5% | 0.8 to 3 | 1.8 to 2.8 | 2.0 | 2.2 | 2.4 |
| 3827 | 38% | 60.5% | 1.5% | 0.8 to 3 | 1.8 to 2.8 | 2.0 | 2.2 | 2.4 |
| 3828 | 39% | 59.5% | 1.5% | 0.8 to 3 | 1.8 to 2.8 | 2.0 | 2.2 | 2.4 |
| 3829 | 40% | 58.5% | 1.5% | 0.8 to 3 | 1.8 to 2.8 | 2.0 | 2.2 | 2.4 |
| 3830 | 41% | 57.5% | 1.5% | 0.8 to 3 | 1.8 to 2.8 | 2.0 | 2.2 | 2.4 |
| 3831 | 42% | 56.5% | 1.5% | 0.8 to 3 | 1.8 to 2.8 | 2.0 | 2.2 | 2.4 |
| 3832 | 43% | 55.5% | 1.5% | 0.8 to 3 | 1.8 to 2.8 | 2.0 | 2.2 | 2.4 |
| 3833 | 44% | 54.5% | 1.5% | 0.8 to 3 | 1.8 to 2.8 | 2.0 | 2.2 | 2.4 |
| 3834 | 45% | 53.5% | 1.5% | 0.8 to 3 | 1.8 to 2.8 | 2.0 | 2.2 | 2.4 |

TABLE 9-continued

| | Alkyl Sulfate Alkyl Chain Length, Wt. % | | Alkyl Chain Length, Wt. % | Alkyl Ether Sulfate | | | | |
| | | | | Average mol. EO (Alternatives for each numbered species) | | | | |
| Species | 9 to 11 | 10 to 12 | 8 to 10 | Range A | Range B | Species C | Species D | Species E |
|---|---|---|---|---|---|---|---|---|
| 3835 | 46% | 52.5% | 1.5% | 0.8 to 3 | 1.8 to 2.8 | 2.0 | 2.2 | 2.4 |
| 3836 | 47% | 51.5% | 1.5% | 0.8 to 3 | 1.8 to 2.8 | 2.0 | 2.2 | 2.4 |
| 3837 | 48% | 50.5% | 1.5% | 0.8 to 3 | 1.8 to 2.8 | 2.0 | 2.2 | 2.4 |
| 3838 | 49% | 49.5% | 1.5% | 0.8 to 3 | 1.8 to 2.8 | 2.0 | 2.2 | 2.4 |
| 3839 | 50% | 48.5% | 1.5% | 0.8 to 3 | 1.8 to 2.8 | 2.0 | 2.2 | 2.4 |
| 3840 | 51% | 47.5% | 1.5% | 0.8 to 3 | 1.8 to 2.8 | 2.0 | 2.2 | 2.4 |
| 3841 | 52% | 46.5% | 1.5% | 0.8 to 3 | 1.8 to 2.8 | 2.0 | 2.2 | 2.4 |
| 3842 | 53% | 45.5% | 1.5% | 0.8 to 3 | 1.8 to 2.8 | 2.0 | 2.2 | 2.4 |
| 3843 | 54% | 44.5% | 1.5% | 0.8 to 3 | 1.8 to 2.8 | 2.0 | 2.2 | 2.4 |
| 3844 | 55% | 43.5% | 1.5% | 0.8 to 3 | 1.8 to 2.8 | 2.0 | 2.2 | 2.4 |
| 3845 | 56% | 42.5% | 1.5% | 0.8 to 3 | 1.8 to 2.8 | 2.0 | 2.2 | 2.4 |
| 3846 | 57% | 41.5% | 1.5% | 0.8 to 3 | 1.8 to 2.8 | 2.0 | 2.2 | 2.4 |
| 3847 | 58% | 40.5% | 1.5% | 0.8 to 3 | 1.8 to 2.8 | 2.0 | 2.2 | 2.4 |
| 3848 | 59% | 39.5% | 1.5% | 0.8 to 3 | 1.8 to 2.8 | 2.0 | 2.2 | 2.4 |
| 3849 | 60% | 38.5% | 1.5% | 0.8 to 3 | 1.8 to 2.8 | 2.0 | 2.2 | 2.4 |
| 3850 | 30% | 68% | 2% | 0.8 to 3 | 1.8 to 2.8 | 2.0 | 2.2 | 2.4 |
| 3851 | 31% | 67% | 2% | 0.8 to 3 | 1.8 to 2.8 | 2.0 | 2.2 | 2.4 |
| 3852 | 32% | 66% | 2% | 0.8 to 3 | 1.8 to 2.8 | 2.0 | 2.2 | 2.4 |
| 3853 | 33% | 65% | 2% | 0.8 to 3 | 1.8 to 2.8 | 2.0 | 2.2 | 2.4 |
| 3854 | 34% | 64% | 2% | 0.8 to 3 | 1.8 to 2.8 | 2.0 | 2.2 | 2.4 |
| 3855 | 35% | 63% | 2% | 0.8 to 3 | 1.8 to 2.8 | 2.0 | 2.2 | 2.4 |
| 3856 | 36% | 62% | 2% | 0.8 to 3 | 1.8 to 2.8 | 2.0 | 2.2 | 2.4 |
| 3857 | 37% | 61% | 2% | 0.8 to 3 | 1.8 to 2.8 | 2.0 | 2.2 | 2.4 |
| 3858 | 38% | 60% | 2% | 0.8 to 3 | 1.8 to 2.8 | 2.0 | 2.2 | 2.4 |
| 3859 | 39% | 59% | 2% | 0.8 to 3 | 1.8 to 2.8 | 2.0 | 2.2 | 2.4 |
| 3860 | 40% | 58% | 2% | 0.8 to 3 | 1.8 to 2.8 | 2.0 | 2.2 | 2.4 |
| 3861 | 41% | 57% | 2% | 0.8 to 3 | 1.8 to 2.8 | 2.0 | 2.2 | 2.4 |
| 3862 | 42% | 56% | 2% | 0.8 to 3 | 1.8 to 2.8 | 2.0 | 2.2 | 2.4 |
| 3863 | 43% | 55% | 2% | 0.8 to 3 | 1.8 to 2.8 | 2.0 | 2.2 | 2.4 |
| 3864 | 44% | 54% | 2% | 0.8 to 3 | 1.8 to 2.8 | 2.0 | 2.2 | 2.4 |
| 3865 | 45% | 53% | 2% | 0.8 to 3 | 1.8 to 2.8 | 2.0 | 2.2 | 2.4 |
| 3866 | 46% | 52% | 2% | 0.8 to 3 | 1.8 to 2.8 | 2.0 | 2.2 | 2.4 |
| 3867 | 47% | 51% | 2% | 0.8 to 3 | 1.8 to 2.8 | 2.0 | 2.2 | 2.4 |
| 3868 | 48% | 50% | 2% | 0.8 to 3 | 1.8 to 2.8 | 2.0 | 2.2 | 2.4 |
| 3869 | 49% | 49% | 2% | 0.8 to 3 | 1.8 to 2.8 | 2.0 | 2.2 | 2.4 |
| 3870 | 50% | 48% | 2% | 0.8 to 3 | 1.8 to 2.8 | 2.0 | 2.2 | 2.4 |
| 3871 | 51% | 47% | 2% | 0.8 to 3 | 1.8 to 2.8 | 2.0 | 2.2 | 2.4 |
| 3872 | 52% | 46% | 2% | 0.8 to 3 | 1.8 to 2.8 | 2.0 | 2.2 | 2.4 |
| 3873 | 53% | 45% | 2% | 0.8 to 3 | 1.8 to 2.8 | 2.0 | 2.2 | 2.4 |
| 3874 | 54% | 44% | 2% | 0.8 to 3 | 1.8 to 2.8 | 2.0 | 2.2 | 2.4 |
| 3875 | 55% | 43% | 2% | 0.8 to 3 | 1.8 to 2.8 | 2.0 | 2.2 | 2.4 |
| 3876 | 56% | 42% | 2% | 0.8 to 3 | 1.8 to 2.8 | 2.0 | 2.2 | 2.4 |
| 3877 | 57% | 41% | 2% | 0.8 to 3 | 1.8 to 2.8 | 2.0 | 2.2 | 2.4 |
| 3878 | 58% | 40% | 2% | 0.8 to 3 | 1.8 to 2.8 | 2.0 | 2.2 | 2.4 |
| 3879 | 59% | 39% | 2% | 0.8 to 3 | 1.8 to 2.8 | 2.0 | 2.2 | 2.4 |
| 3880 | 60% | 38% | 2% | 0.8 to 3 | 1.8 to 2.8 | 2.0 | 2.2 | 2.4 |
| 3881 | 30% | 67.5% | 2.5% | 0.8 to 3 | 1.8 to 2.8 | 2.0 | 2.2 | 2.4 |
| 3882 | 31% | 66.5% | 2.5% | 0.8 to 3 | 1.8 to 2.8 | 2.0 | 2.2 | 2.4 |
| 3883 | 32% | 65.5% | 2.5% | 0.8 to 3 | 1.8 to 2.8 | 2.0 | 2.2 | 2.4 |
| 3884 | 33% | 64.5% | 2.5% | 0.8 to 3 | 1.8 to 2.8 | 2.0 | 2.2 | 2.4 |
| 3885 | 34% | 63.5% | 2.5% | 0.8 to 3 | 1.8 to 2.8 | 2.0 | 2.2 | 2.4 |
| 3886 | 35% | 62.5% | 2.5% | 0.8 to 3 | 1.8 to 2.8 | 2.0 | 2.2 | 2.4 |
| 3887 | 36% | 61.5% | 2.5% | 0.8 to 3 | 1.8 to 2.8 | 2.0 | 2.2 | 2.4 |
| 3888 | 37% | 60.5% | 2.5% | 0.8 to 3 | 1.8 to 2.8 | 2.0 | 2.2 | 2.4 |
| 3889 | 38% | 59.5% | 2.5% | 0.8 to 3 | 1.8 to 2.8 | 2.0 | 2.2 | 2.4 |
| 3890 | 39% | 58.5% | 2.5% | 0.8 to 3 | 1.8 to 2.8 | 2.0 | 2.2 | 2.4 |
| 3891 | 40% | 57.5% | 2.5% | 0.8 to 3 | 1.8 to 2.8 | 2.0 | 2.2 | 2.4 |
| 3892 | 41% | 56.5% | 2.5% | 0.8 to 3 | 1.8 to 2.8 | 2.0 | 2.2 | 2.4 |
| 3893 | 42% | 55.5% | 2.5% | 0.8 to 3 | 1.8 to 2.8 | 2.0 | 2.2 | 2.4 |
| 3894 | 43% | 54.5% | 2.5% | 0.8 to 3 | 1.8 to 2.8 | 2.0 | 2.2 | 2.4 |
| 3895 | 44% | 53.5% | 2.5% | 0.8 to 3 | 1.8 to 2.8 | 2.0 | 2.2 | 2.4 |
| 3896 | 45% | 52.5% | 2.5% | 0.8 to 3 | 1.8 to 2.8 | 2.0 | 2.2 | 2.4 |
| 3897 | 46% | 51.5% | 2.5% | 0.8 to 3 | 1.8 to 2.8 | 2.0 | 2.2 | 2.4 |
| 3898 | 47% | 50.5% | 2.5% | 0.8 to 3 | 1.8 to 2.8 | 2.0 | 2.2 | 2.4 |
| 3899 | 48% | 49.5% | 2.5% | 0.8 to 3 | 1.8 to 2.8 | 2.0 | 2.2 | 2.4 |
| 3900 | 49% | 48.5% | 2.5% | 0.8 to 3 | 1.8 to 2.8 | 2.0 | 2.2 | 2.4 |
| 3901 | 50% | 47.5% | 2.5% | 0.8 to 3 | 1.8 to 2.8 | 2.0 | 2.2 | 2.4 |
| 3902 | 51% | 46.5% | 2.5% | 0.8 to 3 | 1.8 to 2.8 | 2.0 | 2.2 | 2.4 |
| 3903 | 52% | 45.5% | 2.5% | 0.8 to 3 | 1.8 to 2.8 | 2.0 | 2.2 | 2.4 |
| 3904 | 53% | 44.5% | 2.5% | 0.8 to 3 | 1.8 to 2.8 | 2.0 | 2.2 | 2.4 |

TABLE 9-continued

|  | Alkyl Sulfate Alkyl Chain Length, Wt. % | | Alkyl Ether Sulfate | | | | | |
|---|---|---|---|---|---|---|---|---|
|  | | | Alkyl Chain Length, Wt. % | Average mol. EO (Alternatives for each numbered species) | | | | |
| Species | 9 to 11 | 10 to 12 | 8 to 10 | Range A | Range B | Species C | Species D | Species E |
| 3905 | 54% | 43.5% | 2.5% | 0.8 to 3 | 1.8 to 2.8 | 2.0 | 2.2 | 2.4 |
| 3906 | 55% | 42.5% | 2.5% | 0.8 to 3 | 1.8 to 2.8 | 2.0 | 2.2 | 2.4 |
| 3907 | 56% | 41.5% | 2.5% | 0.8 to 3 | 1.8 to 2.8 | 2.0 | 2.2 | 2.4 |
| 3908 | 57% | 40.5% | 2.5% | 0.8 to 3 | 1.8 to 2.8 | 2.0 | 2.2 | 2.4 |
| 3909 | 58% | 39.5% | 2.5% | 0.8 to 3 | 1.8 to 2.8 | 2.0 | 2.2 | 2.4 |
| 3910 | 59% | 38.5% | 2.5% | 0.8 to 3 | 1.8 to 2.8 | 2.0 | 2.2 | 2.4 |
| 3911 | 60% | 37.5% | 2.5% | 0.8 to 3 | 1.8 to 2.8 | 2.0 | 2.2 | 2.4 |
| 3912 | 30% | 67% | 3% | 0.8 to 3 | 1.8 to 2.8 | 2.0 | 2.2 | 2.4 |
| 3913 | 31% | 66% | 3% | 0.8 to 3 | 1.8 to 2.8 | 2.0 | 2.2 | 2.4 |
| 3914 | 32% | 65% | 3% | 0.8 to 3 | 1.8 to 2.8 | 2.0 | 2.2 | 2.4 |
| 3915 | 33% | 64% | 3% | 0.8 to 3 | 1.8 to 2.8 | 2.0 | 2.2 | 2.4 |
| 3916 | 34% | 63% | 3% | 0.8 to 3 | 1.8 to 2.8 | 2.0 | 2.2 | 2.4 |
| 3917 | 35% | 62% | 3% | 0.8 to 3 | 1.8 to 2.8 | 2.0 | 2.2 | 2.4 |
| 3918 | 36% | 61% | 3% | 0.8 to 3 | 1.8 to 2.8 | 2.0 | 2.2 | 2.4 |
| 3919 | 37% | 60% | 3% | 0.8 to 3 | 1.8 to 2.8 | 2.0 | 2.2 | 2.4 |
| 3920 | 38% | 59% | 3% | 0.8 to 3 | 1.8 to 2.8 | 2.0 | 2.2 | 2.4 |
| 3921 | 39% | 58% | 3% | 0.8 to 3 | 1.8 to 2.8 | 2.0 | 2.2 | 2.4 |
| 3922 | 40% | 57% | 3% | 0.8 to 3 | 1.8 to 2.8 | 2.0 | 2.2 | 2.4 |
| 3923 | 41% | 56% | 3% | 0.8 to 3 | 1.8 to 2.8 | 2.0 | 2.2 | 2.4 |
| 3924 | 42% | 55% | 3% | 0.8 to 3 | 1.8 to 2.8 | 2.0 | 2.2 | 2.4 |
| 3925 | 43% | 54% | 3% | 0.8 to 3 | 1.8 to 2.8 | 2.0 | 2.2 | 2.4 |
| 3926 | 44% | 53% | 3% | 0.8 to 3 | 1.8 to 2.8 | 2.0 | 2.2 | 2.4 |
| 3927 | 45% | 52% | 3% | 0.8 to 3 | 1.8 to 2.8 | 2.0 | 2.2 | 2.4 |
| 3928 | 46% | 51% | 3% | 0.8 to 3 | 1.8 to 2.8 | 2.0 | 2.2 | 2.4 |
| 3929 | 47% | 50% | 3% | 0.8 to 3 | 1.8 to 2.8 | 2.0 | 2.2 | 2.4 |
| 3930 | 48% | 49% | 3% | 0.8 to 3 | 1.8 to 2.8 | 2.0 | 2.2 | 2.4 |
| 3931 | 49% | 48% | 3% | 0.8 to 3 | 1.8 to 2.8 | 2.0 | 2.2 | 2.4 |
| 3932 | 50% | 47% | 3% | 0.8 to 3 | 1.8 to 2.8 | 2.0 | 2.2 | 2.4 |
| 3933 | 51% | 46% | 3% | 0.8 to 3 | 1.8 to 2.8 | 2.0 | 2.2 | 2.4 |
| 3934 | 52% | 45% | 3% | 0.8 to 3 | 1.8 to 2.8 | 2.0 | 2.2 | 2.4 |
| 3935 | 53% | 44% | 3% | 0.8 to 3 | 1.8 to 2.8 | 2.0 | 2.2 | 2.4 |
| 3936 | 54% | 43% | 3% | 0.8 to 3 | 1.8 to 2.8 | 2.0 | 2.2 | 2.4 |
| 3937 | 55% | 42% | 3% | 0.8 to 3 | 1.8 to 2.8 | 2.0 | 2.2 | 2.4 |
| 3938 | 56% | 41% | 3% | 0.8 to 3 | 1.8 to 2.8 | 2.0 | 2.2 | 2.4 |
| 3939 | 57% | 40% | 3% | 0.8 to 3 | 1.8 to 2.8 | 2.0 | 2.2 | 2.4 |
| 3940 | 58% | 39% | 3% | 0.8 to 3 | 1.8 to 2.8 | 2.0 | 2.2 | 2.4 |
| 3941 | 59% | 38% | 3% | 0.8 to 3 | 1.8 to 2.8 | 2.0 | 2.2 | 2.4 |
| 3942 | 60% | 37% | 3% | 0.8 to 3 | 1.8 to 2.8 | 2.0 | 2.2 | 2.4 |
| 3943 | 30% | 66.5% | 3.5% | 0.8 to 3 | 1.8 to 2.8 | 2.0 | 2.2 | 2.4 |
| 3944 | 31% | 65.5% | 3.5% | 0.8 to 3 | 1.8 to 2.8 | 2.0 | 2.2 | 2.4 |
| 3945 | 32% | 64.5% | 3.5% | 0.8 to 3 | 1.8 to 2.8 | 2.0 | 2.2 | 2.4 |
| 3946 | 33% | 63.5% | 3.5% | 0.8 to 3 | 1.8 to 2.8 | 2.0 | 2.2 | 2.4 |
| 3947 | 34% | 62.5% | 3.5% | 0.8 to 3 | 1.8 to 2.8 | 2.0 | 2.2 | 2.4 |
| 3948 | 35% | 61.5% | 3.5% | 0.8 to 3 | 1.8 to 2.8 | 2.0 | 2.2 | 2.4 |
| 3949 | 36% | 60.5% | 3.5% | 0.8 to 3 | 1.8 to 2.8 | 2.0 | 2.2 | 2.4 |
| 3950 | 37% | 59.5% | 3.5% | 0.8 to 3 | 1.8 to 2.8 | 2.0 | 2.2 | 2.4 |
| 3951 | 38% | 58.5% | 3.5% | 0.8 to 3 | 1.8 to 2.8 | 2.0 | 2.2 | 2.4 |
| 3952 | 39% | 57.5% | 3.5% | 0.8 to 3 | 1.8 to 2.8 | 2.0 | 2.2 | 2.4 |
| 3953 | 40% | 56.5% | 3.5% | 0.8 to 3 | 1.8 to 2.8 | 2.0 | 2.2 | 2.4 |
| 3954 | 41% | 55.5% | 3.5% | 0.8 to 3 | 1.8 to 2.8 | 2.0 | 2.2 | 2.4 |
| 3955 | 42% | 54.5% | 3.5% | 0.8 to 3 | 1.8 to 2.8 | 2.0 | 2.2 | 2.4 |
| 3956 | 43% | 53.5% | 3.5% | 0.8 to 3 | 1.8 to 2.8 | 2.0 | 2.2 | 2.4 |
| 3957 | 44% | 52.5% | 3.5% | 0.8 to 3 | 1.8 to 2.8 | 2.0 | 2.2 | 2.4 |
| 3958 | 45% | 51.5% | 3.5% | 0.8 to 3 | 1.8 to 2.8 | 2.0 | 2.2 | 2.4 |
| 3959 | 46% | 50.5% | 3.5% | 0.8 to 3 | 1.8 to 2.8 | 2.0 | 2.2 | 2.4 |
| 3960 | 47% | 49.5% | 3.5% | 0.8 to 3 | 1.8 to 2.8 | 2.0 | 2.2 | 2.4 |
| 3961 | 48% | 48.5% | 3.5% | 0.8 to 3 | 1.8 to 2.8 | 2.0 | 2.2 | 2.4 |
| 3962 | 49% | 47.5% | 3.5% | 0.8 to 3 | 1.8 to 2.8 | 2.0 | 2.2 | 2.4 |
| 3963 | 50% | 46.5% | 3.5% | 0.8 to 3 | 1.8 to 2.8 | 2.0 | 2.2 | 2.4 |
| 3964 | 51% | 45.5% | 3.5% | 0.8 to 3 | 1.8 to 2.8 | 2.0 | 2.2 | 2.4 |
| 3965 | 52% | 44.5% | 3.5% | 0.8 to 3 | 1.8 to 2.8 | 2.0 | 2.2 | 2.4 |
| 3966 | 53% | 43.5% | 3.5% | 0.8 to 3 | 1.8 to 2.8 | 2.0 | 2.2 | 2.4 |
| 3967 | 54% | 42.5% | 3.5% | 0.8 to 3 | 1.8 to 2.8 | 2.0 | 2.2 | 2.4 |
| 3968 | 55% | 41.5% | 3.5% | 0.8 to 3 | 1.8 to 2.8 | 2.0 | 2.2 | 2.4 |
| 3969 | 56% | 40.5% | 3.5% | 0.8 to 3 | 1.8 to 2.8 | 2.0 | 2.2 | 2.4 |
| 3970 | 57% | 39.5% | 3.5% | 0.8 to 3 | 1.8 to 2.8 | 2.0 | 2.2 | 2.4 |
| 3971 | 58% | 38.5% | 3.5% | 0.8 to 3 | 1.8 to 2.8 | 2.0 | 2.2 | 2.4 |
| 3972 | 59% | 37.5% | 3.5% | 0.8 to 3 | 1.8 to 2.8 | 2.0 | 2.2 | 2.4 |
| 3973 | 60% | 36.5% | 3.5% | 0.8 to 3 | 1.8 to 2.8 | 2.0 | 2.2 | 2.4 |
| 3974 | 30% | 66% | 4% | 0.8 to 3 | 1.8 to 2.8 | 2.0 | 2.2 | 2.4 |

TABLE 9-continued

|  | Alkyl Sulfate Alkyl Chain Length, Wt. % | | Alkyl Ether Sulfate | | | | | |
|---|---|---|---|---|---|---|---|---|
|  | | | Alkyl Chain Length, Wt. % | Average mol. EO (Alternatives for each numbered species) | | | | |
| Species | 9 to 11 | 10 to 12 | 8 to 10 | Range A | Range B | Species C | Species D | Species E |
| 3975 | 31% | 65% | 4% | 0.8 to 3 | 1.8 to 2.8 | 2.0 | 2.2 | 2.4 |
| 3976 | 32% | 64% | 4% | 0.8 to 3 | 1.8 to 2.8 | 2.0 | 2.2 | 2.4 |
| 3977 | 33% | 63% | 4% | 0.8 to 3 | 1.8 to 2.8 | 2.0 | 2.2 | 2.4 |
| 3978 | 34% | 62% | 4% | 0.8 to 3 | 1.8 to 2.8 | 2.0 | 2.2 | 2.4 |
| 3979 | 35% | 61% | 4% | 0.8 to 3 | 1.8 to 2.8 | 2.0 | 2.2 | 2.4 |
| 3980 | 36% | 60% | 4% | 0.8 to 3 | 1.8 to 2.8 | 2.0 | 2.2 | 2.4 |
| 3981 | 37% | 59% | 4% | 0.8 to 3 | 1.8 to 2.8 | 2.0 | 2.2 | 2.4 |
| 3982 | 38% | 58% | 4% | 0.8 to 3 | 1.8 to 2.8 | 2.0 | 2.2 | 2.4 |
| 3983 | 39% | 57% | 4% | 0.8 to 3 | 1.8 to 2.8 | 2.0 | 2.2 | 2.4 |
| 3984 | 40% | 56% | 4% | 0.8 to 3 | 1.8 to 2.8 | 2.0 | 2.2 | 2.4 |
| 3985 | 41% | 55% | 4% | 0.8 to 3 | 1.8 to 2.8 | 2.0 | 2.2 | 2.4 |
| 3986 | 42% | 54% | 4% | 0.8 to 3 | 1.8 to 2.8 | 2.0 | 2.2 | 2.4 |
| 3987 | 43% | 53% | 4% | 0.8 to 3 | 1.8 to 2.8 | 2.0 | 2.2 | 2.4 |
| 3988 | 44% | 52% | 4% | 0.8 to 3 | 1.8 to 2.8 | 2.0 | 2.2 | 2.4 |
| 3989 | 45% | 51% | 4% | 0.8 to 3 | 1.8 to 2.8 | 2.0 | 2.2 | 2.4 |
| 3990 | 46% | 50% | 4% | 0.8 to 3 | 1.8 to 2.8 | 2.0 | 2.2 | 2.4 |
| 3991 | 47% | 49% | 4% | 0.8 to 3 | 1.8 to 2.8 | 2.0 | 2.2 | 2.4 |
| 3992 | 48% | 48% | 4% | 0.8 to 3 | 1.8 to 2.8 | 2.0 | 2.2 | 2.4 |
| 3993 | 49% | 47% | 4% | 0.8 to 3 | 1.8 to 2.8 | 2.0 | 2.2 | 2.4 |
| 3994 | 50% | 46% | 4% | 0.8 to 3 | 1.8 to 2.8 | 2.0 | 2.2 | 2.4 |
| 3995 | 51% | 45% | 4% | 0.8 to 3 | 1.8 to 2.8 | 2.0 | 2.2 | 2.4 |
| 3996 | 52% | 44% | 4% | 0.8 to 3 | 1.8 to 2.8 | 2.0 | 2.2 | 2.4 |
| 3997 | 53% | 43% | 4% | 0.8 to 3 | 1.8 to 2.8 | 2.0 | 2.2 | 2.4 |
| 3998 | 54% | 42% | 4% | 0.8 to 3 | 1.8 to 2.8 | 2.0 | 2.2 | 2.4 |
| 3999 | 55% | 41% | 4% | 0.8 to 3 | 1.8 to 2.8 | 2.0 | 2.2 | 2.4 |
| 4000 | 56% | 40% | 4% | 0.8 to 3 | 1.8 to 2.8 | 2.0 | 2.2 | 2.4 |
| 4001 | 57% | 39% | 4% | 0.8 to 3 | 1.8 to 2.8 | 2.0 | 2.2 | 2.4 |
| 4002 | 58% | 38% | 4% | 0.8 to 3 | 1.8 to 2.8 | 2.0 | 2.2 | 2.4 |
| 4003 | 59% | 37% | 4% | 0.8 to 3 | 1.8 to 2.8 | 2.0 | 2.2 | 2.4 |
| 4004 | 60% | 36% | 4% | 0.8 to 3 | 1.8 to 2.8 | 2.0 | 2.2 | 2.4 |
| 4005 | 30% | 65.5% | 4.5% | 0.8 to 3 | 1.8 to 2.8 | 2.0 | 2.2 | 2.4 |
| 4006 | 31% | 64.5% | 4.5% | 0.8 to 3 | 1.8 to 2.8 | 2.0 | 2.2 | 2.4 |
| 4007 | 32% | 63.5% | 4.5% | 0.8 to 3 | 1.8 to 2.8 | 2.0 | 2.2 | 2.4 |
| 4008 | 33% | 62.5% | 4.5% | 0.8 to 3 | 1.8 to 2.8 | 2.0 | 2.2 | 2.4 |
| 4009 | 34% | 61.5% | 4.5% | 0.8 to 3 | 1.8 to 2.8 | 2.0 | 2.2 | 2.4 |
| 4010 | 35% | 60.5% | 4.5% | 0.8 to 3 | 1.8 to 2.8 | 2.0 | 2.2 | 2.4 |
| 4011 | 36% | 59.5% | 4.5% | 0.8 to 3 | 1.8 to 2.8 | 2.0 | 2.2 | 2.4 |
| 4012 | 37% | 58.5% | 4.5% | 0.8 to 3 | 1.8 to 2.8 | 2.0 | 2.2 | 2.4 |
| 4013 | 38% | 57.5% | 4.5% | 0.8 to 3 | 1.8 to 2.8 | 2.0 | 2.2 | 2.4 |
| 4014 | 39% | 56.5% | 4.5% | 0.8 to 3 | 1.8 to 2.8 | 2.0 | 2.2 | 2.4 |
| 4015 | 40% | 55.5% | 4.5% | 0.8 to 3 | 1.8 to 2.8 | 2.0 | 2.2 | 2.4 |
| 4016 | 41% | 54.5% | 4.5% | 0.8 to 3 | 1.8 to 2.8 | 2.0 | 2.2 | 2.4 |
| 4017 | 42% | 53.5% | 4.5% | 0.8 to 3 | 1.8 to 2.8 | 2.0 | 2.2 | 2.4 |
| 4018 | 43% | 52.5% | 4.5% | 0.8 to 3 | 1.8 to 2.8 | 2.0 | 2.2 | 2.4 |
| 4019 | 44% | 51.5% | 4.5% | 0.8 to 3 | 1.8 to 2.8 | 2.0 | 2.2 | 2.4 |
| 4020 | 45% | 50.5% | 4.5% | 0.8 to 3 | 1.8 to 2.8 | 2.0 | 2.2 | 2.4 |
| 4021 | 46% | 49.5% | 4.5% | 0.8 to 3 | 1.8 to 2.8 | 2.0 | 2.2 | 2.4 |
| 4022 | 47% | 48.5% | 4.5% | 0.8 to 3 | 1.8 to 2.8 | 2.0 | 2.2 | 2.4 |
| 4023 | 48% | 47.5% | 4.5% | 0.8 to 3 | 1.8 to 2.8 | 2.0 | 2.2 | 2.4 |
| 4024 | 49% | 46.5% | 4.5% | 0.8 to 3 | 1.8 to 2.8 | 2.0 | 2.2 | 2.4 |
| 4025 | 50% | 45.5% | 4.5% | 0.8 to 3 | 1.8 to 2.8 | 2.0 | 2.2 | 2.4 |
| 4026 | 51% | 44.5% | 4.5% | 0.8 to 3 | 1.8 to 2.8 | 2.0 | 2.2 | 2.4 |
| 4027 | 52% | 43.5% | 4.5% | 0.8 to 3 | 1.8 to 2.8 | 2.0 | 2.2 | 2.4 |
| 4028 | 53% | 42.5% | 4.5% | 0.8 to 3 | 1.8 to 2.8 | 2.0 | 2.2 | 2.4 |
| 4029 | 54% | 41.5% | 4.5% | 0.8 to 3 | 1.8 to 2.8 | 2.0 | 2.2 | 2.4 |
| 4030 | 55% | 40.5% | 4.5% | 0.8 to 3 | 1.8 to 2.8 | 2.0 | 2.2 | 2.4 |
| 4031 | 56% | 39.5% | 4.5% | 0.8 to 3 | 1.8 to 2.8 | 2.0 | 2.2 | 2.4 |
| 4032 | 57% | 38.5% | 4.5% | 0.8 to 3 | 1.8 to 2.8 | 2.0 | 2.2 | 2.4 |
| 4033 | 58% | 37.5% | 4.5% | 0.8 to 3 | 1.8 to 2.8 | 2.0 | 2.2 | 2.4 |
| 4034 | 59% | 36.5% | 4.5% | 0.8 to 3 | 1.8 to 2.8 | 2.0 | 2.2 | 2.4 |
| 4035 | 60% | 35.5% | 4.5% | 0.8 to 3 | 1.8 to 2.8 | 2.0 | 2.2 | 2.4 |
| 4036 | 30% | 65% | 5% | 0.8 to 3 | 1.8 to 2.8 | 2.0 | 2.2 | 2.4 |
| 4037 | 31% | 64% | 5% | 0.8 to 3 | 1.8 to 2.8 | 2.0 | 2.2 | 2.4 |
| 4038 | 32% | 63% | 5% | 0.8 to 3 | 1.8 to 2.8 | 2.0 | 2.2 | 2.4 |
| 4039 | 33% | 62% | 5% | 0.8 to 3 | 1.8 to 2.8 | 2.0 | 2.2 | 2.4 |
| 4040 | 34% | 61% | 5% | 0.8 to 3 | 1.8 to 2.8 | 2.0 | 2.2 | 2.4 |
| 4041 | 35% | 60% | 5% | 0.8 to 3 | 1.8 to 2.8 | 2.0 | 2.2 | 2.4 |
| 4042 | 36% | 59% | 5% | 0.8 to 3 | 1.8 to 2.8 | 2.0 | 2.2 | 2.4 |
| 4043 | 37% | 58% | 5% | 0.8 to 3 | 1.8 to 2.8 | 2.0 | 2.2 | 2.4 |
| 4044 | 38% | 57% | 5% | 0.8 to 3 | 1.8 to 2.8 | 2.0 | 2.2 | 2.4 |

TABLE 9-continued

|  | Alkyl Sulfate Alkyl Chain Length, Wt. % | | Alkyl Chain Length, Wt. % | Alkyl Ether Sulfate | | | | |
|---|---|---|---|---|---|---|---|---|
|  | | | | Average mol. EO (Alternatives for each numbered species) | | | | |
| Species | 9 to 11 | 10 to 12 | 8 to 10 | Range A | Range B | Species C | Species D | Species E |
| 4045 | 39% | 56% | 5% | 0.8 to 3 | 1.8 to 2.8 | 2.0 | 2.2 | 2.4 |
| 4046 | 40% | 55% | 5% | 0.8 to 3 | 1.8 to 2.8 | 2.0 | 2.2 | 2.4 |
| 4047 | 41% | 54% | 5% | 0.8 to 3 | 1.8 to 2.8 | 2.0 | 2.2 | 2.4 |
| 4048 | 42% | 53% | 5% | 0.8 to 3 | 1.8 to 2.8 | 2.0 | 2.2 | 2.4 |
| 4049 | 43% | 52% | 5% | 0.8 to 3 | 1.8 to 2.8 | 2.0 | 2.2 | 2.4 |
| 4050 | 44% | 51% | 5% | 0.8 to 3 | 1.8 to 2.8 | 2.0 | 2.2 | 2.4 |
| 4051 | 45% | 50% | 5% | 0.8 to 3 | 1.8 to 2.8 | 2.0 | 2.2 | 2.4 |
| 4052 | 46% | 49% | 5% | 0.8 to 3 | 1.8 to 2.8 | 2.0 | 2.2 | 2.4 |
| 4053 | 47% | 48% | 5% | 0.8 to 3 | 1.8 to 2.8 | 2.0 | 2.2 | 2.4 |
| 4054 | 48% | 47% | 5% | 0.8 to 3 | 1.8 to 2.8 | 2.0 | 2.2 | 2.4 |
| 4055 | 49% | 46% | 5% | 0.8 to 3 | 1.8 to 2.8 | 2.0 | 2.2 | 2.4 |
| 4056 | 50% | 45% | 5% | 0.8 to 3 | 1.8 to 2.8 | 2.0 | 2.2 | 2.4 |
| 4057 | 51% | 44% | 5% | 0.8 to 3 | 1.8 to 2.8 | 2.0 | 2.2 | 2.4 |
| 4058 | 52% | 43% | 5% | 0.8 to 3 | 1.8 to 2.8 | 2.0 | 2.2 | 2.4 |
| 4059 | 53% | 42% | 5% | 0.8 to 3 | 1.8 to 2.8 | 2.0 | 2.2 | 2.4 |
| 4060 | 54% | 41% | 5% | 0.8 to 3 | 1.8 to 2.8 | 2.0 | 2.2 | 2.4 |
| 4061 | 55% | 40% | 5% | 0.8 to 3 | 1.8 to 2.8 | 2.0 | 2.2 | 2.4 |
| 4062 | 56% | 39% | 5% | 0.8 to 3 | 1.8 to 2.8 | 2.0 | 2.2 | 2.4 |
| 4063 | 57% | 38% | 5% | 0.8 to 3 | 1.8 to 2.8 | 2.0 | 2.2 | 2.4 |
| 4064 | 58% | 37% | 5% | 0.8 to 3 | 1.8 to 2.8 | 2.0 | 2.2 | 2.4 |
| 4065 | 59% | 36% | 5% | 0.8 to 3 | 1.8 to 2.8 | 2.0 | 2.2 | 2.4 |
| 4066 | 60% | 35% | 5% | 0.8 to 3 | 1.8 to 2.8 | 2.0 | 2.2 | 2.4 |
| 4067 | 30% | 64.5% | 5.5% | 0.8 to 3 | 1.8 to 2.8 | 2.0 | 2.2 | 2.4 |
| 4068 | 31% | 63.5% | 5.5% | 0.8 to 3 | 1.8 to 2.8 | 2.0 | 2.2 | 2.4 |
| 4069 | 32% | 62.5% | 5.5% | 0.8 to 3 | 1.8 to 2.8 | 2.0 | 2.2 | 2.4 |
| 4070 | 33% | 61.5% | 5.5% | 0.8 to 3 | 1.8 to 2.8 | 2.0 | 2.2 | 2.4 |
| 4071 | 34% | 60.5% | 5.5% | 0.8 to 3 | 1.8 to 2.8 | 2.0 | 2.2 | 2.4 |
| 4072 | 35% | 59.5% | 5.5% | 0.8 to 3 | 1.8 to 2.8 | 2.0 | 2.2 | 2.4 |
| 4073 | 36% | 58.5% | 5.5% | 0.8 to 3 | 1.8 to 2.8 | 2.0 | 2.2 | 2.4 |
| 4074 | 37% | 57.5% | 5.5% | 0.8 to 3 | 1.8 to 2.8 | 2.0 | 2.2 | 2.4 |
| 4075 | 38% | 56.5% | 5.5% | 0.8 to 3 | 1.8 to 2.8 | 2.0 | 2.2 | 2.4 |
| 4076 | 39% | 55.5% | 5.5% | 0.8 to 3 | 1.8 to 2.8 | 2.0 | 2.2 | 2.4 |
| 4077 | 40% | 54.5% | 5.5% | 0.8 to 3 | 1.8 to 2.8 | 2.0 | 2.2 | 2.4 |
| 4078 | 41% | 53.5% | 5.5% | 0.8 to 3 | 1.8 to 2.8 | 2.0 | 2.2 | 2.4 |
| 4079 | 42% | 52.5% | 5.5% | 0.8 to 3 | 1.8 to 2.8 | 2.0 | 2.2 | 2.4 |
| 4080 | 43% | 51.5% | 5.5% | 0.8 to 3 | 1.8 to 2.8 | 2.0 | 2.2 | 2.4 |
| 4081 | 44% | 50.5% | 5.5% | 0.8 to 3 | 1.8 to 2.8 | 2.0 | 2.2 | 2.4 |
| 4082 | 45% | 49.5% | 5.5% | 0.8 to 3 | 1.8 to 2.8 | 2.0 | 2.2 | 2.4 |
| 4083 | 46% | 48.5% | 5.5% | 0.8 to 3 | 1.8 to 2.8 | 2.0 | 2.2 | 2.4 |
| 4084 | 47% | 47.5% | 5.5% | 0.8 to 3 | 1.8 to 2.8 | 2.0 | 2.2 | 2.4 |
| 4085 | 48% | 46.5% | 5.5% | 0.8 to 3 | 1.8 to 2.8 | 2.0 | 2.2 | 2.4 |
| 4086 | 49% | 45.5% | 5.5% | 0.8 to 3 | 1.8 to 2.8 | 2.0 | 2.2 | 2.4 |
| 4087 | 50% | 44.5% | 5.5% | 0.8 to 3 | 1.8 to 2.8 | 2.0 | 2.2 | 2.4 |
| 4088 | 51% | 43.5% | 5.5% | 0.8 to 3 | 1.8 to 2.8 | 2.0 | 2.2 | 2.4 |
| 4089 | 52% | 42.5% | 5.5% | 0.8 to 3 | 1.8 to 2.8 | 2.0 | 2.2 | 2.4 |
| 4090 | 53% | 41.5% | 5.5% | 0.8 to 3 | 1.8 to 2.8 | 2.0 | 2.2 | 2.4 |
| 4091 | 54% | 40.5% | 5.5% | 0.8 to 3 | 1.8 to 2.8 | 2.0 | 2.2 | 2.4 |
| 4092 | 55% | 39.5% | 5.5% | 0.8 to 3 | 1.8 to 2.8 | 2.0 | 2.2 | 2.4 |
| 4093 | 56% | 38.5% | 5.5% | 0.8 to 3 | 1.8 to 2.8 | 2.0 | 2.2 | 2.4 |
| 4094 | 57% | 37.5% | 5.5% | 0.8 to 3 | 1.8 to 2.8 | 2.0 | 2.2 | 2.4 |
| 4095 | 58% | 36.5% | 5.5% | 0.8 to 3 | 1.8 to 2.8 | 2.0 | 2.2 | 2.4 |
| 4096 | 59% | 35.5% | 5.5% | 0.8 to 3 | 1.8 to 2.8 | 2.0 | 2.2 | 2.4 |
| 4097 | 60% | 34.5% | 5.5% | 0.8 to 3 | 1.8 to 2.8 | 2.0 | 2.2 | 2.4 |
| 4098 | 30% | 64% | 6% | 0.8 to 3 | 1.8 to 2.8 | 2.0 | 2.2 | 2.4 |
| 4099 | 31% | 63% | 6% | 0.8 to 3 | 1.8 to 2.8 | 2.0 | 2.2 | 2.4 |
| 4100 | 32% | 62% | 6% | 0.8 to 3 | 1.8 to 2.8 | 2.0 | 2.2 | 2.4 |
| 4101 | 33% | 61% | 6% | 0.8 to 3 | 1.8 to 2.8 | 2.0 | 2.2 | 2.4 |
| 4102 | 34% | 60% | 6% | 0.8 to 3 | 1.8 to 2.8 | 2.0 | 2.2 | 2.4 |
| 4103 | 35% | 59% | 6% | 0.8 to 3 | 1.8 to 2.8 | 2.0 | 2.2 | 2.4 |
| 4104 | 36% | 58% | 6% | 0.8 to 3 | 1.8 to 2.8 | 2.0 | 2.2 | 2.4 |
| 4105 | 37% | 57% | 6% | 0.8 to 3 | 1.8 to 2.8 | 2.0 | 2.2 | 2.4 |
| 4106 | 38% | 56% | 6% | 0.8 to 3 | 1.8 to 2.8 | 2.0 | 2.2 | 2.4 |
| 4107 | 39% | 55% | 6% | 0.8 to 3 | 1.8 to 2.8 | 2.0 | 2.2 | 2.4 |
| 4108 | 40% | 54% | 6% | 0.8 to 3 | 1.8 to 2.8 | 2.0 | 2.2 | 2.4 |
| 4109 | 41% | 53% | 6% | 0.8 to 3 | 1.8 to 2.8 | 2.0 | 2.2 | 2.4 |
| 4110 | 42% | 52% | 6% | 0.8 to 3 | 1.8 to 2.8 | 2.0 | 2.2 | 2.4 |
| 4111 | 43% | 51% | 6% | 0.8 to 3 | 1.8 to 2.8 | 2.0 | 2.2 | 2.4 |
| 4112 | 44% | 50% | 6% | 0.8 to 3 | 1.8 to 2.8 | 2.0 | 2.2 | 2.4 |
| 4113 | 45% | 49% | 6% | 0.8 to 3 | 1.8 to 2.8 | 2.0 | 2.2 | 2.4 |
| 4114 | 46% | 48% | 6% | 0.8 to 3 | 1.8 to 2.8 | 2.0 | 2.2 | 2.4 |

TABLE 9-continued

| | Alkyl Sulfate Alkyl Chain Length, Wt. % | | Alkyl Chain Length, Wt. % | Alkyl Ether Sulfate | | | | |
|---|---|---|---|---|---|---|---|---|
| | | | | Average mol. EO (Alternatives for each numbered species) | | | | |
| Species | 9 to 11 | 10 to 12 | 8 to 10 | Range A | Range B | Species C | Species D | Species E |
| 4115 | 47% | 47% | 6% | 0.8 to 3 | 1.8 to 2.8 | 2.0 | 2.2 | 2.4 |
| 4116 | 48% | 46% | 6% | 0.8 to 3 | 1.8 to 2.8 | 2.0 | 2.2 | 2.4 |
| 4117 | 49% | 45% | 6% | 0.8 to 3 | 1.8 to 2.8 | 2.0 | 2.2 | 2.4 |
| 4118 | 50% | 44% | 6% | 0.8 to 3 | 1.8 to 2.8 | 2.0 | 2.2 | 2.4 |
| 4119 | 51% | 43% | 6% | 0.8 to 3 | 1.8 to 2.8 | 2.0 | 2.2 | 2.4 |
| 4120 | 52% | 42% | 6% | 0.8 to 3 | 1.8 to 2.8 | 2.0 | 2.2 | 2.4 |
| 4121 | 53% | 41% | 6% | 0.8 to 3 | 1.8 to 2.8 | 2.0 | 2.2 | 2.4 |
| 4122 | 54% | 40% | 6% | 0.8 to 3 | 1.8 to 2.8 | 2.0 | 2.2 | 2.4 |
| 4123 | 55% | 39% | 6% | 0.8 to 3 | 1.8 to 2.8 | 2.0 | 2.2 | 2.4 |
| 4124 | 56% | 38% | 6% | 0.8 to 3 | 1.8 to 2.8 | 2.0 | 2.2 | 2.4 |
| 4125 | 57% | 37% | 6% | 0.8 to 3 | 1.8 to 2.8 | 2.0 | 2.2 | 2.4 |
| 4126 | 58% | 36% | 6% | 0.8 to 3 | 1.8 to 2.8 | 2.0 | 2.2 | 2.4 |
| 4127 | 59% | 35% | 6% | 0.8 to 3 | 1.8 to 2.8 | 2.0 | 2.2 | 2.4 |
| 4128 | 60% | 34% | 6% | 0.8 to 3 | 1.8 to 2.8 | 2.0 | 2.2 | 2.4 |
| 4129 | 30% | 63.5% | 6.5% | 0.8 to 3 | 1.8 to 2.8 | 2.0 | 2.2 | 2.4 |
| 4130 | 31% | 62.5% | 6.5% | 0.8 to 3 | 1.8 to 2.8 | 2.0 | 2.2 | 2.4 |
| 4131 | 32% | 61.5% | 6.5% | 0.8 to 3 | 1.8 to 2.8 | 2.0 | 2.2 | 2.4 |
| 4132 | 33% | 60.5% | 6.5% | 0.8 to 3 | 1.8 to 2.8 | 2.0 | 2.2 | 2.4 |
| 4133 | 34% | 59.5% | 6.5% | 0.8 to 3 | 1.8 to 2.8 | 2.0 | 2.2 | 2.4 |
| 4134 | 35% | 58.5% | 6.5% | 0.8 to 3 | 1.8 to 2.8 | 2.0 | 2.2 | 2.4 |
| 4135 | 36% | 57.5% | 6.5% | 0.8 to 3 | 1.8 to 2.8 | 2.0 | 2.2 | 2.4 |
| 4136 | 37% | 56.5% | 6.5% | 0.8 to 3 | 1.8 to 2.8 | 2.0 | 2.2 | 2.4 |
| 4137 | 38% | 55.5% | 6.5% | 0.8 to 3 | 1.8 to 2.8 | 2.0 | 2.2 | 2.4 |
| 4138 | 39% | 54.5% | 6.5% | 0.8 to 3 | 1.8 to 2.8 | 2.0 | 2.2 | 2.4 |
| 4139 | 40% | 53.5% | 6.5% | 0.8 to 3 | 1.8 to 2.8 | 2.0 | 2.2 | 2.4 |
| 4140 | 41% | 52.5% | 6.5% | 0.8 to 3 | 1.8 to 2.8 | 2.0 | 2.2 | 2.4 |
| 4141 | 42% | 51.5% | 6.5% | 0.8 to 3 | 1.8 to 2.8 | 2.0 | 2.2 | 2.4 |
| 4142 | 43% | 50.5% | 6.5% | 0.8 to 3 | 1.8 to 2.8 | 2.0 | 2.2 | 2.4 |
| 4143 | 44% | 49.5% | 6.5% | 0.8 to 3 | 1.8 to 2.8 | 2.0 | 2.2 | 2.4 |
| 4144 | 45% | 48.5% | 6.5% | 0.8 to 3 | 1.8 to 2.8 | 2.0 | 2.2 | 2.4 |
| 4145 | 46% | 47.5% | 6.5% | 0.8 to 3 | 1.8 to 2.8 | 2.0 | 2.2 | 2.4 |
| 4146 | 47% | 46.5% | 6.5% | 0.8 to 3 | 1.8 to 2.8 | 2.0 | 2.2 | 2.4 |
| 4147 | 48% | 45.5% | 6.5% | 0.8 to 3 | 1.8 to 2.8 | 2.0 | 2.2 | 2.4 |
| 4148 | 49% | 44.5% | 6.5% | 0.8 to 3 | 1.8 to 2.8 | 2.0 | 2.2 | 2.4 |
| 4149 | 50% | 43.5% | 6.5% | 0.8 to 3 | 1.8 to 2.8 | 2.0 | 2.2 | 2.4 |
| 4150 | 51% | 42.5% | 6.5% | 0.8 to 3 | 1.8 to 2.8 | 2.0 | 2.2 | 2.4 |
| 4151 | 52% | 41.5% | 6.5% | 0.8 to 3 | 1.8 to 2.8 | 2.0 | 2.2 | 2.4 |
| 4152 | 53% | 40.5% | 6.5% | 0.8 to 3 | 1.8 to 2.8 | 2.0 | 2.2 | 2.4 |
| 4153 | 54% | 39.5% | 6.5% | 0.8 to 3 | 1.8 to 2.8 | 2.0 | 2.2 | 2.4 |
| 4154 | 55% | 38.5% | 6.5% | 0.8 to 3 | 1.8 to 2.8 | 2.0 | 2.2 | 2.4 |
| 4155 | 56% | 37.5% | 6.5% | 0.8 to 3 | 1.8 to 2.8 | 2.0 | 2.2 | 2.4 |
| 4156 | 57% | 36.5% | 6.5% | 0.8 to 3 | 1.8 to 2.8 | 2.0 | 2.2 | 2.4 |
| 4157 | 58% | 35.5% | 6.5% | 0.8 to 3 | 1.8 to 2.8 | 2.0 | 2.2 | 2.4 |
| 4158 | 59% | 34.5% | 6.5% | 0.8 to 3 | 1.8 to 2.8 | 2.0 | 2.2 | 2.4 |
| 4159 | 60% | 33.5% | 6.5% | 0.8 to 3 | 1.8 to 2.8 | 2.0 | 2.2 | 2.4 |
| 4160 | 30% | 63% | 7% | 0.8 to 3 | 1.8 to 2.8 | 2.0 | 2.2 | 2.4 |
| 4161 | 31% | 62% | 7% | 0.8 to 3 | 1.8 to 2.8 | 2.0 | 2.2 | 2.4 |
| 4162 | 32% | 61% | 7% | 0.8 to 3 | 1.8 to 2.8 | 2.0 | 2.2 | 2.4 |
| 4163 | 33% | 60% | 7% | 0.8 to 3 | 1.8 to 2.8 | 2.0 | 2.2 | 2.4 |
| 4164 | 34% | 59% | 7% | 0.8 to 3 | 1.8 to 2.8 | 2.0 | 2.2 | 2.4 |
| 4165 | 35% | 58% | 7% | 0.8 to 3 | 1.8 to 2.8 | 2.0 | 2.2 | 2.4 |
| 4166 | 36% | 57% | 7% | 0.8 to 3 | 1.8 to 2.8 | 2.0 | 2.2 | 2.4 |
| 4167 | 37% | 56% | 7% | 0.8 to 3 | 1.8 to 2.8 | 2.0 | 2.2 | 2.4 |
| 4168 | 38% | 55% | 7% | 0.8 to 3 | 1.8 to 2.8 | 2.0 | 2.2 | 2.4 |
| 4169 | 39% | 54% | 7% | 0.8 to 3 | 1.8 to 2.8 | 2.0 | 2.2 | 2.4 |
| 4170 | 40% | 53% | 7% | 0.8 to 3 | 1.8 to 2.8 | 2.0 | 2.2 | 2.4 |
| 4171 | 41% | 52% | 7% | 0.8 to 3 | 1.8 to 2.8 | 2.0 | 2.2 | 2.4 |
| 4172 | 42% | 51% | 7% | 0.8 to 3 | 1.8 to 2.8 | 2.0 | 2.2 | 2.4 |
| 4173 | 43% | 50% | 7% | 0.8 to 3 | 1.8 to 2.8 | 2.0 | 2.2 | 2.4 |
| 4174 | 44% | 49% | 7% | 0.8 to 3 | 1.8 to 2.8 | 2.0 | 2.2 | 2.4 |
| 4175 | 45% | 48% | 7% | 0.8 to 3 | 1.8 to 2.8 | 2.0 | 2.2 | 2.4 |
| 4176 | 46% | 47% | 7% | 0.8 to 3 | 1.8 to 2.8 | 2.0 | 2.2 | 2.4 |
| 4177 | 47% | 46% | 7% | 0.8 to 3 | 1.8 to 2.8 | 2.0 | 2.2 | 2.4 |
| 4178 | 48% | 45% | 7% | 0.8 to 3 | 1.8 to 2.8 | 2.0 | 2.2 | 2.4 |
| 4179 | 49% | 44% | 7% | 0.8 to 3 | 1.8 to 2.8 | 2.0 | 2.2 | 2.4 |
| 4180 | 50% | 43% | 7% | 0.8 to 3 | 1.8 to 2.8 | 2.0 | 2.2 | 2.4 |
| 4181 | 51% | 42% | 7% | 0.8 to 3 | 1.8 to 2.8 | 2.0 | 2.2 | 2.4 |
| 4182 | 52% | 41% | 7% | 0.8 to 3 | 1.8 to 2.8 | 2.0 | 2.2 | 2.4 |
| 4183 | 53% | 40% | 7% | 0.8 to 3 | 1.8 to 2.8 | 2.0 | 2.2 | 2.4 |
| 4184 | 54% | 39% | 7% | 0.8 to 3 | 1.8 to 2.8 | 2.0 | 2.2 | 2.4 |

TABLE 9-continued

| | Alkyl Sulfate Alkyl Chain Length, Wt. % | Alkyl Chain Length, Wt. % | Alkyl Ether Sulfate Average mol. EO (Alternatives for each numbered species) | | | | |
|---|---|---|---|---|---|---|---|
| Species | 9 to 11 | 10 to 12 | 8 to 10 | Range A | Range B | Species C | Species D | Species E |
| 4185 | 55% | 38% | 7% | 0.8 to 3 | 1.8 to 2.8 | 2.0 | 2.2 | 2.4 |
| 4186 | 56% | 37% | 7% | 0.8 to 3 | 1.8 to 2.8 | 2.0 | 2.2 | 2.4 |
| 4187 | 57% | 36% | 7% | 0.8 to 3 | 1.8 to 2.8 | 2.0 | 2.2 | 2.4 |
| 4188 | 58% | 35% | 7% | 0.8 to 3 | 1.8 to 2.8 | 2.0 | 2.2 | 2.4 |
| 4189 | 59% | 34% | 7% | 0.8 to 3 | 1.8 to 2.8 | 2.0 | 2.2 | 2.4 |
| 4190 | 60% | 33% | 7% | 0.8 to 3 | 1.8 to 2.8 | 2.0 | 2.2 | 2.4 |

TABLE 10

| Species | Alkyl Sulfate Alkyl Chain Length, Wt. % 10 to 12 | Alkyl Chain Length, Wt. % 8 to 10 | Range A | Range B | Species C | Species D | Species E |
|---|---|---|---|---|---|---|---|
| 4191 | 30% | 70% | 0% | 0.8 to 3 | 1.8 to 2.8 | 2.0 | 2.2 | 2.4 |
| 4192 | 31% | 69% | 0% | 0.8 to 3 | 1.8 to 2.8 | 2.0 | 2.2 | 2.4 |
| 4193 | 32% | 68% | 0% | 0.8 to 3 | 1.8 to 2.8 | 2.0 | 2.2 | 2.4 |
| 4194 | 33% | 67% | 0% | 0.8 to 3 | 1.8 to 2.8 | 2.0 | 2.2 | 2.4 |
| 4195 | 34% | 66% | 0% | 0.8 to 3 | 1.8 to 2.8 | 2.0 | 2.2 | 2.4 |
| 4196 | 35% | 65% | 0% | 0.8 to 3 | 1.8 to 2.8 | 2.0 | 2.2 | 2.4 |
| 4197 | 36% | 64% | 0% | 0.8 to 3 | 1.8 to 2.8 | 2.0 | 2.2 | 2.4 |
| 4198 | 37% | 63% | 0% | 0.8 to 3 | 1.8 to 2.8 | 2.0 | 2.2 | 2.4 |
| 4199 | 38% | 62% | 0% | 0.8 to 3 | 1.8 to 2.8 | 2.0 | 2.2 | 2.4 |
| 4200 | 39% | 61% | 0% | 0.8 to 3 | 1.8 to 2.8 | 2.0 | 2.2 | 2.4 |
| 4201 | 40% | 60% | 0% | 0.8 to 3 | 1.8 to 2.8 | 2.0 | 2.2 | 2.4 |
| 4202 | 41% | 59% | 0% | 0.8 to 3 | 1.8 to 2.8 | 2.0 | 2.2 | 2.4 |
| 4203 | 42% | 58% | 0% | 0.8 to 3 | 1.8 to 2.8 | 2.0 | 2.2 | 2.4 |
| 4204 | 43% | 57% | 0% | 0.8 to 3 | 1.8 to 2.8 | 2.0 | 2.2 | 2.4 |
| 4205 | 44% | 56% | 0% | 0.8 to 3 | 1.8 to 2.8 | 2.0 | 2.2 | 2.4 |
| 4206 | 45% | 55% | 0% | 0.8 to 3 | 1.8 to 2.8 | 2.0 | 2.2 | 2.4 |
| 4207 | 46% | 54% | 0% | 0.8 to 3 | 1.8 to 2.8 | 2.0 | 2.2 | 2.4 |
| 4208 | 47% | 53% | 0% | 0.8 to 3 | 1.8 to 2.8 | 2.0 | 2.2 | 2.4 |
| 4209 | 48% | 52% | 0% | 0.8 to 3 | 1.8 to 2.8 | 2.0 | 2.2 | 2.4 |
| 4210 | 49% | 51% | 0% | 0.8 to 3 | 1.8 to 2.8 | 2.0 | 2.2 | 2.4 |
| 4211 | 50% | 50% | 0% | 0.8 to 3 | 1.8 to 2.8 | 2.0 | 2.2 | 2.4 |
| 4212 | 51% | 49% | 0% | 0.8 to 3 | 1.8 to 2.8 | 2.0 | 2.2 | 2.4 |
| 4213 | 52% | 48% | 0% | 0.8 to 3 | 1.8 to 2.8 | 2.0 | 2.2 | 2.4 |
| 4214 | 53% | 47% | 0% | 0.8 to 3 | 1.8 to 2.8 | 2.0 | 2.2 | 2.4 |
| 4215 | 54% | 46% | 0% | 0.8 to 3 | 1.8 to 2.8 | 2.0 | 2.2 | 2.4 |
| 4216 | 55% | 45% | 0% | 0.8 to 3 | 1.8 to 2.8 | 2.0 | 2.2 | 2.4 |
| 4217 | 56% | 44% | 0% | 0.8 to 3 | 1.8 to 2.8 | 2.0 | 2.2 | 2.4 |
| 4218 | 57% | 43% | 0% | 0.8 to 3 | 1.8 to 2.8 | 2.0 | 2.2 | 2.4 |
| 4219 | 58% | 42% | 0% | 0.8 to 3 | 1.8 to 2.8 | 2.0 | 2.2 | 2.4 |
| 4220 | 59% | 41% | 0% | 0.8 to 3 | 1.8 to 2.8 | 2.0 | 2.2 | 2.4 |
| 4221 | 60% | 40% | 0% | 0.8 to 3 | 1.8 to 2.8 | 2.0 | 2.2 | 2.4 |
| 4222 | 30% | 70% | 0.5% | 0.8 to 3 | 1.8 to 2.8 | 2.0 | 2.2 | 2.4 |
| 4223 | 31% | 69% | 0.5% | 0.8 to 3 | 1.8 to 2.8 | 2.0 | 2.2 | 2.4 |
| 4224 | 32% | 68% | 0.5% | 0.8 to 3 | 1.8 to 2.8 | 2.0 | 2.2 | 2.4 |
| 4225 | 33% | 67% | 0.5% | 0.8 to 3 | 1.8 to 2.8 | 2.0 | 2.2 | 2.4 |
| 4226 | 34% | 66% | 0.5% | 0.8 to 3 | 1.8 to 2.8 | 2.0 | 2.2 | 2.4 |
| 4227 | 35% | 65% | 0.5% | 0.8 to 3 | 1.8 to 2.8 | 2.0 | 2.2 | 2.4 |
| 4228 | 36% | 64% | 0.5% | 0.8 to 3 | 1.8 to 2.8 | 2.0 | 2.2 | 2.4 |
| 4229 | 37% | 63% | 0.5% | 0.8 to 3 | 1.8 to 2.8 | 2.0 | 2.2 | 2.4 |
| 4230 | 38% | 62% | 0.5% | 0.8 to 3 | 1.8 to 2.8 | 2.0 | 2.2 | 2.4 |
| 4231 | 39% | 61% | 0.5% | 0.8 to 3 | 1.8 to 2.8 | 2.0 | 2.2 | 2.4 |
| 4232 | 40% | 60% | 0.5% | 0.8 to 3 | 1.8 to 2.8 | 2.0 | 2.2 | 2.4 |
| 4233 | 41% | 59% | 0.5% | 0.8 to 3 | 1.8 to 2.8 | 2.0 | 2.2 | 2.4 |
| 4234 | 42% | 58% | 0.5% | 0.8 to 3 | 1.8 to 2.8 | 2.0 | 2.2 | 2.4 |
| 4235 | 43% | 57% | 0.5% | 0.8 to 3 | 1.8 to 2.8 | 2.0 | 2.2 | 2.4 |
| 4236 | 44% | 56% | 0.5% | 0.8 to 3 | 1.8 to 2.8 | 2.0 | 2.2 | 2.4 |
| 4237 | 45% | 55% | 0.5% | 0.8 to 3 | 1.8 to 2.8 | 2.0 | 2.2 | 2.4 |
| 4238 | 46% | 54% | 0.5% | 0.8 to 3 | 1.8 to 2.8 | 2.0 | 2.2 | 2.4 |
| 4239 | 47% | 53% | 0.5% | 0.8 to 3 | 1.8 to 2.8 | 2.0 | 2.2 | 2.4 |
| 4240 | 48% | 52% | 0.5% | 0.8 to 3 | 1.8 to 2.8 | 2.0 | 2.2 | 2.4 |
| 4241 | 49% | 51% | 0.5% | 0.8 to 3 | 1.8 to 2.8 | 2.0 | 2.2 | 2.4 |
| 4242 | 50% | 50% | 0.5% | 0.8 to 3 | 1.8 to 2.8 | 2.0 | 2.2 | 2.4 |
| 4243 | 51% | 49% | 0.5% | 0.8 to 3 | 1.8 to 2.8 | 2.0 | 2.2 | 2.4 |
| 4244 | 52% | 48% | 0.5% | 0.8 to 3 | 1.8 to 2.8 | 2.0 | 2.2 | 2.4 |
| 4245 | 53% | 47% | 0.5% | 0.8 to 3 | 1.8 to 2.8 | 2.0 | 2.2 | 2.4 |
| 4246 | 54% | 46% | 0.5% | 0.8 to 3 | 1.8 to 2.8 | 2.0 | 2.2 | 2.4 |
| 4247 | 55% | 45% | 0.5% | 0.8 to 3 | 1.8 to 2.8 | 2.0 | 2.2 | 2.4 |
| 4248 | 56% | 44% | 0.5% | 0.8 to 3 | 1.8 to 2.8 | 2.0 | 2.2 | 2.4 |
| 4249 | 57% | 43% | 0.5% | 0.8 to 3 | 1.8 to 2.8 | 2.0 | 2.2 | 2.4 |
| 4250 | 58% | 42% | 0.5% | 0.8 to 3 | 1.8 to 2.8 | 2.0 | 2.2 | 2.4 |
| 4251 | 59% | 41% | 0.5% | 0.8 to 3 | 1.8 to 2.8 | 2.0 | 2.2 | 2.4 |
| 4252 | 60% | 40% | 0.5% | 0.8 to 3 | 1.8 to 2.8 | 2.0 | 2.2 | 2.4 |
| 4253 | 30% | 69% | 1% | 0.8 to 3 | 1.8 to 2.8 | 2.0 | 2.2 | 2.4 |
| 4254 | 31% | 68% | 1% | 0.8 to 3 | 1.8 to 2.8 | 2.0 | 2.2 | 2.4 |
| 4255 | 32% | 67% | 1% | 0.8 to 3 | 1.8 to 2.8 | 2.0 | 2.2 | 2.4 |
| 4256 | 33% | 66% | 1% | 0.8 to 3 | 1.8 to 2.8 | 2.0 | 2.2 | 2.4 |
| 4257 | 34% | 65% | 1% | 0.8 to 3 | 1.8 to 2.8 | 2.0 | 2.2 | 2.4 |
| 4258 | 35% | 64% | 1% | 0.8 to 3 | 1.8 to 2.8 | 2.0 | 2.2 | 2.4 |
| 4259 | 36% | 63% | 1% | 0.8 to 3 | 1.8 to 2.8 | 2.0 | 2.2 | 2.4 |
| 4260 | 37% | 62% | 1% | 0.8 to 3 | 1.8 to 2.8 | 2.0 | 2.2 | 2.4 |
| 4261 | 38% | 61% | 1% | 0.8 to 3 | 1.8 to 2.8 | 2.0 | 2.2 | 2.4 |
| 4262 | 39% | 60% | 1% | 0.8 to 3 | 1.8 to 2.8 | 2.0 | 2.2 | 2.4 |
| 4263 | 40% | 59% | 1% | 0.8 to 3 | 1.8 to 2.8 | 2.0 | 2.2 | 2.4 |
| 4264 | 41% | 58% | 1% | 0.8 to 3 | 1.8 to 2.8 | 2.0 | 2.2 | 2.4 |
| 4265 | 42% | 57% | 1% | 0.8 to 3 | 1.8 to 2.8 | 2.0 | 2.2 | 2.4 |
| 4266 | 43% | 56% | 1% | 0.8 to 3 | 1.8 to 2.8 | 2.0 | 2.2 | 2.4 |
| 4267 | 44% | 55% | 1% | 0.8 to 3 | 1.8 to 2.8 | 2.0 | 2.2 | 2.4 |
| 4268 | 45% | 54% | 1% | 0.8 to 3 | 1.8 to 2.8 | 2.0 | 2.2 | 2.4 |
| 4269 | 46% | 53% | 1% | 0.8 to 3 | 1.8 to 2.8 | 2.0 | 2.2 | 2.4 |
| 4270 | 47% | 52% | 1% | 0.8 to 3 | 1.8 to 2.8 | 2.0 | 2.2 | 2.4 |
| 4271 | 48% | 51% | 1% | 0.8 to 3 | 1.8 to 2.8 | 2.0 | 2.2 | 2.4 |
| 4272 | 49% | 50% | 1% | 0.8 to 3 | 1.8 to 2.8 | 2.0 | 2.2 | 2.4 |
| 4273 | 50% | 49% | 1% | 0.8 to 3 | 1.8 to 2.8 | 2.0 | 2.2 | 2.4 |
| 4274 | 51% | 48% | 1% | 0.8 to 3 | 1.8 to 2.8 | 2.0 | 2.2 | 2.4 |
| 4275 | 52% | 47% | 1% | 0.8 to 3 | 1.8 to 2.8 | 2.0 | 2.2 | 2.4 |
| 4276 | 53% | 46% | 1% | 0.8 to 3 | 1.8 to 2.8 | 2.0 | 2.2 | 2.4 |
| 4277 | 54% | 45% | 1% | 0.8 to 3 | 1.8 to 2.8 | 2.0 | 2.2 | 2.4 |
| 4278 | 55% | 44% | 1% | 0.8 to 3 | 1.8 to 2.8 | 2.0 | 2.2 | 2.4 |
| 4279 | 56% | 43% | 1% | 0.8 to 3 | 1.8 to 2.8 | 2.0 | 2.2 | 2.4 |
| 4280 | 57% | 42% | 1% | 0.8 to 3 | 1.8 to 2.8 | 2.0 | 2.2 | 2.4 |
| 4281 | 58% | 41% | 1% | 0.8 to 3 | 1.8 to 2.8 | 2.0 | 2.2 | 2.4 |
| 4282 | 59% | 40% | 1% | 0.8 to 3 | 1.8 to 2.8 | 2.0 | 2.2 | 2.4 |
| 4283 | 60% | 39% | 1% | 0.8 to 3 | 1.8 to 2.8 | 2.0 | 2.2 | 2.4 |
| 4284 | 30% | 69% | 1.5% | 0.8 to 3 | 1.8 to 2.8 | 2.0 | 2.2 | 2.4 |

TABLE 10-continued

| | Alkyl Sulfate Alkyl Chain Length, Wt. % | | Alkyl Ether Sulfate | | | | |
|---|---|---|---|---|---|---|---|
| | | Alkyl Chain Length, Wt. % 8 to 10 | | Average mol. EO (Alternatives for each numbered species) | | | |
| Species | 8 | 10 to 12 | | Range A | Range B | Species C | Species D | Species E |
| 4285 | 31% | 68% | 1.5% | 0.8 to 3 | 1.8 to 2.8 | 2.0 | 2.2 | 2.4 |
| 4286 | 32% | 67% | 1.5% | 0.8 to 3 | 1.8 to 2.8 | 2.0 | 2.2 | 2.4 |
| 4287 | 33% | 66% | 1.5% | 0.8 to 3 | 1.8 to 2.8 | 2.0 | 2.2 | 2.4 |
| 4288 | 34% | 65% | 1.5% | 0.8 to 3 | 1.8 to 2.8 | 2.0 | 2.2 | 2.4 |
| 4289 | 35% | 64% | 1.5% | 0.8 to 3 | 1.8 to 2.8 | 2.0 | 2.2 | 2.4 |
| 4290 | 36% | 63% | 1.5% | 0.8 to 3 | 1.8 to 2.8 | 2.0 | 2.2 | 2.4 |
| 4291 | 37% | 62% | 1.5% | 0.8 to 3 | 1.8 to 2.8 | 2.0 | 2.2 | 2.4 |
| 4292 | 38% | 61% | 1.5% | 0.8 to 3 | 1.8 to 2.8 | 2.0 | 2.2 | 2.4 |
| 4293 | 39% | 60% | 1.5% | 0.8 to 3 | 1.8 to 2.8 | 2.0 | 2.2 | 2.4 |
| 4294 | 40% | 59% | 1.5% | 0.8 to 3 | 1.8 to 2.8 | 2.0 | 2.2 | 2.4 |
| 4295 | 41% | 58% | 1.5% | 0.8 to 3 | 1.8 to 2.8 | 2.0 | 2.2 | 2.4 |
| 4296 | 42% | 57% | 1.5% | 0.8 to 3 | 1.8 to 2.8 | 2.0 | 2.2 | 2.4 |
| 4297 | 43% | 56% | 1.5% | 0.8 to 3 | 1.8 to 2.8 | 2.0 | 2.2 | 2.4 |
| 4298 | 44% | 55% | 1.5% | 0.8 to 3 | 1.8 to 2.8 | 2.0 | 2.2 | 2.4 |
| 4299 | 45% | 54% | 1.5% | 0.8 to 3 | 1.8 to 2.8 | 2.0 | 2.2 | 2.4 |
| 4300 | 46% | 53% | 1.5% | 0.8 to 3 | 1.8 to 2.8 | 2.0 | 2.2 | 2.4 |
| 4301 | 47% | 52% | 1.5% | 0.8 to 3 | 1.8 to 2.8 | 2.0 | 2.2 | 2.4 |
| 4302 | 48% | 51% | 1.5% | 0.8 to 3 | 1.8 to 2.8 | 2.0 | 2.2 | 2.4 |
| 4303 | 49% | 50% | 1.5% | 0.8 to 3 | 1.8 to 2.8 | 2.0 | 2.2 | 2.4 |
| 4304 | 50% | 49% | 1.5% | 0.8 to 3 | 1.8 to 2.8 | 2.0 | 2.2 | 2.4 |
| 4305 | 51% | 48% | 1.5% | 0.8 to 3 | 1.8 to 2.8 | 2.0 | 2.2 | 2.4 |
| 4306 | 52% | 47% | 1.5% | 0.8 to 3 | 1.8 to 2.8 | 2.0 | 2.2 | 2.4 |
| 4307 | 53% | 46% | 1.5% | 0.8 to 3 | 1.8 to 2.8 | 2.0 | 2.2 | 2.4 |
| 4308 | 54% | 45% | 1.5% | 0.8 to 3 | 1.8 to 2.8 | 2.0 | 2.2 | 2.4 |
| 4309 | 55% | 44% | 1.5% | 0.8 to 3 | 1.8 to 2.8 | 2.0 | 2.2 | 2.4 |
| 4310 | 56% | 43% | 1.5% | 0.8 to 3 | 1.8 to 2.8 | 2.0 | 2.2 | 2.4 |
| 4311 | 57% | 42% | 1.5% | 0.8 to 3 | 1.8 to 2.8 | 2.0 | 2.2 | 2.4 |
| 4312 | 58% | 41% | 1.5% | 0.8 to 3 | 1.8 to 2.8 | 2.0 | 2.2 | 2.4 |
| 4313 | 59% | 40% | 1.5% | 0.8 to 3 | 1.8 to 2.8 | 2.0 | 2.2 | 2.4 |
| 4314 | 60% | 39% | 1.5% | 0.8 to 3 | 1.8 to 2.8 | 2.0 | 2.2 | 2.4 |
| 4315 | 30% | 68% | 2% | 0.8 to 3 | 1.8 to 2.8 | 2.0 | 2.2 | 2.4 |
| 4316 | 31% | 67% | 2% | 0.8 to 3 | 1.8 to 2.8 | 2.0 | 2.2 | 2.4 |
| 4317 | 32% | 66% | 2% | 0.8 to 3 | 1.8 to 2.8 | 2.0 | 2.2 | 2.4 |
| 4318 | 33% | 65% | 2% | 0.8 to 3 | 1.8 to 2.8 | 2.0 | 2.2 | 2.4 |
| 4319 | 34% | 64% | 2% | 0.8 to 3 | 1.8 to 2.8 | 2.0 | 2.2 | 2.4 |
| 4320 | 35% | 63% | 2% | 0.8 to 3 | 1.8 to 2.8 | 2.0 | 2.2 | 2.4 |
| 4321 | 36% | 62% | 2% | 0.8 to 3 | 1.8 to 2.8 | 2.0 | 2.2 | 2.4 |
| 4322 | 37% | 61% | 2% | 0.8 to 3 | 1.8 to 2.8 | 2.0 | 2.2 | 2.4 |
| 4323 | 38% | 60% | 2% | 0.8 to 3 | 1.8 to 2.8 | 2.0 | 2.2 | 2.4 |
| 4324 | 39% | 59% | 2% | 0.8 to 3 | 1.8 to 2.8 | 2.0 | 2.2 | 2.4 |
| 4325 | 40% | 58% | 2% | 0.8 to 3 | 1.8 to 2.8 | 2.0 | 2.2 | 2.4 |
| 4326 | 41% | 57% | 2% | 0.8 to 3 | 1.8 to 2.8 | 2.0 | 2.2 | 2.4 |
| 4327 | 42% | 56% | 2% | 0.8 to 3 | 1.8 to 2.8 | 2.0 | 2.2 | 2.4 |
| 4328 | 43% | 55% | 2% | 0.8 to 3 | 1.8 to 2.8 | 2.0 | 2.2 | 2.4 |
| 4329 | 44% | 54% | 2% | 0.8 to 3 | 1.8 to 2.8 | 2.0 | 2.2 | 2.4 |
| 4330 | 45% | 53% | 2% | 0.8 to 3 | 1.8 to 2.8 | 2.0 | 2.2 | 2.4 |
| 4331 | 46% | 52% | 2% | 0.8 to 3 | 1.8 to 2.8 | 2.0 | 2.2 | 2.4 |
| 4332 | 47% | 51% | 2% | 0.8 to 3 | 1.8 to 2.8 | 2.0 | 2.2 | 2.4 |
| 4333 | 48% | 50% | 2% | 0.8 to 3 | 1.8 to 2.8 | 2.0 | 2.2 | 2.4 |
| 4334 | 49% | 49% | 2% | 0.8 to 3 | 1.8 to 2.8 | 2.0 | 2.2 | 2.4 |
| 4335 | 50% | 48% | 2% | 0.8 to 3 | 1.8 to 2.8 | 2.0 | 2.2 | 2.4 |
| 4336 | 51% | 47% | 2% | 0.8 to 3 | 1.8 to 2.8 | 2.0 | 2.2 | 2.4 |
| 4337 | 52% | 46% | 2% | 0.8 to 3 | 1.8 to 2.8 | 2.0 | 2.2 | 2.4 |
| 4338 | 53% | 45% | 2% | 0.8 to 3 | 1.8 to 2.8 | 2.0 | 2.2 | 2.4 |
| 4339 | 54% | 44% | 2% | 0.8 to 3 | 1.8 to 2.8 | 2.0 | 2.2 | 2.4 |
| 4340 | 55% | 43% | 2% | 0.8 to 3 | 1.8 to 2.8 | 2.0 | 2.2 | 2.4 |
| 4341 | 56% | 42% | 2% | 0.8 to 3 | 1.8 to 2.8 | 2.0 | 2.2 | 2.4 |
| 4342 | 57% | 41% | 2% | 0.8 to 3 | 1.8 to 2.8 | 2.0 | 2.2 | 2.4 |
| 4343 | 58% | 40% | 2% | 0.8 to 3 | 1.8 to 2.8 | 2.0 | 2.2 | 2.4 |
| 4344 | 59% | 39% | 2% | 0.8 to 3 | 1.8 to 2.8 | 2.0 | 2.2 | 2.4 |
| 4345 | 60% | 38% | 2% | 0.8 to 3 | 1.8 to 2.8 | 2.0 | 2.2 | 2.4 |
| 4346 | 30% | 68% | 2.5% | 0.8 to 3 | 1.8 to 2.8 | 2.0 | 2.2 | 2.4 |
| 4347 | 31% | 67% | 2.5% | 0.8 to 3 | 1.8 to 2.8 | 2.0 | 2.2 | 2.4 |
| 4348 | 32% | 66% | 2.5% | 0.8 to 3 | 1.8 to 2.8 | 2.0 | 2.2 | 2.4 |
| 4349 | 33% | 65% | 2.5% | 0.8 to 3 | 1.8 to 2.8 | 2.0 | 2.2 | 2.4 |
| 4350 | 34% | 64% | 2.5% | 0.8 to 3 | 1.8 to 2.8 | 2.0 | 2.2 | 2.4 |
| 4351 | 35% | 63% | 2.5% | 0.8 to 3 | 1.8 to 2.8 | 2.0 | 2.2 | 2.4 |
| 4352 | 36% | 62% | 2.5% | 0.8 to 3 | 1.8 to 2.8 | 2.0 | 2.2 | 2.4 |
| 4353 | 37% | 61% | 2.5% | 0.8 to 3 | 1.8 to 2.8 | 2.0 | 2.2 | 2.4 |
| 4354 | 38% | 60% | 2.5% | 0.8 to 3 | 1.8 to 2.8 | 2.0 | 2.2 | 2.4 |
| 4355 | 39% | 59% | 2.5% | 0.8 to 3 | 1.8 to 2.8 | 2.0 | 2.2 | 2.4 |
| 4356 | 40% | 58% | 2.5% | 0.8 to 3 | 1.8 to 2.8 | 2.0 | 2.2 | 2.4 |
| 4357 | 41% | 57% | 2.5% | 0.8 to 3 | 1.8 to 2.8 | 2.0 | 2.2 | 2.4 |
| 4358 | 42% | 56% | 2.5% | 0.8 to 3 | 1.8 to 2.8 | 2.0 | 2.2 | 2.4 |
| 4359 | 43% | 55% | 2.5% | 0.8 to 3 | 1.8 to 2.8 | 2.0 | 2.2 | 2.4 |
| 4360 | 44% | 54% | 2.5% | 0.8 to 3 | 1.8 to 2.8 | 2.0 | 2.2 | 2.4 |
| 4361 | 45% | 53% | 2.5% | 0.8 to 3 | 1.8 to 2.8 | 2.0 | 2.2 | 2.4 |
| 4362 | 46% | 52% | 2.5% | 0.8 to 3 | 1.8 to 2.8 | 2.0 | 2.2 | 2.4 |
| 4363 | 47% | 51% | 2.5% | 0.8 to 3 | 1.8 to 2.8 | 2.0 | 2.2 | 2.4 |
| 4364 | 48% | 50% | 2.5% | 0.8 to 3 | 1.8 to 2.8 | 2.0 | 2.2 | 2.4 |
| 4365 | 49% | 49% | 2.5% | 0.8 to 3 | 1.8 to 2.8 | 2.0 | 2.2 | 2.4 |
| 4366 | 50% | 48% | 2.5% | 0.8 to 3 | 1.8 to 2.8 | 2.0 | 2.2 | 2.4 |
| 4367 | 51% | 47% | 2.5% | 0.8 to 3 | 1.8 to 2.8 | 2.0 | 2.2 | 2.4 |
| 4368 | 52% | 46% | 2.5% | 0.8 to 3 | 1.8 to 2.8 | 2.0 | 2.2 | 2.4 |
| 4369 | 53% | 45% | 2.5% | 0.8 to 3 | 1.8 to 2.8 | 2.0 | 2.2 | 2.4 |
| 4370 | 54% | 44% | 2.5% | 0.8 to 3 | 1.8 to 2.8 | 2.0 | 2.2 | 2.4 |
| 4371 | 55% | 43% | 2.5% | 0.8 to 3 | 1.8 to 2.8 | 2.0 | 2.2 | 2.4 |
| 4372 | 56% | 42% | 2.5% | 0.8 to 3 | 1.8 to 2.8 | 2.0 | 2.2 | 2.4 |
| 4373 | 57% | 41% | 2.5% | 0.8 to 3 | 1.8 to 2.8 | 2.0 | 2.2 | 2.4 |
| 4374 | 58% | 40% | 2.5% | 0.8 to 3 | 1.8 to 2.8 | 2.0 | 2.2 | 2.4 |
| 4375 | 59% | 39% | 2.5% | 0.8 to 3 | 1.8 to 2.8 | 2.0 | 2.2 | 2.4 |
| 4376 | 60% | 38% | 2.5% | 0.8 to 3 | 1.8 to 2.8 | 2.0 | 2.2 | 2.4 |
| 4377 | 30% | 67% | 3% | 0.8 to 3 | 1.8 to 2.8 | 2.0 | 2.2 | 2.4 |
| 4378 | 31% | 66% | 3% | 0.8 to 3 | 1.8 to 2.8 | 2.0 | 2.2 | 2.4 |
| 4379 | 32% | 65% | 3% | 0.8 to 3 | 1.8 to 2.8 | 2.0 | 2.2 | 2.4 |
| 4380 | 33% | 64% | 3% | 0.8 to 3 | 1.8 to 2.8 | 2.0 | 2.2 | 2.4 |
| 4381 | 34% | 63% | 3% | 0.8 to 3 | 1.8 to 2.8 | 2.0 | 2.2 | 2.4 |
| 4382 | 35% | 62% | 3% | 0.8 to 3 | 1.8 to 2.8 | 2.0 | 2.2 | 2.4 |
| 4383 | 36% | 61% | 3% | 0.8 to 3 | 1.8 to 2.8 | 2.0 | 2.2 | 2.4 |
| 4384 | 37% | 60% | 3% | 0.8 to 3 | 1.8 to 2.8 | 2.0 | 2.2 | 2.4 |
| 4385 | 38% | 59% | 3% | 0.8 to 3 | 1.8 to 2.8 | 2.0 | 2.2 | 2.4 |
| 4386 | 39% | 58% | 3% | 0.8 to 3 | 1.8 to 2.8 | 2.0 | 2.2 | 2.4 |
| 4387 | 40% | 57% | 3% | 0.8 to 3 | 1.8 to 2.8 | 2.0 | 2.2 | 2.4 |
| 4388 | 41% | 56% | 3% | 0.8 to 3 | 1.8 to 2.8 | 2.0 | 2.2 | 2.4 |
| 4389 | 42% | 55% | 3% | 0.8 to 3 | 1.8 to 2.8 | 2.0 | 2.2 | 2.4 |
| 4390 | 43% | 54% | 3% | 0.8 to 3 | 1.8 to 2.8 | 2.0 | 2.2 | 2.4 |
| 4391 | 44% | 53% | 3% | 0.8 to 3 | 1.8 to 2.8 | 2.0 | 2.2 | 2.4 |
| 4392 | 45% | 52% | 3% | 0.8 to 3 | 1.8 to 2.8 | 2.0 | 2.2 | 2.4 |
| 4393 | 46% | 51% | 3% | 0.8 to 3 | 1.8 to 2.8 | 2.0 | 2.2 | 2.4 |
| 4394 | 47% | 50% | 3% | 0.8 to 3 | 1.8 to 2.8 | 2.0 | 2.2 | 2.4 |
| 4395 | 48% | 49% | 3% | 0.8 to 3 | 1.8 to 2.8 | 2.0 | 2.2 | 2.4 |
| 4396 | 49% | 48% | 3% | 0.8 to 3 | 1.8 to 2.8 | 2.0 | 2.2 | 2.4 |
| 4397 | 50% | 47% | 3% | 0.8 to 3 | 1.8 to 2.8 | 2.0 | 2.2 | 2.4 |
| 4398 | 51% | 46% | 3% | 0.8 to 3 | 1.8 to 2.8 | 2.0 | 2.2 | 2.4 |
| 4399 | 52% | 45% | 3% | 0.8 to 3 | 1.8 to 2.8 | 2.0 | 2.2 | 2.4 |
| 4400 | 53% | 44% | 3% | 0.8 to 3 | 1.8 to 2.8 | 2.0 | 2.2 | 2.4 |
| 4401 | 54% | 43% | 3% | 0.8 to 3 | 1.8 to 2.8 | 2.0 | 2.2 | 2.4 |
| 4402 | 55% | 42% | 3% | 0.8 to 3 | 1.8 to 2.8 | 2.0 | 2.2 | 2.4 |
| 4403 | 56% | 41% | 3% | 0.8 to 3 | 1.8 to 2.8 | 2.0 | 2.2 | 2.4 |
| 4404 | 57% | 40% | 3% | 0.8 to 3 | 1.8 to 2.8 | 2.0 | 2.2 | 2.4 |
| 4405 | 58% | 39% | 3% | 0.8 to 3 | 1.8 to 2.8 | 2.0 | 2.2 | 2.4 |
| 4406 | 59% | 38% | 3% | 0.8 to 3 | 1.8 to 2.8 | 2.0 | 2.2 | 2.4 |
| 4407 | 60% | 37% | 3% | 0.8 to 3 | 1.8 to 2.8 | 2.0 | 2.2 | 2.4 |
| 4408 | 30% | 67% | 3.5% | 0.8 to 3 | 1.8 to 2.8 | 2.0 | 2.2 | 2.4 |
| 4409 | 31% | 66% | 3.5% | 0.8 to 3 | 1.8 to 2.8 | 2.0 | 2.2 | 2.4 |
| 4410 | 32% | 65% | 3.5% | 0.8 to 3 | 1.8 to 2.8 | 2.0 | 2.2 | 2.4 |
| 4411 | 33% | 64% | 3.5% | 0.8 to 3 | 1.8 to 2.8 | 2.0 | 2.2 | 2.4 |
| 4412 | 34% | 63% | 3.5% | 0.8 to 3 | 1.8 to 2.8 | 2.0 | 2.2 | 2.4 |
| 4413 | 35% | 62% | 3.5% | 0.8 to 3 | 1.8 to 2.8 | 2.0 | 2.2 | 2.4 |
| 4414 | 36% | 61% | 3.5% | 0.8 to 3 | 1.8 to 2.8 | 2.0 | 2.2 | 2.4 |
| 4415 | 37% | 60% | 3.5% | 0.8 to 3 | 1.8 to 2.8 | 2.0 | 2.2 | 2.4 |
| 4416 | 38% | 59% | 3.5% | 0.8 to 3 | 1.8 to 2.8 | 2.0 | 2.2 | 2.4 |
| 4417 | 39% | 58% | 3.5% | 0.8 to 3 | 1.8 to 2.8 | 2.0 | 2.2 | 2.4 |
| 4418 | 40% | 57% | 3.5% | 0.8 to 3 | 1.8 to 2.8 | 2.0 | 2.2 | 2.4 |
| 4419 | 41% | 56% | 3.5% | 0.8 to 3 | 1.8 to 2.8 | 2.0 | 2.2 | 2.4 |
| 4420 | 42% | 55% | 3.5% | 0.8 to 3 | 1.8 to 2.8 | 2.0 | 2.2 | 2.4 |
| 4421 | 43% | 54% | 3.5% | 0.8 to 3 | 1.8 to 2.8 | 2.0 | 2.2 | 2.4 |
| 4422 | 44% | 53% | 3.5% | 0.8 to 3 | 1.8 to 2.8 | 2.0 | 2.2 | 2.4 |

TABLE 10-continued

| | Alkyl Sulfate Alkyl Chain Length, Wt. % | | Alkyl Chain Length, Wt. % | Alkyl Ether Sulfate Average mol. EO (Alternatives for each numbered species) | | | | |
|---|---|---|---|---|---|---|---|---|
| Species | 8 | 10 to 12 | 8 to 10 | Range A | Range B | Species C | Species D | Species E |
| 4423 | 45% | 52% | 3.5% | 0.8 to 3 | 1.8 to 2.8 | 2.0 | 2.2 | 2.4 |
| 4424 | 46% | 51% | 3.5% | 0.8 to 3 | 1.8 to 2.8 | 2.0 | 2.2 | 2.4 |
| 4425 | 47% | 50% | 3.5% | 0.8 to 3 | 1.8 to 2.8 | 2.0 | 2.2 | 2.4 |
| 4426 | 48% | 49% | 3.5% | 0.8 to 3 | 1.8 to 2.8 | 2.0 | 2.2 | 2.4 |
| 4427 | 49% | 48% | 3.5% | 0.8 to 3 | 1.8 to 2.8 | 2.0 | 2.2 | 2.4 |
| 4428 | 50% | 47% | 3.5% | 0.8 to 3 | 1.8 to 2.8 | 2.0 | 2.2 | 2.4 |
| 4429 | 51% | 46% | 3.5% | 0.8 to 3 | 1.8 to 2.8 | 2.0 | 2.2 | 2.4 |
| 4430 | 52% | 45% | 3.5% | 0.8 to 3 | 1.8 to 2.8 | 2.0 | 2.2 | 2.4 |
| 4431 | 53% | 44% | 3.5% | 0.8 to 3 | 1.8 to 2.8 | 2.0 | 2.2 | 2.4 |
| 4432 | 54% | 43% | 3.5% | 0.8 to 3 | 1.8 to 2.8 | 2.0 | 2.2 | 2.4 |
| 4433 | 55% | 42% | 3.5% | 0.8 to 3 | 1.8 to 2.8 | 2.0 | 2.2 | 2.4 |
| 4434 | 56% | 41% | 3.5% | 0.8 to 3 | 1.8 to 2.8 | 2.0 | 2.2 | 2.4 |
| 4435 | 57% | 40% | 3.5% | 0.8 to 3 | 1.8 to 2.8 | 2.0 | 2.2 | 2.4 |
| 4436 | 58% | 39% | 3.5% | 0.8 to 3 | 1.8 to 2.8 | 2.0 | 2.2 | 2.4 |
| 4437 | 59% | 38% | 3.5% | 0.8 to 3 | 1.8 to 2.8 | 2.0 | 2.2 | 2.4 |
| 4438 | 60% | 37% | 3.5% | 0.8 to 3 | 1.8 to 2.8 | 2.0 | 2.2 | 2.4 |
| 4439 | 30% | 66% | 4% | 0.8 to 3 | 1.8 to 2.8 | 2.0 | 2.2 | 2.4 |
| 4440 | 31% | 65% | 4% | 0.8 to 3 | 1.8 to 2.8 | 2.0 | 2.2 | 2.4 |
| 4441 | 32% | 64% | 4% | 0.8 to 3 | 1.8 to 2.8 | 2.0 | 2.2 | 2.4 |
| 4442 | 33% | 63% | 4% | 0.8 to 3 | 1.8 to 2.8 | 2.0 | 2.2 | 2.4 |
| 4443 | 34% | 62% | 4% | 0.8 to 3 | 1.8 to 2.8 | 2.0 | 2.2 | 2.4 |
| 4444 | 35% | 61% | 4% | 0.8 to 3 | 1.8 to 2.8 | 2.0 | 2.2 | 2.4 |
| 4445 | 36% | 60% | 4% | 0.8 to 3 | 1.8 to 2.8 | 2.0 | 2.2 | 2.4 |
| 4446 | 37% | 59% | 4% | 0.8 to 3 | 1.8 to 2.8 | 2.0 | 2.2 | 2.4 |
| 4447 | 38% | 58% | 4% | 0.8 to 3 | 1.8 to 2.8 | 2.0 | 2.2 | 2.4 |
| 4448 | 39% | 57% | 4% | 0.8 to 3 | 1.8 to 2.8 | 2.0 | 2.2 | 2.4 |
| 4449 | 40% | 56% | 4% | 0.8 to 3 | 1.8 to 2.8 | 2.0 | 2.2 | 2.4 |
| 4450 | 41% | 55% | 4% | 0.8 to 3 | 1.8 to 2.8 | 2.0 | 2.2 | 2.4 |
| 4451 | 42% | 54% | 4% | 0.8 to 3 | 1.8 to 2.8 | 2.0 | 2.2 | 2.4 |
| 4452 | 43% | 53% | 4% | 0.8 to 3 | 1.8 to 2.8 | 2.0 | 2.2 | 2.4 |
| 4453 | 44% | 52% | 4% | 0.8 to 3 | 1.8 to 2.8 | 2.0 | 2.2 | 2.4 |
| 4454 | 45% | 51% | 4% | 0.8 to 3 | 1.8 to 2.8 | 2.0 | 2.2 | 2.4 |
| 4455 | 46% | 50% | 4% | 0.8 to 3 | 1.8 to 2.8 | 2.0 | 2.2 | 2.4 |
| 4456 | 47% | 49% | 4% | 0.8 to 3 | 1.8 to 2.8 | 2.0 | 2.2 | 2.4 |
| 4457 | 48% | 48% | 4% | 0.8 to 3 | 1.8 to 2.8 | 2.0 | 2.2 | 2.4 |
| 4458 | 49% | 47% | 4% | 0.8 to 3 | 1.8 to 2.8 | 2.0 | 2.2 | 2.4 |
| 4459 | 50% | 46% | 4% | 0.8 to 3 | 1.8 to 2.8 | 2.0 | 2.2 | 2.4 |
| 4460 | 51% | 45% | 4% | 0.8 to 3 | 1.8 to 2.8 | 2.0 | 2.2 | 2.4 |
| 4461 | 52% | 44% | 4% | 0.8 to 3 | 1.8 to 2.8 | 2.0 | 2.2 | 2.4 |
| 4462 | 53% | 43% | 4% | 0.8 to 3 | 1.8 to 2.8 | 2.0 | 2.2 | 2.4 |
| 4463 | 54% | 42% | 4% | 0.8 to 3 | 1.8 to 2.8 | 2.0 | 2.2 | 2.4 |
| 4464 | 55% | 41% | 4% | 0.8 to 3 | 1.8 to 2.8 | 2.0 | 2.2 | 2.4 |
| 4465 | 56% | 40% | 4% | 0.8 to 3 | 1.8 to 2.8 | 2.0 | 2.2 | 2.4 |
| 4466 | 57% | 39% | 4% | 0.8 to 3 | 1.8 to 2.8 | 2.0 | 2.2 | 2.4 |
| 4467 | 58% | 38% | 4% | 0.8 to 3 | 1.8 to 2.8 | 2.0 | 2.2 | 2.4 |
| 4468 | 59% | 37% | 4% | 0.8 to 3 | 1.8 to 2.8 | 2.0 | 2.2 | 2.4 |
| 4469 | 60% | 36% | 4% | 0.8 to 3 | 1.8 to 2.8 | 2.0 | 2.2 | 2.4 |
| 4470 | 30% | 66% | 4.5% | 0.8 to 3 | 1.8 to 2.8 | 2.0 | 2.2 | 2.4 |
| 4471 | 31% | 65% | 4.5% | 0.8 to 3 | 1.8 to 2.8 | 2.0 | 2.2 | 2.4 |
| 4472 | 32% | 64% | 4.5% | 0.8 to 3 | 1.8 to 2.8 | 2.0 | 2.2 | 2.4 |
| 4473 | 33% | 63% | 4.5% | 0.8 to 3 | 1.8 to 2.8 | 2.0 | 2.2 | 2.4 |
| 4474 | 34% | 62% | 4.5% | 0.8 to 3 | 1.8 to 2.8 | 2.0 | 2.2 | 2.4 |
| 4475 | 35% | 61% | 4.5% | 0.8 to 3 | 1.8 to 2.8 | 2.0 | 2.2 | 2.4 |
| 4476 | 36% | 60% | 4.5% | 0.8 to 3 | 1.8 to 2.8 | 2.0 | 2.2 | 2.4 |
| 4477 | 37% | 59% | 4.5% | 0.8 to 3 | 1.8 to 2.8 | 2.0 | 2.2 | 2.4 |
| 4478 | 38% | 58% | 4.5% | 0.8 to 3 | 1.8 to 2.8 | 2.0 | 2.2 | 2.4 |
| 4479 | 39% | 57% | 4.5% | 0.8 to 3 | 1.8 to 2.8 | 2.0 | 2.2 | 2.4 |
| 4480 | 40% | 56% | 4.5% | 0.8 to 3 | 1.8 to 2.8 | 2.0 | 2.2 | 2.4 |
| 4481 | 41% | 55% | 4.5% | 0.8 to 3 | 1.8 to 2.8 | 2.0 | 2.2 | 2.4 |
| 4482 | 42% | 54% | 4.5% | 0.8 to 3 | 1.8 to 2.8 | 2.0 | 2.2 | 2.4 |
| 4483 | 43% | 53% | 4.5% | 0.8 to 3 | 1.8 to 2.8 | 2.0 | 2.2 | 2.4 |
| 4484 | 44% | 52% | 4.5% | 0.8 to 3 | 1.8 to 2.8 | 2.0 | 2.2 | 2.4 |
| 4485 | 45% | 51% | 4.5% | 0.8 to 3 | 1.8 to 2.8 | 2.0 | 2.2 | 2.4 |
| 4486 | 46% | 50% | 4.5% | 0.8 to 3 | 1.8 to 2.8 | 2.0 | 2.2 | 2.4 |
| 4487 | 47% | 49% | 4.5% | 0.8 to 3 | 1.8 to 2.8 | 2.0 | 2.2 | 2.4 |
| 4488 | 48% | 48% | 4.5% | 0.8 to 3 | 1.8 to 2.8 | 2.0 | 2.2 | 2.4 |
| 4489 | 49% | 47% | 4.5% | 0.8 to 3 | 1.8 to 2.8 | 2.0 | 2.2 | 2.4 |
| 4490 | 50% | 46% | 4.5% | 0.8 to 3 | 1.8 to 2.8 | 2.0 | 2.2 | 2.4 |
| 4491 | 51% | 45% | 4.5% | 0.8 to 3 | 1.8 to 2.8 | 2.0 | 2.2 | 2.4 |
| 4492 | 52% | 44% | 4.5% | 0.8 to 3 | 1.8 to 2.8 | 2.0 | 2.2 | 2.4 |
| 4493 | 53% | 43% | 4.5% | 0.8 to 3 | 1.8 to 2.8 | 2.0 | 2.2 | 2.4 |
| 4494 | 54% | 42% | 4.5% | 0.8 to 3 | 1.8 to 2.8 | 2.0 | 2.2 | 2.4 |
| 4495 | 55% | 41% | 4.5% | 0.8 to 3 | 1.8 to 2.8 | 2.0 | 2.2 | 2.4 |
| 4496 | 56% | 40% | 4.5% | 0.8 to 3 | 1.8 to 2.8 | 2.0 | 2.2 | 2.4 |
| 4497 | 57% | 39% | 4.5% | 0.8 to 3 | 1.8 to 2.8 | 2.0 | 2.2 | 2.4 |
| 4498 | 58% | 38% | 4.5% | 0.8 to 3 | 1.8 to 2.8 | 2.0 | 2.2 | 2.4 |
| 4499 | 59% | 37% | 4.5% | 0.8 to 3 | 1.8 to 2.8 | 2.0 | 2.2 | 2.4 |
| 4500 | 60% | 36% | 4.5% | 0.8 to 3 | 1.8 to 2.8 | 2.0 | 2.2 | 2.4 |
| 4501 | 30% | 65% | 5% | 0.8 to 3 | 1.8 to 2.8 | 2.0 | 2.2 | 2.4 |
| 4502 | 31% | 64% | 5% | 0.8 to 3 | 1.8 to 2.8 | 2.0 | 2.2 | 2.4 |
| 4503 | 32% | 63% | 5% | 0.8 to 3 | 1.8 to 2.8 | 2.0 | 2.2 | 2.4 |
| 4504 | 33% | 62% | 5% | 0.8 to 3 | 1.8 to 2.8 | 2.0 | 2.2 | 2.4 |
| 4505 | 34% | 61% | 5% | 0.8 to 3 | 1.8 to 2.8 | 2.0 | 2.2 | 2.4 |
| 4506 | 35% | 60% | 5% | 0.8 to 3 | 1.8 to 2.8 | 2.0 | 2.2 | 2.4 |
| 4507 | 36% | 59% | 5% | 0.8 to 3 | 1.8 to 2.8 | 2.0 | 2.2 | 2.4 |
| 4508 | 37% | 58% | 5% | 0.8 to 3 | 1.8 to 2.8 | 2.0 | 2.2 | 2.4 |
| 4509 | 38% | 57% | 5% | 0.8 to 3 | 1.8 to 2.8 | 2.0 | 2.2 | 2.4 |
| 4510 | 39% | 56% | 5% | 0.8 to 3 | 1.8 to 2.8 | 2.0 | 2.2 | 2.4 |
| 4511 | 40% | 55% | 5% | 0.8 to 3 | 1.8 to 2.8 | 2.0 | 2.2 | 2.4 |
| 4512 | 41% | 54% | 5% | 0.8 to 3 | 1.8 to 2.8 | 2.0 | 2.2 | 2.4 |
| 4513 | 42% | 53% | 5% | 0.8 to 3 | 1.8 to 2.8 | 2.0 | 2.2 | 2.4 |
| 4514 | 43% | 52% | 5% | 0.8 to 3 | 1.8 to 2.8 | 2.0 | 2.2 | 2.4 |
| 4515 | 44% | 51% | 5% | 0.8 to 3 | 1.8 to 2.8 | 2.0 | 2.2 | 2.4 |
| 4516 | 45% | 50% | 5% | 0.8 to 3 | 1.8 to 2.8 | 2.0 | 2.2 | 2.4 |
| 4517 | 46% | 49% | 5% | 0.8 to 3 | 1.8 to 2.8 | 2.0 | 2.2 | 2.4 |
| 4518 | 47% | 48% | 5% | 0.8 to 3 | 1.8 to 2.8 | 2.0 | 2.2 | 2.4 |
| 4519 | 48% | 47% | 5% | 0.8 to 3 | 1.8 to 2.8 | 2.0 | 2.2 | 2.4 |
| 4520 | 49% | 46% | 5% | 0.8 to 3 | 1.8 to 2.8 | 2.0 | 2.2 | 2.4 |
| 4521 | 50% | 45% | 5% | 0.8 to 3 | 1.8 to 2.8 | 2.0 | 2.2 | 2.4 |
| 4522 | 51% | 44% | 5% | 0.8 to 3 | 1.8 to 2.8 | 2.0 | 2.2 | 2.4 |
| 4523 | 52% | 43% | 5% | 0.8 to 3 | 1.8 to 2.8 | 2.0 | 2.2 | 2.4 |
| 4524 | 53% | 42% | 5% | 0.8 to 3 | 1.8 to 2.8 | 2.0 | 2.2 | 2.4 |
| 4525 | 54% | 41% | 5% | 0.8 to 3 | 1.8 to 2.8 | 2.0 | 2.2 | 2.4 |
| 4526 | 55% | 40% | 5% | 0.8 to 3 | 1.8 to 2.8 | 2.0 | 2.2 | 2.4 |
| 4527 | 56% | 39% | 5% | 0.8 to 3 | 1.8 to 2.8 | 2.0 | 2.2 | 2.4 |
| 4528 | 57% | 38% | 5% | 0.8 to 3 | 1.8 to 2.8 | 2.0 | 2.2 | 2.4 |
| 4529 | 58% | 37% | 5% | 0.8 to 3 | 1.8 to 2.8 | 2.0 | 2.2 | 2.4 |
| 4530 | 59% | 36% | 5% | 0.8 to 3 | 1.8 to 2.8 | 2.0 | 2.2 | 2.4 |
| 4531 | 60% | 35% | 5% | 0.8 to 3 | 1.8 to 2.8 | 2.0 | 2.2 | 2.4 |
| 4532 | 30% | 65% | 5.5% | 0.8 to 3 | 1.8 to 2.8 | 2.0 | 2.2 | 2.4 |
| 4533 | 31% | 64% | 5.5% | 0.8 to 3 | 1.8 to 2.8 | 2.0 | 2.2 | 2.4 |
| 4534 | 32% | 63% | 5.5% | 0.8 to 3 | 1.8 to 2.8 | 2.0 | 2.2 | 2.4 |
| 4535 | 33% | 62% | 5.5% | 0.8 to 3 | 1.8 to 2.8 | 2.0 | 2.2 | 2.4 |
| 4536 | 34% | 61% | 5.5% | 0.8 to 3 | 1.8 to 2.8 | 2.0 | 2.2 | 2.4 |
| 4537 | 35% | 60% | 5.5% | 0.8 to 3 | 1.8 to 2.8 | 2.0 | 2.2 | 2.4 |
| 4538 | 36% | 59% | 5.5% | 0.8 to 3 | 1.8 to 2.8 | 2.0 | 2.2 | 2.4 |
| 4539 | 37% | 58% | 5.5% | 0.8 to 3 | 1.8 to 2.8 | 2.0 | 2.2 | 2.4 |
| 4540 | 38% | 57% | 5.5% | 0.8 to 3 | 1.8 to 2.8 | 2.0 | 2.2 | 2.4 |
| 4541 | 39% | 56% | 5.5% | 0.8 to 3 | 1.8 to 2.8 | 2.0 | 2.2 | 2.4 |
| 4542 | 40% | 55% | 5.5% | 0.8 to 3 | 1.8 to 2.8 | 2.0 | 2.2 | 2.4 |
| 4543 | 41% | 54% | 5.5% | 0.8 to 3 | 1.8 to 2.8 | 2.0 | 2.2 | 2.4 |
| 4544 | 42% | 53% | 5.5% | 0.8 to 3 | 1.8 to 2.8 | 2.0 | 2.2 | 2.4 |
| 4545 | 43% | 52% | 5.5% | 0.8 to 3 | 1.8 to 2.8 | 2.0 | 2.2 | 2.4 |
| 4546 | 44% | 51% | 5.5% | 0.8 to 3 | 1.8 to 2.8 | 2.0 | 2.2 | 2.4 |
| 4547 | 45% | 50% | 5.5% | 0.8 to 3 | 1.8 to 2.8 | 2.0 | 2.2 | 2.4 |
| 4548 | 46% | 49% | 5.5% | 0.8 to 3 | 1.8 to 2.8 | 2.0 | 2.2 | 2.4 |
| 4549 | 47% | 48% | 5.5% | 0.8 to 3 | 1.8 to 2.8 | 2.0 | 2.2 | 2.4 |
| 4550 | 48% | 47% | 5.5% | 0.8 to 3 | 1.8 to 2.8 | 2.0 | 2.2 | 2.4 |
| 4551 | 49% | 46% | 5.5% | 0.8 to 3 | 1.8 to 2.8 | 2.0 | 2.2 | 2.4 |
| 4552 | 50% | 45% | 5.5% | 0.8 to 3 | 1.8 to 2.8 | 2.0 | 2.2 | 2.4 |
| 4553 | 51% | 44% | 5.5% | 0.8 to 3 | 1.8 to 2.8 | 2.0 | 2.2 | 2.4 |
| 4554 | 52% | 43% | 5.5% | 0.8 to 3 | 1.8 to 2.8 | 2.0 | 2.2 | 2.4 |
| 4555 | 53% | 42% | 5.5% | 0.8 to 3 | 1.8 to 2.8 | 2.0 | 2.2 | 2.4 |
| 4556 | 54% | 41% | 5.5% | 0.8 to 3 | 1.8 to 2.8 | 2.0 | 2.2 | 2.4 |
| 4557 | 55% | 40% | 5.5% | 0.8 to 3 | 1.8 to 2.8 | 2.0 | 2.2 | 2.4 |
| 4558 | 56% | 39% | 5.5% | 0.8 to 3 | 1.8 to 2.8 | 2.0 | 2.2 | 2.4 |
| 4559 | 57% | 38% | 5.5% | 0.8 to 3 | 1.8 to 2.8 | 2.0 | 2.2 | 2.4 |
| 4560 | 58% | 37% | 5.5% | 0.8 to 3 | 1.8 to 2.8 | 2.0 | 2.2 | 2.4 |

TABLE 10-continued

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % | Average mol. EO (Alternatives for each numbered species) | | | | |
| Species | 8 | 10 to 12 | 8 to 10 | Range A | Range B | Species C | Species D | Species E |
| 4561 | 59% | 36% | 5.5% | 0.8 to 3 | 1.8 to 2.8 | 2.0 | 2.2 | 2.4 |
| 4562 | 60% | 35% | 5.5% | 0.8 to 3 | 1.8 to 2.8 | 2.0 | 2.2 | 2.4 |
| 4563 | 30% | 64% | 6% | 0.8 to 3 | 1.8 to 2.8 | 2.0 | 2.2 | 2.4 |
| 4564 | 31% | 63% | 6% | 0.8 to 3 | 1.8 to 2.8 | 2.0 | 2.2 | 2.4 |
| 4565 | 32% | 62% | 6% | 0.8 to 3 | 1.8 to 2.8 | 2.0 | 2.2 | 2.4 |
| 4566 | 33% | 61% | 6% | 0.8 to 3 | 1.8 to 2.8 | 2.0 | 2.2 | 2.4 |
| 4567 | 34% | 60% | 6% | 0.8 to 3 | 1.8 to 2.8 | 2.0 | 2.2 | 2.4 |
| 4568 | 35% | 59% | 6% | 0.8 to 3 | 1.8 to 2.8 | 2.0 | 2.2 | 2.4 |
| 4569 | 36% | 58% | 6% | 0.8 to 3 | 1.8 to 2.8 | 2.0 | 2.2 | 2.4 |
| 4570 | 37% | 57% | 6% | 0.8 to 3 | 1.8 to 2.8 | 2.0 | 2.2 | 2.4 |
| 4571 | 38% | 56% | 6% | 0.8 to 3 | 1.8 to 2.8 | 2.0 | 2.2 | 2.4 |
| 4572 | 39% | 55% | 6% | 0.8 to 3 | 1.8 to 2.8 | 2.0 | 2.2 | 2.4 |
| 4573 | 40% | 54% | 6% | 0.8 to 3 | 1.8 to 2.8 | 2.0 | 2.2 | 2.4 |
| 4574 | 41% | 53% | 6% | 0.8 to 3 | 1.8 to 2.8 | 2.0 | 2.2 | 2.4 |
| 4575 | 42% | 52% | 6% | 0.8 to 3 | 1.8 to 2.8 | 2.0 | 2.2 | 2.4 |
| 4576 | 43% | 51% | 6% | 0.8 to 3 | 1.8 to 2.8 | 2.0 | 2.2 | 2.4 |
| 4577 | 44% | 50% | 6% | 0.8 to 3 | 1.8 to 2.8 | 2.0 | 2.2 | 2.4 |
| 4578 | 45% | 49% | 6% | 0.8 to 3 | 1.8 to 2.8 | 2.0 | 2.2 | 2.4 |
| 4579 | 46% | 48% | 6% | 0.8 to 3 | 1.8 to 2.8 | 2.0 | 2.2 | 2.4 |
| 4580 | 47% | 47% | 6% | 0.8 to 3 | 1.8 to 2.8 | 2.0 | 2.2 | 2.4 |
| 4581 | 48% | 46% | 6% | 0.8 to 3 | 1.8 to 2.8 | 2.0 | 2.2 | 2.4 |
| 4582 | 49% | 45% | 6% | 0.8 to 3 | 1.8 to 2.8 | 2.0 | 2.2 | 2.4 |
| 4583 | 50% | 44% | 6% | 0.8 to 3 | 1.8 to 2.8 | 2.0 | 2.2 | 2.4 |
| 4584 | 51% | 43% | 6% | 0.8 to 3 | 1.8 to 2.8 | 2.0 | 2.2 | 2.4 |
| 4585 | 52% | 42% | 6% | 0.8 to 3 | 1.8 to 2.8 | 2.0 | 2.2 | 2.4 |
| 4586 | 53% | 41% | 6% | 0.8 to 3 | 1.8 to 2.8 | 2.0 | 2.2 | 2.4 |
| 4587 | 54% | 40% | 6% | 0.8 to 3 | 1.8 to 2.8 | 2.0 | 2.2 | 2.4 |
| 4588 | 55% | 39% | 6% | 0.8 to 3 | 1.8 to 2.8 | 2.0 | 2.2 | 2.4 |
| 4589 | 56% | 38% | 6% | 0.8 to 3 | 1.8 to 2.8 | 2.0 | 2.2 | 2.4 |
| 4590 | 57% | 37% | 6% | 0.8 to 3 | 1.8 to 2.8 | 2.0 | 2.2 | 2.4 |
| 4591 | 58% | 36% | 6% | 0.8 to 3 | 1.8 to 2.8 | 2.0 | 2.2 | 2.4 |
| 4592 | 59% | 35% | 6% | 0.8 to 3 | 1.8 to 2.8 | 2.0 | 2.2 | 2.4 |
| 4593 | 60% | 34% | 6% | 0.8 to 3 | 1.8 to 2.8 | 2.0 | 2.2 | 2.4 |
| 4594 | 30% | 64% | 6.5% | 0.8 to 3 | 1.8 to 2.8 | 2.0 | 2.2 | 2.4 |
| 4595 | 31% | 63% | 6.5% | 0.8 to 3 | 1.8 to 2.8 | 2.0 | 2.2 | 2.4 |
| 4596 | 32% | 62% | 6.5% | 0.8 to 3 | 1.8 to 2.8 | 2.0 | 2.2 | 2.4 |
| 4597 | 33% | 61% | 6.5% | 0.8 to 3 | 1.8 to 2.8 | 2.0 | 2.2 | 2.4 |
| 4598 | 34% | 60% | 6.5% | 0.8 to 3 | 1.8 to 2.8 | 2.0 | 2.2 | 2.4 |
| 4599 | 35% | 59% | 6.5% | 0.8 to 3 | 1.8 to 2.8 | 2.0 | 2.2 | 2.4 |
| 4600 | 36% | 58% | 6.5% | 0.8 to 3 | 1.8 to 2.8 | 2.0 | 2.2 | 2.4 |
| 4601 | 37% | 57% | 6.5% | 0.8 to 3 | 1.8 to 2.8 | 2.0 | 2.2 | 2.4 |
| 4602 | 38% | 56% | 6.5% | 0.8 to 3 | 1.8 to 2.8 | 2.0 | 2.2 | 2.4 |
| 4603 | 39% | 55% | 6.5% | 0.8 to 3 | 1.8 to 2.8 | 2.0 | 2.2 | 2.4 |
| 4604 | 40% | 54% | 6.5% | 0.8 to 3 | 1.8 to 2.8 | 2.0 | 2.2 | 2.4 |
| 4605 | 41% | 53% | 6.5% | 0.8 to 3 | 1.8 to 2.8 | 2.0 | 2.2 | 2.4 |
| 4606 | 42% | 52% | 6.5% | 0.8 to 3 | 1.8 to 2.8 | 2.0 | 2.2 | 2.4 |
| 4607 | 43% | 51% | 6.5% | 0.8 to 3 | 1.8 to 2.8 | 2.0 | 2.2 | 2.4 |
| 4608 | 44% | 50% | 6.5% | 0.8 to 3 | 1.8 to 2.8 | 2.0 | 2.2 | 2.4 |
| 4609 | 45% | 49% | 6.5% | 0.8 to 3 | 1.8 to 2.8 | 2.0 | 2.2 | 2.4 |
| 4610 | 46% | 48% | 6.5% | 0.8 to 3 | 1.8 to 2.8 | 2.0 | 2.2 | 2.4 |
| 4611 | 47% | 47% | 6.5% | 0.8 to 3 | 1.8 to 2.8 | 2.0 | 2.2 | 2.4 |
| 4612 | 48% | 46% | 6.5% | 0.8 to 3 | 1.8 to 2.8 | 2.0 | 2.2 | 2.4 |
| 4613 | 49% | 45% | 6.5% | 0.8 to 3 | 1.8 to 2.8 | 2.0 | 2.2 | 2.4 |
| 4614 | 50% | 44% | 6.5% | 0.8 to 3 | 1.8 to 2.8 | 2.0 | 2.2 | 2.4 |
| 4615 | 51% | 43% | 6.5% | 0.8 to 3 | 1.8 to 2.8 | 2.0 | 2.2 | 2.4 |
| 4616 | 52% | 42% | 6.5% | 0.8 to 3 | 1.8 to 2.8 | 2.0 | 2.2 | 2.4 |
| 4617 | 53% | 41% | 6.5% | 0.8 to 3 | 1.8 to 2.8 | 2.0 | 2.2 | 2.4 |
| 4618 | 54% | 40% | 6.5% | 0.8 to 3 | 1.8 to 2.8 | 2.0 | 2.2 | 2.4 |
| 4619 | 55% | 39% | 6.5% | 0.8 to 3 | 1.8 to 2.8 | 2.0 | 2.2 | 2.4 |
| 4620 | 56% | 38% | 6.5% | 0.8 to 3 | 1.8 to 2.8 | 2.0 | 2.2 | 2.4 |
| 4621 | 57% | 37% | 6.5% | 0.8 to 3 | 1.8 to 2.8 | 2.0 | 2.2 | 2.4 |
| 4622 | 58% | 36% | 6.5% | 0.8 to 3 | 1.8 to 2.8 | 2.0 | 2.2 | 2.4 |
| 4623 | 59% | 35% | 6.5% | 0.8 to 3 | 1.8 to 2.8 | 2.0 | 2.2 | 2.4 |
| 4624 | 60% | 34% | 6.5% | 0.8 to 3 | 1.8 to 2.8 | 2.0 | 2.2 | 2.4 |
| 4625 | 30% | 63% | 7% | 0.8 to 3 | 1.8 to 2.8 | 2.0 | 2.2 | 2.4 |
| 4626 | 31% | 62% | 7% | 0.8 to 3 | 1.8 to 2.8 | 2.0 | 2.2 | 2.4 |
| 4627 | 32% | 61% | 7% | 0.8 to 3 | 1.8 to 2.8 | 2.0 | 2.2 | 2.4 |
| 4628 | 33% | 60% | 7% | 0.8 to 3 | 1.8 to 2.8 | 2.0 | 2.2 | 2.4 |
| 4629 | 34% | 59% | 7% | 0.8 to 3 | 1.8 to 2.8 | 2.0 | 2.2 | 2.4 |
| 4630 | 35% | 58% | 7% | 0.8 to 3 | 1.8 to 2.8 | 2.0 | 2.2 | 2.4 |
| 4631 | 36% | 57% | 7% | 0.8 to 3 | 1.8 to 2.8 | 2.0 | 2.2 | 2.4 |
| 4632 | 37% | 56% | 7% | 0.8 to 3 | 1.8 to 2.8 | 2.0 | 2.2 | 2.4 |
| 4633 | 38% | 55% | 7% | 0.8 to 3 | 1.8 to 2.8 | 2.0 | 2.2 | 2.4 |
| 4634 | 39% | 54% | 7% | 0.8 to 3 | 1.8 to 2.8 | 2.0 | 2.2 | 2.4 |
| 4635 | 40% | 53% | 7% | 0.8 to 3 | 1.8 to 2.8 | 2.0 | 2.2 | 2.4 |
| 4636 | 41% | 52% | 7% | 0.8 to 3 | 1.8 to 2.8 | 2.0 | 2.2 | 2.4 |
| 4637 | 42% | 51% | 7% | 0.8 to 3 | 1.8 to 2.8 | 2.0 | 2.2 | 2.4 |
| 4638 | 43% | 50% | 7% | 0.8 to 3 | 1.8 to 2.8 | 2.0 | 2.2 | 2.4 |
| 4639 | 44% | 49% | 7% | 0.8 to 3 | 1.8 to 2.8 | 2.0 | 2.2 | 2.4 |
| 4640 | 45% | 48% | 7% | 0.8 to 3 | 1.8 to 2.8 | 2.0 | 2.2 | 2.4 |
| 4641 | 46% | 47% | 7% | 0.8 to 3 | 1.8 to 2.8 | 2.0 | 2.2 | 2.4 |
| 4642 | 47% | 46% | 7% | 0.8 to 3 | 1.8 to 2.8 | 2.0 | 2.2 | 2.4 |
| 4643 | 48% | 45% | 7% | 0.8 to 3 | 1.8 to 2.8 | 2.0 | 2.2 | 2.4 |
| 4644 | 49% | 44% | 7% | 0.8 to 3 | 1.8 to 2.8 | 2.0 | 2.2 | 2.4 |
| 4645 | 50% | 43% | 7% | 0.8 to 3 | 1.8 to 2.8 | 2.0 | 2.2 | 2.4 |
| 4646 | 51% | 42% | 7% | 0.8 to 3 | 1.8 to 2.8 | 2.0 | 2.2 | 2.4 |
| 4647 | 52% | 41% | 7% | 0.8 to 3 | 1.8 to 2.8 | 2.0 | 2.2 | 2.4 |
| 4648 | 53% | 40% | 7% | 0.8 to 3 | 1.8 to 2.8 | 2.0 | 2.2 | 2.4 |
| 4649 | 54% | 39% | 7% | 0.8 to 3 | 1.8 to 2.8 | 2.0 | 2.2 | 2.4 |
| 4650 | 55% | 38% | 7% | 0.8 to 3 | 1.8 to 2.8 | 2.0 | 2.2 | 2.4 |
| 4651 | 56% | 37% | 7% | 0.8 to 3 | 1.8 to 2.8 | 2.0 | 2.2 | 2.4 |
| 4652 | 57% | 36% | 7% | 0.8 to 3 | 1.8 to 2.8 | 2.0 | 2.2 | 2.4 |
| 4653 | 58% | 35% | 7% | 0.8 to 3 | 1.8 to 2.8 | 2.0 | 2.2 | 2.4 |
| 4654 | 59% | 34% | 7% | 0.8 to 3 | 1.8 to 2.8 | 2.0 | 2.2 | 2.4 |
| 4655 | 60% | 33% | 7% | 0.8 to 3 | 1.8 to 2.8 | 2.0 | 2.2 | 2.4 |

TABLE 11

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % | Average mol. EO (Alternatives for each numbered species) | | | | |
| Species | 8 | 8 to 10 | 9 to 11 | Range A | Range B | Species C | Species D | Species E |
| 4656 | 30% | 70% | 0% | 0.8 to 3 | 1.8 to 2.8 | 2.0 | 2.2 | 2.4 |
| 4657 | 31% | 69% | 0% | 0.8 to 3 | 1.8 to 2.8 | 2.0 | 2.2 | 2.4 |
| 4658 | 32% | 68% | 0% | 0.8 to 3 | 1.8 to 2.8 | 2.0 | 2.2 | 2.4 |
| 4659 | 33% | 67% | 0% | 0.8 to 3 | 1.8 to 2.8 | 2.0 | 2.2 | 2.4 |
| 4660 | 34% | 66% | 0% | 0.8 to 3 | 1.8 to 2.8 | 2.0 | 2.2 | 2.4 |
| 4661 | 35% | 65% | 0% | 0.8 to 3 | 1.8 to 2.8 | 2.0 | 2.2 | 2.4 |
| 4662 | 36% | 64% | 0% | 0.8 to 3 | 1.8 to 2.8 | 2.0 | 2.2 | 2.4 |
| 4663 | 37% | 63% | 0% | 0.8 to 3 | 1.8 to 2.8 | 2.0 | 2.2 | 2.4 |
| 4664 | 38% | 62% | 0% | 0.8 to 3 | 1.8 to 2.8 | 2.0 | 2.2 | 2.4 |
| 4665 | 39% | 61% | 0% | 0.8 to 3 | 1.8 to 2.8 | 2.0 | 2.2 | 2.4 |
| 4666 | 40% | 60% | 0% | 0.8 to 3 | 1.8 to 2.8 | 2.0 | 2.2 | 2.4 |
| 4667 | 41% | 59% | 0% | 0.8 to 3 | 1.8 to 2.8 | 2.0 | 2.2 | 2.4 |
| 4668 | 42% | 58% | 0% | 0.8 to 3 | 1.8 to 2.8 | 2.0 | 2.2 | 2.4 |
| 4669 | 43% | 57% | 0% | 0.8 to 3 | 1.8 to 2.8 | 2.0 | 2.2 | 2.4 |
| 4670 | 44% | 56% | 0% | 0.8 to 3 | 1.8 to 2.8 | 2.0 | 2.2 | 2.4 |
| 4671 | 45% | 55% | 0% | 0.8 to 3 | 1.8 to 2.8 | 2.0 | 2.2 | 2.4 |
| 4672 | 46% | 54% | 0% | 0.8 to 3 | 1.8 to 2.8 | 2.0 | 2.2 | 2.4 |
| 4673 | 47% | 53% | 0% | 0.8 to 3 | 1.8 to 2.8 | 2.0 | 2.2 | 2.4 |
| 4674 | 48% | 52% | 0% | 0.8 to 3 | 1.8 to 2.8 | 2.0 | 2.2 | 2.4 |
| 4675 | 49% | 51% | 0% | 0.8 to 3 | 1.8 to 2.8 | 2.0 | 2.2 | 2.4 |
| 4676 | 50% | 50% | 0% | 0.8 to 3 | 1.8 to 2.8 | 2.0 | 2.2 | 2.4 |
| 4677 | 51% | 49% | 0% | 0.8 to 3 | 1.8 to 2.8 | 2.0 | 2.2 | 2.4 |
| 4678 | 52% | 48% | 0% | 0.8 to 3 | 1.8 to 2.8 | 2.0 | 2.2 | 2.4 |
| 4679 | 53% | 47% | 0% | 0.8 to 3 | 1.8 to 2.8 | 2.0 | 2.2 | 2.4 |
| 4680 | 54% | 46% | 0% | 0.8 to 3 | 1.8 to 2.8 | 2.0 | 2.2 | 2.4 |
| 4681 | 55% | 45% | 0% | 0.8 to 3 | 1.8 to 2.8 | 2.0 | 2.2 | 2.4 |

TABLE 11-continued

| | Alkyl Sulfate Alkyl Chain Length, Wt. % | | Alkyl Ether Sulfate | | | | |
|---|---|---|---|---|---|---|---|
| | | | Alkyl Chain | Average mol. EO (Alternatives for each numbered species) | | | |
| Species | 8 | 8 to 10 | Wt. % 9 to 11 | Range A | Range B | Species C | Species D | Species E |
| 4682 | 56% | 44% | 0% | 0.8 to 3 | 1.8 to 2.8 | 2.0 | 2.2 | 2.4 |
| 4683 | 57% | 43% | 0% | 0.8 to 3 | 1.8 to 2.8 | 2.0 | 2.2 | 2.4 |
| 4684 | 58% | 42% | 0% | 0.8 to 3 | 1.8 to 2.8 | 2.0 | 2.2 | 2.4 |
| 4685 | 59% | 41% | 0% | 0.8 to 3 | 1.8 to 2.8 | 2.0 | 2.2 | 2.4 |
| 4686 | 60% | 40% | 0% | 0.8 to 3 | 1.8 to 2.8 | 2.0 | 2.2 | 2.4 |
| 4687 | 30% | 69.5% | 0.5% | 0.8 to 3 | 1.8 to 2.8 | 2.0 | 2.2 | 2.4 |
| 4688 | 31% | 68.5% | 0.5% | 0.8 to 3 | 1.8 to 2.8 | 2.0 | 2.2 | 2.4 |
| 4689 | 32% | 67.5% | 0.5% | 0.8 to 3 | 1.8 to 2.8 | 2.0 | 2.2 | 2.4 |
| 4690 | 33% | 66.5% | 0.5% | 0.8 to 3 | 1.8 to 2.8 | 2.0 | 2.2 | 2.4 |
| 4691 | 34% | 65.5% | 0.5% | 0.8 to 3 | 1.8 to 2.8 | 2.0 | 2.2 | 2.4 |
| 4692 | 35% | 64.5% | 0.5% | 0.8 to 3 | 1.8 to 2.8 | 2.0 | 2.2 | 2.4 |
| 4693 | 36% | 63.5% | 0.5% | 0.8 to 3 | 1.8 to 2.8 | 2.0 | 2.2 | 2.4 |
| 4694 | 37% | 62.5% | 0.5% | 0.8 to 3 | 1.8 to 2.8 | 2.0 | 2.2 | 2.4 |
| 4695 | 38% | 61.5% | 0.5% | 0.8 to 3 | 1.8 to 2.8 | 2.0 | 2.2 | 2.4 |
| 4696 | 39% | 60.5% | 0.5% | 0.8 to 3 | 1.8 to 2.8 | 2.0 | 2.2 | 2.4 |
| 4697 | 40% | 59.5% | 0.5% | 0.8 to 3 | 1.8 to 2.8 | 2.0 | 2.2 | 2.4 |
| 4698 | 41% | 58.5% | 0.5% | 0.8 to 3 | 1.8 to 2.8 | 2.0 | 2.2 | 2.4 |
| 4699 | 42% | 57.5% | 0.5% | 0.8 to 3 | 1.8 to 2.8 | 2.0 | 2.2 | 2.4 |
| 4700 | 43% | 56.5% | 0.5% | 0.8 to 3 | 1.8 to 2.8 | 2.0 | 2.2 | 2.4 |
| 4701 | 44% | 55.5% | 0.5% | 0.8 to 3 | 1.8 to 2.8 | 2.0 | 2.2 | 2.4 |
| 4702 | 45% | 54.5% | 0.5% | 0.8 to 3 | 1.8 to 2.8 | 2.0 | 2.2 | 2.4 |
| 4703 | 46% | 53.5% | 0.5% | 0.8 to 3 | 1.8 to 2.8 | 2.0 | 2.2 | 2.4 |
| 4704 | 47% | 52.5% | 0.5% | 0.8 to 3 | 1.8 to 2.8 | 2.0 | 2.2 | 2.4 |
| 4705 | 48% | 51.5% | 0.5% | 0.8 to 3 | 1.8 to 2.8 | 2.0 | 2.2 | 2.4 |
| 4706 | 49% | 50.5% | 0.5% | 0.8 to 3 | 1.8 to 2.8 | 2.0 | 2.2 | 2.4 |
| 4707 | 50% | 49.5% | 0.5% | 0.8 to 3 | 1.8 to 2.8 | 2.0 | 2.2 | 2.4 |
| 4708 | 51% | 48.5% | 0.5% | 0.8 to 3 | 1.8 to 2.8 | 2.0 | 2.2 | 2.4 |
| 4709 | 52% | 47.5% | 0.5% | 0.8 to 3 | 1.8 to 2.8 | 2.0 | 2.2 | 2.4 |
| 4710 | 53% | 46.5% | 0.5% | 0.8 to 3 | 1.8 to 2.8 | 2.0 | 2.2 | 2.4 |
| 4711 | 54% | 45.5% | 0.5% | 0.8 to 3 | 1.8 to 2.8 | 2.0 | 2.2 | 2.4 |
| 4712 | 55% | 44.5% | 0.5% | 0.8 to 3 | 1.8 to 2.8 | 2.0 | 2.2 | 2.4 |
| 4713 | 56% | 43.5% | 0.5% | 0.8 to 3 | 1.8 to 2.8 | 2.0 | 2.2 | 2.4 |
| 4714 | 57% | 42.5% | 0.5% | 0.8 to 3 | 1.8 to 2.8 | 2.0 | 2.2 | 2.4 |
| 4715 | 58% | 41.5% | 0.5% | 0.8 to 3 | 1.8 to 2.8 | 2.0 | 2.2 | 2.4 |
| 4716 | 59% | 40.5% | 0.5% | 0.8 to 3 | 1.8 to 2.8 | 2.0 | 2.2 | 2.4 |
| 4717 | 60% | 39.5% | 0.5% | 0.8 to 3 | 1.8 to 2.8 | 2.0 | 2.2 | 2.4 |
| 4718 | 30% | 69% | 1% | 0.8 to 3 | 1.8 to 2.8 | 2.0 | 2.2 | 2.4 |
| 4719 | 31% | 68% | 1% | 0.8 to 3 | 1.8 to 2.8 | 2.0 | 2.2 | 2.4 |
| 4720 | 32% | 67% | 1% | 0.8 to 3 | 1.8 to 2.8 | 2.0 | 2.2 | 2.4 |
| 4721 | 33% | 66% | 1% | 0.8 to 3 | 1.8 to 2.8 | 2.0 | 2.2 | 2.4 |
| 4722 | 34% | 65% | 1% | 0.8 to 3 | 1.8 to 2.8 | 2.0 | 2.2 | 2.4 |
| 4723 | 35% | 64% | 1% | 0.8 to 3 | 1.8 to 2.8 | 2.0 | 2.2 | 2.4 |
| 4724 | 36% | 63% | 1% | 0.8 to 3 | 1.8 to 2.8 | 2.0 | 2.2 | 2.4 |
| 4725 | 37% | 62% | 1% | 0.8 to 3 | 1.8 to 2.8 | 2.0 | 2.2 | 2.4 |
| 4726 | 38% | 61% | 1% | 0.8 to 3 | 1.8 to 2.8 | 2.0 | 2.2 | 2.4 |
| 4727 | 39% | 60% | 1% | 0.8 to 3 | 1.8 to 2.8 | 2.0 | 2.2 | 2.4 |
| 4728 | 40% | 59% | 1% | 0.8 to 3 | 1.8 to 2.8 | 2.0 | 2.2 | 2.4 |
| 4729 | 41% | 58% | 1% | 0.8 to 3 | 1.8 to 2.8 | 2.0 | 2.2 | 2.4 |
| 4730 | 42% | 57% | 1% | 0.8 to 3 | 1.8 to 2.8 | 2.0 | 2.2 | 2.4 |
| 4731 | 43% | 56% | 1% | 0.8 to 3 | 1.8 to 2.8 | 2.0 | 2.2 | 2.4 |
| 4732 | 44% | 55% | 1% | 0.8 to 3 | 1.8 to 2.8 | 2.0 | 2.2 | 2.4 |
| 4733 | 45% | 54% | 1% | 0.8 to 3 | 1.8 to 2.8 | 2.0 | 2.2 | 2.4 |
| 4734 | 46% | 53% | 1% | 0.8 to 3 | 1.8 to 2.8 | 2.0 | 2.2 | 2.4 |
| 4735 | 47% | 52% | 1% | 0.8 to 3 | 1.8 to 2.8 | 2.0 | 2.2 | 2.4 |
| 4736 | 48% | 51% | 1% | 0.8 to 3 | 1.8 to 2.8 | 2.0 | 2.2 | 2.4 |
| 4737 | 49% | 50% | 1% | 0.8 to 3 | 1.8 to 2.8 | 2.0 | 2.2 | 2.4 |
| 4738 | 50% | 49% | 1% | 0.8 to 3 | 1.8 to 2.8 | 2.0 | 2.2 | 2.4 |
| 4739 | 51% | 48% | 1% | 0.8 to 3 | 1.8 to 2.8 | 2.0 | 2.2 | 2.4 |
| 4740 | 52% | 47% | 1% | 0.8 to 3 | 1.8 to 2.8 | 2.0 | 2.2 | 2.4 |
| 4741 | 53% | 46% | 1% | 0.8 to 3 | 1.8 to 2.8 | 2.0 | 2.2 | 2.4 |
| 4742 | 54% | 45% | 1% | 0.8 to 3 | 1.8 to 2.8 | 2.0 | 2.2 | 2.4 |
| 4743 | 55% | 44% | 1% | 0.8 to 3 | 1.8 to 2.8 | 2.0 | 2.2 | 2.4 |
| 4744 | 56% | 43% | 1% | 0.8 to 3 | 1.8 to 2.8 | 2.0 | 2.2 | 2.4 |
| 4745 | 57% | 42% | 1% | 0.8 to 3 | 1.8 to 2.8 | 2.0 | 2.2 | 2.4 |
| 4746 | 58% | 41% | 1% | 0.8 to 3 | 1.8 to 2.8 | 2.0 | 2.2 | 2.4 |
| 4747 | 59% | 40% | 1% | 0.8 to 3 | 1.8 to 2.8 | 2.0 | 2.2 | 2.4 |
| 4748 | 60% | 39% | 1% | 0.8 to 3 | 1.8 to 2.8 | 2.0 | 2.2 | 2.4 |
| 4749 | 30% | 68.5% | 1.5% | 0.8 to 3 | 1.8 to 2.8 | 2.0 | 2.2 | 2.4 |
| 4750 | 31% | 67.5% | 1.5% | 0.8 to 3 | 1.8 to 2.8 | 2.0 | 2.2 | 2.4 |
| 4751 | 32% | 66.5% | 1.5% | 0.8 to 3 | 1.8 to 2.8 | 2.0 | 2.2 | 2.4 |
| 4752 | 33% | 65.5% | 1.5% | 0.8 to 3 | 1.8 to 2.8 | 2.0 | 2.2 | 2.4 |
| 4753 | 34% | 64.5% | 1.5% | 0.8 to 3 | 1.8 to 2.8 | 2.0 | 2.2 | 2.4 |
| 4754 | 35% | 63.5% | 1.5% | 0.8 to 3 | 1.8 to 2.8 | 2.0 | 2.2 | 2.4 |
| 4755 | 36% | 62.5% | 1.5% | 0.8 to 3 | 1.8 to 2.8 | 2.0 | 2.2 | 2.4 |
| 4756 | 37% | 61.5% | 1.5% | 0.8 to 3 | 1.8 to 2.8 | 2.0 | 2.2 | 2.4 |
| 4757 | 38% | 60.5% | 1.5% | 0.8 to 3 | 1.8 to 2.8 | 2.0 | 2.2 | 2.4 |
| 4758 | 39% | 59.5% | 1.5% | 0.8 to 3 | 1.8 to 2.8 | 2.0 | 2.2 | 2.4 |
| 4759 | 40% | 58.5% | 1.5% | 0.8 to 3 | 1.8 to 2.8 | 2.0 | 2.2 | 2.4 |
| 4760 | 41% | 57.5% | 1.5% | 0.8 to 3 | 1.8 to 2.8 | 2.0 | 2.2 | 2.4 |
| 4761 | 42% | 56.5% | 1.5% | 0.8 to 3 | 1.8 to 2.8 | 2.0 | 2.2 | 2.4 |
| 4762 | 43% | 55.5% | 1.5% | 0.8 to 3 | 1.8 to 2.8 | 2.0 | 2.2 | 2.4 |
| 4763 | 44% | 54.5% | 1.5% | 0.8 to 3 | 1.8 to 2.8 | 2.0 | 2.2 | 2.4 |
| 4764 | 45% | 53.5% | 1.5% | 0.8 to 3 | 1.8 to 2.8 | 2.0 | 2.2 | 2.4 |
| 4765 | 46% | 52.5% | 1.5% | 0.8 to 3 | 1.8 to 2.8 | 2.0 | 2.2 | 2.4 |
| 4766 | 47% | 51.5% | 1.5% | 0.8 to 3 | 1.8 to 2.8 | 2.0 | 2.2 | 2.4 |
| 4767 | 48% | 50.5% | 1.5% | 0.8 to 3 | 1.8 to 2.8 | 2.0 | 2.2 | 2.4 |
| 4768 | 49% | 49.5% | 1.5% | 0.8 to 3 | 1.8 to 2.8 | 2.0 | 2.2 | 2.4 |
| 4769 | 50% | 48.5% | 1.5% | 0.8 to 3 | 1.8 to 2.8 | 2.0 | 2.2 | 2.4 |
| 4770 | 51% | 47.5% | 1.5% | 0.8 to 3 | 1.8 to 2.8 | 2.0 | 2.2 | 2.4 |
| 4771 | 52% | 46.5% | 1.5% | 0.8 to 3 | 1.8 to 2.8 | 2.0 | 2.2 | 2.4 |
| 4772 | 53% | 45.5% | 1.5% | 0.8 to 3 | 1.8 to 2.8 | 2.0 | 2.2 | 2.4 |
| 4773 | 54% | 44.5% | 1.5% | 0.8 to 3 | 1.8 to 2.8 | 2.0 | 2.2 | 2.4 |
| 4774 | 55% | 43.5% | 1.5% | 0.8 to 3 | 1.8 to 2.8 | 2.0 | 2.2 | 2.4 |
| 4775 | 56% | 42.5% | 1.5% | 0.8 to 3 | 1.8 to 2.8 | 2.0 | 2.2 | 2.4 |
| 4776 | 57% | 41.5% | 1.5% | 0.8 to 3 | 1.8 to 2.8 | 2.0 | 2.2 | 2.4 |
| 4777 | 58% | 40.5% | 1.5% | 0.8 to 3 | 1.8 to 2.8 | 2.0 | 2.2 | 2.4 |
| 4778 | 59% | 39.5% | 1.5% | 0.8 to 3 | 1.8 to 2.8 | 2.0 | 2.2 | 2.4 |
| 4779 | 60% | 38.5% | 1.5% | 0.8 to 3 | 1.8 to 2.8 | 2.0 | 2.2 | 2.4 |
| 4780 | 30% | 68% | 2% | 0.8 to 3 | 1.8 to 2.8 | 2.0 | 2.2 | 2.4 |
| 4781 | 31% | 67% | 2% | 0.8 to 3 | 1.8 to 2.8 | 2.0 | 2.2 | 2.4 |
| 4782 | 32% | 66% | 2% | 0.8 to 3 | 1.8 to 2.8 | 2.0 | 2.2 | 2.4 |
| 4783 | 33% | 65% | 2% | 0.8 to 3 | 1.8 to 2.8 | 2.0 | 2.2 | 2.4 |
| 4784 | 34% | 64% | 2% | 0.8 to 3 | 1.8 to 2.8 | 2.0 | 2.2 | 2.4 |
| 4785 | 35% | 63% | 2% | 0.8 to 3 | 1.8 to 2.8 | 2.0 | 2.2 | 2.4 |
| 4786 | 36% | 62% | 2% | 0.8 to 3 | 1.8 to 2.8 | 2.0 | 2.2 | 2.4 |
| 4787 | 37% | 61% | 2% | 0.8 to 3 | 1.8 to 2.8 | 2.0 | 2.2 | 2.4 |
| 4788 | 38% | 60% | 2% | 0.8 to 3 | 1.8 to 2.8 | 2.0 | 2.2 | 2.4 |
| 4789 | 39% | 59% | 2% | 0.8 to 3 | 1.8 to 2.8 | 2.0 | 2.2 | 2.4 |
| 4790 | 40% | 58% | 2% | 0.8 to 3 | 1.8 to 2.8 | 2.0 | 2.2 | 2.4 |
| 4791 | 41% | 57% | 2% | 0.8 to 3 | 1.8 to 2.8 | 2.0 | 2.2 | 2.4 |
| 4792 | 42% | 56% | 2% | 0.8 to 3 | 1.8 to 2.8 | 2.0 | 2.2 | 2.4 |
| 4793 | 43% | 55% | 2% | 0.8 to 3 | 1.8 to 2.8 | 2.0 | 2.2 | 2.4 |
| 4794 | 44% | 54% | 2% | 0.8 to 3 | 1.8 to 2.8 | 2.0 | 2.2 | 2.4 |
| 4795 | 45% | 53% | 2% | 0.8 to 3 | 1.8 to 2.8 | 2.0 | 2.2 | 2.4 |
| 4796 | 46% | 52% | 2% | 0.8 to 3 | 1.8 to 2.8 | 2.0 | 2.2 | 2.4 |
| 4797 | 47% | 51% | 2% | 0.8 to 3 | 1.8 to 2.8 | 2.0 | 2.2 | 2.4 |
| 4798 | 48% | 50% | 2% | 0.8 to 3 | 1.8 to 2.8 | 2.0 | 2.2 | 2.4 |
| 4799 | 49% | 49% | 2% | 0.8 to 3 | 1.8 to 2.8 | 2.0 | 2.2 | 2.4 |
| 4800 | 50% | 48% | 2% | 0.8 to 3 | 1.8 to 2.8 | 2.0 | 2.2 | 2.4 |
| 4801 | 51% | 47% | 2% | 0.8 to 3 | 1.8 to 2.8 | 2.0 | 2.2 | 2.4 |
| 4802 | 52% | 46% | 2% | 0.8 to 3 | 1.8 to 2.8 | 2.0 | 2.2 | 2.4 |
| 4803 | 53% | 45% | 2% | 0.8 to 3 | 1.8 to 2.8 | 2.0 | 2.2 | 2.4 |
| 4804 | 54% | 44% | 2% | 0.8 to 3 | 1.8 to 2.8 | 2.0 | 2.2 | 2.4 |
| 4805 | 55% | 43% | 2% | 0.8 to 3 | 1.8 to 2.8 | 2.0 | 2.2 | 2.4 |
| 4806 | 56% | 42% | 2% | 0.8 to 3 | 1.8 to 2.8 | 2.0 | 2.2 | 2.4 |
| 4807 | 57% | 41% | 2% | 0.8 to 3 | 1.8 to 2.8 | 2.0 | 2.2 | 2.4 |
| 4808 | 58% | 40% | 2% | 0.8 to 3 | 1.8 to 2.8 | 2.0 | 2.2 | 2.4 |
| 4809 | 59% | 39% | 2% | 0.8 to 3 | 1.8 to 2.8 | 2.0 | 2.2 | 2.4 |
| 4810 | 60% | 38% | 2% | 0.8 to 3 | 1.8 to 2.8 | 2.0 | 2.2 | 2.4 |
| 4811 | 30% | 67.5% | 2.5% | 0.8 to 3 | 1.8 to 2.8 | 2.0 | 2.2 | 2.4 |
| 4812 | 31% | 66.5% | 2.5% | 0.8 to 3 | 1.8 to 2.8 | 2.0 | 2.2 | 2.4 |
| 4813 | 32% | 65.5% | 2.5% | 0.8 to 3 | 1.8 to 2.8 | 2.0 | 2.2 | 2.4 |
| 4814 | 33% | 64.5% | 2.5% | 0.8 to 3 | 1.8 to 2.8 | 2.0 | 2.2 | 2.4 |
| 4815 | 34% | 63.5% | 2.5% | 0.8 to 3 | 1.8 to 2.8 | 2.0 | 2.2 | 2.4 |
| 4816 | 35% | 62.5% | 2.5% | 0.8 to 3 | 1.8 to 2.8 | 2.0 | 2.2 | 2.4 |
| 4817 | 36% | 61.5% | 2.5% | 0.8 to 3 | 1.8 to 2.8 | 2.0 | 2.2 | 2.4 |
| 4818 | 37% | 60.5% | 2.5% | 0.8 to 3 | 1.8 to 2.8 | 2.0 | 2.2 | 2.4 |
| 4819 | 38% | 59.5% | 2.5% | 0.8 to 3 | 1.8 to 2.8 | 2.0 | 2.2 | 2.4 |

TABLE 11-continued

| | Alkyl Sulfate | | Alkyl Ether Sulfate | | | | | |
|---|---|---|---|---|---|---|---|---|
| | Alkyl Chain Length, Wt. % | | Alkyl Chain Length, | | Average mol. EO (Alternatives for each numbered species) | | | |
| Species | 8 | 8 to 10 | Wt. % 9 to 11 | Range A | Range B | Species C | Species D | Species E |
| 4820 | 39% | 58.5% | 2.5% | 0.8 to 3 | 1.8 to 2.8 | 2.0 | 2.2 | 2.4 |
| 4821 | 40% | 57.5% | 2.5% | 0.8 to 3 | 1.8 to 2.8 | 2.0 | 2.2 | 2.4 |
| 4822 | 41% | 56.5% | 2.5% | 0.8 to 3 | 1.8 to 2.8 | 2.0 | 2.2 | 2.4 |
| 4823 | 42% | 55.5% | 2.5% | 0.8 to 3 | 1.8 to 2.8 | 2.0 | 2.2 | 2.4 |
| 4824 | 43% | 54.5% | 2.5% | 0.8 to 3 | 1.8 to 2.8 | 2.0 | 2.2 | 2.4 |
| 4825 | 44% | 53.5% | 2.5% | 0.8 to 3 | 1.8 to 2.8 | 2.0 | 2.2 | 2.4 |
| 4826 | 45% | 52.5% | 2.5% | 0.8 to 3 | 1.8 to 2.8 | 2.0 | 2.2 | 2.4 |
| 4827 | 46% | 51.5% | 2.5% | 0.8 to 3 | 1.8 to 2.8 | 2.0 | 2.2 | 2.4 |
| 4828 | 47% | 50.5% | 2.5% | 0.8 to 3 | 1.8 to 2.8 | 2.0 | 2.2 | 2.4 |
| 4829 | 48% | 49.5% | 2.5% | 0.8 to 3 | 1.8 to 2.8 | 2.0 | 2.2 | 2.4 |
| 4830 | 49% | 48.5% | 2.5% | 0.8 to 3 | 1.8 to 2.8 | 2.0 | 2.2 | 2.4 |
| 4831 | 50% | 47.5% | 2.5% | 0.8 to 3 | 1.8 to 2.8 | 2.0 | 2.2 | 2.4 |
| 4832 | 51% | 46.5% | 2.5% | 0.8 to 3 | 1.8 to 2.8 | 2.0 | 2.2 | 2.4 |
| 4833 | 52% | 45.5% | 2.5% | 0.8 to 3 | 1.8 to 2.8 | 2.0 | 2.2 | 2.4 |
| 4834 | 53% | 44.5% | 2.5% | 0.8 to 3 | 1.8 to 2.8 | 2.0 | 2.2 | 2.4 |
| 4835 | 54% | 43.5% | 2.5% | 0.8 to 3 | 1.8 to 2.8 | 2.0 | 2.2 | 2.4 |
| 4836 | 55% | 42.5% | 2.5% | 0.8 to 3 | 1.8 to 2.8 | 2.0 | 2.2 | 2.4 |
| 4837 | 56% | 41.5% | 2.5% | 0.8 to 3 | 1.8 to 2.8 | 2.0 | 2.2 | 2.4 |
| 4838 | 57% | 40.5% | 2.5% | 0.8 to 3 | 1.8 to 2.8 | 2.0 | 2.2 | 2.4 |
| 4839 | 58% | 39.5% | 2.5% | 0.8 to 3 | 1.8 to 2.8 | 2.0 | 2.2 | 2.4 |
| 4840 | 59% | 38.5% | 2.5% | 0.8 to 3 | 1.8 to 2.8 | 2.0 | 2.2 | 2.4 |
| 4841 | 60% | 37.5% | 2.5% | 0.8 to 3 | 1.8 to 2.8 | 2.0 | 2.2 | 2.4 |
| 4842 | 30% | 67% | 3% | 0.8 to 3 | 1.8 to 2.8 | 2.0 | 2.2 | 2.4 |
| 4843 | 31% | 66% | 3% | 0.8 to 3 | 1.8 to 2.8 | 2.0 | 2.2 | 2.4 |
| 4844 | 32% | 65% | 3% | 0.8 to 3 | 1.8 to 2.8 | 2.0 | 2.2 | 2.4 |
| 4845 | 33% | 64% | 3% | 0.8 to 3 | 1.8 to 2.8 | 2.0 | 2.2 | 2.4 |
| 4846 | 34% | 63% | 3% | 0.8 to 3 | 1.8 to 2.8 | 2.0 | 2.2 | 2.4 |
| 4847 | 35% | 62% | 3% | 0.8 to 3 | 1.8 to 2.8 | 2.0 | 2.2 | 2.4 |
| 4848 | 36% | 61% | 3% | 0.8 to 3 | 1.8 to 2.8 | 2.0 | 2.2 | 2.4 |
| 4849 | 37% | 60% | 3% | 0.8 to 3 | 1.8 to 2.8 | 2.0 | 2.2 | 2.4 |
| 4850 | 38% | 59% | 3% | 0.8 to 3 | 1.8 to 2.8 | 2.0 | 2.2 | 2.4 |
| 4851 | 39% | 58% | 3% | 0.8 to 3 | 1.8 to 2.8 | 2.0 | 2.2 | 2.4 |
| 4852 | 40% | 57% | 3% | 0.8 to 3 | 1.8 to 2.8 | 2.0 | 2.2 | 2.4 |
| 4853 | 41% | 56% | 3% | 0.8 to 3 | 1.8 to 2.8 | 2.0 | 2.2 | 2.4 |
| 4854 | 42% | 55% | 3% | 0.8 to 3 | 1.8 to 2.8 | 2.0 | 2.2 | 2.4 |
| 4855 | 43% | 54% | 3% | 0.8 to 3 | 1.8 to 2.8 | 2.0 | 2.2 | 2.4 |
| 4856 | 44% | 53% | 3% | 0.8 to 3 | 1.8 to 2.8 | 2.0 | 2.2 | 2.4 |
| 4857 | 45% | 52% | 3% | 0.8 to 3 | 1.8 to 2.8 | 2.0 | 2.2 | 2.4 |
| 4858 | 46% | 51% | 3% | 0.8 to 3 | 1.8 to 2.8 | 2.0 | 2.2 | 2.4 |
| 4859 | 47% | 50% | 3% | 0.8 to 3 | 1.8 to 2.8 | 2.0 | 2.2 | 2.4 |
| 4860 | 48% | 49% | 3% | 0.8 to 3 | 1.8 to 2.8 | 2.0 | 2.2 | 2.4 |
| 4861 | 49% | 48% | 3% | 0.8 to 3 | 1.8 to 2.8 | 2.0 | 2.2 | 2.4 |
| 4862 | 50% | 47% | 3% | 0.8 to 3 | 1.8 to 2.8 | 2.0 | 2.2 | 2.4 |
| 4863 | 51% | 46% | 3% | 0.8 to 3 | 1.8 to 2.8 | 2.0 | 2.2 | 2.4 |
| 4864 | 52% | 45% | 3% | 0.8 to 3 | 1.8 to 2.8 | 2.0 | 2.2 | 2.4 |
| 4865 | 53% | 44% | 3% | 0.8 to 3 | 1.8 to 2.8 | 2.0 | 2.2 | 2.4 |
| 4866 | 54% | 43% | 3% | 0.8 to 3 | 1.8 to 2.8 | 2.0 | 2.2 | 2.4 |
| 4867 | 55% | 42% | 3% | 0.8 to 3 | 1.8 to 2.8 | 2.0 | 2.2 | 2.4 |
| 4868 | 56% | 41% | 3% | 0.8 to 3 | 1.8 to 2.8 | 2.0 | 2.2 | 2.4 |
| 4869 | 57% | 40% | 3% | 0.8 to 3 | 1.8 to 2.8 | 2.0 | 2.2 | 2.4 |
| 4870 | 58% | 39% | 3% | 0.8 to 3 | 1.8 to 2.8 | 2.0 | 2.2 | 2.4 |
| 4871 | 59% | 38% | 3% | 0.8 to 3 | 1.8 to 2.8 | 2.0 | 2.2 | 2.4 |
| 4872 | 60% | 37% | 3% | 0.8 to 3 | 1.8 to 2.8 | 2.0 | 2.2 | 2.4 |
| 4873 | 30% | 66.5% | 3.5% | 0.8 to 3 | 1.8 to 2.8 | 2.0 | 2.2 | 2.4 |
| 4874 | 31% | 65.5% | 3.5% | 0.8 to 3 | 1.8 to 2.8 | 2.0 | 2.2 | 2.4 |
| 4875 | 32% | 64.5% | 3.5% | 0.8 to 3 | 1.8 to 2.8 | 2.0 | 2.2 | 2.4 |
| 4876 | 33% | 63.5% | 3.5% | 0.8 to 3 | 1.8 to 2.8 | 2.0 | 2.2 | 2.4 |
| 4877 | 34% | 62.5% | 3.5% | 0.8 to 3 | 1.8 to 2.8 | 2.0 | 2.2 | 2.4 |
| 4878 | 35% | 61.5% | 3.5% | 0.8 to 3 | 1.8 to 2.8 | 2.0 | 2.2 | 2.4 |
| 4879 | 36% | 60.5% | 3.5% | 0.8 to 3 | 1.8 to 2.8 | 2.0 | 2.2 | 2.4 |
| 4880 | 37% | 59.5% | 3.5% | 0.8 to 3 | 1.8 to 2.8 | 2.0 | 2.2 | 2.4 |
| 4881 | 38% | 58.5% | 3.5% | 0.8 to 3 | 1.8 to 2.8 | 2.0 | 2.2 | 2.4 |
| 4882 | 39% | 57.5% | 3.5% | 0.8 to 3 | 1.8 to 2.8 | 2.0 | 2.2 | 2.4 |
| 4883 | 40% | 56.5% | 3.5% | 0.8 to 3 | 1.8 to 2.8 | 2.0 | 2.2 | 2.4 |
| 4884 | 41% | 55.5% | 3.5% | 0.8 to 3 | 1.8 to 2.8 | 2.0 | 2.2 | 2.4 |
| 4885 | 42% | 54.5% | 3.5% | 0.8 to 3 | 1.8 to 2.8 | 2.0 | 2.2 | 2.4 |
| 4886 | 43% | 53.5% | 3.5% | 0.8 to 3 | 1.8 to 2.8 | 2.0 | 2.2 | 2.4 |
| 4887 | 44% | 52.5% | 3.5% | 0.8 to 3 | 1.8 to 2.8 | 2.0 | 2.2 | 2.4 |
| 4888 | 45% | 51.5% | 3.5% | 0.8 to 3 | 1.8 to 2.8 | 2.0 | 2.2 | 2.4 |
| 4889 | 46% | 50.5% | 3.5% | 0.8 to 3 | 1.8 to 2.8 | 2.0 | 2.2 | 2.4 |
| 4890 | 47% | 49.5% | 3.5% | 0.8 to 3 | 1.8 to 2.8 | 2.0 | 2.2 | 2.4 |
| 4891 | 48% | 48.5% | 3.5% | 0.8 to 3 | 1.8 to 2.8 | 2.0 | 2.2 | 2.4 |
| 4892 | 49% | 47.5% | 3.5% | 0.8 to 3 | 1.8 to 2.8 | 2.0 | 2.2 | 2.4 |
| 4893 | 50% | 46.5% | 3.5% | 0.8 to 3 | 1.8 to 2.8 | 2.0 | 2.2 | 2.4 |
| 4894 | 51% | 45.5% | 3.5% | 0.8 to 3 | 1.8 to 2.8 | 2.0 | 2.2 | 2.4 |
| 4895 | 52% | 44.5% | 3.5% | 0.8 to 3 | 1.8 to 2.8 | 2.0 | 2.2 | 2.4 |
| 4896 | 53% | 43.5% | 3.5% | 0.8 to 3 | 1.8 to 2.8 | 2.0 | 2.2 | 2.4 |
| 4897 | 54% | 42.5% | 3.5% | 0.8 to 3 | 1.8 to 2.8 | 2.0 | 2.2 | 2.4 |
| 4898 | 55% | 41.5% | 3.5% | 0.8 to 3 | 1.8 to 2.8 | 2.0 | 2.2 | 2.4 |
| 4899 | 56% | 40.5% | 3.5% | 0.8 to 3 | 1.8 to 2.8 | 2.0 | 2.2 | 2.4 |
| 4900 | 57% | 39.5% | 3.5% | 0.8 to 3 | 1.8 to 2.8 | 2.0 | 2.2 | 2.4 |
| 4901 | 58% | 38.5% | 3.5% | 0.8 to 3 | 1.8 to 2.8 | 2.0 | 2.2 | 2.4 |
| 4902 | 59% | 37.5% | 3.5% | 0.8 to 3 | 1.8 to 2.8 | 2.0 | 2.2 | 2.4 |
| 4903 | 60% | 36.5% | 3.5% | 0.8 to 3 | 1.8 to 2.8 | 2.0 | 2.2 | 2.4 |
| 4904 | 30% | 66% | 4% | 0.8 to 3 | 1.8 to 2.8 | 2.0 | 2.2 | 2.4 |
| 4905 | 31% | 65% | 4% | 0.8 to 3 | 1.8 to 2.8 | 2.0 | 2.2 | 2.4 |
| 4906 | 32% | 64% | 4% | 0.8 to 3 | 1.8 to 2.8 | 2.0 | 2.2 | 2.4 |
| 4907 | 33% | 63% | 4% | 0.8 to 3 | 1.8 to 2.8 | 2.0 | 2.2 | 2.4 |
| 4908 | 34% | 62% | 4% | 0.8 to 3 | 1.8 to 2.8 | 2.0 | 2.2 | 2.4 |
| 4909 | 35% | 61% | 4% | 0.8 to 3 | 1.8 to 2.8 | 2.0 | 2.2 | 2.4 |
| 4910 | 36% | 60% | 4% | 0.8 to 3 | 1.8 to 2.8 | 2.0 | 2.2 | 2.4 |
| 4911 | 37% | 59% | 4% | 0.8 to 3 | 1.8 to 2.8 | 2.0 | 2.2 | 2.4 |
| 4912 | 38% | 58% | 4% | 0.8 to 3 | 1.8 to 2.8 | 2.0 | 2.2 | 2.4 |
| 4913 | 39% | 57% | 4% | 0.8 to 3 | 1.8 to 2.8 | 2.0 | 2.2 | 2.4 |
| 4914 | 40% | 56% | 4% | 0.8 to 3 | 1.8 to 2.8 | 2.0 | 2.2 | 2.4 |
| 4915 | 41% | 55% | 4% | 0.8 to 3 | 1.8 to 2.8 | 2.0 | 2.2 | 2.4 |
| 4916 | 42% | 54% | 4% | 0.8 to 3 | 1.8 to 2.8 | 2.0 | 2.2 | 2.4 |
| 4917 | 43% | 53% | 4% | 0.8 to 3 | 1.8 to 2.8 | 2.0 | 2.2 | 2.4 |
| 4918 | 44% | 52% | 4% | 0.8 to 3 | 1.8 to 2.8 | 2.0 | 2.2 | 2.4 |
| 4919 | 45% | 51% | 4% | 0.8 to 3 | 1.8 to 2.8 | 2.0 | 2.2 | 2.4 |
| 4920 | 46% | 50% | 4% | 0.8 to 3 | 1.8 to 2.8 | 2.0 | 2.2 | 2.4 |
| 4921 | 47% | 49% | 4% | 0.8 to 3 | 1.8 to 2.8 | 2.0 | 2.2 | 2.4 |
| 4922 | 48% | 48% | 4% | 0.8 to 3 | 1.8 to 2.8 | 2.0 | 2.2 | 2.4 |
| 4923 | 49% | 47% | 4% | 0.8 to 3 | 1.8 to 2.8 | 2.0 | 2.2 | 2.4 |
| 4924 | 50% | 46% | 4% | 0.8 to 3 | 1.8 to 2.8 | 2.0 | 2.2 | 2.4 |
| 4925 | 51% | 45% | 4% | 0.8 to 3 | 1.8 to 2.8 | 2.0 | 2.2 | 2.4 |
| 4926 | 52% | 44% | 4% | 0.8 to 3 | 1.8 to 2.8 | 2.0 | 2.2 | 2.4 |
| 4927 | 53% | 43% | 4% | 0.8 to 3 | 1.8 to 2.8 | 2.0 | 2.2 | 2.4 |
| 4928 | 54% | 42% | 4% | 0.8 to 3 | 1.8 to 2.8 | 2.0 | 2.2 | 2.4 |
| 4929 | 55% | 41% | 4% | 0.8 to 3 | 1.8 to 2.8 | 2.0 | 2.2 | 2.4 |
| 4930 | 56% | 40% | 4% | 0.8 to 3 | 1.8 to 2.8 | 2.0 | 2.2 | 2.4 |
| 4931 | 57% | 39% | 4% | 0.8 to 3 | 1.8 to 2.8 | 2.0 | 2.2 | 2.4 |
| 4932 | 58% | 38% | 4% | 0.8 to 3 | 1.8 to 2.8 | 2.0 | 2.2 | 2.4 |
| 4933 | 59% | 37% | 4% | 0.8 to 3 | 1.8 to 2.8 | 2.0 | 2.2 | 2.4 |
| 4934 | 60% | 36% | 4% | 0.8 to 3 | 1.8 to 2.8 | 2.0 | 2.2 | 2.4 |
| 4935 | 30% | 65.5% | 4.5% | 0.8 to 3 | 1.8 to 2.8 | 2.0 | 2.2 | 2.4 |
| 4936 | 31% | 64.5% | 4.5% | 0.8 to 3 | 1.8 to 2.8 | 2.0 | 2.2 | 2.4 |
| 4937 | 32% | 63.5% | 4.5% | 0.8 to 3 | 1.8 to 2.8 | 2.0 | 2.2 | 2.4 |
| 4938 | 33% | 62.5% | 4.5% | 0.8 to 3 | 1.8 to 2.8 | 2.0 | 2.2 | 2.4 |
| 4939 | 34% | 61.5% | 4.5% | 0.8 to 3 | 1.8 to 2.8 | 2.0 | 2.2 | 2.4 |
| 4940 | 35% | 60.5% | 4.5% | 0.8 to 3 | 1.8 to 2.8 | 2.0 | 2.2 | 2.4 |
| 4941 | 36% | 59.5% | 4.5% | 0.8 to 3 | 1.8 to 2.8 | 2.0 | 2.2 | 2.4 |
| 4942 | 37% | 58.5% | 4.5% | 0.8 to 3 | 1.8 to 2.8 | 2.0 | 2.2 | 2.4 |
| 4943 | 38% | 57.5% | 4.5% | 0.8 to 3 | 1.8 to 2.8 | 2.0 | 2.2 | 2.4 |
| 4944 | 39% | 56.5% | 4.5% | 0.8 to 3 | 1.8 to 2.8 | 2.0 | 2.2 | 2.4 |
| 4945 | 40% | 55.5% | 4.5% | 0.8 to 3 | 1.8 to 2.8 | 2.0 | 2.2 | 2.4 |
| 4946 | 41% | 54.5% | 4.5% | 0.8 to 3 | 1.8 to 2.8 | 2.0 | 2.2 | 2.4 |
| 4947 | 42% | 53.5% | 4.5% | 0.8 to 3 | 1.8 to 2.8 | 2.0 | 2.2 | 2.4 |
| 4948 | 43% | 52.5% | 4.5% | 0.8 to 3 | 1.8 to 2.8 | 2.0 | 2.2 | 2.4 |
| 4949 | 44% | 51.5% | 4.5% | 0.8 to 3 | 1.8 to 2.8 | 2.0 | 2.2 | 2.4 |
| 4950 | 45% | 50.5% | 4.5% | 0.8 to 3 | 1.8 to 2.8 | 2.0 | 2.2 | 2.4 |
| 4951 | 46% | 49.5% | 4.5% | 0.8 to 3 | 1.8 to 2.8 | 2.0 | 2.2 | 2.4 |
| 4952 | 47% | 48.5% | 4.5% | 0.8 to 3 | 1.8 to 2.8 | 2.0 | 2.2 | 2.4 |
| 4953 | 48% | 47.5% | 4.5% | 0.8 to 3 | 1.8 to 2.8 | 2.0 | 2.2 | 2.4 |
| 4954 | 49% | 46.5% | 4.5% | 0.8 to 3 | 1.8 to 2.8 | 2.0 | 2.2 | 2.4 |
| 4955 | 50% | 45.5% | 4.5% | 0.8 to 3 | 1.8 to 2.8 | 2.0 | 2.2 | 2.4 |
| 4956 | 51% | 44.5% | 4.5% | 0.8 to 3 | 1.8 to 2.8 | 2.0 | 2.2 | 2.4 |
| 4957 | 52% | 43.5% | 4.5% | 0.8 to 3 | 1.8 to 2.8 | 2.0 | 2.2 | 2.4 |

TABLE 11-continued

| | Alkyl Sulfate | | Alkyl Ether Sulfate | | | | |
|---|---|---|---|---|---|---|---|
| | Alkyl Chain Length, Wt. % | Alkyl Chain Length, | Average mol. EO (Alternatives for each numbered species) | | | | |
| Species | 8 | 8 to 10 | Wt. % 9 to 11 | Range A | Range B | Species C | Species D | Species E |
| 4958 | 53% | 42.5% | 4.5% | 0.8 to 3 | 1.8 to 2.8 | 2.0 | 2.2 | 2.4 |
| 4959 | 54% | 41.5% | 4.5% | 0.8 to 3 | 1.8 to 2.8 | 2.0 | 2.2 | 2.4 |
| 4960 | 55% | 40.5% | 4.5% | 0.8 to 3 | 1.8 to 2.8 | 2.0 | 2.2 | 2.4 |
| 4961 | 56% | 39.5% | 4.5% | 0.8 to 3 | 1.8 to 2.8 | 2.0 | 2.2 | 2.4 |
| 4962 | 57% | 38.5% | 4.5% | 0.8 to 3 | 1.8 to 2.8 | 2.0 | 2.2 | 2.4 |
| 4963 | 58% | 37.5% | 4.5% | 0.8 to 3 | 1.8 to 2.8 | 2.0 | 2.2 | 2.4 |
| 4964 | 59% | 36.5% | 4.5% | 0.8 to 3 | 1.8 to 2.8 | 2.0 | 2.2 | 2.4 |
| 4965 | 60% | 35.5% | 4.5% | 0.8 to 3 | 1.8 to 2.8 | 2.0 | 2.2 | 2.4 |
| 4966 | 30% | 65% | 5% | 0.8 to 3 | 1.8 to 2.8 | 2.0 | 2.2 | 2.4 |
| 4967 | 31% | 64% | 5% | 0.8 to 3 | 1.8 to 2.8 | 2.0 | 2.2 | 2.4 |
| 4968 | 32% | 63% | 5% | 0.8 to 3 | 1.8 to 2.8 | 2.0 | 2.2 | 2.4 |
| 4969 | 33% | 62% | 5% | 0.8 to 3 | 1.8 to 2.8 | 2.0 | 2.2 | 2.4 |
| 4970 | 34% | 61% | 5% | 0.8 to 3 | 1.8 to 2.8 | 2.0 | 2.2 | 2.4 |
| 4971 | 35% | 60% | 5% | 0.8 to 3 | 1.8 to 2.8 | 2.0 | 2.2 | 2.4 |
| 4972 | 36% | 59% | 5% | 0.8 to 3 | 1.8 to 2.8 | 2.0 | 2.2 | 2.4 |
| 4973 | 37% | 58% | 5% | 0.8 to 3 | 1.8 to 2.8 | 2.0 | 2.2 | 2.4 |
| 4974 | 38% | 57% | 5% | 0.8 to 3 | 1.8 to 2.8 | 2.0 | 2.2 | 2.4 |
| 4975 | 39% | 56% | 5% | 0.8 to 3 | 1.8 to 2.8 | 2.0 | 2.2 | 2.4 |
| 4976 | 40% | 55% | 5% | 0.8 to 3 | 1.8 to 2.8 | 2.0 | 2.2 | 2.4 |
| 4977 | 41% | 54% | 5% | 0.8 to 3 | 1.8 to 2.8 | 2.0 | 2.2 | 2.4 |
| 4978 | 42% | 53% | 5% | 0.8 to 3 | 1.8 to 2.8 | 2.0 | 2.2 | 2.4 |
| 4979 | 43% | 52% | 5% | 0.8 to 3 | 1.8 to 2.8 | 2.0 | 2.2 | 2.4 |
| 4980 | 44% | 51% | 5% | 0.8 to 3 | 1.8 to 2.8 | 2.0 | 2.2 | 2.4 |
| 4981 | 45% | 50% | 5% | 0.8 to 3 | 1.8 to 2.8 | 2.0 | 2.2 | 2.4 |
| 4982 | 46% | 49% | 5% | 0.8 to 3 | 1.8 to 2.8 | 2.0 | 2.2 | 2.4 |
| 4983 | 47% | 48% | 5% | 0.8 to 3 | 1.8 to 2.8 | 2.0 | 2.2 | 2.4 |
| 4984 | 48% | 47% | 5% | 0.8 to 3 | 1.8 to 2.8 | 2.0 | 2.2 | 2.4 |
| 4985 | 49% | 46% | 5% | 0.8 to 3 | 1.8 to 2.8 | 2.0 | 2.2 | 2.4 |
| 4986 | 50% | 45% | 5% | 0.8 to 3 | 1.8 to 2.8 | 2.0 | 2.2 | 2.4 |
| 4987 | 51% | 44% | 5% | 0.8 to 3 | 1.8 to 2.8 | 2.0 | 2.2 | 2.4 |
| 4988 | 52% | 43% | 5% | 0.8 to 3 | 1.8 to 2.8 | 2.0 | 2.2 | 2.4 |
| 4989 | 53% | 42% | 5% | 0.8 to 3 | 1.8 to 2.8 | 2.0 | 2.2 | 2.4 |
| 4990 | 54% | 41% | 5% | 0.8 to 3 | 1.8 to 2.8 | 2.0 | 2.2 | 2.4 |
| 4991 | 55% | 40% | 5% | 0.8 to 3 | 1.8 to 2.8 | 2.0 | 2.2 | 2.4 |
| 4992 | 56% | 39% | 5% | 0.8 to 3 | 1.8 to 2.8 | 2.0 | 2.2 | 2.4 |
| 4993 | 57% | 38% | 5% | 0.8 to 3 | 1.8 to 2.8 | 2.0 | 2.2 | 2.4 |
| 4994 | 58% | 37% | 5% | 0.8 to 3 | 1.8 to 2.8 | 2.0 | 2.2 | 2.4 |
| 4995 | 59% | 36% | 5% | 0.8 to 3 | 1.8 to 2.8 | 2.0 | 2.2 | 2.4 |
| 4996 | 60% | 35% | 5% | 0.8 to 3 | 1.8 to 2.8 | 2.0 | 2.2 | 2.4 |
| 4997 | 30% | 64.5% | 5.5% | 0.8 to 3 | 1.8 to 2.8 | 2.0 | 2.2 | 2.4 |
| 4998 | 31% | 63.5% | 5.5% | 0.8 to 3 | 1.8 to 2.8 | 2.0 | 2.2 | 2.4 |
| 4999 | 32% | 62.5% | 5.5% | 0.8 to 3 | 1.8 to 2.8 | 2.0 | 2.2 | 2.4 |
| 5000 | 33% | 61.5% | 5.5% | 0.8 to 3 | 1.8 to 2.8 | 2.0 | 2.2 | 2.4 |
| 5001 | 34% | 60.5% | 5.5% | 0.8 to 3 | 1.8 to 2.8 | 2.0 | 2.2 | 2.4 |
| 5002 | 35% | 59.5% | 5.5% | 0.8 to 3 | 1.8 to 2.8 | 2.0 | 2.2 | 2.4 |
| 5003 | 36% | 58.5% | 5.5% | 0.8 to 3 | 1.8 to 2.8 | 2.0 | 2.2 | 2.4 |
| 5004 | 37% | 57.5% | 5.5% | 0.8 to 3 | 1.8 to 2.8 | 2.0 | 2.2 | 2.4 |
| 5005 | 38% | 56.5% | 5.5% | 0.8 to 3 | 1.8 to 2.8 | 2.0 | 2.2 | 2.4 |
| 5006 | 39% | 55.5% | 5.5% | 0.8 to 3 | 1.8 to 2.8 | 2.0 | 2.2 | 2.4 |
| 5007 | 40% | 54.5% | 5.5% | 0.8 to 3 | 1.8 to 2.8 | 2.0 | 2.2 | 2.4 |
| 5008 | 41% | 53.5% | 5.5% | 0.8 to 3 | 1.8 to 2.8 | 2.0 | 2.2 | 2.4 |
| 5009 | 42% | 52.5% | 5.5% | 0.8 to 3 | 1.8 to 2.8 | 2.0 | 2.2 | 2.4 |
| 5010 | 43% | 51.5% | 5.5% | 0.8 to 3 | 1.8 to 2.8 | 2.0 | 2.2 | 2.4 |
| 5011 | 44% | 50.5% | 5.5% | 0.8 to 3 | 1.8 to 2.8 | 2.0 | 2.2 | 2.4 |
| 5012 | 45% | 49.5% | 5.5% | 0.8 to 3 | 1.8 to 2.8 | 2.0 | 2.2 | 2.4 |
| 5013 | 46% | 48.5% | 5.5% | 0.8 to 3 | 1.8 to 2.8 | 2.0 | 2.2 | 2.4 |
| 5014 | 47% | 47.5% | 5.5% | 0.8 to 3 | 1.8 to 2.8 | 2.0 | 2.2 | 2.4 |
| 5015 | 48% | 46.5% | 5.5% | 0.8 to 3 | 1.8 to 2.8 | 2.0 | 2.2 | 2.4 |
| 5016 | 49% | 45.5% | 5.5% | 0.8 to 3 | 1.8 to 2.8 | 2.0 | 2.2 | 2.4 |
| 5017 | 50% | 44.5% | 5.5% | 0.8 to 3 | 1.8 to 2.8 | 2.0 | 2.2 | 2.4 |
| 5018 | 51% | 43.5% | 5.5% | 0.8 to 3 | 1.8 to 2.8 | 2.0 | 2.2 | 2.4 |
| 5019 | 52% | 42.5% | 5.5% | 0.8 to 3 | 1.8 to 2.8 | 2.0 | 2.2 | 2.4 |
| 5020 | 53% | 41.5% | 5.5% | 0.8 to 3 | 1.8 to 2.8 | 2.0 | 2.2 | 2.4 |
| 5021 | 54% | 40.5% | 5.5% | 0.8 to 3 | 1.8 to 2.8 | 2.0 | 2.2 | 2.4 |
| 5022 | 55% | 39.5% | 5.5% | 0.8 to 3 | 1.8 to 2.8 | 2.0 | 2.2 | 2.4 |
| 5023 | 56% | 38.5% | 5.5% | 0.8 to 3 | 1.8 to 2.8 | 2.0 | 2.2 | 2.4 |
| 5024 | 57% | 37.5% | 5.5% | 0.8 to 3 | 1.8 to 2.8 | 2.0 | 2.2 | 2.4 |
| 5025 | 58% | 36.5% | 5.5% | 0.8 to 3 | 1.8 to 2.8 | 2.0 | 2.2 | 2.4 |
| 5026 | 59% | 35.5% | 5.5% | 0.8 to 3 | 1.8 to 2.8 | 2.0 | 2.2 | 2.4 |
| 5027 | 60% | 34.5% | 5.5% | 0.8 to 3 | 1.8 to 2.8 | 2.0 | 2.2 | 2.4 |
| 5028 | 30% | 64% | 6% | 0.8 to 3 | 1.8 to 2.8 | 2.0 | 2.2 | 2.4 |
| 5029 | 31% | 63% | 6% | 0.8 to 3 | 1.8 to 2.8 | 2.0 | 2.2 | 2.4 |
| 5030 | 32% | 62% | 6% | 0.8 to 3 | 1.8 to 2.8 | 2.0 | 2.2 | 2.4 |
| 5031 | 33% | 61% | 6% | 0.8 to 3 | 1.8 to 2.8 | 2.0 | 2.2 | 2.4 |
| 5032 | 34% | 60% | 6% | 0.8 to 3 | 1.8 to 2.8 | 2.0 | 2.2 | 2.4 |
| 5033 | 35% | 59% | 6% | 0.8 to 3 | 1.8 to 2.8 | 2.0 | 2.2 | 2.4 |
| 5034 | 36% | 58% | 6% | 0.8 to 3 | 1.8 to 2.8 | 2.0 | 2.2 | 2.4 |
| 5035 | 37% | 57% | 6% | 0.8 to 3 | 1.8 to 2.8 | 2.0 | 2.2 | 2.4 |
| 5036 | 38% | 56% | 6% | 0.8 to 3 | 1.8 to 2.8 | 2.0 | 2.2 | 2.4 |
| 5037 | 39% | 55% | 6% | 0.8 to 3 | 1.8 to 2.8 | 2.0 | 2.2 | 2.4 |
| 5038 | 40% | 54% | 6% | 0.8 to 3 | 1.8 to 2.8 | 2.0 | 2.2 | 2.4 |
| 5039 | 41% | 53% | 6% | 0.8 to 3 | 1.8 to 2.8 | 2.0 | 2.2 | 2.4 |
| 5040 | 42% | 52% | 6% | 0.8 to 3 | 1.8 to 2.8 | 2.0 | 2.2 | 2.4 |
| 5041 | 43% | 51% | 6% | 0.8 to 3 | 1.8 to 2.8 | 2.0 | 2.2 | 2.4 |
| 5042 | 44% | 50% | 6% | 0.8 to 3 | 1.8 to 2.8 | 2.0 | 2.2 | 2.4 |
| 5043 | 45% | 49% | 6% | 0.8 to 3 | 1.8 to 2.8 | 2.0 | 2.2 | 2.4 |
| 5044 | 46% | 48% | 6% | 0.8 to 3 | 1.8 to 2.8 | 2.0 | 2.2 | 2.4 |
| 5045 | 47% | 47% | 6% | 0.8 to 3 | 1.8 to 2.8 | 2.0 | 2.2 | 2.4 |
| 5046 | 48% | 46% | 6% | 0.8 to 3 | 1.8 to 2.8 | 2.0 | 2.2 | 2.4 |
| 5047 | 49% | 45% | 6% | 0.8 to 3 | 1.8 to 2.8 | 2.0 | 2.2 | 2.4 |
| 5048 | 50% | 44% | 6% | 0.8 to 3 | 1.8 to 2.8 | 2.0 | 2.2 | 2.4 |
| 5049 | 51% | 43% | 6% | 0.8 to 3 | 1.8 to 2.8 | 2.0 | 2.2 | 2.4 |
| 5050 | 52% | 42% | 6% | 0.8 to 3 | 1.8 to 2.8 | 2.0 | 2.2 | 2.4 |
| 5051 | 53% | 41% | 6% | 0.8 to 3 | 1.8 to 2.8 | 2.0 | 2.2 | 2.4 |
| 5052 | 54% | 40% | 6% | 0.8 to 3 | 1.8 to 2.8 | 2.0 | 2.2 | 2.4 |
| 5053 | 55% | 39% | 6% | 0.8 to 3 | 1.8 to 2.8 | 2.0 | 2.2 | 2.4 |
| 5054 | 56% | 38% | 6% | 0.8 to 3 | 1.8 to 2.8 | 2.0 | 2.2 | 2.4 |
| 5055 | 57% | 37% | 6% | 0.8 to 3 | 1.8 to 2.8 | 2.0 | 2.2 | 2.4 |
| 5056 | 58% | 36% | 6% | 0.8 to 3 | 1.8 to 2.8 | 2.0 | 2.2 | 2.4 |
| 5057 | 59% | 35% | 6% | 0.8 to 3 | 1.8 to 2.8 | 2.0 | 2.2 | 2.4 |
| 5058 | 60% | 34% | 6% | 0.8 to 3 | 1.8 to 2.8 | 2.0 | 2.2 | 2.4 |
| 5059 | 30% | 63.5% | 6.5% | 0.8 to 3 | 1.8 to 2.8 | 2.0 | 2.2 | 2.4 |
| 5060 | 31% | 62.5% | 6.5% | 0.8 to 3 | 1.8 to 2.8 | 2.0 | 2.2 | 2.4 |
| 5061 | 32% | 61.5% | 6.5% | 0.8 to 3 | 1.8 to 2.8 | 2.0 | 2.2 | 2.4 |
| 5062 | 33% | 60.5% | 6.5% | 0.8 to 3 | 1.8 to 2.8 | 2.0 | 2.2 | 2.4 |
| 5063 | 34% | 59.5% | 6.5% | 0.8 to 3 | 1.8 to 2.8 | 2.0 | 2.2 | 2.4 |
| 5064 | 35% | 58.5% | 6.5% | 0.8 to 3 | 1.8 to 2.8 | 2.0 | 2.2 | 2.4 |
| 5065 | 36% | 57.5% | 6.5% | 0.8 to 3 | 1.8 to 2.8 | 2.0 | 2.2 | 2.4 |
| 5066 | 37% | 56.5% | 6.5% | 0.8 to 3 | 1.8 to 2.8 | 2.0 | 2.2 | 2.4 |
| 5067 | 38% | 55.5% | 6.5% | 0.8 to 3 | 1.8 to 2.8 | 2.0 | 2.2 | 2.4 |
| 5068 | 39% | 54.5% | 6.5% | 0.8 to 3 | 1.8 to 2.8 | 2.0 | 2.2 | 2.4 |
| 5069 | 40% | 53.5% | 6.5% | 0.8 to 3 | 1.8 to 2.8 | 2.0 | 2.2 | 2.4 |
| 5070 | 41% | 52.5% | 6.5% | 0.8 to 3 | 1.8 to 2.8 | 2.0 | 2.2 | 2.4 |
| 5071 | 42% | 51.5% | 6.5% | 0.8 to 3 | 1.8 to 2.8 | 2.0 | 2.2 | 2.4 |
| 5072 | 43% | 50.5% | 6.5% | 0.8 to 3 | 1.8 to 2.8 | 2.0 | 2.2 | 2.4 |
| 5073 | 44% | 49.5% | 6.5% | 0.8 to 3 | 1.8 to 2.8 | 2.0 | 2.2 | 2.4 |
| 5074 | 45% | 48.5% | 6.5% | 0.8 to 3 | 1.8 to 2.8 | 2.0 | 2.2 | 2.4 |
| 5075 | 46% | 47.5% | 6.5% | 0.8 to 3 | 1.8 to 2.8 | 2.0 | 2.2 | 2.4 |
| 5076 | 47% | 46.5% | 6.5% | 0.8 to 3 | 1.8 to 2.8 | 2.0 | 2.2 | 2.4 |
| 5077 | 48% | 45.5% | 6.5% | 0.8 to 3 | 1.8 to 2.8 | 2.0 | 2.2 | 2.4 |
| 5078 | 49% | 44.5% | 6.5% | 0.8 to 3 | 1.8 to 2.8 | 2.0 | 2.2 | 2.4 |
| 5079 | 50% | 43.5% | 6.5% | 0.8 to 3 | 1.8 to 2.8 | 2.0 | 2.2 | 2.4 |
| 5080 | 51% | 42.5% | 6.5% | 0.8 to 3 | 1.8 to 2.8 | 2.0 | 2.2 | 2.4 |
| 5081 | 52% | 41.5% | 6.5% | 0.8 to 3 | 1.8 to 2.8 | 2.0 | 2.2 | 2.4 |
| 5082 | 53% | 40.5% | 6.5% | 0.8 to 3 | 1.8 to 2.8 | 2.0 | 2.2 | 2.4 |
| 5083 | 54% | 39.5% | 6.5% | 0.8 to 3 | 1.8 to 2.8 | 2.0 | 2.2 | 2.4 |
| 5084 | 55% | 38.5% | 6.5% | 0.8 to 3 | 1.8 to 2.8 | 2.0 | 2.2 | 2.4 |
| 5085 | 56% | 37.5% | 6.5% | 0.8 to 3 | 1.8 to 2.8 | 2.0 | 2.2 | 2.4 |
| 5086 | 57% | 36.5% | 6.5% | 0.8 to 3 | 1.8 to 2.8 | 2.0 | 2.2 | 2.4 |
| 5087 | 58% | 35.5% | 6.5% | 0.8 to 3 | 1.8 to 2.8 | 2.0 | 2.2 | 2.4 |
| 5088 | 59% | 34.5% | 6.5% | 0.8 to 3 | 1.8 to 2.8 | 2.0 | 2.2 | 2.4 |
| 5089 | 60% | 33.5% | 6.5% | 0.8 to 3 | 1.8 to 2.8 | 2.0 | 2.2 | 2.4 |
| 5090 | 30% | 63% | 7% | 0.8 to 3 | 1.8 to 2.8 | 2.0 | 2.2 | 2.4 |
| 5091 | 31% | 62% | 7% | 0.8 to 3 | 1.8 to 2.8 | 2.0 | 2.2 | 2.4 |
| 5092 | 32% | 61% | 7% | 0.8 to 3 | 1.8 to 2.8 | 2.0 | 2.2 | 2.4 |
| 5093 | 33% | 60% | 7% | 0.8 to 3 | 1.8 to 2.8 | 2.0 | 2.2 | 2.4 |
| 5094 | 34% | 59% | 7% | 0.8 to 3 | 1.8 to 2.8 | 2.0 | 2.2 | 2.4 |
| 5095 | 35% | 58% | 7% | 0.8 to 3 | 1.8 to 2.8 | 2.0 | 2.2 | 2.4 |

TABLE 11-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 to 10 | 9 to 11 | Range A | Range B | Species C | Species D | Species E |
| 5096 | 36% | 57% | 7% | 0.8 to 3 | 1.8 to 2.8 | 2.0 | 2.2 | 2.4 |
| 5097 | 37% | 56% | 7% | 0.8 to 3 | 1.8 to 2.8 | 2.0 | 2.2 | 2.4 |
| 5098 | 38% | 55% | 7% | 0.8 to 3 | 1.8 to 2.8 | 2.0 | 2.2 | 2.4 |
| 5099 | 39% | 54% | 7% | 0.8 to 3 | 1.8 to 2.8 | 2.0 | 2.2 | 2.4 |
| 5100 | 40% | 53% | 7% | 0.8 to 3 | 1.8 to 2.8 | 2.0 | 2.2 | 2.4 |
| 5101 | 41% | 52% | 7% | 0.8 to 3 | 1.8 to 2.8 | 2.0 | 2.2 | 2.4 |
| 5102 | 42% | 51% | 7% | 0.8 to 3 | 1.8 to 2.8 | 2.0 | 2.2 | 2.4 |
| 5103 | 43% | 50% | 7% | 0.8 to 3 | 1.8 to 2.8 | 2.0 | 2.2 | 2.4 |
| 5104 | 44% | 49% | 7% | 0.8 to 3 | 1.8 to 2.8 | 2.0 | 2.2 | 2.4 |
| 5105 | 45% | 48% | 7% | 0.8 to 3 | 1.8 to 2.8 | 2.0 | 2.2 | 2.4 |
| 5106 | 46% | 47% | 7% | 0.8 to 3 | 1.8 to 2.8 | 2.0 | 2.2 | 2.4 |
| 5107 | 47% | 46% | 7% | 0.8 to 3 | 1.8 to 2.8 | 2.0 | 2.2 | 2.4 |
| 5108 | 48% | 45% | 7% | 0.8 to 3 | 1.8 to 2.8 | 2.0 | 2.2 | 2.4 |
| 5109 | 49% | 44% | 7% | 0.8 to 3 | 1.8 to 2.8 | 2.0 | 2.2 | 2.4 |
| 5110 | 50% | 43% | 7% | 0.8 to 3 | 1.8 to 2.8 | 2.0 | 2.2 | 2.4 |
| 5111 | 51% | 42% | 7% | 0.8 to 3 | 1.8 to 2.8 | 2.0 | 2.2 | 2.4 |
| 5112 | 52% | 41% | 7% | 0.8 to 3 | 1.8 to 2.8 | 2.0 | 2.2 | 2.4 |
| 5113 | 53% | 40% | 7% | 0.8 to 3 | 1.8 to 2.8 | 2.0 | 2.2 | 2.4 |
| 5114 | 54% | 39% | 7% | 0.8 to 3 | 1.8 to 2.8 | 2.0 | 2.2 | 2.4 |
| 5115 | 55% | 38% | 7% | 0.8 to 3 | 1.8 to 2.8 | 2.0 | 2.2 | 2.4 |
| 5116 | 56% | 37% | 7% | 0.8 to 3 | 1.8 to 2.8 | 2.0 | 2.2 | 2.4 |
| 5117 | 57% | 36% | 7% | 0.8 to 3 | 1.8 to 2.8 | 2.0 | 2.2 | 2.4 |
| 5118 | 58% | 35% | 7% | 0.8 to 3 | 1.8 to 2.8 | 2.0 | 2.2 | 2.4 |
| 5119 | 59% | 34% | 7% | 0.8 to 3 | 1.8 to 2.8 | 2.0 | 2.2 | 2.4 |
| 5120 | 60% | 33% | 7% | 0.8 to 3 | 1.8 to 2.8 | 2.0 | 2.2 | 2.4 |

TABLE 12

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 | 9 | 9 to 11 | Range A | Range B | Species C | Species D | Species E |
| 5121 | 30% | 70% | 0% | 0.8 to 3 | 1.8 to 2.8 | 2.0 | 2.2 | 2.4 |
| 5122 | 31% | 69% | 0% | 0.8 to 3 | 1.8 to 2.8 | 2.0 | 2.2 | 2.4 |
| 5123 | 32% | 68% | 0% | 0.8 to 3 | 1.8 to 2.8 | 2.0 | 2.2 | 2.4 |
| 5124 | 33% | 67% | 0% | 0.8 to 3 | 1.8 to 2.8 | 2.0 | 2.2 | 2.4 |
| 5125 | 34% | 66% | 0% | 0.8 to 3 | 1.8 to 2.8 | 2.0 | 2.2 | 2.4 |
| 5126 | 35% | 65% | 0% | 0.8 to 3 | 1.8 to 2.8 | 2.0 | 2.2 | 2.4 |
| 5127 | 36% | 64% | 0% | 0.8 to 3 | 1.8 to 2.8 | 2.0 | 2.2 | 2.4 |
| 5128 | 37% | 63% | 0% | 0.8 to 3 | 1.8 to 2.8 | 2.0 | 2.2 | 2.4 |
| 5129 | 38% | 62% | 0% | 0.8 to 3 | 1.8 to 2.8 | 2.0 | 2.2 | 2.4 |
| 5130 | 39% | 61% | 0% | 0.8 to 3 | 1.8 to 2.8 | 2.0 | 2.2 | 2.4 |
| 5131 | 40% | 60% | 0% | 0.8 to 3 | 1.8 to 2.8 | 2.0 | 2.2 | 2.4 |
| 5132 | 41% | 59% | 0% | 0.8 to 3 | 1.8 to 2.8 | 2.0 | 2.2 | 2.4 |
| 5133 | 42% | 58% | 0% | 0.8 to 3 | 1.8 to 2.8 | 2.0 | 2.2 | 2.4 |
| 5134 | 43% | 57% | 0% | 0.8 to 3 | 1.8 to 2.8 | 2.0 | 2.2 | 2.4 |
| 5135 | 44% | 56% | 0% | 0.8 to 3 | 1.8 to 2.8 | 2.0 | 2.2 | 2.4 |
| 5136 | 45% | 55% | 0% | 0.8 to 3 | 1.8 to 2.8 | 2.0 | 2.2 | 2.4 |
| 5137 | 46% | 54% | 0% | 0.8 to 3 | 1.8 to 2.8 | 2.0 | 2.2 | 2.4 |
| 5138 | 47% | 53% | 0% | 0.8 to 3 | 1.8 to 2.8 | 2.0 | 2.2 | 2.4 |
| 5139 | 48% | 52% | 0% | 0.8 to 3 | 1.8 to 2.8 | 2.0 | 2.2 | 2.4 |
| 5140 | 49% | 51% | 0% | 0.8 to 3 | 1.8 to 2.8 | 2.0 | 2.2 | 2.4 |
| 5141 | 50% | 50% | 0% | 0.8 to 3 | 1.8 to 2.8 | 2.0 | 2.2 | 2.4 |
| 5142 | 51% | 49% | 0% | 0.8 to 3 | 1.8 to 2.8 | 2.0 | 2.2 | 2.4 |
| 5143 | 52% | 48% | 0% | 0.8 to 3 | 1.8 to 2.8 | 2.0 | 2.2 | 2.4 |
| 5144 | 53% | 47% | 0% | 0.8 to 3 | 1.8 to 2.8 | 2.0 | 2.2 | 2.4 |
| 5145 | 54% | 46% | 0% | 0.8 to 3 | 1.8 to 2.8 | 2.0 | 2.2 | 2.4 |
| 5146 | 55% | 45% | 0% | 0.8 to 3 | 1.8 to 2.8 | 2.0 | 2.2 | 2.4 |
| 5147 | 56% | 44% | 0% | 0.8 to 3 | 1.8 to 2.8 | 2.0 | 2.2 | 2.4 |
| 5148 | 57% | 43% | 0% | 0.8 to 3 | 1.8 to 2.8 | 2.0 | 2.2 | 2.4 |
| 5149 | 58% | 42% | 0% | 0.8 to 3 | 1.8 to 2.8 | 2.0 | 2.2 | 2.4 |
| 5150 | 59% | 41% | 0% | 0.8 to 3 | 1.8 to 2.8 | 2.0 | 2.2 | 2.4 |
| 5151 | 60% | 40% | 0% | 0.8 to 3 | 1.8 to 2.8 | 2.0 | 2.2 | 2.4 |
| 5152 | 30% | 69.5% | 0.5% | 0.8 to 3 | 1.8 to 2.8 | 2.0 | 2.2 | 2.4 |
| 5153 | 31% | 68.5% | 0.5% | 0.8 to 3 | 1.8 to 2.8 | 2.0 | 2.2 | 2.4 |
| 5154 | 32% | 67.5% | 0.5% | 0.8 to 3 | 1.8 to 2.8 | 2.0 | 2.2 | 2.4 |
| 5155 | 33% | 66.5% | 0.5% | 0.8 to 3 | 1.8 to 2.8 | 2.0 | 2.2 | 2.4 |
| 5156 | 34% | 65.5% | 0.5% | 0.8 to 3 | 1.8 to 2.8 | 2.0 | 2.2 | 2.4 |
| 5157 | 35% | 64.5% | 0.5% | 0.8 to 3 | 1.8 to 2.8 | 2.0 | 2.2 | 2.4 |
| 5158 | 36% | 63.5% | 0.5% | 0.8 to 3 | 1.8 to 2.8 | 2.0 | 2.2 | 2.4 |
| 5159 | 37% | 62.5% | 0.5% | 0.8 to 3 | 1.8 to 2.8 | 2.0 | 2.2 | 2.4 |
| 5160 | 38% | 61.5% | 0.5% | 0.8 to 3 | 1.8 to 2.8 | 2.0 | 2.2 | 2.4 |
| 5161 | 39% | 60.5% | 0.5% | 0.8 to 3 | 1.8 to 2.8 | 2.0 | 2.2 | 2.4 |
| 5162 | 40% | 59.5% | 0.5% | 0.8 to 3 | 1.8 to 2.8 | 2.0 | 2.2 | 2.4 |
| 5163 | 41% | 58.5% | 0.5% | 0.8 to 3 | 1.8 to 2.8 | 2.0 | 2.2 | 2.4 |
| 5164 | 42% | 57.5% | 0.5% | 0.8 to 3 | 1.8 to 2.8 | 2.0 | 2.2 | 2.4 |
| 5165 | 43% | 56.5% | 0.5% | 0.8 to 3 | 1.8 to 2.8 | 2.0 | 2.2 | 2.4 |
| 5166 | 44% | 55.5% | 0.5% | 0.8 to 3 | 1.8 to 2.8 | 2.0 | 2.2 | 2.4 |
| 5167 | 45% | 54.5% | 0.5% | 0.8 to 3 | 1.8 to 2.8 | 2.0 | 2.2 | 2.4 |
| 5168 | 46% | 53.5% | 0.5% | 0.8 to 3 | 1.8 to 2.8 | 2.0 | 2.2 | 2.4 |
| 5169 | 47% | 52.5% | 0.5% | 0.8 to 3 | 1.8 to 2.8 | 2.0 | 2.2 | 2.4 |
| 5170 | 48% | 51.5% | 0.5% | 0.8 to 3 | 1.8 to 2.8 | 2.0 | 2.2 | 2.4 |
| 5171 | 49% | 50.5% | 0.5% | 0.8 to 3 | 1.8 to 2.8 | 2.0 | 2.2 | 2.4 |
| 5172 | 50% | 49.5% | 0.5% | 0.8 to 3 | 1.8 to 2.8 | 2.0 | 2.2 | 2.4 |
| 5173 | 51% | 48.5% | 0.5% | 0.8 to 3 | 1.8 to 2.8 | 2.0 | 2.2 | 2.4 |
| 5174 | 52% | 47.5% | 0.5% | 0.8 to 3 | 1.8 to 2.8 | 2.0 | 2.2 | 2.4 |
| 5175 | 53% | 46.5% | 0.5% | 0.8 to 3 | 1.8 to 2.8 | 2.0 | 2.2 | 2.4 |
| 5176 | 54% | 45.5% | 0.5% | 0.8 to 3 | 1.8 to 2.8 | 2.0 | 2.2 | 2.4 |
| 5177 | 55% | 44.5% | 0.5% | 0.8 to 3 | 1.8 to 2.8 | 2.0 | 2.2 | 2.4 |
| 5178 | 56% | 43.5% | 0.5% | 0.8 to 3 | 1.8 to 2.8 | 2.0 | 2.2 | 2.4 |
| 5179 | 57% | 42.5% | 0.5% | 0.8 to 3 | 1.8 to 2.8 | 2.0 | 2.2 | 2.4 |
| 5180 | 58% | 41.5% | 0.5% | 0.8 to 3 | 1.8 to 2.8 | 2.0 | 2.2 | 2.4 |
| 5181 | 59% | 40.5% | 0.5% | 0.8 to 3 | 1.8 to 2.8 | 2.0 | 2.2 | 2.4 |
| 5182 | 60% | 39.5% | 0.5% | 0.8 to 3 | 1.8 to 2.8 | 2.0 | 2.2 | 2.4 |
| 5183 | 30% | 69% | 1% | 0.8 to 3 | 1.8 to 2.8 | 2.0 | 2.2 | 2.4 |
| 5184 | 31% | 68% | 1% | 0.8 to 3 | 1.8 to 2.8 | 2.0 | 2.2 | 2.4 |
| 5185 | 32% | 67% | 1% | 0.8 to 3 | 1.8 to 2.8 | 2.0 | 2.2 | 2.4 |
| 5186 | 33% | 66% | 1% | 0.8 to 3 | 1.8 to 2.8 | 2.0 | 2.2 | 2.4 |
| 5187 | 34% | 65% | 1% | 0.8 to 3 | 1.8 to 2.8 | 2.0 | 2.2 | 2.4 |
| 5188 | 35% | 64% | 1% | 0.8 to 3 | 1.8 to 2.8 | 2.0 | 2.2 | 2.4 |
| 5189 | 36% | 63% | 1% | 0.8 to 3 | 1.8 to 2.8 | 2.0 | 2.2 | 2.4 |
| 5190 | 37% | 62% | 1% | 0.8 to 3 | 1.8 to 2.8 | 2.0 | 2.2 | 2.4 |
| 5191 | 38% | 61% | 1% | 0.8 to 3 | 1.8 to 2.8 | 2.0 | 2.2 | 2.4 |
| 5192 | 39% | 60% | 1% | 0.8 to 3 | 1.8 to 2.8 | 2.0 | 2.2 | 2.4 |
| 5193 | 40% | 59% | 1% | 0.8 to 3 | 1.8 to 2.8 | 2.0 | 2.2 | 2.4 |
| 5194 | 41% | 58% | 1% | 0.8 to 3 | 1.8 to 2.8 | 2.0 | 2.2 | 2.4 |
| 5195 | 42% | 57% | 1% | 0.8 to 3 | 1.8 to 2.8 | 2.0 | 2.2 | 2.4 |
| 5196 | 43% | 56% | 1% | 0.8 to 3 | 1.8 to 2.8 | 2.0 | 2.2 | 2.4 |
| 5197 | 44% | 55% | 1% | 0.8 to 3 | 1.8 to 2.8 | 2.0 | 2.2 | 2.4 |
| 5198 | 45% | 54% | 1% | 0.8 to 3 | 1.8 to 2.8 | 2.0 | 2.2 | 2.4 |
| 5199 | 46% | 53% | 1% | 0.8 to 3 | 1.8 to 2.8 | 2.0 | 2.2 | 2.4 |
| 5200 | 47% | 52% | 1% | 0.8 to 3 | 1.8 to 2.8 | 2.0 | 2.2 | 2.4 |
| 5201 | 48% | 51% | 1% | 0.8 to 3 | 1.8 to 2.8 | 2.0 | 2.2 | 2.4 |
| 5202 | 49% | 50% | 1% | 0.8 to 3 | 1.8 to 2.8 | 2.0 | 2.2 | 2.4 |
| 5203 | 50% | 49% | 1% | 0.8 to 3 | 1.8 to 2.8 | 2.0 | 2.2 | 2.4 |
| 5204 | 51% | 48% | 1% | 0.8 to 3 | 1.8 to 2.8 | 2.0 | 2.2 | 2.4 |
| 5205 | 52% | 47% | 1% | 0.8 to 3 | 1.8 to 2.8 | 2.0 | 2.2 | 2.4 |
| 5206 | 53% | 46% | 1% | 0.8 to 3 | 1.8 to 2.8 | 2.0 | 2.2 | 2.4 |
| 5207 | 54% | 45% | 1% | 0.8 to 3 | 1.8 to 2.8 | 2.0 | 2.2 | 2.4 |
| 5208 | 55% | 44% | 1% | 0.8 to 3 | 1.8 to 2.8 | 2.0 | 2.2 | 2.4 |
| 5209 | 56% | 43% | 1% | 0.8 to 3 | 1.8 to 2.8 | 2.0 | 2.2 | 2.4 |
| 5210 | 57% | 42% | 1% | 0.8 to 3 | 1.8 to 2.8 | 2.0 | 2.2 | 2.4 |
| 5211 | 58% | 41% | 1% | 0.8 to 3 | 1.8 to 2.8 | 2.0 | 2.2 | 2.4 |
| 5212 | 59% | 40% | 1% | 0.8 to 3 | 1.8 to 2.8 | 2.0 | 2.2 | 2.4 |
| 5213 | 60% | 39% | 1% | 0.8 to 3 | 1.8 to 2.8 | 2.0 | 2.2 | 2.4 |
| 5214 | 30% | 68.5% | 1.5% | 0.8 to 3 | 1.8 to 2.8 | 2.0 | 2.2 | 2.4 |

TABLE 12-continued

| | Alkyl Sulfate | Alkyl Ether Sulfate | | | | | |
|---|---|---|---|---|---|---|---|
| | Alkyl Chain Length, | Alkyl Chain Length, | Average mol. EO (Alternatives for each numbered species) | | | | |
| Species | Wt. % 8 | Wt. % 9 | Range 9 to 11 | Range A | Range B | Species C | Species D | Species E |
| 5215 | 31% | 67.5% | 1.5% | 0.8 to 3 | 1.8 to 2.8 | 2.0 | 2.2 | 2.4 |
| 5216 | 32% | 66.5% | 1.5% | 0.8 to 3 | 1.8 to 2.8 | 2.0 | 2.2 | 2.4 |
| 5217 | 33% | 65.5% | 1.5% | 0.8 to 3 | 1.8 to 2.8 | 2.0 | 2.2 | 2.4 |
| 5218 | 34% | 64.5% | 1.5% | 0.8 to 3 | 1.8 to 2.8 | 2.0 | 2.2 | 2.4 |
| 5219 | 35% | 63.5% | 1.5% | 0.8 to 3 | 1.8 to 2.8 | 2.0 | 2.2 | 2.4 |
| 5220 | 36% | 62.5% | 1.5% | 0.8 to 3 | 1.8 to 2.8 | 2.0 | 2.2 | 2.4 |
| 5221 | 37% | 61.5% | 1.5% | 0.8 to 3 | 1.8 to 2.8 | 2.0 | 2.2 | 2.4 |
| 5222 | 38% | 60.5% | 1.5% | 0.8 to 3 | 1.8 to 2.8 | 2.0 | 2.2 | 2.4 |
| 5223 | 39% | 59.5% | 1.5% | 0.8 to 3 | 1.8 to 2.8 | 2.0 | 2.2 | 2.4 |
| 5224 | 40% | 58.5% | 1.5% | 0.8 to 3 | 1.8 to 2.8 | 2.0 | 2.2 | 2.4 |
| 5225 | 41% | 57.5% | 1.5% | 0.8 to 3 | 1.8 to 2.8 | 2.0 | 2.2 | 2.4 |
| 5226 | 42% | 56.5% | 1.5% | 0.8 to 3 | 1.8 to 2.8 | 2.0 | 2.2 | 2.4 |
| 5227 | 43% | 55.5% | 1.5% | 0.8 to 3 | 1.8 to 2.8 | 2.0 | 2.2 | 2.4 |
| 5228 | 44% | 54.5% | 1.5% | 0.8 to 3 | 1.8 to 2.8 | 2.0 | 2.2 | 2.4 |
| 5229 | 45% | 53.5% | 1.5% | 0.8 to 3 | 1.8 to 2.8 | 2.0 | 2.2 | 2.4 |
| 5230 | 46% | 52.5% | 1.5% | 0.8 to 3 | 1.8 to 2.8 | 2.0 | 2.2 | 2.4 |
| 5231 | 47% | 51.5% | 1.5% | 0.8 to 3 | 1.8 to 2.8 | 2.0 | 2.2 | 2.4 |
| 5232 | 48% | 50.5% | 1.5% | 0.8 to 3 | 1.8 to 2.8 | 2.0 | 2.2 | 2.4 |
| 5233 | 49% | 49.5% | 1.5% | 0.8 to 3 | 1.8 to 2.8 | 2.0 | 2.2 | 2.4 |
| 5234 | 50% | 48.5% | 1.5% | 0.8 to 3 | 1.8 to 2.8 | 2.0 | 2.2 | 2.4 |
| 5235 | 51% | 47.5% | 1.5% | 0.8 to 3 | 1.8 to 2.8 | 2.0 | 2.2 | 2.4 |
| 5236 | 52% | 46.5% | 1.5% | 0.8 to 3 | 1.8 to 2.8 | 2.0 | 2.2 | 2.4 |
| 5237 | 53% | 45.5% | 1.5% | 0.8 to 3 | 1.8 to 2.8 | 2.0 | 2.2 | 2.4 |
| 5238 | 54% | 44.5% | 1.5% | 0.8 to 3 | 1.8 to 2.8 | 2.0 | 2.2 | 2.4 |
| 5239 | 55% | 43.5% | 1.5% | 0.8 to 3 | 1.8 to 2.8 | 2.0 | 2.2 | 2.4 |
| 5240 | 56% | 42.5% | 1.5% | 0.8 to 3 | 1.8 to 2.8 | 2.0 | 2.2 | 2.4 |
| 5241 | 57% | 41.5% | 1.5% | 0.8 to 3 | 1.8 to 2.8 | 2.0 | 2.2 | 2.4 |
| 5242 | 58% | 40.5% | 1.5% | 0.8 to 3 | 1.8 to 2.8 | 2.0 | 2.2 | 2.4 |
| 5243 | 59% | 39.5% | 1.5% | 0.8 to 3 | 1.8 to 2.8 | 2.0 | 2.2 | 2.4 |
| 5244 | 60% | 38.5% | 1.5% | 0.8 to 3 | 1.8 to 2.8 | 2.0 | 2.2 | 2.4 |
| 5245 | 30% | 68% | 2% | 0.8 to 3 | 1.8 to 2.8 | 2.0 | 2.2 | 2.4 |
| 5246 | 31% | 67% | 2% | 0.8 to 3 | 1.8 to 2.8 | 2.0 | 2.2 | 2.4 |
| 5247 | 32% | 66% | 2% | 0.8 to 3 | 1.8 to 2.8 | 2.0 | 2.2 | 2.4 |
| 5248 | 33% | 65% | 2% | 0.8 to 3 | 1.8 to 2.8 | 2.0 | 2.2 | 2.4 |
| 5249 | 34% | 64% | 2% | 0.8 to 3 | 1.8 to 2.8 | 2.0 | 2.2 | 2.4 |
| 5250 | 35% | 63% | 2% | 0.8 to 3 | 1.8 to 2.8 | 2.0 | 2.2 | 2.4 |
| 5251 | 36% | 62% | 2% | 0.8 to 3 | 1.8 to 2.8 | 2.0 | 2.2 | 2.4 |
| 5252 | 37% | 61% | 2% | 0.8 to 3 | 1.8 to 2.8 | 2.0 | 2.2 | 2.4 |
| 5253 | 38% | 60% | 2% | 0.8 to 3 | 1.8 to 2.8 | 2.0 | 2.2 | 2.4 |
| 5254 | 39% | 59% | 2% | 0.8 to 3 | 1.8 to 2.8 | 2.0 | 2.2 | 2.4 |
| 5255 | 40% | 58% | 2% | 0.8 to 3 | 1.8 to 2.8 | 2.0 | 2.2 | 2.4 |
| 5256 | 41% | 57% | 2% | 0.8 to 3 | 1.8 to 2.8 | 2.0 | 2.2 | 2.4 |
| 5257 | 42% | 56% | 2% | 0.8 to 3 | 1.8 to 2.8 | 2.0 | 2.2 | 2.4 |
| 5258 | 43% | 55% | 2% | 0.8 to 3 | 1.8 to 2.8 | 2.0 | 2.2 | 2.4 |
| 5259 | 44% | 54% | 2% | 0.8 to 3 | 1.8 to 2.8 | 2.0 | 2.2 | 2.4 |
| 5260 | 45% | 53% | 2% | 0.8 to 3 | 1.8 to 2.8 | 2.0 | 2.2 | 2.4 |
| 5261 | 46% | 52% | 2% | 0.8 to 3 | 1.8 to 2.8 | 2.0 | 2.2 | 2.4 |
| 5262 | 47% | 51% | 2% | 0.8 to 3 | 1.8 to 2.8 | 2.0 | 2.2 | 2.4 |
| 5263 | 48% | 50% | 2% | 0.8 to 3 | 1.8 to 2.8 | 2.0 | 2.2 | 2.4 |
| 5264 | 49% | 49% | 2% | 0.8 to 3 | 1.8 to 2.8 | 2.0 | 2.2 | 2.4 |
| 5265 | 50% | 48% | 2% | 0.8 to 3 | 1.8 to 2.8 | 2.0 | 2.2 | 2.4 |
| 5266 | 51% | 47% | 2% | 0.8 to 3 | 1.8 to 2.8 | 2.0 | 2.2 | 2.4 |
| 5267 | 52% | 46% | 2% | 0.8 to 3 | 1.8 to 2.8 | 2.0 | 2.2 | 2.4 |
| 5268 | 53% | 45% | 2% | 0.8 to 3 | 1.8 to 2.8 | 2.0 | 2.2 | 2.4 |
| 5269 | 54% | 44% | 2% | 0.8 to 3 | 1.8 to 2.8 | 2.0 | 2.2 | 2.4 |
| 5270 | 55% | 43% | 2% | 0.8 to 3 | 1.8 to 2.8 | 2.0 | 2.2 | 2.4 |
| 5271 | 56% | 42% | 2% | 0.8 to 3 | 1.8 to 2.8 | 2.0 | 2.2 | 2.4 |
| 5272 | 57% | 41% | 2% | 0.8 to 3 | 1.8 to 2.8 | 2.0 | 2.2 | 2.4 |
| 5273 | 58% | 40% | 2% | 0.8 to 3 | 1.8 to 2.8 | 2.0 | 2.2 | 2.4 |
| 5274 | 59% | 39% | 2% | 0.8 to 3 | 1.8 to 2.8 | 2.0 | 2.2 | 2.4 |
| 5275 | 60% | 38% | 2% | 0.8 to 3 | 1.8 to 2.8 | 2.0 | 2.2 | 2.4 |
| 5276 | 30% | 67.5% | 2.5% | 0.8 to 3 | 1.8 to 2.8 | 2.0 | 2.2 | 2.4 |
| 5277 | 31% | 66.5% | 2.5% | 0.8 to 3 | 1.8 to 2.8 | 2.0 | 2.2 | 2.4 |
| 5278 | 32% | 65.5% | 2.5% | 0.8 to 3 | 1.8 to 2.8 | 2.0 | 2.2 | 2.4 |
| 5279 | 33% | 64.5% | 2.5% | 0.8 to 3 | 1.8 to 2.8 | 2.0 | 2.2 | 2.4 |
| 5280 | 34% | 63.5% | 2.5% | 0.8 to 3 | 1.8 to 2.8 | 2.0 | 2.2 | 2.4 |
| 5281 | 35% | 62.5% | 2.5% | 0.8 to 3 | 1.8 to 2.8 | 2.0 | 2.2 | 2.4 |
| 5282 | 36% | 61.5% | 2.5% | 0.8 to 3 | 1.8 to 2.8 | 2.0 | 2.2 | 2.4 |
| 5283 | 37% | 60.5% | 2.5% | 0.8 to 3 | 1.8 to 2.8 | 2.0 | 2.2 | 2.4 |
| 5284 | 38% | 59.5% | 2.5% | 0.8 to 3 | 1.8 to 2.8 | 2.0 | 2.2 | 2.4 |
| 5285 | 39% | 58.5% | 2.5% | 0.8 to 3 | 1.8 to 2.8 | 2.0 | 2.2 | 2.4 |
| 5286 | 40% | 57.5% | 2.5% | 0.8 to 3 | 1.8 to 2.8 | 2.0 | 2.2 | 2.4 |
| 5287 | 41% | 56.5% | 2.5% | 0.8 to 3 | 1.8 to 2.8 | 2.0 | 2.2 | 2.4 |
| 5288 | 42% | 55.5% | 2.5% | 0.8 to 3 | 1.8 to 2.8 | 2.0 | 2.2 | 2.4 |
| 5289 | 43% | 54.5% | 2.5% | 0.8 to 3 | 1.8 to 2.8 | 2.0 | 2.2 | 2.4 |
| 5290 | 44% | 53.5% | 2.5% | 0.8 to 3 | 1.8 to 2.8 | 2.0 | 2.2 | 2.4 |
| 5291 | 45% | 52.5% | 2.5% | 0.8 to 3 | 1.8 to 2.8 | 2.0 | 2.2 | 2.4 |
| 5292 | 46% | 51.5% | 2.5% | 0.8 to 3 | 1.8 to 2.8 | 2.0 | 2.2 | 2.4 |
| 5293 | 47% | 50.5% | 2.5% | 0.8 to 3 | 1.8 to 2.8 | 2.0 | 2.2 | 2.4 |
| 5294 | 48% | 49.5% | 2.5% | 0.8 to 3 | 1.8 to 2.8 | 2.0 | 2.2 | 2.4 |
| 5295 | 49% | 48.5% | 2.5% | 0.8 to 3 | 1.8 to 2.8 | 2.0 | 2.2 | 2.4 |
| 5296 | 50% | 47.5% | 2.5% | 0.8 to 3 | 1.8 to 2.8 | 2.0 | 2.2 | 2.4 |
| 5297 | 51% | 46.5% | 2.5% | 0.8 to 3 | 1.8 to 2.8 | 2.0 | 2.2 | 2.4 |
| 5298 | 52% | 45.5% | 2.5% | 0.8 to 3 | 1.8 to 2.8 | 2.0 | 2.2 | 2.4 |
| 5299 | 53% | 44.5% | 2.5% | 0.8 to 3 | 1.8 to 2.8 | 2.0 | 2.2 | 2.4 |
| 5300 | 54% | 43.5% | 2.5% | 0.8 to 3 | 1.8 to 2.8 | 2.0 | 2.2 | 2.4 |
| 5301 | 55% | 42.5% | 2.5% | 0.8 to 3 | 1.8 to 2.8 | 2.0 | 2.2 | 2.4 |
| 5302 | 56% | 41.5% | 2.5% | 0.8 to 3 | 1.8 to 2.8 | 2.0 | 2.2 | 2.4 |
| 5303 | 57% | 40.5% | 2.5% | 0.8 to 3 | 1.8 to 2.8 | 2.0 | 2.2 | 2.4 |
| 5304 | 58% | 39.5% | 2.5% | 0.8 to 3 | 1.8 to 2.8 | 2.0 | 2.2 | 2.4 |
| 5305 | 59% | 38.5% | 2.5% | 0.8 to 3 | 1.8 to 2.8 | 2.0 | 2.2 | 2.4 |
| 5306 | 60% | 37.5% | 2.5% | 0.8 to 3 | 1.8 to 2.8 | 2.0 | 2.2 | 2.4 |
| 5307 | 30% | 67% | 3% | 0.8 to 3 | 1.8 to 2.8 | 2.0 | 2.2 | 2.4 |
| 5308 | 31% | 66% | 3% | 0.8 to 3 | 1.8 to 2.8 | 2.0 | 2.2 | 2.4 |
| 5309 | 32% | 65% | 3% | 0.8 to 3 | 1.8 to 2.8 | 2.0 | 2.2 | 2.4 |
| 5310 | 33% | 64% | 3% | 0.8 to 3 | 1.8 to 2.8 | 2.0 | 2.2 | 2.4 |
| 5311 | 34% | 63% | 3% | 0.8 to 3 | 1.8 to 2.8 | 2.0 | 2.2 | 2.4 |
| 5312 | 35% | 62% | 3% | 0.8 to 3 | 1.8 to 2.8 | 2.0 | 2.2 | 2.4 |
| 5313 | 36% | 61% | 3% | 0.8 to 3 | 1.8 to 2.8 | 2.0 | 2.2 | 2.4 |
| 5314 | 37% | 60% | 3% | 0.8 to 3 | 1.8 to 2.8 | 2.0 | 2.2 | 2.4 |
| 5315 | 38% | 59% | 3% | 0.8 to 3 | 1.8 to 2.8 | 2.0 | 2.2 | 2.4 |
| 5316 | 39% | 58% | 3% | 0.8 to 3 | 1.8 to 2.8 | 2.0 | 2.2 | 2.4 |
| 5317 | 40% | 57% | 3% | 0.8 to 3 | 1.8 to 2.8 | 2.0 | 2.2 | 2.4 |
| 5318 | 41% | 56% | 3% | 0.8 to 3 | 1.8 to 2.8 | 2.0 | 2.2 | 2.4 |
| 5319 | 42% | 55% | 3% | 0.8 to 3 | 1.8 to 2.8 | 2.0 | 2.2 | 2.4 |
| 5320 | 43% | 54% | 3% | 0.8 to 3 | 1.8 to 2.8 | 2.0 | 2.2 | 2.4 |
| 5321 | 44% | 53% | 3% | 0.8 to 3 | 1.8 to 2.8 | 2.0 | 2.2 | 2.4 |
| 5322 | 45% | 52% | 3% | 0.8 to 3 | 1.8 to 2.8 | 2.0 | 2.2 | 2.4 |
| 5323 | 46% | 51% | 3% | 0.8 to 3 | 1.8 to 2.8 | 2.0 | 2.2 | 2.4 |
| 5324 | 47% | 50% | 3% | 0.8 to 3 | 1.8 to 2.8 | 2.0 | 2.2 | 2.4 |
| 5325 | 48% | 49% | 3% | 0.8 to 3 | 1.8 to 2.8 | 2.0 | 2.2 | 2.4 |
| 5326 | 49% | 48% | 3% | 0.8 to 3 | 1.8 to 2.8 | 2.0 | 2.2 | 2.4 |
| 5327 | 50% | 47% | 3% | 0.8 to 3 | 1.8 to 2.8 | 2.0 | 2.2 | 2.4 |
| 5328 | 51% | 46% | 3% | 0.8 to 3 | 1.8 to 2.8 | 2.0 | 2.2 | 2.4 |
| 5329 | 52% | 45% | 3% | 0.8 to 3 | 1.8 to 2.8 | 2.0 | 2.2 | 2.4 |
| 5330 | 53% | 44% | 3% | 0.8 to 3 | 1.8 to 2.8 | 2.0 | 2.2 | 2.4 |
| 5331 | 54% | 43% | 3% | 0.8 to 3 | 1.8 to 2.8 | 2.0 | 2.2 | 2.4 |
| 5332 | 55% | 42% | 3% | 0.8 to 3 | 1.8 to 2.8 | 2.0 | 2.2 | 2.4 |
| 5333 | 56% | 41% | 3% | 0.8 to 3 | 1.8 to 2.8 | 2.0 | 2.2 | 2.4 |
| 5334 | 57% | 40% | 3% | 0.8 to 3 | 1.8 to 2.8 | 2.0 | 2.2 | 2.4 |
| 5335 | 58% | 39% | 3% | 0.8 to 3 | 1.8 to 2.8 | 2.0 | 2.2 | 2.4 |
| 5336 | 59% | 38% | 3% | 0.8 to 3 | 1.8 to 2.8 | 2.0 | 2.2 | 2.4 |
| 5337 | 60% | 37% | 3% | 0.8 to 3 | 1.8 to 2.8 | 2.0 | 2.2 | 2.4 |
| 5338 | 30% | 66.5% | 3.5% | 0.8 to 3 | 1.8 to 2.8 | 2.0 | 2.2 | 2.4 |
| 5339 | 31% | 65.5% | 3.5% | 0.8 to 3 | 1.8 to 2.8 | 2.0 | 2.2 | 2.4 |
| 5340 | 32% | 64.5% | 3.5% | 0.8 to 3 | 1.8 to 2.8 | 2.0 | 2.2 | 2.4 |
| 5341 | 33% | 63.5% | 3.5% | 0.8 to 3 | 1.8 to 2.8 | 2.0 | 2.2 | 2.4 |
| 5342 | 34% | 62.5% | 3.5% | 0.8 to 3 | 1.8 to 2.8 | 2.0 | 2.2 | 2.4 |
| 5343 | 35% | 61.5% | 3.5% | 0.8 to 3 | 1.8 to 2.8 | 2.0 | 2.2 | 2.4 |
| 5344 | 36% | 60.5% | 3.5% | 0.8 to 3 | 1.8 to 2.8 | 2.0 | 2.2 | 2.4 |
| 5345 | 37% | 59.5% | 3.5% | 0.8 to 3 | 1.8 to 2.8 | 2.0 | 2.2 | 2.4 |
| 5346 | 38% | 58.5% | 3.5% | 0.8 to 3 | 1.8 to 2.8 | 2.0 | 2.2 | 2.4 |
| 5347 | 39% | 57.5% | 3.5% | 0.8 to 3 | 1.8 to 2.8 | 2.0 | 2.2 | 2.4 |
| 5348 | 40% | 56.5% | 3.5% | 0.8 to 3 | 1.8 to 2.8 | 2.0 | 2.2 | 2.4 |
| 5349 | 41% | 55.5% | 3.5% | 0.8 to 3 | 1.8 to 2.8 | 2.0 | 2.2 | 2.4 |
| 5350 | 42% | 54.5% | 3.5% | 0.8 to 3 | 1.8 to 2.8 | 2.0 | 2.2 | 2.4 |

TABLE 12-continued

| | Alkyl Sulfate | Alkyl Ether Sulfate | | | | | |
|---|---|---|---|---|---|---|---|
| | Alkyl Chain Length, | Alkyl Chain Length, | Average mol. EO (Alternatives for each numbered species) | | | | |
| Species | Wt. % 8 | Wt. % 9 | Range 9 to 11 | Range A | Range B | Species C | Species D | Species E |
| 5351 | 43% | 53.5% | 3.5% | 0.8 to 3 | 1.8 to 2.8 | 2.0 | 2.2 | 2.4 |
| 5352 | 44% | 52.5% | 3.5% | 0.8 to 3 | 1.8 to 2.8 | 2.0 | 2.2 | 2.4 |
| 5353 | 45% | 51.5% | 3.5% | 0.8 to 3 | 1.8 to 2.8 | 2.0 | 2.2 | 2.4 |
| 5354 | 46% | 50.5% | 3.5% | 0.8 to 3 | 1.8 to 2.8 | 2.0 | 2.2 | 2.4 |
| 5355 | 47% | 49.5% | 3.5% | 0.8 to 3 | 1.8 to 2.8 | 2.0 | 2.2 | 2.4 |
| 5356 | 48% | 48.5% | 3.5% | 0.8 to 3 | 1.8 to 2.8 | 2.0 | 2.2 | 2.4 |
| 5357 | 49% | 47.5% | 3.5% | 0.8 to 3 | 1.8 to 2.8 | 2.0 | 2.2 | 2.4 |
| 5358 | 50% | 46.5% | 3.5% | 0.8 to 3 | 1.8 to 2.8 | 2.0 | 2.2 | 2.4 |
| 5359 | 51% | 45.5% | 3.5% | 0.8 to 3 | 1.8 to 2.8 | 2.0 | 2.2 | 2.4 |
| 5360 | 52% | 44.5% | 3.5% | 0.8 to 3 | 1.8 to 2.8 | 2.0 | 2.2 | 2.4 |
| 5361 | 53% | 43.5% | 3.5% | 0.8 to 3 | 1.8 to 2.8 | 2.0 | 2.2 | 2.4 |
| 5362 | 54% | 42.5% | 3.5% | 0.8 to 3 | 1.8 to 2.8 | 2.0 | 2.2 | 2.4 |
| 5363 | 55% | 41.5% | 3.5% | 0.8 to 3 | 1.8 to 2.8 | 2.0 | 2.2 | 2.4 |
| 5364 | 56% | 40.5% | 3.5% | 0.8 to 3 | 1.8 to 2.8 | 2.0 | 2.2 | 2.4 |
| 5365 | 57% | 39.5% | 3.5% | 0.8 to 3 | 1.8 to 2.8 | 2.0 | 2.2 | 2.4 |
| 5366 | 58% | 38.5% | 3.5% | 0.8 to 3 | 1.8 to 2.8 | 2.0 | 2.2 | 2.4 |
| 5367 | 59% | 37.5% | 3.5% | 0.8 to 3 | 1.8 to 2.8 | 2.0 | 2.2 | 2.4 |
| 5368 | 60% | 36.5% | 3.5% | 0.8 to 3 | 1.8 to 2.8 | 2.0 | 2.2 | 2.4 |
| 5369 | 30% | 66% | 4% | 0.8 to 3 | 1.8 to 2.8 | 2.0 | 2.2 | 2.4 |
| 5370 | 31% | 65% | 4% | 0.8 to 3 | 1.8 to 2.8 | 2.0 | 2.2 | 2.4 |
| 5371 | 32% | 64% | 4% | 0.8 to 3 | 1.8 to 2.8 | 2.0 | 2.2 | 2.4 |
| 5372 | 33% | 63% | 4% | 0.8 to 3 | 1.8 to 2.8 | 2.0 | 2.2 | 2.4 |
| 5373 | 34% | 62% | 4% | 0.8 to 3 | 1.8 to 2.8 | 2.0 | 2.2 | 2.4 |
| 5374 | 35% | 61% | 4% | 0.8 to 3 | 1.8 to 2.8 | 2.0 | 2.2 | 2.4 |
| 5375 | 36% | 60% | 4% | 0.8 to 3 | 1.8 to 2.8 | 2.0 | 2.2 | 2.4 |
| 5376 | 37% | 59% | 4% | 0.8 to 3 | 1.8 to 2.8 | 2.0 | 2.2 | 2.4 |
| 5377 | 38% | 58% | 4% | 0.8 to 3 | 1.8 to 2.8 | 2.0 | 2.2 | 2.4 |
| 5378 | 39% | 57% | 4% | 0.8 to 3 | 1.8 to 2.8 | 2.0 | 2.2 | 2.4 |
| 5379 | 40% | 56% | 4% | 0.8 to 3 | 1.8 to 2.8 | 2.0 | 2.2 | 2.4 |
| 5380 | 41% | 55% | 4% | 0.8 to 3 | 1.8 to 2.8 | 2.0 | 2.2 | 2.4 |
| 5381 | 42% | 54% | 4% | 0.8 to 3 | 1.8 to 2.8 | 2.0 | 2.2 | 2.4 |
| 5382 | 43% | 53% | 4% | 0.8 to 3 | 1.8 to 2.8 | 2.0 | 2.2 | 2.4 |
| 5383 | 44% | 52% | 4% | 0.8 to 3 | 1.8 to 2.8 | 2.0 | 2.2 | 2.4 |
| 5384 | 45% | 51% | 4% | 0.8 to 3 | 1.8 to 2.8 | 2.0 | 2.2 | 2.4 |
| 5385 | 46% | 50% | 4% | 0.8 to 3 | 1.8 to 2.8 | 2.0 | 2.2 | 2.4 |
| 5386 | 47% | 49% | 4% | 0.8 to 3 | 1.8 to 2.8 | 2.0 | 2.2 | 2.4 |
| 5387 | 48% | 48% | 4% | 0.8 to 3 | 1.8 to 2.8 | 2.0 | 2.2 | 2.4 |
| 5388 | 49% | 47% | 4% | 0.8 to 3 | 1.8 to 2.8 | 2.0 | 2.2 | 2.4 |
| 5389 | 50% | 46% | 4% | 0.8 to 3 | 1.8 to 2.8 | 2.0 | 2.2 | 2.4 |
| 5390 | 51% | 45% | 4% | 0.8 to 3 | 1.8 to 2.8 | 2.0 | 2.2 | 2.4 |
| 5391 | 52% | 44% | 4% | 0.8 to 3 | 1.8 to 2.8 | 2.0 | 2.2 | 2.4 |
| 5392 | 53% | 43% | 4% | 0.8 to 3 | 1.8 to 2.8 | 2.0 | 2.2 | 2.4 |
| 5393 | 54% | 42% | 4% | 0.8 to 3 | 1.8 to 2.8 | 2.0 | 2.2 | 2.4 |
| 5394 | 55% | 41% | 4% | 0.8 to 3 | 1.8 to 2.8 | 2.0 | 2.2 | 2.4 |
| 5395 | 56% | 40% | 4% | 0.8 to 3 | 1.8 to 2.8 | 2.0 | 2.2 | 2.4 |
| 5396 | 57% | 39% | 4% | 0.8 to 3 | 1.8 to 2.8 | 2.0 | 2.2 | 2.4 |
| 5397 | 58% | 38% | 4% | 0.8 to 3 | 1.8 to 2.8 | 2.0 | 2.2 | 2.4 |
| 5398 | 59% | 37% | 4% | 0.8 to 3 | 1.8 to 2.8 | 2.0 | 2.2 | 2.4 |
| 5399 | 60% | 36% | 4% | 0.8 to 3 | 1.8 to 2.8 | 2.0 | 2.2 | 2.4 |
| 5400 | 30% | 65.5% | 4.5% | 0.8 to 3 | 1.8 to 2.8 | 2.0 | 2.2 | 2.4 |
| 5401 | 31% | 64.5% | 4.5% | 0.8 to 3 | 1.8 to 2.8 | 2.0 | 2.2 | 2.4 |
| 5402 | 32% | 63.5% | 4.5% | 0.8 to 3 | 1.8 to 2.8 | 2.0 | 2.2 | 2.4 |
| 5403 | 33% | 62.5% | 4.5% | 0.8 to 3 | 1.8 to 2.8 | 2.0 | 2.2 | 2.4 |
| 5404 | 34% | 61.5% | 4.5% | 0.8 to 3 | 1.8 to 2.8 | 2.0 | 2.2 | 2.4 |
| 5405 | 35% | 60.5% | 4.5% | 0.8 to 3 | 1.8 to 2.8 | 2.0 | 2.2 | 2.4 |
| 5406 | 36% | 59.5% | 4.5% | 0.8 to 3 | 1.8 to 2.8 | 2.0 | 2.2 | 2.4 |
| 5407 | 37% | 58.5% | 4.5% | 0.8 to 3 | 1.8 to 2.8 | 2.0 | 2.2 | 2.4 |
| 5408 | 38% | 57.5% | 4.5% | 0.8 to 3 | 1.8 to 2.8 | 2.0 | 2.2 | 2.4 |
| 5409 | 39% | 56.5% | 4.5% | 0.8 to 3 | 1.8 to 2.8 | 2.0 | 2.2 | 2.4 |
| 5410 | 40% | 55.5% | 4.5% | 0.8 to 3 | 1.8 to 2.8 | 2.0 | 2.2 | 2.4 |
| 5411 | 41% | 54.5% | 4.5% | 0.8 to 3 | 1.8 to 2.8 | 2.0 | 2.2 | 2.4 |
| 5412 | 42% | 53.5% | 4.5% | 0.8 to 3 | 1.8 to 2.8 | 2.0 | 2.2 | 2.4 |
| 5413 | 43% | 52.5% | 4.5% | 0.8 to 3 | 1.8 to 2.8 | 2.0 | 2.2 | 2.4 |
| 5414 | 44% | 51.5% | 4.5% | 0.8 to 3 | 1.8 to 2.8 | 2.0 | 2.2 | 2.4 |
| 5415 | 45% | 50.5% | 4.5% | 0.8 to 3 | 1.8 to 2.8 | 2.0 | 2.2 | 2.4 |
| 5416 | 46% | 49.5% | 4.5% | 0.8 to 3 | 1.8 to 2.8 | 2.0 | 2.2 | 2.4 |
| 5417 | 47% | 48.5% | 4.5% | 0.8 to 3 | 1.8 to 2.8 | 2.0 | 2.2 | 2.4 |
| 5418 | 48% | 47.5% | 4.5% | 0.8 to 3 | 1.8 to 2.8 | 2.0 | 2.2 | 2.4 |
| 5419 | 49% | 46.5% | 4.5% | 0.8 to 3 | 1.8 to 2.8 | 2.0 | 2.2 | 2.4 |
| 5420 | 50% | 45.5% | 4.5% | 0.8 to 3 | 1.8 to 2.8 | 2.0 | 2.2 | 2.4 |
| 5421 | 51% | 44.5% | 4.5% | 0.8 to 3 | 1.8 to 2.8 | 2.0 | 2.2 | 2.4 |
| 5422 | 52% | 43.5% | 4.5% | 0.8 to 3 | 1.8 to 2.8 | 2.0 | 2.2 | 2.4 |
| 5423 | 53% | 42.5% | 4.5% | 0.8 to 3 | 1.8 to 2.8 | 2.0 | 2.2 | 2.4 |
| 5424 | 54% | 41.5% | 4.5% | 0.8 to 3 | 1.8 to 2.8 | 2.0 | 2.2 | 2.4 |
| 5425 | 55% | 40.5% | 4.5% | 0.8 to 3 | 1.8 to 2.8 | 2.0 | 2.2 | 2.4 |
| 5426 | 56% | 39.5% | 4.5% | 0.8 to 3 | 1.8 to 2.8 | 2.0 | 2.2 | 2.4 |
| 5427 | 57% | 38.5% | 4.5% | 0.8 to 3 | 1.8 to 2.8 | 2.0 | 2.2 | 2.4 |
| 5428 | 58% | 37.5% | 4.5% | 0.8 to 3 | 1.8 to 2.8 | 2.0 | 2.2 | 2.4 |
| 5429 | 59% | 36.5% | 4.5% | 0.8 to 3 | 1.8 to 2.8 | 2.0 | 2.2 | 2.4 |
| 5430 | 60% | 35.5% | 4.5% | 0.8 to 3 | 1.8 to 2.8 | 2.0 | 2.2 | 2.4 |
| 5431 | 30% | 65% | 5% | 0.8 to 3 | 1.8 to 2.8 | 2.0 | 2.2 | 2.4 |
| 5432 | 31% | 64% | 5% | 0.8 to 3 | 1.8 to 2.8 | 2.0 | 2.2 | 2.4 |
| 5433 | 32% | 63% | 5% | 0.8 to 3 | 1.8 to 2.8 | 2.0 | 2.2 | 2.4 |
| 5434 | 33% | 62% | 5% | 0.8 to 3 | 1.8 to 2.8 | 2.0 | 2.2 | 2.4 |
| 5435 | 34% | 61% | 5% | 0.8 to 3 | 1.8 to 2.8 | 2.0 | 2.2 | 2.4 |
| 5436 | 35% | 60% | 5% | 0.8 to 3 | 1.8 to 2.8 | 2.0 | 2.2 | 2.4 |
| 5437 | 36% | 59% | 5% | 0.8 to 3 | 1.8 to 2.8 | 2.0 | 2.2 | 2.4 |
| 5438 | 37% | 58% | 5% | 0.8 to 3 | 1.8 to 2.8 | 2.0 | 2.2 | 2.4 |
| 5439 | 38% | 57% | 5% | 0.8 to 3 | 1.8 to 2.8 | 2.0 | 2.2 | 2.4 |
| 5440 | 39% | 56% | 5% | 0.8 to 3 | 1.8 to 2.8 | 2.0 | 2.2 | 2.4 |
| 5441 | 40% | 55% | 5% | 0.8 to 3 | 1.8 to 2.8 | 2.0 | 2.2 | 2.4 |
| 5442 | 41% | 54% | 5% | 0.8 to 3 | 1.8 to 2.8 | 2.0 | 2.2 | 2.4 |
| 5443 | 42% | 53% | 5% | 0.8 to 3 | 1.8 to 2.8 | 2.0 | 2.2 | 2.4 |
| 5444 | 43% | 52% | 5% | 0.8 to 3 | 1.8 to 2.8 | 2.0 | 2.2 | 2.4 |
| 5445 | 44% | 51% | 5% | 0.8 to 3 | 1.8 to 2.8 | 2.0 | 2.2 | 2.4 |
| 5446 | 45% | 50% | 5% | 0.8 to 3 | 1.8 to 2.8 | 2.0 | 2.2 | 2.4 |
| 5447 | 46% | 49% | 5% | 0.8 to 3 | 1.8 to 2.8 | 2.0 | 2.2 | 2.4 |
| 5448 | 47% | 48% | 5% | 0.8 to 3 | 1.8 to 2.8 | 2.0 | 2.2 | 2.4 |
| 5449 | 48% | 47% | 5% | 0.8 to 3 | 1.8 to 2.8 | 2.0 | 2.2 | 2.4 |
| 5450 | 49% | 46% | 5% | 0.8 to 3 | 1.8 to 2.8 | 2.0 | 2.2 | 2.4 |
| 5451 | 50% | 45% | 5% | 0.8 to 3 | 1.8 to 2.8 | 2.0 | 2.2 | 2.4 |
| 5452 | 51% | 44% | 5% | 0.8 to 3 | 1.8 to 2.8 | 2.0 | 2.2 | 2.4 |
| 5453 | 52% | 43% | 5% | 0.8 to 3 | 1.8 to 2.8 | 2.0 | 2.2 | 2.4 |
| 5454 | 53% | 42% | 5% | 0.8 to 3 | 1.8 to 2.8 | 2.0 | 2.2 | 2.4 |
| 5455 | 54% | 41% | 5% | 0.8 to 3 | 1.8 to 2.8 | 2.0 | 2.2 | 2.4 |
| 5456 | 55% | 40% | 5% | 0.8 to 3 | 1.8 to 2.8 | 2.0 | 2.2 | 2.4 |
| 5457 | 56% | 39% | 5% | 0.8 to 3 | 1.8 to 2.8 | 2.0 | 2.2 | 2.4 |
| 5458 | 57% | 38% | 5% | 0.8 to 3 | 1.8 to 2.8 | 2.0 | 2.2 | 2.4 |
| 5459 | 58% | 37% | 5% | 0.8 to 3 | 1.8 to 2.8 | 2.0 | 2.2 | 2.4 |
| 5460 | 59% | 36% | 5% | 0.8 to 3 | 1.8 to 2.8 | 2.0 | 2.2 | 2.4 |
| 5461 | 60% | 35% | 5% | 0.8 to 3 | 1.8 to 2.8 | 2.0 | 2.2 | 2.4 |
| 5462 | 30% | 64.5% | 5.5% | 0.8 to 3 | 1.8 to 2.8 | 2.0 | 2.2 | 2.4 |
| 5463 | 31% | 63.5% | 5.5% | 0.8 to 3 | 1.8 to 2.8 | 2.0 | 2.2 | 2.4 |
| 5464 | 32% | 62.5% | 5.5% | 0.8 to 3 | 1.8 to 2.8 | 2.0 | 2.2 | 2.4 |
| 5465 | 33% | 61.5% | 5.5% | 0.8 to 3 | 1.8 to 2.8 | 2.0 | 2.2 | 2.4 |
| 5466 | 34% | 60.5% | 5.5% | 0.8 to 3 | 1.8 to 2.8 | 2.0 | 2.2 | 2.4 |
| 5467 | 35% | 59.5% | 5.5% | 0.8 to 3 | 1.8 to 2.8 | 2.0 | 2.2 | 2.4 |
| 5468 | 36% | 58.5% | 5.5% | 0.8 to 3 | 1.8 to 2.8 | 2.0 | 2.2 | 2.4 |
| 5469 | 37% | 57.5% | 5.5% | 0.8 to 3 | 1.8 to 2.8 | 2.0 | 2.2 | 2.4 |
| 5470 | 38% | 56.5% | 5.5% | 0.8 to 3 | 1.8 to 2.8 | 2.0 | 2.2 | 2.4 |
| 5471 | 39% | 55.5% | 5.5% | 0.8 to 3 | 1.8 to 2.8 | 2.0 | 2.2 | 2.4 |
| 5472 | 40% | 54.5% | 5.5% | 0.8 to 3 | 1.8 to 2.8 | 2.0 | 2.2 | 2.4 |
| 5473 | 41% | 53.5% | 5.5% | 0.8 to 3 | 1.8 to 2.8 | 2.0 | 2.2 | 2.4 |
| 5474 | 42% | 52.5% | 5.5% | 0.8 to 3 | 1.8 to 2.8 | 2.0 | 2.2 | 2.4 |
| 5475 | 43% | 51.5% | 5.5% | 0.8 to 3 | 1.8 to 2.8 | 2.0 | 2.2 | 2.4 |
| 5476 | 44% | 50.5% | 5.5% | 0.8 to 3 | 1.8 to 2.8 | 2.0 | 2.2 | 2.4 |
| 5477 | 45% | 49.5% | 5.5% | 0.8 to 3 | 1.8 to 2.8 | 2.0 | 2.2 | 2.4 |
| 5478 | 46% | 48.5% | 5.5% | 0.8 to 3 | 1.8 to 2.8 | 2.0 | 2.2 | 2.4 |
| 5479 | 47% | 47.5% | 5.5% | 0.8 to 3 | 1.8 to 2.8 | 2.0 | 2.2 | 2.4 |
| 5480 | 48% | 46.5% | 5.5% | 0.8 to 3 | 1.8 to 2.8 | 2.0 | 2.2 | 2.4 |
| 5481 | 49% | 45.5% | 5.5% | 0.8 to 3 | 1.8 to 2.8 | 2.0 | 2.2 | 2.4 |
| 5482 | 50% | 44.5% | 5.5% | 0.8 to 3 | 1.8 to 2.8 | 2.0 | 2.2 | 2.4 |
| 5483 | 51% | 43.5% | 5.5% | 0.8 to 3 | 1.8 to 2.8 | 2.0 | 2.2 | 2.4 |
| 5484 | 52% | 42.5% | 5.5% | 0.8 to 3 | 1.8 to 2.8 | 2.0 | 2.2 | 2.4 |
| 5485 | 53% | 41.5% | 5.5% | 0.8 to 3 | 1.8 to 2.8 | 2.0 | 2.2 | 2.4 |
| 5486 | 54% | 40.5% | 5.5% | 0.8 to 3 | 1.8 to 2.8 | 2.0 | 2.2 | 2.4 |

TABLE 12-continued

| | Alkyl Sulfate | Alkyl Ether Sulfate | | | | | |
|---|---|---|---|---|---|---|---|
| | Alkyl Chain Length, Wt. % | Alkyl Chain Length, Wt. % | Average mol. EO (Alternatives for each numbered species) | | | | |
| Species | 8 | 9 | Range 9 to 11 | Range A | Range B | Species C | Species D | Species E |
| 5487 | 55% | 39.5% | 5.5% | 0.8 to 3 | 1.8 to 2.8 | 2.0 | 2.2 | 2.4 |
| 5488 | 56% | 38.5% | 5.5% | 0.8 to 3 | 1.8 to 2.8 | 2.0 | 2.2 | 2.4 |
| 5489 | 57% | 37.5% | 5.5% | 0.8 to 3 | 1.8 to 2.8 | 2.0 | 2.2 | 2.4 |
| 5490 | 58% | 36.5% | 5.5% | 0.8 to 3 | 1.8 to 2.8 | 2.0 | 2.2 | 2.4 |
| 5491 | 59% | 35.5% | 5.5% | 0.8 to 3 | 1.8 to 2.8 | 2.0 | 2.2 | 2.4 |
| 5492 | 60% | 34.5% | 5.5% | 0.8 to 3 | 1.8 to 2.8 | 2.0 | 2.2 | 2.4 |
| 5493 | 30% | 64% | 6% | 0.8 to 3 | 1.8 to 2.8 | 2.0 | 2.2 | 2.4 |
| 5494 | 31% | 63% | 6% | 0.8 to 3 | 1.8 to 2.8 | 2.0 | 2.2 | 2.4 |
| 5495 | 32% | 62% | 6% | 0.8 to 3 | 1.8 to 2.8 | 2.0 | 2.2 | 2.4 |
| 5496 | 33% | 61% | 6% | 0.8 to 3 | 1.8 to 2.8 | 2.0 | 2.2 | 2.4 |
| 5497 | 34% | 60% | 6% | 0.8 to 3 | 1.8 to 2.8 | 2.0 | 2.2 | 2.4 |
| 5498 | 35% | 59% | 6% | 0.8 to 3 | 1.8 to 2.8 | 2.0 | 2.2 | 2.4 |
| 5499 | 36% | 58% | 6% | 0.8 to 3 | 1.8 to 2.8 | 2.0 | 2.2 | 2.4 |
| 5500 | 37% | 57% | 6% | 0.8 to 3 | 1.8 to 2.8 | 2.0 | 2.2 | 2.4 |
| 5501 | 38% | 56% | 6% | 0.8 to 3 | 1.8 to 2.8 | 2.0 | 2.2 | 2.4 |
| 5502 | 39% | 55% | 6% | 0.8 to 3 | 1.8 to 2.8 | 2.0 | 2.2 | 2.4 |
| 5503 | 40% | 54% | 6% | 0.8 to 3 | 1.8 to 2.8 | 2.0 | 2.2 | 2.4 |
| 5504 | 41% | 53% | 6% | 0.8 to 3 | 1.8 to 2.8 | 2.0 | 2.2 | 2.4 |
| 5505 | 42% | 52% | 6% | 0.8 to 3 | 1.8 to 2.8 | 2.0 | 2.2 | 2.4 |
| 5506 | 43% | 51% | 6% | 0.8 to 3 | 1.8 to 2.8 | 2.0 | 2.2 | 2.4 |
| 5507 | 44% | 50% | 6% | 0.8 to 3 | 1.8 to 2.8 | 2.0 | 2.2 | 2.4 |
| 5508 | 45% | 49% | 6% | 0.8 to 3 | 1.8 to 2.8 | 2.0 | 2.2 | 2.4 |
| 5509 | 46% | 48% | 6% | 0.8 to 3 | 1.8 to 2.8 | 2.0 | 2.2 | 2.4 |
| 5510 | 47% | 47% | 6% | 0.8 to 3 | 1.8 to 2.8 | 2.0 | 2.2 | 2.4 |
| 5511 | 48% | 46% | 6% | 0.8 to 3 | 1.8 to 2.8 | 2.0 | 2.2 | 2.4 |
| 5512 | 49% | 45% | 6% | 0.8 to 3 | 1.8 to 2.8 | 2.0 | 2.2 | 2.4 |
| 5513 | 50% | 44% | 6% | 0.8 to 3 | 1.8 to 2.8 | 2.0 | 2.2 | 2.4 |
| 5514 | 51% | 43% | 6% | 0.8 to 3 | 1.8 to 2.8 | 2.0 | 2.2 | 2.4 |
| 5515 | 52% | 42% | 6% | 0.8 to 3 | 1.8 to 2.8 | 2.0 | 2.2 | 2.4 |
| 5516 | 53% | 41% | 6% | 0.8 to 3 | 1.8 to 2.8 | 2.0 | 2.2 | 2.4 |
| 5517 | 54% | 40% | 6% | 0.8 to 3 | 1.8 to 2.8 | 2.0 | 2.2 | 2.4 |
| 5518 | 55% | 39% | 6% | 0.8 to 3 | 1.8 to 2.8 | 2.0 | 2.2 | 2.4 |
| 5519 | 56% | 38% | 6% | 0.8 to 3 | 1.8 to 2.8 | 2.0 | 2.2 | 2.4 |
| 5520 | 57% | 37% | 6% | 0.8 to 3 | 1.8 to 2.8 | 2.0 | 2.2 | 2.4 |
| 5521 | 58% | 36% | 6% | 0.8 to 3 | 1.8 to 2.8 | 2.0 | 2.2 | 2.4 |
| 5522 | 59% | 35% | 6% | 0.8 to 3 | 1.8 to 2.8 | 2.0 | 2.2 | 2.4 |
| 5523 | 60% | 34% | 6% | 0.8 to 3 | 1.8 to 2.8 | 2.0 | 2.2 | 2.4 |
| 5524 | 30% | 63.5% | 6.5% | 0.8 to 3 | 1.8 to 2.8 | 2.0 | 2.2 | 2.4 |
| 5525 | 31% | 62.5% | 6.5% | 0.8 to 3 | 1.8 to 2.8 | 2.0 | 2.2 | 2.4 |
| 5526 | 32% | 61.5% | 6.5% | 0.8 to 3 | 1.8 to 2.8 | 2.0 | 2.2 | 2.4 |
| 5527 | 33% | 60.5% | 6.5% | 0.8 to 3 | 1.8 to 2.8 | 2.0 | 2.2 | 2.4 |
| 5528 | 34% | 59.5% | 6.5% | 0.8 to 3 | 1.8 to 2.8 | 2.0 | 2.2 | 2.4 |
| 5529 | 35% | 58.5% | 6.5% | 0.8 to 3 | 1.8 to 2.8 | 2.0 | 2.2 | 2.4 |
| 5530 | 36% | 57.5% | 6.5% | 0.8 to 3 | 1.8 to 2.8 | 2.0 | 2.2 | 2.4 |
| 5531 | 37% | 56.5% | 6.5% | 0.8 to 3 | 1.8 to 2.8 | 2.0 | 2.2 | 2.4 |
| 5532 | 38% | 55.5% | 6.5% | 0.8 to 3 | 1.8 to 2.8 | 2.0 | 2.2 | 2.4 |
| 5533 | 39% | 54.5% | 6.5% | 0.8 to 3 | 1.8 to 2.8 | 2.0 | 2.2 | 2.4 |
| 5534 | 40% | 53.5% | 6.5% | 0.8 to 3 | 1.8 to 2.8 | 2.0 | 2.2 | 2.4 |
| 5535 | 41% | 52.5% | 6.5% | 0.8 to 3 | 1.8 to 2.8 | 2.0 | 2.2 | 2.4 |
| 5536 | 42% | 51.5% | 6.5% | 0.8 to 3 | 1.8 to 2.8 | 2.0 | 2.2 | 2.4 |
| 5537 | 43% | 50.5% | 6.5% | 0.8 to 3 | 1.8 to 2.8 | 2.0 | 2.2 | 2.4 |
| 5538 | 44% | 49.5% | 6.5% | 0.8 to 3 | 1.8 to 2.8 | 2.0 | 2.2 | 2.4 |
| 5539 | 45% | 48.5% | 6.5% | 0.8 to 3 | 1.8 to 2.8 | 2.0 | 2.2 | 2.4 |
| 5540 | 46% | 47.5% | 6.5% | 0.8 to 3 | 1.8 to 2.8 | 2.0 | 2.2 | 2.4 |
| 5541 | 47% | 46.5% | 6.5% | 0.8 to 3 | 1.8 to 2.8 | 2.0 | 2.2 | 2.4 |
| 5542 | 48% | 45.5% | 6.5% | 0.8 to 3 | 1.8 to 2.8 | 2.0 | 2.2 | 2.4 |
| 5543 | 49% | 44.5% | 6.5% | 0.8 to 3 | 1.8 to 2.8 | 2.0 | 2.2 | 2.4 |
| 5544 | 50% | 43.5% | 6.5% | 0.8 to 3 | 1.8 to 2.8 | 2.0 | 2.2 | 2.4 |
| 5545 | 51% | 42.5% | 6.5% | 0.8 to 3 | 1.8 to 2.8 | 2.0 | 2.2 | 2.4 |
| 5546 | 52% | 41.5% | 6.5% | 0.8 to 3 | 1.8 to 2.8 | 2.0 | 2.2 | 2.4 |
| 5547 | 53% | 40.5% | 6.5% | 0.8 to 3 | 1.8 to 2.8 | 2.0 | 2.2 | 2.4 |
| 5548 | 54% | 39.5% | 6.5% | 0.8 to 3 | 1.8 to 2.8 | 2.0 | 2.2 | 2.4 |
| 5549 | 55% | 38.5% | 6.5% | 0.8 to 3 | 1.8 to 2.8 | 2.0 | 2.2 | 2.4 |
| 5550 | 56% | 37.5% | 6.5% | 0.8 to 3 | 1.8 to 2.8 | 2.0 | 2.2 | 2.4 |
| 5551 | 57% | 36.5% | 6.5% | 0.8 to 3 | 1.8 to 2.8 | 2.0 | 2.2 | 2.4 |
| 5552 | 58% | 35.5% | 6.5% | 0.8 to 3 | 1.8 to 2.8 | 2.0 | 2.2 | 2.4 |
| 5553 | 59% | 34.5% | 6.5% | 0.8 to 3 | 1.8 to 2.8 | 2.0 | 2.2 | 2.4 |
| 5554 | 60% | 33.5% | 6.5% | 0.8 to 3 | 1.8 to 2.8 | 2.0 | 2.2 | 2.4 |
| 5555 | 30% | 63% | 7% | 0.8 to 3 | 1.8 to 2.8 | 2.0 | 2.2 | 2.4 |
| 5556 | 31% | 62% | 7% | 0.8 to 3 | 1.8 to 2.8 | 2.0 | 2.2 | 2.4 |
| 5557 | 32% | 61% | 7% | 0.8 to 3 | 1.8 to 2.8 | 2.0 | 2.2 | 2.4 |
| 5558 | 33% | 60% | 7% | 0.8 to 3 | 1.8 to 2.8 | 2.0 | 2.2 | 2.4 |
| 5559 | 34% | 59% | 7% | 0.8 to 3 | 1.8 to 2.8 | 2.0 | 2.2 | 2.4 |
| 5560 | 35% | 58% | 7% | 0.8 to 3 | 1.8 to 2.8 | 2.0 | 2.2 | 2.4 |
| 5561 | 36% | 57% | 7% | 0.8 to 3 | 1.8 to 2.8 | 2.0 | 2.2 | 2.4 |
| 5562 | 37% | 56% | 7% | 0.8 to 3 | 1.8 to 2.8 | 2.0 | 2.2 | 2.4 |
| 5563 | 38% | 55% | 7% | 0.8 to 3 | 1.8 to 2.8 | 2.0 | 2.2 | 2.4 |
| 5564 | 39% | 54% | 7% | 0.8 to 3 | 1.8 to 2.8 | 2.0 | 2.2 | 2.4 |
| 5565 | 40% | 53% | 7% | 0.8 to 3 | 1.8 to 2.8 | 2.0 | 2.2 | 2.4 |
| 5566 | 41% | 52% | 7% | 0.8 to 3 | 1.8 to 2.8 | 2.0 | 2.2 | 2.4 |
| 5567 | 42% | 51% | 7% | 0.8 to 3 | 1.8 to 2.8 | 2.0 | 2.2 | 2.4 |
| 5568 | 43% | 50% | 7% | 0.8 to 3 | 1.8 to 2.8 | 2.0 | 2.2 | 2.4 |
| 5569 | 44% | 49% | 7% | 0.8 to 3 | 1.8 to 2.8 | 2.0 | 2.2 | 2.4 |
| 5570 | 45% | 48% | 7% | 0.8 to 3 | 1.8 to 2.8 | 2.0 | 2.2 | 2.4 |
| 5571 | 46% | 47% | 7% | 0.8 to 3 | 1.8 to 2.8 | 2.0 | 2.2 | 2.4 |
| 5572 | 47% | 46% | 7% | 0.8 to 3 | 1.8 to 2.8 | 2.0 | 2.2 | 2.4 |
| 5573 | 48% | 45% | 7% | 0.8 to 3 | 1.8 to 2.8 | 2.0 | 2.2 | 2.4 |
| 5574 | 49% | 44% | 7% | 0.8 to 3 | 1.8 to 2.8 | 2.0 | 2.2 | 2.4 |
| 5575 | 50% | 43% | 7% | 0.8 to 3 | 1.8 to 2.8 | 2.0 | 2.2 | 2.4 |
| 5576 | 51% | 42% | 7% | 0.8 to 3 | 1.8 to 2.8 | 2.0 | 2.2 | 2.4 |
| 5577 | 52% | 41% | 7% | 0.8 to 3 | 1.8 to 2.8 | 2.0 | 2.2 | 2.4 |
| 5578 | 53% | 40% | 7% | 0.8 to 3 | 1.8 to 2.8 | 2.0 | 2.2 | 2.4 |
| 5579 | 54% | 39% | 7% | 0.8 to 3 | 1.8 to 2.8 | 2.0 | 2.2 | 2.4 |
| 5580 | 55% | 38% | 7% | 0.8 to 3 | 1.8 to 2.8 | 2.0 | 2.2 | 2.4 |
| 5581 | 56% | 37% | 7% | 0.8 to 3 | 1.8 to 2.8 | 2.0 | 2.2 | 2.4 |
| 5582 | 57% | 36% | 7% | 0.8 to 3 | 1.8 to 2.8 | 2.0 | 2.2 | 2.4 |
| 5583 | 58% | 35% | 7% | 0.8 to 3 | 1.8 to 2.8 | 2.0 | 2.2 | 2.4 |
| 5584 | 59% | 34% | 7% | 0.8 to 3 | 1.8 to 2.8 | 2.0 | 2.2 | 2.4 |
| 5585 | 60% | 33% | 7% | 0.8 to 3 | 1.8 to 2.8 | 2.0 | 2.2 | 2.4 |

TABLE 13

| | Alkyl Sulfate | | Alkyl Ether Sulfate | | | | |
|---|---|---|---|---|---|---|---|
| | Alkyl Chain Length, Wt. Percentage | | Alkyl Chain Length, Wt. % 9 to 11 | Average mol. EO (Alternatives for each numbered species) | | | |
| Species | 8 to 10 | 9 to 11 | | Range A | Range B | Species C | Species D | Species E |
| 5586 | 30% | 70% | 0% | 0.8 to 3 | 1.8 to 2.8 | 2.0 | 2.2 | 2.4 |
| 5587 | 31% | 69% | 0% | 0.8 to 3 | 1.8 to 2.8 | 2.0 | 2.2 | 2.4 |
| 5588 | 32% | 68% | 0% | 0.8 to 3 | 1.8 to 2.8 | 2.0 | 2.2 | 2.4 |
| 5589 | 33% | 67% | 0% | 0.8 to 3 | 1.8 to 2.8 | 2.0 | 2.2 | 2.4 |
| 5590 | 34% | 66% | 0% | 0.8 to 3 | 1.8 to 2.8 | 2.0 | 2.2 | 2.4 |
| 5591 | 35% | 65% | 0% | 0.8 to 3 | 1.8 to 2.8 | 2.0 | 2.2 | 2.4 |
| 5592 | 36% | 64% | 0% | 0.8 to 3 | 1.8 to 2.8 | 2.0 | 2.2 | 2.4 |
| 5593 | 37% | 63% | 0% | 0.8 to 3 | 1.8 to 2.8 | 2.0 | 2.2 | 2.4 |
| 5594 | 38% | 62% | 0% | 0.8 to 3 | 1.8 to 2.8 | 2.0 | 2.2 | 2.4 |
| 5595 | 39% | 61% | 0% | 0.8 to 3 | 1.8 to 2.8 | 2.0 | 2.2 | 2.4 |
| 5596 | 40% | 60% | 0% | 0.8 to 3 | 1.8 to 2.8 | 2.0 | 2.2 | 2.4 |
| 5597 | 41% | 59% | 0% | 0.8 to 3 | 1.8 to 2.8 | 2.0 | 2.2 | 2.4 |
| 5598 | 42% | 58% | 0% | 0.8 to 3 | 1.8 to 2.8 | 2.0 | 2.2 | 2.4 |
| 5599 | 43% | 57% | 0% | 0.8 to 3 | 1.8 to 2.8 | 2.0 | 2.2 | 2.4 |
| 5600 | 44% | 56% | 0% | 0.8 to 3 | 1.8 to 2.8 | 2.0 | 2.2 | 2.4 |
| 5601 | 45% | 55% | 0% | 0.8 to 3 | 1.8 to 2.8 | 2.0 | 2.2 | 2.4 |
| 5602 | 46% | 54% | 0% | 0.8 to 3 | 1.8 to 2.8 | 2.0 | 2.2 | 2.4 |
| 5603 | 47% | 53% | 0% | 0.8 to 3 | 1.8 to 2.8 | 2.0 | 2.2 | 2.4 |
| 5604 | 48% | 52% | 0% | 0.8 to 3 | 1.8 to 2.8 | 2.0 | 2.2 | 2.4 |

TABLE 13-continued

| Species | Alkyl Sulfate Alkyl Chain Length, Wt. Percentage 8 to 10 | 9 to 11 | Alkyl Chain Length, Wt. % 9 to 11 | Alkyl Ether Sulfate Average mol. EO (Alternatives for each numbered species) Range A | Range B | Species C | Species D | Species E |
|---|---|---|---|---|---|---|---|---|
| 5605 | 49% | 51% | 0% | 0.8 to 3 | 1.8 to 2.8 | 2.0 | 2.2 | 2.4 |
| 5606 | 50% | 50% | 0% | 0.8 to 3 | 1.8 to 2.8 | 2.0 | 2.2 | 2.4 |
| 5607 | 51% | 49% | 0% | 0.8 to 3 | 1.8 to 2.8 | 2.0 | 2.2 | 2.4 |
| 5608 | 52% | 48% | 0% | 0.8 to 3 | 1.8 to 2.8 | 2.0 | 2.2 | 2.4 |
| 5609 | 53% | 47% | 0% | 0.8 to 3 | 1.8 to 2.8 | 2.0 | 2.2 | 2.4 |
| 5610 | 54% | 46% | 0% | 0.8 to 3 | 1.8 to 2.8 | 2.0 | 2.2 | 2.4 |
| 5611 | 55% | 45% | 0% | 0.8 to 3 | 1.8 to 2.8 | 2.0 | 2.2 | 2.4 |
| 5612 | 56% | 44% | 0% | 0.8 to 3 | 1.8 to 2.8 | 2.0 | 2.2 | 2.4 |
| 5613 | 57% | 43% | 0% | 0.8 to 3 | 1.8 to 2.8 | 2.0 | 2.2 | 2.4 |
| 5614 | 58% | 42% | 0% | 0.8 to 3 | 1.8 to 2.8 | 2.0 | 2.2 | 2.4 |
| 5615 | 59% | 41% | 0% | 0.8 to 3 | 1.8 to 2.8 | 2.0 | 2.2 | 2.4 |
| 5616 | 60% | 40% | 0% | 0.8 to 3 | 1.8 to 2.8 | 2.0 | 2.2 | 2.4 |
| 5617 | 30% | 69.5% | 0.5% | 0.8 to 3 | 1.8 to 2.8 | 2.0 | 2.2 | 2.4 |
| 5618 | 31% | 68.5% | 0.5% | 0.8 to 3 | 1.8 to 2.8 | 2.0 | 2.2 | 2.4 |
| 5619 | 32% | 67.5% | 0.5% | 0.8 to 3 | 1.8 to 2.8 | 2.0 | 2.2 | 2.4 |
| 5620 | 33% | 66.5% | 0.5% | 0.8 to 3 | 1.8 to 2.8 | 2.0 | 2.2 | 2.4 |
| 5621 | 34% | 65.5% | 0.5% | 0.8 to 3 | 1.8 to 2.8 | 2.0 | 2.2 | 2.4 |
| 5622 | 35% | 64.5% | 0.5% | 0.8 to 3 | 1.8 to 2.8 | 2.0 | 2.2 | 2.4 |
| 5623 | 36% | 63.5% | 0.5% | 0.8 to 3 | 1.8 to 2.8 | 2.0 | 2.2 | 2.4 |
| 5624 | 37% | 62.5% | 0.5% | 0.8 to 3 | 1.8 to 2.8 | 2.0 | 2.2 | 2.4 |
| 5625 | 38% | 61.5% | 0.5% | 0.8 to 3 | 1.8 to 2.8 | 2.0 | 2.2 | 2.4 |
| 5626 | 39% | 60.5% | 0.5% | 0.8 to 3 | 1.8 to 2.8 | 2.0 | 2.2 | 2.4 |
| 5627 | 40% | 59.5% | 0.5% | 0.8 to 3 | 1.8 to 2.8 | 2.0 | 2.2 | 2.4 |
| 5628 | 41% | 58.5% | 0.5% | 0.8 to 3 | 1.8 to 2.8 | 2.0 | 2.2 | 2.4 |
| 5629 | 42% | 57.5% | 0.5% | 0.8 to 3 | 1.8 to 2.8 | 2.0 | 2.2 | 2.4 |
| 5630 | 43% | 56.5% | 0.5% | 0.8 to 3 | 1.8 to 2.8 | 2.0 | 2.2 | 2.4 |
| 5631 | 44% | 55.5% | 0.5% | 0.8 to 3 | 1.8 to 2.8 | 2.0 | 2.2 | 2.4 |
| 5632 | 45% | 54.5% | 0.5% | 0.8 to 3 | 1.8 to 2.8 | 2.0 | 2.2 | 2.4 |
| 5633 | 46% | 53.5% | 0.5% | 0.8 to 3 | 1.8 to 2.8 | 2.0 | 2.2 | 2.4 |
| 5634 | 47% | 52.5% | 0.5% | 0.8 to 3 | 1.8 to 2.8 | 2.0 | 2.2 | 2.4 |
| 5635 | 48% | 51.5% | 0.5% | 0.8 to 3 | 1.8 to 2.8 | 2.0 | 2.2 | 2.4 |
| 5636 | 49% | 50.5% | 0.5% | 0.8 to 3 | 1.8 to 2.8 | 2.0 | 2.2 | 2.4 |
| 5637 | 50% | 49.5% | 0.5% | 0.8 to 3 | 1.8 to 2.8 | 2.0 | 2.2 | 2.4 |
| 5638 | 51% | 48.5% | 0.5% | 0.8 to 3 | 1.8 to 2.8 | 2.0 | 2.2 | 2.4 |
| 5639 | 52% | 47.5% | 0.5% | 0.8 to 3 | 1.8 to 2.8 | 2.0 | 2.2 | 2.4 |
| 5640 | 53% | 46.5% | 0.5% | 0.8 to 3 | 1.8 to 2.8 | 2.0 | 2.2 | 2.4 |
| 5641 | 54% | 45.5% | 0.5% | 0.8 to 3 | 1.8 to 2.8 | 2.0 | 2.2 | 2.4 |
| 5642 | 55% | 44.5% | 0.5% | 0.8 to 3 | 1.8 to 2.8 | 2.0 | 2.2 | 2.4 |
| 5643 | 56% | 43.5% | 0.5% | 0.8 to 3 | 1.8 to 2.8 | 2.0 | 2.2 | 2.4 |
| 5644 | 57% | 42.5% | 0.5% | 0.8 to 3 | 1.8 to 2.8 | 2.0 | 2.2 | 2.4 |
| 5645 | 58% | 41.5% | 0.5% | 0.8 to 3 | 1.8 to 2.8 | 2.0 | 2.2 | 2.4 |
| 5646 | 59% | 40.5% | 0.5% | 0.8 to 3 | 1.8 to 2.8 | 2.0 | 2.2 | 2.4 |
| 5647 | 60% | 39.5% | 0.5% | 0.8 to 3 | 1.8 to 2.8 | 2.0 | 2.2 | 2.4 |
| 5648 | 30% | 69% | 1% | 0.8 to 3 | 1.8 to 2.8 | 2.0 | 2.2 | 2.4 |
| 5649 | 31% | 68% | 1% | 0.8 to 3 | 1.8 to 2.8 | 2.0 | 2.2 | 2.4 |
| 5650 | 32% | 67% | 1% | 0.8 to 3 | 1.8 to 2.8 | 2.0 | 2.2 | 2.4 |
| 5651 | 33% | 66% | 1% | 0.8 to 3 | 1.8 to 2.8 | 2.0 | 2.2 | 2.4 |
| 5652 | 34% | 65% | 1% | 0.8 to 3 | 1.8 to 2.8 | 2.0 | 2.2 | 2.4 |
| 5653 | 35% | 64% | 1% | 0.8 to 3 | 1.8 to 2.8 | 2.0 | 2.2 | 2.4 |
| 5654 | 36% | 63% | 1% | 0.8 to 3 | 1.8 to 2.8 | 2.0 | 2.2 | 2.4 |
| 5655 | 37% | 62% | 1% | 0.8 to 3 | 1.8 to 2.8 | 2.0 | 2.2 | 2.4 |
| 5656 | 38% | 61% | 1% | 0.8 to 3 | 1.8 to 2.8 | 2.0 | 2.2 | 2.4 |
| 5657 | 39% | 60% | 1% | 0.8 to 3 | 1.8 to 2.8 | 2.0 | 2.2 | 2.4 |
| 5658 | 40% | 59% | 1% | 0.8 to 3 | 1.8 to 2.8 | 2.0 | 2.2 | 2.4 |
| 5659 | 41% | 58% | 1% | 0.8 to 3 | 1.8 to 2.8 | 2.0 | 2.2 | 2.4 |
| 5660 | 42% | 57% | 1% | 0.8 to 3 | 1.8 to 2.8 | 2.0 | 2.2 | 2.4 |
| 5661 | 43% | 56% | 1% | 0.8 to 3 | 1.8 to 2.8 | 2.0 | 2.2 | 2.4 |
| 5662 | 44% | 55% | 1% | 0.8 to 3 | 1.8 to 2.8 | 2.0 | 2.2 | 2.4 |
| 5663 | 45% | 54% | 1% | 0.8 to 3 | 1.8 to 2.8 | 2.0 | 2.2 | 2.4 |
| 5664 | 46% | 53% | 1% | 0.8 to 3 | 1.8 to 2.8 | 2.0 | 2.2 | 2.4 |
| 5665 | 47% | 52% | 1% | 0.8 to 3 | 1.8 to 2.8 | 2.0 | 2.2 | 2.4 |
| 5666 | 48% | 51% | 1% | 0.8 to 3 | 1.8 to 2.8 | 2.0 | 2.2 | 2.4 |
| 5667 | 49% | 50% | 1% | 0.8 to 3 | 1.8 to 2.8 | 2.0 | 2.2 | 2.4 |
| 5668 | 50% | 49% | 1% | 0.8 to 3 | 1.8 to 2.8 | 2.0 | 2.2 | 2.4 |
| 5669 | 51% | 48% | 1% | 0.8 to 3 | 1.8 to 2.8 | 2.0 | 2.2 | 2.4 |
| 5670 | 52% | 47% | 1% | 0.8 to 3 | 1.8 to 2.8 | 2.0 | 2.2 | 2.4 |
| 5671 | 53% | 46% | 1% | 0.8 to 3 | 1.8 to 2.8 | 2.0 | 2.2 | 2.4 |
| 5672 | 54% | 45% | 1% | 0.8 to 3 | 1.8 to 2.8 | 2.0 | 2.2 | 2.4 |
| 5673 | 55% | 44% | 1% | 0.8 to 3 | 1.8 to 2.8 | 2.0 | 2.2 | 2.4 |
| 5674 | 56% | 43% | 1% | 0.8 to 3 | 1.8 to 2.8 | 2.0 | 2.2 | 2.4 |
| 5675 | 57% | 42% | 1% | 0.8 to 3 | 1.8 to 2.8 | 2.0 | 2.2 | 2.4 |
| 5676 | 58% | 41% | 1% | 0.8 to 3 | 1.8 to 2.8 | 2.0 | 2.2 | 2.4 |
| 5677 | 59% | 40% | 1% | 0.8 to 3 | 1.8 to 2.8 | 2.0 | 2.2 | 2.4 |
| 5678 | 60% | 39% | 1% | 0.8 to 3 | 1.8 to 2.8 | 2.0 | 2.2 | 2.4 |
| 5679 | 30% | 68.5% | 1.5% | 0.8 to 3 | 1.8 to 2.8 | 2.0 | 2.2 | 2.4 |
| 5680 | 31% | 67.5% | 1.5% | 0.8 to 3 | 1.8 to 2.8 | 2.0 | 2.2 | 2.4 |
| 5681 | 32% | 66.5% | 1.5% | 0.8 to 3 | 1.8 to 2.8 | 2.0 | 2.2 | 2.4 |
| 5682 | 33% | 65.5% | 1.5% | 0.8 to 3 | 1.8 to 2.8 | 2.0 | 2.2 | 2.4 |
| 5683 | 34% | 64.5% | 1.5% | 0.8 to 3 | 1.8 to 2.8 | 2.0 | 2.2 | 2.4 |
| 5684 | 35% | 63.5% | 1.5% | 0.8 to 3 | 1.8 to 2.8 | 2.0 | 2.2 | 2.4 |
| 5685 | 36% | 62.5% | 1.5% | 0.8 to 3 | 1.8 to 2.8 | 2.0 | 2.2 | 2.4 |
| 5686 | 37% | 61.5% | 1.5% | 0.8 to 3 | 1.8 to 2.8 | 2.0 | 2.2 | 2.4 |
| 5687 | 38% | 60.5% | 1.5% | 0.8 to 3 | 1.8 to 2.8 | 2.0 | 2.2 | 2.4 |
| 5688 | 39% | 59.5% | 1.5% | 0.8 to 3 | 1.8 to 2.8 | 2.0 | 2.2 | 2.4 |
| 5689 | 40% | 58.5% | 1.5% | 0.8 to 3 | 1.8 to 2.8 | 2.0 | 2.2 | 2.4 |
| 5690 | 41% | 57.5% | 1.5% | 0.8 to 3 | 1.8 to 2.8 | 2.0 | 2.2 | 2.4 |
| 5691 | 42% | 56.5% | 1.5% | 0.8 to 3 | 1.8 to 2.8 | 2.0 | 2.2 | 2.4 |
| 5692 | 43% | 55.5% | 1.5% | 0.8 to 3 | 1.8 to 2.8 | 2.0 | 2.2 | 2.4 |
| 5693 | 44% | 54.5% | 1.5% | 0.8 to 3 | 1.8 to 2.8 | 2.0 | 2.2 | 2.4 |
| 5694 | 45% | 53.5% | 1.5% | 0.8 to 3 | 1.8 to 2.8 | 2.0 | 2.2 | 2.4 |
| 5695 | 46% | 52.5% | 1.5% | 0.8 to 3 | 1.8 to 2.8 | 2.0 | 2.2 | 2.4 |
| 5696 | 47% | 51.5% | 1.5% | 0.8 to 3 | 1.8 to 2.8 | 2.0 | 2.2 | 2.4 |
| 5697 | 48% | 50.5% | 1.5% | 0.8 to 3 | 1.8 to 2.8 | 2.0 | 2.2 | 2.4 |
| 5698 | 49% | 49.5% | 1.5% | 0.8 to 3 | 1.8 to 2.8 | 2.0 | 2.2 | 2.4 |
| 5699 | 50% | 48.5% | 1.5% | 0.8 to 3 | 1.8 to 2.8 | 2.0 | 2.2 | 2.4 |
| 5700 | 51% | 47.5% | 1.5% | 0.8 to 3 | 1.8 to 2.8 | 2.0 | 2.2 | 2.4 |
| 5701 | 52% | 46.5% | 1.5% | 0.8 to 3 | 1.8 to 2.8 | 2.0 | 2.2 | 2.4 |
| 5702 | 53% | 45.5% | 1.5% | 0.8 to 3 | 1.8 to 2.8 | 2.0 | 2.2 | 2.4 |
| 5703 | 54% | 44.5% | 1.5% | 0.8 to 3 | 1.8 to 2.8 | 2.0 | 2.2 | 2.4 |
| 5704 | 55% | 43.5% | 1.5% | 0.8 to 3 | 1.8 to 2.8 | 2.0 | 2.2 | 2.4 |
| 5705 | 56% | 42.5% | 1.5% | 0.8 to 3 | 1.8 to 2.8 | 2.0 | 2.2 | 2.4 |
| 5706 | 57% | 41.5% | 1.5% | 0.8 to 3 | 1.8 to 2.8 | 2.0 | 2.2 | 2.4 |
| 5707 | 58% | 40.5% | 1.5% | 0.8 to 3 | 1.8 to 2.8 | 2.0 | 2.2 | 2.4 |
| 5708 | 59% | 39.5% | 1.5% | 0.8 to 3 | 1.8 to 2.8 | 2.0 | 2.2 | 2.4 |
| 5709 | 60% | 38.5% | 1.5% | 0.8 to 3 | 1.8 to 2.8 | 2.0 | 2.2 | 2.4 |
| 5710 | 30% | 68% | 2% | 0.8 to 3 | 1.8 to 2.8 | 2.0 | 2.2 | 2.4 |
| 5711 | 31% | 67% | 2% | 0.8 to 3 | 1.8 to 2.8 | 2.0 | 2.2 | 2.4 |
| 5712 | 32% | 66% | 2% | 0.8 to 3 | 1.8 to 2.8 | 2.0 | 2.2 | 2.4 |
| 5713 | 33% | 65% | 2% | 0.8 to 3 | 1.8 to 2.8 | 2.0 | 2.2 | 2.4 |
| 5714 | 34% | 64% | 2% | 0.8 to 3 | 1.8 to 2.8 | 2.0 | 2.2 | 2.4 |
| 5715 | 35% | 63% | 2% | 0.8 to 3 | 1.8 to 2.8 | 2.0 | 2.2 | 2.4 |
| 5716 | 36% | 62% | 2% | 0.8 to 3 | 1.8 to 2.8 | 2.0 | 2.2 | 2.4 |
| 5717 | 37% | 61% | 2% | 0.8 to 3 | 1.8 to 2.8 | 2.0 | 2.2 | 2.4 |
| 5718 | 38% | 60% | 2% | 0.8 to 3 | 1.8 to 2.8 | 2.0 | 2.2 | 2.4 |
| 5719 | 39% | 59% | 2% | 0.8 to 3 | 1.8 to 2.8 | 2.0 | 2.2 | 2.4 |
| 5720 | 40% | 58% | 2% | 0.8 to 3 | 1.8 to 2.8 | 2.0 | 2.2 | 2.4 |
| 5721 | 41% | 57% | 2% | 0.8 to 3 | 1.8 to 2.8 | 2.0 | 2.2 | 2.4 |
| 5722 | 42% | 56% | 2% | 0.8 to 3 | 1.8 to 2.8 | 2.0 | 2.2 | 2.4 |
| 5723 | 43% | 55% | 2% | 0.8 to 3 | 1.8 to 2.8 | 2.0 | 2.2 | 2.4 |
| 5724 | 44% | 54% | 2% | 0.8 to 3 | 1.8 to 2.8 | 2.0 | 2.2 | 2.4 |
| 5725 | 45% | 53% | 2% | 0.8 to 3 | 1.8 to 2.8 | 2.0 | 2.2 | 2.4 |
| 5726 | 46% | 52% | 2% | 0.8 to 3 | 1.8 to 2.8 | 2.0 | 2.2 | 2.4 |
| 5727 | 47% | 51% | 2% | 0.8 to 3 | 1.8 to 2.8 | 2.0 | 2.2 | 2.4 |
| 5728 | 48% | 50% | 2% | 0.8 to 3 | 1.8 to 2.8 | 2.0 | 2.2 | 2.4 |
| 5729 | 49% | 49% | 2% | 0.8 to 3 | 1.8 to 2.8 | 2.0 | 2.2 | 2.4 |
| 5730 | 50% | 48% | 2% | 0.8 to 3 | 1.8 to 2.8 | 2.0 | 2.2 | 2.4 |
| 5731 | 51% | 47% | 2% | 0.8 to 3 | 1.8 to 2.8 | 2.0 | 2.2 | 2.4 |
| 5732 | 52% | 46% | 2% | 0.8 to 3 | 1.8 to 2.8 | 2.0 | 2.2 | 2.4 |
| 5733 | 53% | 45% | 2% | 0.8 to 3 | 1.8 to 2.8 | 2.0 | 2.2 | 2.4 |
| 5734 | 54% | 44% | 2% | 0.8 to 3 | 1.8 to 2.8 | 2.0 | 2.2 | 2.4 |
| 5735 | 55% | 43% | 2% | 0.8 to 3 | 1.8 to 2.8 | 2.0 | 2.2 | 2.4 |
| 5736 | 56% | 42% | 2% | 0.8 to 3 | 1.8 to 2.8 | 2.0 | 2.2 | 2.4 |
| 5737 | 57% | 41% | 2% | 0.8 to 3 | 1.8 to 2.8 | 2.0 | 2.2 | 2.4 |
| 5738 | 58% | 40% | 2% | 0.8 to 3 | 1.8 to 2.8 | 2.0 | 2.2 | 2.4 |
| 5739 | 59% | 39% | 2% | 0.8 to 3 | 1.8 to 2.8 | 2.0 | 2.2 | 2.4 |
| 5740 | 60% | 38% | 2% | 0.8 to 3 | 1.8 to 2.8 | 2.0 | 2.2 | 2.4 |

TABLE 13-continued

| | Alkyl Sulfate | | | Alkyl Ether Sulfate | | | | |
| --- | --- | --- | --- | --- | --- | --- | --- | --- |
| | Alkyl Chain Length, Wt. Percentage | | Alkyl Chain Length, | Average mol. EO (Alternatives for each numbered species) | | | | |
| Species | 8 to 10 | 9 to 11 | Wt. % 9 to 11 | Range A | Range B | Species C | Species D | Species E |
| 5741 | 30% | 67.5% | 2.5% | 0.8 to 3 | 1.8 to 2.8 | 2.0 | 2.2 | 2.4 |
| 5742 | 31% | 66.5% | 2.5% | 0.8 to 3 | 1.8 to 2.8 | 2.0 | 2.2 | 2.4 |
| 5743 | 32% | 65.5% | 2.5% | 0.8 to 3 | 1.8 to 2.8 | 2.0 | 2.2 | 2.4 |
| 5744 | 33% | 64.5% | 2.5% | 0.8 to 3 | 1.8 to 2.8 | 2.0 | 2.2 | 2.4 |
| 5745 | 34% | 63.5% | 2.5% | 0.8 to 3 | 1.8 to 2.8 | 2.0 | 2.2 | 2.4 |
| 5746 | 35% | 62.5% | 2.5% | 0.8 to 3 | 1.8 to 2.8 | 2.0 | 2.2 | 2.4 |
| 5747 | 36% | 61.5% | 2.5% | 0.8 to 3 | 1.8 to 2.8 | 2.0 | 2.2 | 2.4 |
| 5748 | 37% | 60.5% | 2.5% | 0.8 to 3 | 1.8 to 2.8 | 2.0 | 2.2 | 2.4 |
| 5749 | 38% | 59.5% | 2.5% | 0.8 to 3 | 1.8 to 2.8 | 2.0 | 2.2 | 2.4 |
| 5750 | 39% | 58.5% | 2.5% | 0.8 to 3 | 1.8 to 2.8 | 2.0 | 2.2 | 2.4 |
| 5751 | 40% | 57.5% | 2.5% | 0.8 to 3 | 1.8 to 2.8 | 2.0 | 2.2 | 2.4 |
| 5752 | 41% | 56.5% | 2.5% | 0.8 to 3 | 1.8 to 2.8 | 2.0 | 2.2 | 2.4 |
| 5753 | 42% | 55.5% | 2.5% | 0.8 to 3 | 1.8 to 2.8 | 2.0 | 2.2 | 2.4 |
| 5754 | 43% | 54.5% | 2.5% | 0.8 to 3 | 1.8 to 2.8 | 2.0 | 2.2 | 2.4 |
| 5755 | 44% | 53.5% | 2.5% | 0.8 to 3 | 1.8 to 2.8 | 2.0 | 2.2 | 2.4 |
| 5756 | 45% | 52.5% | 2.5% | 0.8 to 3 | 1.8 to 2.8 | 2.0 | 2.2 | 2.4 |
| 5757 | 46% | 51.5% | 2.5% | 0.8 to 3 | 1.8 to 2.8 | 2.0 | 2.2 | 2.4 |
| 5758 | 47% | 50.5% | 2.5% | 0.8 to 3 | 1.8 to 2.8 | 2.0 | 2.2 | 2.4 |
| 5759 | 48% | 49.5% | 2.5% | 0.8 to 3 | 1.8 to 2.8 | 2.0 | 2.2 | 2.4 |
| 5760 | 49% | 48.5% | 2.5% | 0.8 to 3 | 1.8 to 2.8 | 2.0 | 2.2 | 2.4 |
| 5761 | 50% | 47.5% | 2.5% | 0.8 to 3 | 1.8 to 2.8 | 2.0 | 2.2 | 2.4 |
| 5762 | 51% | 46.5% | 2.5% | 0.8 to 3 | 1.8 to 2.8 | 2.0 | 2.2 | 2.4 |
| 5763 | 52% | 45.5% | 2.5% | 0.8 to 3 | 1.8 to 2.8 | 2.0 | 2.2 | 2.4 |
| 5764 | 53% | 44.5% | 2.5% | 0.8 to 3 | 1.8 to 2.8 | 2.0 | 2.2 | 2.4 |
| 5765 | 54% | 43.5% | 2.5% | 0.8 to 3 | 1.8 to 2.8 | 2.0 | 2.2 | 2.4 |
| 5766 | 55% | 42.5% | 2.5% | 0.8 to 3 | 1.8 to 2.8 | 2.0 | 2.2 | 2.4 |
| 5767 | 56% | 41.5% | 2.5% | 0.8 to 3 | 1.8 to 2.8 | 2.0 | 2.2 | 2.4 |
| 5768 | 57% | 40.5% | 2.5% | 0.8 to 3 | 1.8 to 2.8 | 2.0 | 2.2 | 2.4 |
| 5769 | 58% | 39.5% | 2.5% | 0.8 to 3 | 1.8 to 2.8 | 2.0 | 2.2 | 2.4 |
| 5770 | 59% | 38.5% | 2.5% | 0.8 to 3 | 1.8 to 2.8 | 2.0 | 2.2 | 2.4 |
| 5771 | 60% | 37.5% | 2.5% | 0.8 to 3 | 1.8 to 2.8 | 2.0 | 2.2 | 2.4 |
| 5772 | 30% | 67% | 3% | 0.8 to 3 | 1.8 to 2.8 | 2.0 | 2.2 | 2.4 |
| 5773 | 31% | 66% | 3% | 0.8 to 3 | 1.8 to 2.8 | 2.0 | 2.2 | 2.4 |
| 5774 | 32% | 65% | 3% | 0.8 to 3 | 1.8 to 2.8 | 2.0 | 2.2 | 2.4 |
| 5775 | 33% | 64% | 3% | 0.8 to 3 | 1.8 to 2.8 | 2.0 | 2.2 | 2.4 |
| 5776 | 34% | 63% | 3% | 0.8 to 3 | 1.8 to 2.8 | 2.0 | 2.2 | 2.4 |
| 5777 | 35% | 62% | 3% | 0.8 to 3 | 1.8 to 2.8 | 2.0 | 2.2 | 2.4 |
| 5778 | 36% | 61% | 3% | 0.8 to 3 | 1.8 to 2.8 | 2.0 | 2.2 | 2.4 |
| 5779 | 37% | 60% | 3% | 0.8 to 3 | 1.8 to 2.8 | 2.0 | 2.2 | 2.4 |
| 5780 | 38% | 59% | 3% | 0.8 to 3 | 1.8 to 2.8 | 2.0 | 2.2 | 2.4 |
| 5781 | 39% | 58% | 3% | 0.8 to 3 | 1.8 to 2.8 | 2.0 | 2.2 | 2.4 |
| 5782 | 40% | 57% | 3% | 0.8 to 3 | 1.8 to 2.8 | 2.0 | 2.2 | 2.4 |
| 5783 | 41% | 56% | 3% | 0.8 to 3 | 1.8 to 2.8 | 2.0 | 2.2 | 2.4 |
| 5784 | 42% | 55% | 3% | 0.8 to 3 | 1.8 to 2.8 | 2.0 | 2.2 | 2.4 |
| 5785 | 43% | 54% | 3% | 0.8 to 3 | 1.8 to 2.8 | 2.0 | 2.2 | 2.4 |
| 5786 | 44% | 53% | 3% | 0.8 to 3 | 1.8 to 2.8 | 2.0 | 2.2 | 2.4 |
| 5787 | 45% | 52% | 3% | 0.8 to 3 | 1.8 to 2.8 | 2.0 | 2.2 | 2.4 |
| 5788 | 46% | 51% | 3% | 0.8 to 3 | 1.8 to 2.8 | 2.0 | 2.2 | 2.4 |
| 5789 | 47% | 50% | 3% | 0.8 to 3 | 1.8 to 2.8 | 2.0 | 2.2 | 2.4 |
| 5790 | 48% | 49% | 3% | 0.8 to 3 | 1.8 to 2.8 | 2.0 | 2.2 | 2.4 |
| 5791 | 49% | 48% | 3% | 0.8 to 3 | 1.8 to 2.8 | 2.0 | 2.2 | 2.4 |
| 5792 | 50% | 47% | 3% | 0.8 to 3 | 1.8 to 2.8 | 2.0 | 2.2 | 2.4 |
| 5793 | 51% | 46% | 3% | 0.8 to 3 | 1.8 to 2.8 | 2.0 | 2.2 | 2.4 |
| 5794 | 52% | 45% | 3% | 0.8 to 3 | 1.8 to 2.8 | 2.0 | 2.2 | 2.4 |
| 5795 | 53% | 44% | 3% | 0.8 to 3 | 1.8 to 2.8 | 2.0 | 2.2 | 2.4 |
| 5796 | 54% | 43% | 3% | 0.8 to 3 | 1.8 to 2.8 | 2.0 | 2.2 | 2.4 |
| 5797 | 55% | 42% | 3% | 0.8 to 3 | 1.8 to 2.8 | 2.0 | 2.2 | 2.4 |
| 5798 | 56% | 41% | 3% | 0.8 to 3 | 1.8 to 2.8 | 2.0 | 2.2 | 2.4 |
| 5799 | 57% | 40% | 3% | 0.8 to 3 | 1.8 to 2.8 | 2.0 | 2.2 | 2.4 |
| 5800 | 58% | 39% | 3% | 0.8 to 3 | 1.8 to 2.8 | 2.0 | 2.2 | 2.4 |
| 5801 | 59% | 38% | 3% | 0.8 to 3 | 1.8 to 2.8 | 2.0 | 2.2 | 2.4 |
| 5802 | 60% | 37% | 3% | 0.8 to 3 | 1.8 to 2.8 | 2.0 | 2.2 | 2.4 |
| 5803 | 30% | 66.5% | 3.5% | 0.8 to 3 | 1.8 to 2.8 | 2.0 | 2.2 | 2.4 |
| 5804 | 31% | 65.5% | 3.5% | 0.8 to 3 | 1.8 to 2.8 | 2.0 | 2.2 | 2.4 |
| 5805 | 32% | 64.5% | 3.5% | 0.8 to 3 | 1.8 to 2.8 | 2.0 | 2.2 | 2.4 |
| 5806 | 33% | 63.5% | 3.5% | 0.8 to 3 | 1.8 to 2.8 | 2.0 | 2.2 | 2.4 |
| 5807 | 34% | 62.5% | 3.5% | 0.8 to 3 | 1.8 to 2.8 | 2.0 | 2.2 | 2.4 |
| 5808 | 35% | 61.5% | 3.5% | 0.8 to 3 | 1.8 to 2.8 | 2.0 | 2.2 | 2.4 |
| 5809 | 36% | 60.5% | 3.5% | 0.8 to 3 | 1.8 to 2.8 | 2.0 | 2.2 | 2.4 |
| 5810 | 37% | 59.5% | 3.5% | 0.8 to 3 | 1.8 to 2.8 | 2.0 | 2.2 | 2.4 |
| 5811 | 38% | 58.5% | 3.5% | 0.8 to 3 | 1.8 to 2.8 | 2.0 | 2.2 | 2.4 |
| 5812 | 39% | 57.5% | 3.5% | 0.8 to 3 | 1.8 to 2.8 | 2.0 | 2.2 | 2.4 |
| 5813 | 40% | 56.5% | 3.5% | 0.8 to 3 | 1.8 to 2.8 | 2.0 | 2.2 | 2.4 |
| 5814 | 41% | 55.5% | 3.5% | 0.8 to 3 | 1.8 to 2.8 | 2.0 | 2.2 | 2.4 |
| 5815 | 42% | 54.5% | 3.5% | 0.8 to 3 | 1.8 to 2.8 | 2.0 | 2.2 | 2.4 |
| 5816 | 43% | 53.5% | 3.5% | 0.8 to 3 | 1.8 to 2.8 | 2.0 | 2.2 | 2.4 |
| 5817 | 44% | 52.5% | 3.5% | 0.8 to 3 | 1.8 to 2.8 | 2.0 | 2.2 | 2.4 |
| 5818 | 45% | 51.5% | 3.5% | 0.8 to 3 | 1.8 to 2.8 | 2.0 | 2.2 | 2.4 |
| 5819 | 46% | 50.5% | 3.5% | 0.8 to 3 | 1.8 to 2.8 | 2.0 | 2.2 | 2.4 |
| 5820 | 47% | 49.5% | 3.5% | 0.8 to 3 | 1.8 to 2.8 | 2.0 | 2.2 | 2.4 |
| 5821 | 48% | 48.5% | 3.5% | 0.8 to 3 | 1.8 to 2.8 | 2.0 | 2.2 | 2.4 |
| 5822 | 49% | 47.5% | 3.5% | 0.8 to 3 | 1.8 to 2.8 | 2.0 | 2.2 | 2.4 |
| 5823 | 50% | 46.5% | 3.5% | 0.8 to 3 | 1.8 to 2.8 | 2.0 | 2.2 | 2.4 |
| 5824 | 51% | 45.5% | 3.5% | 0.8 to 3 | 1.8 to 2.8 | 2.0 | 2.2 | 2.4 |
| 5825 | 52% | 44.5% | 3.5% | 0.8 to 3 | 1.8 to 2.8 | 2.0 | 2.2 | 2.4 |
| 5826 | 53% | 43.5% | 3.5% | 0.8 to 3 | 1.8 to 2.8 | 2.0 | 2.2 | 2.4 |
| 5827 | 54% | 42.5% | 3.5% | 0.8 to 3 | 1.8 to 2.8 | 2.0 | 2.2 | 2.4 |
| 5828 | 55% | 41.5% | 3.5% | 0.8 to 3 | 1.8 to 2.8 | 2.0 | 2.2 | 2.4 |
| 5829 | 56% | 40.5% | 3.5% | 0.8 to 3 | 1.8 to 2.8 | 2.0 | 2.2 | 2.4 |
| 5830 | 57% | 39.5% | 3.5% | 0.8 to 3 | 1.8 to 2.8 | 2.0 | 2.2 | 2.4 |
| 5831 | 58% | 38.5% | 3.5% | 0.8 to 3 | 1.8 to 2.8 | 2.0 | 2.2 | 2.4 |
| 5832 | 59% | 37.5% | 3.5% | 0.8 to 3 | 1.8 to 2.8 | 2.0 | 2.2 | 2.4 |
| 5833 | 60% | 36.5% | 3.5% | 0.8 to 3 | 1.8 to 2.8 | 2.0 | 2.2 | 2.4 |
| 5834 | 30% | 66% | 4% | 0.8 to 3 | 1.8 to 2.8 | 2.0 | 2.2 | 2.4 |
| 5835 | 31% | 65% | 4% | 0.8 to 3 | 1.8 to 2.8 | 2.0 | 2.2 | 2.4 |
| 5836 | 32% | 64% | 4% | 0.8 to 3 | 1.8 to 2.8 | 2.0 | 2.2 | 2.4 |
| 5837 | 33% | 63% | 4% | 0.8 to 3 | 1.8 to 2.8 | 2.0 | 2.2 | 2.4 |
| 5838 | 34% | 62% | 4% | 0.8 to 3 | 1.8 to 2.8 | 2.0 | 2.2 | 2.4 |
| 5839 | 35% | 61% | 4% | 0.8 to 3 | 1.8 to 2.8 | 2.0 | 2.2 | 2.4 |
| 5840 | 36% | 60% | 4% | 0.8 to 3 | 1.8 to 2.8 | 2.0 | 2.2 | 2.4 |
| 5841 | 37% | 59% | 4% | 0.8 to 3 | 1.8 to 2.8 | 2.0 | 2.2 | 2.4 |
| 5842 | 38% | 58% | 4% | 0.8 to 3 | 1.8 to 2.8 | 2.0 | 2.2 | 2.4 |
| 5843 | 39% | 57% | 4% | 0.8 to 3 | 1.8 to 2.8 | 2.0 | 2.2 | 2.4 |
| 5844 | 40% | 56% | 4% | 0.8 to 3 | 1.8 to 2.8 | 2.0 | 2.2 | 2.4 |
| 5845 | 41% | 55% | 4% | 0.8 to 3 | 1.8 to 2.8 | 2.0 | 2.2 | 2.4 |
| 5846 | 42% | 54% | 4% | 0.8 to 3 | 1.8 to 2.8 | 2.0 | 2.2 | 2.4 |
| 5847 | 43% | 53% | 4% | 0.8 to 3 | 1.8 to 2.8 | 2.0 | 2.2 | 2.4 |
| 5848 | 44% | 52% | 4% | 0.8 to 3 | 1.8 to 2.8 | 2.0 | 2.2 | 2.4 |
| 5849 | 45% | 51% | 4% | 0.8 to 3 | 1.8 to 2.8 | 2.0 | 2.2 | 2.4 |
| 5850 | 46% | 50% | 4% | 0.8 to 3 | 1.8 to 2.8 | 2.0 | 2.2 | 2.4 |
| 5851 | 47% | 49% | 4% | 0.8 to 3 | 1.8 to 2.8 | 2.0 | 2.2 | 2.4 |
| 5852 | 48% | 48% | 4% | 0.8 to 3 | 1.8 to 2.8 | 2.0 | 2.2 | 2.4 |
| 5853 | 49% | 47% | 4% | 0.8 to 3 | 1.8 to 2.8 | 2.0 | 2.2 | 2.4 |
| 5854 | 50% | 46% | 4% | 0.8 to 3 | 1.8 to 2.8 | 2.0 | 2.2 | 2.4 |
| 5855 | 51% | 45% | 4% | 0.8 to 3 | 1.8 to 2.8 | 2.0 | 2.2 | 2.4 |
| 5856 | 52% | 44% | 4% | 0.8 to 3 | 1.8 to 2.8 | 2.0 | 2.2 | 2.4 |
| 5857 | 53% | 43% | 4% | 0.8 to 3 | 1.8 to 2.8 | 2.0 | 2.2 | 2.4 |
| 5858 | 54% | 42% | 4% | 0.8 to 3 | 1.8 to 2.8 | 2.0 | 2.2 | 2.4 |
| 5859 | 55% | 41% | 4% | 0.8 to 3 | 1.8 to 2.8 | 2.0 | 2.2 | 2.4 |
| 5860 | 56% | 40% | 4% | 0.8 to 3 | 1.8 to 2.8 | 2.0 | 2.2 | 2.4 |
| 5861 | 57% | 39% | 4% | 0.8 to 3 | 1.8 to 2.8 | 2.0 | 2.2 | 2.4 |
| 5862 | 58% | 38% | 4% | 0.8 to 3 | 1.8 to 2.8 | 2.0 | 2.2 | 2.4 |
| 5863 | 59% | 37% | 4% | 0.8 to 3 | 1.8 to 2.8 | 2.0 | 2.2 | 2.4 |
| 5864 | 60% | 36% | 4% | 0.8 to 3 | 1.8 to 2.8 | 2.0 | 2.2 | 2.4 |
| 5865 | 30% | 65.5% | 4.5% | 0.8 to 3 | 1.8 to 2.8 | 2.0 | 2.2 | 2.4 |
| 5866 | 31% | 64.5% | 4.5% | 0.8 to 3 | 1.8 to 2.8 | 2.0 | 2.2 | 2.4 |
| 5867 | 32% | 63.5% | 4.5% | 0.8 to 3 | 1.8 to 2.8 | 2.0 | 2.2 | 2.4 |
| 5868 | 33% | 62.5% | 4.5% | 0.8 to 3 | 1.8 to 2.8 | 2.0 | 2.2 | 2.4 |
| 5869 | 34% | 61.5% | 4.5% | 0.8 to 3 | 1.8 to 2.8 | 2.0 | 2.2 | 2.4 |
| 5870 | 35% | 60.5% | 4.5% | 0.8 to 3 | 1.8 to 2.8 | 2.0 | 2.2 | 2.4 |
| 5871 | 36% | 59.5% | 4.5% | 0.8 to 3 | 1.8 to 2.8 | 2.0 | 2.2 | 2.4 |
| 5872 | 37% | 58.5% | 4.5% | 0.8 to 3 | 1.8 to 2.8 | 2.0 | 2.2 | 2.4 |
| 5873 | 38% | 57.5% | 4.5% | 0.8 to 3 | 1.8 to 2.8 | 2.0 | 2.2 | 2.4 |
| 5874 | 39% | 56.5% | 4.5% | 0.8 to 3 | 1.8 to 2.8 | 2.0 | 2.2 | 2.4 |
| 5875 | 40% | 55.5% | 4.5% | 0.8 to 3 | 1.8 to 2.8 | 2.0 | 2.2 | 2.4 |
| 5876 | 41% | 54.5% | 4.5% | 0.8 to 3 | 1.8 to 2.8 | 2.0 | 2.2 | 2.4 |

TABLE 13-continued

| | Alkyl Sulfate Alkyl Chain Length, Wt. Percentage | | Alkyl Chain Length, Wt. % 9 to 11 | Alkyl Ether Sulfate Average mol. EO (Alternatives for each numbered species) | | | | |
|---|---|---|---|---|---|---|---|---|
| Species | 8 to 10 | 9 to 11 | | Range A | Range B | Species C | Species D | Species E |
| 5877 | 42% | 53.5% | 4.5% | 0.8 to 3 | 1.8 to 2.8 | 2.0 | 2.2 | 2.4 |
| 5878 | 43% | 52.5% | 4.5% | 0.8 to 3 | 1.8 to 2.8 | 2.0 | 2.2 | 2.4 |
| 5879 | 44% | 51.5% | 4.5% | 0.8 to 3 | 1.8 to 2.8 | 2.0 | 2.2 | 2.4 |
| 5880 | 45% | 50.5% | 4.5% | 0.8 to 3 | 1.8 to 2.8 | 2.0 | 2.2 | 2.4 |
| 5881 | 46% | 49.5% | 4.5% | 0.8 to 3 | 1.8 to 2.8 | 2.0 | 2.2 | 2.4 |
| 5882 | 47% | 48.5% | 4.5% | 0.8 to 3 | 1.8 to 2.8 | 2.0 | 2.2 | 2.4 |
| 5883 | 48% | 47.5% | 4.5% | 0.8 to 3 | 1.8 to 2.8 | 2.0 | 2.2 | 2.4 |
| 5884 | 49% | 46.5% | 4.5% | 0.8 to 3 | 1.8 to 2.8 | 2.0 | 2.2 | 2.4 |
| 5885 | 50% | 45.5% | 4.5% | 0.8 to 3 | 1.8 to 2.8 | 2.0 | 2.2 | 2.4 |
| 5886 | 51% | 44.5% | 4.5% | 0.8 to 3 | 1.8 to 2.8 | 2.0 | 2.2 | 2.4 |
| 5887 | 52% | 43.5% | 4.5% | 0.8 to 3 | 1.8 to 2.8 | 2.0 | 2.2 | 2.4 |
| 5888 | 53% | 42.5% | 4.5% | 0.8 to 3 | 1.8 to 2.8 | 2.0 | 2.2 | 2.4 |
| 5889 | 54% | 41.5% | 4.5% | 0.8 to 3 | 1.8 to 2.8 | 2.0 | 2.2 | 2.4 |
| 5890 | 55% | 40.5% | 4.5% | 0.8 to 3 | 1.8 to 2.8 | 2.0 | 2.2 | 2.4 |
| 5891 | 56% | 39.5% | 4.5% | 0.8 to 3 | 1.8 to 2.8 | 2.0 | 2.2 | 2.4 |
| 5892 | 57% | 38.5% | 4.5% | 0.8 to 3 | 1.8 to 2.8 | 2.0 | 2.2 | 2.4 |
| 5893 | 58% | 37.5% | 4.5% | 0.8 to 3 | 1.8 to 2.8 | 2.0 | 2.2 | 2.4 |
| 5894 | 59% | 36.5% | 4.5% | 0.8 to 3 | 1.8 to 2.8 | 2.0 | 2.2 | 2.4 |
| 5895 | 60% | 35.5% | 4.5% | 0.8 to 3 | 1.8 to 2.8 | 2.0 | 2.2 | 2.4 |
| 5896 | 30% | 65% | 5% | 0.8 to 3 | 1.8 to 2.8 | 2.0 | 2.2 | 2.4 |
| 5897 | 31% | 64% | 5% | 0.8 to 3 | 1.8 to 2.8 | 2.0 | 2.2 | 2.4 |
| 5898 | 32% | 63% | 5% | 0.8 to 3 | 1.8 to 2.8 | 2.0 | 2.2 | 2.4 |
| 5899 | 33% | 62% | 5% | 0.8 to 3 | 1.8 to 2.8 | 2.0 | 2.2 | 2.4 |
| 5900 | 34% | 61% | 5% | 0.8 to 3 | 1.8 to 2.8 | 2.0 | 2.2 | 2.4 |
| 5901 | 35% | 60% | 5% | 0.8 to 3 | 1.8 to 2.8 | 2.0 | 2.2 | 2.4 |
| 5902 | 36% | 59% | 5% | 0.8 to 3 | 1.8 to 2.8 | 2.0 | 2.2 | 2.4 |
| 5903 | 37% | 58% | 5% | 0.8 to 3 | 1.8 to 2.8 | 2.0 | 2.2 | 2.4 |
| 5904 | 38% | 57% | 5% | 0.8 to 3 | 1.8 to 2.8 | 2.0 | 2.2 | 2.4 |
| 5905 | 39% | 56% | 5% | 0.8 to 3 | 1.8 to 2.8 | 2.0 | 2.2 | 2.4 |
| 5906 | 40% | 55% | 5% | 0.8 to 3 | 1.8 to 2.8 | 2.0 | 2.2 | 2.4 |
| 5907 | 41% | 54% | 5% | 0.8 to 3 | 1.8 to 2.8 | 2.0 | 2.2 | 2.4 |
| 5908 | 42% | 53% | 5% | 0.8 to 3 | 1.8 to 2.8 | 2.0 | 2.2 | 2.4 |
| 5909 | 43% | 52% | 5% | 0.8 to 3 | 1.8 to 2.8 | 2.0 | 2.2 | 2.4 |
| 5910 | 44% | 51% | 5% | 0.8 to 3 | 1.8 to 2.8 | 2.0 | 2.2 | 2.4 |
| 5911 | 45% | 50% | 5% | 0.8 to 3 | 1.8 to 2.8 | 2.0 | 2.2 | 2.4 |
| 5912 | 46% | 49% | 5% | 0.8 to 3 | 1.8 to 2.8 | 2.0 | 2.2 | 2.4 |
| 5913 | 47% | 48% | 5% | 0.8 to 3 | 1.8 to 2.8 | 2.0 | 2.2 | 2.4 |
| 5914 | 48% | 47% | 5% | 0.8 to 3 | 1.8 to 2.8 | 2.0 | 2.2 | 2.4 |
| 5915 | 49% | 46% | 5% | 0.8 to 3 | 1.8 to 2.8 | 2.0 | 2.2 | 2.4 |
| 5916 | 50% | 45% | 5% | 0.8 to 3 | 1.8 to 2.8 | 2.0 | 2.2 | 2.4 |
| 5917 | 51% | 44% | 5% | 0.8 to 3 | 1.8 to 2.8 | 2.0 | 2.2 | 2.4 |
| 5918 | 52% | 43% | 5% | 0.8 to 3 | 1.8 to 2.8 | 2.0 | 2.2 | 2.4 |
| 5919 | 53% | 42% | 5% | 0.8 to 3 | 1.8 to 2.8 | 2.0 | 2.2 | 2.4 |
| 5920 | 54% | 41% | 5% | 0.8 to 3 | 1.8 to 2.8 | 2.0 | 2.2 | 2.4 |
| 5921 | 55% | 40% | 5% | 0.8 to 3 | 1.8 to 2.8 | 2.0 | 2.2 | 2.4 |
| 5922 | 56% | 39% | 5% | 0.8 to 3 | 1.8 to 2.8 | 2.0 | 2.2 | 2.4 |
| 5923 | 57% | 38% | 5% | 0.8 to 3 | 1.8 to 2.8 | 2.0 | 2.2 | 2.4 |
| 5924 | 58% | 37% | 5% | 0.8 to 3 | 1.8 to 2.8 | 2.0 | 2.2 | 2.4 |
| 5925 | 59% | 36% | 5% | 0.8 to 3 | 1.8 to 2.8 | 2.0 | 2.2 | 2.4 |
| 5926 | 60% | 35% | 5% | 0.8 to 3 | 1.8 to 2.8 | 2.0 | 2.2 | 2.4 |
| 5927 | 30% | 64.5% | 5.5% | 0.8 to 3 | 1.8 to 2.8 | 2.0 | 2.2 | 2.4 |
| 5928 | 31% | 63.5% | 5.5% | 0.8 to 3 | 1.8 to 2.8 | 2.0 | 2.2 | 2.4 |
| 5929 | 32% | 62.5% | 5.5% | 0.8 to 3 | 1.8 to 2.8 | 2.0 | 2.2 | 2.4 |
| 5930 | 33% | 61.5% | 5.5% | 0.8 to 3 | 1.8 to 2.8 | 2.0 | 2.2 | 2.4 |
| 5931 | 34% | 60.5% | 5.5% | 0.8 to 3 | 1.8 to 2.8 | 2.0 | 2.2 | 2.4 |
| 5932 | 35% | 59.5% | 5.5% | 0.8 to 3 | 1.8 to 2.8 | 2.0 | 2.2 | 2.4 |
| 5933 | 36% | 58.5% | 5.5% | 0.8 to 3 | 1.8 to 2.8 | 2.0 | 2.2 | 2.4 |
| 5934 | 37% | 57.5% | 5.5% | 0.8 to 3 | 1.8 to 2.8 | 2.0 | 2.2 | 2.4 |
| 5935 | 38% | 56.5% | 5.5% | 0.8 to 3 | 1.8 to 2.8 | 2.0 | 2.2 | 2.4 |
| 5936 | 39% | 55.5% | 5.5% | 0.8 to 3 | 1.8 to 2.8 | 2.0 | 2.2 | 2.4 |
| 5937 | 40% | 54.5% | 5.5% | 0.8 to 3 | 1.8 to 2.8 | 2.0 | 2.2 | 2.4 |
| 5938 | 41% | 53.5% | 5.5% | 0.8 to 3 | 1.8 to 2.8 | 2.0 | 2.2 | 2.4 |
| 5939 | 42% | 52.5% | 5.5% | 0.8 to 3 | 1.8 to 2.8 | 2.0 | 2.2 | 2.4 |
| 5940 | 43% | 51.5% | 5.5% | 0.8 to 3 | 1.8 to 2.8 | 2.0 | 2.2 | 2.4 |
| 5941 | 44% | 50.5% | 5.5% | 0.8 to 3 | 1.8 to 2.8 | 2.0 | 2.2 | 2.4 |
| 5942 | 45% | 49.5% | 5.5% | 0.8 to 3 | 1.8 to 2.8 | 2.0 | 2.2 | 2.4 |
| 5943 | 46% | 48.5% | 5.5% | 0.8 to 3 | 1.8 to 2.8 | 2.0 | 2.2 | 2.4 |
| 5944 | 47% | 47.5% | 5.5% | 0.8 to 3 | 1.8 to 2.8 | 2.0 | 2.2 | 2.4 |
| 5945 | 48% | 46.5% | 5.5% | 0.8 to 3 | 1.8 to 2.8 | 2.0 | 2.2 | 2.4 |
| 5946 | 49% | 45.5% | 5.5% | 0.8 to 3 | 1.8 to 2.8 | 2.0 | 2.2 | 2.4 |
| 5947 | 50% | 44.5% | 5.5% | 0.8 to 3 | 1.8 to 2.8 | 2.0 | 2.2 | 2.4 |
| 5948 | 51% | 43.5% | 5.5% | 0.8 to 3 | 1.8 to 2.8 | 2.0 | 2.2 | 2.4 |
| 5949 | 52% | 42.5% | 5.5% | 0.8 to 3 | 1.8 to 2.8 | 2.0 | 2.2 | 2.4 |
| 5950 | 53% | 41.5% | 5.5% | 0.8 to 3 | 1.8 to 2.8 | 2.0 | 2.2 | 2.4 |
| 5951 | 54% | 40.5% | 5.5% | 0.8 to 3 | 1.8 to 2.8 | 2.0 | 2.2 | 2.4 |
| 5952 | 55% | 39.5% | 5.5% | 0.8 to 3 | 1.8 to 2.8 | 2.0 | 2.2 | 2.4 |
| 5953 | 56% | 38.5% | 5.5% | 0.8 to 3 | 1.8 to 2.8 | 2.0 | 2.2 | 2.4 |
| 5954 | 57% | 37.5% | 5.5% | 0.8 to 3 | 1.8 to 2.8 | 2.0 | 2.2 | 2.4 |
| 5955 | 58% | 36.5% | 5.5% | 0.8 to 3 | 1.8 to 2.8 | 2.0 | 2.2 | 2.4 |
| 5956 | 59% | 35.5% | 5.5% | 0.8 to 3 | 1.8 to 2.8 | 2.0 | 2.2 | 2.4 |
| 5957 | 60% | 34.5% | 5.5% | 0.8 to 3 | 1.8 to 2.8 | 2.0 | 2.2 | 2.4 |
| 5958 | 30% | 64% | 6% | 0.8 to 3 | 1.8 to 2.8 | 2.0 | 2.2 | 2.4 |
| 5959 | 31% | 63% | 6% | 0.8 to 3 | 1.8 to 2.8 | 2.0 | 2.2 | 2.4 |
| 5960 | 32% | 62% | 6% | 0.8 to 3 | 1.8 to 2.8 | 2.0 | 2.2 | 2.4 |
| 5961 | 33% | 61% | 6% | 0.8 to 3 | 1.8 to 2.8 | 2.0 | 2.2 | 2.4 |
| 5962 | 34% | 60% | 6% | 0.8 to 3 | 1.8 to 2.8 | 2.0 | 2.2 | 2.4 |
| 5963 | 35% | 59% | 6% | 0.8 to 3 | 1.8 to 2.8 | 2.0 | 2.2 | 2.4 |
| 5964 | 36% | 58% | 6% | 0.8 to 3 | 1.8 to 2.8 | 2.0 | 2.2 | 2.4 |
| 5965 | 37% | 57% | 6% | 0.8 to 3 | 1.8 to 2.8 | 2.0 | 2.2 | 2.4 |
| 5966 | 38% | 56% | 6% | 0.8 to 3 | 1.8 to 2.8 | 2.0 | 2.2 | 2.4 |
| 5967 | 39% | 55% | 6% | 0.8 to 3 | 1.8 to 2.8 | 2.0 | 2.2 | 2.4 |
| 5968 | 40% | 54% | 6% | 0.8 to 3 | 1.8 to 2.8 | 2.0 | 2.2 | 2.4 |
| 5969 | 41% | 53% | 6% | 0.8 to 3 | 1.8 to 2.8 | 2.0 | 2.2 | 2.4 |
| 5970 | 42% | 52% | 6% | 0.8 to 3 | 1.8 to 2.8 | 2.0 | 2.2 | 2.4 |
| 5971 | 43% | 51% | 6% | 0.8 to 3 | 1.8 to 2.8 | 2.0 | 2.2 | 2.4 |
| 5972 | 44% | 50% | 6% | 0.8 to 3 | 1.8 to 2.8 | 2.0 | 2.2 | 2.4 |
| 5973 | 45% | 49% | 6% | 0.8 to 3 | 1.8 to 2.8 | 2.0 | 2.2 | 2.4 |
| 5974 | 46% | 48% | 6% | 0.8 to 3 | 1.8 to 2.8 | 2.0 | 2.2 | 2.4 |
| 5975 | 47% | 47% | 6% | 0.8 to 3 | 1.8 to 2.8 | 2.0 | 2.2 | 2.4 |
| 5976 | 48% | 46% | 6% | 0.8 to 3 | 1.8 to 2.8 | 2.0 | 2.2 | 2.4 |
| 5977 | 49% | 45% | 6% | 0.8 to 3 | 1.8 to 2.8 | 2.0 | 2.2 | 2.4 |
| 5978 | 50% | 44% | 6% | 0.8 to 3 | 1.8 to 2.8 | 2.0 | 2.2 | 2.4 |
| 5979 | 51% | 43% | 6% | 0.8 to 3 | 1.8 to 2.8 | 2.0 | 2.2 | 2.4 |
| 5980 | 52% | 42% | 6% | 0.8 to 3 | 1.8 to 2.8 | 2.0 | 2.2 | 2.4 |
| 5981 | 53% | 41% | 6% | 0.8 to 3 | 1.8 to 2.8 | 2.0 | 2.2 | 2.4 |
| 5982 | 54% | 40% | 6% | 0.8 to 3 | 1.8 to 2.8 | 2.0 | 2.2 | 2.4 |
| 5983 | 55% | 39% | 6% | 0.8 to 3 | 1.8 to 2.8 | 2.0 | 2.2 | 2.4 |
| 5984 | 56% | 38% | 6% | 0.8 to 3 | 1.8 to 2.8 | 2.0 | 2.2 | 2.4 |
| 5985 | 57% | 37% | 6% | 0.8 to 3 | 1.8 to 2.8 | 2.0 | 2.2 | 2.4 |
| 5986 | 58% | 36% | 6% | 0.8 to 3 | 1.8 to 2.8 | 2.0 | 2.2 | 2.4 |
| 5987 | 59% | 35% | 6% | 0.8 to 3 | 1.8 to 2.8 | 2.0 | 2.2 | 2.4 |
| 5988 | 60% | 34% | 6% | 0.8 to 3 | 1.8 to 2.8 | 2.0 | 2.2 | 2.4 |
| 5989 | 30% | 63.5% | 6.5% | 0.8 to 3 | 1.8 to 2.8 | 2.0 | 2.2 | 2.4 |
| 5990 | 31% | 62.5% | 6.5% | 0.8 to 3 | 1.8 to 2.8 | 2.0 | 2.2 | 2.4 |
| 5991 | 32% | 61.5% | 6.5% | 0.8 to 3 | 1.8 to 2.8 | 2.0 | 2.2 | 2.4 |
| 5992 | 33% | 60.5% | 6.5% | 0.8 to 3 | 1.8 to 2.8 | 2.0 | 2.2 | 2.4 |
| 5993 | 34% | 59.5% | 6.5% | 0.8 to 3 | 1.8 to 2.8 | 2.0 | 2.2 | 2.4 |
| 5994 | 35% | 58.5% | 6.5% | 0.8 to 3 | 1.8 to 2.8 | 2.0 | 2.2 | 2.4 |
| 5995 | 36% | 57.5% | 6.5% | 0.8 to 3 | 1.8 to 2.8 | 2.0 | 2.2 | 2.4 |
| 5996 | 37% | 56.5% | 6.5% | 0.8 to 3 | 1.8 to 2.8 | 2.0 | 2.2 | 2.4 |
| 5997 | 38% | 55.5% | 6.5% | 0.8 to 3 | 1.8 to 2.8 | 2.0 | 2.2 | 2.4 |
| 5998 | 39% | 54.5% | 6.5% | 0.8 to 3 | 1.8 to 2.8 | 2.0 | 2.2 | 2.4 |
| 5999 | 40% | 53.5% | 6.5% | 0.8 to 3 | 1.8 to 2.8 | 2.0 | 2.2 | 2.4 |
| 6000 | 41% | 52.5% | 6.5% | 0.8 to 3 | 1.8 to 2.8 | 2.0 | 2.2 | 2.4 |
| 6001 | 42% | 51.5% | 6.5% | 0.8 to 3 | 1.8 to 2.8 | 2.0 | 2.2 | 2.4 |
| 6002 | 43% | 50.5% | 6.5% | 0.8 to 3 | 1.8 to 2.8 | 2.0 | 2.2 | 2.4 |
| 6003 | 44% | 49.5% | 6.5% | 0.8 to 3 | 1.8 to 2.8 | 2.0 | 2.2 | 2.4 |
| 6004 | 45% | 48.5% | 6.5% | 0.8 to 3 | 1.8 to 2.8 | 2.0 | 2.2 | 2.4 |
| 6005 | 46% | 47.5% | 6.5% | 0.8 to 3 | 1.8 to 2.8 | 2.0 | 2.2 | 2.4 |
| 6006 | 47% | 46.5% | 6.5% | 0.8 to 3 | 1.8 to 2.8 | 2.0 | 2.2 | 2.4 |
| 6007 | 48% | 45.5% | 6.5% | 0.8 to 3 | 1.8 to 2.8 | 2.0 | 2.2 | 2.4 |
| 6008 | 49% | 44.5% | 6.5% | 0.8 to 3 | 1.8 to 2.8 | 2.0 | 2.2 | 2.4 |
| 6009 | 50% | 43.5% | 6.5% | 0.8 to 3 | 1.8 to 2.8 | 2.0 | 2.2 | 2.4 |
| 6010 | 51% | 42.5% | 6.5% | 0.8 to 3 | 1.8 to 2.8 | 2.0 | 2.2 | 2.4 |
| 6011 | 52% | 41.5% | 6.5% | 0.8 to 3 | 1.8 to 2.8 | 2.0 | 2.2 | 2.4 |
| 6012 | 53% | 40.5% | 6.5% | 0.8 to 3 | 1.8 to 2.8 | 2.0 | 2.2 | 2.4 |

TABLE 13-continued

| | Alkyl Sulfate | | Alkyl Ether Sulfate | | | | | |
|---|---|---|---|---|---|---|---|---|
| | Alkyl Chain Length, Wt. Percentage | | Alkyl Chain Length, Wt. % | Average mol. EO (Alternatives for each numbered species) | | | | |
| Species | 8 to 10 | 9 to 11 | 9 to 11 | Range A | Range B | Species C | Species D | Species E |
| 6013 | 54% | 39.5% | 6.5% | 0.8 to 3 | 1.8 to 2.8 | 2.0 | 2.2 | 2.4 |
| 6014 | 55% | 38.5% | 6.5% | 0.8 to 3 | 1.8 to 2.8 | 2.0 | 2.2 | 2.4 |
| 6015 | 56% | 37.5% | 6.5% | 0.8 to 3 | 1.8 to 2.8 | 2.0 | 2.2 | 2.4 |
| 6016 | 57% | 36.5% | 6.5% | 0.8 to 3 | 1.8 to 2.8 | 2.0 | 2.2 | 2.4 |
| 6017 | 58% | 35.5% | 6.5% | 0.8 to 3 | 1.8 to 2.8 | 2.0 | 2.2 | 2.4 |
| 6018 | 59% | 34.5% | 6.5% | 0.8 to 3 | 1.8 to 2.8 | 2.0 | 2.2 | 2.4 |
| 6019 | 60% | 33.5% | 6.5% | 0.8 to 3 | 1.8 to 2.8 | 2.0 | 2.2 | 2.4 |
| 6020 | 30% | 63% | 7% | 0.8 to 3 | 1.8 to 2.8 | 2.0 | 2.2 | 2.4 |
| 6021 | 31% | 62% | 7% | 0.8 to 3 | 1.8 to 2.8 | 2.0 | 2.2 | 2.4 |
| 6022 | 32% | 61% | 7% | 0.8 to 3 | 1.8 to 2.8 | 2.0 | 2.2 | 2.4 |
| 6023 | 33% | 60% | 7% | 0.8 to 3 | 1.8 to 2.8 | 2.0 | 2.2 | 2.4 |
| 6024 | 34% | 59% | 7% | 0.8 to 3 | 1.8 to 2.8 | 2.0 | 2.2 | 2.4 |
| 6025 | 35% | 58% | 7% | 0.8 to 3 | 1.8 to 2.8 | 2.0 | 2.2 | 2.4 |
| 6026 | 36% | 57% | 7% | 0.8 to 3 | 1.8 to 2.8 | 2.0 | 2.2 | 2.4 |
| 6027 | 37% | 56% | 7% | 0.8 to 3 | 1.8 to 2.8 | 2.0 | 2.2 | 2.4 |
| 6028 | 38% | 55% | 7% | 0.8 to 3 | 1.8 to 2.8 | 2.0 | 2.2 | 2.4 |
| 6029 | 39% | 54% | 7% | 0.8 to 3 | 1.8 to 2.8 | 2.0 | 2.2 | 2.4 |
| 6030 | 40% | 53% | 7% | 0.8 to 3 | 1.8 to 2.8 | 2.0 | 2.2 | 2.4 |
| 6031 | 41% | 52% | 7% | 0.8 to 3 | 1.8 to 2.8 | 2.0 | 2.2 | 2.4 |
| 6032 | 42% | 51% | 7% | 0.8 to 3 | 1.8 to 2.8 | 2.0 | 2.2 | 2.4 |
| 6033 | 43% | 50% | 7% | 0.8 to 3 | 1.8 to 2.8 | 2.0 | 2.2 | 2.4 |
| 6034 | 44% | 49% | 7% | 0.8 to 3 | 1.8 to 2.8 | 2.0 | 2.2 | 2.4 |
| 6035 | 45% | 48% | 7% | 0.8 to 3 | 1.8 to 2.8 | 2.0 | 2.2 | 2.4 |
| 6036 | 46% | 47% | 7% | 0.8 to 3 | 1.8 to 2.8 | 2.0 | 2.2 | 2.4 |
| 6037 | 47% | 46% | 7% | 0.8 to 3 | 1.8 to 2.8 | 2.0 | 2.2 | 2.4 |
| 6038 | 48% | 45% | 7% | 0.8 to 3 | 1.8 to 2.8 | 2.0 | 2.2 | 2.4 |
| 6039 | 49% | 44% | 7% | 0.8 to 3 | 1.8 to 2.8 | 2.0 | 2.2 | 2.4 |
| 6040 | 50% | 43% | 7% | 0.8 to 3 | 1.8 to 2.8 | 2.0 | 2.2 | 2.4 |
| 6041 | 51% | 42% | 7% | 0.8 to 3 | 1.8 to 2.8 | 2.0 | 2.2 | 2.4 |
| 6042 | 52% | 41% | 7% | 0.8 to 3 | 1.8 to 2.8 | 2.0 | 2.2 | 2.4 |
| 6043 | 53% | 40% | 7% | 0.8 to 3 | 1.8 to 2.8 | 2.0 | 2.2 | 2.4 |
| 6044 | 54% | 39% | 7% | 0.8 to 3 | 1.8 to 2.8 | 2.0 | 2.2 | 2.4 |
| 6045 | 55% | 38% | 7% | 0.8 to 3 | 1.8 to 2.8 | 2.0 | 2.2 | 2.4 |
| 6046 | 56% | 37% | 7% | 0.8 to 3 | 1.8 to 2.8 | 2.0 | 2.2 | 2.4 |
| 6047 | 57% | 36% | 7% | 0.8 to 3 | 1.8 to 2.8 | 2.0 | 2.2 | 2.4 |
| 6048 | 58% | 35% | 7% | 0.8 to 3 | 1.8 to 2.8 | 2.0 | 2.2 | 2.4 |
| 6049 | 59% | 34% | 7% | 0.8 to 3 | 1.8 to 2.8 | 2.0 | 2.2 | 2.4 |
| 6050 | 60% | 33% | 7% | 0.8 to 3 | 1.8 to 2.8 | 2.0 | 2.2 | 2.4 |

TABLE 14

| | Alkyl Sulfate Alkyl Chain Length, Wt. % | Alkyl Ether Sulfate | | | | | | |
|---|---|---|---|---|---|---|---|---|
| | | Alkyl Chain Length, Wt. % | Average mol. EO (Alternatives for each numbered species) | | | | | |
| Species | 9 to 11 | 10 to 12 | 9 to 11 | Range A | Range B | Species C | Species D | Species E |
| 6051 | 30% | 70% | 0% | 0.8 to 3 | 1.8 to 2.8 | 2.0 | 2.2 | 2.4 |
| 6052 | 31% | 69% | 0% | 0.8 to 3 | 1.8 to 2.8 | 2.0 | 2.2 | 2.4 |
| 6053 | 32% | 68% | 0% | 0.8 to 3 | 1.8 to 2.8 | 2.0 | 2.2 | 2.4 |
| 6054 | 33% | 67% | 0% | 0.8 to 3 | 1.8 to 2.8 | 2.0 | 2.2 | 2.4 |
| 6055 | 34% | 66% | 0% | 0.8 to 3 | 1.8 to 2.8 | 2.0 | 2.2 | 2.4 |
| 6056 | 35% | 65% | 0% | 0.8 to 3 | 1.8 to 2.8 | 2.0 | 2.2 | 2.4 |
| 6057 | 36% | 64% | 0% | 0.8 to 3 | 1.8 to 2.8 | 2.0 | 2.2 | 2.4 |
| 6058 | 37% | 63% | 0% | 0.8 to 3 | 1.8 to 2.8 | 2.0 | 2.2 | 2.4 |
| 6059 | 38% | 62% | 0% | 0.8 to 3 | 1.8 to 2.8 | 2.0 | 2.2 | 2.4 |
| 6060 | 39% | 61% | 0% | 0.8 to 3 | 1.8 to 2.8 | 2.0 | 2.2 | 2.4 |
| 6061 | 40% | 60% | 0% | 0.8 to 3 | 1.8 to 2.8 | 2.0 | 2.2 | 2.4 |
| 6062 | 41% | 59% | 0% | 0.8 to 3 | 1.8 to 2.8 | 2.0 | 2.2 | 2.4 |
| 6063 | 42% | 58% | 0% | 0.8 to 3 | 1.8 to 2.8 | 2.0 | 2.2 | 2.4 |
| 6064 | 43% | 57% | 0% | 0.8 to 3 | 1.8 to 2.8 | 2.0 | 2.2 | 2.4 |
| 6065 | 44% | 56% | 0% | 0.8 to 3 | 1.8 to 2.8 | 2.0 | 2.2 | 2.4 |
| 6066 | 45% | 55% | 0% | 0.8 to 3 | 1.8 to 2.8 | 2.0 | 2.2 | 2.4 |
| 6067 | 46% | 54% | 0% | 0.8 to 3 | 1.8 to 2.8 | 2.0 | 2.2 | 2.4 |
| 6068 | 47% | 53% | 0% | 0.8 to 3 | 1.8 to 2.8 | 2.0 | 2.2 | 2.4 |
| 6069 | 48% | 52% | 0% | 0.8 to 3 | 1.8 to 2.8 | 2.0 | 2.2 | 2.4 |
| 6070 | 49% | 51% | 0% | 0.8 to 3 | 1.8 to 2.8 | 2.0 | 2.2 | 2.4 |
| 6071 | 50% | 50% | 0% | 0.8 to 3 | 1.8 to 2.8 | 2.0 | 2.2 | 2.4 |
| 6072 | 51% | 49% | 0% | 0.8 to 3 | 1.8 to 2.8 | 2.0 | 2.2 | 2.4 |
| 6073 | 52% | 48% | 0% | 0.8 to 3 | 1.8 to 2.8 | 2.0 | 2.2 | 2.4 |
| 6074 | 53% | 47% | 0% | 0.8 to 3 | 1.8 to 2.8 | 2.0 | 2.2 | 2.4 |
| 6075 | 54% | 46% | 0% | 0.8 to 3 | 1.8 to 2.8 | 2.0 | 2.2 | 2.4 |
| 6076 | 55% | 45% | 0% | 0.8 to 3 | 1.8 to 2.8 | 2.0 | 2.2 | 2.4 |
| 6077 | 56% | 44% | 0% | 0.8 to 3 | 1.8 to 2.8 | 2.0 | 2.2 | 2.4 |
| 6078 | 57% | 43% | 0% | 0.8 to 3 | 1.8 to 2.8 | 2.0 | 2.2 | 2.4 |
| 6079 | 58% | 42% | 0% | 0.8 to 3 | 1.8 to 2.8 | 2.0 | 2.2 | 2.4 |
| 6080 | 59% | 41% | 0% | 0.8 to 3 | 1.8 to 2.8 | 2.0 | 2.2 | 2.4 |
| 6081 | 60% | 40% | 0% | 0.8 to 3 | 1.8 to 2.8 | 2.0 | 2.2 | 2.4 |
| 6082 | 30% | 69.5% | 0.5% | 0.8 to 3 | 1.8 to 2.8 | 2.0 | 2.2 | 2.4 |
| 6083 | 31% | 68.5% | 0.5% | 0.8 to 3 | 1.8 to 2.8 | 2.0 | 2.2 | 2.4 |
| 6084 | 32% | 67.5% | 0.5% | 0.8 to 3 | 1.8 to 2.8 | 2.0 | 2.2 | 2.4 |

TABLE 14-continued

| | Alkyl Sulfate Alkyl Chain Length, Wt. % | | Alkyl Ether Sulfate | | | | | |
|---|---|---|---|---|---|---|---|---|
| | | | Alkyl Chain Length, Wt. % | Average mol. EO (Alternatives for each numbered species) | | | | |
| Species | 9 to 11 | 10 to 12 | 9 to 11 | Range A | Range B | Species C | Species D | Species E |
| 6085 | 33% | 66.5% | 0.5% | 0.8 to 3 | 1.8 to 2.8 | 2.0 | 2.2 | 2.4 |
| 6086 | 34% | 65.5% | 0.5% | 0.8 to 3 | 1.8 to 2.8 | 2.0 | 2.2 | 2.4 |
| 6087 | 35% | 64.5% | 0.5% | 0.8 to 3 | 1.8 to 2.8 | 2.0 | 2.2 | 2.4 |
| 6088 | 36% | 63.5% | 0.5% | 0.8 to 3 | 1.8 to 2.8 | 2.0 | 2.2 | 2.4 |
| 6089 | 37% | 62.5% | 0.5% | 0.8 to 3 | 1.8 to 2.8 | 2.0 | 2.2 | 2.4 |
| 6090 | 38% | 61.5% | 0.5% | 0.8 to 3 | 1.8 to 2.8 | 2.0 | 2.2 | 2.4 |
| 6091 | 39% | 60.5% | 0.5% | 0.8 to 3 | 1.8 to 2.8 | 2.0 | 2.2 | 2.4 |
| 6092 | 40% | 59.5% | 0.5% | 0.8 to 3 | 1.8 to 2.8 | 2.0 | 2.2 | 2.4 |
| 6093 | 41% | 58.5% | 0.5% | 0.8 to 3 | 1.8 to 2.8 | 2.0 | 2.2 | 2.4 |
| 6094 | 42% | 57.5% | 0.5% | 0.8 to 3 | 1.8 to 2.8 | 2.0 | 2.2 | 2.4 |
| 6095 | 43% | 56.5% | 0.5% | 0.8 to 3 | 1.8 to 2.8 | 2.0 | 2.2 | 2.4 |
| 6096 | 44% | 55.5% | 0.5% | 0.8 to 3 | 1.8 to 2.8 | 2.0 | 2.2 | 2.4 |
| 6097 | 45% | 54.5% | 0.5% | 0.8 to 3 | 1.8 to 2.8 | 2.0 | 2.2 | 2.4 |
| 6098 | 46% | 53.5% | 0.5% | 0.8 to 3 | 1.8 to 2.8 | 2.0 | 2.2 | 2.4 |
| 6099 | 47% | 52.5% | 0.5% | 0.8 to 3 | 1.8 to 2.8 | 2.0 | 2.2 | 2.4 |
| 6100 | 48% | 51.5% | 0.5% | 0.8 to 3 | 1.8 to 2.8 | 2.0 | 2.2 | 2.4 |
| 6101 | 49% | 50.5% | 0.5% | 0.8 to 3 | 1.8 to 2.8 | 2.0 | 2.2 | 2.4 |
| 6102 | 50% | 49.5% | 0.5% | 0.8 to 3 | 1.8 to 2.8 | 2.0 | 2.2 | 2.4 |
| 6103 | 51% | 48.5% | 0.5% | 0.8 to 3 | 1.8 to 2.8 | 2.0 | 2.2 | 2.4 |
| 6104 | 52% | 47.5% | 0.5% | 0.8 to 3 | 1.8 to 2.8 | 2.0 | 2.2 | 2.4 |
| 6105 | 53% | 46.5% | 0.5% | 0.8 to 3 | 1.8 to 2.8 | 2.0 | 2.2 | 2.4 |
| 6106 | 54% | 45.5% | 0.5% | 0.8 to 3 | 1.8 to 2.8 | 2.0 | 2.2 | 2.4 |
| 6107 | 55% | 44.5% | 0.5% | 0.8 to 3 | 1.8 to 2.8 | 2.0 | 2.2 | 2.4 |
| 6108 | 56% | 43.5% | 0.5% | 0.8 to 3 | 1.8 to 2.8 | 2.0 | 2.2 | 2.4 |
| 6109 | 57% | 42.5% | 0.5% | 0.8 to 3 | 1.8 to 2.8 | 2.0 | 2.2 | 2.4 |
| 6110 | 58% | 41.5% | 0.5% | 0.8 to 3 | 1.8 to 2.8 | 2.0 | 2.2 | 2.4 |
| 6111 | 59% | 40.5% | 0.5% | 0.8 to 3 | 1.8 to 2.8 | 2.0 | 2.2 | 2.4 |
| 6112 | 60% | 39.5% | 0.5% | 0.8 to 3 | 1.8 to 2.8 | 2.0 | 2.2 | 2.4 |
| 6113 | 30% | 69% | 1% | 0.8 to 3 | 1.8 to 2.8 | 2.0 | 2.2 | 2.4 |
| 6114 | 31% | 68% | 1% | 0.8 to 3 | 1.8 to 2.8 | 2.0 | 2.2 | 2.4 |
| 6115 | 32% | 67% | 1% | 0.8 to 3 | 1.8 to 2.8 | 2.0 | 2.2 | 2.4 |
| 6116 | 33% | 66% | 1% | 0.8 to 3 | 1.8 to 2.8 | 2.0 | 2.2 | 2.4 |
| 6117 | 34% | 65% | 1% | 0.8 to 3 | 1.8 to 2.8 | 2.0 | 2.2 | 2.4 |
| 6118 | 35% | 64% | 1% | 0.8 to 3 | 1.8 to 2.8 | 2.0 | 2.2 | 2.4 |
| 6119 | 36% | 63% | 1% | 0.8 to 3 | 1.8 to 2.8 | 2.0 | 2.2 | 2.4 |
| 6120 | 37% | 62% | 1% | 0.8 to 3 | 1.8 to 2.8 | 2.0 | 2.2 | 2.4 |
| 6121 | 38% | 61% | 1% | 0.8 to 3 | 1.8 to 2.8 | 2.0 | 2.2 | 2.4 |
| 6122 | 39% | 60% | 1% | 0.8 to 3 | 1.8 to 2.8 | 2.0 | 2.2 | 2.4 |
| 6123 | 40% | 59% | 1% | 0.8 to 3 | 1.8 to 2.8 | 2.0 | 2.2 | 2.4 |
| 6124 | 41% | 58% | 1% | 0.8 to 3 | 1.8 to 2.8 | 2.0 | 2.2 | 2.4 |
| 6125 | 42% | 57% | 1% | 0.8 to 3 | 1.8 to 2.8 | 2.0 | 2.2 | 2.4 |
| 6126 | 43% | 56% | 1% | 0.8 to 3 | 1.8 to 2.8 | 2.0 | 2.2 | 2.4 |
| 6127 | 44% | 55% | 1% | 0.8 to 3 | 1.8 to 2.8 | 2.0 | 2.2 | 2.4 |
| 6128 | 45% | 54% | 1% | 0.8 to 3 | 1.8 to 2.8 | 2.0 | 2.2 | 2.4 |
| 6129 | 46% | 53% | 1% | 0.8 to 3 | 1.8 to 2.8 | 2.0 | 2.2 | 2.4 |
| 6130 | 47% | 52% | 1% | 0.8 to 3 | 1.8 to 2.8 | 2.0 | 2.2 | 2.4 |
| 6131 | 48% | 51% | 1% | 0.8 to 3 | 1.8 to 2.8 | 2.0 | 2.2 | 2.4 |
| 6132 | 49% | 50% | 1% | 0.8 to 3 | 1.8 to 2.8 | 2.0 | 2.2 | 2.4 |
| 6133 | 50% | 49% | 1% | 0.8 to 3 | 1.8 to 2.8 | 2.0 | 2.2 | 2.4 |
| 6134 | 51% | 48% | 1% | 0.8 to 3 | 1.8 to 2.8 | 2.0 | 2.2 | 2.4 |
| 6135 | 52% | 47% | 1% | 0.8 to 3 | 1.8 to 2.8 | 2.0 | 2.2 | 2.4 |
| 6136 | 53% | 46% | 1% | 0.8 to 3 | 1.8 to 2.8 | 2.0 | 2.2 | 2.4 |
| 6137 | 54% | 45% | 1% | 0.8 to 3 | 1.8 to 2.8 | 2.0 | 2.2 | 2.4 |
| 6138 | 55% | 44% | 1% | 0.8 to 3 | 1.8 to 2.8 | 2.0 | 2.2 | 2.4 |
| 6139 | 56% | 43% | 1% | 0.8 to 3 | 1.8 to 2.8 | 2.0 | 2.2 | 2.4 |
| 6140 | 57% | 42% | 1% | 0.8 to 3 | 1.8 to 2.8 | 2.0 | 2.2 | 2.4 |
| 6141 | 58% | 41% | 1% | 0.8 to 3 | 1.8 to 2.8 | 2.0 | 2.2 | 2.4 |
| 6142 | 59% | 40% | 1% | 0.8 to 3 | 1.8 to 2.8 | 2.0 | 2.2 | 2.4 |
| 6143 | 60% | 39% | 1% | 0.8 to 3 | 1.8 to 2.8 | 2.0 | 2.2 | 2.4 |
| 6144 | 30% | 68.5% | 1.5% | 0.8 to 3 | 1.8 to 2.8 | 2.0 | 2.2 | 2.4 |
| 6145 | 31% | 67.5% | 1.5% | 0.8 to 3 | 1.8 to 2.8 | 2.0 | 2.2 | 2.4 |
| 6146 | 32% | 66.5% | 1.5% | 0.8 to 3 | 1.8 to 2.8 | 2.0 | 2.2 | 2.4 |
| 6147 | 33% | 65.5% | 1.5% | 0.8 to 3 | 1.8 to 2.8 | 2.0 | 2.2 | 2.4 |
| 6148 | 34% | 64.5% | 1.5% | 0.8 to 3 | 1.8 to 2.8 | 2.0 | 2.2 | 2.4 |
| 6149 | 35% | 63.5% | 1.5% | 0.8 to 3 | 1.8 to 2.8 | 2.0 | 2.2 | 2.4 |
| 6150 | 36% | 62.5% | 1.5% | 0.8 to 3 | 1.8 to 2.8 | 2.0 | 2.2 | 2.4 |
| 6151 | 37% | 61.5% | 1.5% | 0.8 to 3 | 1.8 to 2.8 | 2.0 | 2.2 | 2.4 |
| 6152 | 38% | 60.5% | 1.5% | 0.8 to 3 | 1.8 to 2.8 | 2.0 | 2.2 | 2.4 |
| 6153 | 39% | 59.5% | 1.5% | 0.8 to 3 | 1.8 to 2.8 | 2.0 | 2.2 | 2.4 |
| 6154 | 40% | 58.5% | 1.5% | 0.8 to 3 | 1.8 to 2.8 | 2.0 | 2.2 | 2.4 |
| 6155 | 41% | 57.5% | 1.5% | 0.8 to 3 | 1.8 to 2.8 | 2.0 | 2.2 | 2.4 |

TABLE 14-continued

| | | | Alkyl Ether Sulfate | | | | |
|---|---|---|---|---|---|---|---|
| | Alkyl Sulfate Alkyl Chain Length, Wt. % | Alkyl Chain Length, Wt. % | Average mol. EO (Alternatives for each numbered species) | | | | |
| Species | 9 to 11 | 10 to 12 | 9 to 11 | Range A | Range B | Species C | Species D | Species E |
|---|---|---|---|---|---|---|---|---|
| 6156 | 42% | 56.5% | 1.5% | 0.8 to 3 | 1.8 to 2.8 | 2.0 | 2.2 | 2.4 |
| 6157 | 43% | 55.5% | 1.5% | 0.8 to 3 | 1.8 to 2.8 | 2.0 | 2.2 | 2.4 |
| 6158 | 44% | 54.5% | 1.5% | 0.8 to 3 | 1.8 to 2.8 | 2.0 | 2.2 | 2.4 |
| 6159 | 45% | 53.5% | 1.5% | 0.8 to 3 | 1.8 to 2.8 | 2.0 | 2.2 | 2.4 |
| 6160 | 46% | 52.5% | 1.5% | 0.8 to 3 | 1.8 to 2.8 | 2.0 | 2.2 | 2.4 |
| 6161 | 47% | 51.5% | 1.5% | 0.8 to 3 | 1.8 to 2.8 | 2.0 | 2.2 | 2.4 |
| 6162 | 48% | 50.5% | 1.5% | 0.8 to 3 | 1.8 to 2.8 | 2.0 | 2.2 | 2.4 |
| 6163 | 49% | 49.5% | 1.5% | 0.8 to 3 | 1.8 to 2.8 | 2.0 | 2.2 | 2.4 |
| 6164 | 50% | 48.5% | 1.5% | 0.8 to 3 | 1.8 to 2.8 | 2.0 | 2.2 | 2.4 |
| 6165 | 51% | 47.5% | 1.5% | 0.8 to 3 | 1.8 to 2.8 | 2.0 | 2.2 | 2.4 |
| 6166 | 52% | 46.5% | 1.5% | 0.8 to 3 | 1.8 to 2.8 | 2.0 | 2.2 | 2.4 |
| 6167 | 53% | 45.5% | 1.5% | 0.8 to 3 | 1.8 to 2.8 | 2.0 | 2.2 | 2.4 |
| 6168 | 54% | 44.5% | 1.5% | 0.8 to 3 | 1.8 to 2.8 | 2.0 | 2.2 | 2.4 |
| 6169 | 55% | 43.5% | 1.5% | 0.8 to 3 | 1.8 to 2.8 | 2.0 | 2.2 | 2.4 |
| 6170 | 56% | 42.5% | 1.5% | 0.8 to 3 | 1.8 to 2.8 | 2.0 | 2.2 | 2.4 |
| 6171 | 57% | 41.5% | 1.5% | 0.8 to 3 | 1.8 to 2.8 | 2.0 | 2.2 | 2.4 |
| 6172 | 58% | 40.5% | 1.5% | 0.8 to 3 | 1.8 to 2.8 | 2.0 | 2.2 | 2.4 |
| 6173 | 59% | 39.5% | 1.5% | 0.8 to 3 | 1.8 to 2.8 | 2.0 | 2.2 | 2.4 |
| 6174 | 60% | 38.5% | 1.5% | 0.8 to 3 | 1.8 to 2.8 | 2.0 | 2.2 | 2.4 |
| 6175 | 30% | 68% | 2% | 0.8 to 3 | 1.8 to 2.8 | 2.0 | 2.2 | 2.4 |
| 6176 | 31% | 67% | 2% | 0.8 to 3 | 1.8 to 2.8 | 2.0 | 2.2 | 2.4 |
| 6177 | 32% | 66% | 2% | 0.8 to 3 | 1.8 to 2.8 | 2.0 | 2.2 | 2.4 |
| 6178 | 33% | 65% | 2% | 0.8 to 3 | 1.8 to 2.8 | 2.0 | 2.2 | 2.4 |
| 6179 | 34% | 64% | 2% | 0.8 to 3 | 1.8 to 2.8 | 2.0 | 2.2 | 2.4 |
| 6180 | 35% | 63% | 2% | 0.8 to 3 | 1.8 to 2.8 | 2.0 | 2.2 | 2.4 |
| 6181 | 36% | 62% | 2% | 0.8 to 3 | 1.8 to 2.8 | 2.0 | 2.2 | 2.4 |
| 6182 | 37% | 61% | 2% | 0.8 to 3 | 1.8 to 2.8 | 2.0 | 2.2 | 2.4 |
| 6183 | 38% | 60% | 2% | 0.8 to 3 | 1.8 to 2.8 | 2.0 | 2.2 | 2.4 |
| 6184 | 39% | 59% | 2% | 0.8 to 3 | 1.8 to 2.8 | 2.0 | 2.2 | 2.4 |
| 6185 | 40% | 58% | 2% | 0.8 to 3 | 1.8 to 2.8 | 2.0 | 2.2 | 2.4 |
| 6186 | 41% | 57% | 2% | 0.8 to 3 | 1.8 to 2.8 | 2.0 | 2.2 | 2.4 |
| 6187 | 42% | 56% | 2% | 0.8 to 3 | 1.8 to 2.8 | 2.0 | 2.2 | 2.4 |
| 6188 | 43% | 55% | 2% | 0.8 to 3 | 1.8 to 2.8 | 2.0 | 2.2 | 2.4 |
| 6189 | 44% | 54% | 2% | 0.8 to 3 | 1.8 to 2.8 | 2.0 | 2.2 | 2.4 |
| 6190 | 45% | 53% | 2% | 0.8 to 3 | 1.8 to 2.8 | 2.0 | 2.2 | 2.4 |
| 6191 | 46% | 52% | 2% | 0.8 to 3 | 1.8 to 2.8 | 2.0 | 2.2 | 2.4 |
| 6192 | 47% | 51% | 2% | 0.8 to 3 | 1.8 to 2.8 | 2.0 | 2.2 | 2.4 |
| 6193 | 48% | 50% | 2% | 0.8 to 3 | 1.8 to 2.8 | 2.0 | 2.2 | 2.4 |
| 6194 | 49% | 49% | 2% | 0.8 to 3 | 1.8 to 2.8 | 2.0 | 2.2 | 2.4 |
| 6195 | 50% | 48% | 2% | 0.8 to 3 | 1.8 to 2.8 | 2.0 | 2.2 | 2.4 |
| 6196 | 51% | 47% | 2% | 0.8 to 3 | 1.8 to 2.8 | 2.0 | 2.2 | 2.4 |
| 6197 | 52% | 46% | 2% | 0.8 to 3 | 1.8 to 2.8 | 2.0 | 2.2 | 2.4 |
| 6198 | 53% | 45% | 2% | 0.8 to 3 | 1.8 to 2.8 | 2.0 | 2.2 | 2.4 |
| 6199 | 54% | 44% | 2% | 0.8 to 3 | 1.8 to 2.8 | 2.0 | 2.2 | 2.4 |
| 6200 | 55% | 43% | 2% | 0.8 to 3 | 1.8 to 2.8 | 2.0 | 2.2 | 2.4 |
| 6201 | 56% | 42% | 2% | 0.8 to 3 | 1.8 to 2.8 | 2.0 | 2.2 | 2.4 |
| 6202 | 57% | 41% | 2% | 0.8 to 3 | 1.8 to 2.8 | 2.0 | 2.2 | 2.4 |
| 6203 | 58% | 40% | 2% | 0.8 to 3 | 1.8 to 2.8 | 2.0 | 2.2 | 2.4 |
| 6204 | 59% | 39% | 2% | 0.8 to 3 | 1.8 to 2.8 | 2.0 | 2.2 | 2.4 |
| 6205 | 60% | 38% | 2% | 0.8 to 3 | 1.8 to 2.8 | 2.0 | 2.2 | 2.4 |
| 6206 | 30% | 67.5% | 2.5% | 0.8 to 3 | 1.8 to 2.8 | 2.0 | 2.2 | 2.4 |
| 6207 | 31% | 66.5% | 2.5% | 0.8 to 3 | 1.8 to 2.8 | 2.0 | 2.2 | 2.4 |
| 6208 | 32% | 65.5% | 2.5% | 0.8 to 3 | 1.8 to 2.8 | 2.0 | 2.2 | 2.4 |
| 6209 | 33% | 64.5% | 2.5% | 0.8 to 3 | 1.8 to 2.8 | 2.0 | 2.2 | 2.4 |
| 6210 | 34% | 63.5% | 2.5% | 0.8 to 3 | 1.8 to 2.8 | 2.0 | 2.2 | 2.4 |
| 6211 | 35% | 62.5% | 2.5% | 0.8 to 3 | 1.8 to 2.8 | 2.0 | 2.2 | 2.4 |
| 6212 | 36% | 61.5% | 2.5% | 0.8 to 3 | 1.8 to 2.8 | 2.0 | 2.2 | 2.4 |
| 6213 | 37% | 60.5% | 2.5% | 0.8 to 3 | 1.8 to 2.8 | 2.0 | 2.2 | 2.4 |
| 6214 | 38% | 59.5% | 2.5% | 0.8 to 3 | 1.8 to 2.8 | 2.0 | 2.2 | 2.4 |
| 6215 | 39% | 58.5% | 2.5% | 0.8 to 3 | 1.8 to 2.8 | 2.0 | 2.2 | 2.4 |
| 6216 | 40% | 57.5% | 2.5% | 0.8 to 3 | 1.8 to 2.8 | 2.0 | 2.2 | 2.4 |
| 6217 | 41% | 56.5% | 2.5% | 0.8 to 3 | 1.8 to 2.8 | 2.0 | 2.2 | 2.4 |
| 6218 | 42% | 55.5% | 2.5% | 0.8 to 3 | 1.8 to 2.8 | 2.0 | 2.2 | 2.4 |
| 6219 | 43% | 54.5% | 2.5% | 0.8 to 3 | 1.8 to 2.8 | 2.0 | 2.2 | 2.4 |
| 6220 | 44% | 53.5% | 2.5% | 0.8 to 3 | 1.8 to 2.8 | 2.0 | 2.2 | 2.4 |
| 6221 | 45% | 52.5% | 2.5% | 0.8 to 3 | 1.8 to 2.8 | 2.0 | 2.2 | 2.4 |
| 6222 | 46% | 51.5% | 2.5% | 0.8 to 3 | 1.8 to 2.8 | 2.0 | 2.2 | 2.4 |
| 6223 | 47% | 50.5% | 2.5% | 0.8 to 3 | 1.8 to 2.8 | 2.0 | 2.2 | 2.4 |
| 6224 | 48% | 49.5% | 2.5% | 0.8 to 3 | 1.8 to 2.8 | 2.0 | 2.2 | 2.4 |
| 6225 | 49% | 48.5% | 2.5% | 0.8 to 3 | 1.8 to 2.8 | 2.0 | 2.2 | 2.4 |
| 6226 | 50% | 47.5% | 2.5% | 0.8 to 3 | 1.8 to 2.8 | 2.0 | 2.2 | 2.4 |

TABLE 14-continued

|  | Alkyl Sulfate Alkyl Chain Length, Wt. % | | Alkyl Ether Sulfate | | | | | |
|---|---|---|---|---|---|---|---|---|
|  | | | Alkyl Chain Length, Wt. % | Average mol. EO (Alternatives for each numbered species) | | | | |
| Species | 9 to 11 | 10 to 12 | 9 to 11 | Range A | Range B | Species C | Species D | Species E |
| 6227 | 51% | 46.5% | 2.5% | 0.8 to 3 | 1.8 to 2.8 | 2.0 | 2.2 | 2.4 |
| 6228 | 52% | 45.5% | 2.5% | 0.8 to 3 | 1.8 to 2.8 | 2.0 | 2.2 | 2.4 |
| 6229 | 53% | 44.5% | 2.5% | 0.8 to 3 | 1.8 to 2.8 | 2.0 | 2.2 | 2.4 |
| 6230 | 54% | 43.5% | 2.5% | 0.8 to 3 | 1.8 to 2.8 | 2.0 | 2.2 | 2.4 |
| 6231 | 55% | 42.5% | 2.5% | 0.8 to 3 | 1.8 to 2.8 | 2.0 | 2.2 | 2.4 |
| 6232 | 56% | 41.5% | 2.5% | 0.8 to 3 | 1.8 to 2.8 | 2.0 | 2.2 | 2.4 |
| 6233 | 57% | 40.5% | 2.5% | 0.8 to 3 | 1.8 to 2.8 | 2.0 | 2.2 | 2.4 |
| 6234 | 58% | 39.5% | 2.5% | 0.8 to 3 | 1.8 to 2.8 | 2.0 | 2.2 | 2.4 |
| 6235 | 59% | 38.5% | 2.5% | 0.8 to 3 | 1.8 to 2.8 | 2.0 | 2.2 | 2.4 |
| 6236 | 60% | 37.5% | 2.5% | 0.8 to 3 | 1.8 to 2.8 | 2.0 | 2.2 | 2.4 |
| 6237 | 30% | 67% | 3% | 0.8 to 3 | 1.8 to 2.8 | 2.0 | 2.2 | 2.4 |
| 6238 | 31% | 66% | 3% | 0.8 to 3 | 1.8 to 2.8 | 2.0 | 2.2 | 2.4 |
| 6239 | 32% | 65% | 3% | 0.8 to 3 | 1.8 to 2.8 | 2.0 | 2.2 | 2.4 |
| 6240 | 33% | 64% | 3% | 0.8 to 3 | 1.8 to 2.8 | 2.0 | 2.2 | 2.4 |
| 6241 | 34% | 63% | 3% | 0.8 to 3 | 1.8 to 2.8 | 2.0 | 2.2 | 2.4 |
| 6242 | 35% | 62% | 3% | 0.8 to 3 | 1.8 to 2.8 | 2.0 | 2.2 | 2.4 |
| 6243 | 36% | 61% | 3% | 0.8 to 3 | 1.8 to 2.8 | 2.0 | 2.2 | 2.4 |
| 6244 | 37% | 60% | 3% | 0.8 to 3 | 1.8 to 2.8 | 2.0 | 2.2 | 2.4 |
| 6245 | 38% | 59% | 3% | 0.8 to 3 | 1.8 to 2.8 | 2.0 | 2.2 | 2.4 |
| 6246 | 39% | 58% | 3% | 0.8 to 3 | 1.8 to 2.8 | 2.0 | 2.2 | 2.4 |
| 6247 | 40% | 57% | 3% | 0.8 to 3 | 1.8 to 2.8 | 2.0 | 2.2 | 2.4 |
| 6248 | 41% | 56% | 3% | 0.8 to 3 | 1.8 to 2.8 | 2.0 | 2.2 | 2.4 |
| 6249 | 42% | 55% | 3% | 0.8 to 3 | 1.8 to 2.8 | 2.0 | 2.2 | 2.4 |
| 6250 | 43% | 54% | 3% | 0.8 to 3 | 1.8 to 2.8 | 2.0 | 2.2 | 2.4 |
| 6251 | 44% | 53% | 3% | 0.8 to 3 | 1.8 to 2.8 | 2.0 | 2.2 | 2.4 |
| 6252 | 45% | 52% | 3% | 0.8 to 3 | 1.8 to 2.8 | 2.0 | 2.2 | 2.4 |
| 6253 | 46% | 51% | 3% | 0.8 to 3 | 1.8 to 2.8 | 2.0 | 2.2 | 2.4 |
| 6254 | 47% | 50% | 3% | 0.8 to 3 | 1.8 to 2.8 | 2.0 | 2.2 | 2.4 |
| 6255 | 48% | 49% | 3% | 0.8 to 3 | 1.8 to 2.8 | 2.0 | 2.2 | 2.4 |
| 6256 | 49% | 48% | 3% | 0.8 to 3 | 1.8 to 2.8 | 2.0 | 2.2 | 2.4 |
| 6257 | 50% | 47% | 3% | 0.8 to 3 | 1.8 to 2.8 | 2.0 | 2.2 | 2.4 |
| 6258 | 51% | 46% | 3% | 0.8 to 3 | 1.8 to 2.8 | 2.0 | 2.2 | 2.4 |
| 6259 | 52% | 45% | 3% | 0.8 to 3 | 1.8 to 2.8 | 2.0 | 2.2 | 2.4 |
| 6260 | 53% | 44% | 3% | 0.8 to 3 | 1.8 to 2.8 | 2.0 | 2.2 | 2.4 |
| 6261 | 54% | 43% | 3% | 0.8 to 3 | 1.8 to 2.8 | 2.0 | 2.2 | 2.4 |
| 6262 | 55% | 42% | 3% | 0.8 to 3 | 1.8 to 2.8 | 2.0 | 2.2 | 2.4 |
| 6263 | 56% | 41% | 3% | 0.8 to 3 | 1.8 to 2.8 | 2.0 | 2.2 | 2.4 |
| 6264 | 57% | 40% | 3% | 0.8 to 3 | 1.8 to 2.8 | 2.0 | 2.2 | 2.4 |
| 6265 | 58% | 39% | 3% | 0.8 to 3 | 1.8 to 2.8 | 2.0 | 2.2 | 2.4 |
| 6266 | 59% | 38% | 3% | 0.8 to 3 | 1.8 to 2.8 | 2.0 | 2.2 | 2.4 |
| 6267 | 60% | 37% | 3% | 0.8 to 3 | 1.8 to 2.8 | 2.0 | 2.2 | 2.4 |
| 6268 | 30% | 66.5% | 3.5% | 0.8 to 3 | 1.8 to 2.8 | 2.0 | 2.2 | 2.4 |
| 6269 | 31% | 65.5% | 3.5% | 0.8 to 3 | 1.8 to 2.8 | 2.0 | 2.2 | 2.4 |
| 6270 | 32% | 64.5% | 3.5% | 0.8 to 3 | 1.8 to 2.8 | 2.0 | 2.2 | 2.4 |
| 6271 | 33% | 63.5% | 3.5% | 0.8 to 3 | 1.8 to 2.8 | 2.0 | 2.2 | 2.4 |
| 6272 | 34% | 62.5% | 3.5% | 0.8 to 3 | 1.8 to 2.8 | 2.0 | 2.2 | 2.4 |
| 6273 | 35% | 61.5% | 3.5% | 0.8 to 3 | 1.8 to 2.8 | 2.0 | 2.2 | 2.4 |
| 6274 | 36% | 60.5% | 3.5% | 0.8 to 3 | 1.8 to 2.8 | 2.0 | 2.2 | 2.4 |
| 6275 | 37% | 59.5% | 3.5% | 0.8 to 3 | 1.8 to 2.8 | 2.0 | 2.2 | 2.4 |
| 6276 | 38% | 58.5% | 3.5% | 0.8 to 3 | 1.8 to 2.8 | 2.0 | 2.2 | 2.4 |
| 6277 | 39% | 57.5% | 3.5% | 0.8 to 3 | 1.8 to 2.8 | 2.0 | 2.2 | 2.4 |
| 6278 | 40% | 56.5% | 3.5% | 0.8 to 3 | 1.8 to 2.8 | 2.0 | 2.2 | 2.4 |
| 6279 | 41% | 55.5% | 3.5% | 0.8 to 3 | 1.8 to 2.8 | 2.0 | 2.2 | 2.4 |
| 6280 | 42% | 54.5% | 3.5% | 0.8 to 3 | 1.8 to 2.8 | 2.0 | 2.2 | 2.4 |
| 6281 | 43% | 53.5% | 3.5% | 0.8 to 3 | 1.8 to 2.8 | 2.0 | 2.2 | 2.4 |
| 6282 | 44% | 52.5% | 3.5% | 0.8 to 3 | 1.8 to 2.8 | 2.0 | 2.2 | 2.4 |
| 6283 | 45% | 51.5% | 3.5% | 0.8 to 3 | 1.8 to 2.8 | 2.0 | 2.2 | 2.4 |
| 6284 | 46% | 50.5% | 3.5% | 0.8 to 3 | 1.8 to 2.8 | 2.0 | 2.2 | 2.4 |
| 6285 | 47% | 49.5% | 3.5% | 0.8 to 3 | 1.8 to 2.8 | 2.0 | 2.2 | 2.4 |
| 6286 | 48% | 48.5% | 3.5% | 0.8 to 3 | 1.8 to 2.8 | 2.0 | 2.2 | 2.4 |
| 6287 | 49% | 47.5% | 3.5% | 0.8 to 3 | 1.8 to 2.8 | 2.0 | 2.2 | 2.4 |
| 6288 | 50% | 46.5% | 3.5% | 0.8 to 3 | 1.8 to 2.8 | 2.0 | 2.2 | 2.4 |
| 6289 | 51% | 45.5% | 3.5% | 0.8 to 3 | 1.8 to 2.8 | 2.0 | 2.2 | 2.4 |
| 6290 | 52% | 44.5% | 3.5% | 0.8 to 3 | 1.8 to 2.8 | 2.0 | 2.2 | 2.4 |
| 6291 | 53% | 43.5% | 3.5% | 0.8 to 3 | 1.8 to 2.8 | 2.0 | 2.2 | 2.4 |
| 6292 | 54% | 42.5% | 3.5% | 0.8 to 3 | 1.8 to 2.8 | 2.0 | 2.2 | 2.4 |
| 6293 | 55% | 41.5% | 3.5% | 0.8 to 3 | 1.8 to 2.8 | 2.0 | 2.2 | 2.4 |
| 6294 | 56% | 40.5% | 3.5% | 0.8 to 3 | 1.8 to 2.8 | 2.0 | 2.2 | 2.4 |
| 6295 | 57% | 39.5% | 3.5% | 0.8 to 3 | 1.8 to 2.8 | 2.0 | 2.2 | 2.4 |
| 6296 | 58% | 38.5% | 3.5% | 0.8 to 3 | 1.8 to 2.8 | 2.0 | 2.2 | 2.4 |
| 6297 | 59% | 37.5% | 3.5% | 0.8 to 3 | 1.8 to 2.8 | 2.0 | 2.2 | 2.4 |

TABLE 14-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 9 to 11 | 10 to 12 | 9 to 11 | Range A | Range B | Species C | Species D | Species E |
|---|---|---|---|---|---|---|---|---|
| 6298 | 60% | 36.5% | 3.5% | 0.8 to 3 | 1.8 to 2.8 | 2.0 | 2.2 | 2.4 |
| 6299 | 30% | 66% | 4% | 0.8 to 3 | 1.8 to 2.8 | 2.0 | 2.2 | 2.4 |
| 6300 | 31% | 65% | 4% | 0.8 to 3 | 1.8 to 2.8 | 2.0 | 2.2 | 2.4 |
| 6301 | 32% | 64% | 4% | 0.8 to 3 | 1.8 to 2.8 | 2.0 | 2.2 | 2.4 |
| 6302 | 33% | 63% | 4% | 0.8 to 3 | 1.8 to 2.8 | 2.0 | 2.2 | 2.4 |
| 6303 | 34% | 62% | 4% | 0.8 to 3 | 1.8 to 2.8 | 2.0 | 2.2 | 2.4 |
| 6304 | 35% | 61% | 4% | 0.8 to 3 | 1.8 to 2.8 | 2.0 | 2.2 | 2.4 |
| 6305 | 36% | 60% | 4% | 0.8 to 3 | 1.8 to 2.8 | 2.0 | 2.2 | 2.4 |
| 6306 | 37% | 59% | 4% | 0.8 to 3 | 1.8 to 2.8 | 2.0 | 2.2 | 2.4 |
| 6307 | 38% | 58% | 4% | 0.8 to 3 | 1.8 to 2.8 | 2.0 | 2.2 | 2.4 |
| 6308 | 39% | 57% | 4% | 0.8 to 3 | 1.8 to 2.8 | 2.0 | 2.2 | 2.4 |
| 6309 | 40% | 56% | 4% | 0.8 to 3 | 1.8 to 2.8 | 2.0 | 2.2 | 2.4 |
| 6310 | 41% | 55% | 4% | 0.8 to 3 | 1.8 to 2.8 | 2.0 | 2.2 | 2.4 |
| 6311 | 42% | 54% | 4% | 0.8 to 3 | 1.8 to 2.8 | 2.0 | 2.2 | 2.4 |
| 6312 | 43% | 53% | 4% | 0.8 to 3 | 1.8 to 2.8 | 2.0 | 2.2 | 2.4 |
| 6313 | 44% | 52% | 4% | 0.8 to 3 | 1.8 to 2.8 | 2.0 | 2.2 | 2.4 |
| 6314 | 45% | 51% | 4% | 0.8 to 3 | 1.8 to 2.8 | 2.0 | 2.2 | 2.4 |
| 6315 | 46% | 50% | 4% | 0.8 to 3 | 1.8 to 2.8 | 2.0 | 2.2 | 2.4 |
| 6316 | 47% | 49% | 4% | 0.8 to 3 | 1.8 to 2.8 | 2.0 | 2.2 | 2.4 |
| 6317 | 48% | 48% | 4% | 0.8 to 3 | 1.8 to 2.8 | 2.0 | 2.2 | 2.4 |
| 6318 | 49% | 47% | 4% | 0.8 to 3 | 1.8 to 2.8 | 2.0 | 2.2 | 2.4 |
| 6319 | 50% | 46% | 4% | 0.8 to 3 | 1.8 to 2.8 | 2.0 | 2.2 | 2.4 |
| 6320 | 51% | 45% | 4% | 0.8 to 3 | 1.8 to 2.8 | 2.0 | 2.2 | 2.4 |
| 6321 | 52% | 44% | 4% | 0.8 to 3 | 1.8 to 2.8 | 2.0 | 2.2 | 2.4 |
| 6322 | 53% | 43% | 4% | 0.8 to 3 | 1.8 to 2.8 | 2.0 | 2.2 | 2.4 |
| 6323 | 54% | 42% | 4% | 0.8 to 3 | 1.8 to 2.8 | 2.0 | 2.2 | 2.4 |
| 6324 | 55% | 41% | 4% | 0.8 to 3 | 1.8 to 2.8 | 2.0 | 2.2 | 2.4 |
| 6325 | 56% | 40% | 4% | 0.8 to 3 | 1.8 to 2.8 | 2.0 | 2.2 | 2.4 |
| 6326 | 57% | 39% | 4% | 0.8 to 3 | 1.8 to 2.8 | 2.0 | 2.2 | 2.4 |
| 6327 | 58% | 38% | 4% | 0.8 to 3 | 1.8 to 2.8 | 2.0 | 2.2 | 2.4 |
| 6328 | 59% | 37% | 4% | 0.8 to 3 | 1.8 to 2.8 | 2.0 | 2.2 | 2.4 |
| 6329 | 60% | 36% | 4% | 0.8 to 3 | 1.8 to 2.8 | 2.0 | 2.2 | 2.4 |
| 6330 | 30% | 65.5% | 4.5% | 0.8 to 3 | 1.8 to 2.8 | 2.0 | 2.2 | 2.4 |
| 6331 | 31% | 64.5% | 4.5% | 0.8 to 3 | 1.8 to 2.8 | 2.0 | 2.2 | 2.4 |
| 6332 | 32% | 63.5% | 4.5% | 0.8 to 3 | 1.8 to 2.8 | 2.0 | 2.2 | 2.4 |
| 6333 | 33% | 62.5% | 4.5% | 0.8 to 3 | 1.8 to 2.8 | 2.0 | 2.2 | 2.4 |
| 6334 | 34% | 61.5% | 4.5% | 0.8 to 3 | 1.8 to 2.8 | 2.0 | 2.2 | 2.4 |
| 6335 | 35% | 60.5% | 4.5% | 0.8 to 3 | 1.8 to 2.8 | 2.0 | 2.2 | 2.4 |
| 6336 | 36% | 59.5% | 4.5% | 0.8 to 3 | 1.8 to 2.8 | 2.0 | 2.2 | 2.4 |
| 6337 | 37% | 58.5% | 4.5% | 0.8 to 3 | 1.8 to 2.8 | 2.0 | 2.2 | 2.4 |
| 6338 | 38% | 57.5% | 4.5% | 0.8 to 3 | 1.8 to 2.8 | 2.0 | 2.2 | 2.4 |
| 6339 | 39% | 56.5% | 4.5% | 0.8 to 3 | 1.8 to 2.8 | 2.0 | 2.2 | 2.4 |
| 6340 | 40% | 55.5% | 4.5% | 0.8 to 3 | 1.8 to 2.8 | 2.0 | 2.2 | 2.4 |
| 6341 | 41% | 54.5% | 4.5% | 0.8 to 3 | 1.8 to 2.8 | 2.0 | 2.2 | 2.4 |
| 6342 | 42% | 53.5% | 4.5% | 0.8 to 3 | 1.8 to 2.8 | 2.0 | 2.2 | 2.4 |
| 6343 | 43% | 52.5% | 4.5% | 0.8 to 3 | 1.8 to 2.8 | 2.0 | 2.2 | 2.4 |
| 6344 | 44% | 51.5% | 4.5% | 0.8 to 3 | 1.8 to 2.8 | 2.0 | 2.2 | 2.4 |
| 6345 | 45% | 50.5% | 4.5% | 0.8 to 3 | 1.8 to 2.8 | 2.0 | 2.2 | 2.4 |
| 6346 | 46% | 49.5% | 4.5% | 0.8 to 3 | 1.8 to 2.8 | 2.0 | 2.2 | 2.4 |
| 6347 | 47% | 48.5% | 4.5% | 0.8 to 3 | 1.8 to 2.8 | 2.0 | 2.2 | 2.4 |
| 6348 | 48% | 47.5% | 4.5% | 0.8 to 3 | 1.8 to 2.8 | 2.0 | 2.2 | 2.4 |
| 6349 | 49% | 46.5% | 4.5% | 0.8 to 3 | 1.8 to 2.8 | 2.0 | 2.2 | 2.4 |
| 6350 | 50% | 45.5% | 4.5% | 0.8 to 3 | 1.8 to 2.8 | 2.0 | 2.2 | 2.4 |
| 6351 | 51% | 44.5% | 4.5% | 0.8 to 3 | 1.8 to 2.8 | 2.0 | 2.2 | 2.4 |
| 6352 | 52% | 43.5% | 4.5% | 0.8 to 3 | 1.8 to 2.8 | 2.0 | 2.2 | 2.4 |
| 6353 | 53% | 42.5% | 4.5% | 0.8 to 3 | 1.8 to 2.8 | 2.0 | 2.2 | 2.4 |
| 6354 | 54% | 41.5% | 4.5% | 0.8 to 3 | 1.8 to 2.8 | 2.0 | 2.2 | 2.4 |
| 6355 | 55% | 40.5% | 4.5% | 0.8 to 3 | 1.8 to 2.8 | 2.0 | 2.2 | 2.4 |
| 6356 | 56% | 39.5% | 4.5% | 0.8 to 3 | 1.8 to 2.8 | 2.0 | 2.2 | 2.4 |
| 6357 | 57% | 38.5% | 4.5% | 0.8 to 3 | 1.8 to 2.8 | 2.0 | 2.2 | 2.4 |
| 6358 | 58% | 37.5% | 4.5% | 0.8 to 3 | 1.8 to 2.8 | 2.0 | 2.2 | 2.4 |
| 6359 | 59% | 36.5% | 4.5% | 0.8 to 3 | 1.8 to 2.8 | 2.0 | 2.2 | 2.4 |
| 6360 | 60% | 35.5% | 4.5% | 0.8 to 3 | 1.8 to 2.8 | 2.0 | 2.2 | 2.4 |
| 6361 | 30% | 65% | 5% | 0.8 to 3 | 1.8 to 2.8 | 2.0 | 2.2 | 2.4 |
| 6362 | 31% | 64% | 5% | 0.8 to 3 | 1.8 to 2.8 | 2.0 | 2.2 | 2.4 |
| 6363 | 32% | 63% | 5% | 0.8 to 3 | 1.8 to 2.8 | 2.0 | 2.2 | 2.4 |
| 6364 | 33% | 62% | 5% | 0.8 to 3 | 1.8 to 2.8 | 2.0 | 2.2 | 2.4 |
| 6365 | 34% | 61% | 5% | 0.8 to 3 | 1.8 to 2.8 | 2.0 | 2.2 | 2.4 |
| 6366 | 35% | 60% | 5% | 0.8 to 3 | 1.8 to 2.8 | 2.0 | 2.2 | 2.4 |
| 6367 | 36% | 59% | 5% | 0.8 to 3 | 1.8 to 2.8 | 2.0 | 2.2 | 2.4 |
| 6368 | 37% | 58% | 5% | 0.8 to 3 | 1.8 to 2.8 | 2.0 | 2.2 | 2.4 |

TABLE 14-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 9 to 11 | 10 to 12 | 9 to 11 | Range A | Range B | Species C | Species D | Species E |
|---|---|---|---|---|---|---|---|---|
| 6369 | 38% | 57% | 5% | 0.8 to 3 | 1.8 to 2.8 | 2.0 | 2.2 | 2.4 |
| 6370 | 39% | 56% | 5% | 0.8 to 3 | 1.8 to 2.8 | 2.0 | 2.2 | 2.4 |
| 6371 | 40% | 55% | 5% | 0.8 to 3 | 1.8 to 2.8 | 2.0 | 2.2 | 2.4 |
| 6372 | 41% | 54% | 5% | 0.8 to 3 | 1.8 to 2.8 | 2.0 | 2.2 | 2.4 |
| 6373 | 42% | 53% | 5% | 0.8 to 3 | 1.8 to 2.8 | 2.0 | 2.2 | 2.4 |
| 6374 | 43% | 52% | 5% | 0.8 to 3 | 1.8 to 2.8 | 2.0 | 2.2 | 2.4 |
| 6375 | 44% | 51% | 5% | 0.8 to 3 | 1.8 to 2.8 | 2.0 | 2.2 | 2.4 |
| 6376 | 45% | 50% | 5% | 0.8 to 3 | 1.8 to 2.8 | 2.0 | 2.2 | 2.4 |
| 6377 | 46% | 49% | 5% | 0.8 to 3 | 1.8 to 2.8 | 2.0 | 2.2 | 2.4 |
| 6378 | 47% | 48% | 5% | 0.8 to 3 | 1.8 to 2.8 | 2.0 | 2.2 | 2.4 |
| 6379 | 48% | 47% | 5% | 0.8 to 3 | 1.8 to 2.8 | 2.0 | 2.2 | 2.4 |
| 6380 | 49% | 46% | 5% | 0.8 to 3 | 1.8 to 2.8 | 2.0 | 2.2 | 2.4 |
| 6381 | 50% | 45% | 5% | 0.8 to 3 | 1.8 to 2.8 | 2.0 | 2.2 | 2.4 |
| 6382 | 51% | 44% | 5% | 0.8 to 3 | 1.8 to 2.8 | 2.0 | 2.2 | 2.4 |
| 6383 | 52% | 43% | 5% | 0.8 to 3 | 1.8 to 2.8 | 2.0 | 2.2 | 2.4 |
| 6384 | 53% | 42% | 5% | 0.8 to 3 | 1.8 to 2.8 | 2.0 | 2.2 | 2.4 |
| 6385 | 54% | 41% | 5% | 0.8 to 3 | 1.8 to 2.8 | 2.0 | 2.2 | 2.4 |
| 6386 | 55% | 40% | 5% | 0.8 to 3 | 1.8 to 2.8 | 2.0 | 2.2 | 2.4 |
| 6387 | 56% | 39% | 5% | 0.8 to 3 | 1.8 to 2.8 | 2.0 | 2.2 | 2.4 |
| 6388 | 57% | 38% | 5% | 0.8 to 3 | 1.8 to 2.8 | 2.0 | 2.2 | 2.4 |
| 6389 | 58% | 37% | 5% | 0.8 to 3 | 1.8 to 2.8 | 2.0 | 2.2 | 2.4 |
| 6390 | 59% | 36% | 5% | 0.8 to 3 | 1.8 to 2.8 | 2.0 | 2.2 | 2.4 |
| 6391 | 60% | 35% | 5% | 0.8 to 3 | 1.8 to 2.8 | 2.0 | 2.2 | 2.4 |
| 6392 | 30% | 64.5% | 5.5% | 0.8 to 3 | 1.8 to 2.8 | 2.0 | 2.2 | 2.4 |
| 6393 | 31% | 63.5% | 5.5% | 0.8 to 3 | 1.8 to 2.8 | 2.0 | 2.2 | 2.4 |
| 6394 | 32% | 62.5% | 5.5% | 0.8 to 3 | 1.8 to 2.8 | 2.0 | 2.2 | 2.4 |
| 6395 | 33% | 61.5% | 5.5% | 0.8 to 3 | 1.8 to 2.8 | 2.0 | 2.2 | 2.4 |
| 6396 | 34% | 60.5% | 5.5% | 0.8 to 3 | 1.8 to 2.8 | 2.0 | 2.2 | 2.4 |
| 6397 | 35% | 59.5% | 5.5% | 0.8 to 3 | 1.8 to 2.8 | 2.0 | 2.2 | 2.4 |
| 6398 | 36% | 58.5% | 5.5% | 0.8 to 3 | 1.8 to 2.8 | 2.0 | 2.2 | 2.4 |
| 6399 | 37% | 57.5% | 5.5% | 0.8 to 3 | 1.8 to 2.8 | 2.0 | 2.2 | 2.4 |
| 6400 | 38% | 56.5% | 5.5% | 0.8 to 3 | 1.8 to 2.8 | 2.0 | 2.2 | 2.4 |
| 6401 | 39% | 55.5% | 5.5% | 0.8 to 3 | 1.8 to 2.8 | 2.0 | 2.2 | 2.4 |
| 6402 | 40% | 54.5% | 5.5% | 0.8 to 3 | 1.8 to 2.8 | 2.0 | 2.2 | 2.4 |
| 6403 | 41% | 53.5% | 5.5% | 0.8 to 3 | 1.8 to 2.8 | 2.0 | 2.2 | 2.4 |
| 6404 | 42% | 52.5% | 5.5% | 0.8 to 3 | 1.8 to 2.8 | 2.0 | 2.2 | 2.4 |
| 6405 | 43% | 51.5% | 5.5% | 0.8 to 3 | 1.8 to 2.8 | 2.0 | 2.2 | 2.4 |
| 6406 | 44% | 50.5% | 5.5% | 0.8 to 3 | 1.8 to 2.8 | 2.0 | 2.2 | 2.4 |
| 6407 | 45% | 49.5% | 5.5% | 0.8 to 3 | 1.8 to 2.8 | 2.0 | 2.2 | 2.4 |
| 6408 | 46% | 48.5% | 5.5% | 0.8 to 3 | 1.8 to 2.8 | 2.0 | 2.2 | 2.4 |
| 6409 | 47% | 47.5% | 5.5% | 0.8 to 3 | 1.8 to 2.8 | 2.0 | 2.2 | 2.4 |
| 6410 | 48% | 46.5% | 5.5% | 0.8 to 3 | 1.8 to 2.8 | 2.0 | 2.2 | 2.4 |
| 6411 | 49% | 45.5% | 5.5% | 0.8 to 3 | 1.8 to 2.8 | 2.0 | 2.2 | 2.4 |
| 6412 | 50% | 44.5% | 5.5% | 0.8 to 3 | 1.8 to 2.8 | 2.0 | 2.2 | 2.4 |
| 6413 | 51% | 43.5% | 5.5% | 0.8 to 3 | 1.8 to 2.8 | 2.0 | 2.2 | 2.4 |
| 6414 | 52% | 42.5% | 5.5% | 0.8 to 3 | 1.8 to 2.8 | 2.0 | 2.2 | 2.4 |
| 6415 | 53% | 41.5% | 5.5% | 0.8 to 3 | 1.8 to 2.8 | 2.0 | 2.2 | 2.4 |
| 6416 | 54% | 40.5% | 5.5% | 0.8 to 3 | 1.8 to 2.8 | 2.0 | 2.2 | 2.4 |
| 6417 | 55% | 39.5% | 5.5% | 0.8 to 3 | 1.8 to 2.8 | 2.0 | 2.2 | 2.4 |
| 6418 | 56% | 38.5% | 5.5% | 0.8 to 3 | 1.8 to 2.8 | 2.0 | 2.2 | 2.4 |
| 6419 | 57% | 37.5% | 5.5% | 0.8 to 3 | 1.8 to 2.8 | 2.0 | 2.2 | 2.4 |
| 6420 | 58% | 36.5% | 5.5% | 0.8 to 3 | 1.8 to 2.8 | 2.0 | 2.2 | 2.4 |
| 6421 | 59% | 35.5% | 5.5% | 0.8 to 3 | 1.8 to 2.8 | 2.0 | 2.2 | 2.4 |
| 6422 | 60% | 34.5% | 5.5% | 0.8 to 3 | 1.8 to 2.8 | 2.0 | 2.2 | 2.4 |
| 6423 | 30% | 64% | 6% | 0.8 to 3 | 1.8 to 2.8 | 2.0 | 2.2 | 2.4 |
| 6424 | 31% | 63% | 6% | 0.8 to 3 | 1.8 to 2.8 | 2.0 | 2.2 | 2.4 |
| 6425 | 32% | 62% | 6% | 0.8 to 3 | 1.8 to 2.8 | 2.0 | 2.2 | 2.4 |
| 6426 | 33% | 61% | 6% | 0.8 to 3 | 1.8 to 2.8 | 2.0 | 2.2 | 2.4 |
| 6427 | 34% | 60% | 6% | 0.8 to 3 | 1.8 to 2.8 | 2.0 | 2.2 | 2.4 |
| 6428 | 35% | 59% | 6% | 0.8 to 3 | 1.8 to 2.8 | 2.0 | 2.2 | 2.4 |
| 6429 | 36% | 58% | 6% | 0.8 to 3 | 1.8 to 2.8 | 2.0 | 2.2 | 2.4 |
| 6430 | 37% | 57% | 6% | 0.8 to 3 | 1.8 to 2.8 | 2.0 | 2.2 | 2.4 |
| 6431 | 38% | 56% | 6% | 0.8 to 3 | 1.8 to 2.8 | 2.0 | 2.2 | 2.4 |
| 6432 | 39% | 55% | 6% | 0.8 to 3 | 1.8 to 2.8 | 2.0 | 2.2 | 2.4 |
| 6433 | 40% | 54% | 6% | 0.8 to 3 | 1.8 to 2.8 | 2.0 | 2.2 | 2.4 |
| 6434 | 41% | 53% | 6% | 0.8 to 3 | 1.8 to 2.8 | 2.0 | 2.2 | 2.4 |
| 6435 | 42% | 52% | 6% | 0.8 to 3 | 1.8 to 2.8 | 2.0 | 2.2 | 2.4 |
| 6436 | 43% | 51% | 6% | 0.8 to 3 | 1.8 to 2.8 | 2.0 | 2.2 | 2.4 |
| 6437 | 44% | 50% | 6% | 0.8 to 3 | 1.8 to 2.8 | 2.0 | 2.2 | 2.4 |
| 6438 | 45% | 49% | 6% | 0.8 to 3 | 1.8 to 2.8 | 2.0 | 2.2 | 2.4 |
| 6439 | 46% | 48% | 6% | 0.8 to 3 | 1.8 to 2.8 | 2.0 | 2.2 | 2.4 |

TABLE 14-continued

|  | Alkyl Sulfate Alkyl Chain Length, Wt. % | | Alkyl Ether Sulfate | | | | | |
|---|---|---|---|---|---|---|---|---|
|  | | | Alkyl Chain Length, Wt. % | Average mol. EO (Alternatives for each numbered species) | | | | |
| Species | 9 to 11 | 10 to 12 | 9 to 11 | Range A | Range B | Species C | Species D | Species E |
| 6440 | 47% | 47% | 6% | 0.8 to 3 | 1.8 to 2.8 | 2.0 | 2.2 | 2.4 |
| 6441 | 48% | 46% | 6% | 0.8 to 3 | 1.8 to 2.8 | 2.0 | 2.2 | 2.4 |
| 6442 | 49% | 45% | 6% | 0.8 to 3 | 1.8 to 2.8 | 2.0 | 2.2 | 2.4 |
| 6443 | 50% | 44% | 6% | 0.8 to 3 | 1.8 to 2.8 | 2.0 | 2.2 | 2.4 |
| 6444 | 51% | 43% | 6% | 0.8 to 3 | 1.8 to 2.8 | 2.0 | 2.2 | 2.4 |
| 6445 | 52% | 42% | 6% | 0.8 to 3 | 1.8 to 2.8 | 2.0 | 2.2 | 2.4 |
| 6446 | 53% | 41% | 6% | 0.8 to 3 | 1.8 to 2.8 | 2.0 | 2.2 | 2.4 |
| 6447 | 54% | 40% | 6% | 0.8 to 3 | 1.8 to 2.8 | 2.0 | 2.2 | 2.4 |
| 6448 | 55% | 39% | 6% | 0.8 to 3 | 1.8 to 2.8 | 2.0 | 2.2 | 2.4 |
| 6449 | 56% | 38% | 6% | 0.8 to 3 | 1.8 to 2.8 | 2.0 | 2.2 | 2.4 |
| 6450 | 57% | 37% | 6% | 0.8 to 3 | 1.8 to 2.8 | 2.0 | 2.2 | 2.4 |
| 6451 | 58% | 36% | 6% | 0.8 to 3 | 1.8 to 2.8 | 2.0 | 2.2 | 2.4 |
| 6452 | 59% | 35% | 6% | 0.8 to 3 | 1.8 to 2.8 | 2.0 | 2.2 | 2.4 |
| 6453 | 60% | 34% | 6% | 0.8 to 3 | 1.8 to 2.8 | 2.0 | 2.2 | 2.4 |
| 6454 | 30% | 63.5% | 6.5% | 0.8 to 3 | 1.8 to 2.8 | 2.0 | 2.2 | 2.4 |
| 6455 | 31% | 62.5% | 6.5% | 0.8 to 3 | 1.8 to 2.8 | 2.0 | 2.2 | 2.4 |
| 6456 | 32% | 61.5% | 6.5% | 0.8 to 3 | 1.8 to 2.8 | 2.0 | 2.2 | 2.4 |
| 6457 | 33% | 60.5% | 6.5% | 0.8 to 3 | 1.8 to 2.8 | 2.0 | 2.2 | 2.4 |
| 6458 | 34% | 59.5% | 6.5% | 0.8 to 3 | 1.8 to 2.8 | 2.0 | 2.2 | 2.4 |
| 6459 | 35% | 58.5% | 6.5% | 0.8 to 3 | 1.8 to 2.8 | 2.0 | 2.2 | 2.4 |
| 6460 | 36% | 57.5% | 6.5% | 0.8 to 3 | 1.8 to 2.8 | 2.0 | 2.2 | 2.4 |
| 6461 | 37% | 56.5% | 6.5% | 0.8 to 3 | 1.8 to 2.8 | 2.0 | 2.2 | 2.4 |
| 6462 | 38% | 55.5% | 6.5% | 0.8 to 3 | 1.8 to 2.8 | 2.0 | 2.2 | 2.4 |
| 6463 | 39% | 54.5% | 6.5% | 0.8 to 3 | 1.8 to 2.8 | 2.0 | 2.2 | 2.4 |
| 6464 | 40% | 53.5% | 6.5% | 0.8 to 3 | 1.8 to 2.8 | 2.0 | 2.2 | 2.4 |
| 6465 | 41% | 52.5% | 6.5% | 0.8 to 3 | 1.8 to 2.8 | 2.0 | 2.2 | 2.4 |
| 6466 | 42% | 51.5% | 6.5% | 0.8 to 3 | 1.8 to 2.8 | 2.0 | 2.2 | 2.4 |
| 6467 | 43% | 50.5% | 6.5% | 0.8 to 3 | 1.8 to 2.8 | 2.0 | 2.2 | 2.4 |
| 6468 | 44% | 49.5% | 6.5% | 0.8 to 3 | 1.8 to 2.8 | 2.0 | 2.2 | 2.4 |
| 6469 | 45% | 48.5% | 6.5% | 0.8 to 3 | 1.8 to 2.8 | 2.0 | 2.2 | 2.4 |
| 6470 | 46% | 47.5% | 6.5% | 0.8 to 3 | 1.8 to 2.8 | 2.0 | 2.2 | 2.4 |
| 6471 | 47% | 46.5% | 6.5% | 0.8 to 3 | 1.8 to 2.8 | 2.0 | 2.2 | 2.4 |
| 6472 | 48% | 45.5% | 6.5% | 0.8 to 3 | 1.8 to 2.8 | 2.0 | 2.2 | 2.4 |
| 6473 | 49% | 44.5% | 6.5% | 0.8 to 3 | 1.8 to 2.8 | 2.0 | 2.2 | 2.4 |
| 6474 | 50% | 43.5% | 6.5% | 0.8 to 3 | 1.8 to 2.8 | 2.0 | 2.2 | 2.4 |
| 6475 | 51% | 42.5% | 6.5% | 0.8 to 3 | 1.8 to 2.8 | 2.0 | 2.2 | 2.4 |
| 6476 | 52% | 41.5% | 6.5% | 0.8 to 3 | 1.8 to 2.8 | 2.0 | 2.2 | 2.4 |
| 6477 | 53% | 40.5% | 6.5% | 0.8 to 3 | 1.8 to 2.8 | 2.0 | 2.2 | 2.4 |
| 6478 | 54% | 39.5% | 6.5% | 0.8 to 3 | 1.8 to 2.8 | 2.0 | 2.2 | 2.4 |
| 6479 | 55% | 38.5% | 6.5% | 0.8 to 3 | 1.8 to 2.8 | 2.0 | 2.2 | 2.4 |
| 6480 | 56% | 37.5% | 6.5% | 0.8 to 3 | 1.8 to 2.8 | 2.0 | 2.2 | 2.4 |
| 6481 | 57% | 36.5% | 6.5% | 0.8 to 3 | 1.8 to 2.8 | 2.0 | 2.2 | 2.4 |
| 6482 | 58% | 35.5% | 6.5% | 0.8 to 3 | 1.8 to 2.8 | 2.0 | 2.2 | 2.4 |
| 6483 | 59% | 34.5% | 6.5% | 0.8 to 3 | 1.8 to 2.8 | 2.0 | 2.2 | 2.4 |
| 6484 | 60% | 33.5% | 6.5% | 0.8 to 3 | 1.8 to 2.8 | 2.0 | 2.2 | 2.4 |
| 6485 | 30% | 63% | 7% | 0.8 to 3 | 1.8 to 2.8 | 2.0 | 2.2 | 2.4 |
| 6486 | 31% | 62% | 7% | 0.8 to 3 | 1.8 to 2.8 | 2.0 | 2.2 | 2.4 |
| 6487 | 32% | 61% | 7% | 0.8 to 3 | 1.8 to 2.8 | 2.0 | 2.2 | 2.4 |
| 6488 | 33% | 60% | 7% | 0.8 to 3 | 1.8 to 2.8 | 2.0 | 2.2 | 2.4 |
| 6489 | 34% | 59% | 7% | 0.8 to 3 | 1.8 to 2.8 | 2.0 | 2.2 | 2.4 |
| 6490 | 35% | 58% | 7% | 0.8 to 3 | 1.8 to 2.8 | 2.0 | 2.2 | 2.4 |
| 6491 | 36% | 57% | 7% | 0.8 to 3 | 1.8 to 2.8 | 2.0 | 2.2 | 2.4 |
| 6492 | 37% | 56% | 7% | 0.8 to 3 | 1.8 to 2.8 | 2.0 | 2.2 | 2.4 |
| 6493 | 38% | 55% | 7% | 0.8 to 3 | 1.8 to 2.8 | 2.0 | 2.2 | 2.4 |
| 6494 | 39% | 54% | 7% | 0.8 to 3 | 1.8 to 2.8 | 2.0 | 2.2 | 2.4 |
| 6495 | 40% | 53% | 7% | 0.8 to 3 | 1.8 to 2.8 | 2.0 | 2.2 | 2.4 |
| 6496 | 41% | 52% | 7% | 0.8 to 3 | 1.8 to 2.8 | 2.0 | 2.2 | 2.4 |
| 6497 | 42% | 51% | 7% | 0.8 to 3 | 1.8 to 2.8 | 2.0 | 2.2 | 2.4 |
| 6498 | 43% | 50% | 7% | 0.8 to 3 | 1.8 to 2.8 | 2.0 | 2.2 | 2.4 |
| 6499 | 44% | 49% | 7% | 0.8 to 3 | 1.8 to 2.8 | 2.0 | 2.2 | 2.4 |
| 6500 | 45% | 48% | 7% | 0.8 to 3 | 1.8 to 2.8 | 2.0 | 2.2 | 2.4 |
| 6501 | 46% | 47% | 7% | 0.8 to 3 | 1.8 to 2.8 | 2.0 | 2.2 | 2.4 |
| 6502 | 47% | 46% | 7% | 0.8 to 3 | 1.8 to 2.8 | 2.0 | 2.2 | 2.4 |
| 6503 | 48% | 45% | 7% | 0.8 to 3 | 1.8 to 2.8 | 2.0 | 2.2 | 2.4 |
| 6504 | 49% | 44% | 7% | 0.8 to 3 | 1.8 to 2.8 | 2.0 | 2.2 | 2.4 |
| 6505 | 50% | 43% | 7% | 0.8 to 3 | 1.8 to 2.8 | 2.0 | 2.2 | 2.4 |
| 6506 | 51% | 42% | 7% | 0.8 to 3 | 1.8 to 2.8 | 2.0 | 2.2 | 2.4 |
| 6507 | 52% | 41% | 7% | 0.8 to 3 | 1.8 to 2.8 | 2.0 | 2.2 | 2.4 |
| 6508 | 53% | 40% | 7% | 0.8 to 3 | 1.8 to 2.8 | 2.0 | 2.2 | 2.4 |
| 6509 | 54% | 39% | 7% | 0.8 to 3 | 1.8 to 2.8 | 2.0 | 2.2 | 2.4 |
| 6510 | 55% | 38% | 7% | 0.8 to 3 | 1.8 to 2.8 | 2.0 | 2.2 | 2.4 |

TABLE 14-continued

|  | Alkyl Sulfate Alkyl Chain Length, Wt. % | Alkyl Chain Length, Wt. % | Alkyl Ether Sulfate | | | | |
|---|---|---|---|---|---|---|---|
|  |  |  | Average mol. EO (Alternatives for each numbered species) | | | | |
| Species | 9 to 11 | 10 to 12 | 9 to 11 | Range A | Range B | Species C | Species D | Species E |
| 6511 | 56% | 37% | 7% | 0.8 to 3 | 1.8 to 2.8 | 2.0 | 2.2 | 2.4 |
| 6512 | 57% | 36% | 7% | 0.8 to 3 | 1.8 to 2.8 | 2.0 | 2.2 | 2.4 |
| 6513 | 58% | 35% | 7% | 0.8 to 3 | 1.8 to 2.8 | 2.0 | 2.2 | 2.4 |
| 6514 | 59% | 34% | 7% | 0.8 to 3 | 1.8 to 2.8 | 2.0 | 2.2 | 2.4 |
| 6515 | 60% | 33% | 7% | 0.8 to 3 | 1.8 to 2.8 | 2.0 | 2.2 | 2.4 |

TABLE 15

|  | Alkyl Sulfate Alkyl Chain Length, Wt. % | Alkyl Chain Length, Wt. % | Alkyl Ether Sulfate | | | | |
|---|---|---|---|---|---|---|---|
|  |  |  | Average mol. EO (Alternatives for each numbered species) | | | | |
| Species | 8 | 10 to 12 | 9 to 11 | Range A | Range B | Species C | Species D | Species E |
| 6516 | 30% | 70% | 0% | 0.8 to 3 | 1.8 to 2.8 | 2.0 | 2.2 | 2.4 |
| 6517 | 31% | 69% | 0% | 0.8 to 3 | 1.8 to 2.8 | 2.0 | 2.2 | 2.4 |
| 6518 | 32% | 68% | 0% | 0.8 to 3 | 1.8 to 2.8 | 2.0 | 2.2 | 2.4 |
| 6519 | 33% | 67% | 0% | 0.8 to 3 | 1.8 to 2.8 | 2.0 | 2.2 | 2.4 |
| 6520 | 34% | 66% | 0% | 0.8 to 3 | 1.8 to 2.8 | 2.0 | 2.2 | 2.4 |
| 6521 | 35% | 65% | 0% | 0.8 to 3 | 1.8 to 2.8 | 2.0 | 2.2 | 2.4 |
| 6522 | 36% | 64% | 0% | 0.8 to 3 | 1.8 to 2.8 | 2.0 | 2.2 | 2.4 |
| 6523 | 37% | 63% | 0% | 0.8 to 3 | 1.8 to 2.8 | 2.0 | 2.2 | 2.4 |
| 6524 | 38% | 62% | 0% | 0.8 to 3 | 1.8 to 2.8 | 2.0 | 2.2 | 2.4 |
| 6525 | 39% | 61% | 0% | 0.8 to 3 | 1.8 to 2.8 | 2.0 | 2.2 | 2.4 |
| 6526 | 40% | 60% | 0% | 0.8 to 3 | 1.8 to 2.8 | 2.0 | 2.2 | 2.4 |
| 6527 | 41% | 59% | 0% | 0.8 to 3 | 1.8 to 2.8 | 2.0 | 2.2 | 2.4 |
| 6528 | 42% | 58% | 0% | 0.8 to 3 | 1.8 to 2.8 | 2.0 | 2.2 | 2.4 |
| 6529 | 43% | 57% | 0% | 0.8 to 3 | 1.8 to 2.8 | 2.0 | 2.2 | 2.4 |
| 6530 | 44% | 56% | 0% | 0.8 to 3 | 1.8 to 2.8 | 2.0 | 2.2 | 2.4 |
| 6531 | 45% | 55% | 0% | 0.8 to 3 | 1.8 to 2.8 | 2.0 | 2.2 | 2.4 |
| 6532 | 46% | 54% | 0% | 0.8 to 3 | 1.8 to 2.8 | 2.0 | 2.2 | 2.4 |
| 6533 | 47% | 53% | 0% | 0.8 to 3 | 1.8 to 2.8 | 2.0 | 2.2 | 2.4 |
| 6534 | 48% | 52% | 0% | 0.8 to 3 | 1.8 to 2.8 | 2.0 | 2.2 | 2.4 |
| 6535 | 49% | 51% | 0% | 0.8 to 3 | 1.8 to 2.8 | 2.0 | 2.2 | 2.4 |
| 6536 | 50% | 50% | 0% | 0.8 to 3 | 1.8 to 2.8 | 2.0 | 2.2 | 2.4 |
| 6537 | 51% | 49% | 0% | 0.8 to 3 | 1.8 to 2.8 | 2.0 | 2.2 | 2.4 |
| 6538 | 52% | 48% | 0% | 0.8 to 3 | 1.8 to 2.8 | 2.0 | 2.2 | 2.4 |
| 6539 | 53% | 47% | 0% | 0.8 to 3 | 1.8 to 2.8 | 2.0 | 2.2 | 2.4 |
| 6540 | 54% | 46% | 0% | 0.8 to 3 | 1.8 to 2.8 | 2.0 | 2.2 | 2.4 |
| 6541 | 55% | 45% | 0% | 0.8 to 3 | 1.8 to 2.8 | 2.0 | 2.2 | 2.4 |
| 6542 | 56% | 44% | 0% | 0.8 to 3 | 1.8 to 2.8 | 2.0 | 2.2 | 2.4 |
| 6543 | 57% | 43% | 0% | 0.8 to 3 | 1.8 to 2.8 | 2.0 | 2.2 | 2.4 |
| 6544 | 58% | 42% | 0% | 0.8 to 3 | 1.8 to 2.8 | 2.0 | 2.2 | 2.4 |
| 6545 | 59% | 41% | 0% | 0.8 to 3 | 1.8 to 2.8 | 2.0 | 2.2 | 2.4 |
| 6546 | 60% | 40% | 0% | 0.8 to 3 | 1.8 to 2.8 | 2.0 | 2.2 | 2.4 |
| 6547 | 30% | 70% | 0.5% | 0.8 to 3 | 1.8 to 2.8 | 2.0 | 2.2 | 2.4 |
| 6548 | 31% | 69% | 0.5% | 0.8 to 3 | 1.8 to 2.8 | 2.0 | 2.2 | 2.4 |
| 6549 | 32% | 68% | 0.5% | 0.8 to 3 | 1.8 to 2.8 | 2.0 | 2.2 | 2.4 |
| 6550 | 33% | 67% | 0.5% | 0.8 to 3 | 1.8 to 2.8 | 2.0 | 2.2 | 2.4 |
| 6551 | 34% | 66% | 0.5% | 0.8 to 3 | 1.8 to 2.8 | 2.0 | 2.2 | 2.4 |
| 6552 | 35% | 65% | 0.5% | 0.8 to 3 | 1.8 to 2.8 | 2.0 | 2.2 | 2.4 |
| 6553 | 36% | 64% | 0.5% | 0.8 to 3 | 1.8 to 2.8 | 2.0 | 2.2 | 2.4 |
| 6554 | 37% | 63% | 0.5% | 0.8 to 3 | 1.8 to 2.8 | 2.0 | 2.2 | 2.4 |
| 6555 | 38% | 62% | 0.5% | 0.8 to 3 | 1.8 to 2.8 | 2.0 | 2.2 | 2.4 |
| 6556 | 39% | 61% | 0.5% | 0.8 to 3 | 1.8 to 2.8 | 2.0 | 2.2 | 2.4 |
| 6557 | 40% | 60% | 0.5% | 0.8 to 3 | 1.8 to 2.8 | 2.0 | 2.2 | 2.4 |
| 6558 | 41% | 59% | 0.5% | 0.8 to 3 | 1.8 to 2.8 | 2.0 | 2.2 | 2.4 |
| 6559 | 42% | 58% | 0.5% | 0.8 to 3 | 1.8 to 2.8 | 2.0 | 2.2 | 2.4 |
| 6560 | 43% | 57% | 0.5% | 0.8 to 3 | 1.8 to 2.8 | 2.0 | 2.2 | 2.4 |
| 6561 | 44% | 56% | 0.5% | 0.8 to 3 | 1.8 to 2.8 | 2.0 | 2.2 | 2.4 |
| 6562 | 45% | 55% | 0.5% | 0.8 to 3 | 1.8 to 2.8 | 2.0 | 2.2 | 2.4 |
| 6563 | 46% | 54% | 0.5% | 0.8 to 3 | 1.8 to 2.8 | 2.0 | 2.2 | 2.4 |
| 6564 | 47% | 53% | 0.5% | 0.8 to 3 | 1.8 to 2.8 | 2.0 | 2.2 | 2.4 |
| 6565 | 48% | 52% | 0.5% | 0.8 to 3 | 1.8 to 2.8 | 2.0 | 2.2 | 2.4 |
| 6566 | 49% | 51% | 0.5% | 0.8 to 3 | 1.8 to 2.8 | 2.0 | 2.2 | 2.4 |

TABLE 15-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 | 10 to 12 | 9 to 11 | Range A | Range B | Species C | Species D | Species E |
| 6567 | 50% | 50% | 0.5% | 0.8 to 3 | 1.8 to 2.8 | 2.0 | 2.2 | 2.4 |
| 6568 | 51% | 49% | 0.5% | 0.8 to 3 | 1.8 to 2.8 | 2.0 | 2.2 | 2.4 |
| 6569 | 52% | 48% | 0.5% | 0.8 to 3 | 1.8 to 2.8 | 2.0 | 2.2 | 2.4 |
| 6570 | 53% | 47% | 0.5% | 0.8 to 3 | 1.8 to 2.8 | 2.0 | 2.2 | 2.4 |
| 6571 | 54% | 46% | 0.5% | 0.8 to 3 | 1.8 to 2.8 | 2.0 | 2.2 | 2.4 |
| 6572 | 55% | 45% | 0.5% | 0.8 to 3 | 1.8 to 2.8 | 2.0 | 2.2 | 2.4 |
| 6573 | 56% | 44% | 0.5% | 0.8 to 3 | 1.8 to 2.8 | 2.0 | 2.2 | 2.4 |
| 6574 | 57% | 43% | 0.5% | 0.8 to 3 | 1.8 to 2.8 | 2.0 | 2.2 | 2.4 |
| 6575 | 58% | 42% | 0.5% | 0.8 to 3 | 1.8 to 2.8 | 2.0 | 2.2 | 2.4 |
| 6576 | 59% | 41% | 0.5% | 0.8 to 3 | 1.8 to 2.8 | 2.0 | 2.2 | 2.4 |
| 6577 | 60% | 40% | 0.5% | 0.8 to 3 | 1.8 to 2.8 | 2.0 | 2.2 | 2.4 |
| 6578 | 30% | 69% | 1% | 0.8 to 3 | 1.8 to 2.8 | 2.0 | 2.2 | 2.4 |
| 6579 | 31% | 68% | 1% | 0.8 to 3 | 1.8 to 2.8 | 2.0 | 2.2 | 2.4 |
| 6580 | 32% | 67% | 1% | 0.8 to 3 | 1.8 to 2.8 | 2.0 | 2.2 | 2.4 |
| 6581 | 33% | 66% | 1% | 0.8 to 3 | 1.8 to 2.8 | 2.0 | 2.2 | 2.4 |
| 6582 | 34% | 65% | 1% | 0.8 to 3 | 1.8 to 2.8 | 2.0 | 2.2 | 2.4 |
| 6583 | 35% | 64% | 1% | 0.8 to 3 | 1.8 to 2.8 | 2.0 | 2.2 | 2.4 |
| 6584 | 36% | 63% | 1% | 0.8 to 3 | 1.8 to 2.8 | 2.0 | 2.2 | 2.4 |
| 6585 | 37% | 62% | 1% | 0.8 to 3 | 1.8 to 2.8 | 2.0 | 2.2 | 2.4 |
| 6586 | 38% | 61% | 1% | 0.8 to 3 | 1.8 to 2.8 | 2.0 | 2.2 | 2.4 |
| 6587 | 39% | 60% | 1% | 0.8 to 3 | 1.8 to 2.8 | 2.0 | 2.2 | 2.4 |
| 6588 | 40% | 59% | 1% | 0.8 to 3 | 1.8 to 2.8 | 2.0 | 2.2 | 2.4 |
| 6589 | 41% | 58% | 1% | 0.8 to 3 | 1.8 to 2.8 | 2.0 | 2.2 | 2.4 |
| 6590 | 42% | 57% | 1% | 0.8 to 3 | 1.8 to 2.8 | 2.0 | 2.2 | 2.4 |
| 6591 | 43% | 56% | 1% | 0.8 to 3 | 1.8 to 2.8 | 2.0 | 2.2 | 2.4 |
| 6592 | 44% | 55% | 1% | 0.8 to 3 | 1.8 to 2.8 | 2.0 | 2.2 | 2.4 |
| 6593 | 45% | 54% | 1% | 0.8 to 3 | 1.8 to 2.8 | 2.0 | 2.2 | 2.4 |
| 6594 | 46% | 53% | 1% | 0.8 to 3 | 1.8 to 2.8 | 2.0 | 2.2 | 2.4 |
| 6595 | 47% | 52% | 1% | 0.8 to 3 | 1.8 to 2.8 | 2.0 | 2.2 | 2.4 |
| 6596 | 48% | 51% | 1% | 0.8 to 3 | 1.8 to 2.8 | 2.0 | 2.2 | 2.4 |
| 6597 | 49% | 50% | 1% | 0.8 to 3 | 1.8 to 2.8 | 2.0 | 2.2 | 2.4 |
| 6598 | 50% | 49% | 1% | 0.8 to 3 | 1.8 to 2.8 | 2.0 | 2.2 | 2.4 |
| 6599 | 51% | 48% | 1% | 0.8 to 3 | 1.8 to 2.8 | 2.0 | 2.2 | 2.4 |
| 6600 | 52% | 47% | 1% | 0.8 to 3 | 1.8 to 2.8 | 2.0 | 2.2 | 2.4 |
| 6601 | 53% | 46% | 1% | 0.8 to 3 | 1.8 to 2.8 | 2.0 | 2.2 | 2.4 |
| 6602 | 54% | 45% | 1% | 0.8 to 3 | 1.8 to 2.8 | 2.0 | 2.2 | 2.4 |
| 6603 | 55% | 44% | 1% | 0.8 to 3 | 1.8 to 2.8 | 2.0 | 2.2 | 2.4 |
| 6604 | 56% | 43% | 1% | 0.8 to 3 | 1.8 to 2.8 | 2.0 | 2.2 | 2.4 |
| 6605 | 57% | 42% | 1% | 0.8 to 3 | 1.8 to 2.8 | 2.0 | 2.2 | 2.4 |
| 6606 | 58% | 41% | 1% | 0.8 to 3 | 1.8 to 2.8 | 2.0 | 2.2 | 2.4 |
| 6607 | 59% | 40% | 1% | 0.8 to 3 | 1.8 to 2.8 | 2.0 | 2.2 | 2.4 |
| 6608 | 60% | 39% | 1% | 0.8 to 3 | 1.8 to 2.8 | 2.0 | 2.2 | 2.4 |
| 6609 | 30% | 69% | 1.5% | 0.8 to 3 | 1.8 to 2.8 | 2.0 | 2.2 | 2.4 |
| 6610 | 31% | 68% | 1.5% | 0.8 to 3 | 1.8 to 2.8 | 2.0 | 2.2 | 2.4 |
| 6611 | 32% | 67% | 1.5% | 0.8 to 3 | 1.8 to 2.8 | 2.0 | 2.2 | 2.4 |
| 6612 | 33% | 66% | 1.5% | 0.8 to 3 | 1.8 to 2.8 | 2.0 | 2.2 | 2.4 |
| 6613 | 34% | 65% | 1.5% | 0.8 to 3 | 1.8 to 2.8 | 2.0 | 2.2 | 2.4 |
| 6614 | 35% | 64% | 1.5% | 0.8 to 3 | 1.8 to 2.8 | 2.0 | 2.2 | 2.4 |
| 6615 | 36% | 63% | 1.5% | 0.8 to 3 | 1.8 to 2.8 | 2.0 | 2.2 | 2.4 |
| 6616 | 37% | 62% | 1.5% | 0.8 to 3 | 1.8 to 2.8 | 2.0 | 2.2 | 2.4 |
| 6617 | 38% | 61% | 1.5% | 0.8 to 3 | 1.8 to 2.8 | 2.0 | 2.2 | 2.4 |
| 6618 | 39% | 60% | 1.5% | 0.8 to 3 | 1.8 to 2.8 | 2.0 | 2.2 | 2.4 |
| 6619 | 40% | 59% | 1.5% | 0.8 to 3 | 1.8 to 2.8 | 2.0 | 2.2 | 2.4 |
| 6620 | 41% | 58% | 1.5% | 0.8 to 3 | 1.8 to 2.8 | 2.0 | 2.2 | 2.4 |
| 6621 | 42% | 57% | 1.5% | 0.8 to 3 | 1.8 to 2.8 | 2.0 | 2.2 | 2.4 |
| 6622 | 43% | 56% | 1.5% | 0.8 to 3 | 1.8 to 2.8 | 2.0 | 2.2 | 2.4 |
| 6623 | 44% | 55% | 1.5% | 0.8 to 3 | 1.8 to 2.8 | 2.0 | 2.2 | 2.4 |
| 6624 | 45% | 54% | 1.5% | 0.8 to 3 | 1.8 to 2.8 | 2.0 | 2.2 | 2.4 |
| 6625 | 46% | 53% | 1.5% | 0.8 to 3 | 1.8 to 2.8 | 2.0 | 2.2 | 2.4 |
| 6626 | 47% | 52% | 1.5% | 0.8 to 3 | 1.8 to 2.8 | 2.0 | 2.2 | 2.4 |
| 6627 | 48% | 51% | 1.5% | 0.8 to 3 | 1.8 to 2.8 | 2.0 | 2.2 | 2.4 |
| 6628 | 49% | 50% | 1.5% | 0.8 to 3 | 1.8 to 2.8 | 2.0 | 2.2 | 2.4 |
| 6629 | 50% | 49% | 1.5% | 0.8 to 3 | 1.8 to 2.8 | 2.0 | 2.2 | 2.4 |
| 6630 | 51% | 48% | 1.5% | 0.8 to 3 | 1.8 to 2.8 | 2.0 | 2.2 | 2.4 |
| 6631 | 52% | 47% | 1.5% | 0.8 to 3 | 1.8 to 2.8 | 2.0 | 2.2 | 2.4 |
| 6632 | 53% | 46% | 1.5% | 0.8 to 3 | 1.8 to 2.8 | 2.0 | 2.2 | 2.4 |
| 6633 | 54% | 45% | 1.5% | 0.8 to 3 | 1.8 to 2.8 | 2.0 | 2.2 | 2.4 |
| 6634 | 55% | 44% | 1.5% | 0.8 to 3 | 1.8 to 2.8 | 2.0 | 2.2 | 2.4 |
| 6635 | 56% | 43% | 1.5% | 0.8 to 3 | 1.8 to 2.8 | 2.0 | 2.2 | 2.4 |
| 6636 | 57% | 42% | 1.5% | 0.8 to 3 | 1.8 to 2.8 | 2.0 | 2.2 | 2.4 |
| 6637 | 58% | 41% | 1.5% | 0.8 to 3 | 1.8 to 2.8 | 2.0 | 2.2 | 2.4 |

TABLE 15-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 | 10 to 12 | 9 to 11 | Range A | Range B | Species C | Species D | Species E |
| 6638 | 59% | 40% | 1.5% | 0.8 to 3 | 1.8 to 2.8 | 2.0 | 2.2 | 2.4 |
| 6639 | 60% | 39% | 1.5% | 0.8 to 3 | 1.8 to 2.8 | 2.0 | 2.2 | 2.4 |
| 6640 | 30% | 68% | 2% | 0.8 to 3 | 1.8 to 2.8 | 2.0 | 2.2 | 2.4 |
| 6641 | 31% | 67% | 2% | 0.8 to 3 | 1.8 to 2.8 | 2.0 | 2.2 | 2.4 |
| 6642 | 32% | 66% | 2% | 0.8 to 3 | 1.8 to 2.8 | 2.0 | 2.2 | 2.4 |
| 6643 | 33% | 65% | 2% | 0.8 to 3 | 1.8 to 2.8 | 2.0 | 2.2 | 2.4 |
| 6644 | 34% | 64% | 2% | 0.8 to 3 | 1.8 to 2.8 | 2.0 | 2.2 | 2.4 |
| 6645 | 35% | 63% | 2% | 0.8 to 3 | 1.8 to 2.8 | 2.0 | 2.2 | 2.4 |
| 6646 | 36% | 62% | 2% | 0.8 to 3 | 1.8 to 2.8 | 2.0 | 2.2 | 2.4 |
| 6647 | 37% | 61% | 2% | 0.8 to 3 | 1.8 to 2.8 | 2.0 | 2.2 | 2.4 |
| 6648 | 38% | 60% | 2% | 0.8 to 3 | 1.8 to 2.8 | 2.0 | 2.2 | 2.4 |
| 6649 | 39% | 59% | 2% | 0.8 to 3 | 1.8 to 2.8 | 2.0 | 2.2 | 2.4 |
| 6650 | 40% | 58% | 2% | 0.8 to 3 | 1.8 to 2.8 | 2.0 | 2.2 | 2.4 |
| 6651 | 41% | 57% | 2% | 0.8 to 3 | 1.8 to 2.8 | 2.0 | 2.2 | 2.4 |
| 6652 | 42% | 56% | 2% | 0.8 to 3 | 1.8 to 2.8 | 2.0 | 2.2 | 2.4 |
| 6653 | 43% | 55% | 2% | 0.8 to 3 | 1.8 to 2.8 | 2.0 | 2.2 | 2.4 |
| 6654 | 44% | 54% | 2% | 0.8 to 3 | 1.8 to 2.8 | 2.0 | 2.2 | 2.4 |
| 6655 | 45% | 53% | 2% | 0.8 to 3 | 1.8 to 2.8 | 2.0 | 2.2 | 2.4 |
| 6656 | 46% | 52% | 2% | 0.8 to 3 | 1.8 to 2.8 | 2.0 | 2.2 | 2.4 |
| 6657 | 47% | 51% | 2% | 0.8 to 3 | 1.8 to 2.8 | 2.0 | 2.2 | 2.4 |
| 6658 | 48% | 50% | 2% | 0.8 to 3 | 1.8 to 2.8 | 2.0 | 2.2 | 2.4 |
| 6659 | 49% | 49% | 2% | 0.8 to 3 | 1.8 to 2.8 | 2.0 | 2.2 | 2.4 |
| 6660 | 50% | 48% | 2% | 0.8 to 3 | 1.8 to 2.8 | 2.0 | 2.2 | 2.4 |
| 6661 | 51% | 47% | 2% | 0.8 to 3 | 1.8 to 2.8 | 2.0 | 2.2 | 2.4 |
| 6662 | 52% | 46% | 2% | 0.8 to 3 | 1.8 to 2.8 | 2.0 | 2.2 | 2.4 |
| 6663 | 53% | 45% | 2% | 0.8 to 3 | 1.8 to 2.8 | 2.0 | 2.2 | 2.4 |
| 6664 | 54% | 44% | 2% | 0.8 to 3 | 1.8 to 2.8 | 2.0 | 2.2 | 2.4 |
| 6665 | 55% | 43% | 2% | 0.8 to 3 | 1.8 to 2.8 | 2.0 | 2.2 | 2.4 |
| 6666 | 56% | 42% | 2% | 0.8 to 3 | 1.8 to 2.8 | 2.0 | 2.2 | 2.4 |
| 6667 | 57% | 41% | 2% | 0.8 to 3 | 1.8 to 2.8 | 2.0 | 2.2 | 2.4 |
| 6668 | 58% | 40% | 2% | 0.8 to 3 | 1.8 to 2.8 | 2.0 | 2.2 | 2.4 |
| 6669 | 59% | 39% | 2% | 0.8 to 3 | 1.8 to 2.8 | 2.0 | 2.2 | 2.4 |
| 6670 | 60% | 38% | 2% | 0.8 to 3 | 1.8 to 2.8 | 2.0 | 2.2 | 2.4 |
| 6671 | 30% | 68% | 2.5% | 0.8 to 3 | 1.8 to 2.8 | 2.0 | 2.2 | 2.4 |
| 6672 | 31% | 67% | 2.5% | 0.8 to 3 | 1.8 to 2.8 | 2.0 | 2.2 | 2.4 |
| 6673 | 32% | 66% | 2.5% | 0.8 to 3 | 1.8 to 2.8 | 2.0 | 2.2 | 2.4 |
| 6674 | 33% | 65% | 2.5% | 0.8 to 3 | 1.8 to 2.8 | 2.0 | 2.2 | 2.4 |
| 6675 | 34% | 64% | 2.5% | 0.8 to 3 | 1.8 to 2.8 | 2.0 | 2.2 | 2.4 |
| 6676 | 35% | 63% | 2.5% | 0.8 to 3 | 1.8 to 2.8 | 2.0 | 2.2 | 2.4 |
| 6677 | 36% | 62% | 2.5% | 0.8 to 3 | 1.8 to 2.8 | 2.0 | 2.2 | 2.4 |
| 6678 | 37% | 61% | 2.5% | 0.8 to 3 | 1.8 to 2.8 | 2.0 | 2.2 | 2.4 |
| 6679 | 38% | 60% | 2.5% | 0.8 to 3 | 1.8 to 2.8 | 2.0 | 2.2 | 2.4 |
| 6680 | 39% | 59% | 2.5% | 0.8 to 3 | 1.8 to 2.8 | 2.0 | 2.2 | 2.4 |
| 6681 | 40% | 58% | 2.5% | 0.8 to 3 | 1.8 to 2.8 | 2.0 | 2.2 | 2.4 |
| 6682 | 41% | 57% | 2.5% | 0.8 to 3 | 1.8 to 2.8 | 2.0 | 2.2 | 2.4 |
| 6683 | 42% | 56% | 2.5% | 0.8 to 3 | 1.8 to 2.8 | 2.0 | 2.2 | 2.4 |
| 6684 | 43% | 55% | 2.5% | 0.8 to 3 | 1.8 to 2.8 | 2.0 | 2.2 | 2.4 |
| 6685 | 44% | 54% | 2.5% | 0.8 to 3 | 1.8 to 2.8 | 2.0 | 2.2 | 2.4 |
| 6686 | 45% | 53% | 2.5% | 0.8 to 3 | 1.8 to 2.8 | 2.0 | 2.2 | 2.4 |
| 6687 | 46% | 52% | 2.5% | 0.8 to 3 | 1.8 to 2.8 | 2.0 | 2.2 | 2.4 |
| 6688 | 47% | 51% | 2.5% | 0.8 to 3 | 1.8 to 2.8 | 2.0 | 2.2 | 2.4 |
| 6689 | 48% | 50% | 2.5% | 0.8 to 3 | 1.8 to 2.8 | 2.0 | 2.2 | 2.4 |
| 6690 | 49% | 49% | 2.5% | 0.8 to 3 | 1.8 to 2.8 | 2.0 | 2.2 | 2.4 |
| 6691 | 50% | 48% | 2.5% | 0.8 to 3 | 1.8 to 2.8 | 2.0 | 2.2 | 2.4 |
| 6692 | 51% | 47% | 2.5% | 0.8 to 3 | 1.8 to 2.8 | 2.0 | 2.2 | 2.4 |
| 6693 | 52% | 46% | 2.5% | 0.8 to 3 | 1.8 to 2.8 | 2.0 | 2.2 | 2.4 |
| 6694 | 53% | 45% | 2.5% | 0.8 to 3 | 1.8 to 2.8 | 2.0 | 2.2 | 2.4 |
| 6695 | 54% | 44% | 2.5% | 0.8 to 3 | 1.8 to 2.8 | 2.0 | 2.2 | 2.4 |
| 6696 | 55% | 43% | 2.5% | 0.8 to 3 | 1.8 to 2.8 | 2.0 | 2.2 | 2.4 |
| 6697 | 56% | 42% | 2.5% | 0.8 to 3 | 1.8 to 2.8 | 2.0 | 2.2 | 2.4 |
| 6698 | 57% | 41% | 2.5% | 0.8 to 3 | 1.8 to 2.8 | 2.0 | 2.2 | 2.4 |
| 6699 | 58% | 40% | 2.5% | 0.8 to 3 | 1.8 to 2.8 | 2.0 | 2.2 | 2.4 |
| 6700 | 59% | 39% | 2.5% | 0.8 to 3 | 1.8 to 2.8 | 2.0 | 2.2 | 2.4 |
| 6701 | 60% | 38% | 2.5% | 0.8 to 3 | 1.8 to 2.8 | 2.0 | 2.2 | 2.4 |
| 6702 | 30% | 67% | 3% | 0.8 to 3 | 1.8 to 2.8 | 2.0 | 2.2 | 2.4 |
| 6703 | 31% | 66% | 3% | 0.8 to 3 | 1.8 to 2.8 | 2.0 | 2.2 | 2.4 |
| 6704 | 32% | 65% | 3% | 0.8 to 3 | 1.8 to 2.8 | 2.0 | 2.2 | 2.4 |
| 6705 | 33% | 64% | 3% | 0.8 to 3 | 1.8 to 2.8 | 2.0 | 2.2 | 2.4 |
| 6706 | 34% | 63% | 3% | 0.8 to 3 | 1.8 to 2.8 | 2.0 | 2.2 | 2.4 |
| 6707 | 35% | 62% | 3% | 0.8 to 3 | 1.8 to 2.8 | 2.0 | 2.2 | 2.4 |
| 6708 | 36% | 61% | 3% | 0.8 to 3 | 1.8 to 2.8 | 2.0 | 2.2 | 2.4 |

TABLE 15-continued

| | Alkyl Sulfate Alkyl Chain Length, Wt. % | Alkyl Chain Length, Wt. % | Alkyl Ether Sulfate ||||| 
| | | | Average mol. EO (Alternatives for each numbered species) |||||
| Species | 8 | 10 to 12 | 9 to 11 | Range A | Range B | Species C | Species D | Species E |
| --- | --- | --- | --- | --- | --- | --- | --- | --- |
| 6709 | 37% | 60% | 3% | 0.8 to 3 | 1.8 to 2.8 | 2.0 | 2.2 | 2.4 |
| 6710 | 38% | 59% | 3% | 0.8 to 3 | 1.8 to 2.8 | 2.0 | 2.2 | 2.4 |
| 6711 | 39% | 58% | 3% | 0.8 to 3 | 1.8 to 2.8 | 2.0 | 2.2 | 2.4 |
| 6712 | 40% | 57% | 3% | 0.8 to 3 | 1.8 to 2.8 | 2.0 | 2.2 | 2.4 |
| 6713 | 41% | 56% | 3% | 0.8 to 3 | 1.8 to 2.8 | 2.0 | 2.2 | 2.4 |
| 6714 | 42% | 55% | 3% | 0.8 to 3 | 1.8 to 2.8 | 2.0 | 2.2 | 2.4 |
| 6715 | 43% | 54% | 3% | 0.8 to 3 | 1.8 to 2.8 | 2.0 | 2.2 | 2.4 |
| 6716 | 44% | 53% | 3% | 0.8 to 3 | 1.8 to 2.8 | 2.0 | 2.2 | 2.4 |
| 6717 | 45% | 52% | 3% | 0.8 to 3 | 1.8 to 2.8 | 2.0 | 2.2 | 2.4 |
| 6718 | 46% | 51% | 3% | 0.8 to 3 | 1.8 to 2.8 | 2.0 | 2.2 | 2.4 |
| 6719 | 47% | 50% | 3% | 0.8 to 3 | 1.8 to 2.8 | 2.0 | 2.2 | 2.4 |
| 6720 | 48% | 49% | 3% | 0.8 to 3 | 1.8 to 2.8 | 2.0 | 2.2 | 2.4 |
| 6721 | 49% | 48% | 3% | 0.8 to 3 | 1.8 to 2.8 | 2.0 | 2.2 | 2.4 |
| 6722 | 50% | 47% | 3% | 0.8 to 3 | 1.8 to 2.8 | 2.0 | 2.2 | 2.4 |
| 6723 | 51% | 46% | 3% | 0.8 to 3 | 1.8 to 2.8 | 2.0 | 2.2 | 2.4 |
| 6724 | 52% | 45% | 3% | 0.8 to 3 | 1.8 to 2.8 | 2.0 | 2.2 | 2.4 |
| 6725 | 53% | 44% | 3% | 0.8 to 3 | 1.8 to 2.8 | 2.0 | 2.2 | 2.4 |
| 6726 | 54% | 43% | 3% | 0.8 to 3 | 1.8 to 2.8 | 2.0 | 2.2 | 2.4 |
| 6727 | 55% | 42% | 3% | 0.8 to 3 | 1.8 to 2.8 | 2.0 | 2.2 | 2.4 |
| 6728 | 56% | 41% | 3% | 0.8 to 3 | 1.8 to 2.8 | 2.0 | 2.2 | 2.4 |
| 6729 | 57% | 40% | 3% | 0.8 to 3 | 1.8 to 2.8 | 2.0 | 2.2 | 2.4 |
| 6730 | 58% | 39% | 3% | 0.8 to 3 | 1.8 to 2.8 | 2.0 | 2.2 | 2.4 |
| 6731 | 59% | 38% | 3% | 0.8 to 3 | 1.8 to 2.8 | 2.0 | 2.2 | 2.4 |
| 6732 | 60% | 37% | 3% | 0.8 to 3 | 1.8 to 2.8 | 2.0 | 2.2 | 2.4 |
| 6733 | 30% | 67% | 3.5% | 0.8 to 3 | 1.8 to 2.8 | 2.0 | 2.2 | 2.4 |
| 6734 | 31% | 66% | 3.5% | 0.8 to 3 | 1.8 to 2.8 | 2.0 | 2.2 | 2.4 |
| 6735 | 32% | 65% | 3.5% | 0.8 to 3 | 1.8 to 2.8 | 2.0 | 2.2 | 2.4 |
| 6736 | 33% | 64% | 3.5% | 0.8 to 3 | 1.8 to 2.8 | 2.0 | 2.2 | 2.4 |
| 6737 | 34% | 63% | 3.5% | 0.8 to 3 | 1.8 to 2.8 | 2.0 | 2.2 | 2.4 |
| 6738 | 35% | 62% | 3.5% | 0.8 to 3 | 1.8 to 2.8 | 2.0 | 2.2 | 2.4 |
| 6739 | 36% | 61% | 3.5% | 0.8 to 3 | 1.8 to 2.8 | 2.0 | 2.2 | 2.4 |
| 6740 | 37% | 60% | 3.5% | 0.8 to 3 | 1.8 to 2.8 | 2.0 | 2.2 | 2.4 |
| 6741 | 38% | 59% | 3.5% | 0.8 to 3 | 1.8 to 2.8 | 2.0 | 2.2 | 2.4 |
| 6742 | 39% | 58% | 3.5% | 0.8 to 3 | 1.8 to 2.8 | 2.0 | 2.2 | 2.4 |
| 6743 | 40% | 57% | 3.5% | 0.8 to 3 | 1.8 to 2.8 | 2.0 | 2.2 | 2.4 |
| 6744 | 41% | 56% | 3.5% | 0.8 to 3 | 1.8 to 2.8 | 2.0 | 2.2 | 2.4 |
| 6745 | 42% | 55% | 3.5% | 0.8 to 3 | 1.8 to 2.8 | 2.0 | 2.2 | 2.4 |
| 6746 | 43% | 54% | 3.5% | 0.8 to 3 | 1.8 to 2.8 | 2.0 | 2.2 | 2.4 |
| 6747 | 44% | 53% | 3.5% | 0.8 to 3 | 1.8 to 2.8 | 2.0 | 2.2 | 2.4 |
| 6748 | 45% | 52% | 3.5% | 0.8 to 3 | 1.8 to 2.8 | 2.0 | 2.2 | 2.4 |
| 6749 | 46% | 51% | 3.5% | 0.8 to 3 | 1.8 to 2.8 | 2.0 | 2.2 | 2.4 |
| 6750 | 47% | 50% | 3.5% | 0.8 to 3 | 1.8 to 2.8 | 2.0 | 2.2 | 2.4 |
| 6751 | 48% | 49% | 3.5% | 0.8 to 3 | 1.8 to 2.8 | 2.0 | 2.2 | 2.4 |
| 6752 | 49% | 48% | 3.5% | 0.8 to 3 | 1.8 to 2.8 | 2.0 | 2.2 | 2.4 |
| 6753 | 50% | 47% | 3.5% | 0.8 to 3 | 1.8 to 2.8 | 2.0 | 2.2 | 2.4 |
| 6754 | 51% | 46% | 3.5% | 0.8 to 3 | 1.8 to 2.8 | 2.0 | 2.2 | 2.4 |
| 6755 | 52% | 45% | 3.5% | 0.8 to 3 | 1.8 to 2.8 | 2.0 | 2.2 | 2.4 |
| 6756 | 53% | 44% | 3.5% | 0.8 to 3 | 1.8 to 2.8 | 2.0 | 2.2 | 2.4 |
| 6757 | 54% | 43% | 3.5% | 0.8 to 3 | 1.8 to 2.8 | 2.0 | 2.2 | 2.4 |
| 6758 | 55% | 42% | 3.5% | 0.8 to 3 | 1.8 to 2.8 | 2.0 | 2.2 | 2.4 |
| 6759 | 56% | 41% | 3.5% | 0.8 to 3 | 1.8 to 2.8 | 2.0 | 2.2 | 2.4 |
| 6760 | 57% | 40% | 3.5% | 0.8 to 3 | 1.8 to 2.8 | 2.0 | 2.2 | 2.4 |
| 6761 | 58% | 39% | 3.5% | 0.8 to 3 | 1.8 to 2.8 | 2.0 | 2.2 | 2.4 |
| 6762 | 59% | 38% | 3.5% | 0.8 to 3 | 1.8 to 2.8 | 2.0 | 2.2 | 2.4 |
| 6763 | 60% | 37% | 3.5% | 0.8 to 3 | 1.8 to 2.8 | 2.0 | 2.2 | 2.4 |
| 6764 | 30% | 66% | 4% | 0.8 to 3 | 1.8 to 2.8 | 2.0 | 2.2 | 2.4 |
| 6765 | 31% | 65% | 4% | 0.8 to 3 | 1.8 to 2.8 | 2.0 | 2.2 | 2.4 |
| 6766 | 32% | 64% | 4% | 0.8 to 3 | 1.8 to 2.8 | 2.0 | 2.2 | 2.4 |
| 6767 | 33% | 63% | 4% | 0.8 to 3 | 1.8 to 2.8 | 2.0 | 2.2 | 2.4 |
| 6768 | 34% | 62% | 4% | 0.8 to 3 | 1.8 to 2.8 | 2.0 | 2.2 | 2.4 |
| 6769 | 35% | 61% | 4% | 0.8 to 3 | 1.8 to 2.8 | 2.0 | 2.2 | 2.4 |
| 6770 | 36% | 60% | 4% | 0.8 to 3 | 1.8 to 2.8 | 2.0 | 2.2 | 2.4 |
| 6771 | 37% | 59% | 4% | 0.8 to 3 | 1.8 to 2.8 | 2.0 | 2.2 | 2.4 |
| 6772 | 38% | 58% | 4% | 0.8 to 3 | 1.8 to 2.8 | 2.0 | 2.2 | 2.4 |
| 6773 | 39% | 57% | 4% | 0.8 to 3 | 1.8 to 2.8 | 2.0 | 2.2 | 2.4 |
| 6774 | 40% | 56% | 4% | 0.8 to 3 | 1.8 to 2.8 | 2.0 | 2.2 | 2.4 |
| 6775 | 41% | 55% | 4% | 0.8 to 3 | 1.8 to 2.8 | 2.0 | 2.2 | 2.4 |
| 6776 | 42% | 54% | 4% | 0.8 to 3 | 1.8 to 2.8 | 2.0 | 2.2 | 2.4 |
| 6777 | 43% | 53% | 4% | 0.8 to 3 | 1.8 to 2.8 | 2.0 | 2.2 | 2.4 |
| 6778 | 44% | 52% | 4% | 0.8 to 3 | 1.8 to 2.8 | 2.0 | 2.2 | 2.4 |
| 6779 | 45% | 51% | 4% | 0.8 to 3 | 1.8 to 2.8 | 2.0 | 2.2 | 2.4 |

TABLE 15-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 | 10 to 12 | 9 to 11 | Range A | Range B | Species C | Species D | Species E |
| 6780 | 46% | 50% | 4% | 0.8 to 3 | 1.8 to 2.8 | 2.0 | 2.2 | 2.4 |
| 6781 | 47% | 49% | 4% | 0.8 to 3 | 1.8 to 2.8 | 2.0 | 2.2 | 2.4 |
| 6782 | 48% | 48% | 4% | 0.8 to 3 | 1.8 to 2.8 | 2.0 | 2.2 | 2.4 |
| 6783 | 49% | 47% | 4% | 0.8 to 3 | 1.8 to 2.8 | 2.0 | 2.2 | 2.4 |
| 6784 | 50% | 46% | 4% | 0.8 to 3 | 1.8 to 2.8 | 2.0 | 2.2 | 2.4 |
| 6785 | 51% | 45% | 4% | 0.8 to 3 | 1.8 to 2.8 | 2.0 | 2.2 | 2.4 |
| 6786 | 52% | 44% | 4% | 0.8 to 3 | 1.8 to 2.8 | 2.0 | 2.2 | 2.4 |
| 6787 | 53% | 43% | 4% | 0.8 to 3 | 1.8 to 2.8 | 2.0 | 2.2 | 2.4 |
| 6788 | 54% | 42% | 4% | 0.8 to 3 | 1.8 to 2.8 | 2.0 | 2.2 | 2.4 |
| 6789 | 55% | 41% | 4% | 0.8 to 3 | 1.8 to 2.8 | 2.0 | 2.2 | 2.4 |
| 6790 | 56% | 40% | 4% | 0.8 to 3 | 1.8 to 2.8 | 2.0 | 2.2 | 2.4 |
| 6791 | 57% | 39% | 4% | 0.8 to 3 | 1.8 to 2.8 | 2.0 | 2.2 | 2.4 |
| 6792 | 58% | 38% | 4% | 0.8 to 3 | 1.8 to 2.8 | 2.0 | 2.2 | 2.4 |
| 6793 | 59% | 37% | 4% | 0.8 to 3 | 1.8 to 2.8 | 2.0 | 2.2 | 2.4 |
| 6794 | 60% | 36% | 4% | 0.8 to 3 | 1.8 to 2.8 | 2.0 | 2.2 | 2.4 |
| 6795 | 30% | 66% | 4.5% | 0.8 to 3 | 1.8 to 2.8 | 2.0 | 2.2 | 2.4 |
| 6796 | 31% | 65% | 4.5% | 0.8 to 3 | 1.8 to 2.8 | 2.0 | 2.2 | 2.4 |
| 6797 | 32% | 64% | 4.5% | 0.8 to 3 | 1.8 to 2.8 | 2.0 | 2.2 | 2.4 |
| 6798 | 33% | 63% | 4.5% | 0.8 to 3 | 1.8 to 2.8 | 2.0 | 2.2 | 2.4 |
| 6799 | 34% | 62% | 4.5% | 0.8 to 3 | 1.8 to 2.8 | 2.0 | 2.2 | 2.4 |
| 6800 | 35% | 61% | 4.5% | 0.8 to 3 | 1.8 to 2.8 | 2.0 | 2.2 | 2.4 |
| 6801 | 36% | 60% | 4.5% | 0.8 to 3 | 1.8 to 2.8 | 2.0 | 2.2 | 2.4 |
| 6802 | 37% | 59% | 4.5% | 0.8 to 3 | 1.8 to 2.8 | 2.0 | 2.2 | 2.4 |
| 6803 | 38% | 58% | 4.5% | 0.8 to 3 | 1.8 to 2.8 | 2.0 | 2.2 | 2.4 |
| 6804 | 39% | 57% | 4.5% | 0.8 to 3 | 1.8 to 2.8 | 2.0 | 2.2 | 2.4 |
| 6805 | 40% | 56% | 4.5% | 0.8 to 3 | 1.8 to 2.8 | 2.0 | 2.2 | 2.4 |
| 6806 | 41% | 55% | 4.5% | 0.8 to 3 | 1.8 to 2.8 | 2.0 | 2.2 | 2.4 |
| 6807 | 42% | 54% | 4.5% | 0.8 to 3 | 1.8 to 2.8 | 2.0 | 2.2 | 2.4 |
| 6808 | 43% | 53% | 4.5% | 0.8 to 3 | 1.8 to 2.8 | 2.0 | 2.2 | 2.4 |
| 6809 | 44% | 52% | 4.5% | 0.8 to 3 | 1.8 to 2.8 | 2.0 | 2.2 | 2.4 |
| 6810 | 45% | 51% | 4.5% | 0.8 to 3 | 1.8 to 2.8 | 2.0 | 2.2 | 2.4 |
| 6811 | 46% | 50% | 4.5% | 0.8 to 3 | 1.8 to 2.8 | 2.0 | 2.2 | 2.4 |
| 6812 | 47% | 49% | 4.5% | 0.8 to 3 | 1.8 to 2.8 | 2.0 | 2.2 | 2.4 |
| 6813 | 48% | 48% | 4.5% | 0.8 to 3 | 1.8 to 2.8 | 2.0 | 2.2 | 2.4 |
| 6814 | 49% | 47% | 4.5% | 0.8 to 3 | 1.8 to 2.8 | 2.0 | 2.2 | 2.4 |
| 6815 | 50% | 46% | 4.5% | 0.8 to 3 | 1.8 to 2.8 | 2.0 | 2.2 | 2.4 |
| 6816 | 51% | 45% | 4.5% | 0.8 to 3 | 1.8 to 2.8 | 2.0 | 2.2 | 2.4 |
| 6817 | 52% | 44% | 4.5% | 0.8 to 3 | 1.8 to 2.8 | 2.0 | 2.2 | 2.4 |
| 6818 | 53% | 43% | 4.5% | 0.8 to 3 | 1.8 to 2.8 | 2.0 | 2.2 | 2.4 |
| 6819 | 54% | 42% | 4.5% | 0.8 to 3 | 1.8 to 2.8 | 2.0 | 2.2 | 2.4 |
| 6820 | 55% | 41% | 4.5% | 0.8 to 3 | 1.8 to 2.8 | 2.0 | 2.2 | 2.4 |
| 6821 | 56% | 40% | 4.5% | 0.8 to 3 | 1.8 to 2.8 | 2.0 | 2.2 | 2.4 |
| 6822 | 57% | 39% | 4.5% | 0.8 to 3 | 1.8 to 2.8 | 2.0 | 2.2 | 2.4 |
| 6823 | 58% | 38% | 4.5% | 0.8 to 3 | 1.8 to 2.8 | 2.0 | 2.2 | 2.4 |
| 6824 | 59% | 37% | 4.5% | 0.8 to 3 | 1.8 to 2.8 | 2.0 | 2.2 | 2.4 |
| 6825 | 60% | 36% | 4.5% | 0.8 to 3 | 1.8 to 2.8 | 2.0 | 2.2 | 2.4 |
| 6826 | 30% | 65% | 5% | 0.8 to 3 | 1.8 to 2.8 | 2.0 | 2.2 | 2.4 |
| 6827 | 31% | 64% | 5% | 0.8 to 3 | 1.8 to 2.8 | 2.0 | 2.2 | 2.4 |
| 6828 | 32% | 63% | 5% | 0.8 to 3 | 1.8 to 2.8 | 2.0 | 2.2 | 2.4 |
| 6829 | 33% | 62% | 5% | 0.8 to 3 | 1.8 to 2.8 | 2.0 | 2.2 | 2.4 |
| 6830 | 34% | 61% | 5% | 0.8 to 3 | 1.8 to 2.8 | 2.0 | 2.2 | 2.4 |
| 6831 | 35% | 60% | 5% | 0.8 to 3 | 1.8 to 2.8 | 2.0 | 2.2 | 2.4 |
| 6832 | 36% | 59% | 5% | 0.8 to 3 | 1.8 to 2.8 | 2.0 | 2.2 | 2.4 |
| 6833 | 37% | 58% | 5% | 0.8 to 3 | 1.8 to 2.8 | 2.0 | 2.2 | 2.4 |
| 6834 | 38% | 57% | 5% | 0.8 to 3 | 1.8 to 2.8 | 2.0 | 2.2 | 2.4 |
| 6835 | 39% | 56% | 5% | 0.8 to 3 | 1.8 to 2.8 | 2.0 | 2.2 | 2.4 |
| 6836 | 40% | 55% | 5% | 0.8 to 3 | 1.8 to 2.8 | 2.0 | 2.2 | 2.4 |
| 6837 | 41% | 54% | 5% | 0.8 to 3 | 1.8 to 2.8 | 2.0 | 2.2 | 2.4 |
| 6838 | 42% | 53% | 5% | 0.8 to 3 | 1.8 to 2.8 | 2.0 | 2.2 | 2.4 |
| 6839 | 43% | 52% | 5% | 0.8 to 3 | 1.8 to 2.8 | 2.0 | 2.2 | 2.4 |
| 6840 | 44% | 51% | 5% | 0.8 to 3 | 1.8 to 2.8 | 2.0 | 2.2 | 2.4 |
| 6841 | 45% | 50% | 5% | 0.8 to 3 | 1.8 to 2.8 | 2.0 | 2.2 | 2.4 |
| 6842 | 46% | 49% | 5% | 0.8 to 3 | 1.8 to 2.8 | 2.0 | 2.2 | 2.4 |
| 6843 | 47% | 48% | 5% | 0.8 to 3 | 1.8 to 2.8 | 2.0 | 2.2 | 2.4 |
| 6844 | 48% | 47% | 5% | 0.8 to 3 | 1.8 to 2.8 | 2.0 | 2.2 | 2.4 |
| 6845 | 49% | 46% | 5% | 0.8 to 3 | 1.8 to 2.8 | 2.0 | 2.2 | 2.4 |
| 6846 | 50% | 45% | 5% | 0.8 to 3 | 1.8 to 2.8 | 2.0 | 2.2 | 2.4 |
| 6847 | 51% | 44% | 5% | 0.8 to 3 | 1.8 to 2.8 | 2.0 | 2.2 | 2.4 |
| 6848 | 52% | 43% | 5% | 0.8 to 3 | 1.8 to 2.8 | 2.0 | 2.2 | 2.4 |
| 6849 | 53% | 42% | 5% | 0.8 to 3 | 1.8 to 2.8 | 2.0 | 2.2 | 2.4 |
| 6850 | 54% | 41% | 5% | 0.8 to 3 | 1.8 to 2.8 | 2.0 | 2.2 | 2.4 |

TABLE 15-continued

| | | Alkyl Ether Sulfate | | | | | |
|---|---|---|---|---|---|---|---|
| | Alkyl Sulfate Alkyl Chain Length, Wt. % | Alkyl Chain Length, Wt. % | Average mol. EO (Alternatives for each numbered species) | | | | |
| Species | 8 | 10 to 12 | 9 to 11 | Range A | Range B | Species C | Species D | Species E |
| 6851 | 55% | 40% | 5% | 0.8 to 3 | 1.8 to 2.8 | 2.0 | 2.2 | 2.4 |
| 6852 | 56% | 39% | 5% | 0.8 to 3 | 1.8 to 2.8 | 2.0 | 2.2 | 2.4 |
| 6853 | 57% | 38% | 5% | 0.8 to 3 | 1.8 to 2.8 | 2.0 | 2.2 | 2.4 |
| 6854 | 58% | 37% | 5% | 0.8 to 3 | 1.8 to 2.8 | 2.0 | 2.2 | 2.4 |
| 6855 | 59% | 36% | 5% | 0.8 to 3 | 1.8 to 2.8 | 2.0 | 2.2 | 2.4 |
| 6856 | 60% | 35% | 5% | 0.8 to 3 | 1.8 to 2.8 | 2.0 | 2.2 | 2.4 |
| 6857 | 30% | 65% | 5.5% | 0.8 to 3 | 1.8 to 2.8 | 2.0 | 2.2 | 2.4 |
| 6858 | 31% | 64% | 5.5% | 0.8 to 3 | 1.8 to 2.8 | 2.0 | 2.2 | 2.4 |
| 6859 | 32% | 63% | 5.5% | 0.8 to 3 | 1.8 to 2.8 | 2.0 | 2.2 | 2.4 |
| 6860 | 33% | 62% | 5.5% | 0.8 to 3 | 1.8 to 2.8 | 2.0 | 2.2 | 2.4 |
| 6861 | 34% | 61% | 5.5% | 0.8 to 3 | 1.8 to 2.8 | 2.0 | 2.2 | 2.4 |
| 6862 | 35% | 60% | 5.5% | 0.8 to 3 | 1.8 to 2.8 | 2.0 | 2.2 | 2.4 |
| 6863 | 36% | 59% | 5.5% | 0.8 to 3 | 1.8 to 2.8 | 2.0 | 2.2 | 2.4 |
| 6864 | 37% | 58% | 5.5% | 0.8 to 3 | 1.8 to 2.8 | 2.0 | 2.2 | 2.4 |
| 6865 | 38% | 57% | 5.5% | 0.8 to 3 | 1.8 to 2.8 | 2.0 | 2.2 | 2.4 |
| 6866 | 39% | 56% | 5.5% | 0.8 to 3 | 1.8 to 2.8 | 2.0 | 2.2 | 2.4 |
| 6867 | 40% | 55% | 5.5% | 0.8 to 3 | 1.8 to 2.8 | 2.0 | 2.2 | 2.4 |
| 6868 | 41% | 54% | 5.5% | 0.8 to 3 | 1.8 to 2.8 | 2.0 | 2.2 | 2.4 |
| 6869 | 42% | 53% | 5.5% | 0.8 to 3 | 1.8 to 2.8 | 2.0 | 2.2 | 2.4 |
| 6870 | 43% | 52% | 5.5% | 0.8 to 3 | 1.8 to 2.8 | 2.0 | 2.2 | 2.4 |
| 6871 | 44% | 51% | 5.5% | 0.8 to 3 | 1.8 to 2.8 | 2.0 | 2.2 | 2.4 |
| 6872 | 45% | 50% | 5.5% | 0.8 to 3 | 1.8 to 2.8 | 2.0 | 2.2 | 2.4 |
| 6873 | 46% | 49% | 5.5% | 0.8 to 3 | 1.8 to 2.8 | 2.0 | 2.2 | 2.4 |
| 6874 | 47% | 48% | 5.5% | 0.8 to 3 | 1.8 to 2.8 | 2.0 | 2.2 | 2.4 |
| 6875 | 48% | 47% | 5.5% | 0.8 to 3 | 1.8 to 2.8 | 2.0 | 2.2 | 2.4 |
| 6876 | 49% | 46% | 5.5% | 0.8 to 3 | 1.8 to 2.8 | 2.0 | 2.2 | 2.4 |
| 6877 | 50% | 45% | 5.5% | 0.8 to 3 | 1.8 to 2.8 | 2.0 | 2.2 | 2.4 |
| 6878 | 51% | 44% | 5.5% | 0.8 to 3 | 1.8 to 2.8 | 2.0 | 2.2 | 2.4 |
| 6879 | 52% | 43% | 5.5% | 0.8 to 3 | 1.8 to 2.8 | 2.0 | 2.2 | 2.4 |
| 6880 | 53% | 42% | 5.5% | 0.8 to 3 | 1.8 to 2.8 | 2.0 | 2.2 | 2.4 |
| 6881 | 54% | 41% | 5.5% | 0.8 to 3 | 1.8 to 2.8 | 2.0 | 2.2 | 2.4 |
| 6882 | 55% | 40% | 5.5% | 0.8 to 3 | 1.8 to 2.8 | 2.0 | 2.2 | 2.4 |
| 6883 | 56% | 39% | 5.5% | 0.8 to 3 | 1.8 to 2.8 | 2.0 | 2.2 | 2.4 |
| 6884 | 57% | 38% | 5.5% | 0.8 to 3 | 1.8 to 2.8 | 2.0 | 2.2 | 2.4 |
| 6885 | 58% | 37% | 5.5% | 0.8 to 3 | 1.8 to 2.8 | 2.0 | 2.2 | 2.4 |
| 6886 | 59% | 36% | 5.5% | 0.8 to 3 | 1.8 to 2.8 | 2.0 | 2.2 | 2.4 |
| 6887 | 60% | 35% | 5.5% | 0.8 to 3 | 1.8 to 2.8 | 2.0 | 2.2 | 2.4 |
| 6888 | 30% | 64% | 6% | 0.8 to 3 | 1.8 to 2.8 | 2.0 | 2.2 | 2.4 |
| 6889 | 31% | 63% | 6% | 0.8 to 3 | 1.8 to 2.8 | 2.0 | 2.2 | 2.4 |
| 6890 | 32% | 62% | 6% | 0.8 to 3 | 1.8 to 2.8 | 2.0 | 2.2 | 2.4 |
| 6891 | 33% | 61% | 6% | 0.8 to 3 | 1.8 to 2.8 | 2.0 | 2.2 | 2.4 |
| 6892 | 34% | 60% | 6% | 0.8 to 3 | 1.8 to 2.8 | 2.0 | 2.2 | 2.4 |
| 6893 | 35% | 59% | 6% | 0.8 to 3 | 1.8 to 2.8 | 2.0 | 2.2 | 2.4 |
| 6894 | 36% | 58% | 6% | 0.8 to 3 | 1.8 to 2.8 | 2.0 | 2.2 | 2.4 |
| 6895 | 37% | 57% | 6% | 0.8 to 3 | 1.8 to 2.8 | 2.0 | 2.2 | 2.4 |
| 6896 | 38% | 56% | 6% | 0.8 to 3 | 1.8 to 2.8 | 2.0 | 2.2 | 2.4 |
| 6897 | 39% | 55% | 6% | 0.8 to 3 | 1.8 to 2.8 | 2.0 | 2.2 | 2.4 |
| 6898 | 40% | 54% | 6% | 0.8 to 3 | 1.8 to 2.8 | 2.0 | 2.2 | 2.4 |
| 6899 | 41% | 53% | 6% | 0.8 to 3 | 1.8 to 2.8 | 2.0 | 2.2 | 2.4 |
| 6900 | 42% | 52% | 6% | 0.8 to 3 | 1.8 to 2.8 | 2.0 | 2.2 | 2.4 |
| 6901 | 43% | 51% | 6% | 0.8 to 3 | 1.8 to 2.8 | 2.0 | 2.2 | 2.4 |
| 6902 | 44% | 50% | 6% | 0.8 to 3 | 1.8 to 2.8 | 2.0 | 2.2 | 2.4 |
| 6903 | 45% | 49% | 6% | 0.8 to 3 | 1.8 to 2.8 | 2.0 | 2.2 | 2.4 |
| 6904 | 46% | 48% | 6% | 0.8 to 3 | 1.8 to 2.8 | 2.0 | 2.2 | 2.4 |
| 6905 | 47% | 47% | 6% | 0.8 to 3 | 1.8 to 2.8 | 2.0 | 2.2 | 2.4 |
| 6906 | 48% | 46% | 6% | 0.8 to 3 | 1.8 to 2.8 | 2.0 | 2.2 | 2.4 |
| 6907 | 49% | 45% | 6% | 0.8 to 3 | 1.8 to 2.8 | 2.0 | 2.2 | 2.4 |
| 6908 | 50% | 44% | 6% | 0.8 to 3 | 1.8 to 2.8 | 2.0 | 2.2 | 2.4 |
| 6909 | 51% | 43% | 6% | 0.8 to 3 | 1.8 to 2.8 | 2.0 | 2.2 | 2.4 |
| 6910 | 52% | 42% | 6% | 0.8 to 3 | 1.8 to 2.8 | 2.0 | 2.2 | 2.4 |
| 6911 | 53% | 41% | 6% | 0.8 to 3 | 1.8 to 2.8 | 2.0 | 2.2 | 2.4 |
| 6912 | 54% | 40% | 6% | 0.8 to 3 | 1.8 to 2.8 | 2.0 | 2.2 | 2.4 |
| 6913 | 55% | 39% | 6% | 0.8 to 3 | 1.8 to 2.8 | 2.0 | 2.2 | 2.4 |
| 6914 | 56% | 38% | 6% | 0.8 to 3 | 1.8 to 2.8 | 2.0 | 2.2 | 2.4 |
| 6915 | 57% | 37% | 6% | 0.8 to 3 | 1.8 to 2.8 | 2.0 | 2.2 | 2.4 |
| 6916 | 58% | 36% | 6% | 0.8 to 3 | 1.8 to 2.8 | 2.0 | 2.2 | 2.4 |
| 6917 | 59% | 35% | 6% | 0.8 to 3 | 1.8 to 2.8 | 2.0 | 2.2 | 2.4 |
| 6918 | 60% | 34% | 6% | 0.8 to 3 | 1.8 to 2.8 | 2.0 | 2.2 | 2.4 |
| 6919 | 30% | 64% | 6.5% | 0.8 to 3 | 1.8 to 2.8 | 2.0 | 2.2 | 2.4 |
| 6920 | 31% | 63% | 6.5% | 0.8 to 3 | 1.8 to 2.8 | 2.0 | 2.2 | 2.4 |
| 6921 | 32% | 62% | 6.5% | 0.8 to 3 | 1.8 to 2.8 | 2.0 | 2.2 | 2.4 |

TABLE 15-continued

| | Alkyl Sulfate Alkyl Chain Length, Wt. % | Alkyl Ether Sulfate | | | | | |
|---|---|---|---|---|---|---|---|
| | | Alkyl Chain Length, Wt. % | Average mol. EO (Alternatives for each numbered species) | | | | |
| Species | 8 | 10 to 12 | 9 to 11 | Range A | Range B | Species C | Species D | Species E |
| 6922 | 33% | 61% | 6.5% | 0.8 to 3 | 1.8 to 2.8 | 2.0 | 2.2 | 2.4 |
| 6923 | 34% | 60% | 6.5% | 0.8 to 3 | 1.8 to 2.8 | 2.0 | 2.2 | 2.4 |
| 6924 | 35% | 59% | 6.5% | 0.8 to 3 | 1.8 to 2.8 | 2.0 | 2.2 | 2.4 |
| 6925 | 36% | 58% | 6.5% | 0.8 to 3 | 1.8 to 2.8 | 2.0 | 2.2 | 2.4 |
| 6926 | 37% | 57% | 6.5% | 0.8 to 3 | 1.8 to 2.8 | 2.0 | 2.2 | 2.4 |
| 6927 | 38% | 56% | 6.5% | 0.8 to 3 | 1.8 to 2.8 | 2.0 | 2.2 | 2.4 |
| 6928 | 39% | 55% | 6.5% | 0.8 to 3 | 1.8 to 2.8 | 2.0 | 2.2 | 2.4 |
| 6929 | 40% | 54% | 6.5% | 0.8 to 3 | 1.8 to 2.8 | 2.0 | 2.2 | 2.4 |
| 6930 | 41% | 53% | 6.5% | 0.8 to 3 | 1.8 to 2.8 | 2.0 | 2.2 | 2.4 |
| 6931 | 42% | 52% | 6.5% | 0.8 to 3 | 1.8 to 2.8 | 2.0 | 2.2 | 2.4 |
| 6932 | 43% | 51% | 6.5% | 0.8 to 3 | 1.8 to 2.8 | 2.0 | 2.2 | 2.4 |
| 6933 | 44% | 50% | 6.5% | 0.8 to 3 | 1.8 to 2.8 | 2.0 | 2.2 | 2.4 |
| 6934 | 45% | 49% | 6.5% | 0.8 to 3 | 1.8 to 2.8 | 2.0 | 2.2 | 2.4 |
| 6935 | 46% | 48% | 6.5% | 0.8 to 3 | 1.8 to 2.8 | 2.0 | 2.2 | 2.4 |
| 6936 | 47% | 47% | 6.5% | 0.8 to 3 | 1.8 to 2.8 | 2.0 | 2.2 | 2.4 |
| 6937 | 48% | 46% | 6.5% | 0.8 to 3 | 1.8 to 2.8 | 2.0 | 2.2 | 2.4 |
| 6938 | 49% | 45% | 6.5% | 0.8 to 3 | 1.8 to 2.8 | 2.0 | 2.2 | 2.4 |
| 6939 | 50% | 44% | 6.5% | 0.8 to 3 | 1.8 to 2.8 | 2.0 | 2.2 | 2.4 |
| 6940 | 51% | 43% | 6.5% | 0.8 to 3 | 1.8 to 2.8 | 2.0 | 2.2 | 2.4 |
| 6941 | 52% | 42% | 6.5% | 0.8 to 3 | 1.8 to 2.8 | 2.0 | 2.2 | 2.4 |
| 6942 | 53% | 41% | 6.5% | 0.8 to 3 | 1.8 to 2.8 | 2.0 | 2.2 | 2.4 |
| 6943 | 54% | 40% | 6.5% | 0.8 to 3 | 1.8 to 2.8 | 2.0 | 2.2 | 2.4 |
| 6944 | 55% | 39% | 6.5% | 0.8 to 3 | 1.8 to 2.8 | 2.0 | 2.2 | 2.4 |
| 6945 | 56% | 38% | 6.5% | 0.8 to 3 | 1.8 to 2.8 | 2.0 | 2.2 | 2.4 |
| 6946 | 57% | 37% | 6.5% | 0.8 to 3 | 1.8 to 2.8 | 2.0 | 2.2 | 2.4 |
| 6947 | 58% | 36% | 6.5% | 0.8 to 3 | 1.8 to 2.8 | 2.0 | 2.2 | 2.4 |
| 6948 | 59% | 35% | 6.5% | 0.8 to 3 | 1.8 to 2.8 | 2.0 | 2.2 | 2.4 |
| 6949 | 60% | 34% | 6.5% | 0.8 to 3 | 1.8 to 2.8 | 2.0 | 2.2 | 2.4 |
| 6950 | 30% | 63% | 7% | 0.8 to 3 | 1.8 to 2.8 | 2.0 | 2.2 | 2.4 |
| 6951 | 31% | 62% | 7% | 0.8 to 3 | 1.8 to 2.8 | 2.0 | 2.2 | 2.4 |
| 6952 | 32% | 61% | 7% | 0.8 to 3 | 1.8 to 2.8 | 2.0 | 2.2 | 2.4 |
| 6953 | 33% | 60% | 7% | 0.8 to 3 | 1.8 to 2.8 | 2.0 | 2.2 | 2.4 |
| 6954 | 34% | 59% | 7% | 0.8 to 3 | 1.8 to 2.8 | 2.0 | 2.2 | 2.4 |
| 6955 | 35% | 58% | 7% | 0.8 to 3 | 1.8 to 2.8 | 2.0 | 2.2 | 2.4 |
| 6956 | 36% | 57% | 7% | 0.8 to 3 | 1.8 to 2.8 | 2.0 | 2.2 | 2.4 |
| 6957 | 37% | 56% | 7% | 0.8 to 3 | 1.8 to 2.8 | 2.0 | 2.2 | 2.4 |
| 6958 | 38% | 55% | 7% | 0.8 to 3 | 1.8 to 2.8 | 2.0 | 2.2 | 2.4 |
| 6959 | 39% | 54% | 7% | 0.8 to 3 | 1.8 to 2.8 | 2.0 | 2.2 | 2.4 |
| 6960 | 40% | 53% | 7% | 0.8 to 3 | 1.8 to 2.8 | 2.0 | 2.2 | 2.4 |
| 6961 | 41% | 52% | 7% | 0.8 to 3 | 1.8 to 2.8 | 2.0 | 2.2 | 2.4 |
| 6962 | 42% | 51% | 7% | 0.8 to 3 | 1.8 to 2.8 | 2.0 | 2.2 | 2.4 |
| 6963 | 43% | 50% | 7% | 0.8 to 3 | 1.8 to 2.8 | 2.0 | 2.2 | 2.4 |
| 6964 | 44% | 49% | 7% | 0.8 to 3 | 1.8 to 2.8 | 2.0 | 2.2 | 2.4 |
| 6965 | 45% | 48% | 7% | 0.8 to 3 | 1.8 to 2.8 | 2.0 | 2.2 | 2.4 |
| 6966 | 46% | 47% | 7% | 0.8 to 3 | 1.8 to 2.8 | 2.0 | 2.2 | 2.4 |
| 6967 | 47% | 46% | 7% | 0.8 to 3 | 1.8 to 2.8 | 2.0 | 2.2 | 2.4 |
| 6968 | 48% | 45% | 7% | 0.8 to 3 | 1.8 to 2.8 | 2.0 | 2.2 | 2.4 |
| 6969 | 49% | 44% | 7% | 0.8 to 3 | 1.8 to 2.8 | 2.0 | 2.2 | 2.4 |
| 6970 | 50% | 43% | 7% | 0.8 to 3 | 1.8 to 2.8 | 2.0 | 2.2 | 2.4 |
| 6971 | 51% | 42% | 7% | 0.8 to 3 | 1.8 to 2.8 | 2.0 | 2.2 | 2.4 |
| 6972 | 52% | 41% | 7% | 0.8 to 3 | 1.8 to 2.8 | 2.0 | 2.2 | 2.4 |
| 6973 | 53% | 40% | 7% | 0.8 to 3 | 1.8 to 2.8 | 2.0 | 2.2 | 2.4 |
| 6974 | 54% | 39% | 7% | 0.8 to 3 | 1.8 to 2.8 | 2.0 | 2.2 | 2.4 |
| 6975 | 55% | 38% | 7% | 0.8 to 3 | 1.8 to 2.8 | 2.0 | 2.2 | 2.4 |
| 6976 | 56% | 37% | 7% | 0.8 to 3 | 1.8 to 2.8 | 2.0 | 2.2 | 2.4 |
| 6977 | 57% | 36% | 7% | 0.8 to 3 | 1.8 to 2.8 | 2.0 | 2.2 | 2.4 |
| 6978 | 58% | 35% | 7% | 0.8 to 3 | 1.8 to 2.8 | 2.0 | 2.2 | 2.4 |
| 6979 | 59% | 34% | 7% | 0.8 to 3 | 1.8 to 2.8 | 2.0 | 2.2 | 2.4 |
| 6980 | 60% | 33% | 7% | 0.8 to 3 | 1.8 to 2.8 | 2.0 | 2.2 | 2.4 |

The invention claimed is:
1. A gypsum slurry comprising gypsum, water, and a surfactant composition comprising
from 97.5 to 99.5 wt. % by total surfactant weight of a linear or branched alkyl sulfate having the structure of Formula (1):

$$R^1\!-\!OSO_3^-{}^+M^1 \qquad (1)$$

in which $R^1$ is linear or branched alkyl having from 6 to 14 carbon atoms and $M^1$ is a cation selected from sodium, calcium, ammonium, or a combination of two or all of these,
an average number of carbon atoms, $n_m$, in $R^1$ between 9 and 10, and
the following proportions by weight of species of Formula (1):
  25% to 47% in which $R^1$ is straight or branched $C_8H_{17}$;
  38% to 55% in which $R^1$ is straight or branched $C_{10}H_{21}$;
  12% to 20% in which $R^1$ is straight or branched $C_{12}H_{25}$;
and from 0.5 to 2.5 wt. % by total surfactant weight of a linear or branched alkyl ether sulfate having the structure of Formula (2):

$$R^2\!-\!(OCH_2CH_2)_y OSO_3^-{}^+M^2 \qquad (2)$$

in which $R^2$ is branched alkyl or linear alkyl or a combination thereof having from 6 to 14 carbon atoms,
y has an average value from 0.1 to 5, and
$M^2$ is a cation selected from sodium, calcium, ammonium, or a combination of two or all of these,
an average number of carbon atoms, $n_m$, in $R^2$ between 9 and 10, and
an average value of y from 0.5 to 2.5.
2. A gypsum board comprising a core having multiple foam voids and facing sheets, the core having been formed from a gypsum slurry according to claim 1.

* * * * *